US010264138B2

(12) United States Patent
Raleigh et al.

(10) Patent No.: US 10,264,138 B2
(45) Date of Patent: Apr. 16, 2019

(54) MOBILE DEVICE AND SERVICE MANAGEMENT

(71) Applicant: Headwater Research LLC, Tyler, TX (US)

(72) Inventors: Gregory G. Raleigh, Woodside, CA (US); James Lavine, Corte Madera, CA (US); Russell Bertrand Carter, III, San Jose, CA (US)

(73) Assignee: Headwater Research LLC, Tyler, TX (US)

( * ) Notice: Subject to any disclaimer, the term of this patent is extended or adjusted under 35 U.S.C. 154(b) by 0 days.

(21) Appl. No.: 15/428,891

(22) Filed: Feb. 9, 2017

(65) Prior Publication Data

US 2017/0279971 A1 Sep. 28, 2017

Related U.S. Application Data

(63) Continuation of application No. 14/275,805, filed on May 12, 2014, now Pat. No. 9,578,182, which is a (Continued)

(51) Int. Cl.
*H04M 15/00* (2006.01)
*H04L 12/14* (2006.01)

(Continued)

(52) U.S. Cl.
CPC .......... *H04M 15/723* (2013.01); *H04L 12/14* (2013.01); *H04L 67/306* (2013.01); *H04M 15/58* (2013.01);

(Continued)

(58) Field of Classification Search
CPC ......... H04W 4/70; H04W 4/50; H04W 4/005; H04W 4/08; H04W 12/08; H04L 12/14;

(Continued)

(56) References Cited

U.S. PATENT DOCUMENTS 5,131,020 A 7/1992 Liebesny et al.
5,283,904 A 2/1994 Carson et al.

(Continued)

FOREIGN PATENT DOCUMENTS

CA 2688553 A1 12/2008
CN 1310401 A 8/2001

(Continued)

OTHER PUBLICATIONS

Schiller et al., "Location-Based Services," The Morgan Kaufmann Series in Data Management Systems, 2004.

(Continued)

*Primary Examiner* — Andrew Joseph Rudy
(74) *Attorney, Agent, or Firm* — James E. Harris

(57) ABSTRACT

A wireless end-user device, comprising one or more modems enabling the wireless end-user device to communicate with a network system over a wireless access network, a touch-screen user interface, and one or more processors configured to execute one or more instructions that, when executed by the one or more processors, cause the one or more processors to detect a user input through the touch-screen user interface, the user input comprising a request to remove the wireless end-user device from an existing device group account, the existing device group account being associated with one or more devices including the wireless end-user device, and send a message to the network system over the wireless access network, the message conveying the request to remove the wireless end-user device from the existing device group account.

9 Claims, 151 Drawing Sheets

Related U.S. Application Data continuation-in-part of application No. 12/380,780, filed on Mar. 2, 2009, now Pat. No. 8,839,388, and a continuation-in-part of application No. 13/748,152, filed on Jan. 23, 2013, now Pat. No. 9,557,889, which is a continuation-in-part of application No. 13/441, 821, filed on Apr. 6, 2012, now Pat. No. 9,755,842, and a continuation-in-part of application No. 13/374, 959, filed on Jan. 24, 2012, now Pat. No. 8,606,911, which is a continuation-in-part of application No. 13/134,028, filed on May 25, 2011, now Pat. No. 8,589,541, which is a continuation-in-part of application No. 12/695,021, filed on Jan. 27, 2010, now Pat. No. 8,346,225, and a continuation-in-part of application No. 13/134,005, filed on May 25, 2011, now Pat. No. 8,635,335, said application No. 12/695, 021 is a continuation-in-part of application No. 12/380,780, filed on Mar. 2, 2009, now Pat. No. 8,839,388, said application No. 13/134,005 is a continuation-in-part of application No. 12/380,780, and a continuation-in-part of application No. 12/380,778, filed on Mar. 2, 2009, now Pat. No. 8,321,526.

(60) Provisional application No. 61/822,850, filed on May 13, 2013, provisional application No. 61/589,830, filed on Jan. 23, 2012, provisional application No. 61/610,876, filed on Mar. 14, 2012, provisional application No. 61/658,339, filed on Jun. 11, 2012, provisional application No. 61/667,927, filed on Jul. 3, 2012, provisional application No. 61/674,331, filed on Jul. 21, 2012, provisional application No. 61/724,267, filed on Nov. 8, 2012, provisional application No. 61/724,837, filed on Nov. 9, 2012, provisional application No. 61/724,974, filed on Nov. 10, 2012, provisional application No. 61/732,249, filed on Nov. 30, 2012, provisional application No. 61/734,288, filed on Dec. 6, 2012, provisional application No. 61/745,548, filed on Dec. 22, 2012, provisional application No. 61/610,910, filed on Mar. 14, 2012, provisional application No. 61/435,564, filed on Jan. 24, 2011, provisional application No. 61/472,606, filed on Apr. 6, 2011, provisional application No. 61/550,906, filed on Oct. 24, 2011, provisional application No. 61/589,830, filed on Jan. 23, 2012, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.

| | |
|---|---|
| ***H04L 29/08*** | (2006.01) |
| ***H04W 4/08*** | (2009.01) |
| ***H04W 4/24*** | (2018.01) |
| ***H04W 4/00*** | (2018.01) |
| ***H04W 4/50*** | (2018.01) |
| ***H04W 60/06*** | (2009.01) |
| *H04W 12/08* | (2009.01) |
| *H04W 12/06* | (2009.01) |
| *H04L 29/06* | (2006.01) |
| *H04W 4/70* | (2018.01) |
| *H04W 4/029* | (2018.01) |

(52) U.S. Cl.
CPC ..... *H04M 15/765* (2013.01); *H04M 15/7652* (2013.01); *H04M 15/83* (2013.01); *H04M 15/85* (2013.01); *H04M 15/852* (2013.01); *H04W 4/00* (2013.01); *H04W 4/08* (2013.01); *H04W 4/24* (2013.01); *H04W 4/50* (2018.02); *H04W 60/06* (2013.01); *H04L 63/104* (2013.01); *H04M 2215/0188* (2013.01); *H04W 4/029* (2018.02); *H04W 4/70* (2018.02); *H04W 12/06* (2013.01); *H04W 12/08* (2013.01)

(58) Field of Classification Search
CPC . H04L 67/306; H04M 15/765; H04M 15/723; G06Q 20/40; G06Q 10/06375; G06Q 20/102; G06Q 20/20; G06Q 30/0207; G06Q 30/0283; G06Q 30/0284; G06Q 30/04; G06Q 30/0601
USPC ................ 705/16, 17, 21, 35; 709/219–226; 455/414.1, 422.1, 432.1, 502, 556.1, 455/556.2; 463/16; 370/352
See application file for complete search history.

(56) References Cited

U.S. PATENT DOCUMENTS

| | | | |
|---|---|---|---|
| 5,325,532 A | 6/1994 | Crosswy et al. | |
| 5,572,528 A | 11/1996 | Shuen | |
| 5,577,100 A | 11/1996 | McGregor et al. | |
| 5,594,777 A | 1/1997 | Makkonen et al. | |
| 5,617,539 A | 4/1997 | Ludwig et al. | |
| 5,630,159 A | 5/1997 | Zancho | |
| 5,633,484 A | 5/1997 | Zancho et al. | |
| 5,633,868 A | 5/1997 | Baldwin et al. | |
| 5,754,953 A | 5/1998 | Briancon et al. | |
| 5,774,532 A | 6/1998 | Gottlieb et al. | |
| 5,794,142 A | 8/1998 | Vanttila et al. | |
| 5,814,798 A | 9/1998 | Zancho | |
| 5,889,477 A | 3/1999 | Fastenrath | |
| 5,892,900 A | 4/1999 | Ginter et al. | |
| 5,903,845 A | 5/1999 | Buhrmann et al. | |
| 5,915,008 A | 6/1999 | Dulman | |
| 5,915,226 A | 6/1999 | Martineau | |
| 5,933,778 A | 8/1999 | Buhrmann et al. | |
| 5,940,472 A | 8/1999 | Newman et al. | |
| 5,974,439 A | 10/1999 | Bollella | |
| 5,983,270 A | 11/1999 | Abraham et al. | |
| 6,035,281 A | 3/2000 | Crosskey et al. | |
| 6,038,452 A | 3/2000 | Strawczynski et al. | |
| 6,038,540 A | 3/2000 | Krist et al. | |
| 6,047,268 A | 4/2000 | Bartoli et al. | |
| 6,058,434 A | 5/2000 | Wilt et al. | |
| 6,061,571 A | 5/2000 | Tamura | |
| 6,064,878 A | 5/2000 | Denker et al. | |
| 6,078,953 A | 6/2000 | Vaid et al. | |
| 6,081,591 A | 6/2000 | Skoog | |
| 6,098,878 A | 8/2000 | Dent et al. | |
| 6,104,700 A | 8/2000 | Haddock et al. | |
| 6,115,823 A | 9/2000 | Velasco et al. | |
| 6,119,933 A | 9/2000 | Wong et al. | |
| 6,125,391 A | 9/2000 | Meltzer et al. | |
| 6,141,565 A | 10/2000 | Feuerstein et al. | |
| 6,141,686 A | 10/2000 | Jackowski et al. | |
| 6,148,336 A | 11/2000 | Thomas et al. | |
| 6,154,738 A | 11/2000 | Call | |
| 6,157,636 A | 12/2000 | Voit et al. | |
| 6,185,576 B1 | 2/2001 | Mcintosh | |
| 6,198,915 B1 | 3/2001 | McGregor et al. | |
| 6,219,786 B1 | 4/2001 | Cunningham et al. | |
| 6,226,277 B1 | 5/2001 | Chuah | |
| 6,246,870 B1 | 6/2001 | Dent et al. | |
| 6,263,055 B1 | 7/2001 | Garland et al. | |
| 6,292,828 B1 | 9/2001 | Williams | |
| 6,317,584 B1 | 11/2001 | Abu-Amara et al. | |
| 6,370,139 B2 * | 4/2002 | Redmond ........... | G06Q 10/107 370/354 |

(56) References Cited

U.S. PATENT DOCUMENTS 6,381,316 B2 4/2002 Joyce et al.
6,393,014 B1 5/2002 Daly et al.
6,397,259 B1 5/2002 Lincke et al.
6,401,113 B2 6/2002 Lazaridis et al.
6,418,147 B1 7/2002 Wiedeman
6,438,575 B1 8/2002 Khan et al.
6,445,777 B1 9/2002 Clark
6,449,479 B1 9/2002 Sanchez
6,466,984 B1 10/2002 Naveh et al.
6,477,670 B1 11/2002 Ahmadvand
6,502,131 B1 12/2002 Vaid et al.
6,505,114 B2 1/2003 Luciani
6,510,152 B1 1/2003 Gerszberg et al.
6,522,629 B1 2/2003 Anderson, Sr.
6,526,066 B1 2/2003 Weaver
6,532,235 B1 3/2003 Benson et al.
6,532,579 B2 3/2003 Sato et al.
6,535,855 B1 3/2003 Cahill et al.
6,535,949 B1 3/2003 Parker
6,539,082 B1 3/2003 Lowe et al.
6,542,465 B1 4/2003 Wang
6,542,500 B1 4/2003 Gerszberg et al.
6,542,992 B1 4/2003 Peirce et al.
6,546,016 B1 4/2003 Gerszberg et al.
6,563,806 B1 5/2003 Yano et al.
6,570,974 B1 5/2003 Gerszberg et al.
6,574,321 B1 6/2003 Cox et al.
6,574,465 B2 6/2003 Marsh et al.
6,578,076 B1 6/2003 Putzolu
6,581,092 B1 6/2003 Motoyama
6,591,098 B1 7/2003 Shieh et al.
6,598,034 B1 7/2003 Kloth
6,601,040 B1 7/2003 Kolls
6,603,969 B1 8/2003 Vuoristo et al.
6,603,975 B1 8/2003 Inouchi et al.
6,606,744 B1 8/2003 Mikurak
6,628,934 B2 9/2003 Rosenberg et al.
6,631,122 B1 10/2003 Arunachalam et al.
6,636,721 B2 10/2003 Threadgill et al.
6,639,975 B1 * 10/2003 O'Neal .................. G06Q 20/14
379/112.01
6,640,097 B2 10/2003 Corrigan et al.
6,640,334 B1 10/2003 Rasmussen
6,650,887 B2 11/2003 McGregor et al.
6,651,101 B1 11/2003 Gai et al.
6,654,786 B1 11/2003 Fox et al.
6,654,814 B1 11/2003 Britton et al.
6,658,254 B1 12/2003 Purdy et al.
6,662,014 B1 12/2003 Walsh
6,678,516 B2 1/2004 Nordman et al.
6,683,853 B1 1/2004 Kannas et al.
6,684,244 B1 1/2004 Goldman et al.
6,690,918 B2 2/2004 Evans et al.
6,697,821 B2 2/2004 Ziff et al.
6,725,031 B2 4/2004 Watler et al.
6,725,256 B1 4/2004 Albal et al.
6,732,176 B1 5/2004 Stewart et al.
6,735,206 B1 5/2004 Oki et al.
6,748,195 B1 6/2004 Phillips
6,748,437 B1 6/2004 Mankude et al.
6,751,296 B1 6/2004 Albal et al.
6,754,470 B2 6/2004 Hendrickson et al.
6,757,717 B1 6/2004 Goldstein
6,760,417 B1 7/2004 Wallenius
6,763,000 B1 7/2004 Walsh
6,763,226 B1 7/2004 McZeal, Jr.
6,765,864 B1 7/2004 Natarajan et al.
6,765,925 B1 7/2004 Sawyer et al.
6,782,412 B2 8/2004 Brophy et al.
6,785,889 B1 8/2004 Williams
6,792,461 B1 9/2004 Hericourt
6,829,596 B1 12/2004 Frazee
6,829,696 B1 12/2004 Balmer et al.
6,839,340 B1 1/2005 Voit et al.
6,842,628 B1 * 1/2005 Arnold .................... H04L 51/24
455/556.2
6,873,988 B2 3/2005 Herrmann et al.
6,876,653 B2 4/2005 Ambe et al.
6,879,825 B1 4/2005 Daly
6,882,718 B1 4/2005 Smith
6,885,997 B1 4/2005 Roberts
6,901,440 B1 5/2005 Bimm et al.
6,920,455 B1 7/2005 Weschler
6,922,562 B2 7/2005 Ward et al.
6,928,280 B1 8/2005 Xanthos et al.
6,934,249 B1 8/2005 Bertin et al.
6,934,751 B2 8/2005 Jayapalan et al.
6,947,723 B1 9/2005 Gurnani et al.
6,947,985 B2 9/2005 Hegli et al.
6,952,428 B1 10/2005 Necka et al.
6,957,067 B1 10/2005 Iyer et al.
6,959,202 B2 10/2005 Heinonen et al.
6,959,393 B2 10/2005 Hollis et al.
6,965,667 B2 11/2005 Trabandt et al.
6,965,872 B1 11/2005 Grdina
6,967,958 B2 11/2005 Ono et al.
6,970,692 B2 11/2005 Tysor
6,970,927 B1 11/2005 Stewart et al.
6,982,733 B1 1/2006 McNally et al.
6,983,370 B2 1/2006 Eaton et al.
6,996,062 B1 2/2006 Freed et al.
6,996,076 B1 2/2006 Forbes et al.
6,996,393 B2 2/2006 Pyhalammi et al.
6,998,985 B2 2/2006 Reisman et al.
7,002,920 B1 2/2006 Ayyagari et al.
7,007,295 B1 2/2006 Rose et al.
7,013,469 B2 3/2006 Smith et al.
7,017,189 B1 3/2006 DeMello et al.
7,024,200 B2 4/2006 McKenna et al.
7,024,460 B2 4/2006 Koopmas et al.
7,027,055 B2 4/2006 Anderson et al.
7,027,408 B2 4/2006 Nabkel et al.
7,031,733 B2 4/2006 Alminana et al.
7,032,072 B1 4/2006 Quinn et al.
7,039,027 B2 5/2006 Bridgelall
7,039,037 B2 5/2006 Wang et al.
7,039,403 B2 5/2006 Wong
7,039,713 B1 5/2006 Van Gunter et al.
7,042,988 B2 5/2006 Juitt et al.
7,043,225 B1 5/2006 Patel et al.
7,043,226 B2 5/2006 Yamauchi
7,043,268 B2 5/2006 Yukie et al.
7,047,276 B2 5/2006 Liu et al.
7,058,022 B1 6/2006 Carolan et al.
7,058,968 B2 6/2006 Rowland et al.
7,068,600 B2 6/2006 Cain
7,069,248 B2 6/2006 Huber
7,082,422 B1 7/2006 Zirngibl et al.
7,084,775 B1 8/2006 Smith
7,092,696 B1 8/2006 Hosain et al.
7,095,754 B2 8/2006 Benveniste
7,102,620 B2 9/2006 Harries et al.
7,110,753 B2 9/2006 Campen
7,113,780 B2 9/2006 Mckenna et al.
7,113,997 B2 9/2006 Jayapalan et al.
7,120,133 B1 10/2006 Joo et al.
7,133,386 B2 11/2006 Holur et al.
7,133,695 B2 11/2006 Beyda
7,136,361 B2 11/2006 Benveniste
7,139,569 B2 11/2006 Kato
7,142,876 B2 11/2006 Trossen et al.
7,149,229 B1 12/2006 Leung
7,149,521 B2 12/2006 Sundar et al.
7,151,764 B1 12/2006 Heinonen et al.
7,158,792 B1 1/2007 Cook
7,162,237 B1 1/2007 Silver et al.
7,165,040 B2 1/2007 Ehrman et al.
7,167,078 B2 1/2007 Pourchot
7,174,156 B1 2/2007 Mangal
7,174,174 B2 2/2007 Boris et al.
7,177,919 B1 2/2007 Truong et al.
7,180,855 B1 2/2007 Lin
7,181,017 B1 2/2007 Nagel et al.

(56) References Cited

U.S. PATENT DOCUMENTS

| | | | | |
|---|---|---|---|---|
| 7,181,197 | B2 | 2/2007 | Clayton | |
| 7,191,248 | B2 | 3/2007 | Chattopadhyay et al. | |
| 7,197,321 | B2 | 3/2007 | Erskine et al. | |
| 7,200,112 | B2 | 4/2007 | Sundar et al. | |
| 7,200,551 | B1 * | 4/2007 | Senez | G06Q 20/10 705/35 |
| 7,203,169 | B1 | 4/2007 | Okholm et al. | |
| 7,203,721 | B1 | 4/2007 | Ben-Efraim et al. | |
| 7,203,752 | B2 | 4/2007 | Rice et al. | |
| 7,209,664 | B1 | 4/2007 | McNicol et al. | |
| 7,212,491 | B2 | 5/2007 | Koga | |
| 7,219,123 | B1 | 5/2007 | Fiechter et al. | |
| 7,222,190 | B2 | 5/2007 | Klinker et al. | |
| 7,222,304 | B2 | 5/2007 | Beaton et al. | |
| 7,224,968 | B2 | 5/2007 | Dobson et al. | |
| 7,228,354 | B2 | 6/2007 | Chambliss et al. | |
| 7,236,780 | B2 | 6/2007 | Benco | |
| 7,242,668 | B2 | 7/2007 | Kan et al. | |
| 7,242,920 | B2 | 7/2007 | Morris | |
| 7,245,901 | B2 | 7/2007 | McGregor et al. | |
| 7,248,570 | B2 | 7/2007 | Bahl et al. | |
| 7,251,218 | B2 | 7/2007 | Jorgensen | |
| 7,260,382 | B1 | 8/2007 | Lamb et al. | |
| 7,266,371 | B1 | 9/2007 | Amin et al. | |
| 7,269,157 | B2 | 9/2007 | Klinker et al. | |
| 7,271,765 | B2 | 9/2007 | Stilp et al. | |
| 7,272,660 | B1 | 9/2007 | Powers et al. | |
| 7,280,816 | B2 | 10/2007 | Fratti et al. | |
| 7,280,818 | B2 | 10/2007 | Clayton | |
| 7,283,561 | B1 | 10/2007 | Picher-Dempsey | |
| 7,283,963 | B1 | 10/2007 | Fitzpatrick et al. | |
| 7,286,834 | B2 | 10/2007 | Walter | |
| 7,286,848 | B2 | 10/2007 | Vireday et al. | |
| 7,289,489 | B1 | 10/2007 | Kung et al. | |
| 7,290,283 | B2 | 10/2007 | Copeland, III | |
| 7,310,424 | B2 | 12/2007 | Gehring et al. | |
| 7,313,237 | B2 | 12/2007 | Bahl et al. | |
| 7,315,892 | B2 | 1/2008 | Freimuth et al. | |
| 7,317,699 | B2 | 1/2008 | Godfrey et al. | |
| 7,318,111 | B2 | 1/2008 | Zhao | |
| 7,320,029 | B2 | 1/2008 | Rinne et al. | |
| 7,322,044 | B2 | 1/2008 | Hrastar | |
| 7,324,447 | B1 | 1/2008 | Morford | |
| 7,325,037 | B2 | 1/2008 | Lawson | |
| 7,336,960 | B2 | 2/2008 | Zavalkovsky et al. | |
| 7,340,772 | B2 | 3/2008 | Panasyuk et al. | |
| 7,346,410 | B2 | 3/2008 | Uchiyama | |
| 7,349,695 | B2 | 3/2008 | Oommen et al. | |
| 7,353,533 | B2 | 4/2008 | Wright et al. | |
| 7,356,011 | B1 | 4/2008 | Waters et al. | |
| 7,356,337 | B2 | 4/2008 | Florence | |
| 7,366,497 | B2 | 4/2008 | Nagata | |
| 7,366,654 | B2 | 4/2008 | Moore | |
| 7,369,848 | B2 | 5/2008 | Jiang | |
| 7,369,856 | B2 | 5/2008 | Ovadia | |
| 7,373,136 | B2 | 5/2008 | Watler et al. | |
| 7,373,179 | B2 | 5/2008 | Stine et al. | |
| 7,379,731 | B2 | 5/2008 | Natsuno et al. | |
| 7,388,950 | B2 | 6/2008 | Elsey et al. | |
| 7,389,412 | B2 | 6/2008 | Sharma et al. | |
| 7,391,724 | B2 | 6/2008 | Alakoski et al. | |
| 7,395,244 | B1 | 7/2008 | Kingsford | |
| 7,401,338 | B1 | 7/2008 | Bowen et al. | |
| 7,403,763 | B2 | 7/2008 | Maes | |
| 7,409,447 | B1 | 8/2008 | Assadzadeh | |
| 7,409,569 | B2 | 8/2008 | Illowsky et al. | |
| 7,411,930 | B2 | 8/2008 | Montojo et al. | |
| 7,418,253 | B2 | 8/2008 | Kavanah | |
| 7,418,257 | B2 | 8/2008 | Kim | |
| 7,421,004 | B2 | 9/2008 | Feher | |
| 7,423,971 | B1 | 9/2008 | Mohaban et al. | |
| 7,428,750 | B1 | 9/2008 | Dunn et al. | |
| 7,433,362 | B2 | 10/2008 | Mallya et al. | |
| 7,436,816 | B2 | 10/2008 | Mehta et al. | |
| 7,440,433 | B2 | 10/2008 | Rink et al. | |
| 7,444,669 | B1 | 10/2008 | Bahl et al. | |
| 7,450,591 | B2 | 11/2008 | Korling et al. | |
| 7,450,927 | B1 | 11/2008 | Creswell et al. | |
| 7,454,191 | B2 | 11/2008 | Dawson et al. | |
| 7,457,265 | B2 | 11/2008 | Julka et al. | |
| 7,457,870 | B1 | 11/2008 | Lownsbrough et al. | |
| 7,460,837 | B2 | 12/2008 | Diener | |
| 7,466,652 | B2 | 12/2008 | Lau et al. | |
| 7,467,160 | B2 * | 12/2008 | McIntyre | G06Q 20/387 |
| 7,472,189 | B2 | 12/2008 | Mallya et al. | |
| 7,478,420 | B2 | 1/2009 | Wright et al. | |
| 7,486,185 | B2 | 2/2009 | Culpepper et al. | |
| 7,486,658 | B2 | 2/2009 | Kumar | |
| 7,493,659 | B1 | 2/2009 | Wu et al. | |
| 7,496,652 | B2 | 2/2009 | Pezzutti | |
| 7,499,438 | B2 | 3/2009 | Hinman et al. | |
| 7,499,537 | B2 | 3/2009 | Elsey et al. | |
| 7,502,672 | B1 | 3/2009 | Kolls | |
| 7,505,756 | B2 | 3/2009 | Bahl | |
| 7,505,795 | B1 | 3/2009 | Lim et al. | |
| 7,508,799 | B2 | 3/2009 | Sumner et al. | |
| 7,512,128 | B2 | 3/2009 | DiMambro et al. | |
| 7,512,131 | B2 | 3/2009 | Svensson et al. | |
| 7,515,608 | B2 | 4/2009 | Yuan et al. | |
| 7,515,926 | B2 | 4/2009 | Bu et al. | |
| 7,516,219 | B2 | 4/2009 | Moghaddam et al. | |
| 7,522,549 | B2 | 4/2009 | Karaoguz et al. | |
| 7,522,576 | B2 | 4/2009 | Du et al. | |
| 7,526,541 | B2 | 4/2009 | Roese et al. | |
| 7,529,204 | B2 | 5/2009 | Bourlas et al. | |
| 7,535,880 | B1 | 5/2009 | Hinman et al. | |
| 7,536,695 | B2 | 5/2009 | Alam et al. | |
| 7,539,132 | B2 | 5/2009 | Werner et al. | |
| 7,539,862 | B2 | 5/2009 | Edgett et al. | |
| 7,540,408 | B2 | 6/2009 | Levine et al. | |
| 7,545,782 | B2 | 6/2009 | Rayment et al. | |
| 7,546,460 | B2 | 6/2009 | Maes | |
| 7,546,629 | B2 | 6/2009 | Albert et al. | |
| 7,548,875 | B2 | 6/2009 | Mikkelsen et al. | |
| 7,548,976 | B2 | 6/2009 | Bahl et al. | |
| 7,551,921 | B2 * | 6/2009 | Petermann | H04W 16/26 455/422.1 |
| 7,551,922 | B2 | 6/2009 | Roskowski et al. | |
| 7,554,983 | B1 | 6/2009 | Muppala | |
| 7,555,757 | B2 | 6/2009 | Smith et al. | |
| 7,561,899 | B2 | 7/2009 | Lee | |
| 7,562,213 | B1 | 7/2009 | Timms | |
| 7,564,799 | B2 | 7/2009 | Holland et al. | |
| 7,565,141 | B2 | 7/2009 | Macaluso | |
| 7,574,509 | B2 | 8/2009 | Nixon et al. | |
| 7,574,731 | B2 | 8/2009 | Fascenda | |
| 7,577,431 | B2 | 8/2009 | Jiang | |
| 7,580,356 | B1 | 8/2009 | Mishra et al. | |
| 7,580,857 | B2 | 8/2009 | VanFleet et al. | |
| 7,583,964 | B2 | 9/2009 | Wong | |
| 7,584,298 | B2 | 9/2009 | Klinker et al. | |
| 7,586,871 | B2 | 9/2009 | Hamilton et al. | |
| 7,593,417 | B2 | 9/2009 | Wang et al. | |
| 7,593,730 | B2 | 9/2009 | Khandelwal et al. | |
| 7,596,373 | B2 | 9/2009 | Mcgregor et al. | |
| 7,599,288 | B2 | 10/2009 | Cole et al. | |
| 7,599,714 | B2 | 10/2009 | Kuzminskiy | |
| 7,602,746 | B2 | 10/2009 | Calhoun et al. | |
| 7,606,357 | B2 | 10/2009 | Daigle | |
| 7,606,918 | B2 * | 10/2009 | Holzman | H04L 63/08 709/206 |
| 7,607,041 | B2 | 10/2009 | Kraemer et al. | |
| 7,609,650 | B2 | 10/2009 | Roskowski et al. | |
| 7,609,700 | B1 | 10/2009 | Ying et al. | |
| 7,610,047 | B2 | 10/2009 | Hicks, III et al. | |
| 7,610,057 | B2 | 10/2009 | Bahl et al. | |
| 7,610,328 | B2 | 10/2009 | Haase et al. | |
| 7,610,396 | B2 | 10/2009 | Taglienti et al. | |
| 7,612,712 | B2 | 11/2009 | LaMance et al. | |
| 7,614,051 | B2 | 11/2009 | Glaum et al. | |
| 7,616,962 | B2 | 11/2009 | Oswal et al. | |
| 7,617,516 | B2 | 11/2009 | Huslak et al. | |
| 7,620,041 | B2 | 11/2009 | Dunn et al. | |
| 7,620,065 | B2 | 11/2009 | Falardeau | |

(56) References Cited

U.S. PATENT DOCUMENTS 7,620,162 B2 11/2009 Aaron et al.
7,620,383 B2 11/2009 Taglienti et al.
7,627,314 B2 12/2009 Carlson et al.
7,627,600 B2 12/2009 Citron et al.
7,627,767 B2 12/2009 Sherman et al.
7,627,872 B2 12/2009 Hebeler et al.
7,633,438 B2 12/2009 Tysowski
7,634,388 B2 12/2009 Archer et al.
7,636,574 B2 12/2009 Poosala
7,636,626 B2 12/2009 Oesterling et al.
7,643,411 B2 1/2010 Andreasen et al.
7,644,151 B2 1/2010 Jerrim et al.
7,644,267 B2 1/2010 Ylikoski et al.
7,644,414 B2 1/2010 Smith et al.
7,647,047 B2 1/2010 Moghaddam et al.
7,650,137 B2 1/2010 Jobs et al.
7,653,394 B2 1/2010 McMillin
7,656,271 B2 2/2010 Ehrman et al.
7,657,920 B2 2/2010 Arseneau et al.
7,660,419 B1 2/2010 Ho
7,661,124 B2 2/2010 Ramanathan et al.
7,664,494 B2 2/2010 Jiang
7,668,176 B2 2/2010 Chuah
7,668,612 B1 2/2010 Okkonen
7,668,903 B2 2/2010 Edwards et al.
7,668,966 B2 2/2010 Klinker et al.
7,676,673 B2 3/2010 Weller et al.
7,680,086 B2 3/2010 Eglin
7,681,226 B2 3/2010 Kraemer et al.
7,684,370 B2 3/2010 Kezys
7,685,131 B2 3/2010 Batra et al.
7,685,254 B2 3/2010 Pandya
7,685,530 B2 3/2010 Sherrard et al.
7,688,792 B2 3/2010 Babbar et al.
7,693,107 B2 4/2010 De Froment
7,693,720 B2 4/2010 Kennewick et al.
7,697,540 B2 4/2010 Haddad et al.
7,710,932 B2 5/2010 Muthuswamy et al.
7,711,848 B2 5/2010 Maes
7,719,966 B2 5/2010 Luft et al.
7,720,206 B2 5/2010 Devolites et al.
7,720,464 B2 5/2010 Batta
7,720,505 B2 5/2010 Gopi et al.
7,720,960 B2 5/2010 Pruss et al.
7,721,296 B2 5/2010 Ricagni
7,724,716 B2 5/2010 Fadell
7,725,570 B1 5/2010 Lewis
7,729,326 B2 6/2010 Sekhar
7,730,123 B1 6/2010 Erickson et al.
7,734,784 B1 6/2010 Araujo et al.
7,742,406 B1 6/2010 Muppala
7,746,854 B2 6/2010 Ambe et al.
7,747,240 B1 6/2010 Briscoe et al.
7,747,699 B2 6/2010 Prueitt et al.
7,747,730 B1 6/2010 Harlow
7,752,330 B2 7/2010 Olsen et al.
7,756,056 B2 7/2010 Kim et al.
7,756,509 B2 7/2010 Rajagopalan et al.
7,756,534 B2 7/2010 Anupam et al.
7,756,757 B1 7/2010 Oakes, III
7,760,137 B2 7/2010 Martucci et al.
7,760,711 B1 7/2010 Kung et al.
7,760,861 B1 7/2010 Croak et al.
7,765,294 B2 7/2010 Edwards et al.
7,769,397 B2 8/2010 Funato et al.
7,770,785 B2 8/2010 Jha et al.
7,774,323 B2 8/2010 Helfman
7,774,412 B1 8/2010 Schnepel
7,774,456 B1 8/2010 Lownsbrough et al.
7,778,176 B2 8/2010 Morford
7,778,643 B2 8/2010 Laroia et al.
7,792,257 B1 9/2010 Vanier et al.
7,792,538 B2 9/2010 Kozisek
7,792,708 B2 9/2010 Alva
7,797,019 B2 9/2010 Friedmann
7,797,060 B2 9/2010 Grgic et al.
7,797,204 B2 9/2010 Balent
7,797,401 B2 9/2010 Stewart et al.
7,801,523 B1 9/2010 Kenderov
7,801,783 B2 9/2010 Kende et al.
7,801,985 B1 9/2010 Pitkow et al.
7,802,724 B1 9/2010 Nohr
7,805,140 B2 9/2010 Friday et al.
7,805,522 B2 9/2010 Schlüter et al.
7,805,606 B2 9/2010 Birger et al.
7,809,351 B1 10/2010 Panda et al.
7,809,372 B2 10/2010 Rajaniemi
7,813,746 B2 10/2010 Rajkotia
7,817,615 B1 10/2010 Breau et al.
7,817,983 B2 10/2010 Cassett et al.
7,822,837 B1 10/2010 Urban et al.
7,822,849 B2 10/2010 Titus
7,826,427 B2 11/2010 Sood et al.
7,826,607 B1 11/2010 De Carvalho Resende et al.
7,835,275 B1 11/2010 Swan et al.
7,843,831 B2 11/2010 Morrill et al.
7,843,843 B1 11/2010 Papp, III et al.
7,844,034 B1 11/2010 Oh et al.
7,844,728 B2 11/2010 Anderson et al.
7,848,768 B2 12/2010 Omori et al.
7,849,161 B2 12/2010 Koch et al.
7,849,170 B1 * 12/2010 Hargens .............. G06Q 20/085
705/17
7,849,477 B2 12/2010 Cristofalo et al.
7,853,255 B2 12/2010 Karaoguz et al.
7,853,656 B2 12/2010 Yach et al.
7,856,226 B2 12/2010 Wong et al.
7,860,088 B2 12/2010 Lioy
7,865,182 B2 1/2011 Macaluso
7,865,187 B2 1/2011 Ramer et al.
7,868,778 B2 1/2011 Kenwright
7,868,814 B1 1/2011 Bergman
7,873,001 B2 1/2011 Silver
7,873,344 B2 1/2011 Bowser et al.
7,873,346 B2 1/2011 Petersson et al.
7,873,540 B2 1/2011 Arumugam
7,873,705 B2 1/2011 Kalish
7,877,090 B2 1/2011 Maes
7,881,199 B2 2/2011 Krstulich
7,881,697 B2 2/2011 Baker et al.
7,882,029 B2 2/2011 White
7,882,247 B2 2/2011 Sturniolo et al.
7,882,560 B2 2/2011 Kraemer et al.
7,886,047 B1 2/2011 Potluri
7,889,384 B2 2/2011 Armentrout et al.
7,890,084 B1 2/2011 Dudziak et al.
7,890,111 B2 2/2011 Bugenhagen
7,894,431 B2 2/2011 Goring et al.
7,899,039 B2 3/2011 Andreasen et al.
7,899,438 B2 3/2011 Baker et al.
7,903,553 B2 3/2011 Liu
7,907,970 B2 3/2011 Park et al.
7,911,975 B2 3/2011 Droz et al.
7,912,025 B2 3/2011 Pattenden et al.
7,912,056 B1 3/2011 Brassem
7,920,529 B1 4/2011 Mahler et al.
7,921,463 B2 4/2011 Sood et al.
7,925,740 B2 4/2011 Nath et al.
7,925,778 B1 4/2011 Wijnands et al.
7,929,959 B2 4/2011 DeAtley et al.
7,929,960 B2 4/2011 Martin et al.
7,929,973 B2 4/2011 Zavalkovsky et al.
7,930,327 B2 4/2011 Craft et al.
7,930,446 B2 4/2011 Kesselman et al.
7,930,553 B2 4/2011 Satarasinghe et al.
7,933,274 B2 4/2011 Verma et al.
7,936,736 B2 5/2011 Proctor, Jr. et al.
7,937,069 B2 5/2011 Rassam
7,937,450 B2 5/2011 Janik
7,940,685 B1 5/2011 Breslau et al.
7,940,751 B2 5/2011 Hansen
7,941,184 B2 5/2011 Prendergast et al.
7,944,948 B2 5/2011 Chow et al.
7,945,238 B2 5/2011 Baker et al.

(56) References Cited

U.S. PATENT DOCUMENTS 7,945,240 B1 5/2011 Klock et al.
7,945,945 B2 5/2011 Graham et al.
7,948,952 B2 5/2011 Hurtta et al.
7,948,953 B2 5/2011 Melkote et al.
7,948,968 B2 5/2011 Voit et al.
7,949,529 B2 5/2011 Weider et al.
7,953,808 B2 5/2011 Sharp et al.
7,953,877 B2 5/2011 Vemula et al.
7,957,020 B2 6/2011 Mine et al.
7,957,381 B2 6/2011 Clermidy et al.
7,957,511 B2 6/2011 Drudis et al.
7,958,029 B1 6/2011 Bobich et al.
7,962,622 B2 6/2011 Friend et al.
7,965,983 B1 6/2011 Swan et al.
7,966,405 B2 6/2011 Sundaresan et al.
7,969,950 B2 6/2011 Iyer et al.
7,970,350 B2 6/2011 Sheynman
7,970,426 B2 6/2011 Poe et al.
7,974,624 B2 7/2011 Gallagher et al.
7,975,184 B2 7/2011 Goff et al.
7,978,627 B2 7/2011 Taylor et al.
7,978,686 B2 7/2011 Goyal et al.
7,979,069 B2 7/2011 Hupp et al.
7,979,889 B2 7/2011 Gladstone et al.
7,979,896 B2 * 7/2011 McMurtry ............ G06F 21/335 709/225
7,984,130 B2 7/2011 Bogineni et al.
7,984,511 B2 7/2011 Kocher et al.
7,986,935 B1 7/2011 D'Souza et al.
7,987,496 B2 7/2011 Bryce et al.
7,987,510 B2 7/2011 Kocher et al.
7,990,049 B2 8/2011 Shioya
8,000,276 B2 8/2011 Scherzer et al.
8,000,318 B2 8/2011 Wiley et al.
8,005,009 B2 8/2011 McKee et al.
8,005,459 B2 8/2011 Balsillie
8,005,726 B1 8/2011 Bao
8,005,913 B1 8/2011 Carlander
8,005,988 B2 8/2011 Maes
8,010,080 B1 8/2011 Thenthiruperai et al.
8,010,081 B1 8/2011 Roskowski
8,010,082 B2 8/2011 Sutaria et al.
8,010,990 B2 8/2011 Ferguson et al.
8,015,133 B1 9/2011 Wu et al.
8,015,234 B2 9/2011 Lum et al.
8,019,687 B2 9/2011 Wang et al.
8,019,820 B2 9/2011 Son et al.
8,019,846 B2 9/2011 Roelens et al.
8,019,868 B2 9/2011 Rao et al.
8,019,886 B2 9/2011 Harrang et al.
8,023,425 B2 9/2011 Raleigh
8,024,397 B1 9/2011 Erickson et al.
8,024,424 B2 9/2011 Freimuth et al.
8,027,339 B2 9/2011 Short et al.
8,031,601 B2 10/2011 Feroz et al.
8,032,168 B2 10/2011 Ikaheimo
8,032,409 B1 10/2011 Mikurak
8,032,899 B2 10/2011 Archer et al.
8,036,387 B2 10/2011 Kudelski et al.
8,036,600 B2 10/2011 Garrett et al.
8,044,792 B2 10/2011 Orr et al.
8,045,973 B2 10/2011 Chambers
8,046,449 B2 10/2011 Yoshiuchi
8,050,275 B1 11/2011 Iyer
8,050,690 B2 11/2011 Neeraj
8,050,705 B2 11/2011 Sicher et al.
8,059,530 B1 11/2011 Cole
8,060,017 B2 11/2011 Schlicht et al.
8,060,463 B1 11/2011 Spiegel
8,064,418 B2 11/2011 Maki
8,064,896 B2 11/2011 Bell et al.
8,065,365 B2 11/2011 Saxena et al.
8,068,824 B2 11/2011 Shan et al.
8,068,829 B2 11/2011 Lemond et al.
8,073,427 B2 12/2011 Koch et al.
8,073,721 B1 12/2011 Lewis
8,078,140 B2 12/2011 Baker et al.
8,078,163 B2 12/2011 Lemond et al.
8,085,808 B2 12/2011 Brusca et al.
8,086,398 B2 12/2011 Sanchez et al.
8,086,497 B1 12/2011 Oakes, III
8,086,791 B2 12/2011 Caulkins
8,090,359 B2 1/2012 Proctor, Jr. et al.
8,090,361 B2 1/2012 Hagan
8,090,616 B2 1/2012 Proctor, Jr. et al.
8,091,087 B2 1/2012 Ali et al.
8,094,551 B2 1/2012 Huber et al.
8,095,112 B2 1/2012 Chow et al.
8,095,124 B2 1/2012 Balia
8,095,640 B2 1/2012 Guingo et al.
8,095,666 B2 1/2012 Schmidt et al.
8,098,579 B2 1/2012 Ray et al.
8,099,077 B2 1/2012 Chowdhury et al.
8,099,517 B2 1/2012 Jia et al.
8,102,814 B2 1/2012 Rahman et al.
8,103,285 B2 1/2012 Kalhan
8,104,080 B2 1/2012 Burns et al.
8,107,953 B2 1/2012 Zimmerman et al.
8,108,520 B2 1/2012 Ruutu et al.
8,108,680 B2 * 1/2012 Murray ................ H04N 21/462 713/176
8,112,435 B2 2/2012 Epstein et al.
8,116,223 B2 2/2012 Tian et al.
8,116,749 B2 2/2012 Proctor, Jr. et al.
8,116,781 B2 2/2012 Chen et al.
8,122,128 B2 2/2012 Burke, II et al.
8,122,249 B2 2/2012 Falk et al.
8,125,897 B2 2/2012 Ray et al.
8,126,123 B2 2/2012 Cai et al.
8,126,396 B2 2/2012 Bennett
8,126,476 B2 2/2012 Vardi et al.
8,126,722 B2 2/2012 Robb et al.
8,130,793 B2 3/2012 Edwards et al.
8,131,256 B2 3/2012 Martti et al.
8,131,281 B1 3/2012 Hildner et al.
8,131,840 B1 3/2012 Denker
8,131,858 B2 3/2012 Agulnik et al.
8,132,256 B2 3/2012 Bari
8,134,954 B2 3/2012 Godfrey et al.
8,135,388 B1 3/2012 Gailloux et al.
8,135,392 B2 3/2012 Marcellino et al.
8,135,657 B2 3/2012 Kapoor et al.
8,140,690 B2 3/2012 Ly et al.
8,144,591 B2 3/2012 Ghai et al.
8,145,194 B2 3/2012 Yoshikawa et al.
8,146,142 B2 3/2012 Lortz et al.
8,149,748 B2 4/2012 Bata et al.
8,149,771 B2 4/2012 Khivesara et al.
8,149,823 B2 4/2012 Turcan et al.
8,150,394 B2 4/2012 Bianconi et al.
8,150,431 B2 4/2012 Wolovitz et al.
8,151,205 B2 4/2012 Follmann et al.
8,152,246 B2 4/2012 Miller et al.
8,155,155 B1 4/2012 Chow et al.
8,155,620 B2 4/2012 Wang et al.
8,155,666 B2 4/2012 Alizadeh-Shabdiz
8,155,670 B2 4/2012 Fullam et al.
8,156,206 B2 4/2012 Kiley et al.
8,159,520 B1 4/2012 Dhanoa et al.
8,160,015 B2 4/2012 Rashid et al.
8,160,056 B2 4/2012 Van der Merwe et al.
8,160,598 B2 4/2012 Savoor
8,165,576 B2 4/2012 Raju et al.
8,166,040 B2 4/2012 Brindisi et al.
8,166,554 B2 4/2012 John
8,170,553 B2 5/2012 Bennett
8,174,378 B2 5/2012 Richman et al.
8,174,970 B2 5/2012 Adamczyk et al.
8,175,574 B1 5/2012 Panda et al.
8,180,333 B1 5/2012 Wells et al.
8,180,881 B2 5/2012 Seo et al.
8,180,886 B2 5/2012 Overcash et al.
8,184,530 B1 5/2012 Swan et al.
8,184,590 B2 5/2012 Rosenblatt

(56) References Cited

U.S. PATENT DOCUMENTS 8,185,088 B2 5/2012 Klein et al.
8,185,093 B2 5/2012 Jheng et al.
8,185,127 B1 5/2012 Cai et al.
8,185,152 B1 5/2012 Goldner
8,185,158 B2 5/2012 Tamura et al.
8,190,087 B2 5/2012 Fisher et al.
8,190,122 B1 5/2012 Alexander et al.
8,190,675 B2 5/2012 Tribbett
8,191,106 B2 5/2012 Choyi et al.
8,191,116 B1 5/2012 Gazzard
8,191,124 B2 5/2012 Wynn et al.
8,194,549 B2 6/2012 Huber et al.
8,194,553 B2 6/2012 Liang et al.
8,194,572 B2 6/2012 Horvath et al.
8,194,581 B1 6/2012 Schroeder et al.
8,195,093 B2 6/2012 Garrett et al.
8,195,153 B1 6/2012 Frencel et al.
8,195,163 B2 6/2012 Gisby et al.
8,195,661 B2 6/2012 Kalavade
8,196,199 B2 6/2012 Hrastar et al.
8,200,163 B2 6/2012 Hoffman
8,200,200 B1 6/2012 Belser et al.
8,200,509 B2 6/2012 Kenedy et al.
8,200,775 B2 6/2012 Moore
8,200,818 B2 6/2012 Freund et al.
8,204,190 B2 6/2012 Bang et al.
8,204,505 B2 6/2012 Jin et al.
8,204,794 B1 6/2012 Peng et al.
8,208,788 B2 6/2012 Ando et al.
8,208,919 B2 6/2012 Kotecha
8,213,296 B2 7/2012 Shannon et al.
8,213,363 B2 7/2012 Ying et al.
8,214,536 B2 7/2012 Zhao
8,214,890 B2 7/2012 Kirovski et al.
8,219,134 B2 7/2012 Maharajh et al.
8,223,655 B2 7/2012 Heinz et al.
8,223,741 B1 7/2012 Bartlett et al.
8,224,382 B2 7/2012 Bultman
8,224,773 B2 7/2012 Spiegel
8,228,818 B2 7/2012 Chase et al.
8,229,394 B2 7/2012 Karlberg
8,229,914 B2 7/2012 Ramer et al.
8,230,061 B2 7/2012 Hassan et al.
8,233,433 B2 7/2012 Kalhan
8,233,883 B2 7/2012 De Froment
8,233,895 B2 7/2012 Tysowski
8,234,583 B2 7/2012 Sloo et al.
8,238,287 B1 8/2012 Gopi et al.
8,239,520 B2 8/2012 Grah
8,242,959 B2 8/2012 Mia et al.
8,244,241 B2 8/2012 Montemurro
8,249,601 B2 8/2012 Emberson et al.
8,254,880 B2 8/2012 Aaltonen et al.
8,254,915 B2 8/2012 Kozisek
8,255,515 B1 8/2012 Melman et al.
8,255,534 B2 8/2012 Assadzadeh
8,255,689 B2 8/2012 Kim et al.
8,259,692 B2 9/2012 Bajko
8,264,965 B2 9/2012 Dolganow et al.
8,265,004 B2 9/2012 Toutonghi
8,266,249 B2 * 9/2012 Hu ..................... H04L 12/2898
709/219
8,266,269 B2 9/2012 Short et al.
8,266,681 B2 9/2012 Deshpande et al.
8,270,955 B2 9/2012 Ramer et al.
8,270,972 B2 9/2012 Otting et al.
8,271,025 B2 9/2012 Brisebois et al.
8,271,045 B2 9/2012 Parolkar et al.
8,271,049 B2 9/2012 Silver et al.
8,271,992 B2 9/2012 Chatley et al.
8,275,415 B2 9/2012 Huslak
8,275,830 B2 9/2012 Raleigh
8,279,067 B2 10/2012 Berger et al.
8,279,864 B2 10/2012 Wood
8,280,351 B1 10/2012 Ahmed et al.
8,280,354 B2 10/2012 Smith et al.
8,284,740 B2 10/2012 O'Connor
8,285,249 B2 10/2012 Baker et al.
8,285,992 B2 10/2012 Mathur et al.
8,291,238 B2 10/2012 Ginter et al.
8,291,439 B2 10/2012 Jethi et al.
8,296,404 B2 10/2012 McDysan et al.
8,300,575 B2 10/2012 Willars
8,301,513 B1 10/2012 Peng et al.
8,306,518 B1 11/2012 Gailloux
8,306,741 B2 11/2012 Tu
8,307,067 B2 11/2012 Ryan
8,307,095 B2 11/2012 Clark et al.
8,310,943 B2 11/2012 Mehta et al.
8,315,198 B2 11/2012 Corneille et al.
8,315,593 B2 11/2012 Gallant et al.
8,315,594 B1 11/2012 Mauser et al.
8,315,718 B2 11/2012 Caffrey et al.
8,315,999 B2 11/2012 Chatley et al.
8,320,244 B2 11/2012 Muqattash et al.
8,320,902 B2 11/2012 Moring et al.
8,320,949 B2 11/2012 Matta
8,325,638 B2 12/2012 Jin et al.
8,325,906 B2 12/2012 Fullarton et al.
8,326,319 B2 12/2012 Davis
8,326,359 B2 12/2012 Kauffman
8,326,828 B2 12/2012 Zhou et al.
8,331,223 B2 12/2012 Hill et al.
8,331,293 B2 12/2012 Sood
8,332,375 B2 12/2012 Chatley et al.
8,332,517 B2 12/2012 Russell
8,335,161 B2 12/2012 Foottit et al.
8,339,991 B2 12/2012 Biswas et al.
8,340,625 B1 12/2012 Johnson et al.
8,340,628 B2 12/2012 Taylor et al.
8,340,678 B1 12/2012 Pandey
8,340,718 B2 12/2012 Colonna et al.
8,346,210 B2 1/2013 Balsan et al.
8,346,923 B2 1/2013 Rowles et al.
8,347,104 B2 1/2013 Pathiyal
8,347,362 B2 1/2013 Cai et al.
8,347,378 B2 1/2013 Merkin et al.
8,350,700 B2 1/2013 Fast et al.
8,351,592 B2 1/2013 Freeny, Jr. et al.
8,351,898 B2 1/2013 Raleigh
8,352,360 B2 1/2013 De Judicibus et al.
8,352,630 B2 1/2013 Hart
8,352,980 B2 1/2013 Howcroft
8,353,001 B2 1/2013 Herrod
8,355,570 B2 1/2013 Karsanbhai et al.
8,355,696 B1 1/2013 Olding et al.
8,356,336 B2 1/2013 Johnston et al.
8,358,638 B2 1/2013 Scherzer et al.
8,358,975 B2 1/2013 Bahl et al.
8,363,658 B1 1/2013 Delker et al.
8,363,799 B2 1/2013 Gruchala et al.
8,364,089 B2 1/2013 Phillips
8,364,806 B2 1/2013 Short et al.
8,369,274 B2 2/2013 Sawai
8,370,477 B2 2/2013 Short et al.
8,370,483 B2 2/2013 Choong et al.
8,374,090 B2 2/2013 Morrill et al.
8,374,102 B2 2/2013 Luft et al.
8,374,592 B2 2/2013 Proctor, Jr. et al.
8,375,128 B2 2/2013 Tofighbakhsh et al.
8,375,136 B2 2/2013 Roman et al.
8,379,847 B2 2/2013 Bell et al.
8,380,247 B2 2/2013 Engstrom
8,385,199 B1 2/2013 Coward et al.
8,385,896 B2 2/2013 Proctor, Jr. et al.
8,385,964 B2 2/2013 Haney
8,385,975 B2 2/2013 Forutanpour et al.
8,386,386 B1 2/2013 Zhu
8,391,262 B2 3/2013 Maki et al.
8,391,834 B2 3/2013 Raleigh
8,392,982 B2 3/2013 Harris et al.
8,396,458 B2 3/2013 Raleigh
8,396,929 B2 3/2013 Helfman et al.
8,401,968 B1 3/2013 Schattauer et al.

(56) References Cited

U.S. PATENT DOCUMENTS 8,402,165 B2 3/2013 Deu-Ngoc et al.
8,402,540 B2 3/2013 Kapoor et al.
8,406,427 B2 3/2013 Chand et al.
8,406,736 B2 3/2013 Das et al.
8,406,756 B1 3/2013 Reeves et al.
8,407,472 B2 3/2013 Hao et al.
8,407,763 B2 3/2013 Weller et al.
8,411,587 B2 4/2013 Curtis et al.
8,411,691 B2 4/2013 Aggarwal
8,412,798 B1 4/2013 Wang
8,413,245 B2 4/2013 Kraemer et al.
8,418,168 B2 4/2013 Tyhurst et al.
8,422,988 B1 4/2013 Keshav
8,423,016 B2 4/2013 Buckley et al.
8,429,403 B2 4/2013 Moret et al.
8,429,409 B1 4/2013 Wall et al.
8,437,734 B2 5/2013 Ray et al.
8,441,955 B2 5/2013 Wilkinson et al.
8,442,015 B2 5/2013 Behzad et al.
8,443,390 B2 5/2013 Lo et al.
8,446,831 B2 5/2013 Kwan et al.
8,447,324 B2 5/2013 Shuman et al.
8,447,607 B2 5/2013 Weider et al.
8,447,980 B2 5/2013 Godfrey et al.
8,448,015 B2 5/2013 Gerhart
8,452,858 B2 5/2013 Wu et al.
8,461,958 B2 6/2013 Saenz et al.
8,463,194 B2 * 6/2013 Erlenback ............. H04J 3/0682 455/502
8,463,232 B2 6/2013 Tuli et al.
8,468,337 B2 6/2013 Gaur et al.
8,472,371 B1 6/2013 Bari et al.
8,477,778 B2 7/2013 Lehmann, Jr. et al.
8,483,135 B2 7/2013 Cai et al.
8,483,694 B2 7/2013 Lewis et al.
8,484,327 B2 7/2013 Werner et al.
8,484,568 B2 7/2013 Rados et al.
8,488,597 B2 7/2013 Nie et al.
8,489,110 B2 7/2013 Frank et al.
8,489,720 B1 7/2013 Morford et al.
8,494,559 B1 7/2013 Malmi
8,495,181 B2 7/2013 Venkatraman et al.
8,495,227 B2 7/2013 Kaminsky et al.
8,495,360 B2 7/2013 Falk et al.
8,495,700 B2 7/2013 Shahbazi
8,495,743 B2 7/2013 Kraemer et al.
8,499,087 B2 7/2013 Hu
RE44,412 E 8/2013 Naqvi et al.
8,500,533 B2 * 8/2013 Lutnick ................... G07F 17/32 463/16
8,503,358 B2 8/2013 Hanson et al.
8,503,455 B2 8/2013 Heikens
8,504,032 B2 8/2013 Lott et al.
8,504,574 B2 8/2013 Dvorak et al.
8,504,687 B2 8/2013 Maffione et al.
8,504,690 B2 8/2013 Shah et al.
8,504,729 B2 8/2013 Pezzutti
8,505,073 B2 8/2013 Taglienti et al.
8,509,082 B2 8/2013 Heinz et al.
8,514,927 B2 8/2013 Sundararajan et al.
8,516,552 B2 8/2013 Raleigh
8,520,589 B2 8/2013 Bhatt et al.
8,520,595 B2 8/2013 Yadav et al.
8,521,110 B2 8/2013 Rofougaran
8,521,775 B1 8/2013 Poh et al.
8,522,039 B2 8/2013 Hyndman et al.
8,522,249 B2 8/2013 Beaule
8,522,337 B2 8/2013 Adusumilli et al.
8,523,547 B2 9/2013 Pekrul
8,526,329 B2 9/2013 Mahany et al.
8,526,350 B2 9/2013 Xue et al.
8,527,410 B2 9/2013 Markki et al.
8,527,662 B2 9/2013 Biswas et al.
8,528,068 B1 9/2013 Weglein et al.
8,531,954 B2 9/2013 McNaughton et al.
8,531,995 B2 9/2013 Khan et al.
8,532,610 B2 9/2013 Manning Cassett et al.
8,533,775 B2 9/2013 Alcorn et al.
8,535,160 B2 * 9/2013 Lutnick .................. G07F 17/32 463/16
8,538,394 B2 9/2013 Zimmerman et al.
8,538,402 B2 9/2013 Vidal et al.
8,538,421 B2 9/2013 Brisebois et al.
8,538,458 B2 9/2013 Haney
8,539,544 B2 9/2013 Garimella et al.
8,539,561 B2 9/2013 Gupta et al.
8,543,265 B2 9/2013 Ekhaguere et al.
8,543,814 B2 9/2013 Laitinen et al.
8,544,105 B2 9/2013 Mclean et al.
8,548,427 B2 10/2013 Chow et al.
8,548,428 B2 10/2013 Raleigh
8,549,173 B1 10/2013 Wu et al.
8,554,876 B2 10/2013 Winsor
8,559,369 B2 10/2013 Barkan
8,561,138 B2 10/2013 Rothman et al.
8,565,746 B2 10/2013 Hoffman
8,566,236 B2 10/2013 Busch
8,571,474 B2 10/2013 Chavez et al.
8,571,501 B2 10/2013 Miller et al.
8,571,598 B2 10/2013 Valavi
8,571,993 B2 10/2013 Kocher et al.
8,572,117 B2 10/2013 Rappaport
8,572,256 B2 10/2013 Babbar
8,583,499 B2 11/2013 De Judicibus et al.
8,584,226 B2 11/2013 Kudla et al.
8,588,240 B2 11/2013 Ramankutty et al.
8,589,541 B2 11/2013 Raleigh et al.
8,589,955 B2 11/2013 Roundtree et al.
8,594,665 B2 11/2013 Anschutz
8,595,186 B1 11/2013 Mandyam et al.
8,600,895 B2 12/2013 Felsher
8,601,125 B2 12/2013 Huang et al.
8,605,691 B2 12/2013 Soomro et al.
8,615,507 B2 * 12/2013 Varadarajulu ..... G06F 17/30433 707/718
8,619,735 B2 12/2013 Montemurro et al.
8,620,257 B2 12/2013 Qiu et al.
8,621,056 B2 12/2013 Coussemaeker et al.
8,626,115 B2 1/2014 Raleigh et al.
8,630,314 B2 1/2014 York
8,631,428 B2 1/2014 Scott et al.
8,634,425 B2 1/2014 Gorti et al.
8,635,164 B2 1/2014 Rosenhaft et al.
8,639,215 B2 1/2014 McGregor et al.
8,644,702 B1 2/2014 Kalajan
8,644,813 B1 2/2014 Gailloux et al.
8,645,518 B2 2/2014 David
8,655,357 B1 2/2014 Gazzard et al.
8,656,472 B2 * 2/2014 McMurtry ............ G06F 21/335 713/185
8,660,853 B2 2/2014 Robb et al.
8,666,395 B2 3/2014 Silver
8,667,542 B1 3/2014 Bertz et al.
8,670,334 B2 3/2014 Keohane et al.
8,670,752 B2 3/2014 Fan et al.
8,675,852 B2 3/2014 Maes
8,676,682 B2 3/2014 Kalliola
8,676,925 B1 3/2014 Liu et al.
8,693,323 B1 4/2014 McDysan
8,694,772 B2 4/2014 Kao et al.
8,700,729 B2 4/2014 Dua
8,701,015 B2 4/2014 Bonnat
8,705,361 B2 4/2014 Venkataraman et al.
8,706,863 B2 4/2014 Fadell
8,712,631 B2 4/2014 Tietjen et al.
8,713,535 B2 4/2014 Malhotra et al.
8,713,641 B1 4/2014 Pagan et al.
8,719,397 B2 5/2014 Levi et al.
8,719,423 B2 5/2014 Wyld
8,725,899 B2 5/2014 Short et al.
8,730,842 B2 5/2014 Collins et al.
8,731,519 B2 5/2014 Flynn et al.
8,732,808 B2 5/2014 Sewall et al.
8,739,035 B2 5/2014 Trethewey

(56) References Cited

U.S. PATENT DOCUMENTS 8,739,287 B1 5/2014 Polyakov et al.
8,744,339 B2 6/2014 Halfmann et al.
8,761,711 B2 6/2014 Grignani et al.
8,780,857 B2 7/2014 Balasubramanian et al.
8,787,249 B2 7/2014 Giaretta et al.
8,793,304 B2 7/2014 Lu et al.
8,799,227 B2 8/2014 Ferguson et al.
8,804,517 B2 8/2014 Oerton
8,804,695 B2 * 8/2014 Branam ................ H04M 11/04 370/352
8,811,338 B2 8/2014 Jin et al.
8,811,991 B2 8/2014 Jain et al.
8,812,525 B1 8/2014 Taylor, III
8,818,394 B2 8/2014 Bienas et al.
8,819,253 B2 8/2014 Simeloff et al.
8,825,109 B2 9/2014 Montemurro et al.
8,826,411 B2 9/2014 Moen et al.
8,831,561 B2 9/2014 Sutaria et al.
8,837,322 B2 9/2014 Venkataramanan et al.
8,838,686 B2 9/2014 Getchius
8,838,752 B2 9/2014 Lor et al.
8,843,849 B2 9/2014 Neil et al.
8,845,415 B2 * 9/2014 Lutnick .................... A63F 1/00 463/22
8,849,297 B2 9/2014 Balasubramanian
8,855,620 B2 10/2014 Sievers et al.
8,862,751 B2 10/2014 Faccin et al.
8,863,111 B2 10/2014 Selitser et al.
8,868,725 B2 10/2014 Samba
8,868,727 B2 10/2014 Yumerefendi et al.
8,875,042 B2 10/2014 LeJeune et al.
8,880,047 B2 11/2014 Konicek et al.
8,891,483 B2 11/2014 Connelly et al.
8,898,748 B2 11/2014 Burks et al.
8,908,516 B2 12/2014 Tzamaloukas et al.
8,929,374 B2 1/2015 Tönsing et al.
8,930,238 B2 1/2015 Coffman et al.
8,943,551 B2 1/2015 Ganapathy et al.
8,948,726 B2 2/2015 Smith et al.
8,949,382 B2 2/2015 Cornell et al.
8,949,597 B1 2/2015 Reeves et al.
8,955,038 B2 * 2/2015 Nicodemus ............ G06F 21/55 717/172
8,966,018 B2 2/2015 Bugwadia et al.
8,971,841 B2 3/2015 Menezes et al.
8,971,912 B2 3/2015 Chou et al.
8,972,537 B2 3/2015 Bastian et al.
8,977,284 B2 3/2015 Reed
8,977,856 B2 3/2015 Malek et al.
8,983,860 B1 3/2015 Beda, III et al.
8,995,952 B1 3/2015 Baker et al.
9,002,322 B2 4/2015 Cotterill
9,002,342 B2 4/2015 Tenhunen et al.
9,014,059 B2 4/2015 Richardson et al.
9,014,973 B2 4/2015 Ruckart
9,015,331 B2 4/2015 Lai et al.
9,021,069 B2 4/2015 Ducrou et al.
9,030,934 B2 5/2015 Shah et al.
9,032,427 B2 5/2015 Gallant et al.
9,042,923 B1 5/2015 Mirho
9,043,462 B2 5/2015 Badiee et al.
9,047,651 B2 6/2015 Roumeliotis et al.
9,049,010 B2 6/2015 Jueneman et al.
9,064,275 B1 6/2015 Lu et al.
9,105,031 B2 8/2015 Shen et al.
9,111,088 B2 8/2015 Ghai et al.
9,135,037 B1 9/2015 Petrescu-Prahova et al.
9,137,286 B1 9/2015 Yuan
9,137,389 B2 9/2015 Neal et al.
9,172,553 B2 10/2015 Dawes et al.
9,173,090 B2 10/2015 Tuchman et al.
9,176,913 B2 11/2015 Millet et al.
9,177,455 B2 11/2015 Remer
9,191,394 B2 11/2015 Novak et al.
9,282,460 B2 3/2016 Souissi
9,286,469 B2 3/2016 Kraemer et al.
9,286,604 B2 3/2016 Aabye et al.
9,298,723 B1 3/2016 Vincent
9,313,708 B2 4/2016 Nam et al.
9,325,737 B2 4/2016 Gutowski et al.
9,326,173 B2 4/2016 Luft
9,344,557 B2 5/2016 Gruchala et al.
9,361,451 B2 6/2016 Oberheide et al.
9,363,285 B2 * 6/2016 Kitamura ........... H04L 63/1441
9,367,680 B2 6/2016 Mahaffey et al.
9,369,959 B2 6/2016 Ruutu et al.
9,386,045 B2 7/2016 Kgil et al.
9,402,254 B2 7/2016 Kneckt et al.
9,413,546 B2 8/2016 Meier et al.
9,418,381 B2 * 8/2016 Ahuja .................... G06Q 40/02
9,419,867 B2 8/2016 Okholm et al.
9,454,598 B2 9/2016 Hwang et al.
9,459,767 B2 10/2016 Cockcroft et al.
9,501,803 B2 * 11/2016 Bilac .................... H02J 13/001
9,589,117 B2 3/2017 Ali et al.
9,609,459 B2 3/2017 Raleigh
9,634,850 B2 4/2017 Taft et al.
9,673,996 B1 6/2017 Upadhyay et al.
9,712,443 B1 7/2017 Phaal
2001/0048738 A1 12/2001 Baniak et al.
2001/0053694 A1 12/2001 Igarashi et al.
2002/0013844 A1 1/2002 Garrett et al.
2002/0022472 A1 2/2002 Watler et al.
2002/0022483 A1 2/2002 Thompson et al.
2002/0049074 A1 4/2002 Eisinger et al.
2002/0099848 A1 7/2002 Lee
2002/0116338 A1 8/2002 Gonthier et al.
2002/0120370 A1 8/2002 Parupudi et al.
2002/0120540 A1 8/2002 Kende et al.
2002/0131397 A1 9/2002 Patel et al.
2002/0131404 A1 9/2002 Mehta et al.
2002/0138599 A1 9/2002 Dilman et al.
2002/0138601 A1 9/2002 Piponius et al.
2002/0154751 A1 10/2002 Thompson et al.
2002/0161601 A1 10/2002 Nauer et al.
2002/0164983 A1 11/2002 Raviv et al.
2002/0176377 A1 11/2002 Hamilton
2002/0188732 A1 12/2002 Buckman et al.
2002/0191573 A1 12/2002 Whitehill et al.
2002/0199001 A1 12/2002 Wenocur et al.
2003/0004937 A1 1/2003 Salmenkaita et al.
2003/0005112 A1 1/2003 Krautkremer
2003/0013434 A1 1/2003 Rosenberg et al.
2003/0018524 A1 1/2003 Fishman et al.
2003/0028623 A1 2/2003 Hennessey et al.
2003/0046396 A1 3/2003 Richter et al.
2003/0050070 A1 3/2003 Mashinsky et al.
2003/0050837 A1 3/2003 Kim
2003/0084321 A1 5/2003 Tarquini et al.
2003/0088671 A1 5/2003 Klinker et al.
2003/0133408 A1 7/2003 Cheng et al.
2003/0134650 A1 7/2003 Sundar et al.
2003/0159030 A1 8/2003 Evans
2003/0161265 A1 8/2003 Cao et al.
2003/0171112 A1 9/2003 Lupper et al.
2003/0182420 A1 9/2003 Jones et al.
2003/0182435 A1 9/2003 Redlich et al.
2003/0184793 A1 10/2003 Pineau
2003/0188006 A1 10/2003 Bard
2003/0188117 A1 10/2003 Yoshino et al.
2003/0220984 A1 11/2003 Jones et al.
2003/0224781 A1 12/2003 Milford et al.
2003/0229900 A1 12/2003 Reisman
2003/0233332 A1 12/2003 Keeler et al.
2003/0236745 A1 12/2003 Hartsell et al.
2004/0019539 A1 1/2004 Raman et al.
2004/0019564 A1 1/2004 Goldthwaite et al.
2004/0021697 A1 2/2004 Beaton et al.
2004/0024756 A1 2/2004 Rickard
2004/0030705 A1 2/2004 Bowman-Amuah
2004/0039792 A1 2/2004 Nakanishi
2004/0044623 A1 3/2004 Wake et al.
2004/0047358 A1 3/2004 Chen et al.
2004/0054779 A1 3/2004 Takeshima et al.

(56) References Cited

U.S. PATENT DOCUMENTS

| | | | |
|---|---|---|---|
| 2004/0073672 | A1 | 4/2004 | Fascenda |
| 2004/0082346 | A1 | 4/2004 | Skytt et al. |
| 2004/0098715 | A1 | 5/2004 | Aghera et al. |
| 2004/0102182 | A1 | 5/2004 | Reith et al. |
| 2004/0103193 | A1 | 5/2004 | Pandya et al. |
| 2004/0107360 | A1 | 6/2004 | Herrmann et al. |
| 2004/0116140 | A1 | 6/2004 | Babbar et al. |
| 2004/0127200 | A1 | 7/2004 | Shaw et al. |
| 2004/0127208 | A1 | 7/2004 | Nair et al. |
| 2004/0127256 | A1 | 7/2004 | Goldthwaite et al. |
| 2004/0132427 | A1 | 7/2004 | Lee et al. |
| 2004/0133668 | A1 | 7/2004 | Nicholas, III |
| 2004/0137890 | A1 | 7/2004 | Kalke |
| 2004/0165596 | A1 | 8/2004 | Garcia et al. |
| 2004/0167958 | A1 | 8/2004 | Stewart et al. |
| 2004/0168052 | A1 | 8/2004 | Clisham et al. |
| 2004/0170191 | A1 | 9/2004 | Guo et al. |
| 2004/0176104 | A1 | 9/2004 | Arcens |
| 2004/0198331 | A1 | 10/2004 | Coward et al. |
| 2004/0203755 | A1 | 10/2004 | Brunet et al. |
| 2004/0203833 | A1 | 10/2004 | Rathunde et al. |
| 2004/0225561 | A1 | 11/2004 | Hertzberg et al. |
| 2004/0225898 | A1 | 11/2004 | Frost et al. |
| 2004/0236547 | A1 | 11/2004 | Rappaport et al. |
| 2004/0243680 | A1 | 12/2004 | Mayer |
| 2004/0243992 | A1 | 12/2004 | Gustafson et al. |
| 2004/0249918 | A1 | 12/2004 | Sunshine |
| 2004/0255145 | A1 | 12/2004 | Chow |
| 2004/0259534 | A1 | 12/2004 | Chaudhari et al. |
| 2004/0260766 | A1 | 12/2004 | Barros et al. |
| 2004/0267872 | A1 | 12/2004 | Serdy et al. |
| 2005/0007993 | A1 | 1/2005 | Chambers et al. |
| 2005/0009499 | A1 | 1/2005 | Koster |
| 2005/0021995 | A1 | 1/2005 | Lal et al. |
| 2005/0041617 | A1 | 2/2005 | Huotari et al. |
| 2005/0048950 | A1 | 3/2005 | Morper |
| 2005/0055291 | A1 | 3/2005 | Bevente et al. |
| 2005/0055309 | A1 | 3/2005 | Williams et al. |
| 2005/0055595 | A1 | 3/2005 | Frazer et al. |
| 2005/0060266 | A1 | 3/2005 | Demello et al. |
| 2005/0060525 | A1 | 3/2005 | Schwartz et al. |
| 2005/0075115 | A1 | 4/2005 | Corneille et al. |
| 2005/0079863 | A1 | 4/2005 | Macaluso |
| 2005/0091505 | A1 | 4/2005 | Riley et al. |
| 2005/0096024 | A1 | 5/2005 | Bicker et al. |
| 2005/0097516 | A1 | 5/2005 | Donnelly et al. |
| 2005/0107091 | A1 | 5/2005 | Vannithamby et al. |
| 2005/0108075 | A1 | 5/2005 | Douglis et al. |
| 2005/0111463 | A1 | 5/2005 | Leung et al. |
| 2005/0128967 | A1 | 6/2005 | Scobbie |
| 2005/0135264 | A1 | 6/2005 | Popoff et al. |
| 2005/0163320 | A1 | 7/2005 | Brown et al. |
| 2005/0166043 | A1 | 7/2005 | Zhang et al. |
| 2005/0183143 | A1 | 8/2005 | Anderholm et al. |
| 2005/0186948 | A1 | 8/2005 | Gallagher et al. |
| 2005/0198377 | A1 | 9/2005 | Ferguson et al. |
| 2005/0216421 | A1 | 9/2005 | Barry et al. |
| 2005/0228985 | A1 | 10/2005 | Ylikoski et al. |
| 2005/0238046 | A1 | 10/2005 | Hassan et al. |
| 2005/0239447 | A1 | 10/2005 | Holzman et al. |
| 2005/0245241 | A1 | 11/2005 | Durand et al. |
| 2005/0246282 | A1 | 11/2005 | Naslund et al. |
| 2005/0250508 | A1 | 11/2005 | Guo et al. |
| 2005/0250536 | A1 | 11/2005 | Deng et al. |
| 2005/0254435 | A1 | 11/2005 | Moakley et al. |
| 2005/0266825 | A1 | 12/2005 | Clayton |
| 2005/0266880 | A1 | 12/2005 | Gupta |
| 2006/0014519 | A1 | 1/2006 | Marsh et al. |
| 2006/0019632 | A1 | 1/2006 | Cunningham et al. |
| 2006/0020787 | A1 | 1/2006 | Choyi et al. |
| 2006/0026679 | A1 | 2/2006 | Zakas |
| 2006/0030306 | A1 | 2/2006 | Kuhn |
| 2006/0034256 | A1 | 2/2006 | Addagatla et al. |
| 2006/0035631 | A1 | 2/2006 | White et al. |
| 2006/0040642 | A1 | 2/2006 | Boris et al. |
| 2006/0045245 | A1 | 3/2006 | Aaron et al. |
| 2006/0048223 | A1 | 3/2006 | Lee et al. |
| 2006/0068796 | A1 | 3/2006 | Millen et al. |
| 2006/0072451 | A1 | 4/2006 | Ross |
| 2006/0072550 | A1 | 4/2006 | Davis et al. |
| 2006/0072646 | A1 | 4/2006 | Feher |
| 2006/0075506 | A1 | 4/2006 | Sanda et al. |
| 2006/0085543 | A1 | 4/2006 | Hrastar et al. |
| 2006/0095517 | A1 | 5/2006 | O'Connor et al. |
| 2006/0098627 | A1 | 5/2006 | Karaoguz et al. |
| 2006/0099970 | A1 | 5/2006 | Morgan et al. |
| 2006/0101507 | A1 | 5/2006 | Camenisch |
| 2006/0112016 | A1 | 5/2006 | Ishibashi |
| 2006/0114821 | A1 | 6/2006 | Willey et al. |
| 2006/0114832 | A1 | 6/2006 | Hamilton et al. |
| 2006/0126562 | A1 | 6/2006 | Liu |
| 2006/0135144 | A1 | 6/2006 | Jothipragasam |
| 2006/0136882 | A1 | 6/2006 | Noonan et al. |
| 2006/0143066 | A1 | 6/2006 | Calabria |
| 2006/0143098 | A1 | 6/2006 | Lazaridis |
| 2006/0156398 | A1 | 7/2006 | Ross et al. |
| 2006/0160536 | A1 | 7/2006 | Chou |
| 2006/0165060 | A1 | 7/2006 | Dua |
| 2006/0168128 | A1 | 7/2006 | Sistla et al. |
| 2006/0173959 | A1 | 8/2006 | Mckelvie et al. |
| 2006/0174035 | A1 | 8/2006 | Tufail |
| 2006/0178917 | A1 | 8/2006 | Merriam et al. |
| 2006/0178918 | A1 | 8/2006 | Mikurak |
| 2006/0178943 | A1 | 8/2006 | Rollinson et al. |
| 2006/0182137 | A1 | 8/2006 | Zhou et al. |
| 2006/0183462 | A1 | 8/2006 | Kolehmainen |
| 2006/0190314 | A1 | 8/2006 | Hernandez |
| 2006/0190987 | A1 | 8/2006 | Ohta et al. |
| 2006/0193280 | A1 | 8/2006 | Lee et al. |
| 2006/0199608 | A1 | 9/2006 | Dunn et al. |
| 2006/0200663 | A1 | 9/2006 | Thornton |
| 2006/0206709 | A1 | 9/2006 | Labrou et al. |
| 2006/0206904 | A1 | 9/2006 | Watkins et al. |
| 2006/0218395 | A1 | 9/2006 | Maes |
| 2006/0233108 | A1 | 10/2006 | Krishnan |
| 2006/0233166 | A1 | 10/2006 | Bou-Diab et al. |
| 2006/0236095 | A1 | 10/2006 | Smith et al. |
| 2006/0242685 | A1 | 10/2006 | Heard et al. |
| 2006/0258341 | A1 | 11/2006 | Miller et al. |
| 2006/0277590 | A1 | 12/2006 | Limont et al. |
| 2006/0291419 | A1 | 12/2006 | McConnell et al. |
| 2006/0291477 | A1 | 12/2006 | Croak et al. |
| 2007/0005795 | A1 | 1/2007 | Gonzalez |
| 2007/0019670 | A1 | 1/2007 | Falardeau |
| 2007/0022289 | A1 | 1/2007 | Alt et al. |
| 2007/0025301 | A1 | 2/2007 | Petersson et al. |
| 2007/0033194 | A1 | 2/2007 | Srinivas et al. |
| 2007/0033197 | A1 | 2/2007 | Scherzer et al. |
| 2007/0036312 | A1 | 2/2007 | Cai et al. |
| 2007/0055694 | A1 | 3/2007 | Ruge et al. |
| 2007/0060200 | A1 | 3/2007 | Boris et al. |
| 2007/0061243 | A1 | 3/2007 | Ramer et al. |
| 2007/0061800 | A1 | 3/2007 | Cheng et al. |
| 2007/0061878 | A1 | 3/2007 | Hagiu et al. |
| 2007/0073899 | A1 | 3/2007 | Judge et al. |
| 2007/0076616 | A1 | 4/2007 | Ngo et al. |
| 2007/0093243 | A1 | 4/2007 | Kapadekar et al. |
| 2007/0100981 | A1 | 5/2007 | Adamczyk et al. |
| 2007/0101426 | A1 | 5/2007 | Lee et al. |
| 2007/0104126 | A1 | 5/2007 | Calhoun et al. |
| 2007/0109983 | A1 | 5/2007 | Shankar et al. |
| 2007/0111740 | A1 | 5/2007 | Wandel |
| 2007/0130283 | A1 | 6/2007 | Klein et al. |
| 2007/0130315 | A1 | 6/2007 | Friend et al. |
| 2007/0140113 | A1 | 6/2007 | Gemelos |
| 2007/0140145 | A1 | 6/2007 | Kumar et al. |
| 2007/0140275 | A1 | 6/2007 | Bowman et al. |
| 2007/0143824 | A1 | 6/2007 | Shahbazi |
| 2007/0147317 | A1 | 6/2007 | Smith et al. |
| 2007/0147324 | A1 | 6/2007 | McGary |
| 2007/0155365 | A1 | 7/2007 | Kim et al. |
| 2007/0165630 | A1 | 7/2007 | Rasanen et al. |
| 2007/0168499 | A1 | 7/2007 | Chu |
| 2007/0171856 | A1 | 7/2007 | Bruce et al. |

(56) References Cited

U.S. PATENT DOCUMENTS

2007/0174490 A1 7/2007 Choi et al.
2007/0191006 A1 8/2007 Carpenter
2007/0192460 A1 8/2007 Choi et al.
2007/0198656 A1 8/2007 Mazzaferri et al.
2007/0201502 A1 8/2007 Abramson
2007/0213054 A1 9/2007 Han
2007/0220251 A1 9/2007 Rosenberg et al.
2007/0226225 A1 9/2007 Yiu et al.
2007/0226775 A1 9/2007 Andreasen et al.
2007/0234402 A1 10/2007 Khosravi et al.
2007/0243862 A1 10/2007 Coskun et al.
2007/0248100 A1 10/2007 Zuberi et al.
2007/0254646 A1 11/2007 Sokondar
2007/0254675 A1 11/2007 Zorlu Ozer et al.
2007/0255769 A1 11/2007 Agrawal et al.
2007/0255797 A1 11/2007 Dunn et al.
2007/0255848 A1 11/2007 Sewall et al.
2007/0257767 A1 11/2007 Beeson
2007/0259656 A1 11/2007 Jeong
2007/0259673 A1 11/2007 Willars et al.
2007/0263558 A1 11/2007 Salomone
2007/0266422 A1 11/2007 Germano et al.
2007/0274327 A1 11/2007 Kaarela et al.
2007/0280453 A1 12/2007 Kelley
2007/0282896 A1 12/2007 Wydroug et al.
2007/0293191 A1 12/2007 Mir et al.
2007/0294395 A1 12/2007 Strub et al.
2007/0294410 A1 12/2007 Pandya et al.
2007/0297378 A1 12/2007 Poyhonen et al.
2007/0298764 A1 12/2007 Clayton
2007/0299965 A1 12/2007 Nieh et al.
2007/0300252 A1 12/2007 Acharya et al.
2008/0005285 A1 1/2008 Robinson et al.
2008/0005561 A1 1/2008 Brown et al.
2008/0010379 A1 1/2008 Zhao
2008/0010452 A1 1/2008 Holtzman et al.
2008/0018494 A1 1/2008 Waite et al.
2008/0022354 A1 1/2008 Grewal et al.
2008/0025230 A1 1/2008 Patel et al.
2008/0032715 A1 2/2008 Jia et al.
2008/0034063 A1 2/2008 Yee
2008/0034419 A1 2/2008 Mullick et al.
2008/0039102 A1 2/2008 Sewall et al.
2008/0049630 A1 2/2008 Kozisek et al.
2008/0050715 A1 2/2008 Golczewski et al.
2008/0051076 A1 2/2008 O'Shaughnessy et al.
2008/0052387 A1 2/2008 Heinz et al.
2008/0056273 A1 3/2008 Pelletier et al.
2008/0059474 A1 3/2008 Lim
2008/0059743 A1 3/2008 Bychkov et al.
2008/0060066 A1 3/2008 Wynn et al.
2008/0062900 A1 3/2008 Rao
2008/0064367 A1 3/2008 Nath et al.
2008/0066149 A1 3/2008 Lim
2008/0066150 A1 3/2008 Lim
2008/0066181 A1 3/2008 Haveson et al.
2008/0070550 A1 3/2008 Hose
2008/0077705 A1 3/2008 Li et al.
2008/0080457 A1 4/2008 Cole
2008/0081606 A1 4/2008 Cole
2008/0082643 A1 4/2008 Storrie et al.
2008/0083013 A1 4/2008 Soliman et al.
2008/0085707 A1 4/2008 Fadell
2008/0089295 A1 4/2008 Keeler et al.
2008/0089303 A1 4/2008 Wirtanen et al.
2008/0095339 A1 4/2008 Elliott et al.
2008/0096559 A1 4/2008 Phillips et al.
2008/0098062 A1 4/2008 Balia
2008/0109679 A1 5/2008 Wright et al.
2008/0120129 A1 5/2008 Seubert et al.
2008/0120668 A1 5/2008 Yau
2008/0120688 A1 5/2008 Qiu et al.
2008/0125079 A1 5/2008 O'Neil et al.
2008/0126287 A1 5/2008 Cox et al.
2008/0127304 A1 5/2008 Ginter et al.
2008/0130534 A1 6/2008 Tomioka
2008/0130656 A1 6/2008 Kim et al.
2008/0132201 A1 6/2008 Karlberg
2008/0132268 A1 6/2008 Choi-Grogan et al.
2008/0134330 A1 6/2008 Kapoor et al.
2008/0139210 A1 6/2008 Gisby et al.
2008/0147454 A1 6/2008 Walker et al.
2008/0160958 A1 7/2008 Abichandani et al.
2008/0162637 A1 7/2008 Adamczyk et al.
2008/0162704 A1 7/2008 Poplett et al.
2008/0164304 A1 7/2008 Narasimhan et al.
2008/0166993 A1 7/2008 Gautier et al.
2008/0167027 A1 7/2008 Gautier et al.
2008/0167033 A1 7/2008 Beckers
2008/0168275 A1 7/2008 DeAtley et al.
2008/0168523 A1 7/2008 Ansari et al.
2008/0177998 A1 7/2008 Apsangi et al.
2008/0178300 A1 7/2008 Brown et al.
2008/0183812 A1 7/2008 Paul et al.
2008/0184127 A1 7/2008 Rafey et al.
2008/0189760 A1 8/2008 Rosenberg et al.
2008/0201266 A1 8/2008 Chua et al.
2008/0207167 A1 8/2008 Bugenhagen
2008/0212470 A1 9/2008 Castaneda et al.
2008/0212751 A1 9/2008 Chung
2008/0219268 A1 9/2008 Dennison
2008/0221951 A1 9/2008 Stanforth et al.
2008/0222692 A1 9/2008 Andersson et al.
2008/0225748 A1 9/2008 Khemani et al.
2008/0229385 A1 9/2008 Feder et al.
2008/0229388 A1 9/2008 Maes
2008/0235511 A1 9/2008 O'Brien et al.
2008/0240373 A1 10/2008 Wilhelm
2008/0250053 A1 10/2008 Aaltonen et al.
2008/0256593 A1 10/2008 Vinberg et al.
2008/0259924 A1 10/2008 Gooch et al.
2008/0262798 A1 10/2008 Kim et al.
2008/0263348 A1 10/2008 Zaltsman et al.
2008/0268813 A1 10/2008 Maes
2008/0270212 A1 10/2008 Blight et al.
2008/0279216 A1 11/2008 Sharif-Ahmadi et al.
2008/0282319 A1 11/2008 Fontijn et al.
2008/0293395 A1 11/2008 Mathews et al.
2008/0298230 A1 12/2008 Luft et al.
2008/0305793 A1 12/2008 Gallagher et al.
2008/0311885 A1 12/2008 Dawson et al.
2008/0313315 A1 12/2008 Karaoguz et al.
2008/0313730 A1 12/2008 Iftimie et al.
2008/0316923 A1 12/2008 Fedders et al.
2008/0318547 A1 12/2008 Ballou et al.
2008/0318550 A1 12/2008 DeAtley
2008/0319879 A1 12/2008 Carroll et al.
2008/0320497 A1 12/2008 Tarkoma et al.
2009/0005000 A1 1/2009 Baker et al.
2009/0005005 A1 1/2009 Forstall et al.
2009/0006116 A1 1/2009 Baker et al.
2009/0006200 A1 1/2009 Baker et al.
2009/0006229 A1 1/2009 Sweeney et al.
2009/0013157 A1 1/2009 Beaule
2009/0016310 A1 1/2009 Rasal
2009/0036111 A1 2/2009 Danford et al.
2009/0042536 A1 2/2009 Bernard et al.
2009/0044185 A1 2/2009 Krivopaltsev
2009/0046707 A1 2/2009 Smires et al.
2009/0046723 A1 2/2009 Rahman et al.
2009/0047989 A1 2/2009 Harmon et al.
2009/0048913 A1 2/2009 Shenfield et al.
2009/0049156 A1 2/2009 Aronsson et al.
2009/0049518 A1 2/2009 Roman et al.
2009/0054030 A1 2/2009 Golds
2009/0065571 A1 3/2009 Jain
2009/0067372 A1 3/2009 Shah et al.
2009/0068984 A1 3/2009 Burnett
2009/0070379 A1 3/2009 Rappaport
2009/0077622 A1 3/2009 Baum et al.
2009/0079699 A1 3/2009 Sun
2009/0113514 A1 4/2009 Hu
2009/0125619 A1 5/2009 Antani
2009/0132860 A1 5/2009 Liu et al.

(56) References Cited

U.S. PATENT DOCUMENTS

| | | | |
|---|---|---|---|
| 2009/0149154 | A1 | 6/2009 | Bhasin et al. |
| 2009/0157792 | A1 | 6/2009 | Fiatal |
| 2009/0163173 | A1 | 6/2009 | Williams |
| 2009/0172077 | A1 | 7/2009 | Roxburgh et al. |
| 2009/0180391 | A1 | 7/2009 | Petersen et al. |
| 2009/0181662 | A1 | 7/2009 | Fleischman et al. |
| 2009/0197585 | A1 | 8/2009 | Aaron |
| 2009/0197612 | A1 | 8/2009 | Kiiskinen |
| 2009/0203352 | A1 | 8/2009 | Fordon et al. |
| 2009/0217364 | A1 | 8/2009 | Salmela et al. |
| 2009/0219170 | A1 | 9/2009 | Clark et al. |
| 2009/0248883 | A1 | 10/2009 | Suryanarayana et al. |
| 2009/0254857 | A1 | 10/2009 | Romine et al. |
| 2009/0257379 | A1 | 10/2009 | Robinson et al. |
| 2009/0271514 | A1 | 10/2009 | Thomas et al. |
| 2009/0282127 | A1 | 11/2009 | Leblanc et al. |
| 2009/0286507 | A1 | 11/2009 | O'Neil et al. |
| 2009/0287921 | A1 | 11/2009 | Zhu et al. |
| 2009/0288140 | A1 | 11/2009 | Huber et al. |
| 2009/0291665 | A1 | 11/2009 | Gaskarth et al. |
| 2009/0299857 | A1 | 12/2009 | Brubaker |
| 2009/0307696 | A1 | 12/2009 | Vals et al. |
| 2009/0307746 | A1 | 12/2009 | Di et al. |
| 2009/0315735 | A1 | 12/2009 | Bhavani et al. |
| 2009/0320110 | A1 | 12/2009 | Nicolson et al. |
| 2010/0010873 | A1 | 1/2010 | Moreau |
| 2010/0017506 | A1 | 1/2010 | Fadell |
| 2010/0020822 | A1 | 1/2010 | Zerillo et al. |
| 2010/0027469 | A1 | 2/2010 | Gurajala et al. |
| 2010/0027559 | A1 | 2/2010 | Lin et al. |
| 2010/0030890 | A1 | 2/2010 | Dutta et al. |
| 2010/0041364 | A1 | 2/2010 | Lott et al. |
| 2010/0041365 | A1 | 2/2010 | Lott et al. |
| 2010/0042675 | A1 | 2/2010 | Fujii |
| 2010/0043068 | A1 | 2/2010 | Varadhan et al. |
| 2010/0069074 | A1 | 3/2010 | Kodialam et al. |
| 2010/0071053 | A1 | 3/2010 | Ansari et al. |
| 2010/0075666 | A1 | 3/2010 | Garner |
| 2010/0080202 | A1 | 4/2010 | Hanson |
| 2010/0082431 | A1 | 4/2010 | Ramer et al. |
| 2010/0103820 | A1 | 4/2010 | Fuller et al. |
| 2010/0113020 | A1 | 5/2010 | Subramanian et al. |
| 2010/0121744 | A1 | 5/2010 | Belz et al. |
| 2010/0131584 | A1 | 5/2010 | Johnson |
| 2010/0142478 | A1 | 6/2010 | Forssell et al. |
| 2010/0144310 | A1 | 6/2010 | Bedingfield |
| 2010/0151866 | A1 | 6/2010 | Karpov et al. |
| 2010/0153781 | A1 | 6/2010 | Hanna |
| 2010/0167696 | A1 | 7/2010 | Smith et al. |
| 2010/0188975 | A1 | 7/2010 | Raleigh |
| 2010/0188990 | A1 | 7/2010 | Raleigh |
| 2010/0188992 | A1 | 7/2010 | Raleigh |
| 2010/0188994 | A1 | 7/2010 | Raleigh |
| 2010/0190469 | A1 | 7/2010 | Vanderveen et al. |
| 2010/0191576 | A1 | 7/2010 | Raleigh |
| 2010/0191612 | A1 | 7/2010 | Raleigh |
| 2010/0191846 | A1 | 7/2010 | Raleigh |
| 2010/0192170 | A1 | 7/2010 | Raleigh |
| 2010/0192212 | A1 | 7/2010 | Raleigh |
| 2010/0195503 | A1 | 8/2010 | Raleigh |
| 2010/0197268 | A1 | 8/2010 | Raleigh |
| 2010/0198698 | A1 | 8/2010 | Raleigh et al. |
| 2010/0198939 | A1 | 8/2010 | Raleigh |
| 2010/0227632 | A1 | 9/2010 | Bell et al. |
| 2010/0235329 | A1 | 9/2010 | Koren et al. |
| 2010/0241544 | A1 | 9/2010 | Benson et al. |
| 2010/0248719 | A1 | 9/2010 | Scholaert |
| 2010/0284327 | A1 | 11/2010 | Miklos |
| 2010/0284388 | A1 | 11/2010 | Fantini et al. |
| 2010/0287599 | A1 | 11/2010 | He et al. |
| 2010/0311402 | A1 | 12/2010 | Srinivasan et al. |
| 2010/0318652 | A1 | 12/2010 | Samba |
| 2010/0325420 | A1 | 12/2010 | Kanekar |
| 2011/0004917 | A1 | 1/2011 | Salsa et al. |
| 2011/0013569 | A1 | 1/2011 | Scherzer et al. |
| 2011/0019574 | A1 | 1/2011 | Malomsoky et al. |
| 2011/0071854 | A1 | 3/2011 | Medeiros et al. |
| 2011/0081881 | A1 | 4/2011 | Baker et al. |
| 2011/0082790 | A1 | 4/2011 | Baker et al. |
| 2011/0110309 | A1 | 5/2011 | Bennett |
| 2011/0126141 | A1 | 5/2011 | King et al. |
| 2011/0145920 | A1 | 6/2011 | Mahaffey et al. |
| 2011/0159818 | A1 | 6/2011 | Scherzer et al. |
| 2011/0173678 | A1 | 7/2011 | Kaippallimalil et al. |
| 2011/0177811 | A1 | 7/2011 | Heckman et al. |
| 2011/0195700 | A1 | 8/2011 | Kukuchka et al. |
| 2011/0238545 | A1 | 9/2011 | Fanaian et al. |
| 2011/0241624 | A1 | 10/2011 | Park et al. |
| 2011/0252430 | A1 | 10/2011 | Chapman et al. |
| 2011/0264923 | A1 | 10/2011 | Kocher et al. |
| 2011/0277019 | A1 | 11/2011 | Pritchard, Jr. |
| 2012/0020296 | A1 | 1/2012 | Scherzer et al. |
| 2012/0029718 | A1 | 2/2012 | Davis |
| 2012/0101952 | A1 | 4/2012 | Raleigh et al. |
| 2012/0108225 | A1 | 5/2012 | Luna et al. |
| 2012/0144025 | A1 | 6/2012 | Melander et al. |
| 2012/0155296 | A1 | 6/2012 | Kashanian |
| 2012/0166364 | A1 | 6/2012 | Ahmad et al. |
| 2012/0166604 | A1 | 6/2012 | Fortier et al. |
| 2012/0196644 | A1 | 8/2012 | Scherzer et al. |
| 2012/0238287 | A1 | 9/2012 | Scherzer |
| 2012/0330792 | A1 | 12/2012 | Kashanian |
| 2013/0024914 | A1 | 1/2013 | Ahmed et al. |
| 2013/0029653 | A1 | 1/2013 | Baker et al. |
| 2013/0030960 | A1 | 1/2013 | Kashanian |
| 2013/0058274 | A1 | 3/2013 | Scherzer et al. |
| 2013/0065555 | A1 | 3/2013 | Baker et al. |
| 2013/0072177 | A1 | 3/2013 | Ross et al. |
| 2013/0084835 | A1 | 4/2013 | Scherzer et al. |
| 2013/0095787 | A1 | 4/2013 | Kashanian |
| 2013/0103376 | A1 | 4/2013 | Gaddam et al. |
| 2013/0111572 | A1 | 5/2013 | Gaddam et al. |
| 2013/0117140 | A1 | 5/2013 | Kashanian |
| 2013/0117382 | A1 | 5/2013 | Gaddam et al. |
| 2013/0144789 | A1 | 6/2013 | Aaltonen et al. |
| 2013/0149994 | A1 | 6/2013 | Gaddam et al. |
| 2013/0183937 | A1 | 7/2013 | Neal et al. |
| 2013/0275583 | A1 | 10/2013 | Roach et al. |
| 2013/0326356 | A9 | 12/2013 | Zheng et al. |
| 2014/0066101 | A1 | 3/2014 | Lyman et al. |
| 2014/0073291 | A1 | 3/2014 | Hildner et al. |
| 2014/0080458 | A1 | 3/2014 | Bonner et al. |
| 2014/0241342 | A1 | 8/2014 | Constantinof |
| 2015/0149358 | A1 | 5/2015 | Robbin et al. |
| 2015/0181628 | A1 | 6/2015 | Haverinen et al. |

FOREIGN PATENT DOCUMENTS

| | | | |
|---|---|---|---|
| CN | 1345154 | A | 4/2002 |
| CN | 1508734 | A | 6/2004 |
| CN | 1538730 | A | 10/2004 |
| CN | 1567818 | A | 1/2005 |
| CN | 101035308 | A | 3/2006 |
| CN | 1801829 | A | 7/2006 |
| CN | 1802839 | A | 7/2006 |
| CN | 1889777 | A | 7/2006 |
| CN | 101155343 | B | 9/2006 |
| CN | 1867024 | A | 11/2006 |
| CN | 1878160 | A | 12/2006 |
| CN | 1937511 | A | 3/2007 |
| CN | 101123553 | A | 9/2007 |
| CN | 101080055 | A | 11/2007 |
| CN | 101115248 | A | 1/2008 |
| CN | 101127988 | A | 2/2008 |
| CN | 101183958 | A | 5/2008 |
| CN | 101335666 | A | 12/2008 |
| CN | 101341764 | A | 1/2009 |
| CN | 101815275 | A | 8/2010 |
| EP | 1098490 | A2 | 5/2001 |
| EP | 1289326 | A1 | 3/2003 |
| EP | 1463238 | | 9/2004 |
| EP | 1503548 | A1 | 2/2005 |
| EP | 1545114 | A1 | 6/2005 |
| EP | 1739518 | | 1/2007 |

(56) References Cited

FOREIGN PATENT DOCUMENTS

| | | | |
|---|---|---|---|
| EP | 1772988 | | 4/2007 |
| EP | 1850575 | A1 | 10/2007 |
| EP | 1887732 | A1 | 2/2008 |
| EP | 1942698 | A1 | 7/2008 |
| EP | 1978772 | | 10/2008 |
| EP | 2007065 | A1 | 12/2008 |
| EP | 2026514 | A1 | 2/2009 |
| EP | 2466831 | A1 | 6/2012 |
| JP | 3148713 | B2 | 3/2001 |
| JP | 2005339247 | A | 12/2005 |
| JP | 2006041989 | | 2/2006 |
| JP | 2006155263 | A | 6/2006 |
| JP | 2006197137 | | 7/2006 |
| JP | 2006344007 | A | 12/2006 |
| JP | 2007318354 | A | 12/2007 |
| JP | 2008301121 | A | 12/2008 |
| JP | 2009111919 | | 5/2009 |
| JP | 2009212707 | A | 9/2009 |
| JP | 2009218773 | | 9/2009 |
| JP | 2009232107 | A | 10/2009 |
| KR | 20040053858 | A | 6/2004 |
| WO | 1998058505 | | 12/1998 |
| WO | 1999027723 | | 6/1999 |
| WO | 1999065185 | | 12/1999 |
| WO | 0208863 | | 1/2002 |
| WO | 2002045315 | A2 | 6/2002 |
| WO | 2002067616 | A1 | 8/2002 |
| WO | 2002093877 | A1 | 11/2002 |
| WO | 2003014891 | | 2/2003 |
| WO | 2003017063 | A2 | 2/2003 |
| WO | 2003017065 | A2 | 2/2003 |
| WO | 2003058880 | | 7/2003 |
| WO | 2004028070 | | 4/2004 |
| WO | 2004064306 | | 7/2004 |
| WO | 2004077797 | | 9/2004 |
| WO | 2004095753 | | 11/2004 |
| WO | 2005008995 | | 1/2005 |
| WO | 2005053335 | A1 | 6/2005 |
| WO | 2005083934 | A1 | 9/2005 |
| WO | 2006004467 | | 1/2006 |
| WO | 2006004784 | A1 | 1/2006 |
| WO | 2006012610 | A2 | 2/2006 |
| WO | 2006050758 | | 5/2006 |
| WO | 2006073837 | | 7/2006 |
| WO | 2006077481 | | 7/2006 |
| WO | 2006093961 | A1 | 9/2006 |
| WO | 2006120558 | | 11/2006 |
| WO | 2006130960 | | 12/2006 |
| WO | 2007001833 | | 1/2007 |
| WO | 2007014630 | | 2/2007 |
| WO | 2007018363 | | 2/2007 |
| WO | 2007053848 | | 5/2007 |
| WO | 2007068288 | | 6/2007 |
| WO | 2007069245 | | 6/2007 |
| WO | 2007097786 | A | 8/2007 |
| WO | 2007107701 | | 9/2007 |
| WO | 2007120310 | | 10/2007 |
| WO | 2007124279 | | 11/2007 |
| WO | 2007126352 | | 11/2007 |
| WO | 2007129180 | A2 | 11/2007 |
| WO | 2007133844 | A | 11/2007 |
| WO | 2008017837 | | 2/2008 |
| WO | 2008051379 | | 5/2008 |
| WO | 2008066419 | | 6/2008 |
| WO | 2008080139 | | 7/2008 |
| WO | 2008080430 | | 7/2008 |
| WO | 2008099802 | | 8/2008 |
| WO | 2009008817 | A1 | 1/2009 |
| WO | 2009091295 | A1 | 7/2009 |
| WO | 2010088413 | | 8/2010 |
| WO | 2010128391 | A2 | 11/2010 |
| WO | 2011002450 | A1 | 1/2011 |
| WO | 2011149532 | A1 | 12/2011 |
| WO | 2012047275 | A | 4/2012 |

OTHER PUBLICATIONS

Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Wi-Fi Alliance Hotspot 2.0 Technical Task Group, "Wi-Fi Certified Passpoint™ (Release 1) Deployment Guidelines—Version 1.0—Oct. 2012".
Wi-Fi Alliance Technical Committee Hotspot 2.0 Technical Task Group, "Hotspot 2.0 (Release 1) Technical Specification—Version 1.0.0"; 2012.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Android Cupcake excerpts, The Android Open Source Project, Feb. 10, 2009.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"Prevent iCloud Documents & Data from using your data plan," Oct. 26, 2011; CNET webarchive, by Jason Ciprian.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8A.0, Dec. 2008.
3rd Generation Partnership Project, "Technical Specification Group Services and System Aspects; Policy and charging Control Architecture," Release 8, Document No. 3GPP TS 23.203, V8.4.0, Dec. 2008.

(56) References Cited

OTHER PUBLICATIONS

3rd Generation Partnership Project; "Technical Specification Group Services and System Aspects; IP Flow Mobility and seamless WLAN offlload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer—Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco chronicle, Aug. 21, 2006.
Knight et al., "Layer 2 and 3 Virtual Private Networks: Taxonomy, Technology, and Standarization Efforts," IEEE communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer—Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentials und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.

* cited by examiner

= Service Control Plane Communication Path

= Service Traffic Plane Communication Path

868E

868F

869A

869B

939A

939B

939D

939C

977B

977A

977E

977F

977K

978D

978C

978E

978F

MOBILE DEVICE AND SERVICE MANAGEMENT

COPYRIGHT AND TRADEMARK NOTICES

A portion of the disclosure of this patent document may contain material that is subject to copyright protection. The owner has no objection to the facsimile reproduction of the patent document or the patent disclosure, as it appears in the Patent and Trademark Office patent file or records, but otherwise reserves all copyrights whatsoever.

Certain marks referenced herein may be common law or registered trademarks of the applicant, the assignee, or third parties affiliated or unaffiliated with the applicant or the assignee. Use of these marks is for providing an enabling disclosure by way of example and shall not be construed to limit the scope of the disclosed subject matter to material associated with such marks.

BRIEF DESCRIPTION OF THE DRAWINGS

The various embodiments disclosed herein are illustrated by way of example, and not by way of limitation, in the figures of the accompanying drawings in which like reference numerals refer to similar elements, and in which:

FIG. 119 illustrates a pop-up window/message presented through a touch-screen display of a wireless end-user device, in accordance with an exemplary embodiment, which allows a user to select an allowance (limit) of voice minutes for a selected device in the device group.

FIG. 120 illustrates a display screen presented through a touch-screen display of a wireless end-user device, in accordance with an exemplary embodiment, through which a user may cause the allowance to be saved and to go into effect.

FIG. 121 illustrates a pop-up message presented through a touch-screen display of a wireless end-user device, in accordance with an exemplary embodiment, in response to a user selecting the "Apply" button of FIG. 120.

FIGS. 122A and 122B illustrate a display screen presented through a touch-screen display of a wireless end-user device, in accordance with an exemplary embodiment, enabling a user to view text plan usage and plan details, and to change plan allowances for one or more devices in the device group.

FIG. 123 illustrates a display screen presented through a touch-screen display of a wireless end-user device, in accordance with an exemplary embodiment, enabling a user to change a number of text messages available to (e.g., an allowance for) one or more devices in the device group.

FIG. 124 illustrates a pop-up window presented through a touch-screen display of a wireless end-user device, in accordance with an exemplary embodiment, to enable a user to select a number of text messages for an allowance.

FIG. 125 illustrates a display screen presented through a touch-screen display of a wireless end-user device, in accordance with an exemplary embodiment, after a user has changed an allowance available for a selected device in the device group.

FIG. 126 illustrates a pop-up message presented through a touch-screen display of a wireless end-user device, in accordance with an exemplary embodiment, in response to a user selecting the "Apply" button of FIG. 125.

FIGS. 127A and 127B illustrate a display screen presented through a touch-screen display of a wireless end-user device, in accordance with an exemplary embodiment, enabling a user to view data plan usage and plan details, and to change plan allowances for one or more devices in the device group.

FIGS. 128 and 129 illustrate a display screen presented through a touch-screen display of a wireless end-user device, in accordance with an exemplary embodiment, enabling a user to change an amount of data available to (e.g., an allowance for) one or more devices in the device group.

FIGS. 130A through 130F illustrate a display screen presented through a touch-screen display of a wireless end-user device, in accordance with an exemplary embodiment, to enable a user to customize a service plan associated with the device group.

FIG. 131 illustrates a display screen presented through a touch-screen display of a wireless end-user device, in accordance with an exemplary embodiment, to summarize changes to a service plan associated with the device group.

Figure 132:
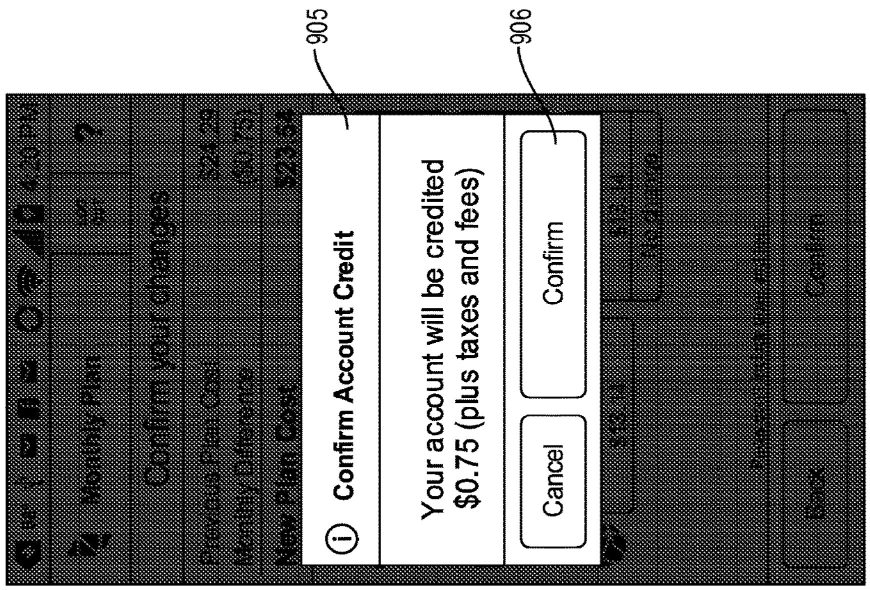

FIG. 132 illustrates a pop-up presented through a touch-screen display of a wireless end-user device, in accordance with an exemplary embodiment, to confirm a change to a service plan associated with the device group.

Figure 133:
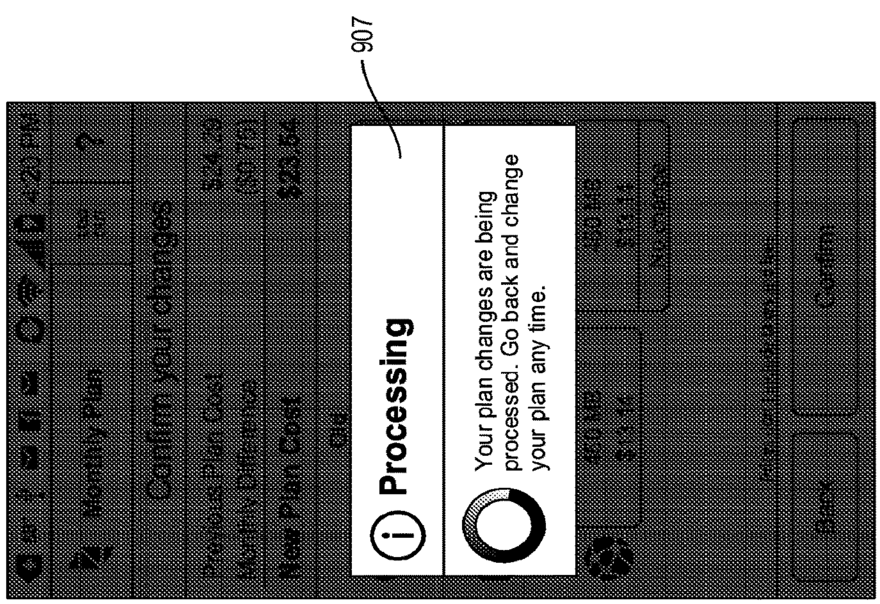

FIG. 133 illustrates a pop-up presented through a touch-screen display of a wireless end-user device, in accordance with an exemplary embodiment, to inform a user that the service plan changes are being processed, and that the user may change the service plan at any time.

Figure 134:
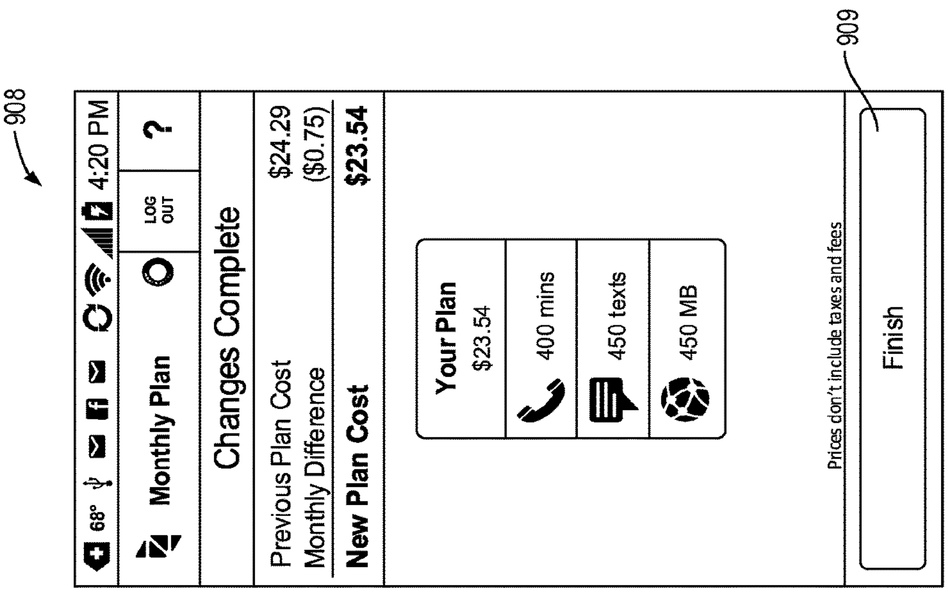

FIG. 134 illustrates a display screen presented through a touch-screen display of a wireless end-user device, in accordance with an exemplary embodiment, which provides a summary of the service plan following the requested changes.

Figure 135:
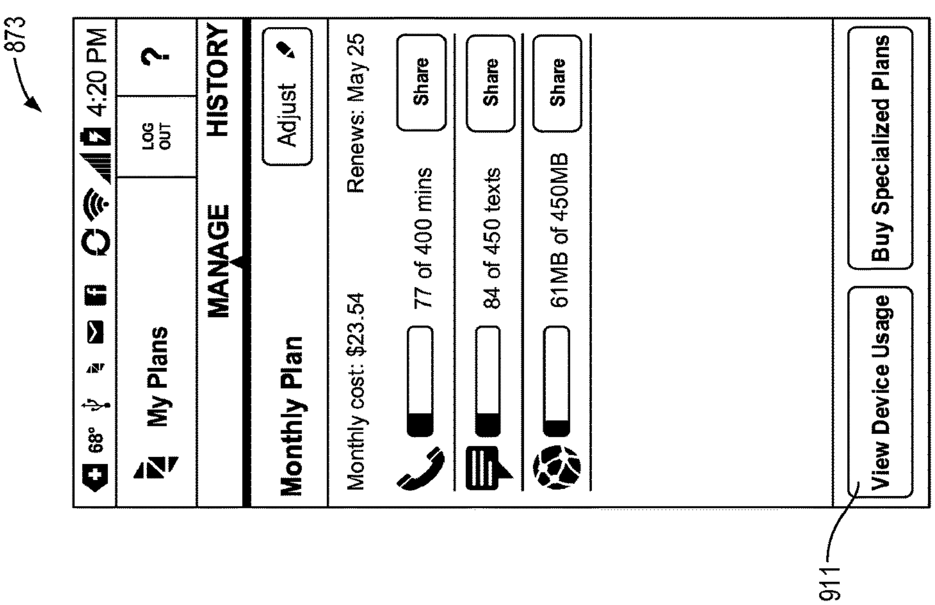

FIG. 135 illustrates a display screen presented through a touch-screen display of a wireless end-user device, in accordance with an exemplary embodiment, in response to a user selecting the "Finish" button of FIG. 134.

Figure 136:
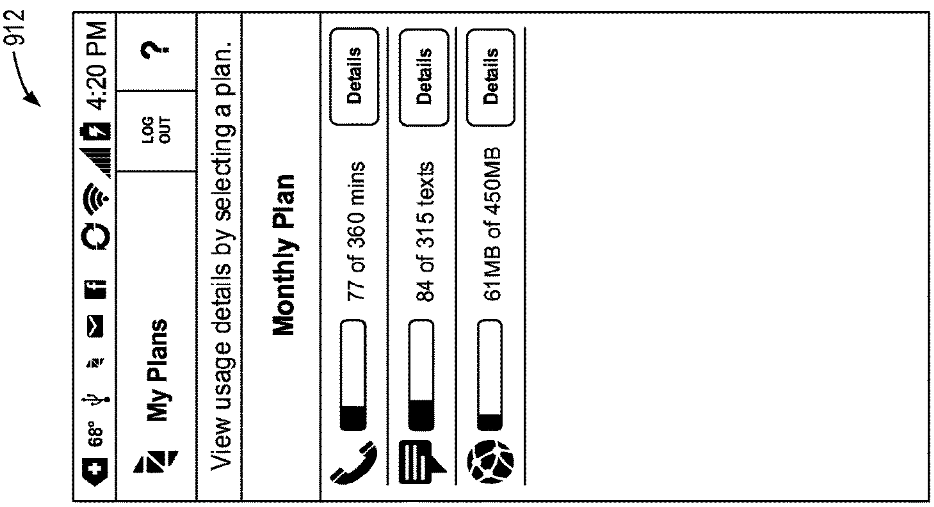

FIG. 136 illustrates a display screen presented through a touch-screen display of a wireless end-user device, in accordance with an exemplary embodiment, in response to a user selecting the "View Device Usage" button of FIG. 135.

Figure 22:
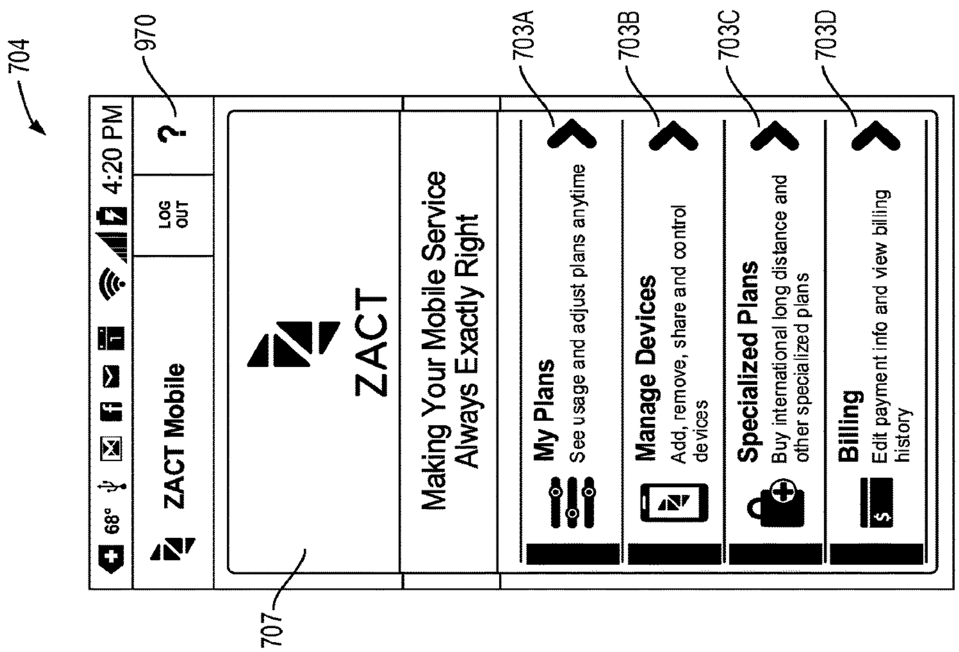
FIG. 22 illustrates an initial or "service home" screen of a device in accordance with an exemplary embodiment.
Figure 137B:
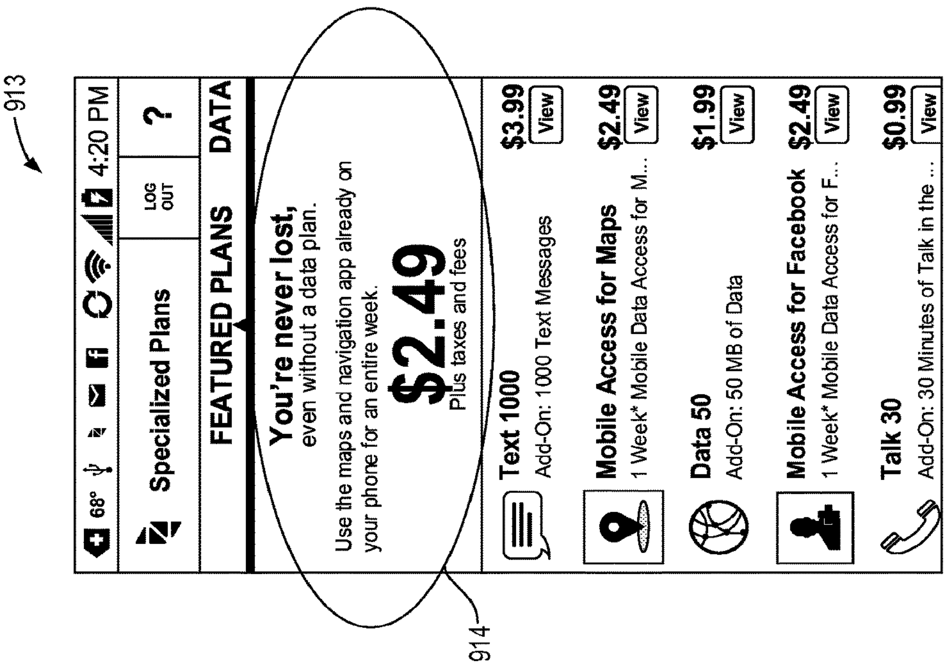
Figure 137A:
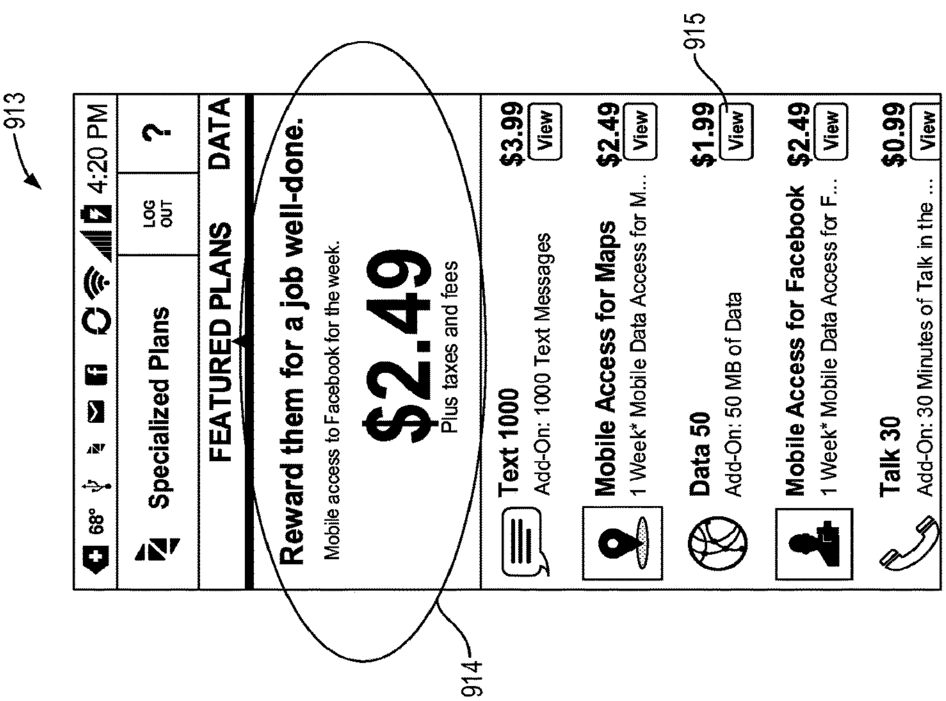
Figure 137C:
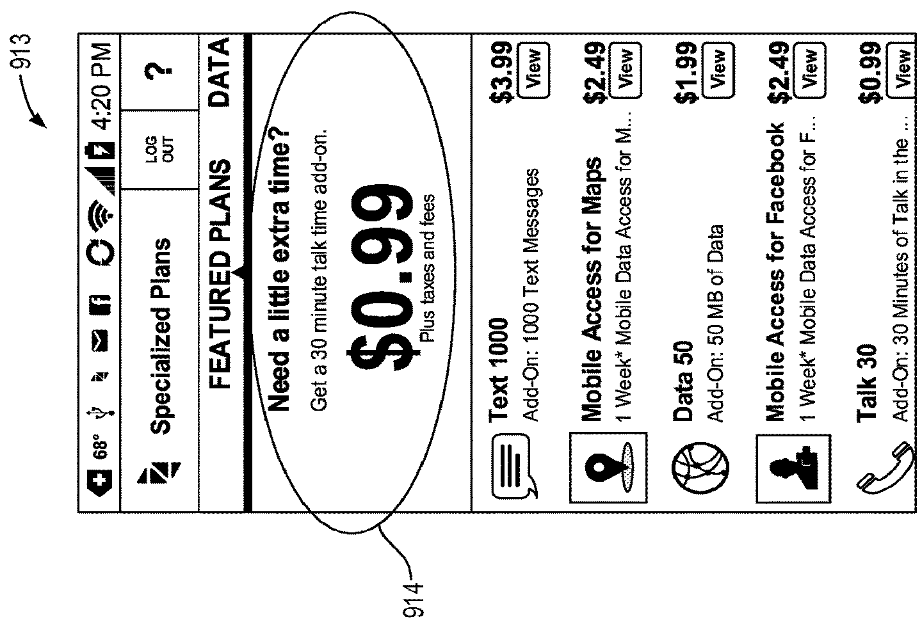

FIGS. 137A through 137C illustrate a display screen presented through a touch-screen display of a wireless end-user device, in accordance with an exemplary embodiment, when a user selects the "Specialized Plans" region of FIG. 22.

Figure 138A:
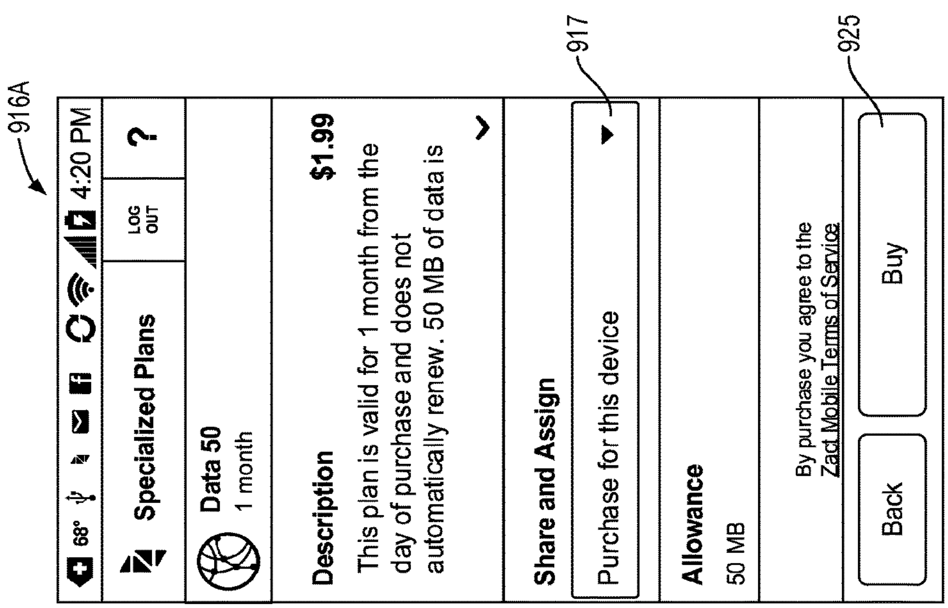
Figure 138B:
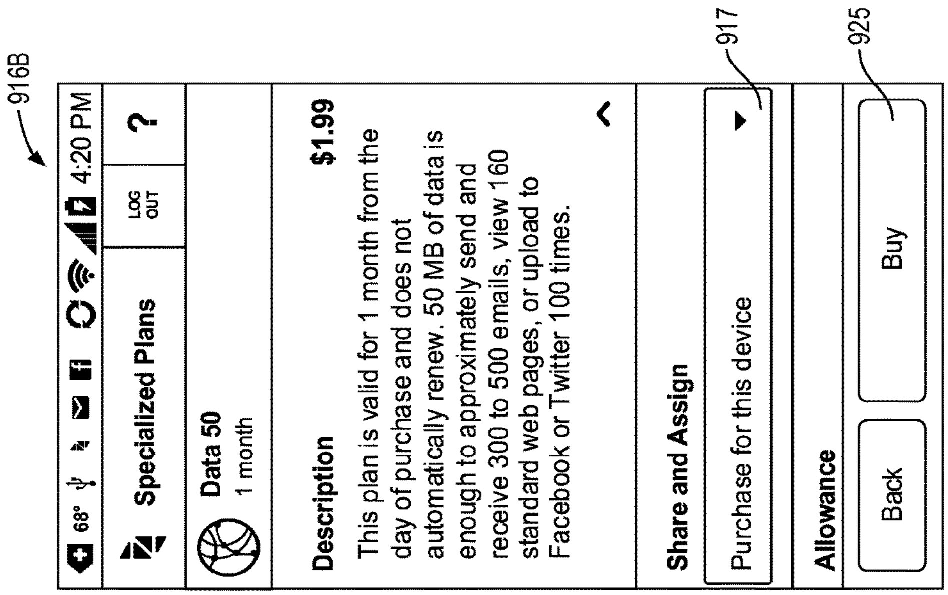
Figure 138C:
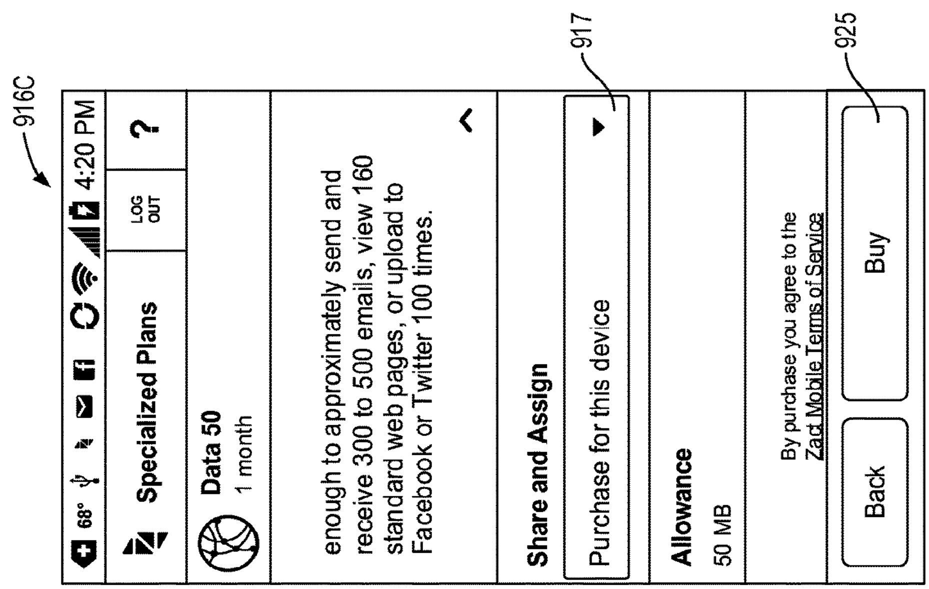

FIGS. 138A through 138C illustrate a display screen presented through a touch-screen display of a wireless end-user device, in accordance with an exemplary embodiment, in response to a user selecting the "Data 50" plan illustrated in FIGS. 137A through 137C.

Figure 139:
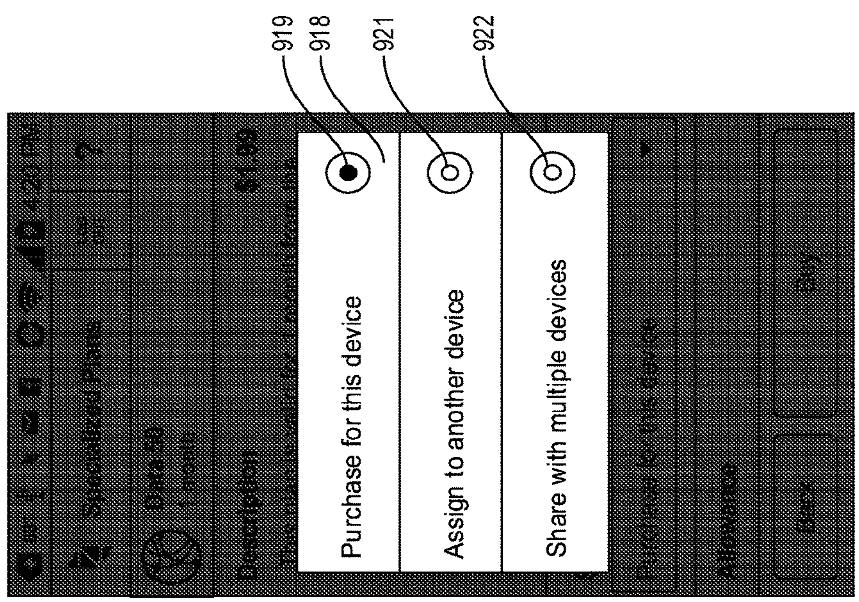

FIG. 139 illustrates a pop-up window/message presented through a touch-screen display of a wireless end-user device, in accordance with an exemplary embodiment, to assist a user to specify whether to purchase the selected plan for the device being used, to assign the selected plan to another device, or to share the selected plan with multiple devices.

Figure 140:
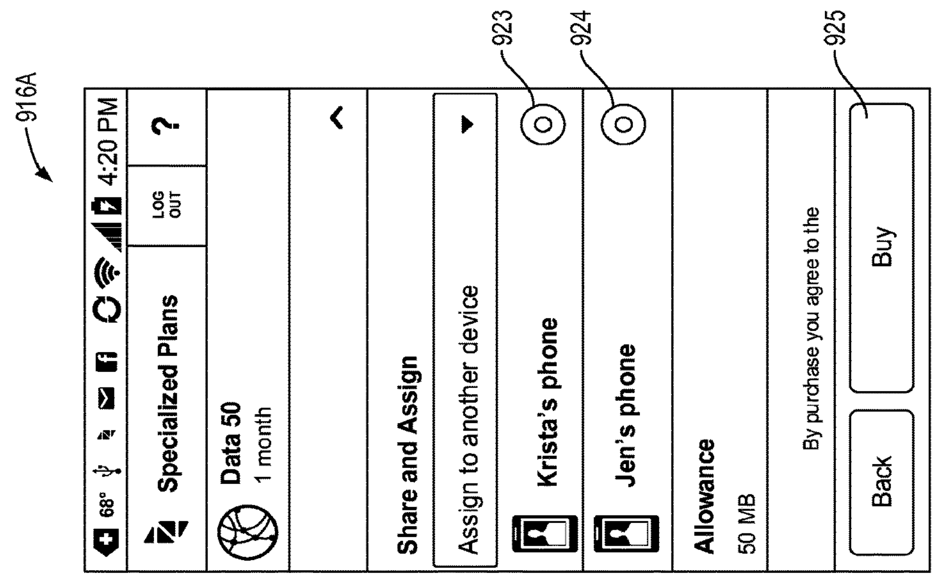

FIG. 140 illustrates a display screen presented through a touch-screen display of a wireless end-user device, in accordance with an exemplary embodiment, when the user selects "Assign to another device" in the pop-up window of FIG. 139.

Figure 141A:
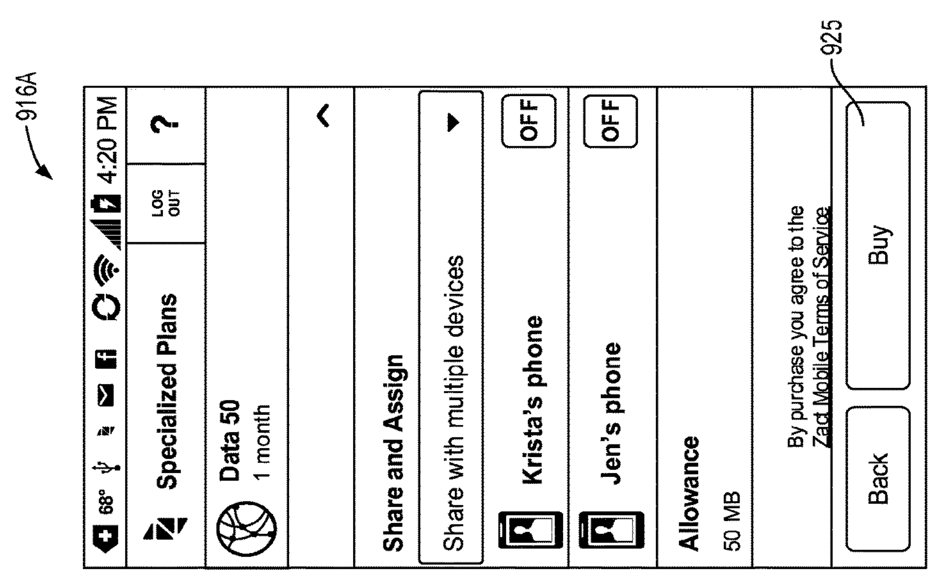
Figure 141B:
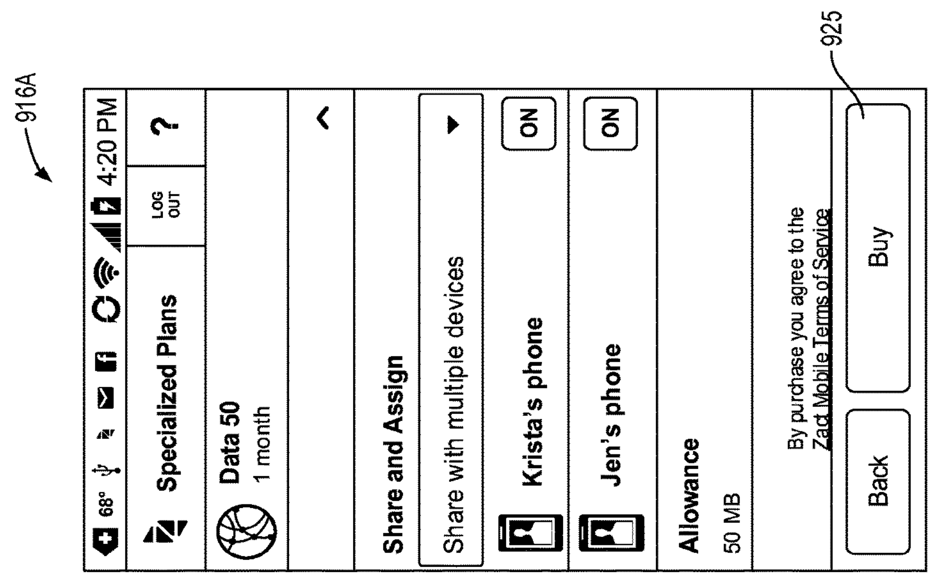
Figure 141C:
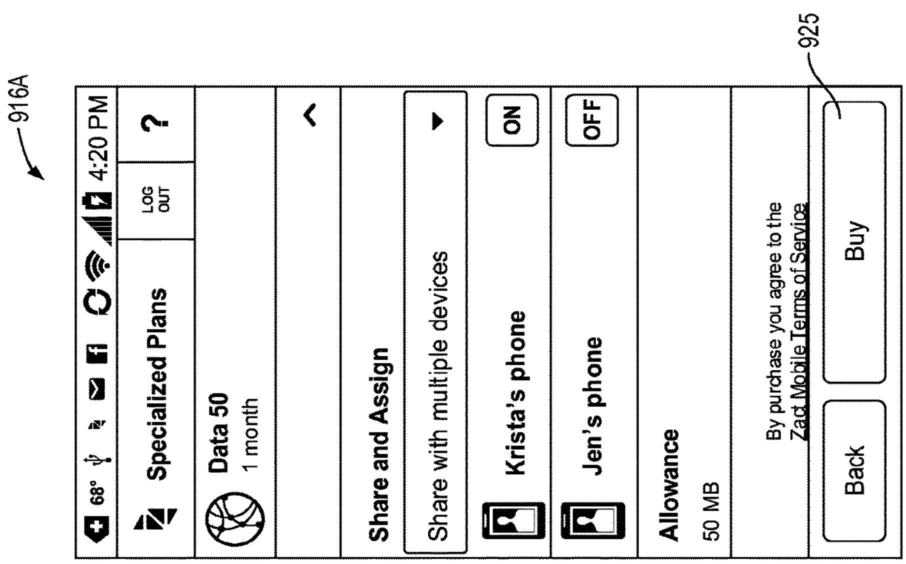

FIGS. 141A through 141C illustrate a display screen presented through a touch-screen display of a wireless end-user device, in accordance with an exemplary embodiment, showing options for sharing the selected plan among multiple devices in the device group.

Figure 142:
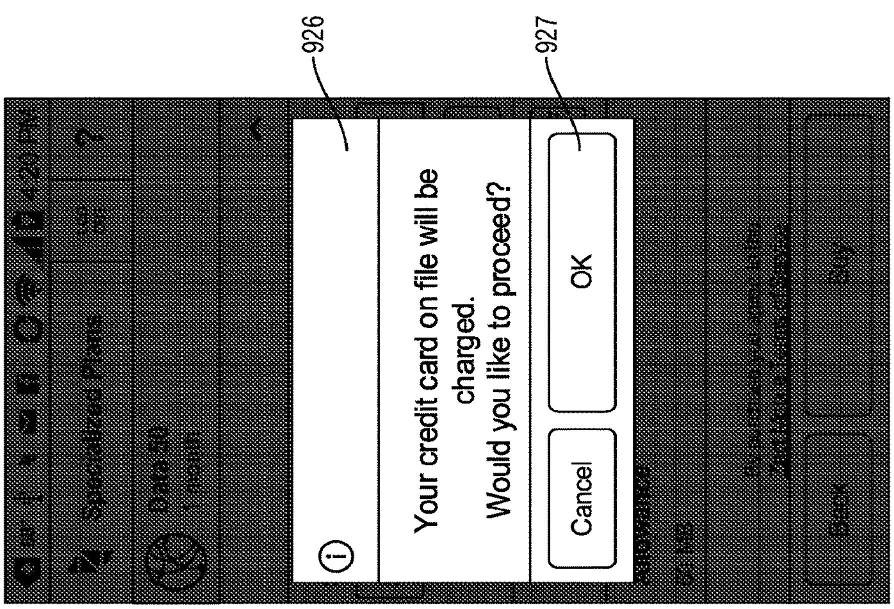

FIG. 142 illustrates a pop-up window/message presented through a touch-screen display of a wireless end-user device, in accordance with an exemplary embodiment, in response to a user selecting the "Buy" button of any of FIG. 138, 140, or 141.

Figure 143:
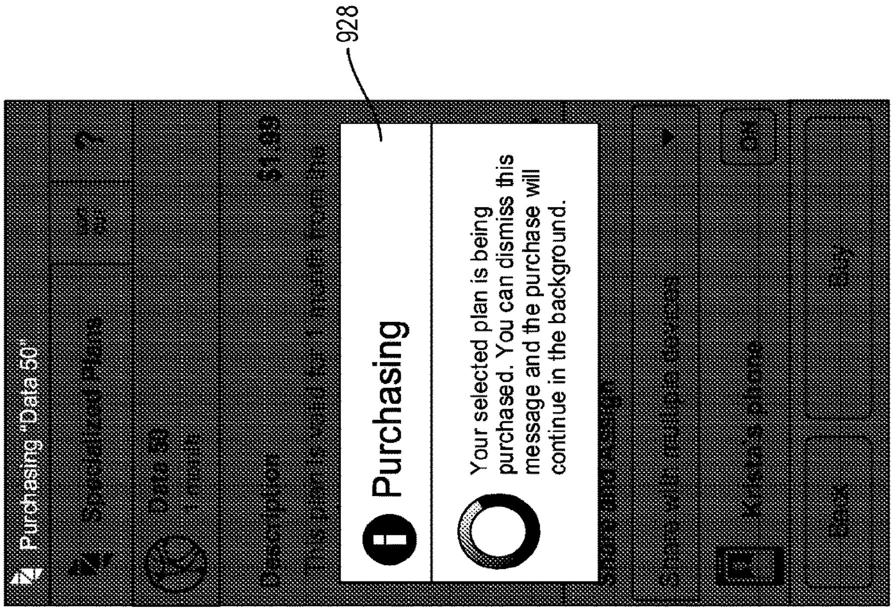

FIG. 143 illustrates a pop-up message presented through a touch-screen display of a wireless end-user device, in accordance with an exemplary embodiment, in response to a user selecting the "OK" button of FIG. 142.

Figure 144:
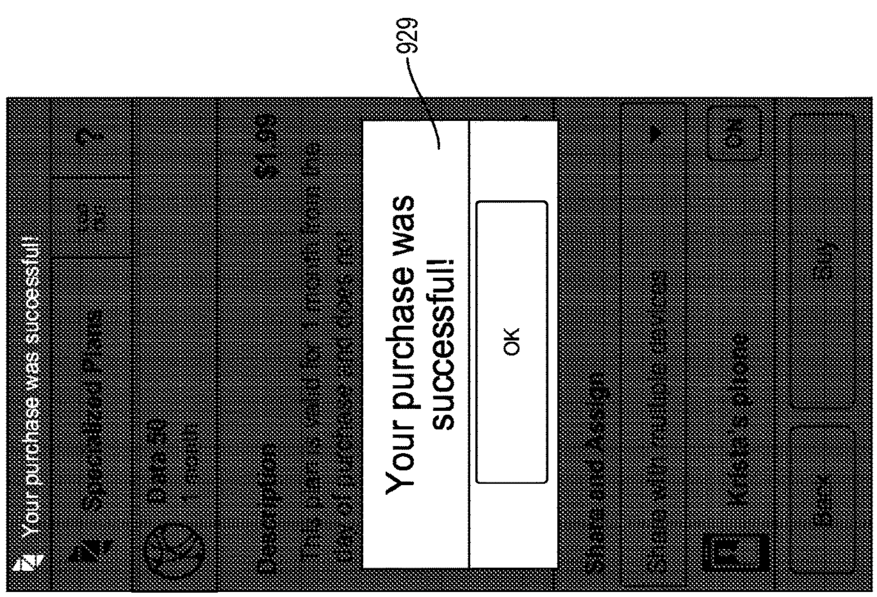

FIG. 144 illustrates a pop-up message presented through a touch-screen display of a wireless end-user device, in accordance with an exemplary embodiment, to notify a user that the purchase of the selected plan was successful.

Figure 145:
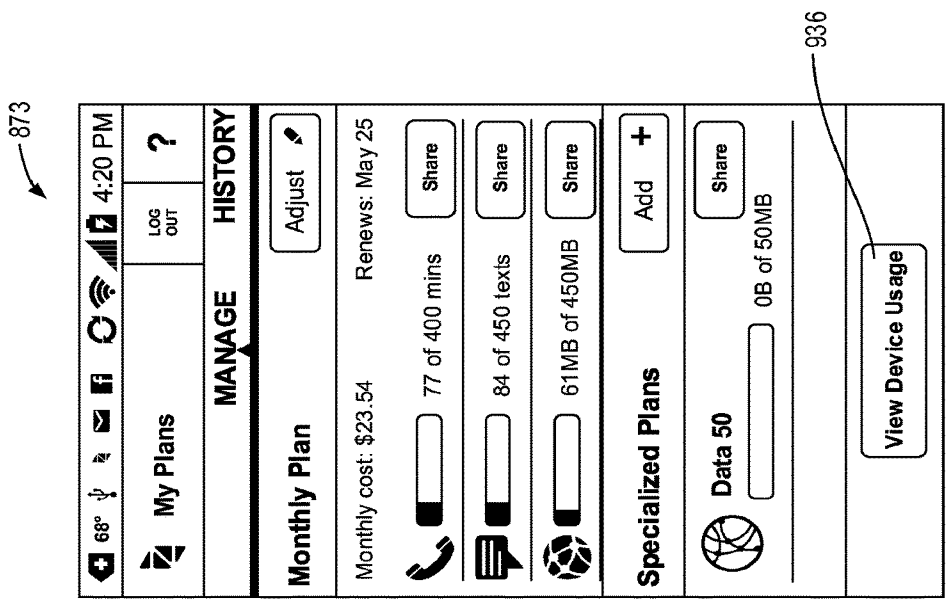

FIG. 145 illustrates a display screen presented through a touch-screen display of a wireless end-user device, in accordance with an exemplary embodiment, after a user has purchased the specialized ("Data 50") plan.

Figure 146:
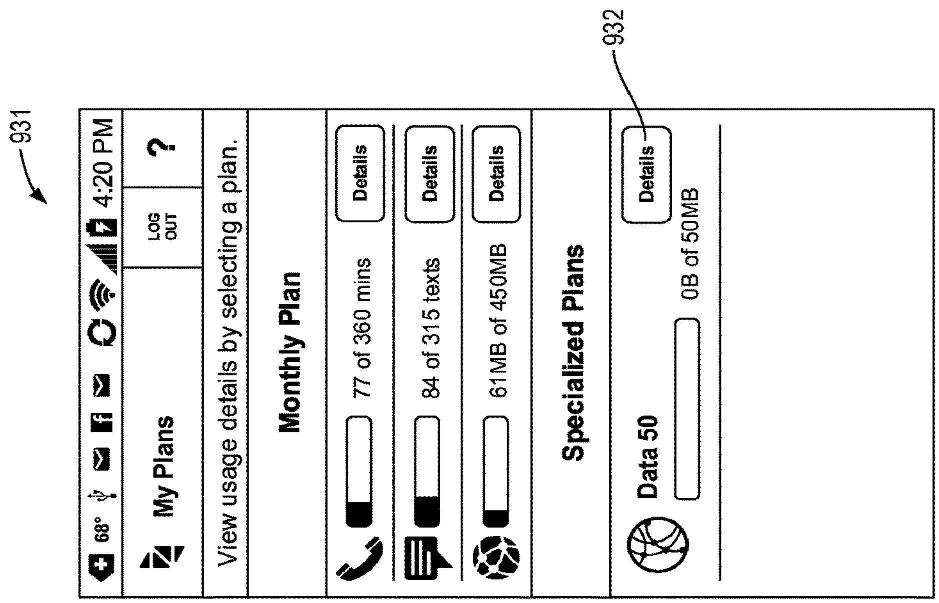

FIG. 146 illustrates a display screen presented through a touch-screen display of a wireless end-user device, in accordance with an exemplary embodiment, in response to a user selecting the "View Device Usage" button of FIG. 145.

Figure 147A:
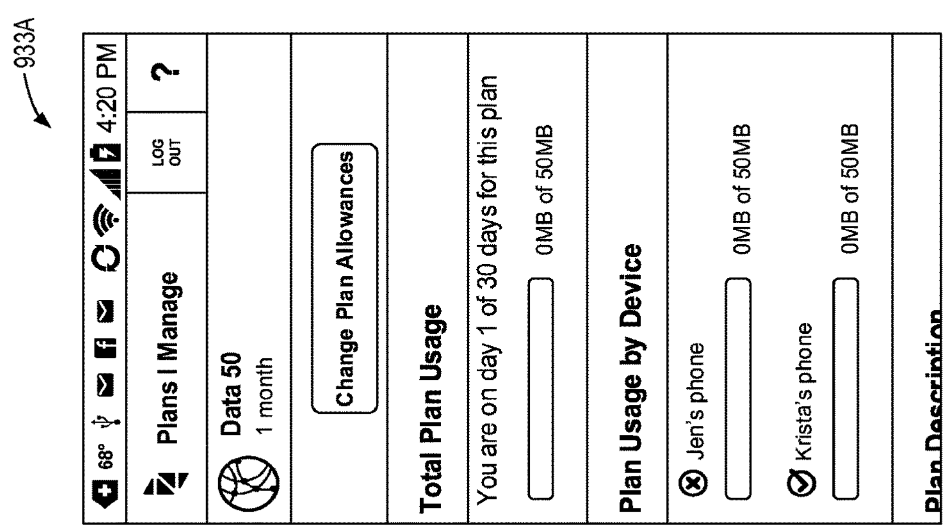
Figure 147B:
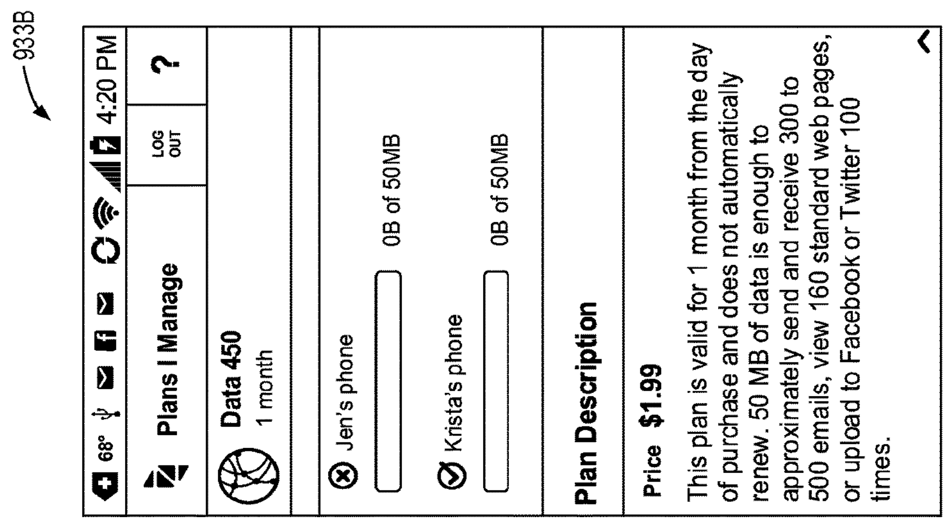
Figure 148A:
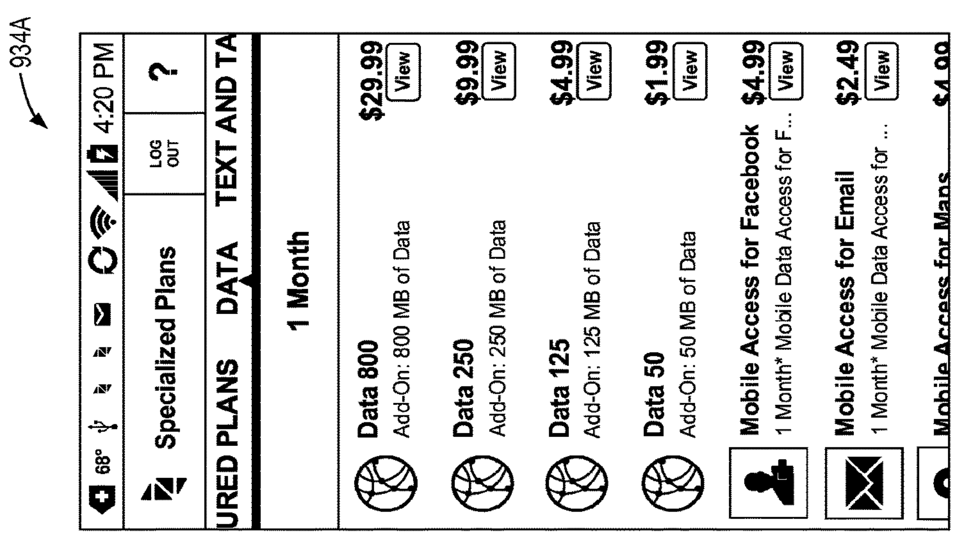
Figure 148B:
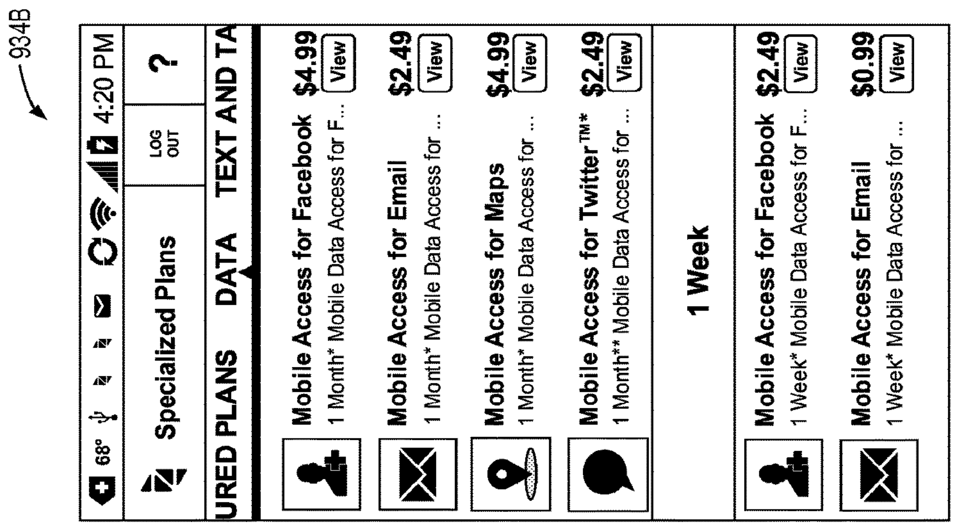
Figure 148D:
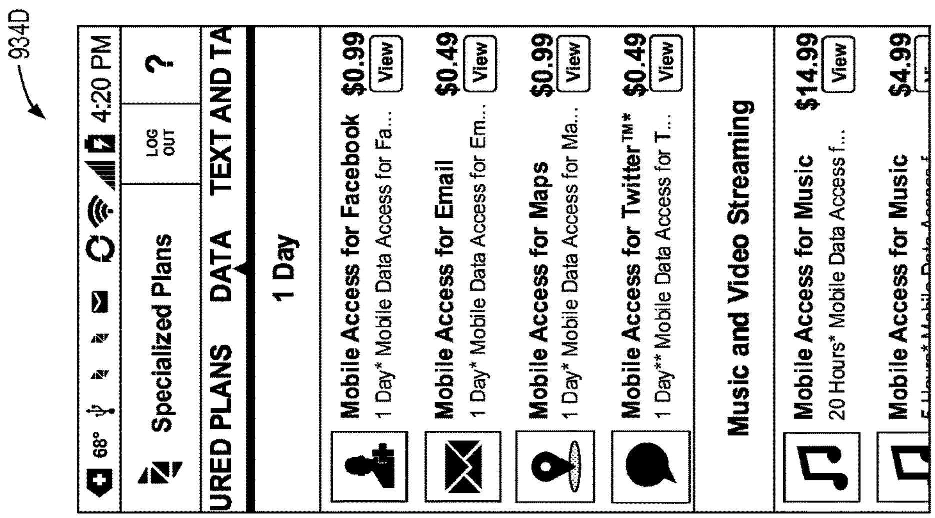
Figure 148C:
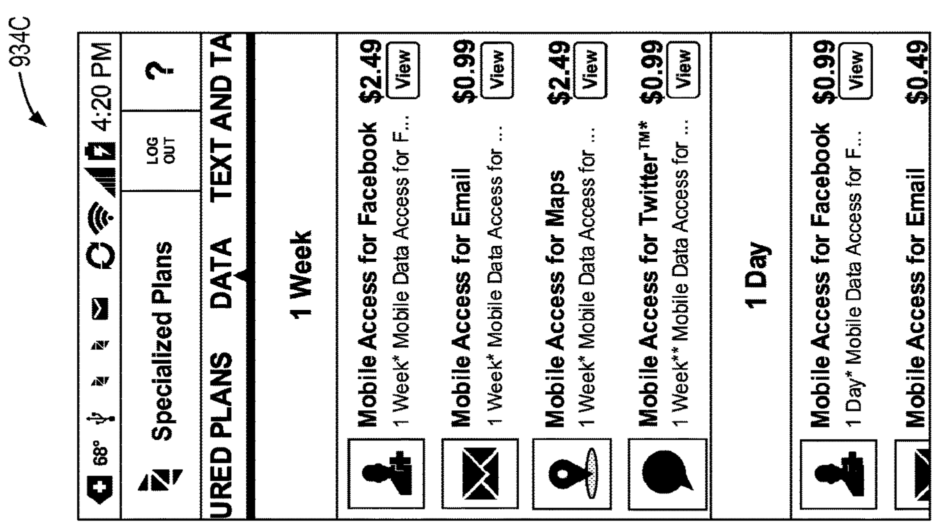
Figure 148E:
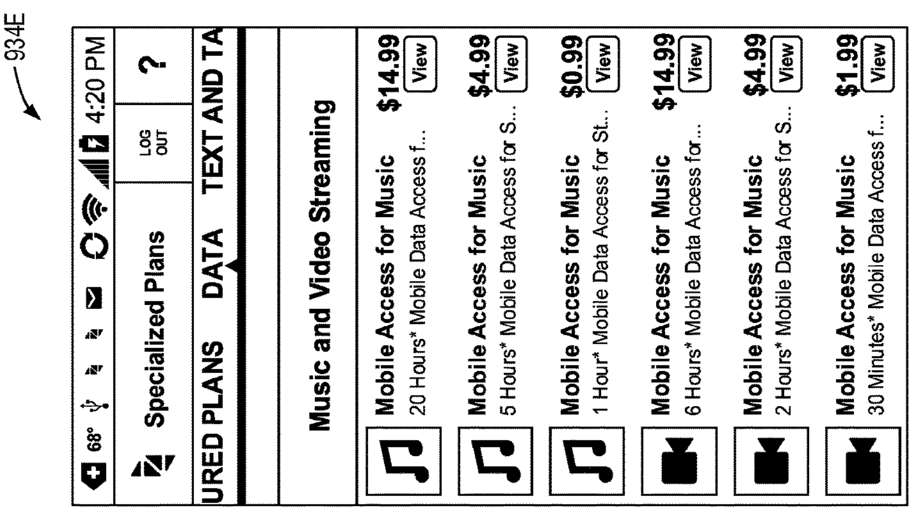

FIGS. 147A and 147B illustrate a display screen presented through a touch-screen display of a wireless end-user device, in accordance with an exemplary embodiment, in response to a user selecting the "Details" button associated with the "Data 50" plan in FIG. 146.

FIGS. 148A through 148E illustrate a display screen presented through a touch-screen display of a wireless end-user device, in accordance with an exemplary embodiment, showing exemplary specialized data plans available to the device group.

Figure 149B:
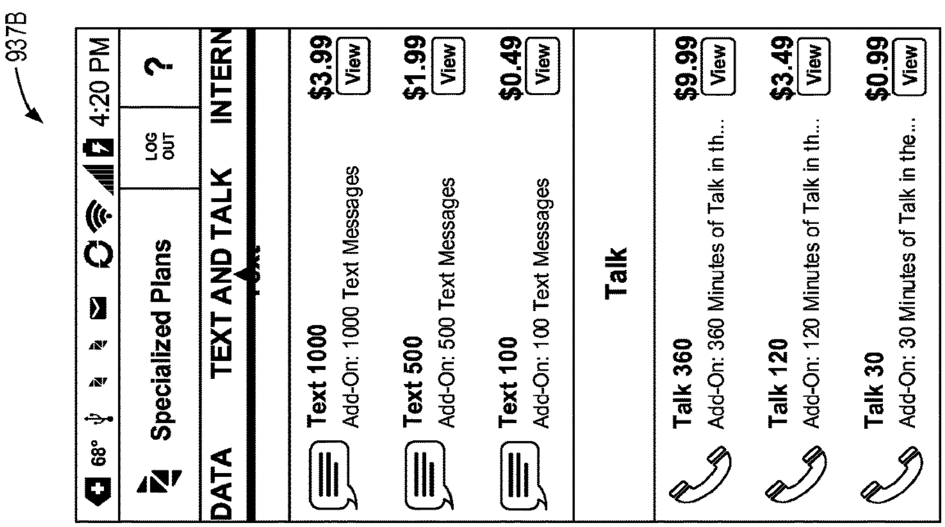
Figure 149A:
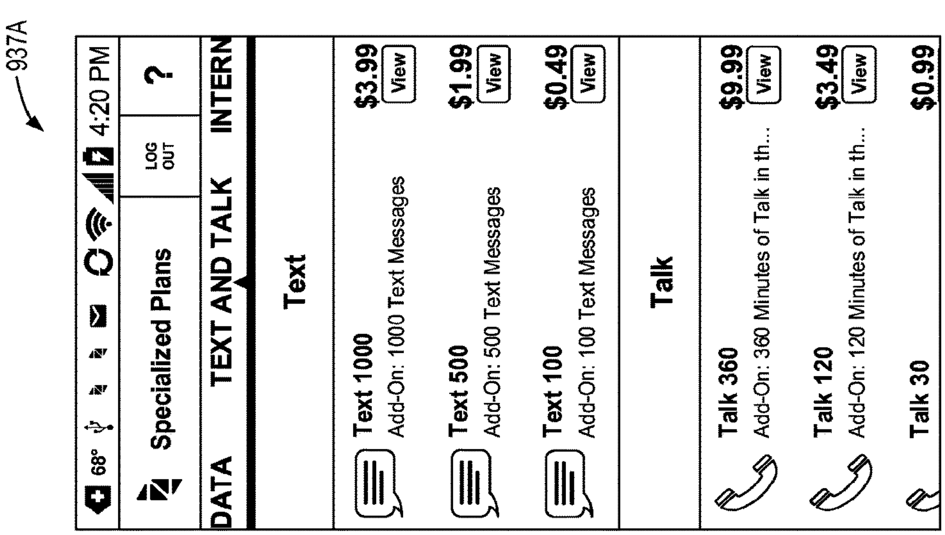

FIGS. 149A and 149B illustrate a display screen presented through a touch-screen display of a wireless end-user device, in accordance with an exemplary embodiment, showing exemplary specialized texting and voice plans available to the device group.

Figure 150A:
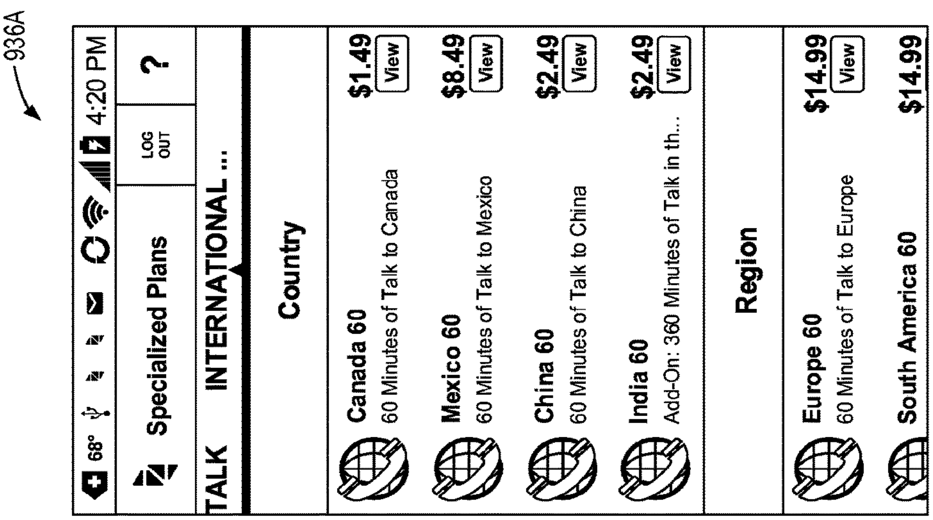
Figure 150B:
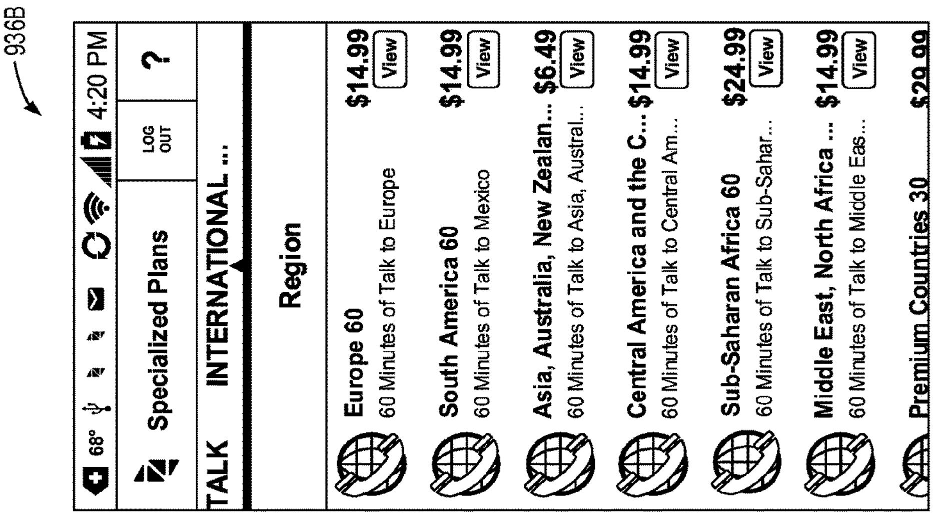

FIGS. 150A and 150B illustrate a display screen presented through a touch-screen display of a wireless end-user device, in accordance with an exemplary embodiment, showing exemplary international calling plans available to the device group.

Figure 151:
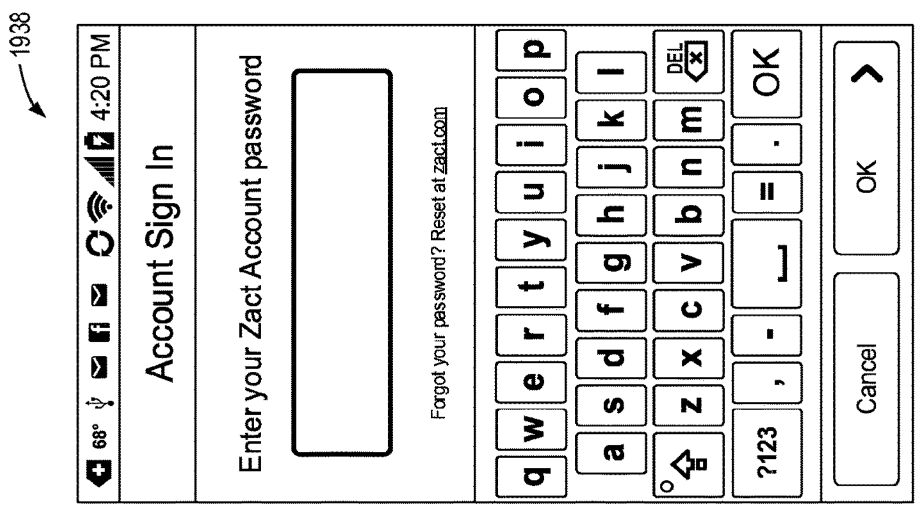

FIG. 151 illustrates a display screen presented through a touch-screen display of a wireless end-user device, in accordance with an exemplary embodiment, enabling a user to log into the device group account.

FIGS. 152A through 152F illustrate a display screen presented through a touch-screen display of a wireless end-user device, in accordance with an exemplary embodiment, enabling an authorized user to view summary and detailed information about uninvoiced purchases for the device group.

Figure 153:
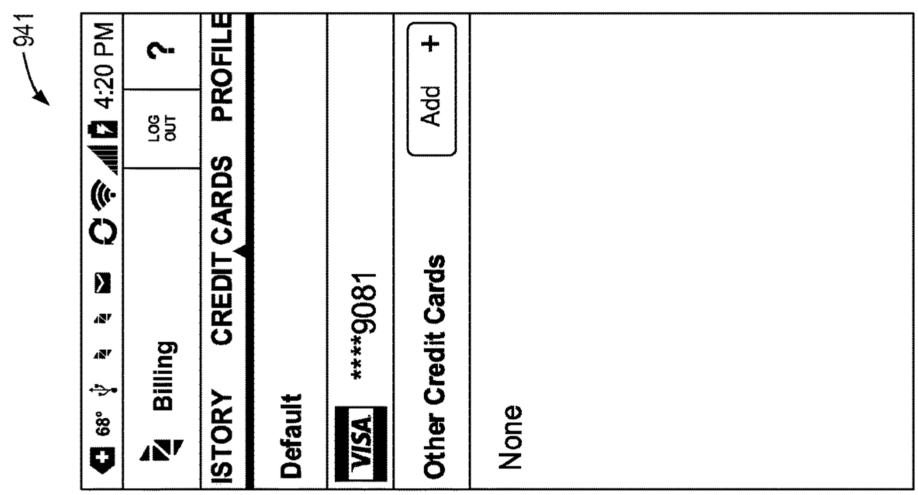

FIG. 153 illustrates a display screen presented through a touch-screen display of a wireless end-user device, in accordance with an exemplary embodiment, showing payment information.

Figure 154B:
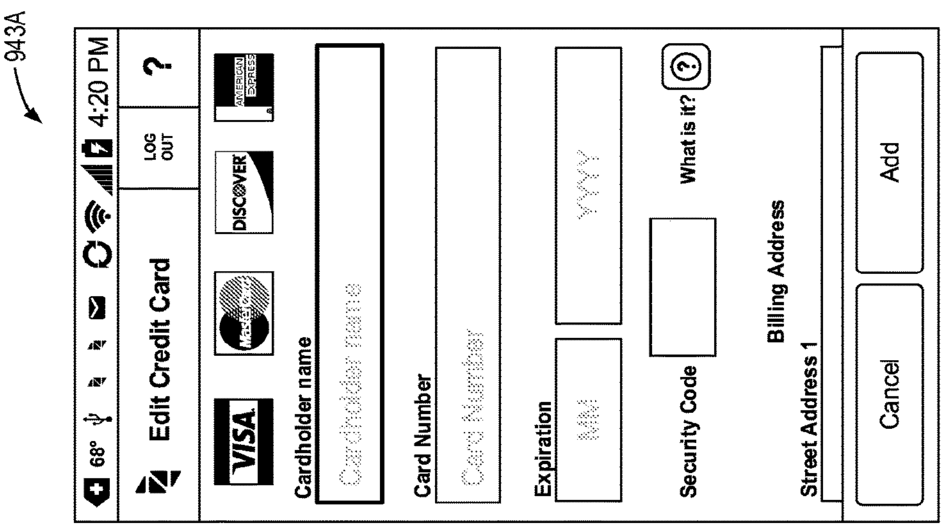
Figure 154A:
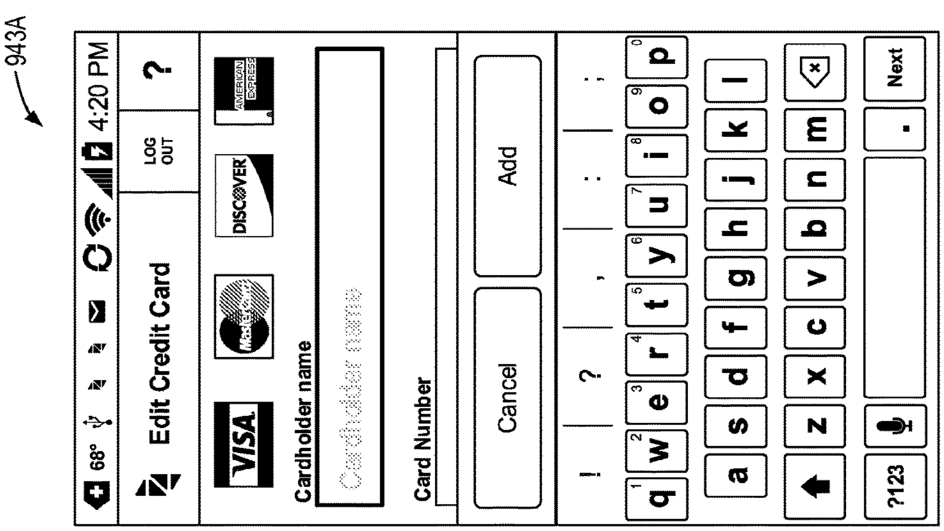
Figure 154C:
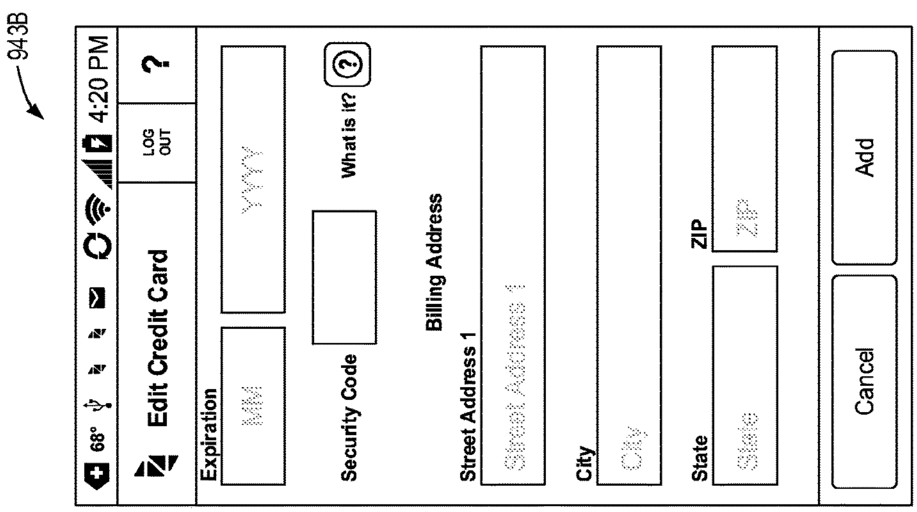

FIGS. 154A through 154C illustrate a display screen presented through a touch-screen display of a wireless end-user device, in accordance with an exemplary embodiment, enabling a user to enter or modify credit card information associated with the device group account.

Figure 155:
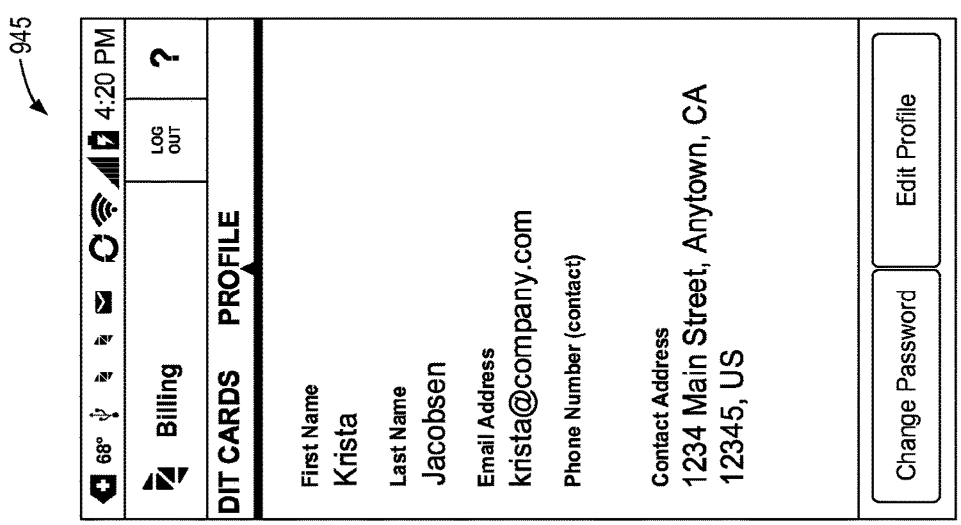
Figure 157B:
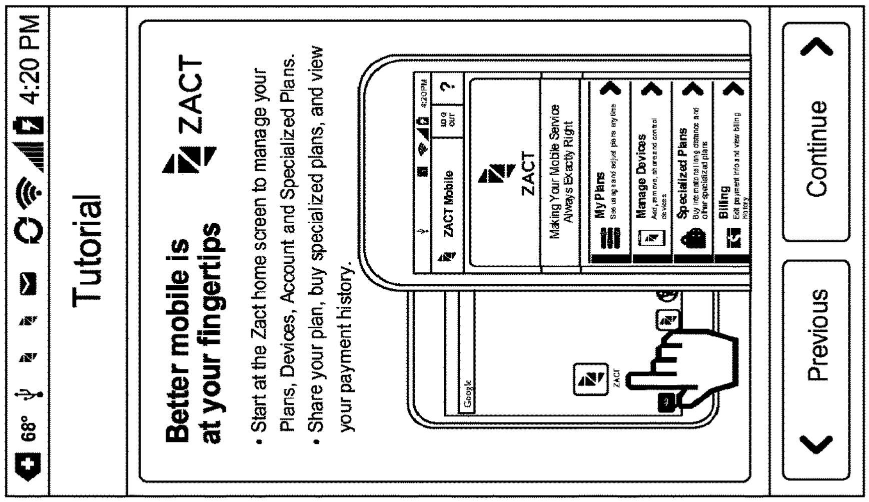
Figure 157A:
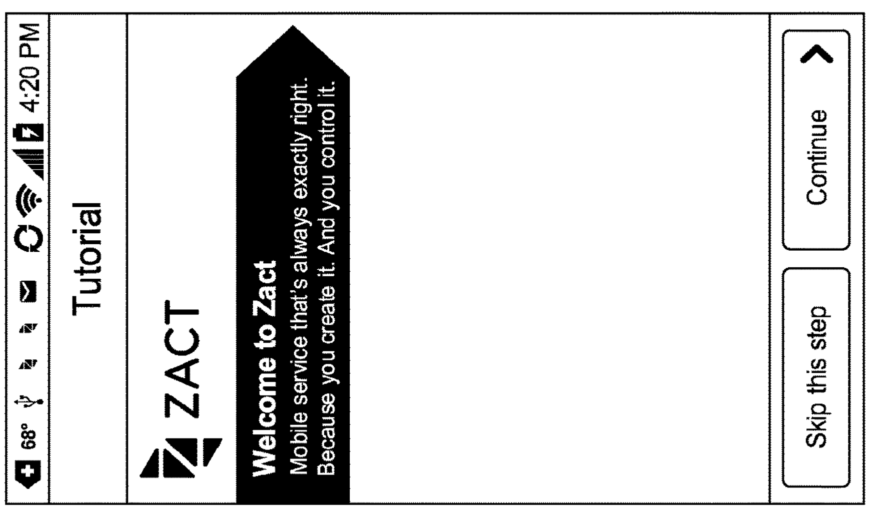
Figure 157D:
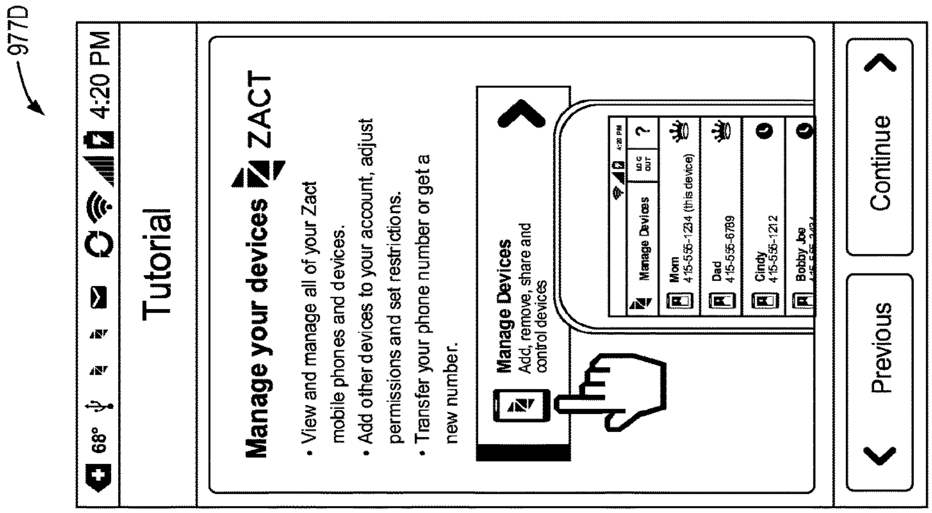
Figure 157C:
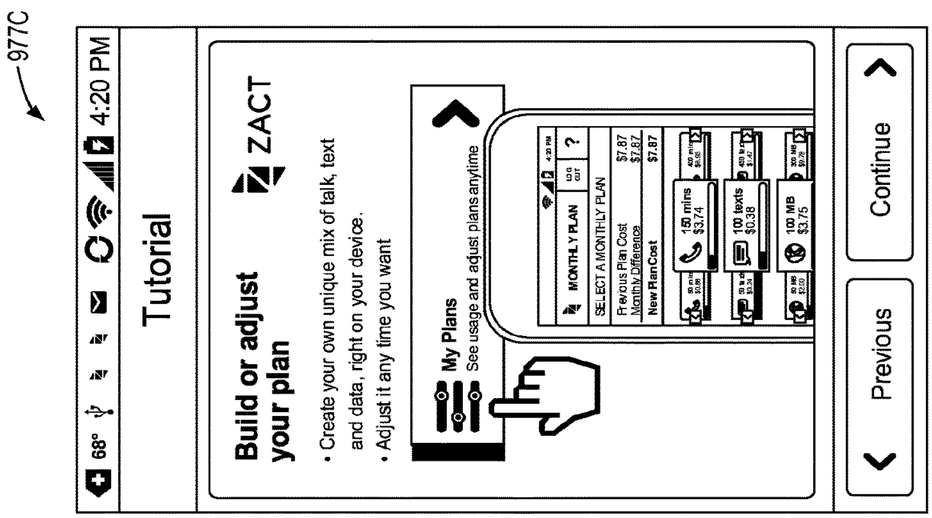
Figure 157E:
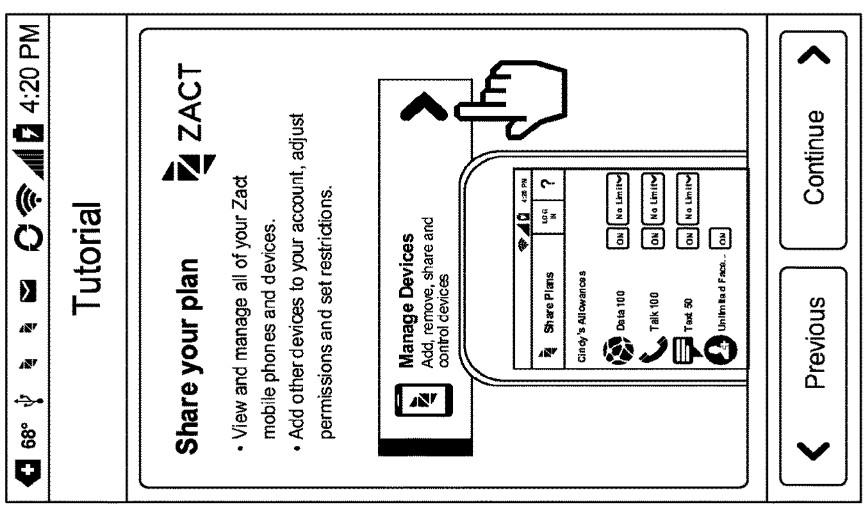
Figure 157F:
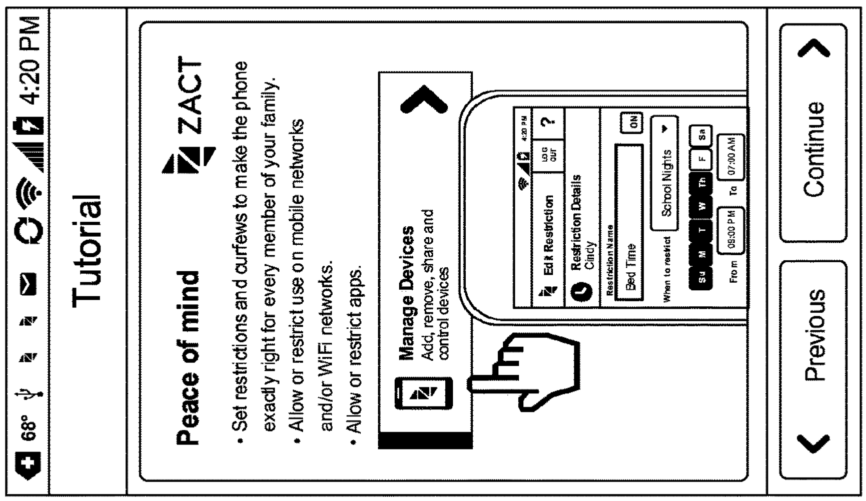
Figure 157G:
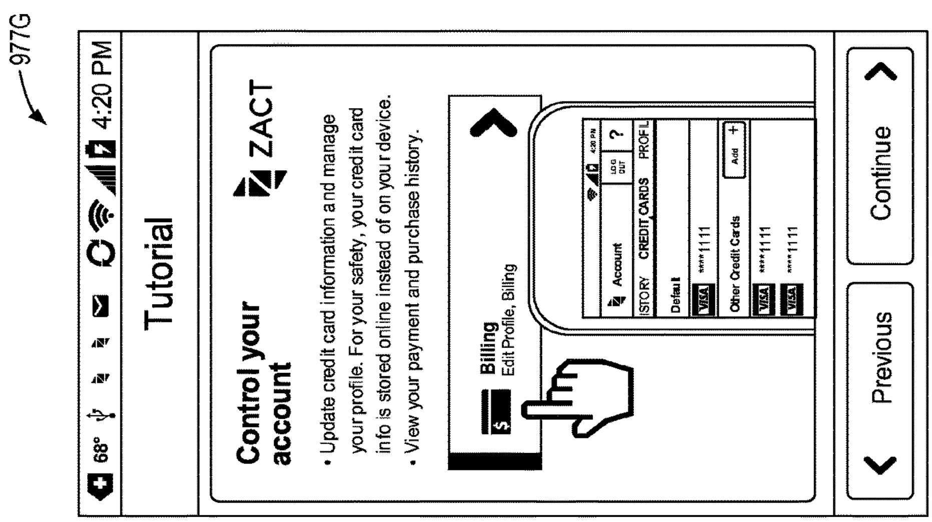
Figure 157H:
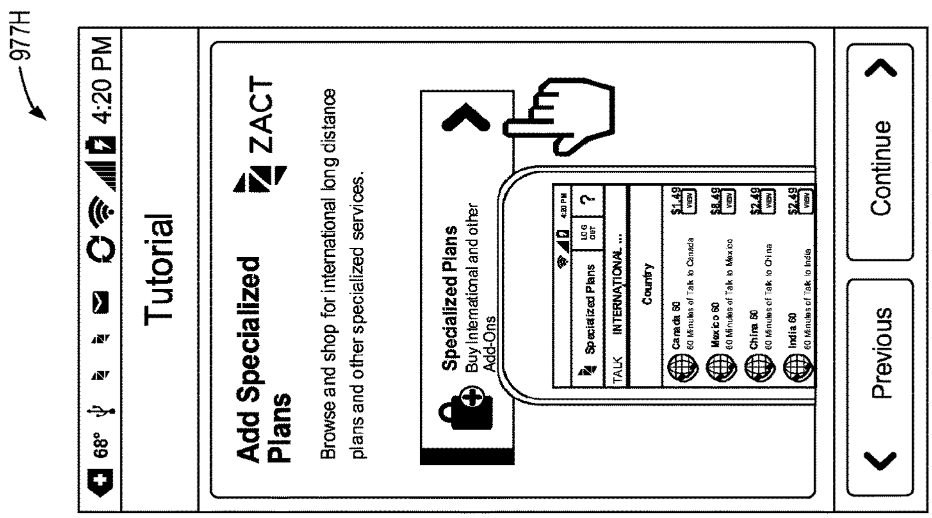
Figure 157J:
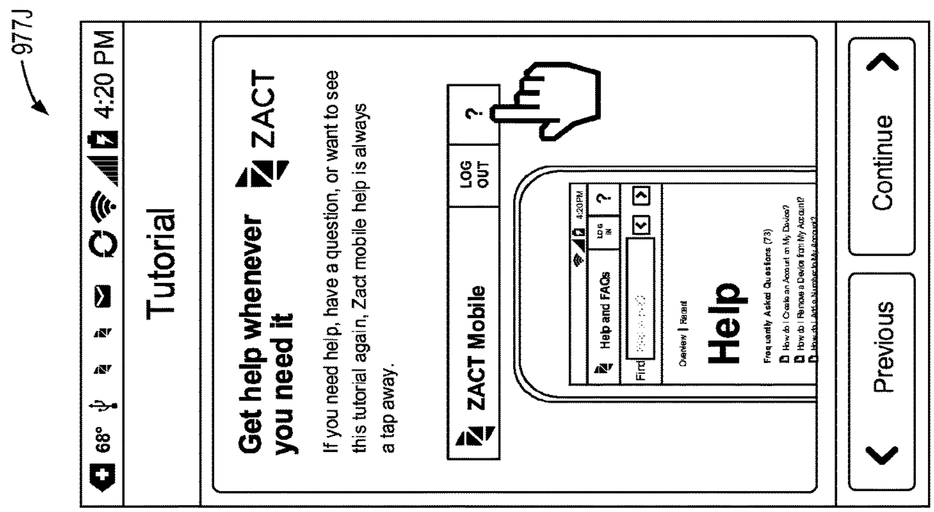
Figure 157I:
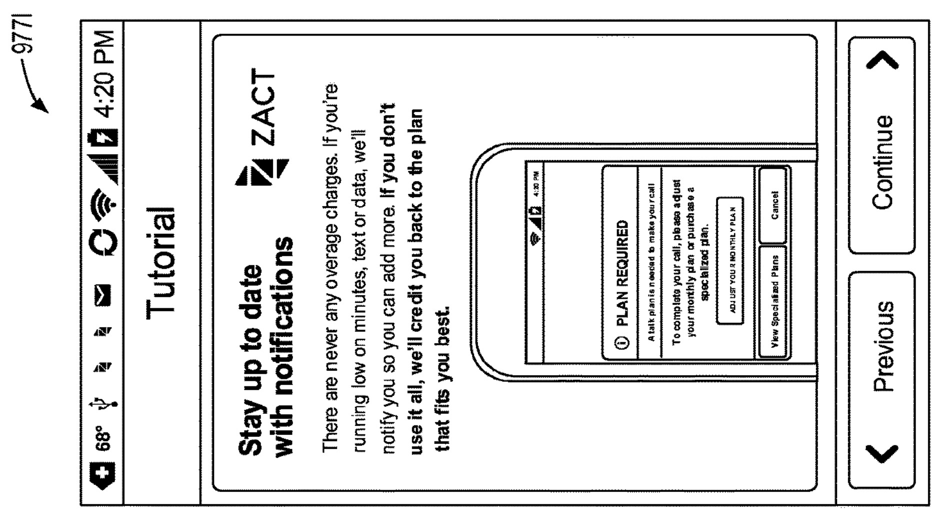
Figure 157K:
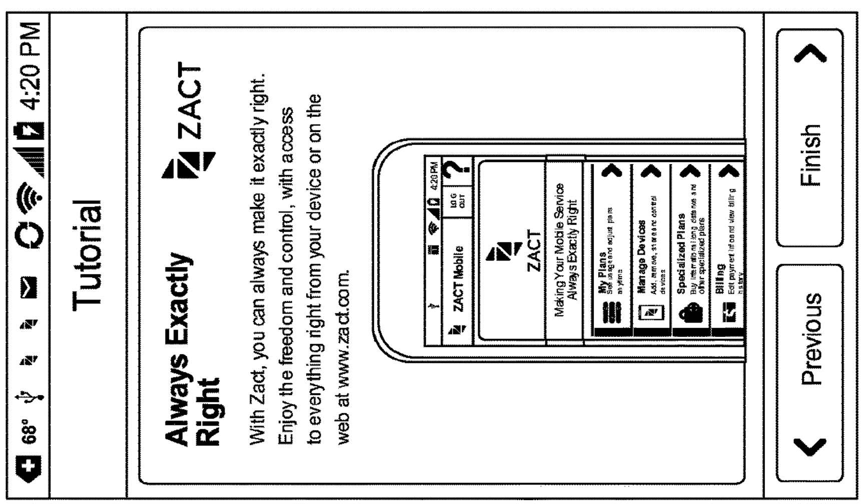

FIG. 155 illustrates a display screen presented through a touch-screen display of a wireless end-user device, in accordance with an exemplary embodiment, enabling a user to view profile information associated with the device group account.

Figure 156:
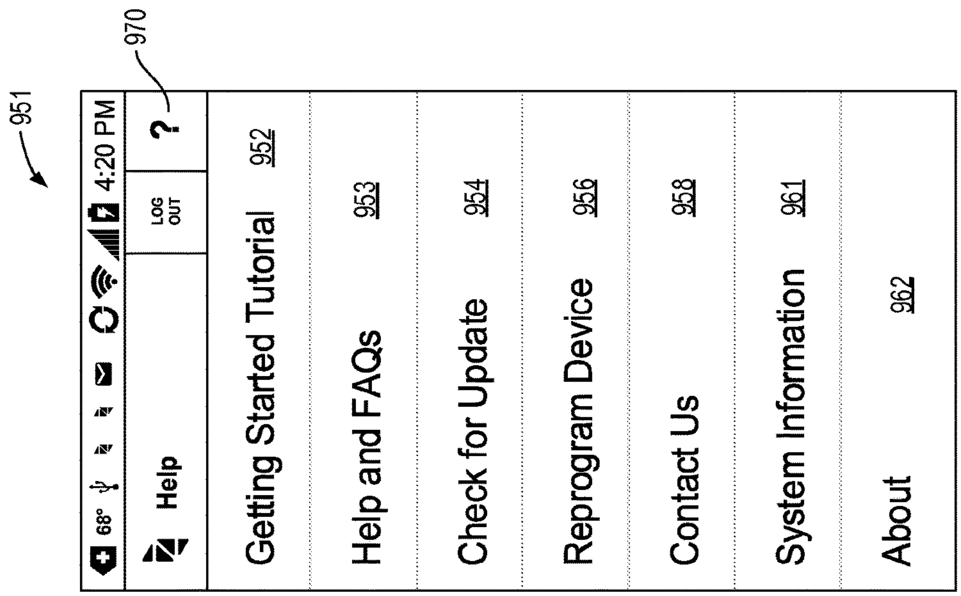

FIG. 156 illustrates a display screen presented through a touch-screen display of a wireless end-user device, in accordance with an exemplary embodiment, providing a help menu.

FIGS. 157A through 157K illustrate display screens presented through a touch-screen display of a wireless end-user device, in accordance with an exemplary embodiment, which provide tutorial information to a user.

Figure 158A:
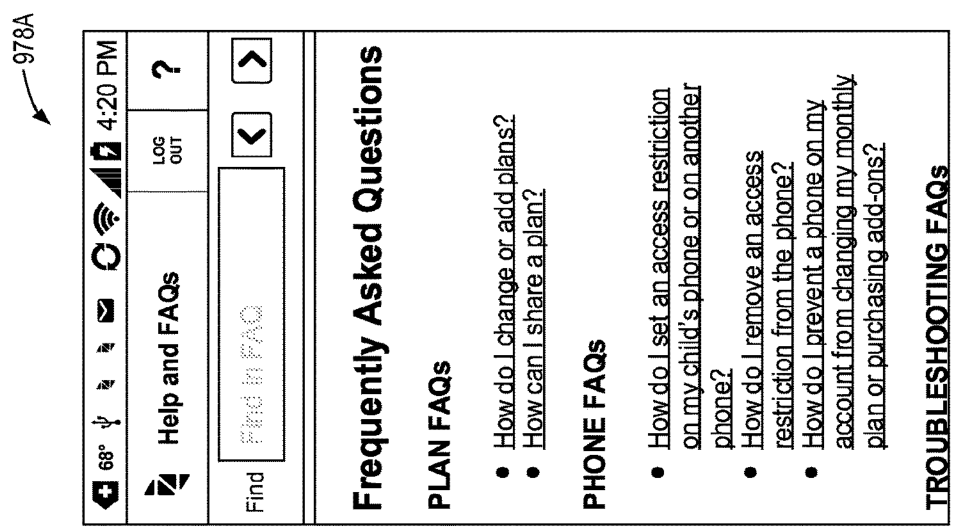
Figure 158B:
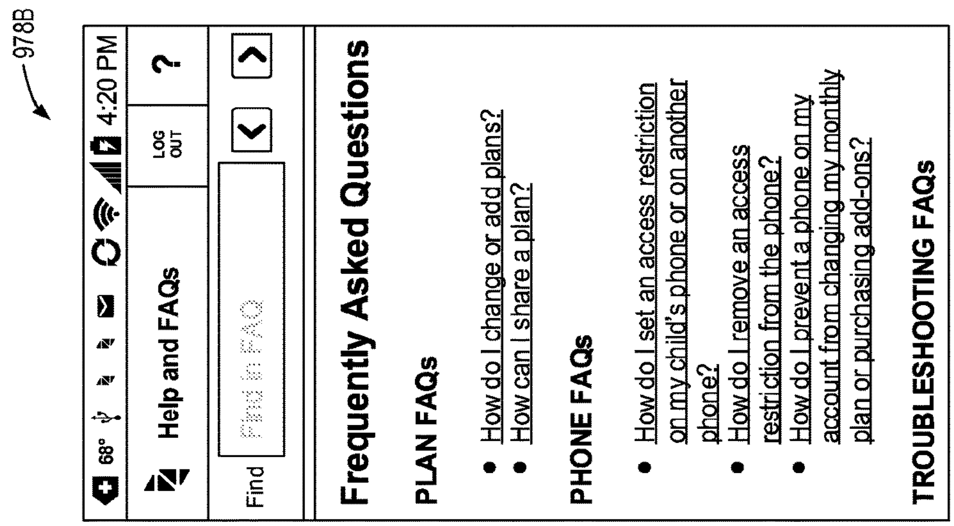
Figure 158D:
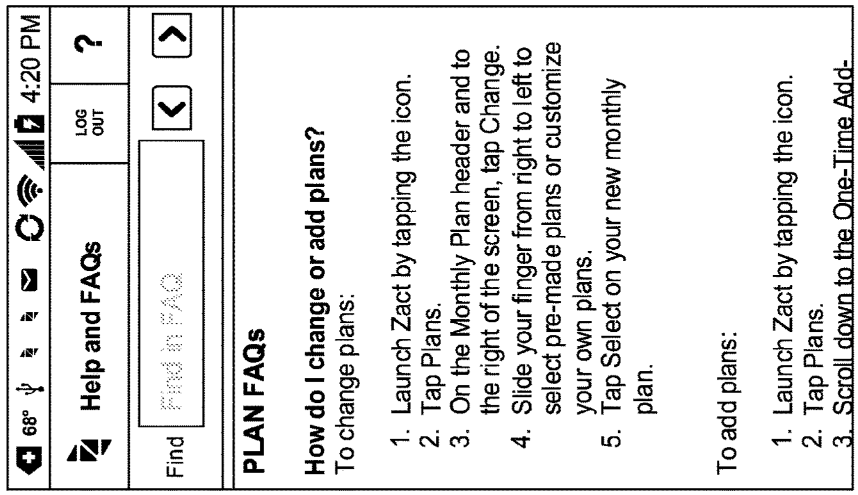
Figure 158C:
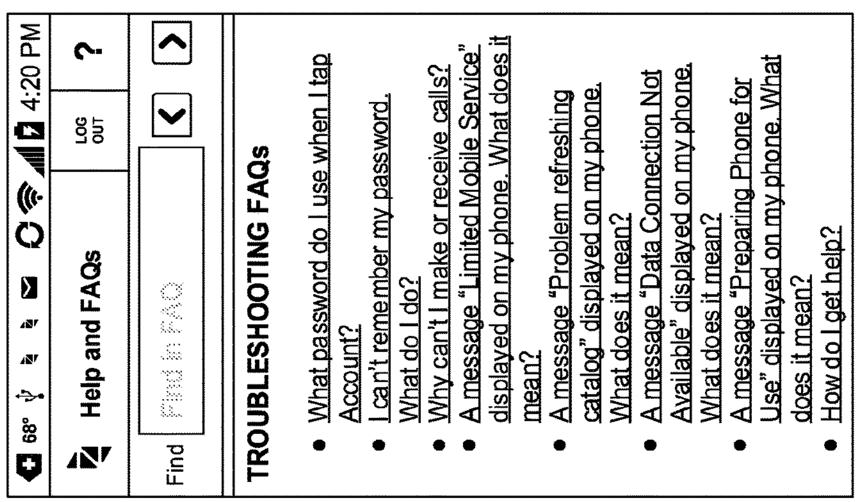
Figure 158E:
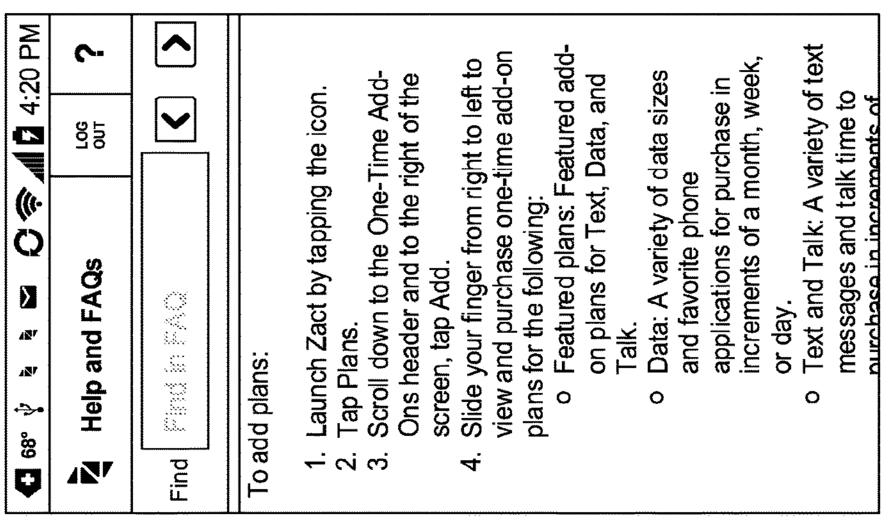
Figure 158F:
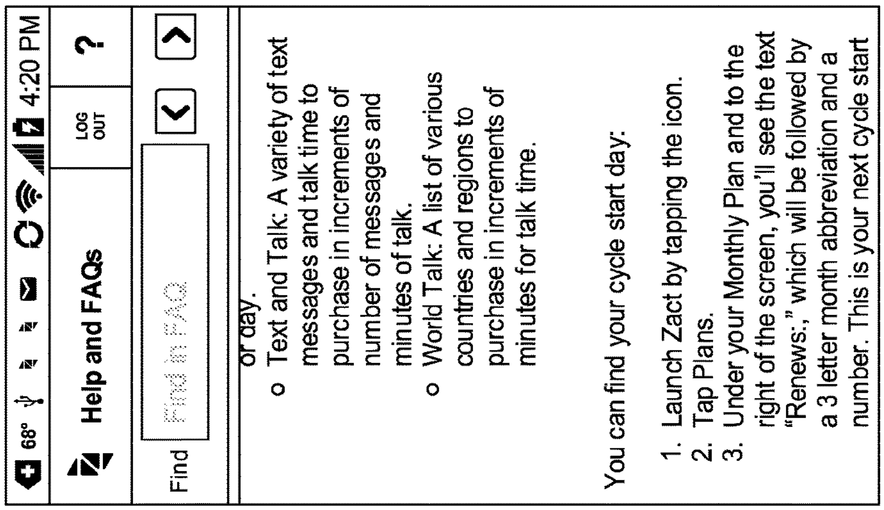
Figure 158H:
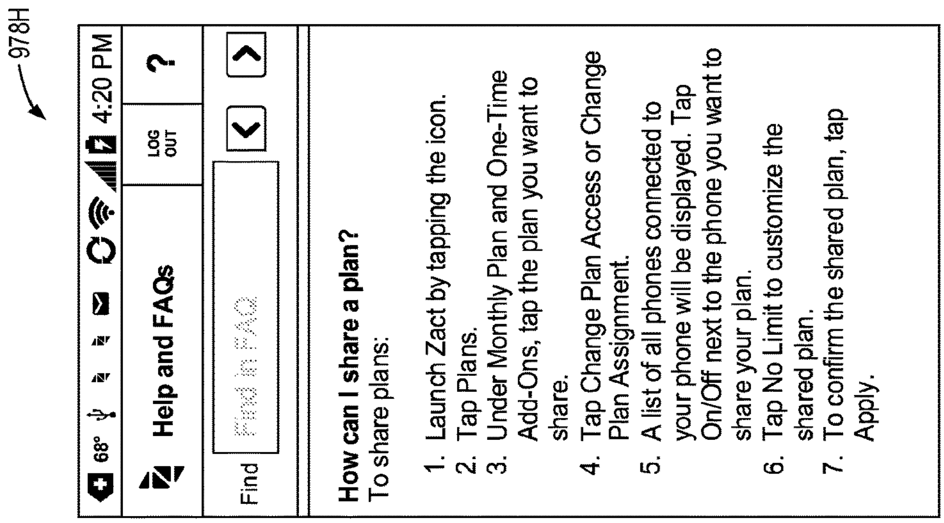
Figure 158G:
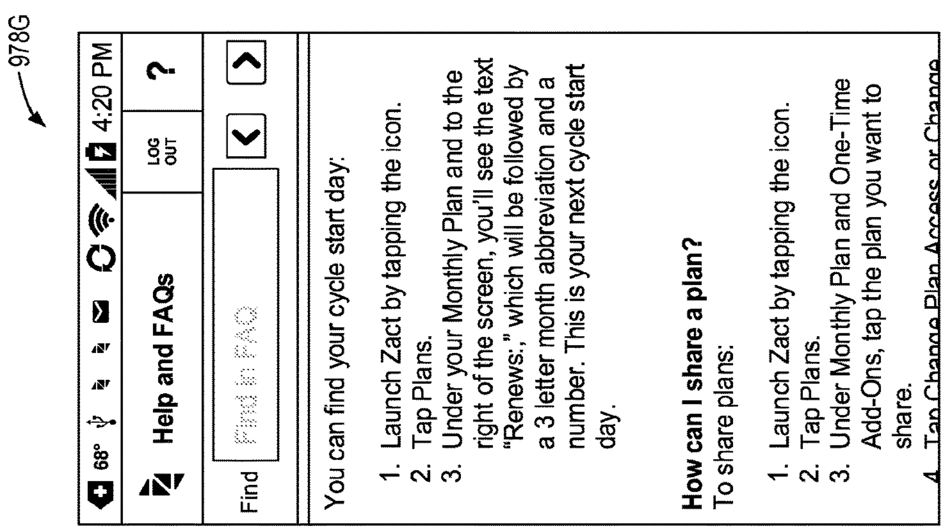
Figure 158I:
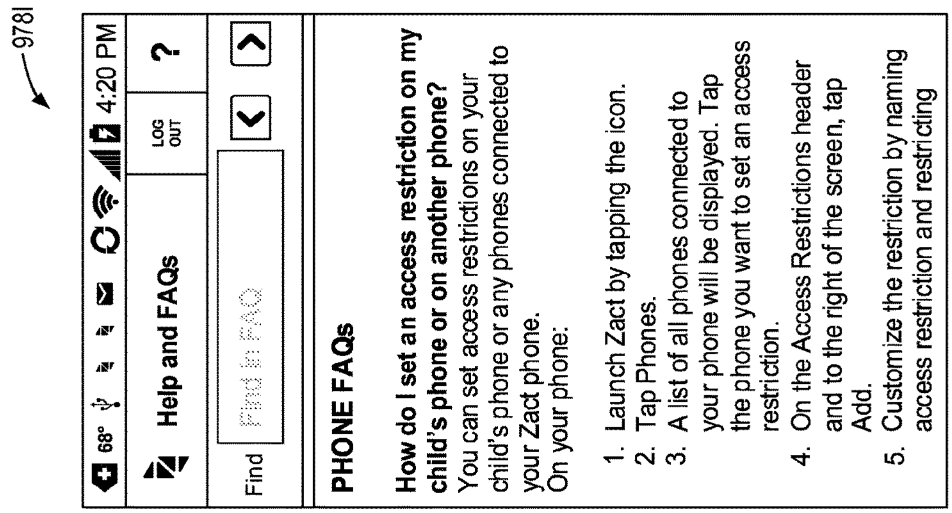
Figure 158J:
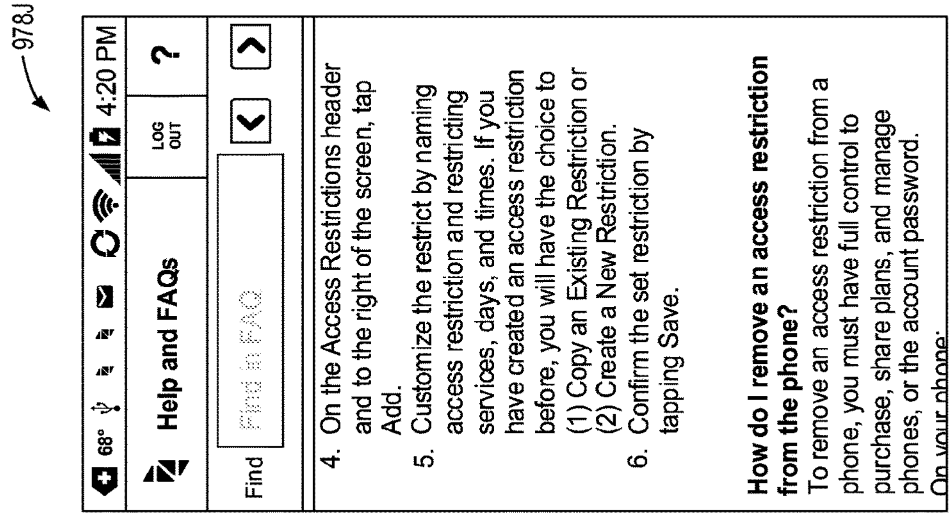
Figure 158K:
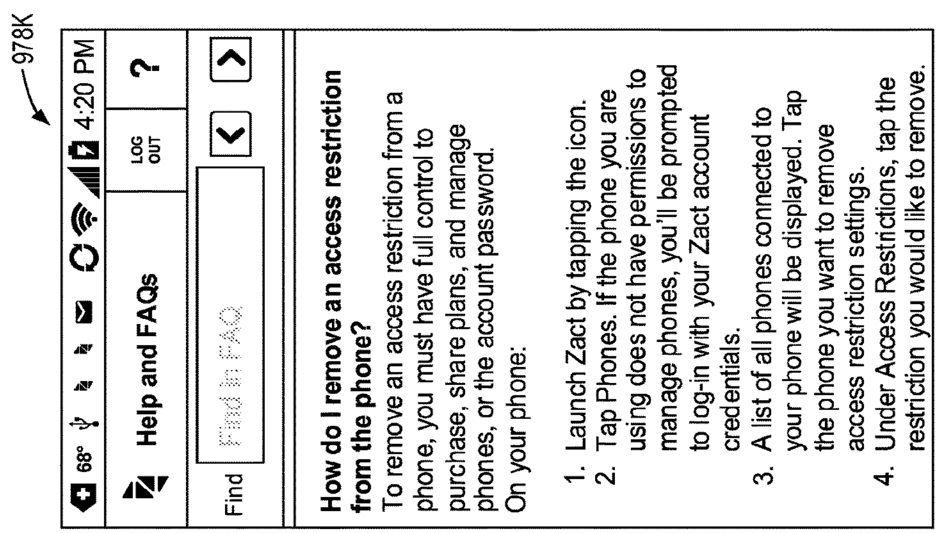
Figure 158L:
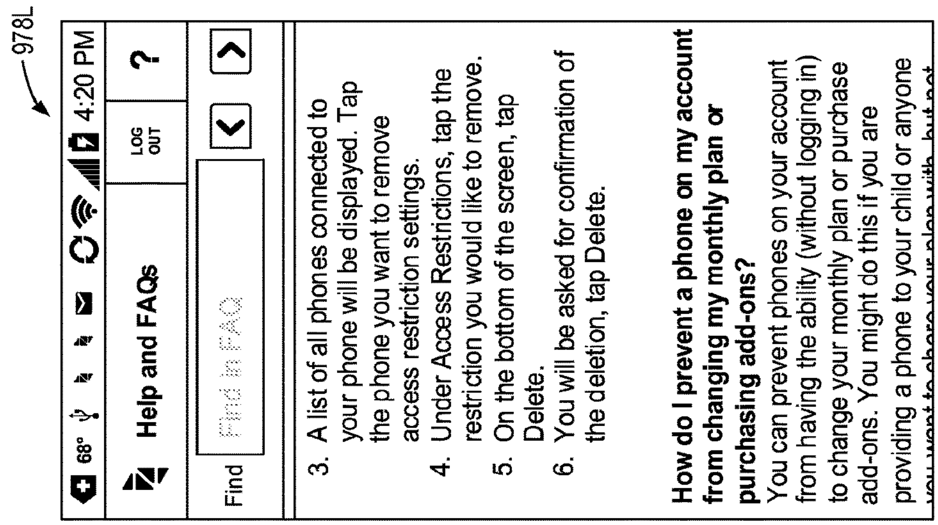
Figure 158N:
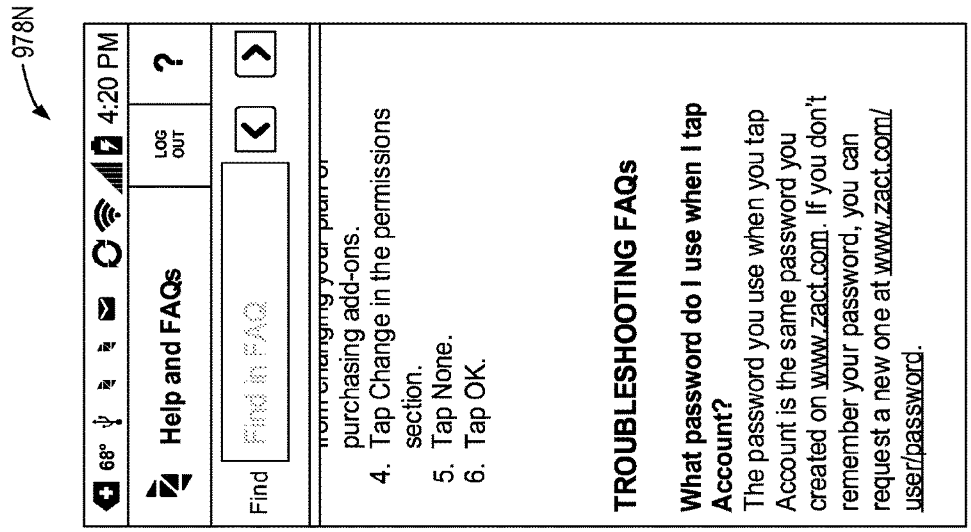
Figure 158M:
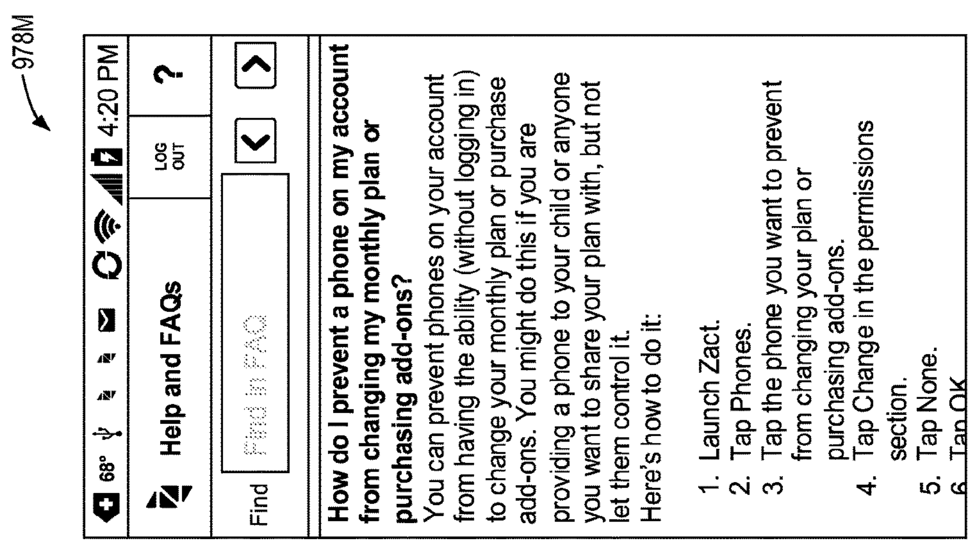
Figure 158O:
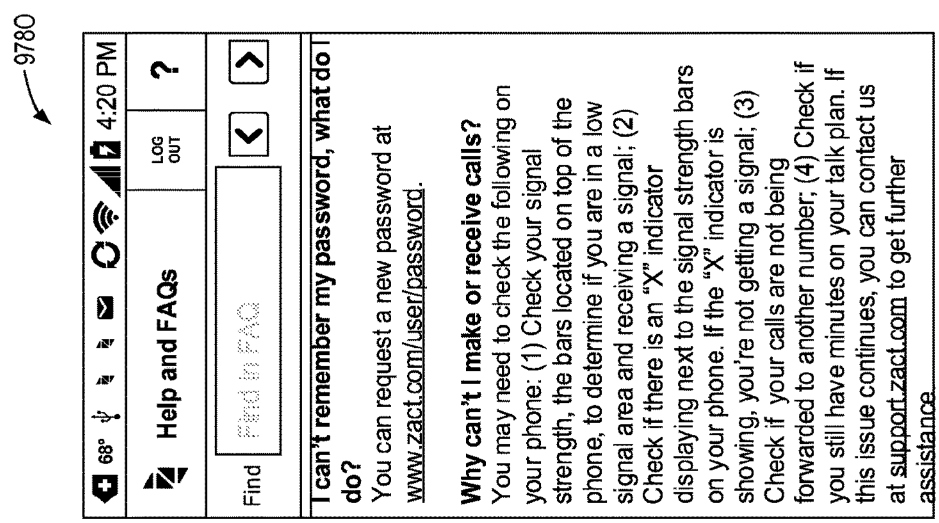
Figure 158P:
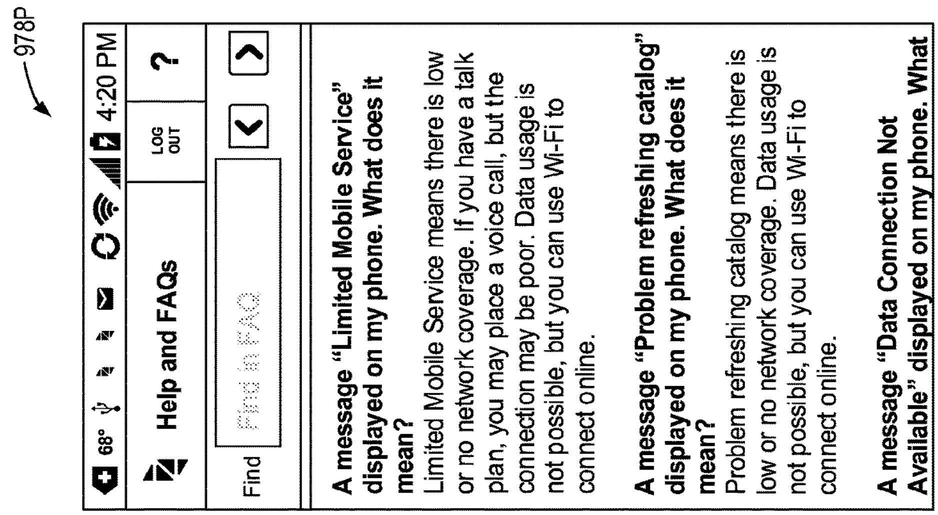
Figure 158Q:
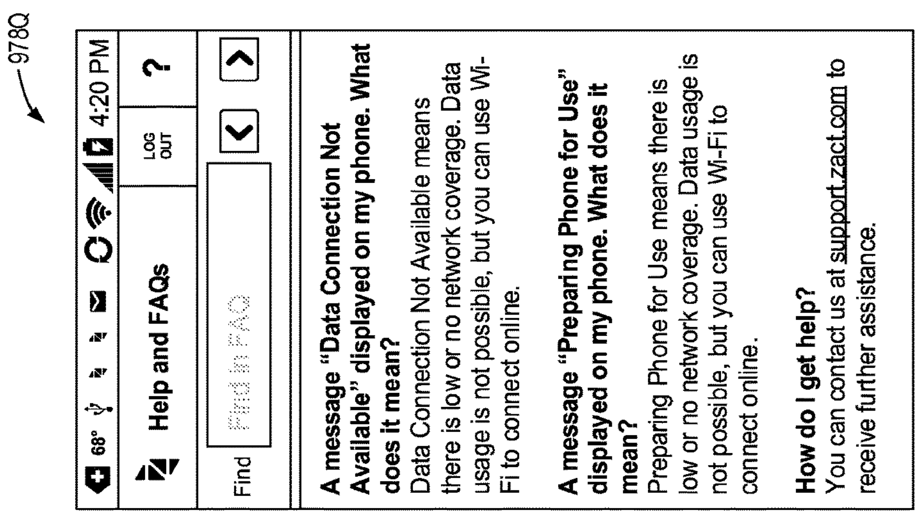

FIGS. 158A through 158Q illustrate display screens presented through a touch-screen display of a wireless end-user device, in accordance with an exemplary embodiment, which provide help and frequently-asked question (FAQ) information to a user.

Figure 159:
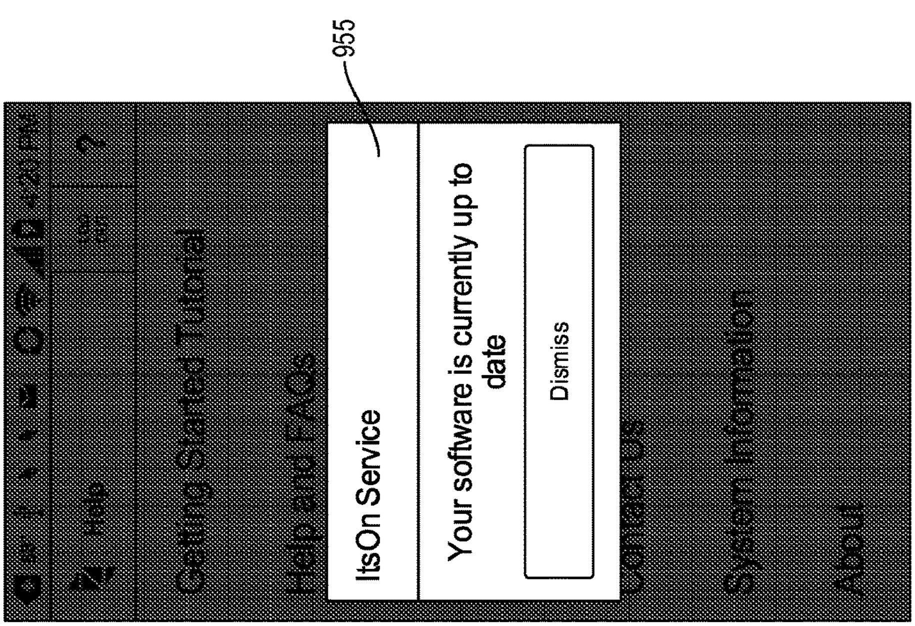

FIG. 159 illustrates a pop-up window/message presented through a touch-screen display of a wireless end-user device, in accordance with an exemplary embodiment, in response to a user selecting the "Check for Update" option of FIG. 156.

Figure 160:
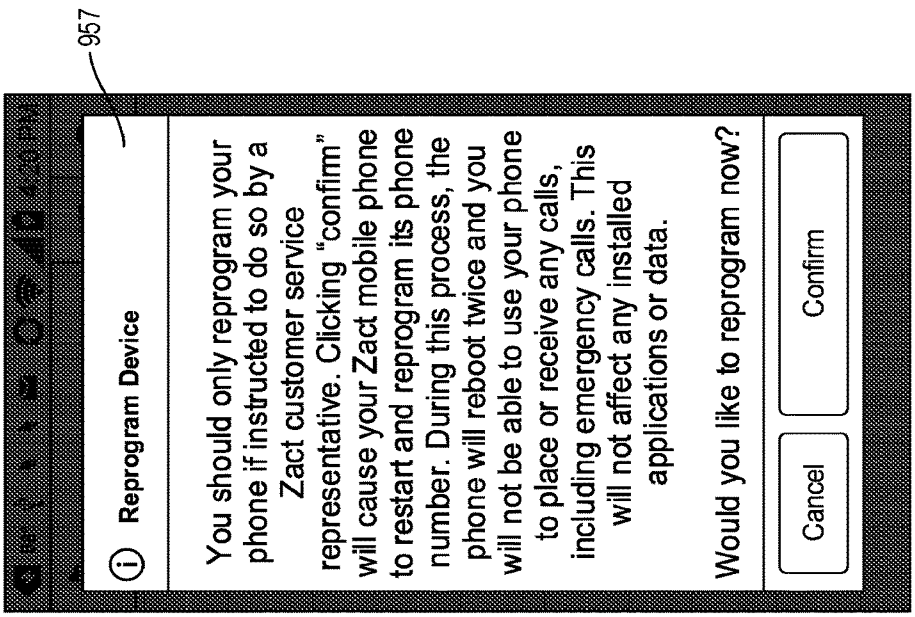

FIG. 160 illustrates a pop-up window/message presented through a touch-screen display of a wireless end-user device, in accordance with an exemplary embodiment, in response to a user selecting the "Reprogram Device" option of FIG. 156.

Figure 161:
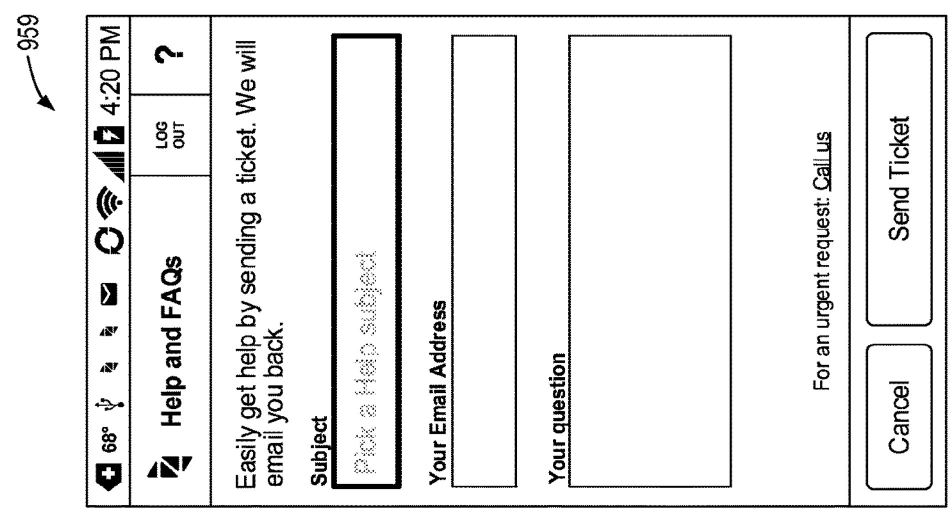

FIG. 161 illustrates a display screen presented through a touch-screen display of a wireless end-user device, in accordance with an exemplary embodiment, in response to a user selecting the "Contact Us" option of FIG. 156.

Figure 162:
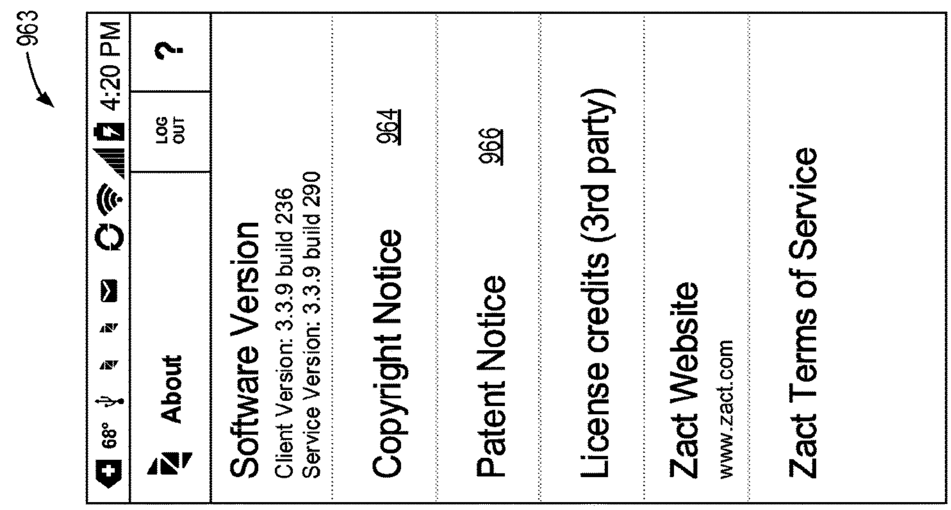

FIG. 162 illustrates a display screen presented through a touch-screen display of a wireless end-user device, in accordance with an exemplary embodiment, in response to a user selecting the "About" option of FIG. 156.

Figure 163:
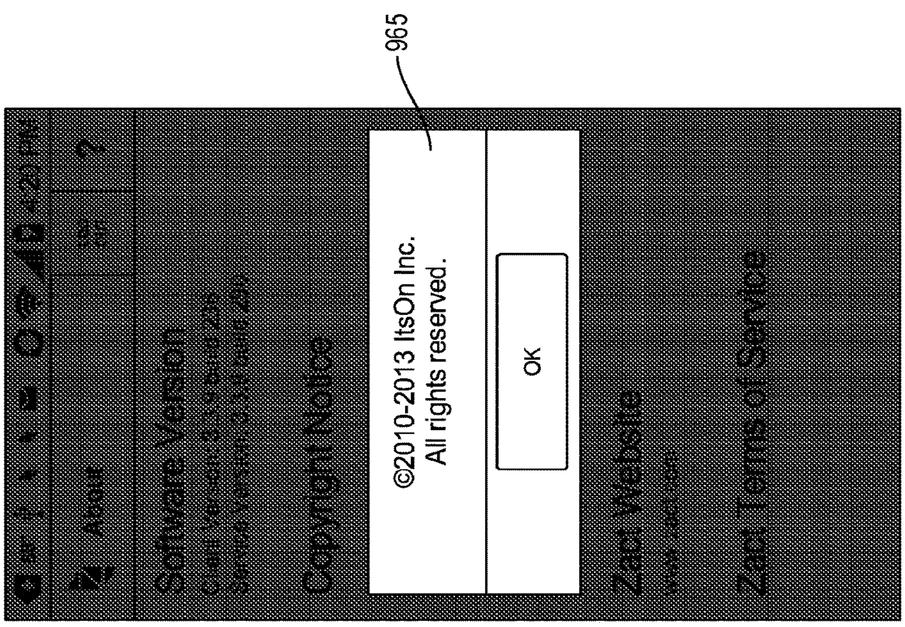

FIG. 163 illustrates a pop-up window/message presented through a touch-screen display of a wireless end-user device, in accordance with an exemplary embodiment, in response to a user selecting the "Copyright" option of FIG. 162.

Figure 164:
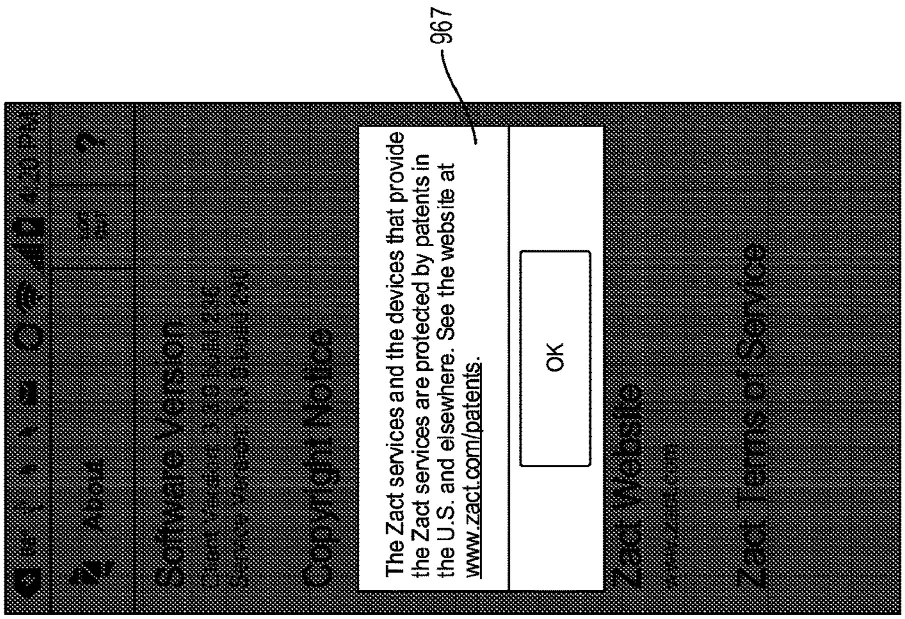

FIG. 164 illustrates a pop-up window/message presented through a touch-screen display of a wireless end-user device, in accordance with an exemplary embodiment, in response to a user selecting the "Patent Notice" region of FIG. 162.

Figure 165:
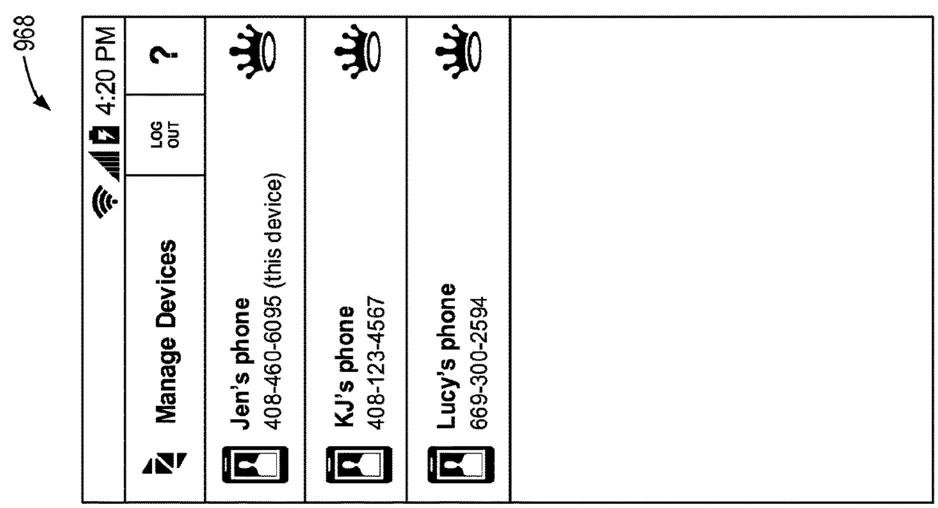

FIG. 165 illustrates a display screen presented through a touch-screen display of a first wireless end-user device in the device group, in accordance with an exemplary embodiment, in response to a user changing the name (nickname) of a second device in the device group.

Figure 166:
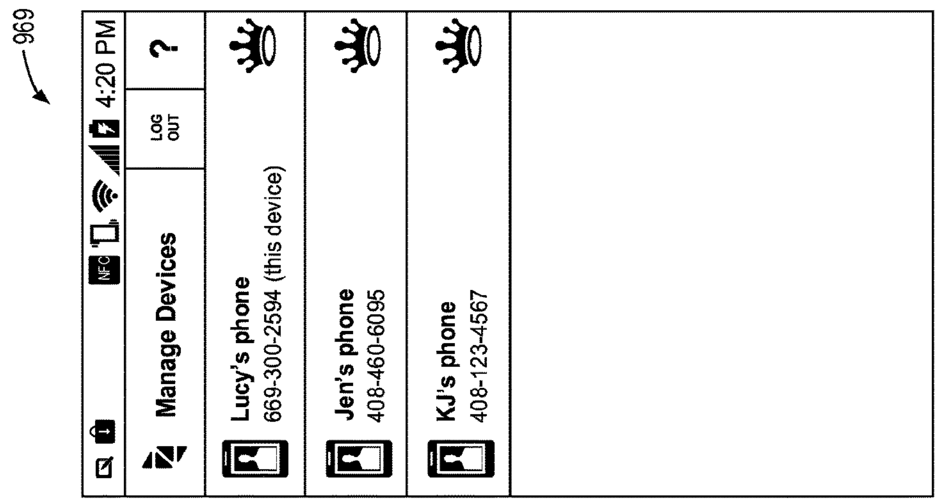

FIG. 166 illustrates a display screen presented through a touch-screen display of a third wireless end-user device, in accordance with an exemplary embodiment, in response to a user changing the name (nickname) of the second device in the device group.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With the development and increasing proliferation of mass market digital communications and content distribution, communication network capacity gains are being outpaced by growing digital networking demand. For example, some industry experts project average wireless device usage of four devices per subscriber, with a mixture of general purpose devices like smart phones and computers along with special purpose devices like music players, electronic readers, connected (e.g., networked) cameras and connected gaming devices. In addition, wire line user service consumption habits are trending toward very high bandwidth applications that can quickly consume the available capacity and degrade overall network service experience if not efficiently managed. Because some components of service provider costs go up with increasing bandwidth, this trend will also negatively impact service provider profits.

There is a need for a communication system and method that provides for flexible service plans and management of user network services to provide consumer choice of more refined service plan offerings and efficient management of network capacity.

Also, it is becoming increasingly important to more deeply manage the level of services delivered to networked devices to provide cost effective services that match growing digital networking usage patterns. For example, access providers can move away from only billing for basic access and move toward billing for higher level service delivery with example services including rich Internet access and email, application based billing, content distribution, entertainment activities, information or content subscription or gaming. In addition, a growing number of new special purpose and general purpose networked devices are fueling demand for new service plans, for example, tailored to the new device usage models (e.g., a special service plan for an e-book reader device).

As network capabilities grow and new networked device offerings grow, access network service providers will realize increasing value in opening up their networks to allow innovation and expanded offerings for network service consumers. However, opening up the networks to provide efficient third party definition of alternative service and billing models requires more flexible service and billing policy management solutions. For example, machine to machine applications such as telemetry, surveillance, shipment tracking and two way power control systems are example new applications that would require new offerings to make such available to network service customers. The need to customize service offerings for these new applications requires more efficient methods for defining, testing and launching new services with more refined control of service functions and service costs. In some embodiments, this means billing for different types of service elements, such as total traffic, content downloads, application usage, information or content subscription services, people or asset tracking services, real time machine to machine information or electronic commerce transactions.

Disclosed herein is a wireless end-user device, comprising one or more modems enabling the wireless end-user device to communicate with a network system over a wireless access network, a touch-screen user interface, and one or more processors configured to execute one or more instructions that, when executed by the one or more processors, cause the one or more processors to detect a user input through the touch-screen user interface, the user input comprising a request to remove the wireless end-user device from an existing device group account, the existing device group account being associated with one or more devices including the wireless end-user device, and send a message to the network system over the wireless access network, the message conveying the request to remove the wireless end-user device from the existing device group account. When executed by the one or more processors, the one or more instructions may also cause the one or more processors to present a notification through the touch-screen user interface, the notification comprising an offer to remove the wireless end-user device from the existing device group account, and the user input may comprise a response to the offer. When executed by the one or more processors, the one or more instructions may cause the one or more processors to obtain a credential through the touch-screen user interface, wherein the credential comprises a password associated with the existing device group account. When executed by the one or more processors, the one or more instructions may cause the one or more processors to send the credential or information representing or identifying the credential to the network system over the wireless access network. When executed by the one or more processors, the one or more instructions may cause the one or more processors to, before sending the message to the network system over the wireless access network, determine, based on the credential, that the request to remove the wireless end-user device from the existing device group account is authorized.

When executed by the one or more processors, the one or more instructions may further cause the one or more processors to present a notification through the touch-screen user interface, the notification comprising an offer to create a new device group account associated with the wireless end-user device. In some such cases, when executed by the one or more processors, the one or more instructions may further cause the one or more processors to obtain, through the touch-screen user interface, a user response to the offer, the user response accepting the offer to create the new device group account associated with the wireless end-user device. When executed by the one or more processors, the one or more instructions may further cause the one or more processors to send an indication of the user response to the network system. When executed by the one or more processors, the one or more instructions may further cause the one or more processors to receive a confirmation message from the network system over the wireless access network, the confirmation message confirming creation of the new device group account associated with the wireless end-user device. When executed by the one or more processors, the one or more instructions may further cause the one or more processors to obtain, through the touch-screen user interface, information associated with an account holder, the account holder to be associated with the new device group account, wherein the information associated with the account holder may comprise a name, an address, a password, a credential, or payment information. When executed by the one or more processors, the one or more instructions may further cause the one or more processors to send the information associated with the account holder to the network system over the wireless access network.

In some embodiments, the existing device group account is a first existing device group account, and, when executed by the one or more processors, the one or more instructions may further cause the one or more processors to present a notification through the touch-screen user interface, the notification comprising an offer to add the wireless end-user device to a second existing device group account. When executed by the one or more processors, the one or more instructions may further cause the one or more processors to obtain, through the touch-screen user interface, a user response to the offer, the user response accepting the offer to add the wireless end-user device to the second existing device group account. When executed by the one or more processors, the one or more instructions may further cause the one or more processors to send an indication of the user response to the network system. When executed by the one or more processors, the one or more instructions may further cause the one or more processors to receive a confirmation message from the network system over the wireless access network, the confirmation message confirming that the wireless end-user device has been added to the second existing device group account. When executed by the one or more processors, the one or more instructions may further cause the one or more processors to obtain, through the touch-screen user interface, a credential associated with the second existing device group account, where the credential may comprise a name, a physical address, an e-mail address, a password, payment information, or a code. The code may comprise a personal identification number (PIN), a sequence of digits, a bar code, or a quick response (QR) code. When executed by the one or more processors, the one or more instructions may further cause the one or more processors to send the credential to the network system over the wireless access network. When executed by the one or more processors, the one or more instructions may further cause the one or more processors to at least assist to a level of account control for the wireless end-user device based on the credential. In some such cases, the level of account control may be based on a level of security of the credential or a type of the credential. In some such cases, the level of account control is a first level when the credential is a password and a second level when the credential is a code, the first level being higher than the second level.

In some embodiments, a wireless end-user device, comprises one or more modems enabling the wireless end-user device to communicate with a network system over a wireless access network, a touch-screen user interface, and one or more processors configured to execute one or more instructions that, when executed by the one or more processors, cause the one or more processors to present a notification through the touch-screen user interface, the notification comprising an offer to add the wireless end-user device to an existing device group account, detect a user input through the touch-screen user interface, the user input accepting the offer to add the wireless end-user device to an existing device group account, and send a message to the network system over the wireless access network, the message conveying the request to add the wireless end-user device to the existing device group account.

In some embodiments, a method is performed by a network system, the method comprising receiving, from a wireless end-user device over a wireless access network, a request to add the wireless end-user device to an existing device group account, wherein the wireless end-user device is not associated with any other device group account, provisioning one or more network elements to add the wireless end-user device to the existing device group account. In some such embodiments, the network system also obtains a credential from the wireless end-user device and verifies the credential. The credential may be a personal identification number, a password, an e-mail address, or any other information identifying a device group account. In some embodiments, the network system sets a level of account control (e.g., a permission level) for the device based on a type of a level of security of the credential (e.g., based on whether the credential is a code, a password, etc.). In some such embodiments, the level of account control is lower or nonexistent if the credential is a code than when the credential is more secure, e.g., a password.

In some embodiments, the network system receives a request to remove the wireless end-user device from the existing device group account and, in response, provisions (or de-provisions) one or more network elements to remove the device from the existing device group account. The network system may send a message to the wireless end-user device, and/or to one or more other devices in the device group or outside of the device group, to confirm that the wireless end-user device has been removed from the existing device group.

In some embodiments, after the wireless end-user device has been removed from a first device group account, the network system receives a request from the wireless end-user device to add the wireless end-user device to a second device group account. In some embodiments, the network system provisions one or more network elements to add the wireless end-user device to the second device group account. The network system may send a message to the wireless end-user device, and/or to one or more other devices in the device group or outside of the device group, to confirm that the wireless end-user device has been added to the second device group.

In some embodiments, the network system may send notifications to the wireless end-user device or to other devices in the device group or outside of the device group, where the notifications may comprise information about usage of a service plan, levels of account control, permissions of users or devices, etc. In some such embodiments, the notification content may depend on the level of account control of the device receiving the notification message. In some embodiments, devices with lower levels of account control may receive only a subset or none of the information sent to devices with higher levels of account control.

In some embodiments, network user capacity is increased and user service costs are reduced by managing and billing for service consumption in a more refined manner (e.g., to satisfy network neutrality requirements). By managing service consumption in a user friendly manner, the overall service capacity required to satisfy the user device needs can be tailored more closely to the needs of a given user thereby reducing user service costs and increasing service provider profits. For example, managing service usage while maintaining user satisfaction includes service usage policy implementation and policy management to identify, manage and bill for service usage categories, such as total traffic consumption, content downloads, application usage, information or content subscription services, electronic commerce transactions, people or asset tracking services or machine to machine networking services. As described herein, service activity is used to refer to any service usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, SMS, IMS or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of verifiable service control policies. As will be apparent to one of ordinary skill in the art in view of the embodiments described herein, some embodiments identify various service activities for the purpose of decomposing overall service usage into finer subcategories of activities that can be verifiably monitored, categorized, cataloged, reported, controlled, monetized and used for end user notification in a manner that results in superior optimization of the service capabilities for various levels of service cost or for various types of devices or groups. In some embodiments, it will be apparent to one of ordinary skill in the art that the terms service activity or service usage are associated with categorizing and possibly monitoring or controlling data traffic, application usage, communication with certain network end points, or transactions, and it will also be apparent that in some embodiments the term service activity is intended to include one or more of the broader aspects listed above. The shortened term service usage can be used interchangeably with service activity, but neither term is intended in general to exclude any aspect of the other. In some cases, where the terms service usage or service activity are used, more specific descriptors such as traffic usage, application usage, website usage, and other service usage examples are also used to provide more specific examples or focus in on a particular element of the more encompassing terms.

In some embodiments, employing this level of service categorization and control is accomplished in a manner that satisfies user preferences. In some embodiments, employing this level of service categorization and control is accomplished in a manner that also satisfies government rules or regulations regarding open access, for example, network neutrality requirements. In some embodiments, service management solutions that also collect and/or report user or device service usage or service activity behavior to determine how best to meet the user's simultaneous desires for service quality and lower service costs are disclosed. For example, such monitoring and reporting are accomplished in a manner that includes approval by the user and in a manner that also protects the privacy of user information and service usage behavior or service activity history.

In some embodiments, a system and method is disclosed for increasing network user capacity for wireless networks in the face of increasing service demand per user by providing for a greater number of base stations, also sometimes referred to as access points, base terminals, terminal nodes or other well known acronyms, to be more easily and/or more cost effectively deployed. For example, to simplify the process of deploying base stations, the installation complexity and the network infrastructure required for the base station to obtain backhaul service to the various networks that users desire to connect with are reduced.

In some embodiments, dense base station deployments are simplified by reducing the requirement to aggregate or concentrate the base station traffic through a specific dedicated core network infrastructure, so that the base stations connect to the desired user networks through a more diverse set of local loop, back bone and core routing options. This approach also reduces network infrastructure equipment, installation and maintenance costs. In some embodiments, this is accomplished by distributing the network traffic policy implementation and control away from the core network by providing for more control for service policy implementation and management on the end user device and, in some embodiments, in the end user device with respect to certain service policies and the network (e.g., control plane servers) with respect to other service policies. For example, this approach facilitates connecting the base stations directly to the local loop Internet with a minimum of specific dedicated networking infrastructure.

In some embodiments, service and transaction billing event capture and logging are distributed to the device. For example, providing service and transaction billing event capture and logging at the device provides a greater capability to monitor, classify and control deeper aspects of service usage or service activity at the device as compared to the relatively less capability for the same in the network infrastructure (e.g., for certain traffic flows, such as encrypted traffic flows). Furthermore, billing at the device provides for very specialized with many different billing and service plans for different device and service usage or service activity scenario combinations without the problem of attempting to propagate and manage many different deep packet inspection (DPI) and traffic shaping profiles in the networking equipment infrastructure. For example, service billing at the device can provide for more sophisticated, more specialized and more scalable billing and service plans.

Another form of billing that needs improvement is electronic commerce transaction billing with device assisted central billing. Today, most central billing and content distribution models require either centralized content distribution maintained by the central service provider or central billing authority, or a centralized ecommerce website or portal traffic aggregation system controlled by the central service provider or central billing provider, or both. In such systems, content and transaction providers such as media providers, application developers, entertainment providers, transaction website providers and others must adapt their mainstream electronic offering and commerce systems, such as shopping experience websites, to fit within the various proprietary customized infrastructure and content storage solutions for ecommerce markets, such as BREW® (Binary Runtime Environment for Wireless from Qualcomm® Inc.), Symbian OS (from Symbian Software Ltd) and Apple iPhone 3G App Store (from Apple Inc.). This approach requires a large amount of unnecessary custom interface development and stifles open market creativity for HTTP, WAP or portal/widget based shopping destinations and experiences. As disclosed below, a superior approach includes device based transaction billing for an open ecosystem in which a central billing provider provides users and ecommerce transaction providers with a central billing solution and experience that does not require extensive custom development or ecommerce infrastructure interfacing.

In some embodiments, products that incorporate device assisted service policy implementation, network services and service profiles (e.g., a service profile includes a set of one or more service policy settings for the device for a service on the network) are disclosed, as described below. For example, aspects of the service policy (e.g., a set of policies/policy settings for the device for network services, typically referring to lower level settings, such as access control settings, traffic control settings, billing system settings, user notification settings, user privacy settings, user preference settings, authentication settings and admission control settings) that are moved out of the core network and into the end user device include, for example, certain lower level service policy implementations, service usage or service activity monitoring and reporting including, for example, privacy filtering, customer resource management monitoring and reporting including, for example, privacy filtering, adaptive service policy control, service network access control services, service network authentication services, service network admission control services, service billing, transaction billing, simplified service activation and sign up, user service usage or service activity notification and service preference feedback and other service capabilities.

As discussed below, product designs that move certain aspects of one or more of these service profile or service policy implementation elements into the device provide several advantageous solutions to the needs described above. For example, benefits of certain embodiments include the ability to manage or bill for a richer and more varied set of network services, better manage overall network capacity, better manage end user access costs, simplify user or new device service activation, simplify development and deployment of new devices with new service plans (e.g., service profile and billing/costs information associated with that service profile), equip central service providers with more effective open access networks for new third party solutions, simplify the equipment and processes necessary to deploy wireless base stations and simplify the core networking equipment required to deploy certain access networks.

As discussed below, there are two network types that are discussed: a central provider network and a service provider network. The central provider network generally refers to the access network required to connect the device to other networks. The central provider network generally includes the physical layer, the Media Access Control (MAC) and the various networking functions that can be implemented to perform authentication, authorization and access control, and to route traffic to a network that connects to the control plane servers, as discussed below. The service provider network generally refers to the network that includes the control plane servers. In some embodiments, a central provider network and a service provider network are the same, and in some embodiments, they are different. In some embodiments, the owner or manager of the central provider network and the owner or manager of the service provider network are the same, and in some embodiments, they are different.

In some embodiments, control of the device service policies is accomplished with a set of service control plane servers that reside in the access network or any network that can be reached by the device. This server based control plane architecture provides for a highly efficient means of enabling third party control of services and billing, such as for central carrier open development programs or Mobile Virtual Network Operator (MVNO) relationships. As device processing and memory capacity expands, moving to this distributed service policy processing architecture also becomes more efficient and economical. In some embodiments, several aspects of user privacy and desired network neutrality are provided by enabling user control of certain aspects of device based service usage or service activity reporting, traffic reporting, service policy control and customer resource management (CRM) reporting.

In many access networks, such as wireless access networks, bandwidth capacity is a valuable resource in the face of the increasing popularity of devices, applications and content types that consume more bandwidth. To maintain reasonable service profit margins, a typical present service provider practice is to charge enough per user for access to make service plans profitable for the higher bandwidth users. However, this is not an optimal situation for users who desire to pay less for lower bandwidth service usage or service activity scenarios.

Accordingly, in some embodiments, a range of service plan pricing can be enabled that also maintains service profitability for the service provider, for example, by providing a more refined set of management and control capabilities for service profiles. For example, this approach generally leads to service management or traffic shaping where certain aspects of a service are controlled down based on service policies to lower levels of quality of service. Generally, there are three problems that arise when these techniques are implemented. The first problem is maintaining user privacy preferences in the reporting of service usage or service activity required to set, manage or verify service policy implementation. This problem is solved in a variety of ways by the embodiments described below with a combination of user notification, preference feedback and approval for the level of traffic information the user is comfortable or approves and the ability to filter service usage or service activity, in some embodiments, specifically traffic usage or CRM reports so that only the level of information the user prefers to share is communicated. The second problem is satisfying network neutrality requirements in the way that traffic is shaped or services are managed. This problem is solved in a variety of ways as described in the embodiments described below by empowering the user to make the choices on how service usage, service activity, traffic usage or CRM data is managed down to control costs, including embodiments on user notification and service policy preference feedback. By allowing the user to decide how they want to spend and manage their service allowance or resources, a more neutral or completely neutral approach to network usage can be maintained by the service provider. The third problem is to help the user have an acceptable and enjoyable service experience for the lower cost plans that will result in much wider scale adoption of connected devices and applications but are more constrained on service activity usage or options or bandwidth or traffic usage. As lower cost service plans are offered, including plans where the basic connection service may be free, these service plans will require service provider cost controls to maintain profitability or preserve network capacity that result in lower limits on service usage or service activity. These lower service usage or service activity limit plans will result in more users who are likely run over service usage limits and either experience service shutdown or service cost overages unless they are provided with more capable means for assistance on how to use and control usage for the lower cost services. This problem is solved in a variety of ways with a rich collection of embodiments on user notification, service usage and cost projection, user notification policy feedback, user service policy preference feedback, and adaptive traffic shaping or service policy implementation. As described herein, some embodiments allow a wide range of flexible and verifiable service plan and service profile implementations ranging from examples such as free ambient services that are perhaps sponsored by transaction revenues and/or bill by account sponsored service partner revenues, to intermediately priced plans for basic access services for mass market user devices or machine to machine communication devices, to more expensive plans with very high levels of service usage or service activity limits or no limits at all. Several bill by account embodiments also provide for the cataloging of service usage that is not a direct benefit to end users but is needed for basic maintenance of the device control channels and access network connection, so that the maintenance traffic service cost can be removed from the user billing or billed to non-user accounts used to track or account for such service costs. These embodiments and others result in a service usage or service activity control capability that provides more attractive device and service alternatives to end users while maintaining profitability for service providers and their partners.

In some embodiments, the above described various embodiments for device based service policy and/or service profile communications control are implemented using network based service control, for example, for satisfying various network neutrality and/or privacy requirements, based on indication(s) received from the device (e.g., user input provided using the device UI using the service processor) and network based service control (e.g., using a DPI service monitor or DPC policy implementation and/or other network elements).

In some embodiments, a virtual network overlay includes a device service processor, a network service controller and a control plane communication link to manage various aspects of device based network service policy implementation. In some embodiments, the virtual network overlay networking solution is applied to an existing hierarchical network (e.g., for wireless services), and in some embodiments, is applied to simplify or flatten the network architecture as will be further described below. In some embodiments, the large majority of the complex data path network processing required to implement the richer service management objectives of existing hierarchical networks (e.g., for wireless services) are moved into the device, leaving less data path processing required in the edge network and in some cases even less in the core network. Because the control plane traffic between the service control servers and the device agents that implement service policies can be several orders of magnitude slower than the data plane traffic, service control server network placement and backhaul infrastructure is much less performance sensitive than the data plane network. In some embodiments, as described further below, this architecture can be overlaid onto all the important existing access network architectures used today. In some embodiments, this architecture can be employed to greatly simplify core access network routing and data plane traffic forwarding and management. For example, in the case of wireless networks, the incorporation of device assisted service policy implementation architectures can result in base stations that directly connect to the Internet local loop and the data traffic does not need to be concentrated into a dedicated core network. This results, for example, in a large reduction in backhaul cost, core network cost and maintenance cost. These cost savings can be re-deployed to purchase and install more base stations with smaller cells, which results in higher data capacity for the access network leading to better user experience, more useful applications and lower service costs. This flattened networking architecture also results in latency reduction as fewer routes are needed to move traffic through the Internet. In some embodiments, the present invention provides the necessary teaching to enable this powerful transformation of centralized network service architectures to a more distributed device based service architectures.

Device based billing can be compromised, hacked and/or spoofed in many different ways. Merely determining that billing reports are being received from the device, that the device agent software is present and properly configured (e.g., the billing agent is present and properly configured) is insufficient and easily spoofed (e.g., by spoofing the agent itself, providing spoofed billing reports using a spoofed billing agent or providing spoofed agent configurations). Accordingly, in some embodiments, verifiable device assisted and/or network based service policy implementation is provided. For example, verifiable service usage and/or service usage billing can be provided as described herein with respect to various embodiments.

While much of the below discussion and embodiments described below focus on paid service networks, those of ordinary skill in the art will appreciate that many of the embodiments also apply to other networks, such as enterprise networks. For example, the same device assisted network services that create access control services, ambient activation services and other service profiles can be used by corporate IT managers to create a controlled cost service policy network for corporate mobile devices. As another example, embodiments described below for providing end user service control can also allow a service provider to offer parental controls by providing parents with access to a website with a web page that controls the policy settings for the access control networking service for a child's device.

Network Architecture for Device Assisted/Based Service Control

Figure 1:
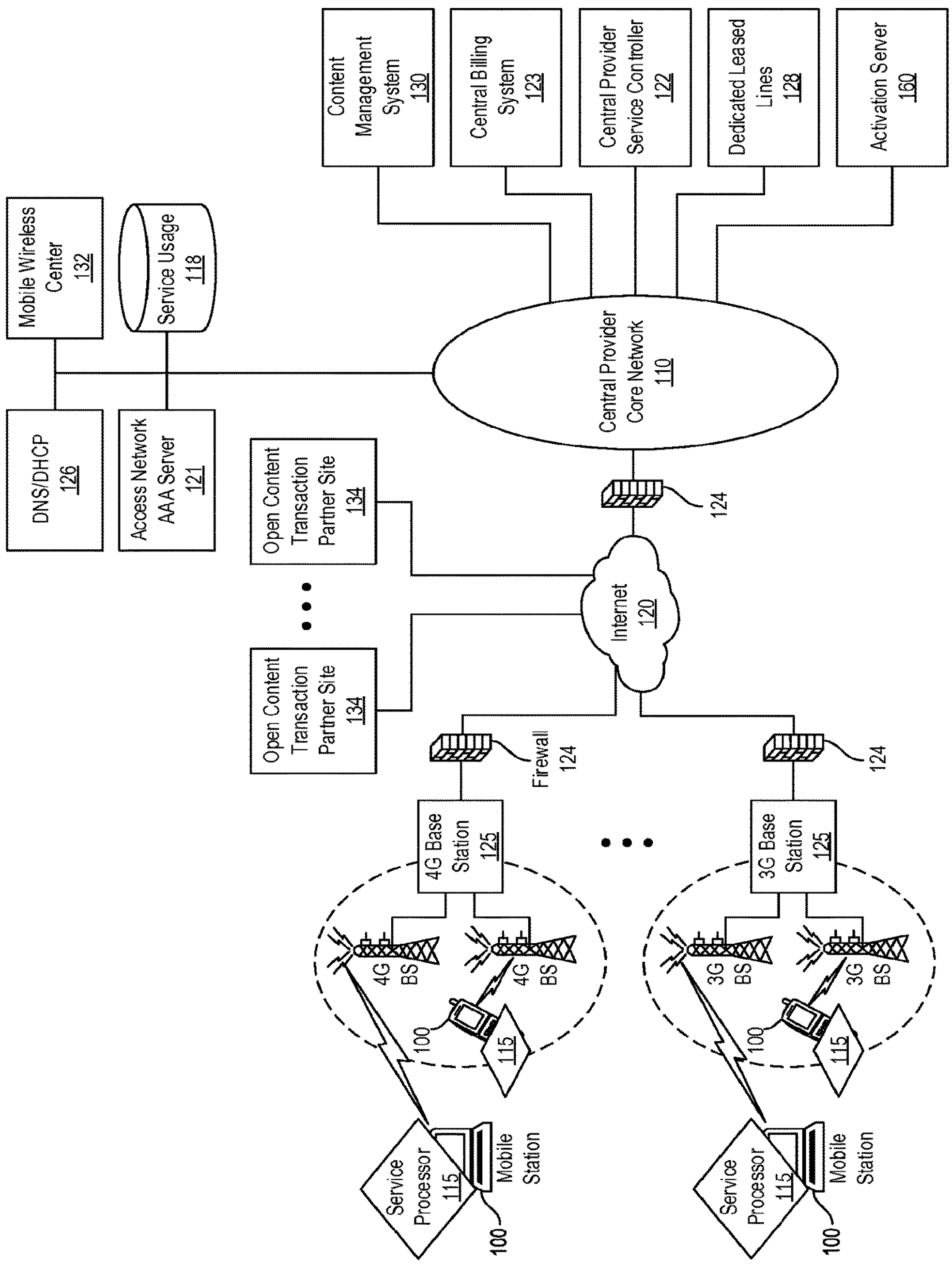
FIG. 1 illustrates a simplified (e.g., "flattened") network architecture in accordance with some embodiments.

FIG. 1 illustrates a simplified (e.g., "flattened") network architecture in accordance with some embodiments. As shown, this provides for a simplified service infrastructure that exemplifies a simplified and "flattened" network architecture in accordance with some embodiments that is advantageous for wireless network architectures. This also reduces the need for complex data path protocol interaction between the base station and network infrastructure. For example, in contrast to a complex edge and core network infrastructure connecting base stations to the central service provider network, as shown the base stations 125 are connected directly to the Internet 120 via firewalls 124 (in some embodiments, the base stations 125 include the firewall functionality 124). Accordingly, in some embodiments, a central provider network is no longer required to route, forward, inspect or manipulate data plane traffic, because data plane traffic policy implementation is conducted in the device 100 by the service processor 115. However, it is still an option, in some embodiments, to bring data plane traffic in from the base stations 125 to a central provider network using either open or secure Internet routing if desired. Base station control plane communication for access network AAA (Authentication, Authorization, and Accounting) server 121, DNS/DHCP (Domain Name System/Dynamic Host Configuration Protocol) server 126, mobile wireless center 132 (sometimes referenced to in part as a home location register (HLR) or other acronym) or other necessary functions are accomplished, for example, with a secure IP tunnel or TCP connection between the central provider network and the base stations. The base station 125 is used to refer to multiple base station embodiments where the base station itself is directly connected to the RAN, or where the base station connects to a base station controller or base station aggregator function that in turn connects to the RAN, and all such configurations are collectively referred to herein as base station 125 in FIG. 1 and most figures that follow that reference base station 125 as described below.

As shown, the central provider access network is both 3G and 4G capable, the devices 100 can be either 3G, 4G or multi-mode 3G and 4G. Those of ordinary skill in the art will also appreciate that in the more general case, the network could be 2G, 3G and 4G capable, or the device could be 2G, 3G and 4G capable with all or a subset of Global System for Mobile (GSM), General Packet Radio Service (GPRS), Code Division Multiple Access (CDMA) lx, High Speed Packet Access (HSPA), Evolution Data Optimized (EVDO), Long Term Evolution (LTE) and WiMax modem capability. If the devices are single mode, then the 3G devices 100 will be activated with a service profile applied to service processor 115 that is consistent with the 3G network capacity and speed, and the 4G devices will be activated with service profiles applied to service processor 115 that are consistent with 4G network capacity and speed. In both cases, the same service controller 122 manages services for both sets of devices in accordance with some embodiments. If the devices are multimode, then the service processor 115 can be activated with a dual mode service profile capability in which the service profile for 3G offers a similar rich set of services as the service profile for 4G but with, for example, scaled back bandwidth. For example, this approach is allows central providers to offer a richer set of service offerings with 3G and then migrate the same set of service offerings to 4G but with higher performance. In particular, this approach allows 3G to 4G rich service migration to occur, for example, with the only change being the increased bandwidth settings in the service profiles that will be available in 4G at the same cost as 3G with lower service profile bandwidth settings.

In some embodiments, if the devices are multimode, a network selection policy implementation within service processor 115 is provided, or in some embodiments, a network selection policy is driven by policy decisions made in service controller 122 based on service availability reports received from service processor 115. The network selection policy allows the selection of the network that corresponds to the most desirable service profile to meet the user's service preferences. For example, if the user specifies, within the framework of the service notification and user preference feedback embodiments described below, that maximum performance is the most important factor in selecting which access network to connect to, then the best profile is likely to be the 4G network as 4G is typically faster, except perhaps, for example, if the device 100 is closer to the 3G base station so that there is a much stronger signal or if the 4G network is much more heavily loaded than the 3G network. On the other hand, if the user preference set specifies cost as the most important factor, then depending on the central provider service costs the 3G network may prove to be the most desirable service profile. This is a simple example and many other selection criteria are possible in the network selection embodiment as discussed further below.

Network Based Service Usage Monitoring for Verification and Other Purposes

In some embodiments, if the base station data plane traffic is transmitted via the Internet 120 as discussed above, then IPDRs (Internet Protocol Detail Records, also sometimes and interchangeably referred to herein as Charging Data Records or CDRs, which as used herein refer to any network measure of service usage or service activity for voice and/or data traffic (e.g., IPDRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the IPDRs can be generated by one or more of the following: base station 125, RAN or transport gateways and AAA 121. In some access network embodiments, the IPDRs are transmitted to equipment functions that aggregated the IPDRs for the purpose of service billing and other functions. Aggregation can occur in the AAA, the transport gateways or other functions including the billing system 123. As discussed below, it is often the case that the IPDRs is assumed to be obtained from the AAA server 121 and/or a service usage data store 118 (e.g., a real-time service usage collection stored in a database or a delayed feed service usage collection stored in a database), or some other network function. However, this does not imply that the IPDRs may not be obtained from a variety of other network functions, and in some embodiments, the IPDRs are obtained from other network functions as disclosed herein. In some embodiments, existing IPDR sources are utilized to obtain network based service usage measures for multiple purposes including but not limited to service policy or profile implementation verification, triggering service verification error responds actions, and service notification synchronization. Certain types of IPDRs can be based on, or based in part on, what are sometimes referred to as CDRs (Charging Data Records, which can track charges for voice and data usage) or modifications of CDRs. Although the capability to monitor, categorize, catalog, report and control service usage or service activity is in general higher on the device than it is in the network, and, as described herein, device based service monitoring or control assistance is in some ways desirable as compared to network based implementations, as described herein many embodiments take advantage of network based service monitoring or control to augment device assisted service monitoring or control and vice versa. For example, even though many embodiments work very well with minimal IPDR service usage or service activity information that is already available in a network, deeper levels of IPDR packet inspection information in general enable deeper levels of service monitoring or service control verification, which can be desirable in some embodiments. As another example, deeper levels of network capability to control service usage or service activity can provide for more sophisticated error handling in some embodiments, for example, providing for more options of the Switched Port Analyzer (SPAN) and network quarantine embodiments as described herein. As another example, in some embodiments it is advantageous to take advantage of network based service monitoring or control for those service aspects the network is capable of supporting, while using device assisted service monitoring or control for the service aspects advantageously implemented on the device.

In some embodiments, where base station data plane traffic is backhauled and concentrated in a central provider core network 110, then the IPDRs can originate in the base stations or a router or gateway in the central provider network 110, and the IPDRs are collected at the AAA server 121 and stored in the service usage data store 118. In some embodiments, the central billing system 123 collects the IPDRs from the AAA server 121 for service billing accounting purposes. In some embodiments, a central billing system 123 collects the IPDRs directly from the initial IPDR source or some other aggregator. In some embodiments, outside partners like MVNOs gain access to the IPDRs from the central billing system 123. As discussed below, it is assumed that the IPDRs are obtained from the AAA server 121, and it is understood that the source of the IPDRs is interchangeable in the embodiments.

In some embodiments, the IPDR information is used by the service processor 115, the service controller 122 and/or other network apparatus or device apparatus to implement service control verification is provided as described below. In some embodiments, an IPDR feed (e.g., also referred to as a charging data record (CDR)) flows between network elements. For example, an IPDR feed can flow from the RAN gateway 410 (e.g., SGSN 410, BSC packet control 510 or RNC 512) and the transport gateway 420 (e.g., GGSN or PDSN). In other embodiments, the IPDRs originate and flow from the base station 125 or some other component/element in the network. In some embodiments, one or more of these IPDR feeds is transmitted to an IPDR aggregation function (e.g., also referred to as a charging gateway). For example, this aggregation function can be located in the AAA 121, in the mobile wireless center 132 (and/or in the home location register (HLR) or other similar function referred to by other common industry names), in the transport gateway 420, or in some other network element. This aggregation function collects the IPDR feeds into a database with an entry for each device 100. In some embodiments, an intermediate aggregation function is provided that feeds a higher level aggregation function, for example, the transport gateway 420 can receive IPDR feeds from the RAN gateway 410 or the base station 125 before sending them to another aggregation function. At some point in time (e.g., at the end of a specified time period, at the end of a device network connection session and/or at a specified time of day), the IPDR aggregation function sends summary information or detailed information of the IPDRs for a given device or group of devices to the billing system for billing and/or reconciliation. In some embodiments, in which the IPDR aggregation feed to the billing system is frequent enough for one or more of the IPDR information purposes described herein, the IPDR feed for the service controller 122 is derived from the aggregated feed, either by having the billing system 123 transmit it to the service controller 122, or by copying it from the IPDR aggregation function.

In some embodiments, the IPDR feed is obtained from the network function that is generating or aggregating the IPDR feed as described herein. In some embodiments, the IPDR feed is copied from the aggregation function in a manner that does not interrupt the operation of the network. For example, a switch based port analysis function can be used to copy the traffic to a traffic analysis or server element that filters out the IPDR traffic and records it to a data base that is then either pushed to the service controller 122 (or any other network element that uses IPDR information as described herein), or is queried by the service controller 122 (or any other function that uses the IPDR information as described herein). In some embodiments, if the aggregated IPDR information transmitted to the billing system is delayed from real-time traffic usage events by an amount of time that is, for example, too long for desired operation, or for any other reason that makes it less desirable to obtain the IPDR information from the same aggregated feed used for the billing system 123, the IPDR information can be collected from one or more of the sources discussed above including, for example, from another aggregation point (e.g., the feed to the charging gateway, AAA server and/or mobile wireless center/HLR), one or more of the gateways 410, 420, 508, 512, 520, 608, 612, 620, 708, 712, 720 the base station 125 and/or another network element. In some embodiments, the IPDR feeds from these or other network functions are copied to a database as described above, which is either pushed or queried to get the information to the service controller 122 or other network elements that request the IPDR information.

In some embodiments, the service processor 115 includes various components, such as device agents, that perform service policy implementation or management functions. In some embodiments, these functions include service policy or implementation verification, service policy implementation tamper prevention, service allowance or denial, application access control, traffic control, network access control services, various network authentication services, service control plane communication, device heartbeat services, service billing, transaction billing, simplified activation services and/or other service implementations or service policy implementations. It will be apparent to those of ordinary skill in the art that the division in functionality between one device agent and another is a design choice, that the functional lines can be re-drawn in any technically feasible way that the product designers see fit, and that the placing divisions on the naming and functional breakouts for device agents aids in understanding, although in more complex embodiments, for example, it can make sense to the product designer to break out device agent functionality specifications in some other manner in order to manage development specification and testing complexity and workflow.

In some embodiments, network control of the service policy settings and services as discussed above is accomplished with the service controller 122 which in various embodiments includes one or more server functions. As with the service processor 115 agent naming and functional break out, it is understood that service controller 122 server naming and functional breakout is also a design choice and is provided mainly to aid in the discussion. It will be apparent to those of ordinary skill in the art that the server names and functional breakouts do not imply that each name is an individual server, and, for example, a single named function in the various embodiments can be implemented on multiple servers, or multiple named functions in the various embodiments can be implemented on a single server.

As shown, there are multiple open content transaction partner sites 134 (e.g., open content transaction servers), which represent the websites or experience portals offered by content partners or ecommerce transaction partners of the service provider. For example, transaction servers 134 can provide an electronic commerce offering and transaction platform to the device. In some embodiments, the central provider has ownership and management of the service controller 122, so the central provider and the service provider are the same, but as discussed below the service provider that uses the service controller 122 to manage the device services by way of service processor 115 is not always the same as the central provider who provides the access network services.

In some embodiments, further distribution of central provider access networking functions such as access network AAA server 121, DNS/DHCP server 126, and other functions are provided in the base stations 125. In some embodiments, network based device service suspend/resume control are also provided in the base stations 125 (or in some embodiments, for hierarchical or overlay networks, this function is provided by one or more of the following: RAN gateways, transport gateways, AAA 121 or some other network function). As shown, the following are connected (e.g., in network communication with) the central provider network 110: central provider billing system 123, dedicated leased lines 128 (e.g., for other services/providers), central provider service controller 122, a content management (e.g., content switching, content billing, and content catching) system 130, central provider DNS/DHCP server 126, access network AAA server 121, service usage data store 118 and central provider mobile wireless center 132. These embodiments may be advantageous particularly for flat networks as that shown in FIG. 1 that are provided by the present invention.

In some embodiments, the base stations 125 implement a firewall function via firewall 124 and are placed directly onto the local loop Internet for backhaul. Voice traffic transport is provided with a secure protocol with Voice Over IP (VOIP) framing running over a secure IP session, for example, Virtual Private Network (VPN), IP Security (IPSEC) or another secure tunneling protocol. In some embodiments, the VOIP channel employs another layer of application level security on the aggregated VOIP traffic trunk before it is placed on the secure IP transport layer. Base station control traffic and other central provider traffic can be provided in a number of ways with secure transport protocols running over Transmission Control Protocol (TCP), Internet Protocol (IP) or User Datagram Protocol (UDP), although TCP provides a more reliable delivery channel for control traffic that is not as sensitive to delay or jitter. One example embodiment for the control channel is a control link buffering, framing, encryption and secure transport protocol similar to that described below for the service control link between a device and the network. In some embodiments, a service control heartbeat function is provided to the base stations 125 similar to that implemented between the service controller 122 and the service processor 115 as described below. If the need to maintain a bandwidth efficient control plane channel between the base stations and the central provider base station control network is not as critical as it is in the case of access network connection to the device, then there are many other approaches for implementing a secure control channel over the Internet including, for example, one or more of various packet encryption protocols running at or just below the application layer, running TCP Transport Layer Security (TLS), and running IP level security or secure tunnels.

In some embodiments, the device based services control plane traffic channel between the service processor 115 and the service controller 122 is implemented over the same control plane channel used for the flat base station control architecture, or in some embodiments, over the Internet. As discussed below, it is assumed that the device bases services control plane channel for service processor 115 to service controller 122 communications is established through the Internet 120 or through the access network using IP protocols as this is the more general case and applies to overlay network applications for various embodiments as well as applications where various embodiments are used to enable flattened access networks.

In some embodiments, by enabling the device to verifiably implement a rich set of service features as described herein, and by enabling the base station 125 to connect directly to the Internet 120 with a local firewall for device data traffic, tunnel the voice to a voice network with VOIP and secure Internet protocols, and control the base station 125 over a secure control plane channel using base station control servers located in a central provider network, base stations 125 can be more efficiently provisioned and installed, because, for example, the base station 125 can accommodate a greater variety of local loop backhaul options. In such embodiments, it is advantageous to perform certain basic network functions in the base station 125 rather than the central provider network.

In some embodiments, a basic device suspend/resume function for allowing or disallowing the device Internet access is provided by the base stations 125 (or in some embodiments, for hierarchical or overlay networks in some embodiments this function is provided by one or more of the following: RAN gateways, transport gateways, AAA 121 or some other network function). This functionality, as will be discussed below, is important for certain embodiments involving taking action to resolve, for example, service policy verification errors. In some embodiments, this function is performed at the base station (e.g., base stations 125) thereby eliminating the need for a more complex networking equipment hierarchy and traffic concentration required to perform the suspend/resume function deeper in the network. Access network base stations control media access and are therefore designed with awareness of which device identification number a given traffic packet, group of packets, packet flow, voice connection or other traffic flow originates from and terminates to. In some embodiments, the suspend/resume function is implemented in the base station 125 by placing an access control function in the traffic path of each device traffic flow. The suspend resume function can be used by various network elements, and in the context of the present embodiment can be used by the service controller 122 (e.g., in some embodiments, access control integrity server 1654 (FIG. 16) of service controller 122 or other service controller elements) to suspend and resume device service based on the assessment of the service policy implementation verification status as described below.

In some embodiments, at least a basic traffic monitoring or service monitoring function is performed at the base station (e.g., base stations 125) similar to the service history records or IPDRs collected deeper in the network in more conventional hierarchical access network infrastructure architectures. For example, the service or traffic monitoring history records are advantageous for tracking device network service usage or service activity behavior and for certain verification methods for device based service policy implementation or higher device based services as discussed below. In some embodiments, a traffic monitoring function is provided in the base station 125 in which the traffic for each device is at least counted for total traffic usage and recorded. In some embodiments, traffic inspection beyond simply counting total traffic usage is provided. For example, the base station traffic monitor can record and report IP addresses or include a DNS lookup function to report IP addresses or IP addresses and associated Uniform Resource Locators (URLs). Another example allows the base station 125 to attach location data to the IPDR to provide device location data in the records. In some embodiments, traffic inspection includes recording deeper levels of traffic or service monitoring.

In some embodiments, device traffic associated with service verification conditions indicating service usage is out of policy or profile limits or allowances is routed to a quarantine network rather than or as an initial alternative to a suspending service. For example, the advantages for this approach and a more detailed description of the quarantine network are discussed below. In some embodiments, the quarantine network capability is provided for in which rather than simply suspending device traffic completely from the network as described above, the base station 125 includes a firewall function (e.g., firewall 124) that is capable of passing device access traffic with the quarantine network destinations and blocking device access to all other destinations. In some embodiments, when it is discovered that service verification conditions indicate that service usage is out of policy or profile limits or allowances, then one or more of the following actions are taken: the user is notified of the overage condition, the user is required to acknowledge the overage condition, the user account is billed for the overage condition, and the device is flagged for further analysis by a network device analysis function or a network manager.

In some embodiments, network complexity is reduced using the device without moving completely to a flat base station network as described above. Device participation in the core network services implementation provides for numerous measures for simplifying or improving network architecture, functionality or performance. For example, two approaches are discussed below ranging from a simple overlay of the service processor 115 onto devices and the service controller 122 in a conventional hierarchical access network as illustrated in FIGS. 4 through 7, to a completely flat network as illustrated in FIGS. 1 through 3 and 8. Those of ordinary skill in the art will appreciate that the disclosed embodiments provided herein can be combined with the above embodiments and other embodiments involving flat network base stations to provide several advantages including, for example, richer service capability, less access network complexity, lower access network expenses, more flexible base station deployments, or less complex or less expensive base station back haul provisioning and service costs.

Figure 16:
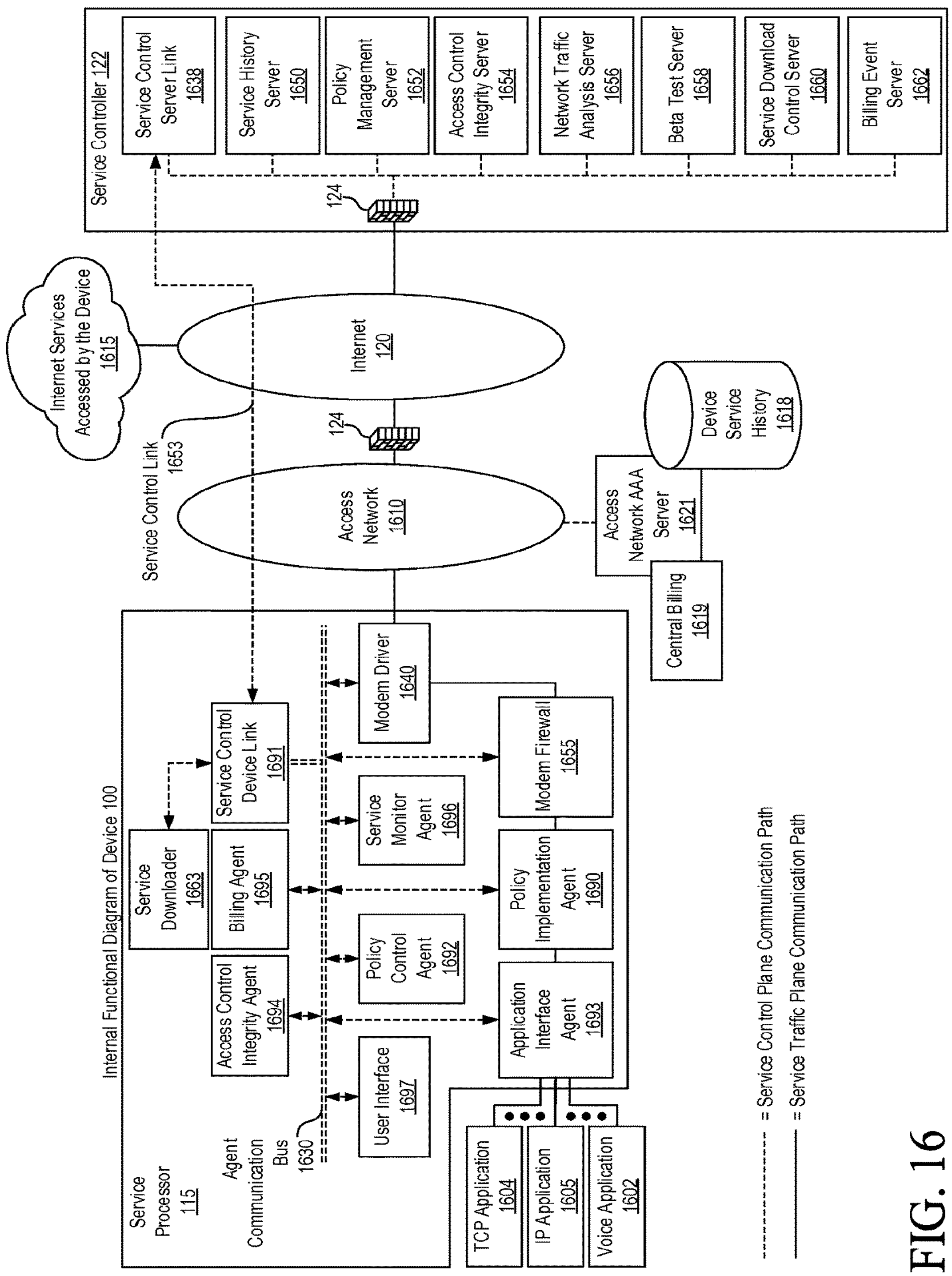
FIG. 16 is a functional diagram illustrating a device based service processor and a service controller in accordance with some embodiments.

In most of the discussion that follows, the network based service history records and the network based suspend-resume functionality used in certain embodiments involving service implementation verification are assumed to be derived from the device service history 1618 (as shown in FIG. 16) central provider network element and the AAA server 121 central provider network element, and in some embodiments, working in conjunction with other central provider network elements. It is understood that these functions provided by the network can be rearranged to be provided by other networking equipment, including the base station as discussed above. It is also understood that the network based device traffic monitoring, recording and reporting to the device service history 1618 element can be accomplished at the base stations. Furthermore, it is understood that while the AAA server 121 is assumed to provide the suspend/resume functionality, quarantine network routing or limited network access called for in some embodiments, the AAA server 121 can be a management device in which the actual implementation of the traffic suspend/resume, firewall, routing, re-direction forwarding or traffic limiting mechanisms discussed in certain embodiments can be implemented in the base stations as discussed above or in another network element.

In some embodiments, an activation server 160 (or other activation sequencing apparatus) provides for provisioning, as described below, of the devices 100 and/or network elements in the central provider network so that, for example, the device credentials can be recognized for activation and/or service by the network. In some embodiments, the activation server 160 provides activation functions, as described below, so that, for example, the devices can be recognized by the network, gain access to the network, be provided with a service profile, be associated with a service account and/or be associated with a service plan. As shown in FIG. 1, the activation server 160 is connected to the central provider core network 110. In this configuration, the activation server 160 acts as, an over the network or over the air, activation function. In some embodiments, the activation server 160, or variations of the activation server 160 as described below, is connected to apparatus in the manufacturing or distribution channel, or over the Internet 120, or as part of the service controller 122 to service provisioning or activation functions. In some embodiments, the activation server 160 is connected to the central provider core network 110. In some embodiments, the activation server 160 is connected to other network extensions such as an MVNO network or the Internet 120 if, for example, the routers in the service gateways or base stations have the capability to direct traffic from devices that are not fully activated or provisioned to an Internet destination, or if the service processor 115 is used for such direction. In some embodiments, the activation server 160 is included in the service controller 122.

Figure 2:
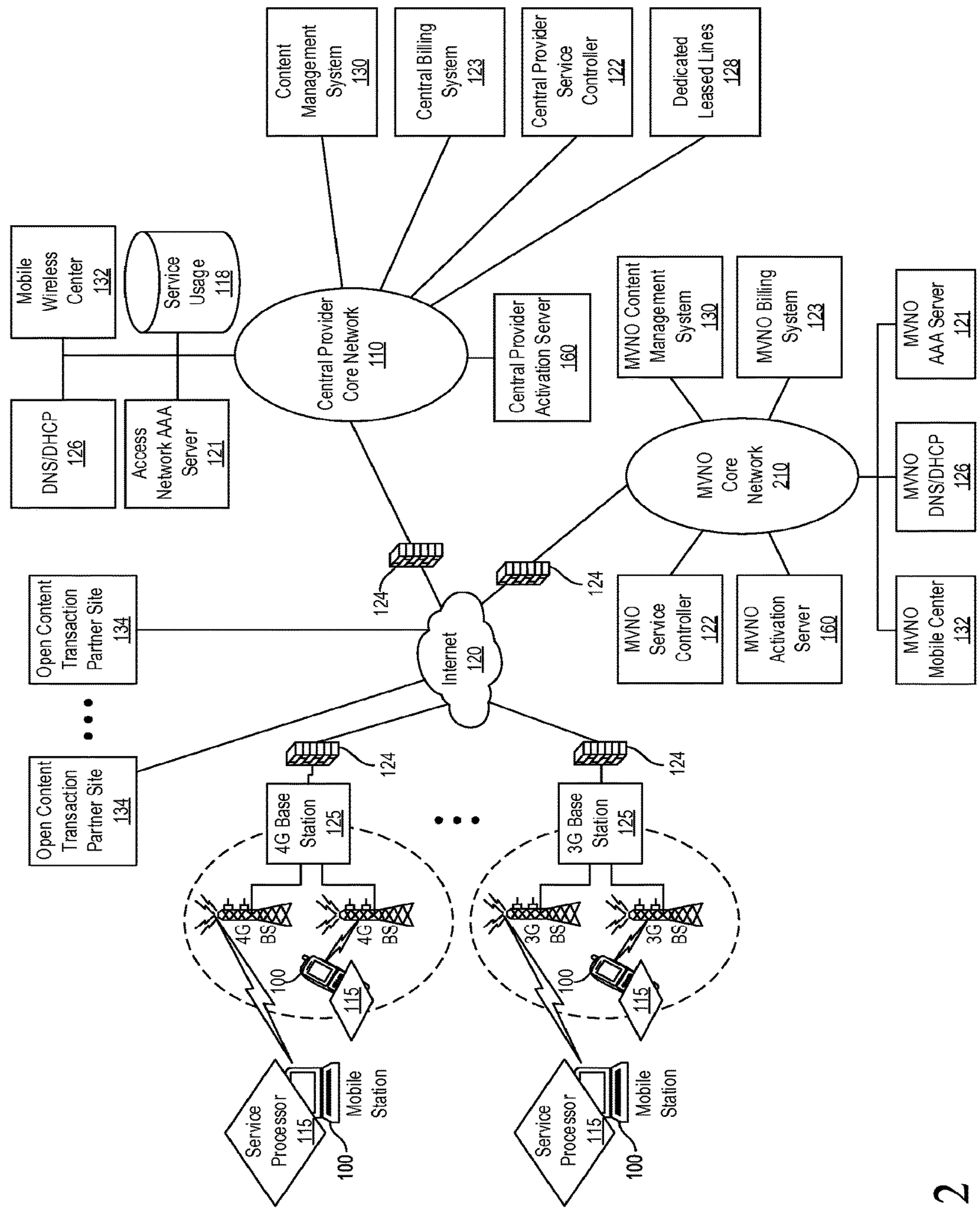
FIG. 2 illustrates another simplified (e.g., "flattened") network architecture including an MVNO (Mobile Virtual Network Operator) relationship in accordance with some embodiments.

FIG. 2 illustrates another simplified (e.g., “flattened”) network architecture including an MVNO (Mobile Virtual Network Operator) relationship in accordance with some embodiments. As shown, an open MVNO configuration is provided in a simplified network as similarly described above with respect to FIG. 1. In some embodiments, the service provider (e.g., service owner) is defined by the entity that maintains and/or manages the service controller 122 associated with and controlling the service processors 115 that are inside the devices 100 using the service. In some embodiments, the service controller 122 requires only a non-real time relatively low data rate secure control plane communication link to the service processors 115. Accordingly, in some embodiments, the service controller 122 servers can reside in any network that can connect to (e.g., be in network communication with) the Internet 120. For example, this approach provides for a more efficient provisioning of the equipment used to set up an MVNO partnership between the central provider and the service provider, and as shown in FIG. 2, an MVNO network 210 is in network communication with the Internet 120 just as with the central provider network 110 is in network communication with the Internet 120. As shown, the following are connected to (e.g., in network communication with) the MVNO core network 210: MVNO billing system 123, MVNO service controller 122, MVNO content management system 130, MVNO DNS/DHCP server 126, MVNO AAA server 121, and MVNO mobile wireless center 132.

By showing two service controllers 122, one connected to (e.g., in network communication with) the MVNO network 210 and one connected to the central provider network 110, FIG. 2 also illustrates that some embodiments allow two entities on the same access network to each use the service controller 122 and service processor 115 to control different devices and offer different or similar services. As described below, the unique secure communication link pairing that exists between the two ends of the service control link, 1691 and 1638 (as shown in FIG. 16), ensure that the two service controllers 122 can only control the devices associated with the correct service provider service profiles.

Figure 3:
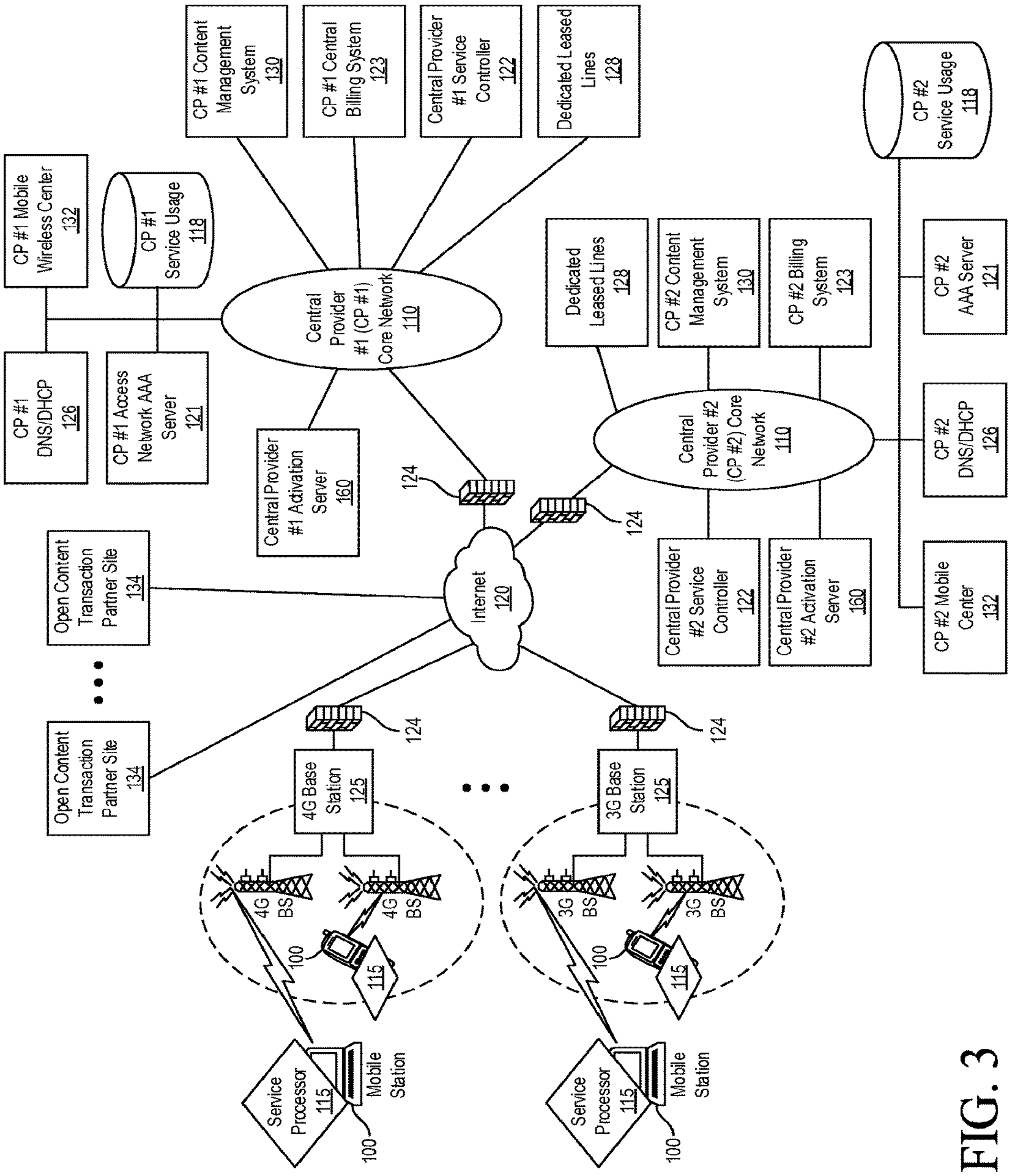
FIG. 3 illustrates another simplified (e.g., "flattened") network architecture including two central providers in accordance with some embodiments.

FIG. 3 illustrates another simplified (e.g., “flattened”) network architecture including two central providers in accordance with some embodiments. For example, this provides for roaming agreements while maintaining rich services across different networks with completely different access layers. As shown, the mobile devices 100 are assumed to have a dual mode wireless modem that will operate on both a 4G network, for example LTE or WiMax, and a 3G network, for example HSPA or EVDO. One example roaming condition would be both Central Provider #1 and Central Provider #2 providing 3G and 4G network resources. In this example, the mobile devices 100 can connect to both 3G and 4G base stations 125 owned and operated by the central provider with whom they have signed up for service, or when neither is available from the central provider the user signed up with the device can roam onto the other central provider access network and still potentially offer the same rich service set using the same service profiles provided, for example, the roaming service costs are reasonable. In some embodiments, if roaming service costs are significantly more expensive than home network service costs, then the service processor 115 is configured with a roaming service profile that reduces or tailors service usage or service activity through a combination of one or more of user notification, user preference feedback regarding traffic shaping or service policy management preference collected and acted on by service processor 115, adaptive policy control in service processor 115 that tracks increasing roaming service costs and scales back service, or recognition of the change in network that causes the service controller 122 to configure service processor 115 of device 100 with a roaming service profile. In some embodiments, in roaming situations, network selection can be based on an automatic network selection with network selection being determined, for example, by a combination of user service profile preferences, service provider roaming deals and/or available roaming network capabilities and cost, as discussed further below.

In some embodiments, the devices 100 are again assumed to be multimode 3G and 4G devices (e.g., the mobile devices 100 are assumed to have a dual mode wireless modem that will operate on both a 4G network, for example LTE, and a 3G network, for example HSPA or EVDO), with the devices 100 being billed for service by Central Provider #1 being, for example, EVDO and LTE capable, and the devices 100 being billed for service by Central Provider #2 being, for example, HSPA and LTE capable. For example, the devices 100 can roam using the 4G LTE network of the roaming central provider when neither the 3G nor 4G networks are available with the home central provider. As similarly discussed above with respect to the above described roaming embodiments, the service processors 115 and service controllers 122 are capable of providing similar services on the 4G roaming network and the 3G home network as on the 4G home network, however, the varying costs and available network capacity and speed differences of 3G home, 4G roaming and 4G home may also encourage the use of different, such as three different, service profiles to allow for the most effective and efficient selection and control of services based on the current network.

Figure 4:
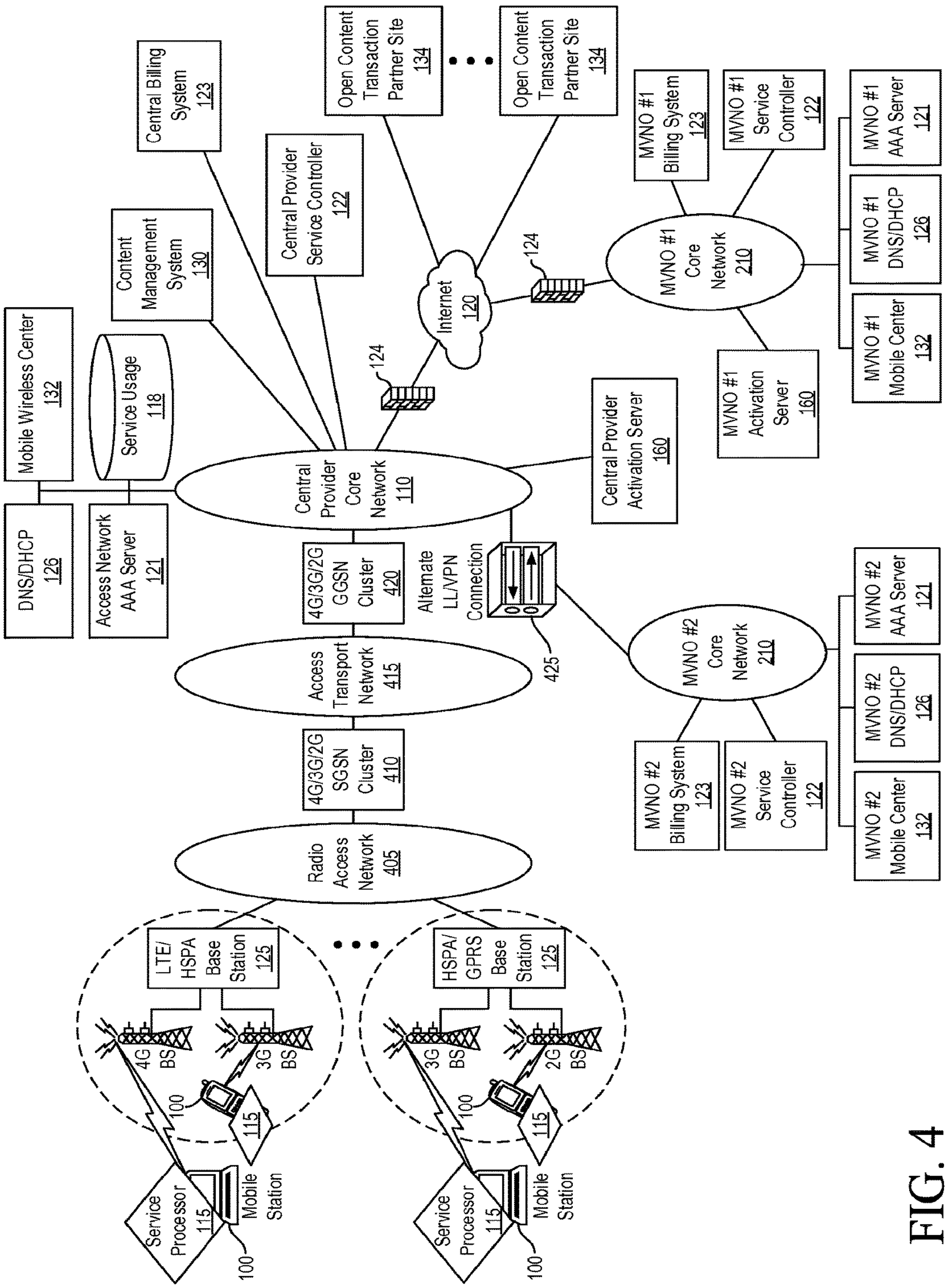
FIG. 4 illustrates a network architecture including a Universal Mobile Telecommunications System (UMTS) overlay configuration in accordance with some embodiments.

FIG. 4 illustrates a network architecture including a Universal Mobile Telecommunications System (UMTS) overlay configuration in accordance with some embodiments. As shown, FIG. 4 includes a 4G/3G/2G HSPA/Transport access network operated by a central provider and two MVNO networks 210 operated by two MVNO partners. In some embodiments, the central provider can offer improved service capabilities using a conventional UMTS network. As shown, the base stations 125 do not connect directly to the Internet 120, and instead the base stations 125 connect to the conventional UMTS network. However, as in various previous embodiments, the service processor 115 still connects through the secure control plane link to service controller 122. In some embodiments, the data plane traffic is backhauled across the various UMTS network routers and gateways as is the control plane traffic, and the IPDRs are obtained from the access network AAA server 121. Referring now to the 4G/3G/2G HSPA/Transport access network as shown in FIG. 4, the LTE/HSPA and HSPA/GPRS base stations/nodes 125 are in communication with 4G/3G/2G Service/Serving GPRS Support Nodes (SGSNs) cluster 410 via a radio access network 405, which are in communication with 4G/3G/2G Gateway GPRS Support Nodes (GGSNs) cluster 420 via an access transport network 415 (e.g., a GPRS-IP network), which are then in communication with central provider core network 110.

As shown in FIG. 4, as discussed elsewhere, service usage data store 118 is a functional descriptor for a network level service usage information collection and reporting function located in one or more of the networking equipment boxes attached to one or more of the sub-networks in the figure (e.g., RAN, transport and/or core networks). As shown in FIG. 4, service usage 118 is shown as an isolated function connected to the central provider core network 110 and the intention of this depiction is to facilitate all the possible embodiments for locating the service usage 118 function. In some UMTS network embodiments, the service usage 118 function is located or partially located in the GGSN gateway (or gateway cluster) 420. In some embodiments, service usage 118 functionality is located or partially located in the SGSN gateway (or gateway cluster) 410. In some embodiments, service usage 118 functionality is located or partially located in the equipment cluster that includes the AAA 121 and/or the mobile wireless center 132. In some embodiments, service usage 118 functionality is located or partially located in the base station, base station controller and/or base station aggregator, collectively referred to as base station 125 in FIG. 4 and many other figures described herein. In some embodiments, service usage 118 functionality is located or partially located in a networking component in the transport network 415, a networking component in the core network 110, the billing system 123 and/or in another network component or function. This discussion on the possible locations for the network based service usage history logging and reporting function can be easily generalized to all the other figures described herein by one of ordinary skill in the art (e.g., RAN Gateway 410 and/or Transport Gateway 420), and this background will be assumed even if not directly stated in all discussion above and below.

In some embodiments, a central provider provides open development services to MVNO, Master Value Added Reseller (MVAR) and/or Original Equipment Manufacturer (OEM) partners. In some embodiments, all three service providers, central provider service provider, MVNO #1 service provider and MVNO #2 service provider have service control and billing control of their own respective devices 100 through the unique pairing of the service processors 115 and service controllers 122. For example, MVNO #1 and MVNO #2 can each have open development billing agreements with the central provider and each can own their respective billing systems 123. As shown in FIG. 4, MVNO #1 core network 210 is in communication with the central provider core network 110 via the Internet 120, and MVNO #2 core network 210 is in communication with the central provider core network 110 via an alternate landline (LL)/VPN connection 425. In some embodiments, the two MVNOs each offer completely different devices and/or services, and the devices and/or services also differ significantly from those offered by the central provider, and the service profiles are adapted as required to service the different devices and respective service offerings. In addition, the central billing system 123 allows all three service provider user populations to access ecommerce experiences from transaction provider partners operating transaction servers 134, to choose central provider billing options that combine their third party transaction bills on their service provider bill, and each subscriber population can experience a service provider specified look and feel that is unique to the respective service provider even though the different user populations are interfacing to the same transaction servers and the transaction partners do not need to require significant custom development to provide the unique central billing and unique consistent user experience look and feel.

In some embodiments, a central provider offers open network device and service developer services using one service controller server 122 (e.g., a service controller server farm) and allows the open development partners to lease server time and server tools to build their own service profiles. The central provider also provides service billing on behalf of services to the open development partners. For example, this reduces costs associated with setting up an MVNO network for the open development partners and does not require the partners to give up significant control or flexibility in device and/or service control.

Figure 5:
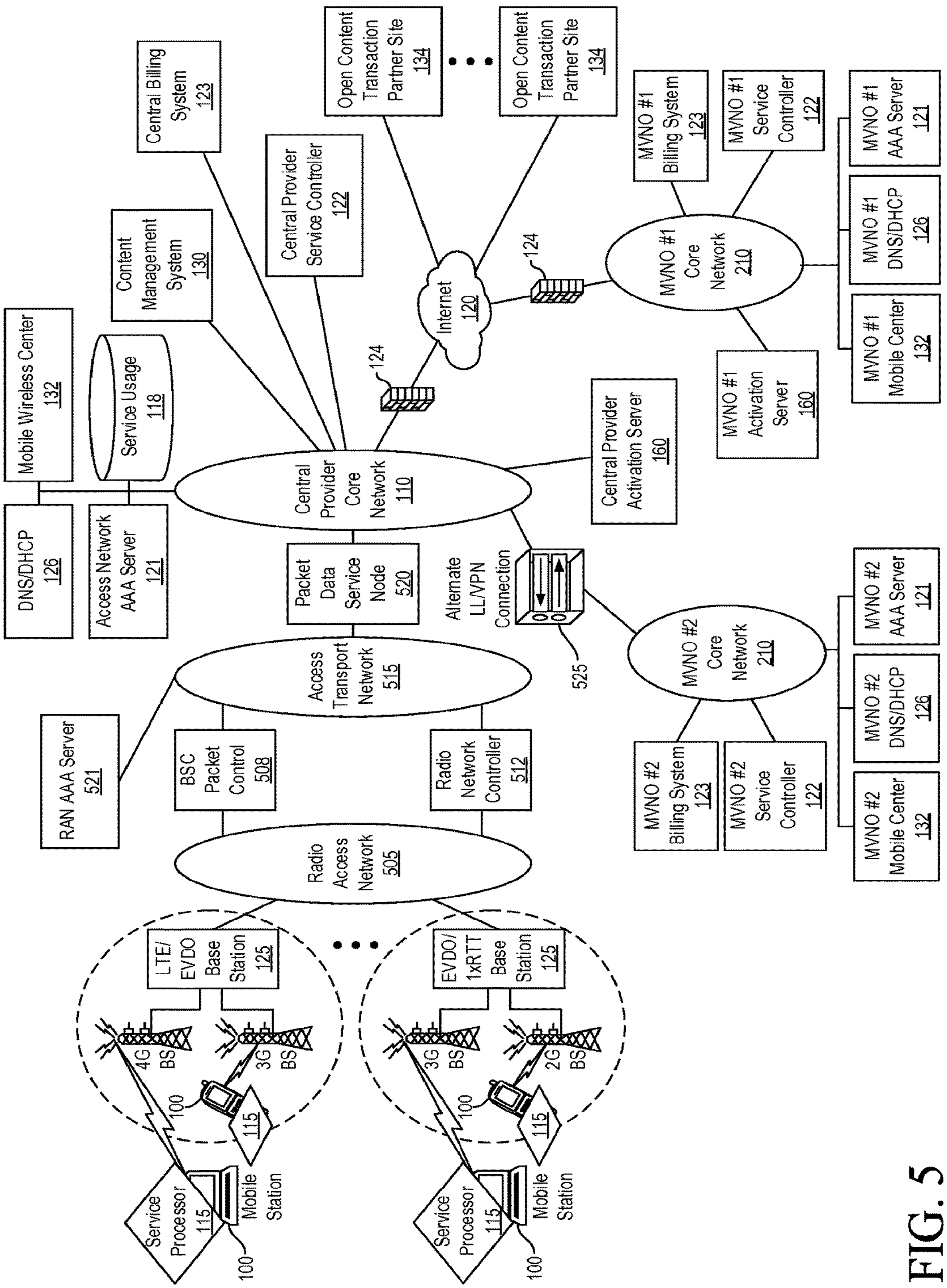
FIG. 5 illustrates a network architecture including an Evolution Data Optimized (EVDO) overlay configuration in accordance with some embodiments.

FIG. 5 illustrates a network architecture including an Evolution Data Optimized (EVDO) overlay configuration in accordance with some embodiments. This figure is similar to FIG. 4 except for the various particular variations of the EVDO network architecture as compared to the HSPA/GPRS wireless access network architecture as will be apparent to one of ordinary skill in the art. As shown, FIG. 5 includes an EVDO access network operated by a central provider and two MVNO networks 210 operated by two MVNO partners. The EVDO access network includes LTE/EVDO and EVDO/1×RTT base stations 125 in communication with Base Station Controller (BSC) packet control 508 and radio network controller 512 via a radio access network (RAN) 505, which are in communication with packet data service node 520 via an access transport network 515, which is in communication with central provider core network 110. As shown, a RAN AAA server 521 is also in communication with the access transport network 515.

In some embodiments, the central provider can offer improved service capabilities using a wireless access network. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 6:
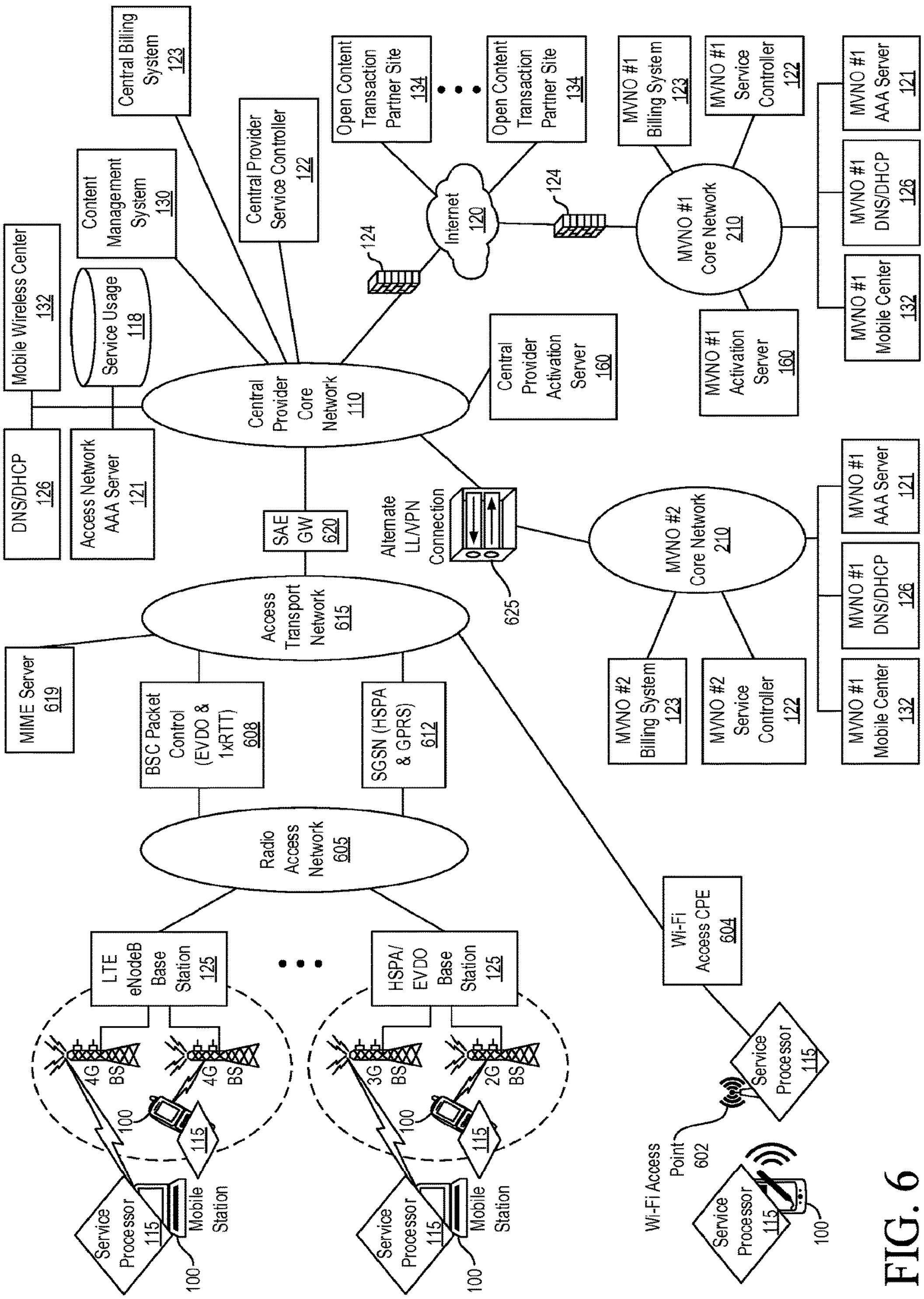
FIG. 6 illustrates a network architecture including a 4G LTE and Wi-Fi overlay configuration in accordance with some embodiments.

FIG. 6 illustrates a network architecture including a 4G LTE and Wi-Fi overlay configuration in accordance with some embodiments. This figure is also similar to FIG. 4 except for the various particular variations of the 4G LTE/Wi-Fi network architecture as compared to the HSPA/GPRS wireless access network architecture as will be apparent to one of ordinary skill. As shown, FIG. 6 includes a 4G LTE and Wi-Fi access network operated by a central provider and two MVNO networks 210 operated by two MVNO partners. The 4G LTE/Wi-Fi access network as shown includes LTE eNodeB and HSPA/EVDO base stations 125 in communication with Base Station Controller (BSC) packet control (EVDO & 1×RTT) 608 and SGSN (HSPA & GPRS) 612 via a radio access network (RAN) 605, which are in communication with System Architecture Evolution (SAE) Gateway (GW) 620 via an access transport network 615, which is then in communication with central provider (core) network 110. As shown, a Mobile Management Entity (MME) server 619 is also in communication with the access transport network 615. Also as shown, a Wi-Fi Access Point (AP) 602 is also in communication with the access transport network 615 via Wi-Fi Access Customer Premises Equipment (CPE) 604. As will be apparent to those of ordinary skill in the art, the embodiments of network architectures shown, for example, in FIGS. 1-8 are exemplary network architecture embodiments in which one or more of the shown network elements may not be required or included, alternative network elements included, and/or additional network elements included based on network design choices, network standards and/or other functional/design considerations and choices.

In some embodiments, the central provider can offer improved service capabilities using the wireless access network as depicted in FIG. 6. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121. Accordingly, as shown in FIGS. 4 through 6, various embodiments can be implemented independent of the wireless access network technology, and for example, can be implemented in 3G, 4G and any other wireless access network technology.

Figure 7:
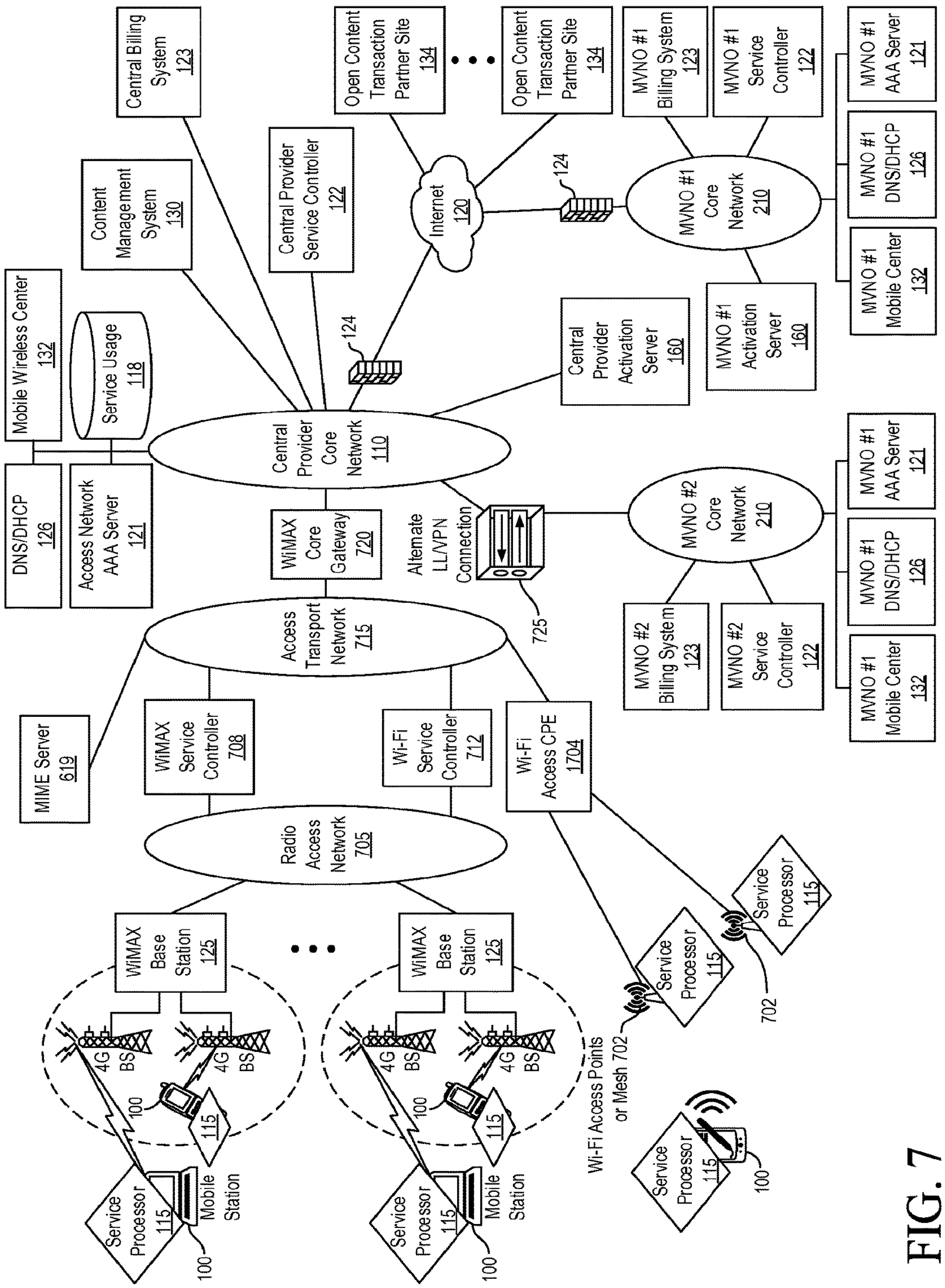
FIG. 7 illustrates a network architecture including a WiMax and Wi-Fi overlay configuration in accordance with some embodiments.

FIG. 7 illustrates a network architecture including a WiMax and Wi-Fi overlay configuration in accordance with some embodiments. This figure is also similar to FIG. 4 except for the various particular variations of a combined WiMax/Wi-Fi network as compared to the HSPA/GPRS wireless access network architecture as will be apparent to one of ordinary skill in the art. As shown, FIG. 7 includes both a WiMax and Wi-Fi network (e.g., a combined WiMax/Wi-Fi network) operated by a central provider and two MVNO networks 210 operated by two MVNO partners. Although the Wi-Fi and WiMax access technologies are different wireless access networking technologies, with WiMax providing a wide area networking technology and Wi-Fi providing a local area networking technology, which efficiently operates using the two wireless access networking capabilities. As similarly discussed above with respect to the switching between 3G and 4G networks, some embodiments employ the automatic network selection capability as described above to choose the best available network service profile, and, for example, the user can force the decision or the service controller can make the decision. For example, if free Wi-Fi services have adequate coverage, in most cases, the decision criteria programmed into the automatic network selection algorithm will select Wi-Fi as long as the Wi-Fi access points are associated with a known and trusted provider. In some embodiments, transaction billing from central provider billing system 123 or MVNO #1 or MVNO #2 billing systems 123 will work with the transaction servers when connected over Wi-Fi just as when connected over any other access technology (including wire line based connections). The WiMax/Wi-Fi access network as shown includes WiMax base stations 125, Wi-Fi access points/hotspots 702 and/or Wi-Fi mesh access networks 702 (in some embodiments, femto cells can be used in addition to and/or as an alternative to Wi-Fi), and Wi-Fi access customer-premises equipment (CPE) 1704 in communication with WiMax service controller 708 and Wi-Fi service controller 712 via a radio access network 705, which are in communication with WiMax core gateway 720 via an access transport network 715, which is then in communication with central provider (core) network 110.

In some embodiments, the central provider can offer improved service capabilities using the wireless access network as depicted in FIG. 7. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 15A:
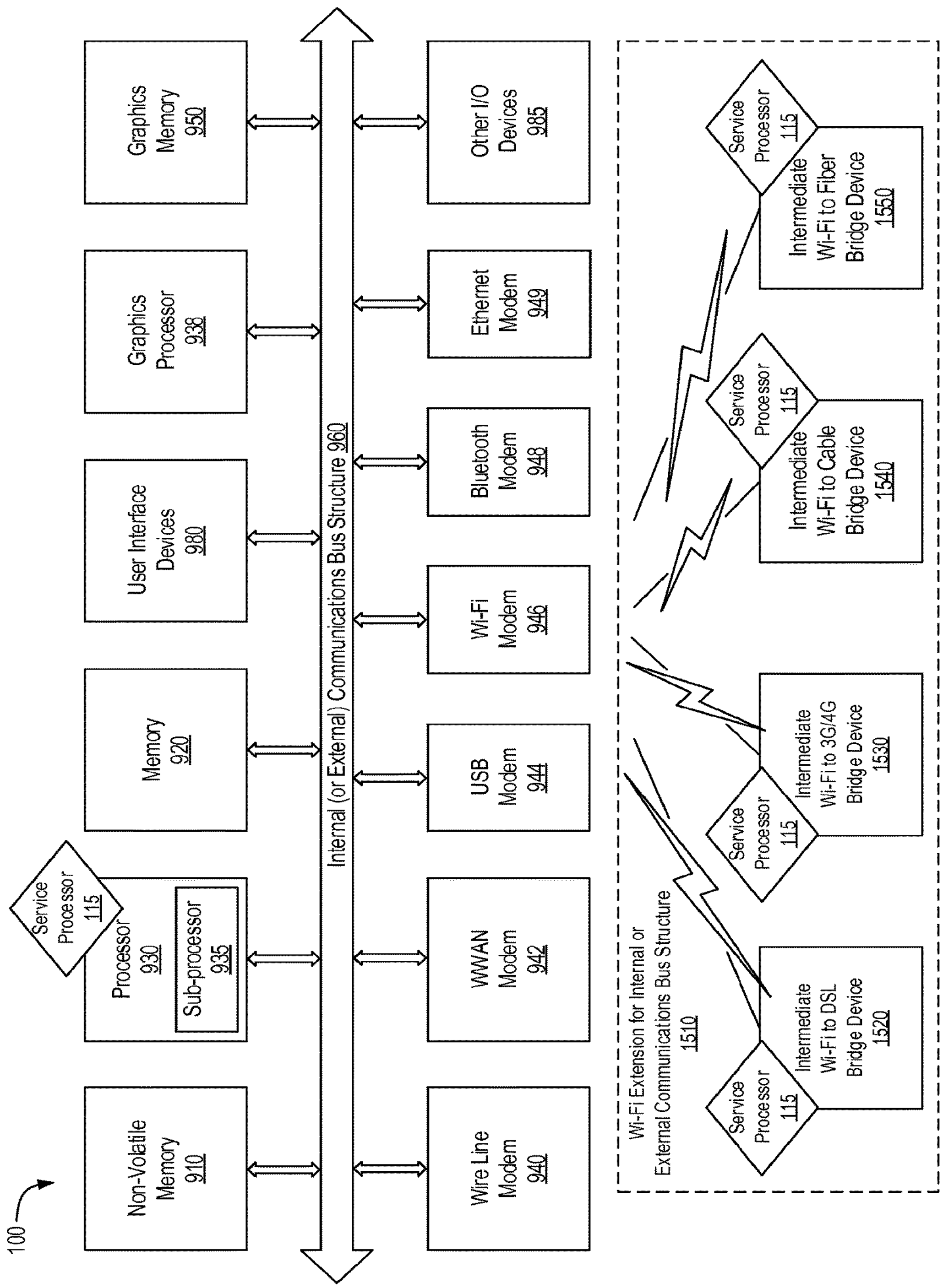
FIGS. 15A through 15F illustrate hardware diagrams of a device that include a service processor and a bus structure extension using intermediate modem or networking device combinations in accordance with various embodiments.
Figure 15B:
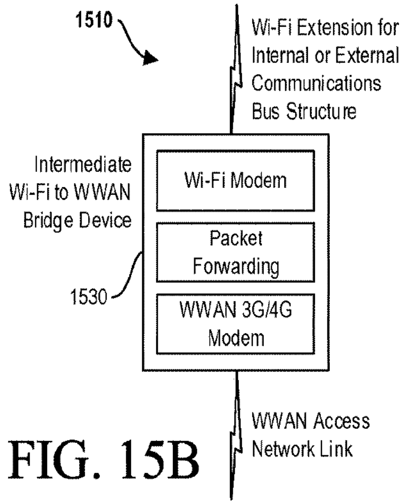
Figure 15C:
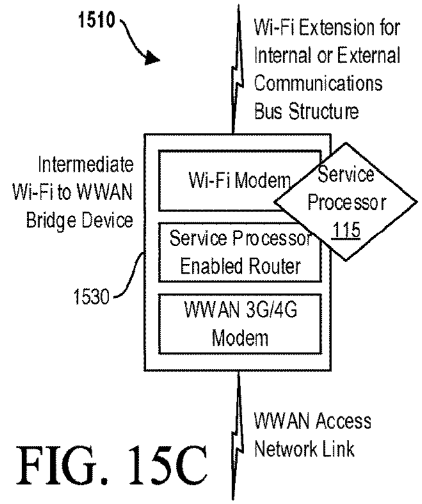
Figure 15D:
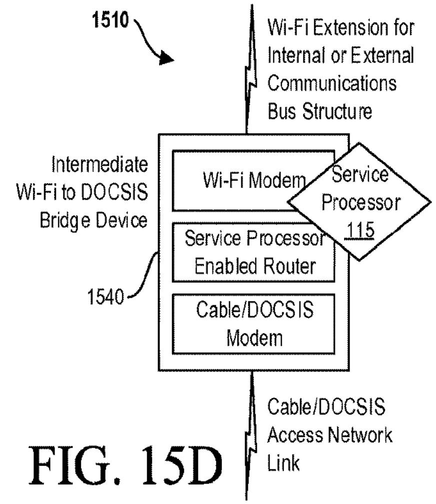
Figure 15E:
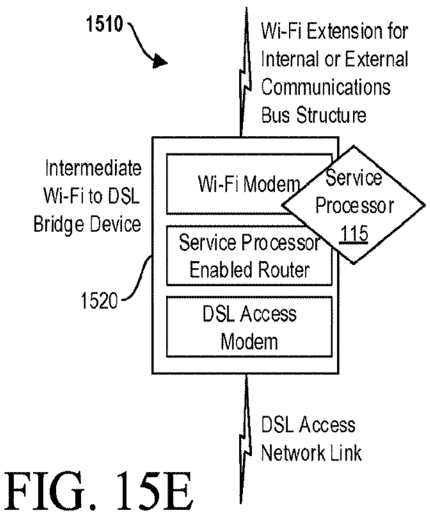

Referring to FIG. 7, the Wi-Fi connection can be replaced with a femto cell (and the Wi-Fi modem shown in FIGS. 15D and 15E can be replaced with a femto cell modem (base station side functionality)). In some embodiments, the service processor 115 is provided on the femto cell to control subscriber access in a verifiable manner as similarly described herein with respect to various embodiments (e.g., the Wi-Fi related embodiments). For example, the femto cell service provider (e.g., the entity that owns the spectrum the femto cell is using) can operate the femto cell as a local access mechanism for the home subscriber (or other who purchased or installed the femto cell), and then also use it to provide pay-for-service or additional free services, with controlled access and/or traffic control and/or service control and/or billing control performed locally or in combination with network equipment as described herein. In some embodiments, the WWAN devices being used at home or work with the femto cell include a portion of the service processor functionality. For example, this allows the service provider for femto cells to provide service and monetize service in a controlled way even though the femto cell is not connected to the service provider network the way conventional base stations are connected to the service provider network, but is connected through the Internet 120. For example, the secure heartbeat function can be extended to include data traffic so that it is encrypted and secured along with the control plane traffic. The decision of whether or not to admit a device onto the femto cell can be made through the service processor 115 connection to the service controller 122 and subsequent look up of the credentials for the device and the associated service plan and service profile that is then programmed into the service processor on the femto cell and/or the device itself. The femto cell can also offer a landing page to devices through the service processor so that devices that do not belong to the network can gain access to the network by signing up over the femto cell. For example, the intermediate device embodiments for Wi-Fi on one end and WWAN on the other can be accomplished by using the Wi-Fi connection in the cell phone in AP mode so that it becomes the intermediate device. The service processor 115 on the cell phone can then act in the same manner as described for the intermediate device as described herein.

Figure 8:
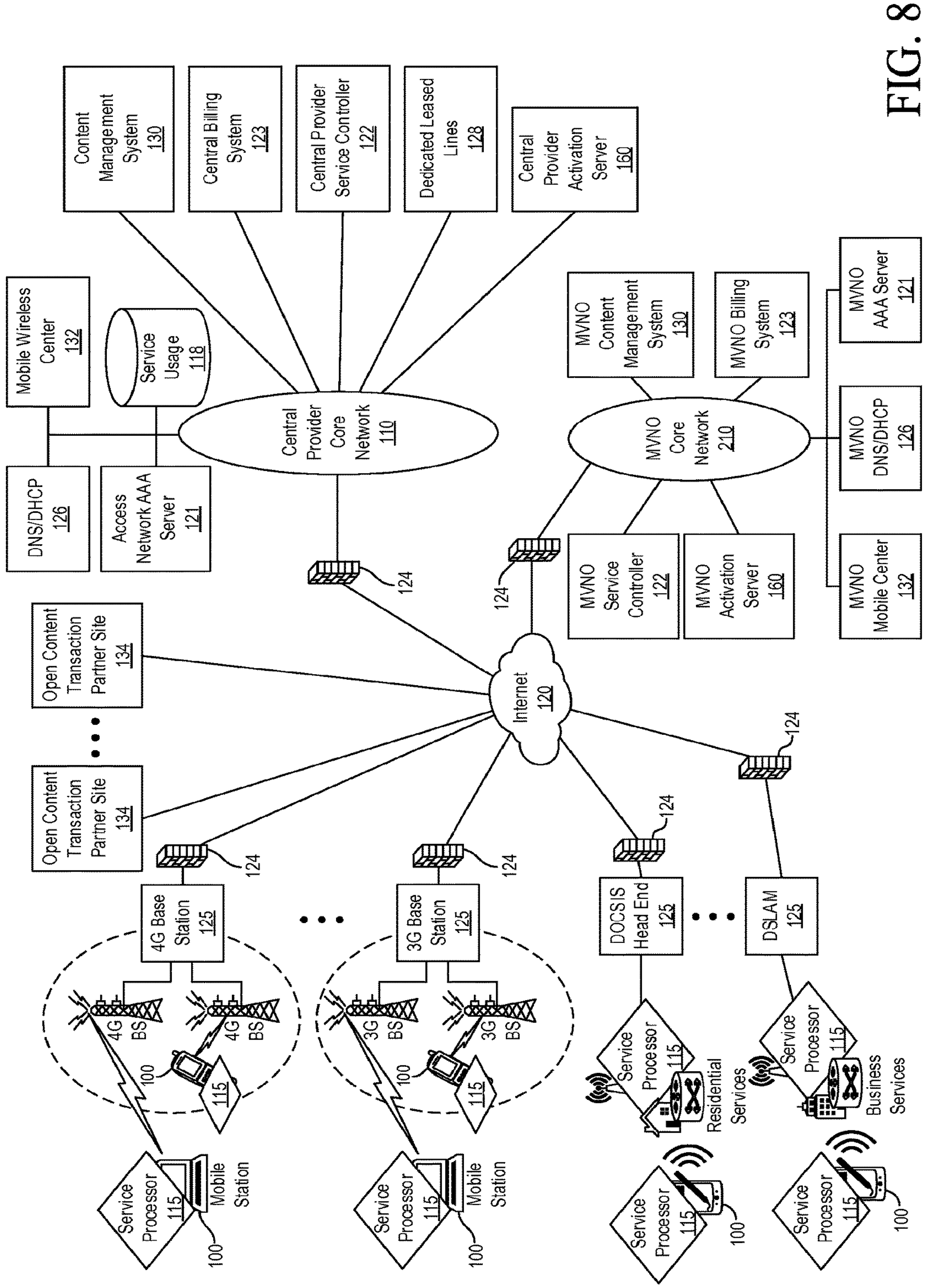
FIG. 8 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments.

FIG. 8 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments. It is a common network architecture for multi-access central providers to have one or more wired access networks and one or more wireless access networks. As shown, FIG. 8 includes both 3G and 4G wireless access networks, including a 4G base station 125 and a 3G base station 125, and both DOCSIS and DSLAM wire line networks (e.g., a combined WWAN/wire line network), including DOCSIS Head End 125 and DSLAM 125, operated by a central provider via central provider (core) network 110 and an MVNO partner via MVNO network 210 via the Internet 120.

As shown, the service processor 115 can reside on a number of different types of devices 100 that work on 3G or 4G wireless, DSL or DOCSIS, and the service controller 122 is capable of controlling each of these types of devices with a consistent service experience, for example, using different service profiles, service capabilities and service profile cost options depending on which network the device is connected to and/or other criteria. For example, a download of a High Definition (HD) movie can be allowed when the service controller 122 is managing service profile policies for a service processor 115 residing on a DOCSIS device 100 (e.g., a computer or laptop connected to a cable modem), but not when the same service controller 122 is managing service profile policies for a service processor 115 residing on a 3G device 100 (e.g., a smart phone connected to a mobile 3G network).

As will now be apparent to one of ordinary skill in the art in view of the above description of FIGS. 1 through 8, the present invention can be provided across any access network and a set of service profiles can be defined in a variety of ways including, for example, to user preference feedback, access network performance, access network cost, access network central provider partnership status with the service provider central provider and roaming deals and costs. For example, as discussed below, various embodiments allow for users to have superior service experiences based on the ability to control certain of their service settings, and service providers can also more efficiently deploy a greater variety of services/service plans to users.

In some embodiments, the service processor 115 and the service controller 122 provide an overlay for existing networks without significantly changing the billing system 123, gateways/routers or other network components/elements, and also provide verifiable service monitoring to control services and/or service usage/costs without involving, for example, a service provider or MVNO (e.g., for smart phone devices and/or laptops or netbooks (or any other network accessible device) with an unlimited data plan or any other service plan). For example, applications that are deployed by device owners or service subscribers (e.g., an IT manager) and do not involve a service provider include roaming services provided as an after-market product without carrier/service provider involvement. In this example, device activity is recorded by the service processor 115 and transmitted to the service controller 122 (e.g., the IT manager controls the service controller 122). In another example, a third party after-market product is provided in which the service controller 122 is hosted by the third party and the device management entity (e.g., the IT manager or parents of the device user for parental controls) uses a secure Virtual Service Provider (VSP) website to control the devices that belong to that management entity's device partition (e.g., VSP partitions and techniques are described below with respect to FIG. 19). The VSP secure website techniques described herein can also be applied to service provider owned servers with device partitions for the purpose of controlling, for example, Deep Packet Inspection (DPI) controllers (e.g., DPC policy implementation 5402 as shown in FIG. 20) to provide similar or substantially equivalent service usage/control capabilities using network based service control techniques, as similarly described in detail below with respect to FIGS. 19 and 20 (e.g., IT manager VSP control of a group partition and/or MVNO VSP control of a group partition).

Service Processor Configurations for Devices

Figure 9:
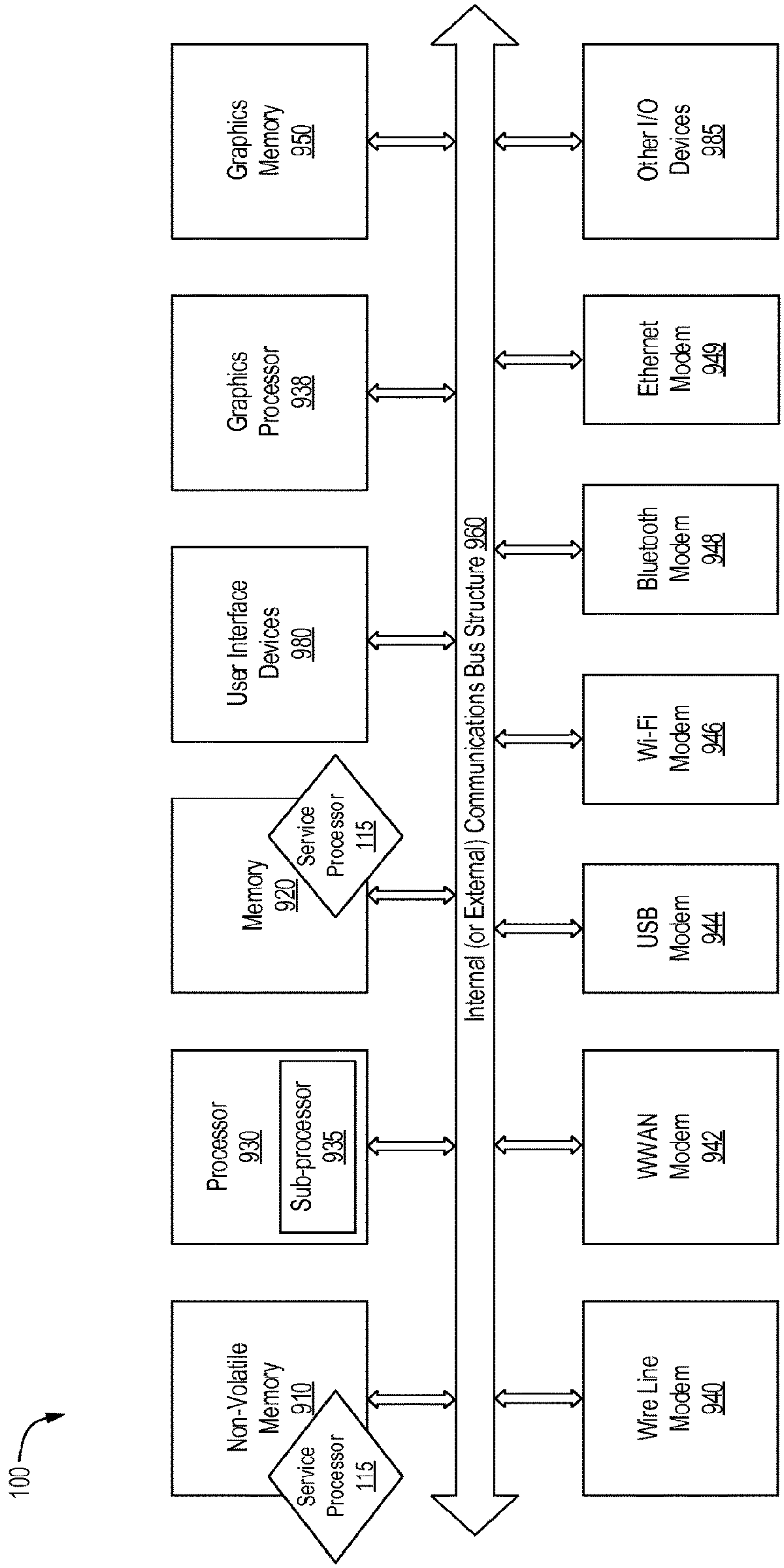
FIG. 9 illustrates a hardware diagram of a device that includes a service processor in accordance with some embodiments.

FIG. 9 illustrates a hardware diagram of a device 100 that includes a service processor 115 in accordance with some embodiments. As shown in FIG. 9, the service processor 115 is stored in a non volatile memory 910 and a memory 920 of the device 100. As will be appreciated by those of ordinary skill in the art, the present invention can operate with virtually any device architecture, and the device architectures discussed herein (e.g., with respect to FIGS. 9-14 and 15A-15F) are examples of various implementations on certain devices (e.g., of different representations of device 100).

As shown in FIG. 9, device 100 also includes a processor 930, sometimes referred to as a CPU or central processor unit, an APU or application processor unit, a core processor, a computing device, or many other well known terms. In some embodiments, device 100 includes one or more processors and/or a multicore processor. As shown, processor 930 includes a sub-processor 935. In some embodiments, processor 930 and/or sub-processor 935 are based on an architecture sometimes referred to as a complex instruction set computer or CISC, a reduced instruction set computer or RISC, a parallel processor, a combination of two or more architectures or any other processor architecture. In some embodiments, processor 930 has a design that is based on logic and circuitry from one or more standard design library or published architecture, or includes specialized logic and circuitry designed for a given device 100 or collection of such devices. In some embodiments, a device includes more than one processor and/or sub-processor, and in such a device, one processor and/or sub-processor can have one architecture while another may have a somewhat different or completely different architecture. In some embodiments, one or more of the processors and/or sub-processors can have a general purpose architecture or instruction set, can have an architecture or instruction set that is partially general or partially specialized, or can have an instruction set or architecture that is entirely specialized. In some embodiments, a device includes more than one processor and/or sub-processor, and in such a device, there can be a division of the functionality for one or more processors and/or sub-processors. For example, one or more processors and/or sub-processors can perform general operating system or application program execution functions, while one or more others can perform communication modem functions, input/output functions, user interface functions, graphics or multimedia functions, communication stack functions, security functions, memory management or direct memory access functions, computing functions, and/or can share in these or other specialized or partially specialized functions. In some embodiments, any processor 930 and/or any sub-processor 935 can run a low level operating system, a high level operating system, a combination of low level and high level operating systems, or can include logic implemented in hardware and/or software that does not depend on the divisions of functionality or hierarchy of processing functionality common to operating systems.

As shown in FIG. 9, device 100 also includes non-volatile memory 910, memory 920, graphics memory 950 and/or other memory used for general and/or specialized purposes. As shown, device 100 also includes a graphics processor 938 (e.g., for graphics processing functions). In some embodiments, graphics processing functions are performed by processor 930 and/or sub-processor 935, and a separate graphics process 938 is not included in device 100. As shown in FIG. 9, device 100 includes the following modems: wire line modem 940, WWAN modem 942, USB modem 944, Wi-Fi modem 946, Bluetooth modem 948, and Ethernet modem 949. In some embodiments, device 100 includes one or more of these modems and/or other modems (e.g., for other networking/access technologies). In some embodiments, some or all of the functions performed by one or more of these modems are performed by the processor 930 and/or sub processor 935. For example, processor 930 can implement some or all of certain WWAN functional aspects, such as the modem management, modem physical layer and/or MAC layer DSP, modem I/O, modem radio circuit interface, or other aspects of modem operation. In some embodiments, processor 930 as functionality discussed above is provided in a separate specialized processor as similarly shown with respect to the graphics and/or multimedia processor 938.

As also shown in FIG. 9, device 100 includes an internal (or external) communication bus structure 960. The internal communication bus structure 960 generally connects the components in the device 100 to one another (e.g., allows for intercommunication). In some embodiments, the internal communication bus structure 960 is based on one or more general purpose buses, such as AMBA, AHP, USB, PCIe, GPIO, UART, SPI, $I^2C$, Fire wire, DisplayPort, Ethernet, Wi-Fi, Bluetooth, Zigbee, IRDA, and/or any other bus and/or I/O standards (open or proprietary). In some embodiments, the bus structure is constructed with one or more custom serial or parallel interconnect logic or protocol schemes. As will be apparent to one of ordinary skill in the art, any of these or other bus schemes can be used in isolation and/or in combination for various interconnections between device 100 components.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (as discussed herein) is implemented and stored in software that can be performed on (e.g., executed by) various components in device 100. FIG. 9 illustrates an embodiment in which service processor 115 is stored in device memory, as shown, in memory 920 and/or non-volatile memory 910, or a combination of both. In some embodiments, it is advantageous to store or implement certain portions or all of service processor 115 in protected or secure memory so that other undesired programs (and/or unauthorized users) have difficulty accessing the functions or software in service processor 115. In some embodiments, service processor 115, at least in part, is implemented in and/or stored on secure non-volatile memory (e.g., non volatile memory 930 can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as discussed below (and as shown in FIG. 16). In some embodiments, a secure software download embodiment also uses a secure non-volatile memory. Those of ordinary skill in the art will also appreciate that all memory can be on-chip, off-chip, on-board and/or off-board. In some embodiments, the service processor 115 which as shown in FIG. 9 is stored or implemented in non volatile memory 910 and memory 920, can be implemented in part on other components in device 100.

As shown, device 100 also includes a user interfaces device component 980 for communicating with user interface devices (e.g., keyboards, displays and/or other interface devices) and other I/O devices component 985 for communicating with other I/O devices. User interface devices, such as keyboards, display screens, touch screens, specialized buttons or switches, speakers, and/or other user interface devices provide various interfaces for allowing one or more users to use the device 100.

Figure 10:
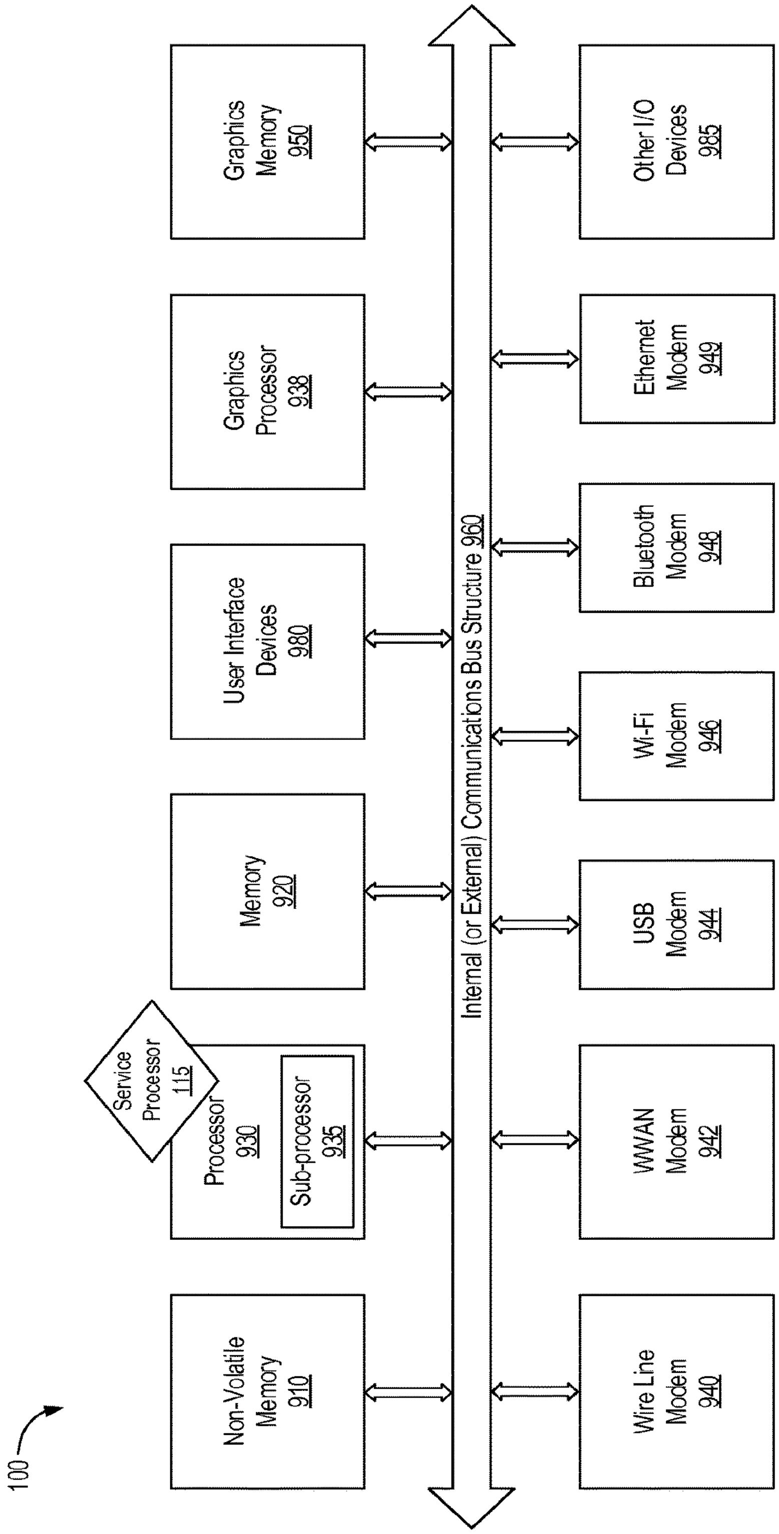
FIG. 10 illustrates another hardware diagram of a device that includes a service processor in accordance with some embodiments.

FIG. 10 illustrates another hardware diagram of a device 100 that includes a service processor 115 in accordance with some embodiments. As shown in FIG. 10, the service processor 115 is implemented on the processor 930 of the device 100. In some embodiments, this implementation can be in part or whole accomplished in software stored, implemented and/or executed on the processor 930. In some embodiments, the implementation and/or execution can be in part or whole accomplished in hardware that is on the processor 930. While the service processor 115 is shown in FIG. 10 as stored, implemented and/or executed on the processor 930, in other embodiments, the service processor 115 is implemented in part on other components in device 100, for example, as discussed below.

Figure 11:
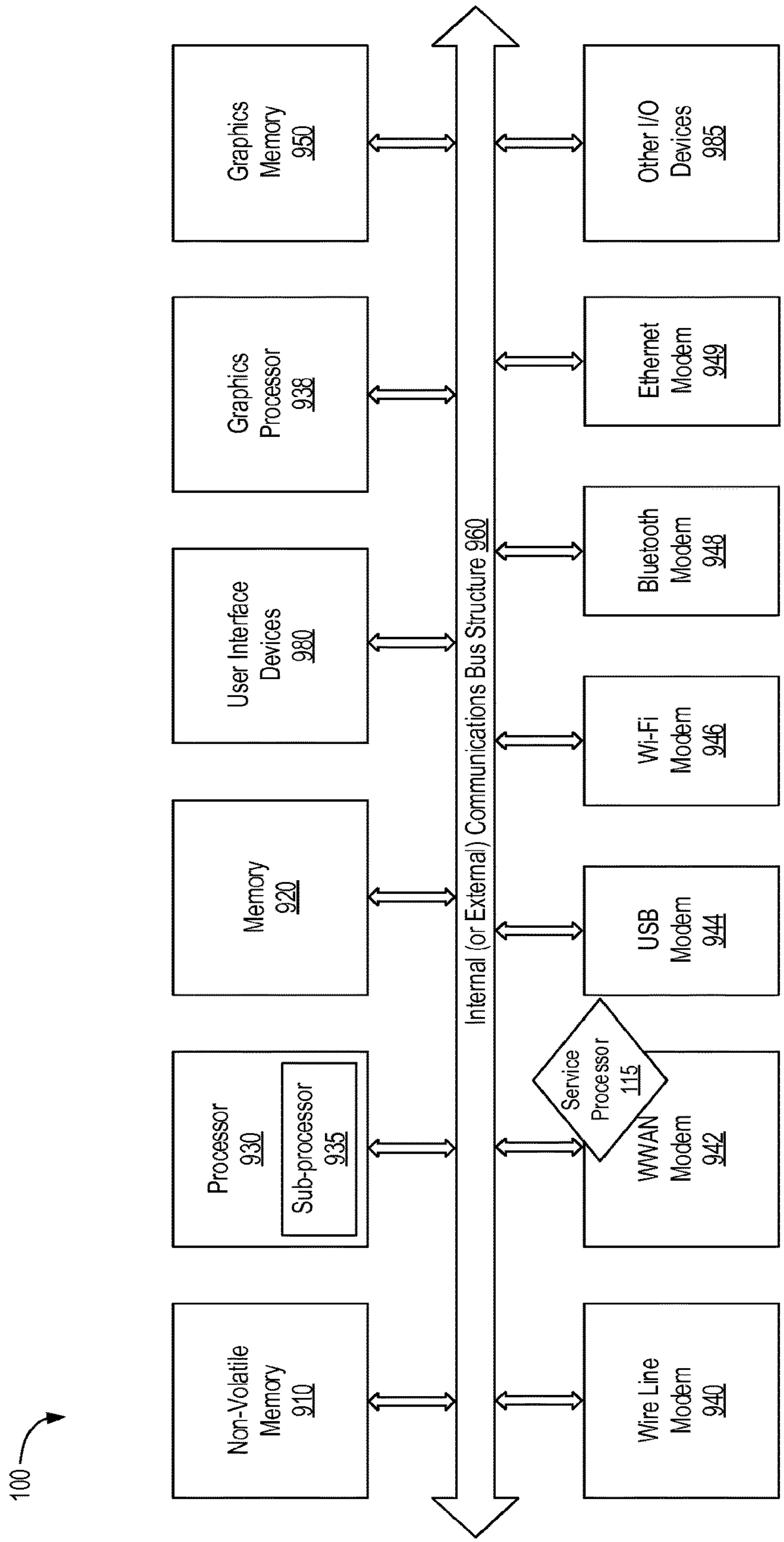
FIG. 11 illustrates another hardware diagram of a device that includes a service processor in accordance with some embodiments.

FIG. 11 illustrates another hardware diagram of a device 100 that includes a service processor 115 in accordance with some embodiments. As shown in FIG. 11, the service processor 115 is implemented on the WWAN modem 942 of the device 100. In some embodiments, this implementation can be in part or whole accomplished in software stored, implemented and/or executed on the WWAN modem 942. In some embodiments, the implementation and/or execution can be in part or whole accomplished in hardware that is on the WWAN modem 942. In some embodiments, service process 115 is implemented on another modem component of device 100 and/or one or more of the modem components of device 100.

In some embodiments, the service processor 115 is implemented on a modem processor (e.g., WWAN modem 942 or WWAN/Wi-Fi modem), and the service processor 115 can be installed and/or executed in protected and/or secure memory or processor hardware on the modem. The modem memory can be made robust to hacking or tampering and, in some embodiments, is only accessible from a secure network management channel or secure device management port and not by most end users. In some embodiments, a portion of the service processor 115 is implemented on a modem processor (e.g., WWAN modem 942 hardware or software), and a portion of the service processor 115 is implemented on another device 100 processor 930. For example, the device service monitor agent 1696 and one or more service usage measurement points (see discussion associated with FIG. 18) can be implemented on a modem processor, and other service processor 115 elements can be implemented in the main device operating system processor 930. As another example, a second (or first) service monitor agent 1696 and one or more service usage measurement points can be implemented on a modem processor, and a first (or second) service monitor 1696 with one or more service measurement points can be implemented on the main operating system processor 930 for device 100. For example, such embodiments can be configured to provide a service usage measurement and reporting system that offers a diversified countermeasure to protect against hacking, tampering or other errors for device based service usage measurements that can be made harder to hack or tamper with than certain software embodiments on the processor 930. For example, such embodiments can be employed when one or more of the following capabilities are not available: network based service usage measures, network based service profile or policy implementation verification measures, and network based service usage verification error response action capabilities.

In some embodiments, certain portions of the service processor 115 that deal with application layer service monitoring or traffic flow identification (e.g., tagging or traffic flow shaping as disclosed elsewhere) are implemented on a main processor 930, and other portions of the service processor 115 are implemented on a modem processor (e.g., WWAN modem 942).

In some embodiments, the WWAN modem is a wide area access technology modem such as 2G, 2.5G, 3G or 4G. As discussed above and below, the connection to the WWAN modem 942 can be a connection internal to device 100, for example a USB, GPIO, AMBA or other bus, or can be a connection that extends external to the device such as for example a USB, Ethernet, Wi-Fi, Bluetooth or other LAN or PAN connection. Three example embodiments in which the bus is internal to the device are as follows: a PCIe modem card running over USB or PCIe, a GPIO connection running from a processor 930 chipset to a modem chipset inside a mobile device, or a Wi-Fi connection running from a Wi-Fi modem inside of device 100 to an intermediate modem or networking device combination that forwards the access network traffic between the access network connection and the device via the Wi-Fi connection. In some embodiments, in addition to the service processor 115 being implemented on the WWAN modem 942 either internal or external to the device 100, similarly service processor 115 can be implemented on a wire line modem 940, such as DSL, Cable or fiber, another wireless LAN or PAN modem, such as Wi-Fi, Zigbee, Bluetooth modem 948, White Space, or some other modem, connected internal to device 100 or external to device 100 via a LAN or PAN extension of internal or external communications bus structure 960.

In some embodiments, a complete turn-key reference design product for the device modem (one or more of 942, 946, 948, 949, 944, 940) combined with a built-in service processor 115, possibly with a well defined and documented application interface and a well defined and documented service processor developers kit (SPDK) provides for a powerful product embodiment for the purpose of achieving mass market distribution and usage for the modem with service processor 115 and associated service controller 122 features. For example, embodiments that include the WWAN modem 942, possibly in combination with one or more additional modems including Wi-Fi modem 946, bluetooth modem 948, USB modem 944 and Ethernet modem 949, can be combined with a pre-tested or pre-certified integrated embodiment of the service processor 115, possibly in combination with a well defined API for writing software applications that interface to, reside on or communicate with this turn-key modem embodiment. As disclosed herein, the advantageous capabilities of the service processor 115, possibly in conjunction with the service controller 122, to assist in monitoring, control, billing and verification for services is made more available for device 100 manufacturers in such a form, because the manufacturers do not need to spend as much time and resources to develop a custom modem only for a subset of devices that the turn-key modem can be used to support. In some embodiments, the service processor 115, as discussed herein, can be configured to provide device assisted service monitoring, control, billing and/or verification across not just when connected to the WWAN network via the WWAN modem, but also when connected to the other networks corresponding to the other access modems included in the turn-key combined module plus service processor 115 (or SPDK or chipset plus service processor 115) design. The pre-integrated service processor 115 and API possibly in combination with testing and certification can be packaged in a small form factor that may have standardized interfaces such as USB, PCIe, firewire, Display Port, GPIO, or other interface. The form factor may be miniaturized into standard configurations such as minicard, half minicard or even smaller form factors, or it can be designed into a non-standard or proprietary form factor. The module form factor can be well documented to simplify integration into various device 100 designs. The SPDK embodiments can be designed to contain one or more of the following: hardware integration and use documentation, software integration documentation, software programming documentation, application interface documentation, service controller documentation, overall testing guidelines and overall use guidelines. In some embodiments, the modem module can be integrated with the service processor 115 functionality as a combined chipset, firmware and/or software product, with other SPDK features very similar to those listed above. The service controller programming guide for these turn-key embodiments can also be documented for the SPDK service processor 115 software, turn-key module with service processor 115 or integrated chipset with service processor 115. Accordingly, these embodiments provide various solutions to simplify the OEM task of integrating, developing, testing and shipping device 100 products (or integrated networking device products) with any of the device assisted service monitoring, control, billing or verification capabilities disclosed herein.

Figure 12:
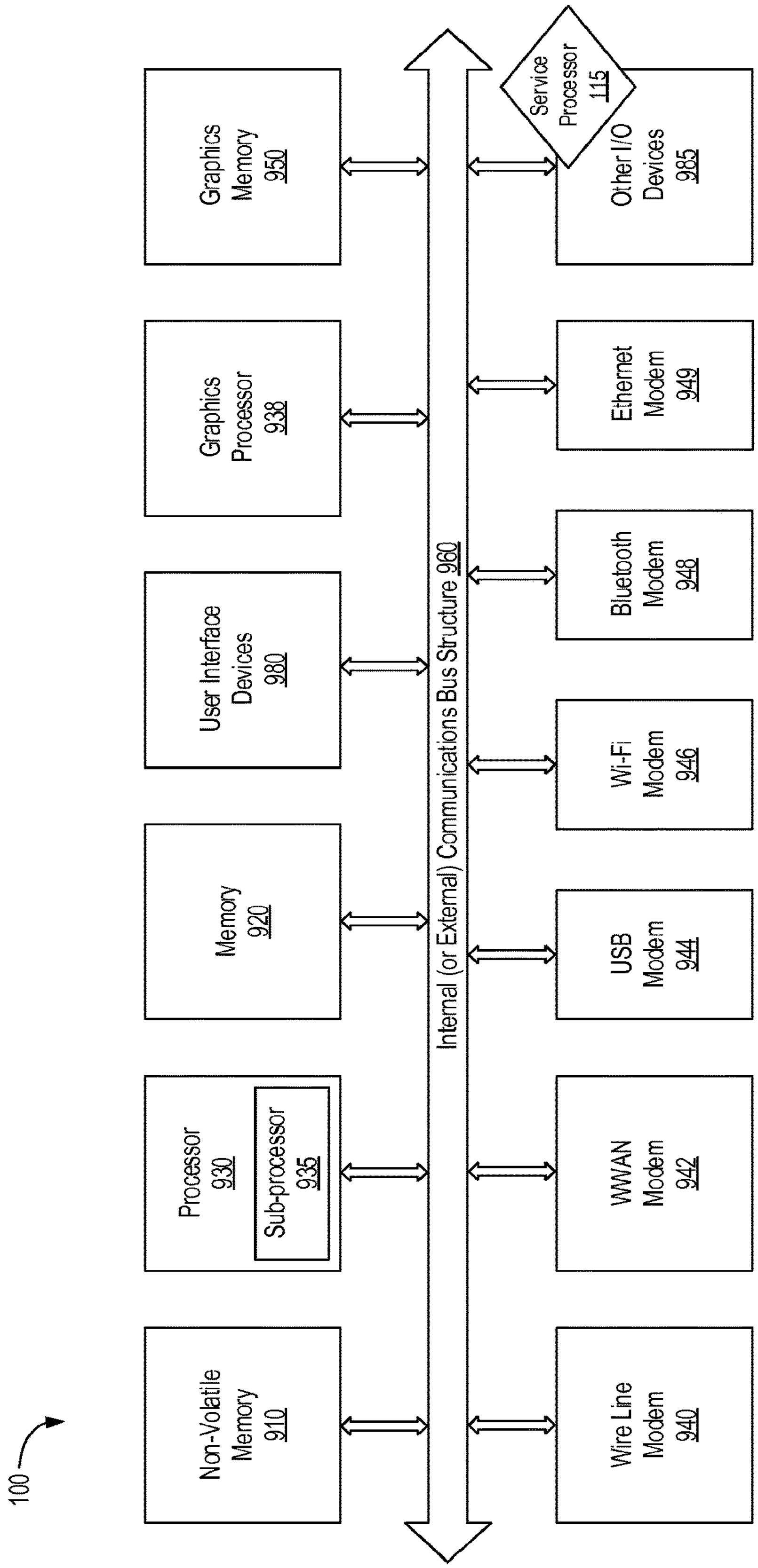
FIG. 12 illustrates another hardware diagram of a device that includes a service processor in accordance with some embodiments.

FIG. 12 illustrates another hardware diagram of a device 100 that includes a service processor 115 in accordance with some embodiments. As shown in FIG. 12, the service processor 115 is implemented on the other I/O devices component 980 of the device 100. In some embodiments, this implementation can be in part or whole accomplished in software stored, implemented and/or executed on the other I/O devices component 980 (e.g., a SIM/USIM card or other secure hardware I/O device). In some embodiments, the implementation and/or execution can be in part or whole accomplished in hardware that is on the other I/O devices component 980.

As discussed above, various embodiments include product designs in which the service processor 115 resides on device volatile or non-volatile memory (see FIG. 9), the device application processor or CPU (see FIG. 10), the wireless access modem (see FIG. 11) (or any other modem), or another I/O device (see FIG. 12). While these are just a few of the example service processor 115 placement embodiments, these embodiments show that the placement of where the software or hardware for implementing the service processor 115 can reside in the device 100 is very flexible and can be implemented in a myriad of places and ways depending on the device and/or other technical design choices.

Figure 13:
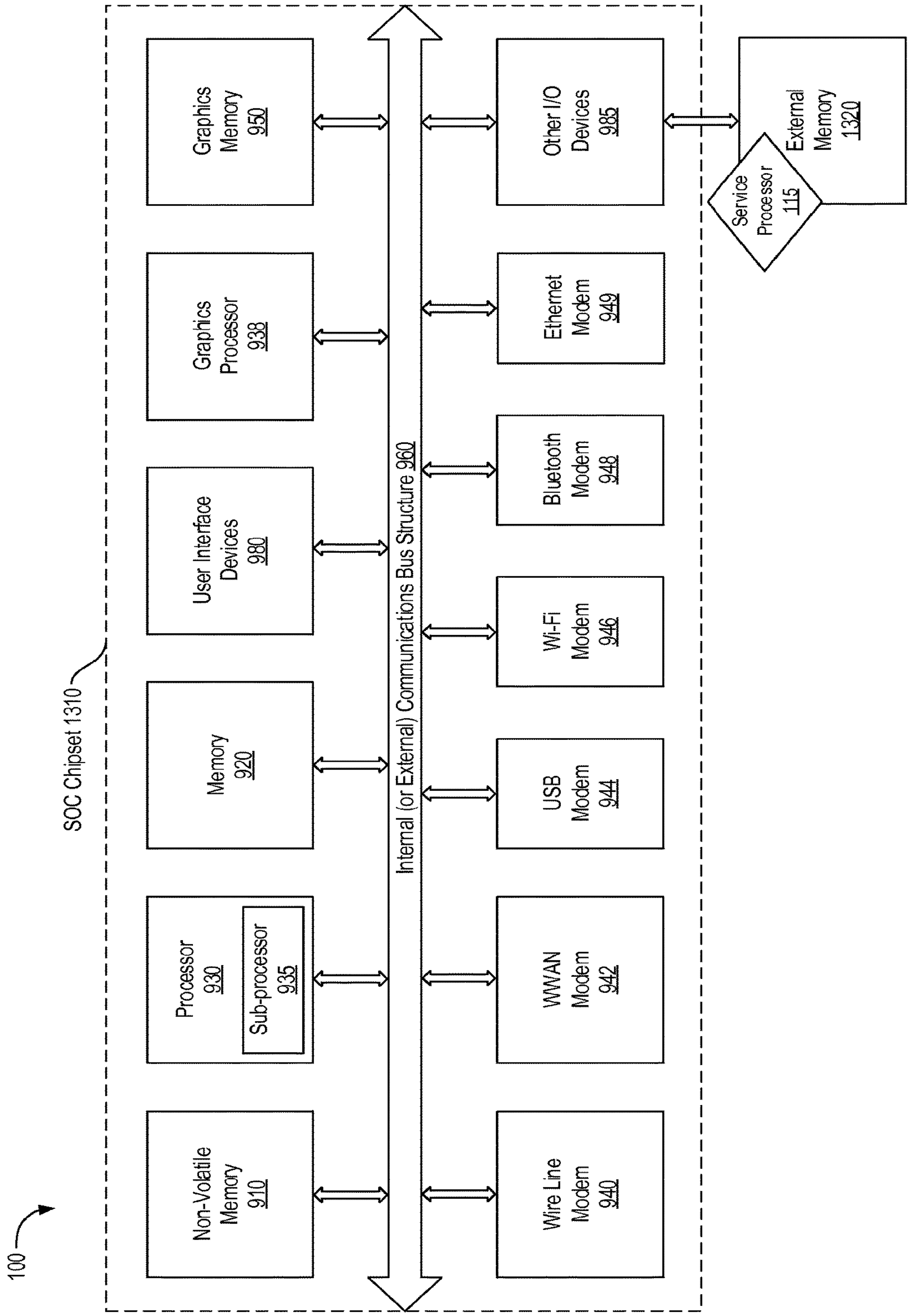
FIG. 13 illustrates another hardware diagram of a device that includes a service processor implemented in external memory of a System On Chip (SOC) in accordance with some embodiments.

FIG. 13 illustrates another hardware diagram of a device 100 that includes a service processor 115 implemented in external memory of a System On Chip (SOC) 1310 in accordance with some embodiments. As shown in FIG. 13, the service processor 115 is implemented on the external memory 1320 of the device 100. In some embodiments, this implementation can be in part or whole accomplished in software stored, implemented and/or executed on the external memory 1320. In some embodiments, the implementation and/or execution can be in part or whole accomplished in hardware that is on the external memory 1320. In some embodiments, SOC chipset 1310 and external memory 1320 provide a portion or all of the hardware of device 100.

Figure 14:
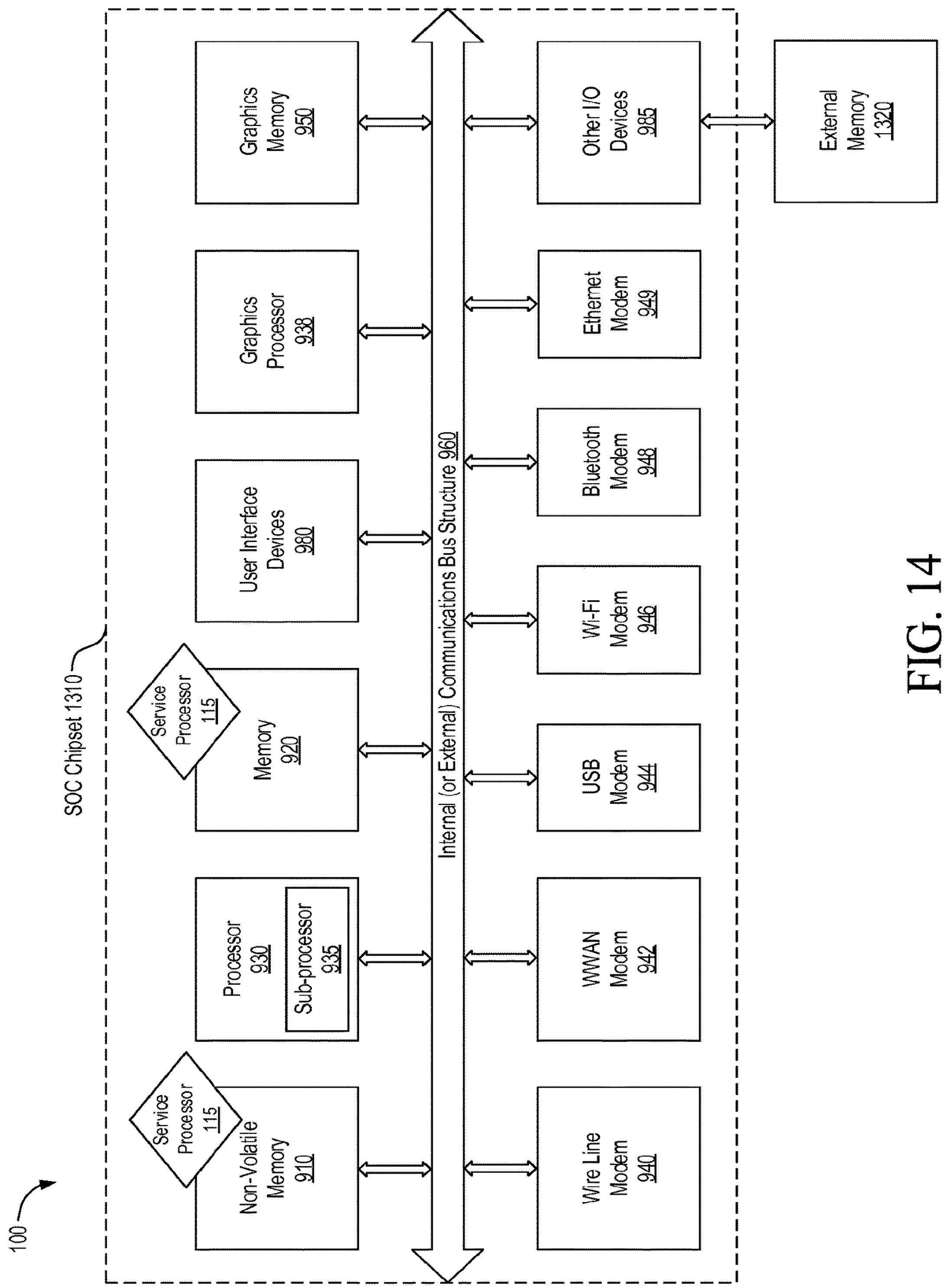
FIG. 14 illustrates another hardware diagram of a device that includes a service processor implemented in external memory of a System On Chip (SOC) in accordance with some embodiments.

FIG. 14 illustrates another hardware diagram of a device 100 that includes a service processor 115 implemented in external memory of a System On Chip (SOC) 1310 in accordance with some embodiments. As shown, the service processor 115 is stored in a non volatile memory 910 and a memory 920 of the SOC chipset 1310, as similarly discussed above with respect to FIG. 9. In some embodiments, SOC chipset 1310 and external memory 1320 provide a portion or all of the hardware of device 100.

As similarly discussed above with respect to FIGS. 9 through 12, various embodiments include product designs including the SOC chipset 1310 in which the service processor 115 resides on internal volatile or non-volatile memory 910 of the SOC chipset 1310 (see FIG. 14), the device application processor or CPU 930 and/or sub processor 935, the modems 940, 942, 944, 946, 948, and/or 949 (or any other modem), another I/O device 985, and/or external memory 1320 (see FIG. 13) (and/or any combinations thereof). While these are just a few of the example service processor 115 placement embodiments, these embodiments show that the placement of where the software or hardware for implementing the service processor 115 can reside in the SOC chipset 1310 and/or the external memory 1320 of the device 100 is very flexible and can be implemented in a myriad of places and ways depending on the device and/or other technical design choices.

The above discussion with respect to FIGS. 9 through 14 illustrating various internal hardware embodiments for device 100 applies equally to this partitioning of device functionality or any other partitioning of how the components in device 100 are configured, whether they are all separate components, some of the components are combined into a single chipset but there are still multiple chipsets, or all of the components are combined into a chipset. For example, FIGS. 9 through 14 illustrating various internal hardware embodiments for device 100 show several access modem components including the wire line modem 940, wireless wide area network (WWAN) modem 942, USB modem 944, Wi-Fi modem 946, Bluetooth modem 948, and Ethernet modem 949. In some embodiments, wire line modem 940 is a DSL or cable modem such as DOCSIS, or some other modem with a hard connection such as fiber. In some embodiments, as discussed above and below, connection to the wire line or wireless access network is accomplished through an extension of the internal or external communications bus structure 960. For example, such an extension is accomplished using one or the other modems, such as Wi-Fi modem 946 or Ethernet modem 949, connecting to a local area network that in turn connects to the access network via a device that bridges the local area network to the access network. One of ordinary skill in the art will appreciate that when discussing device connection to any access network the connection can be via a direct connection to the network, such as a 3G or 4G WWAN modem 942 connection to a 3G or 4G WWAN network, or can be a connection to the access network through an intermediate connection, such as a Wi-Fi modem 946 connection to a modem or networking device combination that has a Wi-Fi LAN connection and a 3G or 4G network access network connection. Another example of an extended modem connection embodiment includes a Wi-Fi modem 946 device connection to a modem or networking device combination that includes a Wi-Fi LAN connection and a DOCSIS or DSL network access connection. Other examples of such combinations will be readily apparent to one of ordinary skill in the art.

Service Processor Configurations for Intermediate Networking Devices

FIGS. 15A through 15F illustrate hardware diagrams of a device 100 that include a service processor 115 and a bus structure extension 1510 using intermediate modem or networking device combinations in accordance with various embodiments. For example, FIGS. 15A through 15E illustrate various extended modem alternatives for access network connection through an intermediate modem or networking device combination that has a connection (e.g., LAN connection) to one or more devices 100.

In some embodiments, device 100 includes a 3G and/or 4G network access connection in combination with the Wi-Fi LAN connection to the device 100. For example, the intermediate device or networking device combination can be a device that simply translates the Wi-Fi data to the WWAN access network without implementing any portion of the service processor 115 as shown in FIG. 15B. In some embodiments, an intermediate device or networking device combination includes a more sophisticated implementation including a networking stack and some embodiments a processor, as is the case for example if the intermediate networking device or networking device combination includes a router function, in which case the service processor 115 can be implemented in part or entirely on the intermediate modem or networking device combination. The intermediate modem or networking device combination can also be a multi-user device in which more than one user is gaining access to the 3G or 4G access network via the Wi-Fi LAN connection. In the case of such a multi-user network, the access network connection can include several managed service links using multiple instantiations of service processor 115, each instantiation, for example, being implemented in whole or in part on device 100 with the intermediate modem or networking device combination only providing the translation services from the Wi-Fi LAN to the WWAN access network.

Referring now to FIGS. 15A, 15C, 15D, and 15E, in some embodiments, the service processors 115 are implemented in part or in whole on the intermediate modem or networking device combination. In the case where the service processor 115 is implemented in part or in whole on the intermediate modem or networking device combination, the service processor 115 can be implemented for each device or each user in the network so that there are multiple managed service provider accounts all gaining access through the same intermediate modem or networking device combination. In some embodiments, the functions of service processor 115 are implemented on an aggregate account that includes the WWAN access network traffic for all of the users or devices connected to the Wi-Fi LAN serviced by the intermediate modem or networking device combination. In some embodiments, the central provider can also provide an aggregated account service plan, such as a family plan, a corporate user group plan and/or an instant hotspot plan. In the case where there is one account for the intermediate modem or networking device combination, the intermediate modem or networking device combination can implement a local division of services to one or more devices 100 or users in which the services are controlled or managed by the intermediate modem or networking device combination or the device 100, but the management is not subject to service provider control and is auxiliary to the service management or service policy implementation performed by service processors 115. In some embodiments, another service model can also be supported in which there is an aggregate service provider plan associated with one intermediate modem or networking device combination, or a group of intermediate modems or networking device combinations but where each user or device still has its own service plan that is a sub-plan under the aggregate plan so that each user or device has independent service policy implementation with a unique instantiation of service processor 115 rather than aggregate service policy implementation across multiple users in the group with a single instantiation of service processor 115.

As shown in FIGS. 15A and 15C, in some embodiments, device 100 includes a Wi-Fi modem 946, a Wi-Fi modem 946 combined with a 3G and/or 4G WWAN modem 1530 on intermediate modem or networking device combination 1510, and the intermediate modem or networking device combination forwards WWAN access network traffic to and from device 100 via the Wi-Fi link. For example, the service processor 115 can be implemented in its entirety on device 100 and the service provider account can be associated exclusively with one device. As shown in FIGS. 15A and 15D, such an implementation can be provided using a different access modem and access network, such as a 2G and/or 3G WWAN, DSL wire line, cable DOC SIS wire line or fiber wire line configuration in place of the 3G and/or 4G access network connection to the intermediate modem or networking device combination 1510. In addition, various other embodiments similarly use DSL as shown in FIGS. 15A and 15E, USB, Ethernet, Bluetooth, or another LAN or point to point connection from device 100 to the intermediate modem or networking device combination 1510.

In some embodiments, a portion of the service processor 115 is implemented on the device 100, such as the application interface agent 1693 and other supporting agents (see FIG. 16), and another portion of the service provider 115 is implemented on the intermediate modem or networking device combination, such as policy implementation agent 1690 or possibly modem firewall 1655 as well as other agents (see FIG. 16). In this example, the service provider 115 can still offer individual service plans associated exclusively with one device, or can offer an aggregate plan in which the portion of the service processor 115 located on the intermediate modem or networking device combination 1510 aggregates service plans into one WWAN connection but each individual device 100 has a unique service interface via the application interface agents and associated agents located on device 100. Similarly, such an implementation can be provided using a different access modem and access network, for example a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, all of the service processor 115 is implemented on the intermediate modem or networking device combination 1510 and the aggregate device or user traffic demand from the LAN port is serviced through one service provider service plan account. Such an implementation can be provided using a different access modem and access network, for example a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, the device 100 uses the on-board WWAN modem 942 when it is outside of Wi-Fi LAN coverage area for one or more trusted access networks for the device, and when the device comes within range of a Wi-Fi network associated with a intermediate modem or networking device combination connected to a trusted wire line access network, the device can switch to the Wi-Fi link service to connect service processor 115 to the trusted wire line access network. In some embodiments, the decision to switch to the Wi-Fi LAN associated with a trusted wire line access network can be made automatically by the device based on the policy implementation rules settings for the modem selection and control 1811 and/or the policy control agent 1692, can be made by the user, or can be made by the service controller 122 (see FIG. 17). In addition, various other embodiments similarly use USB, Ethernet, Bluetooth, or another LAN or point to point connection from device 100 to the intermediate modem or networking device combination 1510.

Figure 15F:
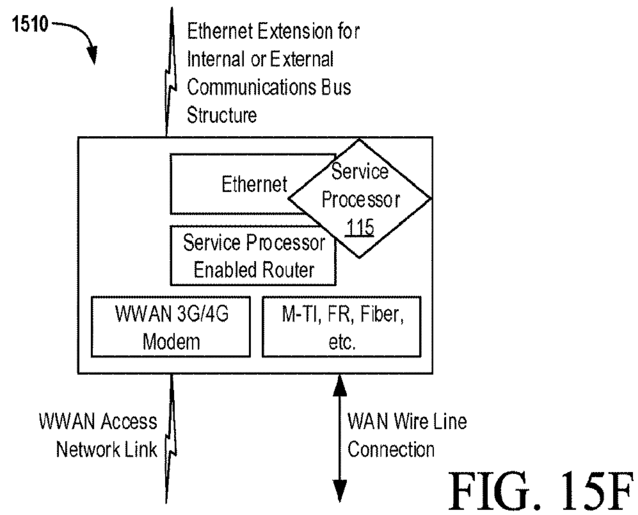

FIG. 15F illustrates another hardware diagram of a device 100 that includes a service processor 115 and a bus structure extension 1510 using intermediate modem or networking device combinations in accordance with various embodiments. In some embodiments, more than one access network connection is implemented in the intermediate modem or networking device combination 1510. This allows the device 100 to potentially connect through the intermediate modem or networking device combination with a choice of access network services. An example of such an embodiment is illustrated in FIG. 15F in which an access network router (e.g., an enterprise router) connected to a LAN with a wire line primary backhaul connection and a back up WWAN connection, for example 3G or 4G, to provide access services when the primary wire line connection fails. As discussed above, the service provider service profile for service processor 115 and the service plan account can be set up as an aggregate account with multiple users connected to the LAN. The service provider can elect to use an embodiment that includes a portion of the service processor 115 on each device 100 so that the account can be managed for each user or each device, or the service provider can elect to implement all of the necessary features in the service processor 115 on the intermediate modem or networking device combination so that there is no visibility to the individual devices 100 or users.

As described herein, various embodiments provide many service policy implementation options that can enhance the service provider control of the service experience and cost, or enhance the user control of the service experience and cost by providing a verifiable or compromise resistant solutions to manage service policy implementation on the intermediate modem or networking device combination, for one or both of the WWAN or wire line access networks, when the WWAN access network is active, or when the WWAN access network is inactive. The level of service control, user preference feedback and service policy implementation verification or compromise resistance enabled by these embodiments improves the offered back up services and primary wire line services. One of ordinary skill in the art will also now appreciate that any number of wire line and/or wireless network access connections can be supported by the various embodiments as described herein, with any number of device architectures and architectures for intermediate modem or networking device combinations bridging the device to the access network of choice. Accordingly, various embodiments provide a verifiable managed service architecture, design and implementation for any number of single access and/or multi-access networks in which the service account can be consistent across multiple networks, and the service policies can be changed from network to network as deemed appropriate by the service provider with service notification, service cost control and privacy preference inputs from the user.

In various embodiments, the verification embodiments discussed herein for service policy implementation verification or service policy implementation compromise protection can be applied. In some embodiments, rather than attaching a service provider service plan account to a single device, it is attached to (e.g., associated with) a user. For example, when the user logs onto an access network with a service controller controlled by a service provider, regardless of what device the user logs onto with the user's service plan profile can be automatically looked up in the central billing system 123 and dynamically loaded (e.g., downloaded) onto the device 100 from the service controller 122 (e.g., a service profile provided on demand based on the user's identity). In some embodiments, in addition to dynamically loading the user's service policy implementation and control settings, one or more of the user's preferences including notification, service control, traffic monitor reporting privacy and Customer Relationship Management (CRM) reporting privacy are also dynamically loaded. For example, this allows the user to have the same service settings, performance and experience regardless of the device the user is logged into and using on the network. In addition, as discussed herein, in the various embodiments that call for roaming from one type of access network to another, the user service plan profile, that includes all of the above in addition to the service plan profile changes that take effect between different types of access network, can be used on any device and on any network, providing the user with a verifiable or compromise resistant, consistent service experience regardless of network or device.

Many of the embodiments described herein refer to a user using device 100. It is understood that there are also applications for these various embodiments that do not involve user interfaces. Examples of such applications include equipment, apparatus or devices for automation, telemetry, sensors, security or surveillance, appliance control, remote machine to machine data connections, certain remote access configurations, two way power metering or control, asset tracking, people tracking or other applications in which a human user interface is not required for device 100.

Various embodiments of the device 100 described above include other I/O devices 985. In some embodiments, these other devices include other modems, other special purpose hardware components, and/or other I/O devices or drivers or modems to connect to other I/O devices. In some embodiments, these other devices include a Subscriber Identity Module (SIM) or Universal Subscriber Identity Module (USIM) device. In some embodiments, it is advantageous to implement some or all of the service processor 115 functions on an embodiment of device 100 that includes a SIM and/or a USIM. In some embodiments, the other I/O devices 985 include a hardware device designed to implement a portion or all of the service processor 115 functions. For example, this is advantageous in cases in which the original device 100 was not manufactured with the service processor 115; in cases in which dedicated hardware is desired to improve one or more aspects of service processor 115 performance; allowing users, for example, to have the same service settings, performance and experience regardless of the device the user is using on the network by using such a SIM and/or USIM (e.g., or implemented as a type of dongle); and/or in cases in which a separate component is desired to assist in compromise protection for one or more aspects of service processor 115.

As discussed above, some embodiments described herein provide for billing of certain access services. In some embodiments, various applications do not require or involve billing of certain services. For example, applications like enterprise IT (Information Technology) group management of enterprise workforce access policy implementation or access cost control or access security policy, privacy control, parental control, network quality of service control or enhancement, private network services, free access services, publicly funded access services, flat rate no-options service and other services, or other examples that will be apparent to one of ordinary skill in the art do not require billing functionality but benefit from many other aspects of various embodiments.

Service Processor and Service Controller for Verifiable Service Monitoring, Notification and Control FIG. 16 is a functional diagram illustrating a device based service processor 115 and a service controller 122 in accordance with some embodiments. For example, this provides relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As previously discussed, it is understood that the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, as discussed below in some embodiments, one or more of the policy implementation or service monitoring functions can be placed on one of the access modems located below the modem driver and modem bus in the communication stack as illustrated in certain figures and described herein. As discussed below, some simplified embodiment figures illustrate that not all the functions illustrated in all the figures are necessary for many designs, so a product/service designer can choose to implement those functions believed to be most advantageous or sufficient for the desired purposes and/or environment. The functional elements shown in FIG. 16 are described below.

As shown, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

In some embodiments, the service control device link 1691 agent messages are transmitted asynchronously as they are generated by one or more of the service agents. In some embodiments, the service control device link 1691 performs collection or buffering of agent messages between transmissions. In some embodiments, the service control device link 1691 determines when to transmit based potentially on several parameters including, for example, one or more of the following parameters: periodic timer trigger, waiting until a certain amount of service usage or traffic usage has occurred, responding to a service controller message, responding to a service controller request, initiated by one or more agents, initiated by a verification error condition, initiated by some other error or status condition. In some embodiments, once a transmission trigger has occurred, the service control device link 1691 assembles all buffered agent communications and frames the communications.

In some embodiments, the transmission trigger is controlled by waiting for an amount of service usage, such as waiting until a certain amount of data traffic has passed, which reduces the control plane communication channel traffic usage to a fraction of the data plane traffic. For example, this approach preserves network capacity and reduces service cost even in traffic scenarios in which data traffic is light.

In some embodiments, the transmission trigger is based on waiting for an amount of service usage, and also including a minimum transmission rate that triggers a transmission according to one or more of the following parameters: a maximum time between transmissions clock to keep the service processor 115 in communication with the service controller 122 when little or no service usage is occurring, a polling request of some kind from the service controller 122, a response to a service controller heartbeat, a transmission generated by a service verification error event, or a transmission generated by some other asynchronous event with time critical service processor 115 (or service controller 122) messaging needs, such as a transaction or service billing event or a user request. For example, service control plane traffic down is reduced to a relatively inexpensive and capacity conserving trickle when device 100 data traffic is not significant. At the same time, this approach also provides an effective flow of real time or near real-time service control plane traffic that is both cost and capacity efficient, because the service control plane traffic is a relatively small percentage of the data plane traffic when data plane traffic usage is heavy. For example, when data plane traffic usage is heavy is generally the time when close monitoring of service policy implementation verification or compromise prevention can be particularly important and by keeping the control plane overhead to a fraction of data plane traffic close monitoring and control of services are maintained at a reasonable cost in terms of percentage of both bandwidth used and network capacity. In some embodiments, the service usage or service activity trigger occurs based on some other measure than traffic usage, such as a number of messages transacted, one or more billing events, number of files downloaded, number of applications run or time that an application has been running, usage of one or more specified applications, GPS coordinate changes, roaming event, an event related to another network connection to the device and/or other service related measures.

In some embodiments, the service control device link 1691 provides for securing, signing, encrypting or otherwise protecting communications before sending. For example, the service control device link 1691 can send to the transport layer or directly to the link layer for transmission. In some embodiments, the communications are further secured with transport layer encryption, such as TCP TLS (Transport Control Protocol Transport Layer Security) or another secure transport layer protocol. In some embodiments, communications are encrypted at the link layer, such as IPSEC (Internet Protocol Security), various VPN (Virtual Private Network) services, other forms of IP layer encryption and/or another link layer encryption technique.

In some embodiments, the service control link 1691 includes the above discussed agent heartbeat function in which the agents provide certain required reports to the service controller 122 for the purpose of service policy implementation verification (e.g., verification related reports on certain aspects of the service processor 115) or for other purposes. For example, such agent heartbeat messages can be in the open/clear (unencrypted) or encrypted, signed and/or otherwise secured. In some embodiments, these messages include one or more of the below described types of messages: an agent information message, an agent check-in message and/or agent cross check message.

In some embodiments, an agent information message is included in the agent heartbeat service policy implementation verification message, which includes, for example, any information the agent needs to communicate to the service controller 122 as part of the operation of the service policy implementation system. For example, an agent response to a service controller challenge, as described below, can be included in the agent heartbeat service policy implementation verification message.

In some embodiments, an agent check-in message is included in an agent heartbeat service policy implementation verification message, which includes, for example, a transmission of a unique agent identifier, secure unique identifier, and/or hashed encrypted and signed message beginning with some shared secret or state variable for the hash. For example, an agent self-check can be included in the agent heartbeat service policy implementation verification message, which includes reporting on agent configuration, agent operation, agent code status, agent communication log, agent error flags, and/or other agent associated information potentially hashed, encrypted, signed or otherwise secured in the message (e.g., using a shared secret unique to that agent).

In some embodiments, an agent cross-check message is included in the agent heartbeat service policy implementation verification message, which includes, for example, reports on the status, configuration, operation observations, communication log or other aspects of another agent. For example, agent environment reports can be included in the agent heartbeat service policy implementation verification message, which includes, for example, reports on certain aspects of the service processor 115 operating environment, such as software presence (e.g., installation status of certain operating system and/or application software and/or components thereof), observed communication with agents or communication attempts, memory accesses or access attempts, network accesses or access attempts, software downloads or attempted downloads, software removal or download blocking, service policy implementation verification or compromise event error conditions with respect to the operating environment for the service processor 115, and/or other messages regarding the verification or possibility of compromise associated with the service processor 115 operating environment or agents.

In some embodiments, the agent heartbeat function also provides regular updates for information important to user service notification services. For example, the network based elements can provide regular synchronization updates for the device based service usage or service activity counters in which service usage or service activity measures available from one or more network service history elements is transmitted to the device 100. This allows the service usage counter errors between the device service counter and the counters used for central billing to be minimized. A common service usage or service activity measure is total traffic usage measured to date within a time frame over which a service limit is applicable. Other service usage or service activity measures can also be tracked and reconciled in a similar manner.

In some embodiments for the heartbeat function, the service controller 122 verifies that the scheduled agent reports are being received and that the reports are within expected parameters. In some embodiments, the access control integrity server 1654 issues signed challenge/response sequences to the policy implementation agent 1690. For example, the challenges can be asynchronous, issued when an event or error condition occurs, issued on a schedule or issued when a certain amount of data has passed. This approach, for example, provides a second layer of service policy implementation verification that strengthens the service usage or service activity measurement verification. For example, a challenge/response can be sent over the heartbeat link for the purpose of verifying device agent integrity. Various challenge/response related verification embodiments are described below.

In some embodiments, the challenge/response heartbeat message can include sending any kind of command or query, secure or transmitted in the open, receiving a response from the agent and then evaluating the response to determine if the response is within a range of parameters expected for a correctly configured agent, an agent that is operating properly, an agent that is not partially compromised or an agent that is not entirely compromised. In some embodiments, the agent is only required to respond with a simple acknowledgement of the challenge. In some embodiments, the agent is required to respond with a message or piece of information that is known by the agent. In some embodiments, the agent is required to respond with a message or piece of information that is difficult for the agent to respond correctly with if it were to be partially or entirely compromised. In some embodiments, the agent is required to respond back with information regarding the operation or configuration of the agent that is difficult for the agent to respond properly with if the agent is not properly configured, not operating properly, is partially compromised or is entirely compromised. In some embodiments, the first agent is required to respond back with information regarding the operation, configuration, status or behavior of a second agent that is difficult for the first or second agent to respond properly with if the first or second agent is not properly configured, not operating properly, is partially compromised or is entirely compromised. In some embodiments, the agent is required to respond with a response that includes a shared secret. In some embodiments, the agent is required to respond with information regarding the presence, configuration, operating characteristics or other information regarding other programs in the operating environment of the agent. In some embodiments, the agent is required to respond with hashed information to be portions of code or a code sample (e.g., the code portion or code sample can be specified by the service controller 122).

In some embodiments, the information the agent responds with is a response to a signed or encrypted message from the service controller 122 in which the agent must know how to decode the encrypted controller message in order to respond correctly or it would be difficult for the agent to respond properly if the agent is not configured properly, is not operating within appropriate limits, is partially compromised or is entirely compromised. In some embodiments, the agent signs or encrypts information in such a manner that it is difficult to respond correctly when the message is decoded by the service controller 122 unless the agent is configured properly, is operating within appropriate limits, is not partially compromised and is not entirely compromised. In some embodiments, the agent is required to respond with a signed or encrypted hash of information that is difficult for the agent to generate unless the agent is configured properly, is operating within appropriate limits, is not partially compromised and is not entirely compromised. For example, the hashed information can be local device configuration information, portions of code or all of the code, and/or the code portion to be used in the response can be specified by the service controller. In another example, the hashed information the agent responds with can include a shared secret, and/or the hashed information can be information regarding the presence, configuration, operating characteristics or other information regarding other programs in the operating environment of the agent.

Accordingly, as described above, the agent heartbeat function provides an important and efficient system in some embodiments for verifying the service policy implementation or protecting against compromise events. For example, there are many other functions the agent heartbeat service can perform and some are described herein while others will be apparent to one of ordinary skill in the art given the principles, design background and various embodiments provided herein.

In some embodiments, the service control device link 1691 facilitates another important function, which is the download of new service processor software elements, revisions of service processor software elements, and/or dynamic refreshes of service processor software elements. There are many embodiments for such operations. In some embodiments, the software is received as a single file over the service control device link 1691. For example, the file can have encryption or signed encryption beyond any provided by the communication link protocol itself. In some embodiments, the software files are segmented into smaller packets that are communicated in multiple messages sent over the service control device link 1691. In some embodiments, once the file(s) are received, or the segmented portions of the file(s) are received, they are communicated to a service downloader 1663 for file aggregation and installation, which, in some embodiments, is performed after further measures to verify the service processor software are completed. In some embodiments, the files are sent using other delivery means, such a direct TCP socket connection to the service downloader 1663 or some other software installer, which can also involve secure transport and additional levels of encryption.

As shown in FIG. 16, an agent communication bus 1630 represents a functional description for providing communication for the various service processor 115 agents and functions. In some embodiments, as represented in the functional diagram illustrated in FIG. 16, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned and/or otherwise protected from unauthorized monitoring or usage.

In some embodiments, as described below, there are multiple layers of security applied to the agent communication bus 1630 communication protocols, such as including one or more of the following: point to point message exchange encryption using one or more keys that are partially shared or shared within the service processor 115 agent group and/or the service controller 122, point to point message exchange that using one or more keys that are private to the two endpoints of the communication, a bus-level message exchange encryption that can be in place of or in addition to other encryption or security, or using one or more keys that are partially shared or shared within the service processor 115 agent group and/or the service controller 122, a set of secure messages that can only be decoded or observed by the agents they are intended for, a set of secure messages that allow communication between certain agents or service processor functions and entities outside of the service processor operating environment. In some embodiments, and as described herein, the service control device link 1691 is assumed to be equivalent to an agent for communication purposes, and, in the case of the service control device link 1691, the communication is not restricted to the agent communication bus 1630 but also extends to the service control communications link 1653. In some embodiments, the system has the capability to replace keys or signatures on occasion or on a regular basis to further secure against monitoring, eavesdropping or compromise of the agent communication system.

For example, various forms of message encryption and security framework techniques can be applied to encrypt and/or secure the agent communication bus 1630, including one or more of the following: agent bus encryption using shared key for all agents provided and updated by the secure server; agent bus encryption using point to point keys in which the secure server informs the bus and agents of keys and updates as appropriate; agent level encryption using agent to agent shared keys in which the secure server informs agents of the key and updates the key as appropriate; agent level encryption using agent to agent point to point key in which the secure server informs agent of the point to point keys that are required and updates the keys as appropriate; agent level access authorization, which only allows access to the agents that are on the secure authorization list and in which the list is provided by the secure server and signatures are provided by the secure server; UI messages are only analyzed and passed, in which the UI cannot have access to configuration information and cannot issue challenges; agent level heartbeat encryption, which can be point to point or shared key for that agent; control link level heartbeat encryption; TLS (Transport Layer Security) communication protocols; server level heartbeat encryption, which can be point to point or shared key for that secure server; and/or the access control integrity agent 1694 or heartbeat function can become point to multipoint secure communications hubs.

In some embodiments of the agent communication bus 1630, the design of the agent communication bus depends on the nature of the design embodiments for the agents and/or other functions. For example, if the agents are implemented largely or entirely in software, then the agent communication bus can be implemented as an inter-process software communication bus. In some embodiments, such an inter-process software communication bus is a variant of D-bus (e.g., a message bus system for inter-process software communication that, for example, helps applications/agents to talk to one another), or another inter-process communication protocol or system, running a session bus in which all communications over the session bus can be secured, signed, encrypted or otherwise protected. For example, the session bus can be further protected by storing all software (e.g., software components, applications and/or agents) in secure memory, storing all software in encrypted form in secure memory, and/or executing all software and communications within a secure execution environment, hardware environment and/or protected memory space. In some embodiments, if the agents and other functions are designed with a mixture of software and hardware, or primarily with hardware, then the implementation of the bus design will vary, and the principles and embodiments described herein will enable one of ordinary skill in the art to design the specifics of the agent communication bus 1630 to meet a particular set of product and desired functional requirements.

As shown in FIG. 16, an access control integrity agent 1694 collects device information on service policy, service usage or service activity, agent configuration and agent behavior. In some embodiments, the access control integrity agent 1694 also cross checks this information to identify integrity breaches in the service policy implementation and control system. In some embodiments, the access control integrity agent 1694 also initiates action when a service policy violation or a system integrity breach is suspected. In some embodiments, the access control integrity agent 1694 also performs asynchronous or periodic agent checks to verify presence, configuration or proper operation of other agents. In some embodiments, the access control integrity agent 1694 also performs challenge-response sequence verification of other agents.

Figure 18:
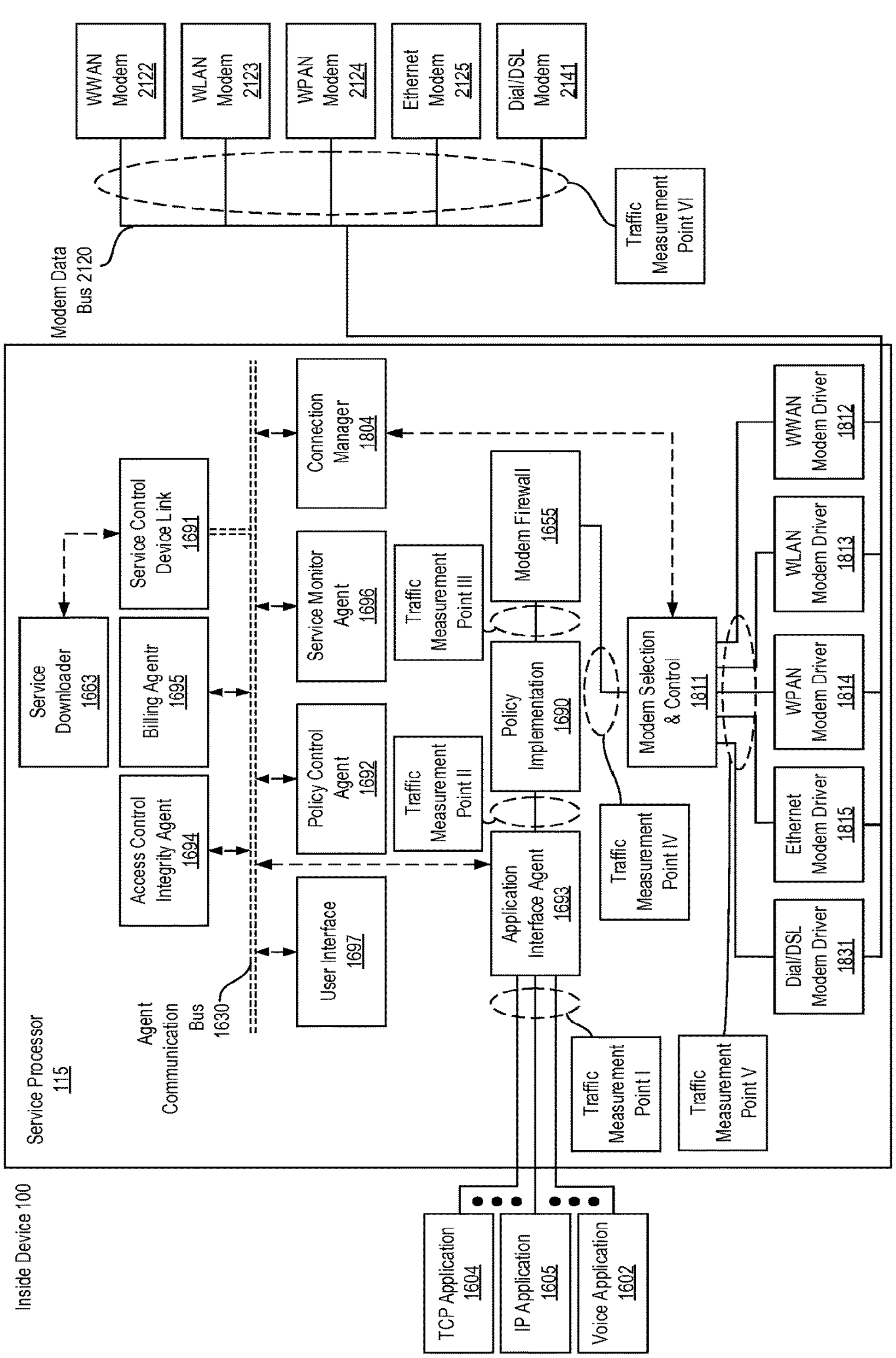
FIG. 18 is another functional diagram illustrating the service processor and the service controller in accordance with some embodiments.

In some embodiments, the access control integrity agent 1694 obtains service usage or service activity measures from a service monitor agent 1696 and compares one or more first service usage measurement points against one or more second service usage measurement points to verify service policy implementation. For example, as shown in FIG. 18, if the service usage at measurement point IV is inconsistent with measurement point III, which, for example, can indicate, for example, that an unauthorized or unmonitored usage of the access modem (e.g., modems 2122, 2123, 2124, 2125 or 2141) is taking place. As another example, as also shown in FIG. 18, if one or more aspects of upstream traffic usage measurement point II, which represents the upstream demand side of policy implementation agent 1690, is inconsistent with upstream traffic measurement point III, which represents delivered traffic from the policy implementation agent 1690, then the policy implementation agent 1690 may not be operating properly. As another example, as also shown in FIG. 18, if service measurement point III and IV indicate that firewall agent 1655 is passing traffic to URLs or IP addresses that are in the blocked policy settings, then a verification error condition can be set for the access control policy. As another example, if the policy controller reports traffic usage statistics that are inconsistent with traffic usage policy settings, then a traffic usage policy verification error may have occurred. As another example, if the service usage counter synchronization information received from the service controller 122, the device service history 1618 and/or the central billing system 1619, is compared to the service usage history reported by the service monitor agent and the two are found to be outside of acceptable tolerance limits for the comparison, then there may be a verification error in the service monitor service usage or service activity accounting. There are numerous additional embodiments of such comparisons as described herein and others as will be readily apparent to one of ordinary skill in the art given the principles, design background and specific examples and various embodiments described herein.

In some embodiments, device service policy implementations are verified by comparing various service usage measures used at the device against expected service usage or service activity behavior given the policies (e.g., one or more service policy settings, service profile or service profile settings for network based access/services, and/or service plan or service plan for network based access/services). For example, verification is performed based on a measure of total data passed at the device as compared to the service policy for total data usage. For example, verification is performed based on a measure of data passed in a period of time at the device as compared to the service policy for data passed in such a period of time. For example, verification is performed based on a monitoring of communications from the device based on IP addresses as compared to the policy for permissible IP addresses. For example, verification is performed based on a measure of total data passed from the device per IP address as compared to the policy for total data usage per IP address. Other examples include such actual versus policy comparisons based on other measures at/from/to the device, such as location, downloads, email accessed, URLs, and/or any other data, location, application, time or other criteria or any combination of criteria that can be measured for comparing with various policy settings and/or restrictions.

In some embodiments, the access control integrity agent 1694 monitors agent self-check reports to verify that agents are properly configured. In some embodiments, the access control integrity agent 1694 reports the agent self check reports to the service controller 122. In some embodiments, the access control integrity agent 1694 performs a role in service usage test transmission, reception and/or monitoring, with the usage test being tailored to test monitoring or control aspects for any subset of service activities. In some embodiments, the access control integrity agent 1694 performs a role in billing test event generation and/or monitoring. In some embodiments, the access control integrity agent 1694 checks and reports the result of service usage monitoring verification tests, service usage billing verification tests and/or transaction billing verification tests.

In some embodiments, the access control integrity agent 1694 receives agent access attempt reports to determine if unauthorized agent access attempts are occurring. In some embodiments, the access control integrity agent 1694 acts as a central secure communications hub for agent to agent or service controller 122 to agent communication. For example, the access control integrity agent 1694 can be used so that no other software or function can access other agents or so that agents cannot access other agents except through the secure point to multipoint communications hub. In some embodiments, this approach further enhances compromise resistance for the agents. In some embodiments, some or all of the agent communications, including agent to agent or service controller 122 to agent communications, and possibly including unauthorized attempts to communication with agents, are monitored and logged so that a trace log of some or all agent communications can be maintained. For example, the agent communication trace log can be summarized and/or compressed for transmission efficiency or regularly reported, such as through the heartbeat function, or the agent communication trace log can be reported only when the service controller 122 requests the agent communication trace log or when there is a verification error event. As similarly described above, the partitioning of agent functions and server functions is provided herein mainly to aid in disclosing various embodiments but those of ordinary skill in the art will appreciate that other partitioning of agent functions and server functions can be used based on different design choices. For example, the central agent communication hub function is performed in some embodiments by the access control integrity agent 1694, however, in other embodiments that function is performed by the service control device link 1691. For example, when the central agent communication hub function is located in the service control device link 1691, then architecturally the device link can be a single point to multipoint secure communications hub for all agent to agent and service controller 122 to agent communications. In some embodiments, this approach has certain advantages from a service policy implementation verification or compromise protection robustness perspective, or has certain advantages from a communications protocol efficiency perspective, or simply can be more efficient to implement. It should be noted that in other embodiments described herein the agent to agent and agent to service controller 122 communications can be multipoint to multipoint, with each agent having the capability to communicate with other agents or the service controller, this communication can be secure, signed or otherwise encrypted or protected in some embodiments and in the open/clear in others. Also, as discussed in some embodiments, the agents can maintain their own communications or attempted communications log, which can then be reported to the service controller 122. In some embodiments, the agents implement restrictions on which device components or agents the agents will conduct communications with so that only agents that need to communicate with one another can do so.

In some embodiments, the service control device link 1691 reviews local billing event history and compares such history to billing event reports to verify that a billing agent 1695 is functioning properly (e.g., has not been tampered with or compromised). In some embodiments, the service control device link 1691 cross-checks service usage or service activity against billing event reports from the billing agent 1695 to verify that billing events are properly billing for service usage or service activity. In some embodiments, the service control device link 1691 cross-checks transaction billing process or records against transaction billing reports to ensure that transaction billing events are being properly reported by the billing agent 1695. In some embodiments, the service control device link 1691 determines if one or more agents have been compromised, and if so, initiates a dynamic agent download process to replace any such potentially compromised agent.

In some embodiments, the access control integrity agent 1694 verifies that the service usage counter is reporting service usage or service cost to the user within acceptable limits of accuracy when compared to the service usage reports obtained from the service monitor agent 1696, the service controller 122, the device service history 1618 and/or the central billing system 1619. In some embodiments, the access control integrity agent 1694 checks to verify that user privacy filter preferences are being properly implemented. In some embodiments, the access control integrity agent 1694 checks to verify that the user is properly receiving UI warnings regarding service usage or roaming service usage conditions.

In some embodiments, the access control integrity agent 1694 checks to verify that the device is not beginning service usage until it has been authenticated, authorized or granted access to the network. In some embodiments, access control integrity agent 1694 checks with the service controller 122 or the billing system 1619 to verify that the user or device has a valid service standing and should be admitted to access on the network.

In some embodiments, an Activation Tracking Service (ATS) is provided in which the service monitoring function (e.g., performed by the service monitor agent 1696 and/or some other agent/component or combinations thereof on the device) is used in part to determine which access networks are being connected to and to record and/or report this information. In some embodiments, the ATS is only enabled if the device user approves reporting of access networks connected to by the user device. In some embodiments, the ATS is protected from tampering. For example, the ATS can be hardened, that is, to be more tamper resistant, using a variety of techniques, including any of the following: the ATS can be located (e.g., stored) in secure memory and/or secure hardware; the ATS can be implemented in the system BIOS, the access modem and/or another hard to access portion of the device; a second device agent can confirm the presence of the ATS with a report to a network based server; the second agent or the network server can initiate a reinstall of the ATS if it is missing or is found to be operating improperly; and/or the ATS can be placed in a secure area of the OS so that it cannot be removed or if removed must be replaced for proper device operation to resume. A variety of other tamper resistance techniques can also be used to protect the ATS from tampering as similarly described herein with respect to other device based functions/software components/agents.

In some embodiments, the access control integrity agent 1694 verifies that ATS software or hardware is present, properly configured or operating properly. In some embodiments, the access control integrity agent 1694 reviews network connection or activity history and compares such to ATS reports to verify activation tracking service reports are occurring properly. In some embodiments, the access control integrity agent 1694 replaces ATS software if it has been removed. In some embodiments, the access control integrity agent 1694 monitors access or compromise of ATS software to determine if it may have been compromised. In some embodiments, the access control integrity agent 1694 reports status of ATS functions.

In some embodiments, the access control integrity agent 1694 scans the local agent execution environment to determine if there are unauthorized accesses to service processor functions, settings or code. In some embodiments, the access control integrity agent 1694 monitors software loading activity, protected memory access or communication with service processor 115 agents to detect unauthorized changes to service processor software or configuration. For example, the access control integrity agent 1694 can have a local database of potentially malicious elements and compare entries in the database against the elements detected locally. As another example, the access control integrity agent 1694 can communicate a list of some or all of the elements detected locally to the service controller 122 to augment or take the place of the database comparison function that may be performed locally. In some embodiments, the access control integrity agent 1694 detects new software downloads, installs or invocations and immediately issues an error flag report when potentially malicious software is downloaded, installed or invoked. In some embodiments, the access control integrity agent 1694 scans the local software loading and invocation activity along with a log of other software runtime events and regularly reports this trace so that when an error or compromise event occurs the trace preceding the event can be analyzed to determine the offending software or activity trace that took place to cause the compromise or error. Once the software or activity that caused the compromise is known, it can be entered into a refreshed version of the database that the device and other devices use to detect potentially malicious pre-cursor conditions. Examples of such pre-cursor events include software invocations, software downloads, attempts to uninstall certain agent and/or application software/components or OS components, a sequence of memory I/O events, a sequence of software access events, a sequence of network address or URL communications or downloads or a sequence of access modem I/O activity. In various other embodiments of the access control integrity agent 1694, the agent performs or (securely) communicates with other software/hardware device/network components that perform other well known signature, behavior blocking and/or intrusion detection identification/detection and/or blocking techniques based on the presence of potentially unwanted and/or potentially or known malicious software and/or intrusion attempts by unauthorized software and/or unauthorized users, using, for example, real-time, on access, periodic, and/or on demand scanning.

In some embodiments, the access control integrity agent 1694 detects or blocks potentially compromising behavior of other software programs/users attempting unauthorized behavior in the service processor 115 operating environment. In some embodiments, the access control integrity agent 1694 detects software that is being loaded that has the same or similar name, identification, memory location or function as one or more of the service processor 115 agents. In some embodiments, the access control integrity agent 1694 blocks operation or loading of such software. In some embodiments, the access control integrity agent 1694 detects or blocks unauthorized access of service processor 115 protected memory. In some embodiments, the access control integrity agent 1694 verifies configuration and operation of secure service downloader 1663. In some embodiments, the access control integrity agent 1694 monitors network and I/O activity to detect potentially compromising events, such as a program that is downloaded from known detrimental or potentially suspect IP addresses or URLs or a program that accesses certain IP addresses or URLs. In some embodiments, the access control integrity agent 1694 scans of the service processor operating environment are recorded and kept for a period of time, and if a service policy verification error occurs, then the scans immediately prior to the error are analyzed or reported to the service controller 122 for analysis. In some embodiments, such scans are regularly reported to the service controller 122 without the presence of service policy verification error conditions.

In some embodiments, the access control integrity agent 1694 requests a dynamic agent download of certain critical service processor functions, including in some cases the access control integrity agent 1694 on a periodic basis, or on a periodic basis when network access activity is not required or minimal.

In some embodiments, the access control integrity agent 1694 determines if a threshold has been surpassed for a max usage trigger for ambient and/or other services that should not be using significant amounts of data (e.g., based on the type of device and/or service profile settings).

In some embodiments, the access control integrity agent 1694 determines if verification errors exist in one or more of the verification process embodiments and, in some embodiments, reports errors immediately or in the next agent heartbeat to the service controller 122. In some embodiments, any number of results from the above checks, monitoring activities, reports or tests are reported to the service controller 122.

In some embodiments, a policy control agent 1692 receives policy instructions from the service controller 122 and/or the user via the billing agent 1695 and adapts device service policy settings (e.g., instantaneous device service policy settings) in one or more of the following agents/components: a policy implementation agent 1690, the modem firewall 1655 and/or an application interface agent 1693. As shown in FIG. 16, the modem firewall 1655 is in communication with a modem driver 1640, which is in communication with the agent communication bus 1630 and access network 1610. As shown with respect to access network 1610, a central billing server 1619, an access network AAA server 1621 and device server history 1618 are also provided. As shown, the Internet 120 is accessible via the access network 1610 and firewall 124, from which device 100 can then access various Internet services 1615.

In some embodiments, the policy control agent 1692 adapts low level service policy rules/settings to perform one or more of the following objectives: achieve higher level service usage or cost objectives, reduce network control channel capacity drain, reduce network control plane server processing bandwidth, and/or provide a higher level of user privacy or network neutrality while satisfying service usage or service activity objectives. In some embodiments, the policy control agent 1692 performs a policy control function to adapt instantaneous service policies to achieve a service usage objective. In some embodiments, the policy control agent 1692 receives service usage information from the service monitor agent 1696 to evaluate service usage history as compared to service usage goals. In some embodiments, the policy control agent 1692 uses service monitor 1696 service usage or service activity history and various possible algorithm embodiments to create an estimate of the future projected service usage. In some embodiments, the policy control agent 1692 uses a future projection of service usage to determine what service usage or service activity controls need to be changed to maintain service usage goals. In some embodiments, the policy control agent 1692 uses service usage history to perform a service usage or service activity analysis to determine the distribution of service usage across service usage elements within categories, such as usage by application, usage by URL, usage by address, usage by content type, usage by time of day, usage by access network, usage by location, and/or any other categories for classifying service usage. In some embodiments, the policy control agent 1692 uses the service usage distribution analysis to determine which service usage elements or service activities are creating the largest service usage (e.g., if e-mail, social networking, or multimedia/online video application categories are creating the largest service usage).

In some embodiments, the policy control agent 1692 is instructed, for example, by the user, through billing agent 1695 to perform a service control algorithm, such as traffic shaping or download management, to manage service usage or service activities to assist the user in controlling service costs. As a basic example of such a traffic shaping algorithm, the traffic shaping algorithm can simply reduce traffic speed for all applications and traffic types successively until the service usage projections are within service usage limits for the present service billing period. To illustrate an algorithm that is more sophisticated and provides the advantage of leaving many service usage elements or service activities unaffected while only controlling down usage on the most aggressive service usage elements or service activities, the traffic shaping algorithm can identify the highest traffic usage applications and/or websites and successively reduce traffic speed just for the highest usage applications and/or websites until the service usage projections are within service usage limits for the present service billing period. These examples thereby reduce network traffic for the user in accordance with the user's service usage objectives while maintaining overall satisfactory service usage experience for the user in a manner that satisfies various net neutrality requirements (e.g., the traffic throttling of certain applications/websites based on user input in which categories based on service usage history are selected by the user, for example, a certain application may be using 90% of the aggregate traffic usage). For example, adaptive throttling algorithms can be used to throttle application traffic that the user requests throttling, such as recursively throttling of the specified application traffic (e.g., to denigrate the traffic usage associated with that application and thereby reduce overall service data usage).

In some embodiments, the policy control agent 1692 adjusts service policy based on time of day. In some embodiments, the policy control agent 1692 obtains a measure of network availability and adjusts traffic shaping policy settings based on available network capacity. In some embodiments, the policy control agent 1692 automatically and dynamically adjusts service policy based on one or more other service policy settings, the service profile and/or the service plan associated with the device and/or user of the device.

In some embodiments, various lower level service policy implementation embodiments are combined with a higher level set of service policy supervision functions to provide device assisted verifiable network access control, authentication and authorization services.

In some embodiments, device based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using IPDRs (e.g., using the device ID/device number for the device 100 to determine if the device has been used in a manner that is out of plan for the service plan associated with the device 100, such as based on the amount of data usage exceeding the service plan's service data usage limits, out of plan/unauthorized access to certain websites, and/or out of plan/unauthorized transactions). In some embodiments, service data usage of the ambient activated device is verified by setting a maximum data rate in the policy control agent 1692 and if/when it is determined that the device is exceeding a specified data rate/data usage, then the service data usage is throttled accordingly. In some embodiments, various other verification approaches are used for ambient activation purposes.

In some embodiments, the policy control agent 1692 (and/or another agent/component of the service processor 115 and/or service controller 122) performs a service control algorithm to assist in managing overall network capacity or application QoS (Quality of Service). In some embodiments, the policy control agent 1692 (and/or another agent/component of the service processor 115) performs an access network selection algorithm to determine which access network to connect to based on connection options and determined strengths of available wireless networks, network preference or security settings, service usage cost based network preferences, and/or any other criteria.

Accordingly, as described herein with respect to various embodiments, service usage or service activities can be measured by various agents at various different measurement points, which provides for a more robust verification and integrity of device based services communication. For example, it is much less likely and more difficult to compromise and/or spoof multiple agents. As described herein, various verification and integrity checks are performed, including, for example, network based service usage measurement (e.g., using IPDRs); heartbeat monitoring; agent based heartbeat (e.g., challenge/response queries); agent operating environment protection; monitoring agent communications; agent cross-checks; comparing device based and network based measures (e.g., service usage measures); dynamic software/agent download; and/or any combination of these and various other verification/integrity check techniques described herein and/or apparent from the various embodiments described herein.

In some embodiments, the device 100 is capable of connecting to more than one network and device service policies are potentially changed based on which network the device is connected to at the time. In some embodiments, the network control plane servers detect a network connection change and initiate the service policy implementation established for the second network. In some embodiments, the device based adaptive policy control agent, as described herein (e.g., policy control agent 1692), detects network connection changes and implements the service policies established for the second network.

In some embodiments, when more than one access network is available, the network is chosen based on which network is most preferred according to a network preference list or according to which network that optimizes a network cost function. For example, the network preference list can be pre-established by the service provide and/or the user and/or later modified/adjusted by either the service provider and/or the user. For example, the cost function can be based on determining a minimum service cost, maximum network performance, whether or not the user or device has access to the network, maximizing service provider connection benefit, reducing connections to alternative paid service providers, and/or any other cost related criteria for network selection purposes.

In some embodiments, the device 100 detects when one or more preferred networks are not available, implements a network selection function or intercepts other network selection functions, and offers a connection to the available service network that is highest on a preference list. For example, the preference list can be set by the service provider, the user and/or the service subscriber. In some embodiments, a notification is provided to the device/user when the device is not connected to a network (e.g., indicating in a pop-up/bubble or other UI based display a notification, such as "You are not connected to the network. Click here to learn more, get free trial, use a session, sign-up for service"). In some embodiments, the notification content can be determined based on usage service patterns, locally stored and/or programmable logic on the device and/or a server (e.g., device reports that user is not connected and WWAN is available). Decisions on what bubble to present when may be in pre-stored logic on device.

In some embodiments, service policies are automatically adapted based on the network to which device 100 is connected. For example, the device can be a cellular communication based device connected to a macrocell, a microcell, a picocell, or a femtocell (e.g., femto cells generally provide a low power, small area cellular network used, for example, in homes or offices, which, for example, can be used as an alternative to Wi-Fi access). In some embodiments, service monitoring agent 1696 and/or billing agent 1695 modify service usage counting and/or billing based on whether the device is connected to a macrocell, microcell, picocell or femtocell. In some embodiments, the device recognizes which type of network it is currently connecting to (e.g., looking up in a local or network table for the current base station connected to, and/or the information is broadcast to the device upon the connection with the base station), that is, whether it is a macrocell, microcell, picocell or femtocell. In other embodiments, the device does not recognize which type of network it is currently connected to, but reports its current base station, and the network uses a network lookup function to determine which type of network it is connected to. In some embodiments, the device adjusts the billing based on the type of network it is connected to, or in other embodiments, the device calculates an offset to such billing based on the type of network it is connected to, and/or in other embodiments, the device records such service usage associated with the type of network it is connected to and the network billing can adjust the billing accordingly. For example, the billing can be lower for service data usage over a femtocell versus a macrocell. In some embodiments, service policies are adjusted based on the type of network that the device is connected, such as billing, user notification, data usage/bandwidth, throttling, time of day, who owns the cellular network connection (e.g., user's home femtocell, or user's work femtocell, or a commercial business's femtocell like a coffee shop or any other common area like an airport) and/or any other service policy can be different for a femtocell connection (or for any other type of connection, such as a macrocell, microcell, or picocell). In some embodiments, the local service usage counter is adjusted based on the type of network (and/or based on the time of day of such service activity) that the device is connected, such as billing, user notification, data usage/bandwidth, and/or any other service policy can be different for a femtocell connection (or for any other type of connection, such as a macrocell, microcell, or picocell). In some embodiments, the service policies and/or billing policies are adjusted based on network congestion.

In some embodiments, if adaptive service policy control is not required, then the policy control agent 1692 can simply pass instantaneous service policy settings directly to the agents responsible for implementing instantaneous service policies.

In some embodiments, a policy implementation agent 1690 implements traffic shaping and QoS policy rules for the device 100. In some embodiments, the policy implementation agent 1690 provides a firewall function. In some embodiments, the policy implementation agent 1690 performs traffic inspection and characterization. In some embodiments, packet inspection is aided by literal or virtual application layer tagging while in other embodiments packet inspection is performed entirely in/by the policy implementation agent 1690. In some embodiments, the policy implementation agent 1690 accepts service policy implementation settings from the policy control agent 1692 or directly from the service controller 122. More detail on specific embodiments for the policy implementation agent 1690 is provided below with respect to the figures associated with communication stack and communication protocol flow.

In some embodiments, the burst size, buffer delay, acknowledgement delay and drop rate used in upstream and downstream traffic shaping are optimized with the goal of reducing access network traffic overhead, and excess capacity usage that can result from mismatches in traffic transmission parameters with the access network MAC and PHY or from excess network level packet delivery protocol re-transmissions. In some embodiments, the application interface agent 1693 is used to literally tag or virtually tag application layer traffic so that the policy implementation agent(s) 1690 has the necessary information to implement selected traffic shaping solutions. As shown in FIG. 16, the application interface agent 1693 is in communication with various applications, including a TCP application 1604, an IP application 1605, and a voice application 1602.

In some embodiments, downstream literal or virtual application tagging are delayed until a traffic flow passes through the service policy implementation functions and to the application interface function where the service flow is then identified and associated with the underlying traffic and application parameters, and the literal or virtual tag is then communicated to the first policy implementation function or service monitoring function in the downstream traffic processing stack. In some embodiments, prior to being associated with a literal or virtual tag, the traffic flow is allowed to pass with no traffic shaping, and once the traffic flow is identified and tagged, the appropriate traffic shaping is applied. In some embodiments, a set of traffic shaping policy parameters are applied to the unidentified traffic flow before the flow is identified, and then the traffic shaping policy for the flow is updated when the flow is tagged. In some embodiments, the traffic flow can be blocked at the application interface agent even before the tag is passed to the policy implementation functions if it is found to be associated with traffic parameters that are blocked by policy once packet processing, framing and encryption are removed.

In some embodiments, a service monitor agent 1696 records and reports device service usage or service activities of device 100. In some embodiments, service usage history is verified by a number of techniques including verifying against network based service usage history (e.g., device service history 1618) and the various service policy implementation techniques as described herein.

In some embodiments, the service monitor agent 1696 includes the capability to filter service usage history reporting with the decision on which aspects of service history to report being determined by policies including possibly privacy policies defined by the device user or control plane servers in the network. In some embodiments, the service monitor agent 1696 monitors and possibly records or reports Customer Resource Management (CRM) information such as websites visited, time spent per website, interest indications based on website viewing, advertisements served to the device, advertisements opened by the user, location of the user, searches conducted by the user, application usage profile, device user interface usage history, electronic commerce transactions, music or video files played, applications on device, and/or when the user is actively working or playing or inactive. In some embodiments, to protect the privacy of this user CRM information, the user is provided with options on how much of the information to share and the user's response to the options are recorded and used to determine the filtering policy for how much of the CRM data to report (e.g., CRM filter level options selected by the user via the device UI and/or via various service plan or service profile or service policy options) and how much to suppress or to not even monitor/record/store in the first place. In some embodiments, to protect the privacy of this user's GPS/location tracking related information, the user is provided with options on how much of the information to share and the user's response to the options are recorded and used to determine the filtering policy for how much of the GPS/location tracking related data to report (e.g., GPS/location tracking filter level options) and how much to suppress or to not even monitor/record/store in the first place. In some embodiments, the service processor 115 allows the user to provide feedback on the user's preferences, such as for privacy/CRM data to report. In some embodiments, the user can also specify their preference(s) for notification (e.g., related to service usage/cost, traffic reporting and other service usage/monitored information) and/or service controls. In some embodiments, the service monitor agent 1696 observes and possibly records or reports service usage categorized by network possibly including roaming networks, paid service networks or free service networks. In some embodiments, the service monitor agent 1696 observes and possibly records or reports service usage categorized by sub-accounts for various types of traffic or various types of network.

For example, service monitor reports can be provided to the service controller 122. Service is monitored through various embodiments that can involve service usage logging or traffic inspection and usage logging at the application level, various levels in the networking communication stack or the access modem. Some embodiments involve multiple levels of service or traffic measurement at various levels in the communications stack as described further below.

In some embodiments, service or traffic monitoring includes monitoring one or more of the following: traffic associated with one or more users; traffic downstream and/or upstream data rate; total traffic received and/or transmitted over a period of time; traffic transmitted and/or received by IP addresses, domain names, URLs or other network address identifiers; traffic transmitted and/or received by email downloads or uploads; traffic transmitted and/or received by an application; traffic transmitted and/or received by network file transfers; traffic transmitted and/or received by file download or upload content types; traffic transmitted and/or received by mobile commerce transactions; traffic transmitted and/or received by one or more time periods; traffic transmitted and/or received by differing levels of network activity and network capacity availability; traffic transmitted and/or received by one or more delivered levels of quality of service; traffic transmitted and/or received by software downloads; traffic transmitted and/or received by application downloads; traffic transmitted and/or received by one or more activities associated with the service control plane link or other network related functions, or traffic that may not directly result in service usage or service activity that the user values or desires; traffic transmitted and/or received to support one or more service provider third party service partner offerings; software usage history; application usage history; device discovery history for UI components, applications, settings, tutorials; ads served history; ads visited history; and/or device location history.

In some embodiments, some or all of the service usage monitoring occurs at the application layer. In some embodiments, the service monitor agent 1696 implements traffic inspection points between the applications and the networking stack application interface, such as the sockets API. In other embodiments, the application interface agent 1693 performs traffic inspection and reports the results to the service monitor agent 1696. Traffic inspection can be accomplished in several ways, including, for example, implementing a T-buffer at each socket connection and feeding the side traffic into a traffic flow analyzer, which in combination with a mapping of application to socket provides much of the information listed above. In cases in which it is necessary to obtain traffic information from the application itself, some embodiments call for the application to be adapted to provide the information to either the application interface agent 1693 or the service monitor agent 1696. As an example, the application interface agent 1693 or the service monitor agent 1696 can monitor and decode advertisements downloaded via HTTP, but if the browser and HTTP server employ security above the sockets protocol stack layer then the application interface agent can communicate with the browser via a java applet or some other inter-process communication method. In some embodiments, the service monitor agent 1696, the billing agent 1695 and/or the policy control agent 1692 (or some other software or hardware function on the device) can monitor and/or control (e.g., allow, block and/or replace) advertisement traffic flow into the device. In some embodiments, the monitoring and control of advertisement traffic flow into the device is also used for bill by account purposes (e.g., charges, such as service charges, billed to the advertiser, sponsor, and/or service or transactional service provider).

In some embodiments, some or all of the service usage monitoring occurs below the application interface for the networking stack. In this case, some portion of the information listed above may not always be available due to encryption applied at the higher layers and/or the computational costs associated with performing deep packet inspection on mobile devices.

In some embodiments, the service monitor agent 1696 is also monitors the operating software install or loading systems, and/or otherwise monitors software installs or loads and/or software uninstalls/de-installations.

Some of the information above may be considered by some users, advocacy groups or agencies as customer sensitive personal information. Simply sending the above information to the network for unspecified purposes may not, therefore, be acceptable for some service providers. However, if the user provides specific approval (e.g., informed consent) for the device, network or service provider to use some or all of the information that may be sensitive for specified purposes, then the user can control the level of information that is used and the purpose the information is used for. Accordingly, various embodiments described herein provide the user with control of what information is used and the purposes it is used for thereby allowing the user adequate control of any such sensitive information. In some embodiments, information that is thought to perhaps be sensitive and is reported to the network must first receive user approval for the reporting. Some basic information is generally not considered sensitive and is necessary for certain basic service provider needs. For example, total data transmitted and/or received, traffic downstream and/or upstream speed, overall traffic usage by time of day are generally not considered private from the service provider's perspective and are necessary in many basic service policy implementations. As additional examples, perhaps other service usage history, such as total traffic email downloads and uploads but not the type of files or any specifics about the email traffic, the total web browsing traffic but nothing specific about the sites visited or content viewed, total file transfer traffic but not the type of files transferred or the addresses involved in the transfer, and other examples may not be viewed as private and, in some embodiments, provide valuable information for the service provider to manage services. Conversely, information such as websites visited, content viewed, mobile commerce transactions completed, advertisements visited, GPS location history and other service usage history the service monitor is capable of recording may be sensitive or private for some users and would thereby benefit from the various embodiments that provide enhanced user control of the reporting of such potentially sensitive or private data. It should also be appreciated that there is an inherent advantage to implementing traffic monitoring, traffic, service monitoring or service control on a device, because it is not necessary to report sensitive information to the network to accomplish many of these service policy implementation objectives.

In some embodiments, the service monitor agent 1696 assists in virtual application tagging of traffic flows through the networking stack policy implementation by tracking the virtually tagged packets through the stack processing and communicating the flow tags to the service policy implementation agent(s) 1690. In some embodiments, the service monitor agent 1696 maintains a history and provides reports or summary reports of which networks in addition to the networks controlled by the service controller 122 to which the device has connected. In some embodiments, this network activity summary includes a summary of the networks accessed, activity versus time per connection, and/or traffic versus time per connection. In some embodiments, the traffic reports that go to the network, possibly to service controller 122, billing system 1619 and/or device service history 1618, are first filtered according to rules defined by user preference selection at the time of service activation (e.g., service plan/service plan option selection), time of first device use, at a time the user selected the option on the service UI or at a time the user chose to change the option on the service UI or some other time/mechanism allowing for user preference selection.

In some embodiments, the service monitor agent 1696 monitors application usage (e.g., which application the user executes on the device 100, such as e-mail applications, web browsing applications and/or media content streaming applications). In some embodiments, the service monitor agent 1696 monitors multimedia file usage (e.g., based on multimedia file type and/or based on specific multimedia files, such as specific movies and/or songs). In some embodiments, the service monitor agent 1696 monitors the device user interface, application, and content discovery history (e.g., monitoring which applications/content the user accesses from the device, including monitoring the pattern by which the user accesses such applications/content, such as how the user navigates the user interface on the device to access such applications/content and maintaining such patterns and history, such as which icons the user access on a home page, secondary or other portion/mechanism on the device for accessing various applications/content). In some embodiments, the service monitor agent 1696 monitors advertisements provided to the user on the device 100. In some embodiments, the service monitor agent 1696 monitors advertisements viewed (e.g., accessed, such as by clicking on a web advertisement) by the user on the device 100. In some embodiments, the service monitor agent 1696 monitors GPS/location information for the device 100. As will be appreciated by those of ordinary skill in the art, the service monitor agent 1696 can monitor a wide variety of activities performed by the device/user of the device and/or based on other information related to the device 100 such as GPS/location information. As described herein, in some embodiments, the user of the device 100 can also specify which activities that the user authorizes for such monitoring (e.g., the user may prefer to not allow for such GPS/location monitoring).

In some embodiments, the application interface agent 1693 provides an interface for device application programs. In some embodiments, the application interface agent 1693 identifies application level traffic, reports virtual service identification tags or appends literal service identification tags to assist service policy implementation, such as access control, traffic shaping QoS control, service type dependent billing or other service control or implementation functions. In some embodiments, the application interface agent 1693 assists with application layer service usage monitoring by, for example, passively inspecting and logging traffic or service characteristics at a point in the software stack between the applications and the standard networking stack application interface, such as the sockets API. In some embodiments, the application interface agent 1693 intercepts traffic between the applications and the standard network stack interface API in order to more deeply inspect the traffic, modify the traffic or shape the traffic (e.g., thereby not requiring any modification of the device networking/communication stack of the device OS). In some embodiments, the application interface agent 1693 implements certain aspects of service policies, such as application level access control, application associated billing, application layer service monitoring or reporting, application layer based traffic shaping, service type dependent billing, or other service control or implementation functions.

In some embodiments, application layer based traffic monitoring and shaping can be performed as described below. The traffic from each application can be divided into one or more traffic flows that each flow through a traffic queue, with each queue being associated with one or more additional classifications for that application (e.g., the application can be a browser that is associated with multiple queues representing different destinations or groups of destinations it is connected to, with each destination or group of destinations having potentially different access control or traffic control policies, or the application can be associated with different content types or groups of content types with each content type having different queues, the application might be an email program with email text traffic going to one queue and downloads going to another with different policies for each). In some embodiments, queues are formed for all applications or groups of applications that are associated with one or more traffic parameters such as destination, content type, time of day or groups of applications can be similarly assigned to different queues. The functions performed by the application layer queues can be similar to the functions described for the policy implementation agent, such as pass, block, buffer, delay, burst in order to control the traffic or network access associated with the queue. The drop function can also be implemented, such as for application layer protocols that include reliable transmission methods, but if the application layer protocol does not involve reliable retransmission of lost information this can result in lost data or unreliable communication which may be acceptable in some cases. The manner in which the queues are controlled can be constructed to result in a similar approach for controlling services or implementing service activity control similar to the other embodiments described herein, including, for example, the policy control agent 1692 implementing an higher layer of service control to achieve a higher level objective as discussed herein.

In some embodiments, the application interface agent 1693 interacts with application programs to arrange application settings to aid in implementing application level service policy implementation or billing, such as email file transfer options, peer to peer networking file transfer options, media content resolution or compression settings and/or inserting or modifying browser headers. In some embodiments, the application interface agent 1693 intercepts certain application traffic to modify traffic application layer parameters, such as email file transfer options or browser headers. In some embodiments, the application interface agent 1693 transmits or receives a service usage test element to aid in verifying service policy implementation, service monitoring or service billing. In some embodiments, the application interface agent 1693 performs a transaction billing intercept function to aid the billing agent 1695 in transaction billing. In some embodiments, the application interface agent 1693 transmits or receives a billing test element to aid in verifying transaction billing or service billing.

In some embodiments, a modem firewall 1655 blocks or passes traffic based on service policies and traffic attributes. In some embodiments, the modem firewall 1655 assists in virtual or literal upstream traffic flow tagging. Although not shown in FIG. 16, in some embodiments, the modem firewall 1655 is located on either side of the modem bus and in some embodiments it is advantageous to locate it on the modem itself.

In some embodiments, the billing agent 1695 detects and reports service billing events. In some embodiments, the billing agent 1695 plays a key role in transaction billing. In some embodiments, the billing agent 1695 performs one or more of the following functions: provides the user with service plan options, accepts service plan selections, provides options on service usage notification policies, accepts user preference specifications on service usage notification policies, provides notification on service usage levels, provides alerts when service usage threatens to go over plan limits or to generate excess cost, provides options on service usage control policy, accepts choices on service usage control policy, informs policy control agent 1692 of user preference on service usage control policy, provides billing transaction options and/or accepts billing transaction choices. In some embodiments, the billing agent 1695 interacts with transaction servers (e.g., open content transaction partner sites 134) to conduct ecommerce transactions with central billing 1619.

In some embodiments, service processor 115 includes one or more service usage or service activity counters. For example, the service monitor agent 1696, billing agent 1695 or a combination of these agents and/or other agents/components of service processor 115 can include such a local service usage counter(s) for the device 100. In some embodiments, a service usage counter monitors service usage including data usage to/from the device 100 with the access network 1610. In some embodiments, the service usage counter periodically, in response to a user request, in response to a service processor 115 agent's request (e.g., the billing agent 1695, the policy control agent 1692, or another agent of service processor 115), in response to the service controller 122, and/or in response to the central billing 1619 (e.g., for billing purposes and/or for storing in the device service history 1618), provides a service usage report, including monitored service usage for the device 100. In some embodiments, the service usage counter periodically, or in response to a request, synchronizes the service usage counter on the device 100 with a network (and/or billing) service usage counter, such as that maintained potentially at central billing 1619. In some embodiments, service processor 115 utilizes the service usage counter to provide a service usage projection. In some embodiments, service processor 115 utilizes the service usage counter to provide a service usage cost estimate. In some embodiments, service usage projections from policy control agent 1692 are used to estimate the projected future service usage if user service usage behavior remains consistent. In some embodiments, service processor 115 utilizes the service usage counter to provide a cost of service usage, and the service processor 115 then periodically, or in response to a request, synchronizes the cost of service usage with, for example, the central billing 1619. In some embodiments, the service processor 115 utilizes the service usage counter to determine whether the user is exceeding and/or is projected to exceed their current service plan for data usage, and then various actions can be performed as similarly described herein to allow the user to modify their service plan and/or modify (e.g., throttle) their network data usage. In some embodiments, the service usage counter can support providing to the user the following service usage related data/reports: service usage, known usage and estimated usage, projected usage, present costs, projected costs, cost to roam, cost to roam options, and/or projected roaming costs. For example, including a local service data usage counter on the device 100 allows the service processor 115 to more accurately monitor service data usage, because, for example, network (and/or billing) service usage counters may not accurately also include, for example, control plane data traffic sent to/from the device 100 in their monitored service data usage count.

In some embodiments, verifiable device based service billing solutions are provided. For example, as described herein, various device based service billing solutions can include a wide range of verification techniques to ensure that the device is properly reporting service billing events (e.g., to verify/ensure that the service billing is not malfunctioning and/or has not been tampered with/compromised such that it is not accurately or timely providing service billing information). As described herein, service billing generally refers the billing for one or more services for a device, such as device 100 (e.g., email service billing for data usage associated with received/sent email related data over the access network 1610, web browsing service billing for data usage associated with received/sent web browsing related data over the access network 1610 and/or any other network based service, and/or any transactional based services, such as for multimedia content purchases or other transactions).

In some embodiments, verifiable device based service billing is provided by sending dummy(/test) billing events, such as having an access control integrity server 1654 of the service controller 122 instruct the access control integrity agent 1694 to send a dummy(/test) billing event to the billing agent 1695. If the billing agent does not then send the expected report, which should reflect the dummy(/test) (or fails to timely send any report), then the system can verify whether the billing process is working properly. In addition, a dummy(/test) transaction can be used to verify transaction based billing through a variety of approaches (e.g., the access control integrity agent 1694 can similarly send a dummy(/test) transactional billing event to the billing agent 1695 as a test to determine whether the billing agent 1695 then provides the expected report reflecting that dummy(/test) transaction). For example, the test billing events can be trapped by a device assisted billing mediation server and removed from the user account billing.

In some embodiments, verifiable device based service billing is provided by sending one or more data bursts to the device to confirm that data was received and to confirm that the service monitor agent 1696 properly logged the data burst(s) in the local service usage or service activity counter. In some embodiments, data bursts can be used to verify data throttling (e.g., if the device has exceeded service data usage limits and/or is approaching such limits such that service data usage should be throttled, then sending data bursts can be used to verify whether the expected throttling is properly being performed on the device). In some embodiments, verifiable device based service billing is provided by submitting requests to connect to an unauthorized service/website to verify if that unauthorized service usage is properly blocked. In some embodiments, verifiable device based service billing is provided by submitting requests to perform an unauthorized transaction to verify if that unauthorized transaction is properly blocked.

In some embodiments, verifiable device based service billing is provided by verifying device service activities relative to IPDRs for the device. In some embodiments, the IPDRs for the device (possibly in a modified format) are periodically and/or upon request sent to the device, as described herein. For example, IPDRs for the device can be compared to the device's local service data usage counter and/or to the service plan for the device to determine if the overall service data usage limit has been exceeded, whether out of plan/unauthorized/unrecorded websites/other services have been performed by the device, whether service plan/profile bandwidth limits have been exceeded, whether out of plan/unauthorized/unrecorded transactions have been performed (e.g., verifying IPDR transaction logs, assuming such are included in the IPDRs, with the local transaction logs of the device to determine, for example, whether the local device records indicate that fewer than the network recorded number of content downloads, such as downloaded songs, were purchased), and/or whether any other activities verifiable based on a comparison of IPDRs indicate that the device has been used in any manner that is out of or exceeds the service plan/profile for the device.

In some embodiments, device based service billing includes recording billing option response history. For example, this approach can be particularly important for service plan overage conditions (e.g., when the use of the device is exceeding the service plan associated with the device in some manner, such as service data usage, bandwidth, service or transaction access and/or in some other manner). In some embodiments, in a service plan overage condition, the user is requested to confirm that user has acknowledged notification of service plan overage, such as via the user interface 1697. In some embodiments, such service plan overage acknowledgements require that the user enter a unique identification to validate authorization by the user identity associated with the device (e.g., another type of verification mechanism, in the event a device is stolen or being used by someone other than the authorized user of the device, then that unauthorized user would not be able to confirm the service plan overage acknowledgement, and appropriate actions can then be taken, such as throttling, quarantining or (temporarily) suspending service/network access). In some embodiments, if the device is compromised/hacked (e.g., by the user of the device), and the device is used in a manner that results in a service usage overage (e.g., determined based on device assisted service usage monitoring, and/or network based service usage monitoring using IPDRs/CDRs), then the billing system determines billing for such service usage overage costs. This overage billing can be initiated by the device 100 (e.g., service processor 115), the service controller 122, the billing system 123, the AAA 121, or some other network function. In some embodiments, if the device is compromised/hacked (e.g., by a user of the device), and the device is used in a manner that results in a service usage overage, one or more of the following actions is taken: the user is notified, the user is required to acknowledge the notification, the device traffic is sent to SPAN (or similar traffic sampling and analysis function), and/or the device is flagged for further analysis.

In some embodiments, device based service billing includes an option to bill by account, such as to bill different service activities and/or transactions to a specified account (e.g., other than the user's account associated with the general service plan for the device). For example, bill by account can provide for billing according to application, content type, website, transaction, network chatter (e.g., heartbeat communications and/or other network traffic that is used by, for example, the central/service provider to generally maintain network access for the device), and/or transaction partner sponsored activities and then report such bill by account information for billing mediation/reconciliation. For example, a bill by account report can be sent by billing agent 1695 from the device to central billing 1619 (e.g., as a billing event); or alternatively, sent to an intermediate server/aggregator, which can then reformat and send the reformatted report to central billing 1619 (e.g., providing the billing report in a format required by central billing 1619); or alternatively, sent to a mediation server, which can re-compute the billing based on the bill by account report (e.g., offset the bill based on network chatter, transaction based billing, transaction partner sponsored activities, content providers, website providers and/or advertising providers) and then send the recomputed (and potentially reformatted) report to central billing 1619.

In some embodiments, one or more of the mediation/reconciliation functions for device assisted billing, device generated billing events, device generated bill by account events and device generated open transaction billing events can be implemented in the service controller 122 (e.g., the billing event server 1662) or in another function located in the billing system 123 or elsewhere. This billing mediation server function accepts the device based billing events discussed immediately above, reformats the billing events into a format accepted and recognized by the billing system, mediates the billing event information to remove service usage billing from the user account and place it in other bill by account categories as appropriate according to the bill by account mediation rules, adds other billing events for service usage or transactions to the user account as appropriate according to the device based billing rules, and then applies the information to the billing information the user account to correct or update the account.

For example, a bill by account can allow for a website provider, such as Google or Yahoo, to pay for or offset certain account usage for web browsing, web based searching, web based email, or any other web based or other service usage activities, which may also be based (in whole or in part) on the activities performed by the user on such transactional services (e.g., based on advertisement viewing/accessing or click-through activities by the user, by which an advertisement business model used by such website providers directly or indirectly supports such service account subsidies). As another example, a bill by account can allow for an advertiser to pay for or offset certain account usage for viewing and/or accessing (e.g., clicking through) a web placed advertisement or other advertisement sent via the network to the device. As yet another example, various network chatter (e.g., heartbeat related network and other network chatter related service data usage) can be assigned to a dummy account and such can be used to offset the bill and/or used for tracking the data usage for such activities for the device. In another example, service data usage for access to a transactional service, such as a multimedia content download service (e.g., music, eBook, music/video streaming, and/or movie or other multimedia content download service), or an online shopping site (e.g., Amazon, eBay or another online shopping site), can be billed to a transactional service account assigned to a transactional service partner that sponsors access to that sponsor's transactional service, thereby allowing that transactional service partner to pays for or offset (e.g., subsidize) the account usage for such activities, which may also be based (in whole or in part) on the transactions actually performed by the user on such transactional services (e.g., based on the volume/cost of the multimedia service download purchases by the user and/or online activities).

In some embodiments, device based service billing includes recording billing events on the device and then reporting such billing to the network (e.g., central billing 1619). In some embodiments, device based service billing includes reporting service usage events and/or applying cost look-up and logging/reporting service billing updates. For example, this allows for reporting not only service usage but also cost of such service usage to the user via the user interface of device 100. Also, for example, the cost of such service usage can also be reported to the billing server. In some embodiments, device based service billing includes reporting service usage to the network, and the network determines the cost for such service usage.

In some embodiments, billing information for roaming partners is provided. For example, a roaming server can include a roaming service cost data table for roaming service partners. In this example, when the device (e.g., device 100) connects to a roaming network provided by a roaming service partner, then the device can also receive the roaming service data rate based on the roaming service cost data table provided by the roaming server. Alternatively, the roaming server can send the roaming service cost data table (or a modified format of the same) to the device thereby allowing the device to determine the costs for such roaming network service usage or service activity. As described herein, the device can also automatically use a roaming service profile when connecting to the roaming network service and/or the user can be notified of the roaming service profile options based on the roaming service data costs and then select the desired roaming service profile accordingly.

In some embodiments, the user is provided with a list of service costs based on locally stored roaming table and a search of available roaming partners that the device 100 detects and can connect to. In some embodiments, the user is provided with a projected cost per day for one or more roaming service provider options based on typical service usage history and the cost for each service provider. In some embodiments, the user is provided with a set of options for service usage notification, controlling or throttling service usage and/or cost while roaming (e.g., using the service notification and cost control techniques as similarly discussed herein but applied to the roaming network). In some embodiments, these controls are set by a VSP (or, e.g., an IT manager using VSP functions). In some embodiments, roaming tables are updated periodically in the background while on a home network (or other low cost network) and cached. In some embodiments, cache updates occur based on fixed time period (e.g., late at night when updates are less expensive due to network inactivity). In some embodiments, the roaming partner cost table cache updates are done whenever connected to a desirable network that is not as expensive or bandwidth constrained (e.g., at home, work, or off the WWAN). In some embodiments, updates occur at time of day that network is not busy. In some embodiments, updates occur based on network push when roaming table is changed (e.g., one or more of the roaming partners changes the rate). In some embodiments, the service cost to update the roaming service cost table is charged to bill by account and possibly not charged to end user. In some embodiments, the roaming service center is provided as a service that is paid for (e.g., potentially bill by account tracks all related costs). For example, this type of roaming cost control can be provided as a service through central provider, MVNO, roaming partner provider, VSP or as a third party application not associated with any service provider (e.g., IT manager). For example, the controls for how to update cache, set service control policies, and other controls can be defined by any number of VSP entities including the user through a website service.

In some embodiments, a roaming service center is provided as a service in which, for example, the user is provided with a list of service costs based on a locally stored (or remotely accessed) roaming table. In some embodiments, the roaming service center provides the user with a projected cost per day for one or more roaming service provider options based on typical service usage history and the cost for each service provider. In some embodiments, the roaming service center provides the user with a set of options for controlling/throttling usage and/or cost while roaming. In some embodiments, these controls are set by a VSP (e.g., an IT manager using VSP functions). For example, roaming tables can be updated periodically in the background while on a home network and cached. In some embodiments, cache updates occur based on a fixed time period. In some embodiments, the roaming partner cost table cache updates are done whenever the device is connected to a desirable network that is not as expensive or bandwidth constrained (e.g., at home, work and/or off the WWAN). In some embodiments, updates occur at time of day that network is not busy. In some embodiments, updates occur based on a network push when a roaming table is changed (e.g., one or more of the roaming partners changes the rate). In some embodiments, the service cost to update the roaming service cost table is charged to bill by account and possibly not charged to the user. In some embodiments, the roaming service center is provided as a service that is paid for by the user and/or part of a service plan. In some embodiments, a bill by account function tracks all related costs. For example, the roaming service center can be provided as a service through central provider, MVNO, roaming partner provider, VSP or as a third party application not associated with any service provider (e.g., IT manager).

In some embodiments, a synchronized local service usage counter based on time stamped central billing information is provided. For example, the local service usage counter, as similarly described above, can also be synchronized to past service usage records (e.g., time stamped central billing records of service usage for the device) and use local estimates for current/present service usage estimates for the device. In this example, the central billing system (e.g., central billing 1619) can push the time stamped central billing information to the device (e.g., device 100), the device can pull the time stamped central billing information, and/or an intermediate server can provide a mediated push or pull process. In some embodiments, synchronization is performing periodically based on service usage levels with free-running estimates between synchronizations.

In some embodiments, service usage is projected based on calculated estimates of service usage based on synchronized service usage and local service usage count information. For example, projected service usage can be calculated on the device or calculated on a server (e.g., a billing server or an intermediate billing server), which provides the calculated projected service usage information to the device, such as using various adaptive algorithms for service usage projections. For example, an adaptive algorithm can use historical/past synchronized network service usage information (e.g., synchronized with local service usage data based on time stamps associated with IPDRs) to assist in service usage projections, based on, for example, total service usage count, service usage count by certain service related criteria (e.g., application, content, service type, website and/or time of day). In another example, an adaptive algorithm synchronizes to past service usage data (e.g., the local estimate of past service usage data is updated to be synchronized up through the point in time associated with the latest IPDR time stamp that has been received) and current local estimates of service usage collected since the latest time stamp are then added to the time stamped IPDR service usage counter to minimize the service usage counter offset so that it is no greater than the difference between the network service usage measure and the local service usage measure since the latest IPDR time stamp. In some embodiments, these adaptive algorithm techniques are performed on the device and/or performed on the network (e.g., on a network server) for processing. In some embodiments, if there is an offset in the local device based service usage count between IPDR synchronization events and the IPDR service usage count between IPDR synchronization events, then an algorithm can be employed to estimate any systematic sources for the offset and correct the local service usage count to minimize the offsets. As an example, if the IPDR service usage count is typically off by a fixed percentage, either high or low, then an algorithm can be employed to estimate a multiplier that is applied to the local service usage count to minimize the offset between IPDR service usage synchronization events. In another example, there can be a consistent constant offset and a multiplier offset, both of which can be estimated and corrected for. Those of ordinary skill in the art will appreciate that more sophisticated algorithms can be employed to estimate the nature of any systematic offsets, including, for example, offsets that occur due to specific service usage activities or network chatter to manage the device, and such offsets can then be minimized between IPDR service synchronization events. In some embodiments, synchronized service usage data is used to create an improved analysis of the statistical patterns of service usage to provide more accurate service usage projections. Those of ordinary skill in the art will also appreciate that a variety of additional adaptive algorithm techniques can be used including those that provide for various statistical analysis techniques and/or other techniques.

In some embodiments, service usage is projected for the end of a billing/service period for a service plan versus the service usage allowed under the service plan for that billing/service period. A display of excess charges is also provided for the projected rate of service usage based on the monitored service usage behavior through the end of the billing/service period (e.g., this can be zero if the service usage is projected to be less than that allowed under the service plan and a positive cost number if it is projected to be more than the service plan). For example, this can be implemented in numerous ways, such as on a server in the network, on a gateway/router/switch in the network, and/or on the device, as discussed below and generally described herein with respect to other service/cost usage monitoring and notification embodiments. If implemented in the network server or gateway/router/switch, then the service/cost usage projections and related information can be pushed to the device, or the device can be notified that such information is available to pull and/or periodically pushed/pulled. The service usage information/estimates can be collected from the device, the network or both (e.g., reconciled and/or synchronized) as similarly described herein. The service usage information/estimates are then analyzed to determine service usage/cost projects as similarly described herein and compared to the service plan for the device to determine the projected service/cost usage overage (if any). In some embodiments, one or more of the following are determined by, reported to and/or displayed on the device: service usage value, projected service usage value, service usage plan limit, projected service usage overage, projected service cost overage, service plan period time duration, service plan time remaining before end of period and/or other pertinent information.

In some embodiments, the device also determines service costs based on the synchronized service usage count thereby allowing the device to also report the service cost information to the user. For example, the device can locally store a service cost look-up table(s), locally store different service cost look-up tables for different networks and/or for roaming networks, and/or request such information from a billing or intermediate billing server (and/or a roaming server) on the network. As another example, the device can obtain the calculated service costs based on the synchronized local service usage count and/or network service usage count from an intermediate server (e.g., a billing or intermediate billing server) thereby offloading the computational costs associated with calculated these projections and the data storage for service cost lookup tables onto the intermediate server on the network using the network service usage counter with or, alternatively, without the synchronized local service usage counter.

In some embodiments, service usage count categorization by network (e.g., a home network (such as a Wi-Fi, WAN, femtocell or other home network) versus a roaming network) is provided. Similarly, the synchronized local service usage counter can be synchronized by network. Also, a synchronized local service usage count for networks controlled by a central provider, for networks controlled by other providers (e.g., MVNO), and/or free networks can similarly be provided.

In some embodiments, a service notification and billing interface is provided. For example, service usage and projected service usage, such as described herein, can be displayed to the user of the device (e.g., via user interface 1697). Similarly, expected/projected service or cost overrun/overage, such as described herein, can also be displayed to the user. As another example, a most cost effective plan can be determined/projected based on historical and/or projected service usage, and this determined/projected most cost effective plan can be displayed to the user. In yet another example, a list of available networks accessible by the device can be displayed to the user. In this example, one or more undesired available networks can also be blocked from display thereby only displaying to the user desired and/or preferred available networks. In this example, service usage plans and/or service usage plan option comparison for one or more alternative networks or roaming networks can also be displayed to the user. Similarly, service cost plans and/or service/cost plan option comparison for one or more alternative networks or roaming networks can also be displayed to the user. In addition, roaming service usage, projected roaming service usage, estimated roaming service cost, and/or projected estimated roaming service cost can also be displayed to the user. These roaming service usage/costs can also be displayed to the user so that the user can utilize this information for selecting various roaming service billing options. In another example, alternative and/or least cost networks are determined and displayed to the user. In another example, alternative warnings are displayed to the user for any or specified roaming networks.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to the billing server (e.g., central billing 1619). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

In some embodiments, an online portal or web server is provided for allowing the user to select and/or update policy settings. For example, user input provided via the online portal/web server can be recorded and reported to the billing server (e.g., central billing 1619). In another example, the online portal/web server can display transaction billing information and/or accept input for a transaction billing request, which can then be reported to the billing server accordingly.

As shown in FIG. 16, the service processor 115 includes a service interface or user interface 1697. In some embodiments, the user interface 1697 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 1697 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 1619 can be used to synchronize local service usage counters and service monitor agent 1696 information to perform real-time updating of local service usage counters between billing system 1619 synchronizations. As another example, the user interface 1697 can display options and accept user preference feedback, such as similarly discussed above with respect to user privacy/CRM/GPS filtering, traffic monitoring and service controls. For example, the user interface 1697 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 1697 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO, VSP, service provider partner, and/or other "entity" in a manner specified or influenced by the user to maintain the user's desired level of information privacy.

As shown in FIG. 16, the service processor 115 includes the service downloader 1663. In some embodiments, the service downloader 1663 provides a download function to install or update service software elements on the device. In some embodiments, the service downloader 1663 requires a secure signed version of software before a download is accepted. For example, the download can require a unique key for a particular service downloader 1663. As another example, the service downloader 1663 can be stored or execute in secure memory or execute a secure memory partition in the CPU memory space. Those of ordinary skill in the art will appreciate that there are a variety of other security techniques that can be used to ensure the integrity of the service downloader 1663.

Figure 17:
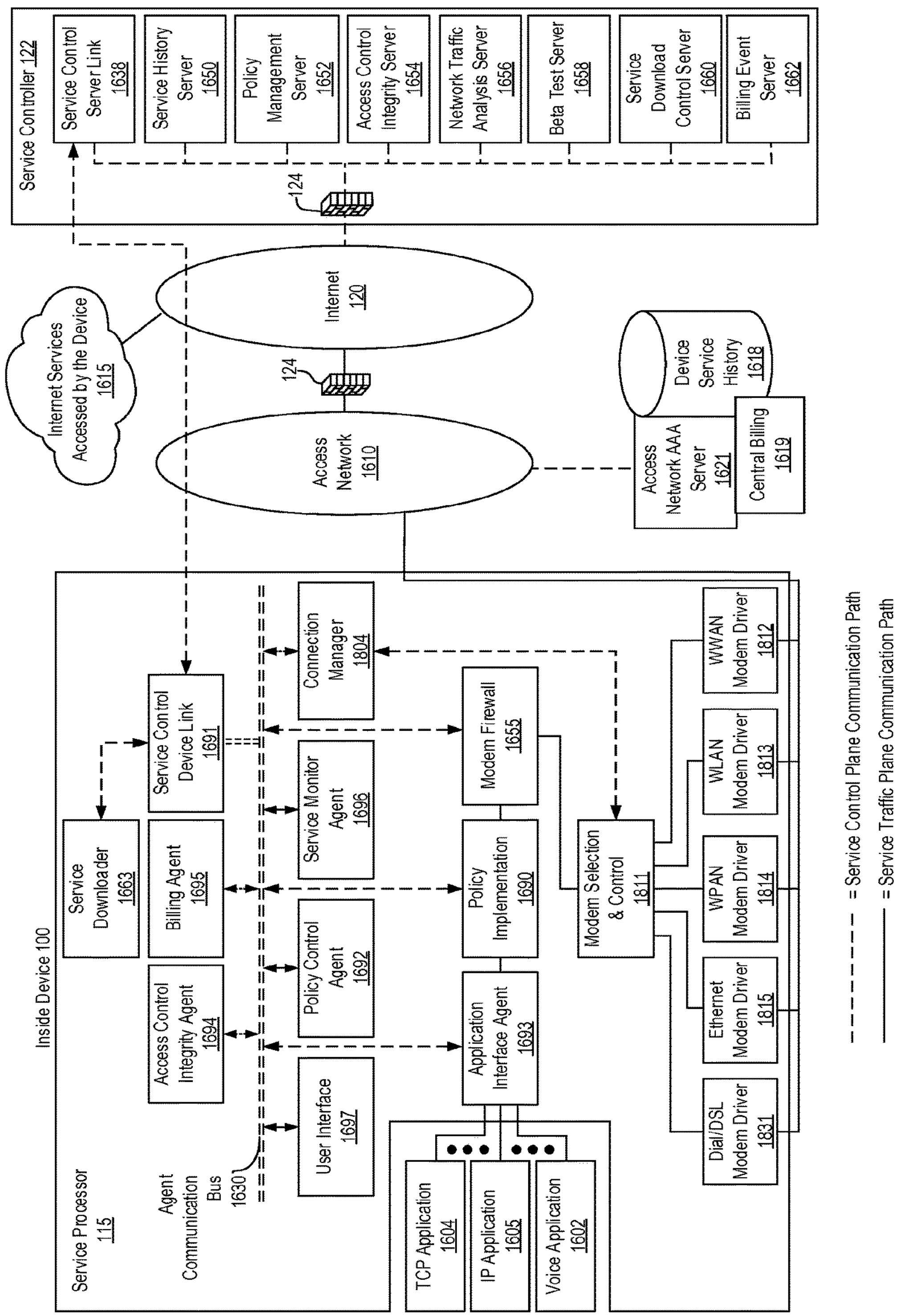
FIG. 17 is another functional diagram illustrating the device based service processor and the service controller in which the service processor controls the policy implementation for multiple access network modems and technologies in accordance with some embodiments.

As shown in FIG. 16, the service processor 115 includes a modem driver 1640. In some embodiments, the modem driver 1640 converts data traffic into modem bus (not shown) traffic for one or more modems via the modem firewall 1655. As shown in FIG. 17, in some embodiments, modem selection and control 1811 selects the access network connection and is in communication with the modem firewall 1655, and modem drivers 1831, 1815, 1814, 1813, 1812 convert data traffic into modem bus traffic for one or more modems and are in communication with the modem selection and control 1811. As shown in FIG. 18, in some embodiments, modems 2141, 2125, 2124, 2123, 2122, which are in communication with the modem bus 2120, connect the device to one or more networks. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider (e.g., as described herein with respect to FIG. 19) or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (potentially for higher service payments) than other users). As another example, ambient services (as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased form the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (or in some embodiments the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 16, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 16, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function. As discussed below, various embodiments described herein for the service control server link 1638 provide an efficient and secure mechanism for transmitting and receiving service policy implementation, control, monitoring and verification information between the device agents (e.g., service processor agents/components) and other network elements (e.g., service controller agents/components).

In some embodiments, the service control server link 1638 can employ the counterpart service control plane secure transmission methods discussed above with respect to the service control device link 1691. For example, one or more layers of security can be used to secure the communications link, including, for example, basic IP layer security, TCP layer security, service control link layer security, and/or security specific from service controller servers to service processor agents.

In some embodiments, the service control server link 1638 reduces network chatter by efficiently transmitting service control related communications over the link. For example, the service control server link 1638 can transmit server messages asynchronously as they arrive. As another example, the service control server link 1638 can perform collection or buffering of server messages between transmissions. As another example, the service control server link 1638 can determine when to transmit based potentially on several parameters, such as one or more of: periodic timer trigger, waiting until a certain amount of service usage or traffic usage has occurred, responding to a service agent message, responding to a service agent request, initiated by one or more servers, initiated by a verification error condition, and/or initiated by some other error condition. For example, once a transmission trigger has occurred, the service control server link 1638 can take all buffered agent communications and frame the communications. In addition, the service control server link 1638 can provide for an efficient communication link based on various embodiments related to the timing of transmissions over the service control link, as similarly discussed above with respect to the service control device link 1691 description. For example, the timing functions, such as asynchronous messages or polling for messages, constant frequency transmission, transmission based on how much service usage or data traffic usage has taken place, transmission in response to device side control link message, service verification error events, other error events, and/or other message transmission trigger criteria can be determined, controlled and/or initiated by either the device side or the network side depending on the embodiment.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

In some embodiments, the service control server link 1638 includes the agent heartbeat function in which the agents provide certain required reports to the service processor for the purpose of service policy implementation verification or for other purposes. For example, the heartbeat function can also be used to issue queries or challenges, messages, service settings, service control objectives, information requests or polling, error checks and/or other communications to the agents. As another example, agent heartbeat messages can be in the open or encrypted, signed and/or otherwise secured. Additional heartbeat function and the content of heartbeat messages can be provided as similarly described herein, such as described above with respect to the service control device link 1691 and the access control integrity agent 1694 and other sections. In some embodiments, the service controller 122 and/or agents of the service controller 122 are programmed to periodically provide reports, such as upon a heartbeat response (e.g., an agent can repeatedly send necessary reports each heartbeat), and appropriate actions can then be taken based upon such received reports. Accordingly, the heartbeat function provides an important and efficient system in various embodiments described herein for verifying the service policy implementation and/or protecting against compromise events. There are many other functions the agent heartbeat service can perform many of which are discussed herein, while many others will be apparent to one of ordinary skill in the art given the principles, design background and various embodiments provided herein.

In some embodiments, the service control server link 1638 also provides a service control software download function for various embodiments, which, for example, can include a download of new service software elements, revisions of service software elements, and/or dynamic refreshes of service software elements of the service processor 115 on the device. In some embodiments, this function is performed by the service control server link 1638 transmitting the service control software as a single file over the service control link. For example, the file can have encryption or signed encryption beyond any provided by the communication link protocol itself for service control link 1653. In another example, the service control software files can be segmented/divided into smaller packets that are transmitted in multiple messages sent over the service control link 1653. In yet another example, the service control software files can be transmitted using other delivery mechanism, such as a direct TCP socket connection from a service download control server 1660, which can also involve secure transport and additional levels of encryption. In some embodiments, the service control server link 1638 and/or service download control server 1660 use(s) an agent serial number and/or a security key look up when agents are updated and/or when a dynamic agent download occurs.

As shown in FIG. 16, the service controller 122 includes an access control integrity server 1654. In some embodiments, the access control integrity server 1654 collects device information on service policy, service usage, agent configuration and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122) verifies device service policy, and the verification error conditions that can indicate a mismatch in service measure and service policy include one or more of the following: unauthorized network access (e.g., access beyond ambient service policy limits); unauthorized network speed (e.g., average speed beyond service policy limit); network data amount does not match policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy.

In some embodiments, the access control integrity server 1654 (and/or some other agent of service controller 122) verifies device service policy based at least in part on, for example, various error conditions that indicate a mismatch in service measure and service policy. For example, various verification error conditions that can indicate a mismatch in service measure and service policy include one or more of the following: mismatch in one service measure and another service measure; agent failure to report in; agent failure to respond to queries (e.g., challenge-response sequence and/or expected periodic agent reporting); agent failure to respond correctly to challenge/response sequence; agent improperly configured; agent failure in self checks; agent failure in cross-checks; unauthorized agent communication or attempted unauthorized communication; failure in service policy implementation test; failure in service usage reporting test; failure in service usage billing test; failure in transaction billing test; failure in download sequence; environment compromise event, such as unauthorized software load or execution (or attempt), unauthorized memory access (or attempt), unauthorized agent access (or attempt), known harmful software, and/or known harmful communications signature; and/or failure to respond to various messages, such as send message and suspend and/or send message and quarantine. In some embodiments, the access control integrity server 1654 (and/or some other agent of service controller 122) verifies device service policy by performing automated queries and analysis, which are then reported (e.g., anomalous/suspicious report results can be reported for further analysis by a person responsible for determining whether such activities indicate out of policy activities or to provide information to the user to inform the user of such anomalous/suspicious report results that may indicate out of policy activities). For example, the user can review the report to authorize whether such activities were performed by the user (e.g., website access requests, specific transactions, and/or phone calls) and/or indicate that such activities were not authorized by the user (e.g., indicate a potential compromise of the device, such as by malware or other unauthorized software/user use of the device). In another example, the user can also be connected to communicate with service support of the service provider regarding such reported activities (e.g., by text/chat, voice/phone, and/or video conference to a service support). Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

In some embodiments, upon detection of one or more service verification errors, such as the various service verification errors discussed above, the device is directed to a quarantine network status in which the device can, for example, only access network control plane functions, billing functions, and other functions generally controlled by the access network service provider or the central service provider. For example, quarantine network access restrictions and routing can be accomplished with the access network AAA and routing system (e.g., access network AAA server 1621 and one or more of the gateways 410, 420, 508, 512, 520, 608, 612, 620, 708, 712, 720) or can be accomplished with device based access control or traffic control policy implementation. Quarantine network equipment or servers can, for example, be located within the access network or within another network with access to the access network. Communication with the quarantine network infrastructure can be accomplished, for example, with a secure link with one or more encryption levels or a dedicated private link. In some embodiments, quarantining a device includes, for example, a two step process for routing quarantine network device traffic, first, to a quarantine traffic handling router or server and, second, from there to the actual quarantine network infrastructure, with the route being determined by device parameters, user parameters, access service provider parameters or other parameters associated with the quarantine network routing. In some embodiments, the device is completely suspended from the network in which, for example, the device can first issue a user interface message to the user or issuing another form of a message to the user or service subscriber, such as via email, hard copy message and/or voice message. In some embodiments, the device network access, service capabilities and/or traffic shaping are limited, partially restricted or completely restricted, service capabilities. For example, these limitations and/or restrictions can be implemented in the device and/or in the network. For example, implementing a device quarantine (e.g., using a RADIUS server to quarantine the device) can involve assigning the device to a different billing profile.

In some embodiments, upon detection of one or more service verification errors, such as the various service verification errors discussed above, switch based port analysis is performed to further monitor the device (e.g., referred to as Switched Port Analyzer (SPAN) on Cisco switches, and various other vendors have different names for it, such as Roving Analysis Port (RAP) on 3Com switches). In some embodiments, the device service policy implementation behavior is monitored at a deeper level in the network by copying device traffic in the switch so that it goes to both an intended data path destination and to a specified port for switch based port analysis (e.g., the traffic content can be analyzed and recorded using deep packet inspection (DPI) techniques, which can provide a finer level of detail than the typical IPDR). For example, an advantage of performing a switch based port analysis function is that the traffic need not be analyzed in real time, and a sample subset of the devices on the network can be selected for such analysis based on, for example, either identifying devices that have suspect service policy implementation behavior and/or a regular sampling algorithm that eventually samples all devices, or some other selection approaches. As another example, a scheduled switch based port analysis sampling can be applied that eventually rotates through all devices and designates a higher priority in the sampling queue for devices that are suspect.

In some embodiments, switch based port analysis allows for off-line sampled or non-real-time DPI, as described above, as a verification measure for the device based service control measures that are implemented. In some embodiments, sophisticated DPI techniques are used to enhance the content of the IPDRs so that they provide detailed information that can be made available in the network. For example, some of the DPI packet analysis may be redundant between the device and the network, but this approach provides for a much finer grain validation for the device based service and less reliance on the device for some of the service traffic analysis that service providers need. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that the network level traffic inspection is accomplished in, or in one or more servers integrated to operate in a coordinated manner with the DPI boxes. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that provides deep service control capability (e.g., using DPI techniques) for devices that have some or all of the service processor functions installed and, in some embodiments, also providing coarser network control of the basics for devices that do not have a service processor installed in the device (e.g., such coarser network control functions include max data rate and/or max total data).

In some embodiments, the SPAN function is used in a revolving periodic manner as well to augment CDR data with deeper packet information for the purpose of spot-checking device based service usage measures. Examples of where this can be beneficial include spot checking network address access policies, spot checking ambient access policies, spot checking billing event reports, spot checking intermediate networking device/end point device count (via checking network source or destination addresses, token, cookies or other credentials, etc.). For example, the periodic SPAN can be scheduled for all devices equally, for certain devices or users with higher priority, frequency or depth of SPAN than others, higher priority, higher frequency or immediate priority for devices with higher usage patterns or unusual usage patterns, immediate or very high priority for devices with a policy violation status.

In some embodiments, a combination traffic inspection and service control approach implements traffic and service control functions in the network that are conducive for a network based implementation and implements traffic and service control functions in the device that are either more conducive for performing in the device or can only be performed in the device (e.g., activities involving inspection of traffic that is encrypted once it is transmitted to the network). For example, using this approach, activities that can be done in the network are generally performed in the network and/or are more efficiently performed in the network than the device, and activities that are more efficiently performed in the device or can only be performed in the device are performed in the device (e.g., depending on device processing/storage capabilities and/or other design/security considerations). For example, the following are various traffic and service control functions that, in some embodiments, are preferably or can only be performed in the device: network based packet processing capability limitations (e.g., encrypted traffic, application layer information unavailable once the traffic goes into the networking stack, other application/usage context information available on the device but not in the network); information that is generally/preferably maintained and processed locally in the device for network neutrality reasons (e.g., network neutrality issues can generally be efficiently implemented by keeping all, substantially all or at least some aspect of decisions on how to implement algorithms to control traffic local to the device and under user decision control, and/or by providing the user with a set of pre-packaged choices on how to manage service usage or service activity usage or manage service usage versus service cost or price); information that is generally/preferably maintained and processed locally in the device for user privacy reasons (e.g., deeper levels of traffic monitoring and service usage monitoring data where it is available for assisting the user in achieving the best, lowest cost experience and implementing a CRM filter function to the user so that the user can control the level of CRM the network is allowed to receive, such as with the higher levels of information being exchanged for something of value to the user, and/or user location information); information that is generally/preferably maintained and processed locally in the device for the purpose of informing the user of service control settings or service activity usage or to adjust service activity control settings or receive user feedback to choices regarding service usage policies or billing options (e.g., providing the user with a UI for the purpose of monitoring an estimate of service usage and/or notifying the user of at least some aspect of estimated service usage or projected service usage, providing the user with a UI for the purpose of monitoring an estimate of service cost and/or notifying the user of at least some aspect of estimated service cost or projected service cost, providing the user with a UI for the purpose of providing the user with one or more service usage and/or service cost notification messages that require user acknowledgement and/or a user decision and obtaining or reporting the user acknowledgements and/or decisions, providing the user with a UI for the purpose of providing the user with service options and/or service payment options, providing the user with a UI for the purpose of obtaining user choice for such options when service usage or cost estimates are about to run over limits or have run over limits or are projected to run over limits, providing the user with a UI for the purpose of monitoring or conducting open central billing transactions or other transactions, providing the user with a UI for the purpose of selecting the service control techniques and/or policies and/or algorithms and/or pre-packaged configurations that can be used to define or partially define the service activity usage control policies implemented in the device service processor or the network service control equipment/billing system or a combination of both); service control for roaming on different networks that typically do not have compatible DPI-type techniques with the home network; certain service notification and traffic control algorithms (e.g., stack-ranked activity statistical analysis and control of only the high usage activities); and/or a function for assigning a device to a service experience or ambient activation experience or virtual service provider (VSP) at various times from manufacturing to device distribution to a user of the device. In some embodiments, certain activities are implemented in the device as a solution for networks in which a new centralized DPI approach is not possible, not economically feasible, or for any number of reasons not an option or not a preferred option.

In some embodiments, a network based solution is provided for a more basic set of services for all devices that do not have service control capabilities, and a super-set of services and/or additional services are provided for devices that include a service processor. As described herein, a service controller function can be located in various places in the network in accordance with various embodiments. It should also be noted that various other embodiments described herein also employ a hybrid service control function performing certain service control functions in the network (e.g., collecting network service usage information, such as IPDRs, and/or performing DPI related functions in the network for collecting network service usage information and/or throttling/shaping traffic) and service control functions in the device (e.g., service processor 115, which, for example, monitors service usage in the device and/or performs throttling or traffic shaping in the device and/or performs certain billing event recording and reporting functions that are aptly performed on the device).

In some embodiments, lower level service policy implementation embodiments are combined with a higher level set of service policy supervision functions to provide device assisted verifiable network access control, authentication and authorization services.

In some embodiments, device based access control services are extended and combined with other policy design techniques to create a simplified device activation process and connected user experience referred to herein as ambient activation. As similarly discussed above, ambient activation can be provided by setting access control to a fixed destination, verifying access with IPDRs, verifying access by setting a max data rate and triggering off in the network if it exceeds the max data rate, and/or by various other techniques.

As shown in FIG. 16, service controller 122 includes a service history server 1650. In some embodiments, the service history server 1650 collects and records service usage or service activity reports from the Access Network AAA Server 1621 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618. In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 16, service controller 122 includes a policy management server 1652. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

In some embodiments, the policy management server 1652 performs a service control algorithm to assist in managing overall network capacity or application QoS. In some embodiments, the policy management server 1652 performs an algorithm to determine which access network is best to connect to, such as based on network capacity or application QoS, service usage costs, and/or any other criteria. In some embodiments, the device is capable of connecting to more than one network, and accordingly, device service policies can be selected/modified based on which network the device is connected to. In some embodiments, the network control plane servers detect a network connection change from a first network to a second network and initiate the service policy implementation established for the second network. In other embodiments, the device based adaptive policy control agent (e.g., policy control agent 1692 described herein) detects network connection changes from the first network to the second network and implements the service policies established for the second network.

In some embodiments, when more than one access network is available, the network is chosen based on which network is most preferred according to a network preference list or according to the network that optimizes a network cost function. For example, the preference list can be pre-established by the service provide and/or the user. For example, the network cost function can be based on a minimum service cost, maximum network performance, determining whether or not the user or device has access to the network, maximizing service provider connection benefit, reducing connections to alternative paid service providers, and/or a variety of other network preference criteria. In other embodiments, the device detects when one or more preferred networks are not available, implements a network selection function or intercepts other network selection functions, and offers a connection to the available service network that is highest on a preference list. For example, the preference list can be set by the service provider, the user and/or the service subscriber.

As shown in FIG. 16, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In other embodiments, the network traffic analysis server 1656 estimates the service quality and/or service usage for the network under variable settings on potential service policy. In other embodiments, the network traffic analysis server 1656 identifies actual or potential service behaviors by one or more devices that are causing problems for overall network service quality or service cost.

As shown in FIG. 16, service controller 122 includes a beta test server 1658. In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 16, service controller 122 includes a service download control server 1660. In some embodiments, the service download control server 1660 provides a download function to install and/or update service software elements (e.g., the service processor 115 and/or agents/components of the service processor 115) on the device, as described herein.

As shown in FIG. 16, service controller 122 includes a billing event server 1662. In some embodiments, the billing event server 1662 collects billing events, provides service plan information to the service processor 115, provides service usage updates to the service processor 115, serves as interface between device and central billing server 1619, and/or provides trusted third party function for certain ecommerce billing transactions.

As shown in FIG. 16, the Access Network AAA server 1621 is in network communication with the access network 1610. In some embodiments, the Access Network AAA server 1621 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 1621 also provides the ability to suspend service for a device and resume service for a device based on communications received from the service controller 122. In some embodiments, the Access Network AAA server 1621 also provides the ability to direct routing for device traffic to a quarantine network or to restrict or limit network access when a device quarantine condition is invoked. In some embodiments, the Access Network AAA server 1621 also records and reports device network service usage (e.g., device network service usage can be reported to device service history 1618).

As shown in FIG. 16, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 16, the central provider billing server 1619 is in network communication with the access network 1610. In some embodiments, the central provider billing server 1619 provides a mediation function for central provider billing events. For example, the central provider billing server 1619 can accept service plan changes. In some embodiments, the central provider billing server 1619 provides updates on device service usage, service plan limits and/or service policies. In some embodiments, the central provider billing server 1619 collects billing events, formulates bills, bills service users, provides certain billing event data and service plan information to the service controller 122 and/or device 100.

Establishing Coordinated Service and Verification Policies for Service Processor, Service Controller and Network Functions In some embodiments, device and network apparatus coordinate one or more of the following: network service policy implementation settings, device service policy implementation settings, network service profile implementation settings, device service profile implementation settings, network service usage measures used for the purpose of verifying service policy implementation, device service usage measures used for the purpose of verifying service policy implementation, network actions taken upon detection of service usage policy violation and device actions taken upon detection of service usage policy violation. In some embodiments, local device settings for the service monitoring, usage and/or billing profile or policy settings used, for example, by a device service processor 115, are associated with corresponding records for the various network apparatus that also rely upon the service policy and profile settings to monitor, control and/or bill for services or to respond to out of policy service usage conditions. For example, such network apparatus include the service controller 122 or similar functions, the billing system 123 or similar functions, the network AAA 121, gateways 410, 420, 508, 512, 520, 608, 612, 620, 708, 712, 720, or other networking equipment. In some embodiments, the service profile or policy settings are associated between the device and network in a manner that allows for effective and coordinated operation between the device service processor 115 and the network apparatus, but does not require an explicit function that simultaneously controls/coordinates the service policy or profile implementation and/or verification actions taken by the device 100 (e.g., the service processor 115) and the network apparatus. As an example, such embodiments can be applied in overlay applications as discussed below.

In some embodiments, a network function (e.g., the service controller 122, and/or more specifically the policy management server 1652 function, or other similar function) obtain, derive or otherwise determine the association of the service profile or policy settings to program a device service processor 115 and the various network apparatus functions (e.g., possibly including but not limited to the service controller 122 or similar functions, the billing system 123 or similar functions, the network AAA 121, gateways 410, 420, 508, 512, 520, 608, 612, 620, 708, 712, 720, or other networking equipment) by reading, receiving, querying, pulling or otherwise obtaining the settings from one or more of the network apparatus functions or from a data base that stores the service policy or profile settings for one or more of the network apparatus functions. After obtaining one or more of the network apparatus settings, a mapping (e.g., an association) of the network apparatus settings to the appropriate device 100 (service processor 115) settings can be determined to advantageously support the service usage monitoring, service usage control, service usage billing or service usage verification objectives being addressed. The policy or profile settings for the device can be a direct translation of the policy or profile settings used for the network apparatus, or the device policy or profile settings can be less directly derived from the network apparatus policy or profile settings. For example, service usage limits contained in the billing system 123 service plan can be either directly mapped to usage limit settings on the device service processor 115 (e.g., service usage stops when the limit is hit or the user is notified or the user is billed), or the usage limits can be mapped to a number of service profiles the user may select from (e.g., as discussed herein, the user can select from options involving various actual usage versus usage limit notification policies and/or service usage control, limitations or throttling policies).

For example, the service usage policy or profile limits or allowances maintained for the network apparatus functions (e.g., the service profile or service plan usage limits stored in the billing system 123 or AAA 121) can be read or queried by a network function (e.g., the service controller 122 or the service controller 122 through a second intermediary server connected to the billing system 123 and/or the AAA system 121), and the service usage limits stored in these networking apparatus can be either directly translated to the settings for the service processor 115 or may need to be interpreted, expanded or otherwise modified to obtain the required service processor 115 policy and/or profile settings.

In some embodiments, the service usage limits set in the billing system 123 service plan record, and/or the service profile record stored in the AAA system 121 can be acquired (e.g., from the apparatus or from a database storing the settings for the apparatus) by the service controller (or another network function) and directly translated and used to program the settings in the service processor 123. In some embodiments, the service usage limits are determined or obtained by the activation server apparatus embodiments, other apparatus embodiments associated with service activation, or the virtual service provider embodiments, as described herein. In this manner, once the association of the service usage profile or policy settings used by a device service processor 115 and the profile or policy settings used by the various network apparatus functions is established, then the service policy or profile for service monitoring, control, billing, verification and/or actions taken on verification error can be coordinated between device and network even if some of the network functions act independent of some of the device functions.

For example, associating the service usage policies and/or profiles between the device service processor 115 and the various network apparatus functions, and then allowing for independent operation or action by the various functions in a manner that results in a coordinated outcome, facilitates an overlay of the device assisted services technology onto existing network equipment in a manner that results in reliable and verifiable service enhancements while minimizing the need for major existing network equipment upgrades.

In some embodiments, the association of the service profile or policy settings used by a device service processor 115 and the service profile or policy settings used by the various network apparatus functions can be provided by a centralized network function that determines the appropriate settings for the network apparatus and the service processor 115 and sets one or more settings to each function. In some embodiments, this networking function is provided by a centralized network management function or service account activation function (e.g., the activation server apparatus embodiments, one of the other disclosed apparatus embodiments associated with service activation or the virtual service provider apparatus embodiments, as described herein).

In some embodiments, the association of the service profile or policy settings used by a device service processor 115 and the service profile or policy settings used by the various network apparatus functions can be provided by a network function that by reads, receives, queries, pulls or otherwise obtains the setting used by the service controller 122 or the service processor 115. The network function can then determine the association of the service profile or policy settings used by a device service processor 115 and the service profile or policy settings required by the various network apparatus functions before writing, transmitting, pushing, or otherwise recording the appropriate settings required by each of the other network apparatus functions. In some embodiments, this functionality can be implemented in the service controller (e.g., the policy management server, possibly acting in coordination with another network function or server), which then links into the databases used for storing the policy or profile settings for the other network apparatus.

In some embodiments, once the association is established between service policy or profile settings in the network apparatus and the service policy or profile settings in the service processor 115, then the network based service usage measures (e.g., IPDRs communicated to the billing system 123, the AAA 121, service controller 122 or other network functions used to verify service usage and/or take actions) used for verification of device 100 service usage versus service policy or profile can be monitored by the network apparatus (e.g., billing system 123 and AAA 121) independent of coordination with the service processor 115 and/or independent of the service controller 122. In some embodiments, in addition to independent monitoring and verification of service usage versus policy, independent service profile or policy verification error response actions can be taken by the network apparatus (e.g., suspend, quarantine, SPAN or flag device 100, notify the user and possibly require acknowledgement, or bill the user account for service usage overage) without direct involvement by the service processor 115 and/or the service controller 122.

Accordingly, the association between service profile and/or service policy that is implemented on the device 100 (e.g., service processor 115) and the service profile and/or policy usage limits recorded in network apparatus can be associated with one another by one or more of the following: (A) implementing a function to read from the network database (e.g., the billing 123 data base, AAA 121 data base, service controller 122 data base, etc.) and mapping the network profiles and/or policies to device 100 (e.g., service processor 115) profiles and/or policies; (B) implementing a function that simultaneously sets the device profile and/or policy and the network equipment profile and/or policy recorded in the appropriate data base records; and (C) implementing a function that reads the profile and/or policy on the device 100 (e.g., service processor 115) or the service controller 122 and then sets the network equipment profile and/or policy recorded in the appropriate data base records. This allows for a simplified but coordinated response to monitoring, controlling and billing for service usage, for verifying service usage versus service usage profile or policy, and/or initiating or carrying out network actions in response to service usage versus profile or policy verification errors and/or device actions in response to service usage versus profile or policy verification errors.

FIG. 17 is another functional diagram illustrating the device based service processor 115 and the service controller 122 in which the service processor controls the policy implementation for multiple access network modems and technologies in accordance with some embodiments. As shown, FIG. 17 provides for various embodiments as similarly described above with respect to the various embodiments described above with respect to FIG. 16, with one of the differences being that the service processor controls the policy implementation for multiple access network modems and technologies. Accordingly, as shown in FIG. 17, in some embodiments, a connection manager 1804, which as shown is in control plane communication with a modem selection and control 1811, provides a control and supervision function for one or more modem drivers or modems that connect to an access network. In some embodiments, the modem selection and control 1811 selects the access network connection and is in communication with the modem firewall 1655, and modem drivers, which as shown include Dial/DSL modem driver 1831, Ethernet modem driver 1815, WPAN modem driver 1814, WLAN modem driver 1813, and WWAN modem driver 1812, convert data traffic into modem bus traffic for one or more modems and are in communication with the modem selection and control 1811.

FIG. 18 is another functional diagram illustrating the service processor 115 and the service controller 122 in accordance with some embodiments. FIG. 18 illustrates the various modem drivers and modems 2122 through 2125 and 2141. In some embodiments, the modems, which include WWAN modem 2122, WLAN modem 2123, WPAN modem 2124, Ethernet modem 2125, and Dial/DSL modem 2141, which are in communication with the modem bus 2120, connect the device to one or more networks. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or, in some embodiments, the modem firewall agent 1655 or the application interface agent 1693, in making a determination regarding the traffic parameters or type once the traffic is farther down in the communication stack where it is sometimes difficult or impossible to make a complete determination of traffic parameters. It should be noted that although the present invention does not need to implement any or all of the measurement points illustrated in FIG. 18 to have an effective implementation, various embodiments benefit from these and/or similar measurement points. It should also be noted that the exact measurement points can be moved to different locations in the traffic processing stack, just as the various embodiments described herein can have the agents affecting policy implementation moved to different points in the traffic processing stack while still maintaining effective operation.

As shown in FIG. 18, measurement point I occurs at the application interface agent 1693 interface to the applications. At this measurement point, the application traffic can be monitored before it is framed, packetized or encrypted by the lower layers of the networking stack. For example, this allows inspection, characterization, tagging (literal or virtual) and, in some embodiments, shaping or control of services or traffic. At this measurement point, traffic can be more readily associated with applications, URLs or IP addresses, content type, service type, and other higher level parameters. For example, at this level email traffic and downloads, web browser applications and end points, media file transfers, application traffic demand, URL traffic demand and other such service monitoring parameters are more readily observed (e.g., accessible in the clear without the need for deep packet inspection and/or decryption), recorded and possibly shaped or controlled. As described herein, it is also possible to monitor upstream traffic demand at this point and compare it to the other measurement points to determine if the traffic policies in place are meeting overall traffic control policy objectives or to determine if traffic policy implementation is operating properly. For example, the downstream delivered traffic can be optimally observed at this measurement point.

As shown in FIG. 18, traffic measurement points II and III are situated on the upstream and downstream sides of policy implementation agent 1690. As described herein, these two locations allow potential tracking of upstream and downstream traffic through the stack portions associated with the policy implementation agent 1690. These two locations also provide for potential cross-checking of how the policy implementation agent 1690 is impacting the demand and delivery of traffic. In a similar manner, measurement point III in connection with measurement point IV provide an opportunity for packet tracing through the stack components associated with the modem firewall 1655 and provide for the opportunity to observe the demand and delivery sides of the modem firewall 1655. Traffic measurement point V provides the potential for observing the traffic at the modem bus drivers for each of the modems.

As shown in FIG. 18, traffic measurement point VI provides, in some embodiments, the ultimate measure of access traffic, for example, the traffic that actually transacts over the access network through the modem. As shown, measurement point VI is at the modem side of the internal or external communications bus 1630, and it will be appreciated that, in some embodiments, this measurement point can be further down the modem stack closer to the MAC or physical layer (e.g., at the designer's discretion). An advantage of having a measurement point deep in the modem is, for example, that if the software or hardware that implements the measurement and reporting is well secured against compromise, then this measure can be almost as strong from a verification perspective as the measure that comes from the network (e.g., from the network elements). Accordingly, this makes it possible to compare this measure against the other measures to determine if there is a traffic path that is leaking past the other measurement point or one or more policy implementation points.

Virtual Service Provider for Service Control

In some embodiments, virtual service provider (VSP) capabilities include making available to a third party service partner one or more of the following: (1) device group definition, control and security, (2) provisioning definition and execution, (3) ATS activation owner, (4) service profile definitions, (5) activation and ambient service definition, (6) billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

Figure 19:
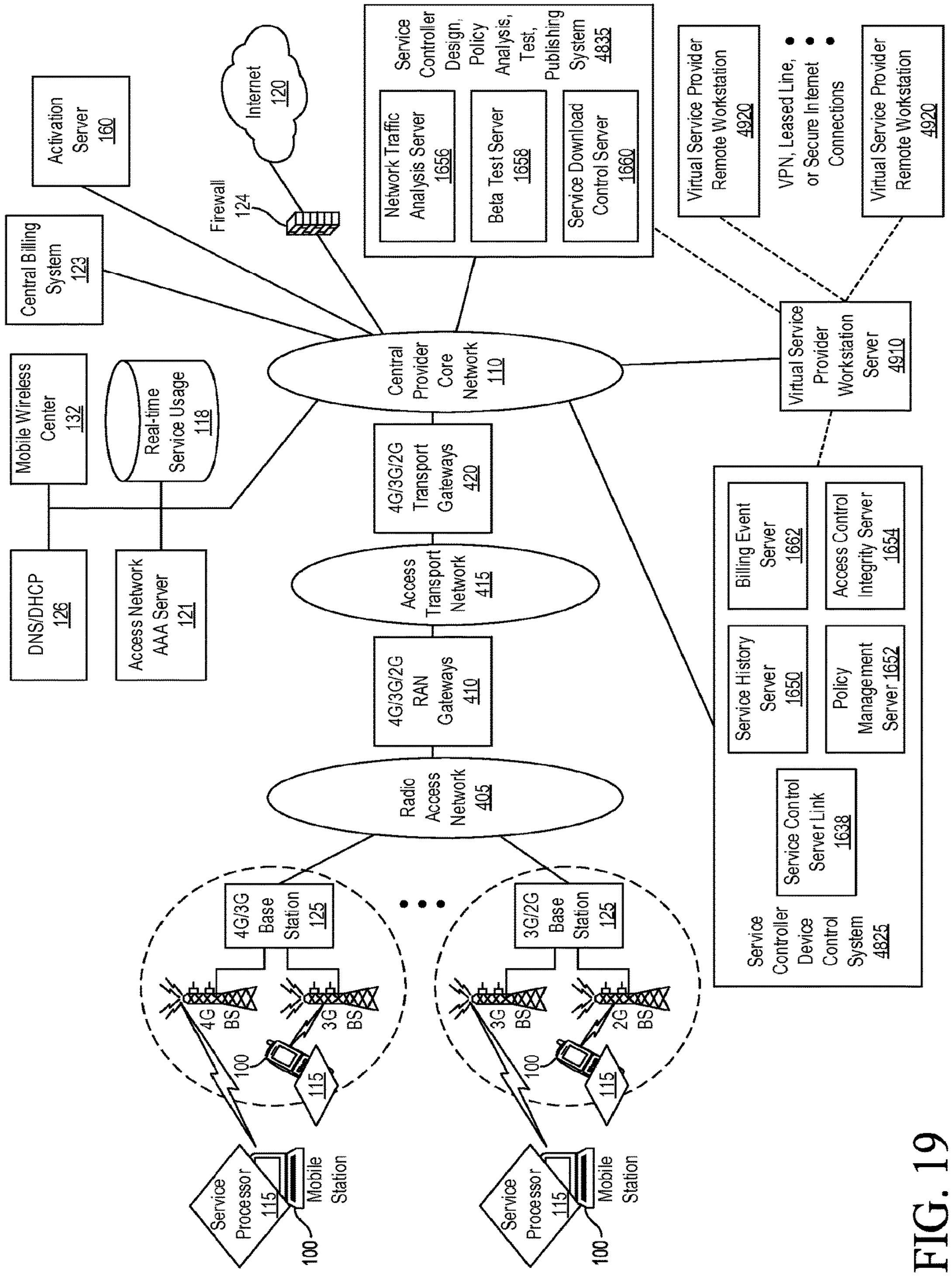
FIG. 19 illustrates a network architecture for an open developer platform for virtual service provider (VSP) partitioning in accordance with some embodiments.
Figure 20:
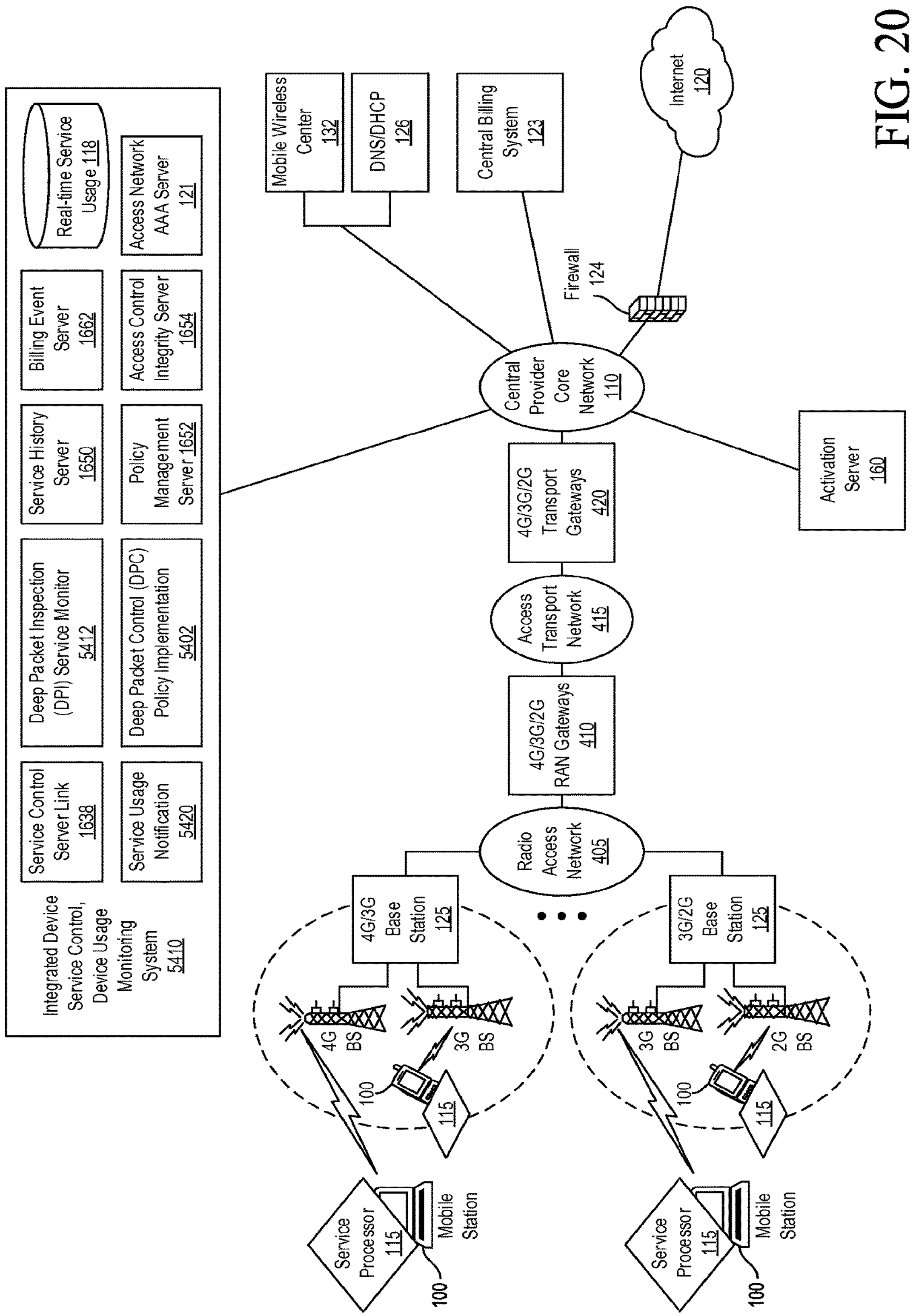
FIG. 20 illustrates a network architecture for locating service controller device control functions with AAA and network service usage including deep packet inspection functions in accordance with some embodiments.

FIG. 19 illustrates a network architecture for an open developer platform for virtual service provider (VSP) partitioning in accordance with some embodiments. As shown, the service controller design, policy analysis, definition, test, publishing system 4835 is configured so that multiple "service group owners" (e.g., the service provider for certain smart phones) or "device group owners" (e.g., eReader devices for the eReader service provider(s)) or "user group owners" (e.g., IT for Company X for their employees' corporate mobile devices), collectively referred to as the "Virtual Service Provider" (VSP), are serviced with the same service controller infrastructure and the same (or substantially similar) service processor design from virtual service provider workstation server 4910 and/or virtual service provider remote workstation(s) 4920. As shown, the virtual service provider remote workstation(s) 4920 communicates with the virtual service provider workstation server 4910 via VPN, leased line or secure Internet connections. The dashed lines shown in FIG. 19 are depicted to represent that, in some embodiments, the virtual service provider workstation server 4910 is networked with the service controller device control system 4825 and/or, in some embodiments, the service controller design, policy analysis, definition, test, publishing system 4835. Based on the discussion herein, it will be apparent to one of ordinary skill in the art that the VSP workstation server 4910 can also be networked in various embodiments with billing system 123, AAA server 121, gateways 410 or 420, or other network components to perform, for example, various network provisioning and activation related functions discussed herein for the device group assigned to one or more VSPs, or for other reasons as will be apparent to a given VSP embodiment.

In some embodiments, the service controller functionality is partitioned for a VSP by setting up one or more secure workstations, secure portals, secure websites, secure remote software terminals and/or other similar techniques to allow the service managers who work for the VSP to analyze, fine tune, control or define the services they decide to publish to one or more groups of devices or groups of users that the VSP "owns," In some embodiments, the VSP "owns" such groups by virtue of a relationship with the central provider in which the VSP is responsible for the service design and profitability. In some embodiments, the central provider receives payment from the VSP for wholesale access services. In some embodiments, the VSP workstations 4910 and 4920 only have access to the service analysis, design, beta testing and publishing functions for the devices or users "owned" by the VSP. In some embodiments, the user or device base serviced by the central provider network is securely partitioned into those owned by the central provider, those owned by the VSP, and those owned by any other VSPs.

In some embodiments, the VSP manages their devices from the VSP workstations 4910 and 4920 using device based service control techniques as described herein. In some embodiments, the VSP manages their devices from the VSP workstations 4910 and 4920 using device assisted and network based service control techniques as described herein. In some embodiments, the VSP manages their devices from the VSP workstations 4910 and 4920 using network based service control techniques (e.g., DPI techniques) as described herein.

For example, this approach is particularly well suited for "open developer programs" offered by the central providers in which the central provider brings in VSPs who offer special value in the devices or service plans, and using this approach, neither the central provider nor the VSP needs to do as much work as would be required to set up a conventional MVNO or MVNE system, which often requires some degree of customization in the network solution, the billing solution or the device solution for each new device application and/or service application that is developed and deployed. In some embodiments, the service customization is simplified by implementing custom policy settings on the service processor and service controller, and the custom device is quickly brought onto the network using the SDK and test/certification process. In some embodiments, the VSP functionality is also offered by an entity other than the central provider. For example, an MVNE entity can develop a wholesale relationship with one or more carriers, use the service controller to create the VSP capabilities, and then offer VSP services for one network or for a group of networks. In some embodiments, the service customization is simplified by implementing custom policy settings through the VSP embodiments on the network equipment, including, in some embodiments, service aware or DPI based network equipment that has a relatively deep level of service activity control capability. For example, using the embodiments described herein, and possibly also including some of the activation and provisioning embodiments, it is possible to efficiently design and implement custom ambient service plans that are different for different types of devices, different OEMs, different VSPs, different distributors, or different user groups all using the same general infrastructure, whether the service control policy implementation is accomplished primarily (or exclusively) with networking equipment (network) based service control, primarily (or exclusively) with device based service control or with a combination of both (e.g., hybrid device and network based service control).

As discussed herein, various VSP embodiments for performing one or more of analyzing traffic usage and defining, managing service profiles or plans, dry lab testing service profiles or plans, beta testing service profiles or plans, fine tuning service profiles or plans, publishing service profiles or plans, or other policy related settings can involve programming settings in the network equipment and/or programming settings or software on the device. For example, as discussed herein, the service processor settings are controlled by the service controller, which can be partitioned to allow groups of devices to be controlled. As another example, equipment in the network involved with network based service control, such as DPI based gateways, routers or switches, can similarly be programmed to utilize various VSP embodiments to implement that portion of the service profile (or service activity usage control) that is controlled by network level functions, and it will be appreciated that substantially all or all of the service activity control for certain embodiments can be accomplished with the network functions instead of the device. Continuing this example, just as the device service processor settings control functions of the service processor can have a group of devices that are partitioned off and placed under the control of a VSP, various VSP control embodiments can partition off a group of devices that have service usage activity controlled by the networking equipment, including, in some embodiments, sophisticated service aware DPI based service control equipment, to achieve similar objectives. It will be appreciated that the discussion herein regarding service controller design, policy analysis, test, publishing 4835, and the discussion regarding device group, user group and other VSP related embodiments, should be understood as applicable to various embodiments described in view of device based services control, control assistance and/or monitoring, or network based services control, control assistance and/or monitoring, or a combination of device based services control, control assistance and/or monitoring and network based services control, control assistance and/or monitoring. The various embodiments described herein related to service activation and provisioning also make apparent how the programming of network equipment service control, service control assistance and/or monitoring can be implemented prior to and following activation of the device. It will also be appreciated that the VSP capabilities described herein can also be applied to those devices that have services controlled by, provided by and/or billed by the central provider, so these techniques can be applied to central provider service embodiments, MVNO embodiments and other embodiments.

Network Based Service Monitoring, Notification and Control

In some embodiments, as described herein, it is desirable to implement some or all of the deep service usage monitoring, service control or control assistance, or service notification or notification assistance associated with a service profile in network apparatus rather than in the device, or to implement some of the deep service monitoring, control, control assistance, notification or notification assistance in the device and others in the network. This is the case, for example, in a mixed network in which some devices have some, or at least one, or all of the service processor capabilities discussed herein, but other devices do not have as much or any of the service processor capabilities. Another example is for networks or devices that do not have any service processor capabilities or where it is desirable to do all of the service monitoring, control and notification in the network rather than the device. As described below, FIG. 20 depicts an exemplary embodiment combining device based service monitoring, control or control assistance, usage notification or usage notification assistance and/or network based service monitoring, control or control assistance, usage notification or usage notification assistance.

FIG. 20 illustrates a network architecture for locating service controller device control functions with AAA and network service usage including deep packet inspection functions in accordance with some embodiments. As shown, an integrated device service control, device usage monitoring system 5410 is provided that integrates service controller functions including a deep packet control (DPC) policy implementation function 5402 with access network AAA server 121 functions and network real-time service usage 118 functions. In the following discussion, it is understood that the AAA server 121 function can be re-located to another point in the network or network equipment partitioning with no loss in generality. It is also understood that many of the functional partitions described for the various embodiments within integrated device service control, device usage monitoring system 5410 can be re-drawn with no loss in applicability, function or generality. Finally, it is understood that one or more of the functional elements described within the integrated device service control, device usage monitoring system 5410 can be removed for simplified embodiments and that not all the functionality described herein is necessary in some embodiments.

In some embodiments, the integrated device service control, device usage monitoring system 5410 provides for network based service monitoring or control that satisfies various network neutrality and/or privacy requirements based on indication(s) received from the device or user (e.g., user input provided using the device UI using the service processor 115; user input provided through another website, WAP site or portal; or user input provided through the service contract where the user agrees to the monitoring and/or service control levels) and network based service control using a DPI service monitor 5412 and/or the DPC policy implementation 5402.

In some embodiments, the integrated device service control, device usage monitoring system 5410 provides for network based service monitoring or service control that satisfies various privacy requirements using indication(s) received from the device or user (e.g., user input provided using the device UI using the service processor 115; user input provided through another website, WAP site or portal; or user input provided through the service contract where the user agrees to the monitoring and/or service control levels) and network based DPI service usage monitoring or DPC policy implementation using the DPI service monitor 5412 or DPC policy implementation 5402 as described below. In some embodiments, the DPI service monitor 5412 and/or DPC policy implementation 5402 include a secure database for storing service monitoring and CRM information for each device/device user. In some embodiments, the DPI service monitor 5412 and/or DPC policy implementation 5402 can be integrated with the integrated device service control, device usage monitoring system 5410 (as shown) or provided within a separate router, server, and/or software/hardware implemented function that is in secure communication with the integrated device service control, device usage monitoring system 5410 and/or other network elements based on the network architecture. In some embodiments, a secure data store, such as a secure database, is not integrated with the DPI service monitor 5412 or DPC policy implementation 5402 but is in secure communication with the DPI service monitor 5412 or DPC policy implementation 5402, the integrated device service control, device usage monitoring system 5410 and/or other network elements depending on the architecture (e.g., a billing server or any other network element). In some embodiments, the user selects limits and/or restrictions on who can access remotely stored service usage history and/or other CRM/privacy related data (e.g., CRM/privacy gatekeeper settings), and, for example, other network elements and/or network administrators access to such data can be limited and/or restricted accordingly. For example, access to such stored service monitoring and CRM information can require certain security credentials and/or using various other well known secure data storage techniques, such as the various secure storage techniques described herein.

In some embodiments, the secure database possessing user service usage information that is considered sensitive and has not been approved for distribution by the user can be made unavailable to the credentials possessed by network managers or network functions except, for example, for emergency service situations of government mandated monitoring needs where special credentials are brought out of secure storage that are not normally available. In some embodiments, rather than the user selecting limits, a certain set of restrictions are assumed unless the user selects information filtering settings that allow more information to be shared with the network functions, network administrators or service provider partners. In some embodiments, the information is filtered to remove information thought to be sensitive but still transmits service usage information needed for monitoring network services or other important parameters. For example, the website destinations a user is visiting can be classified with generic identifiers that are not decodable or the individual website information can be completely removed. Many other examples will be apparent to one of ordinary skill in the art.

For example, the stored service monitoring and CRM information can also be organized into groups to define group CRM profiles to store service monitoring information for every user indexed by the user credentials (e.g., such groups can also be used for various VSP related functions, as described herein). The DPI service monitor 5412 or DPC policy implementation 5402 also uses the secure storage to store service monitoring information for each user indexed by the user credentials or another aspect of the device identifier or address assignment (e.g., IP address or MAC address). In some embodiments, a CRM information manager (e.g., a supervisor program executing on the integrated device service control, device usage monitoring system 5410) communicates with the other network functions and provides filtered service usage and CRM information according to CRM filtering rules for each user or for groups of users. In some embodiments, the filtered CRM data can be made available using secure communications with other networking equipment by the integrated device service control, usage monitoring system 5410. In some embodiments, the filter settings for some users allow more information to be shared from the secure service usage information than others due to the differences in user preference settings and/or service plan agreements.

In some embodiments, user privacy preference information is used to determine the privacy filter settings, which are securely implemented by the integrated device service control, device usage monitoring system 5410. For example, service CRM filter settings can be received at the time of service contract sign up (e.g., service plan selection) and/or allow the user to log into service preferences web page to change settings (e.g., without involving any interaction with local software on the device). As another example, software on the device (e.g., including the service processor 115) can be used for selecting user CRM/privacy preferences, which are securely communicated to the integrated device service control, device usage monitoring system 5410 (e.g., the device can include credentials that can be verified to allow for selection/modification of CRM/privacy preferences or other user based preferences securely maintained in a network server, such as the integrated device service control, device usage monitoring system 5410 or another network element, such as shown in various other embodiments described herein). In these examples, the filtered CRM data is available from the integrated device service control, device usage monitoring system 5410 for other network components over a secure or open communication link. In another example, user CRM/privacy preferences are input using a web server hosted by the integrated device service control, device usage monitoring system 5410 or the central billing system 123. In another example, software on the device (e.g., including the service processor 115) can be used for securely communicating user preference decisions to an intermediate server that acts as a device manager and intermediate server for devices or device groups and the integrated device service control, device usage monitoring system 5410.

In some embodiments, the integrated device service control, device usage monitoring system 5410 provides for network based service control as described below. In some embodiments and similar to the above described network based CRM filtering embodiments, the DPI service monitor 5412 or DPC policy implementation 5402 includes secure storage (e.g., a secure database) for storing service monitoring information (e.g., based on user selections/preferences), and the DPC policy implementation 5402 performs traffic shaping/throttling algorithms for each user based on the stored service monitoring information from DPI service monitor 5412. For example, network based DPI traffic inspection by the DPI service monitor 5412 can use the secure storage to save service monitoring information for each user indexed by the user credentials or other parameters, such as IP address or other network tag. As another example, the DPC policy implementation 5402, for example, which can be supervised by policy management server 1652 as described herein with respect to various other embodiments, can implement service usage history statistical analysis inside the secure storage and maintain a service usage history analysis for each device/user and/or perform various traffic shaping and/or throttling algorithms based on various device, user selected and/or service plan related settings (e.g., for network neutrality purposes) allowing for various higher level service usage goals for one or more users, as similarly described herein with respect to various device based service usage monitoring embodiments (e.g., except for certain encrypted network traffic flows or application related flows for which traffic control generally needs information from the application level and/or content specific traffic control).

In some embodiments, input is collected on how to implement service control (e.g., from the user of the device). For example, such input can be determined based on one or more of the following: a service plan choice for the device; input provided by a user via a website (e.g., web based portal) for indicating changes to service control policies, as similarly described above; input provided by a user via the device (e.g., including the service processor 115), which securely communicates the input to the DPC policy implementation 5402, for example, which can be supervised by the policy management server 1652; and input provided by a user via the device (e.g., including the service processor 115), which securely communicates the input to an intermediate server for the DPC policy implementation 5402, as similarly described above. In some embodiments, such service control is based on various algorithms as described herein that identify the heaviest usage service activities and recursively control the speed for those activities while leaving certain others unaffected, and in a manner that is specified or selected by the user to ensure network neutrality. In some embodiments, the user is offered a choice for controlling service usage and/or selects an algorithm that controls all activities equally/neutrally (e.g., based on selected user preferences). For example, by implementing service control algorithms that are network neutral (e.g., throttling all activities equally or throttling the highest usage algorithms without singling out certain activities for throttling unless they satisfy certain network neutral usage history or usage statistics criteria), or that are approved, selected or otherwise specified by the user, network neutral traffic control or service usage control can be maintained.

In some embodiments, the DPI service monitor 5412, possibly in conjunction with the service usage notification 5420 and/or service history server 1650, provides service usage/service cost (e.g., a real-time service usage counter) related notifications to the device based on user preferences, as similarly described above with respect to various device based service usage/service related notification embodiments. For example, the DPI service monitor 5412, for example, in conjunction with the service usage notification 5420 and/or service history server 1650, can perform service usage/service related notification algorithms based on one or more of the following: service plans, device settings, and/or user selected preferences (e.g., such notification messages can be securely communicated to the device and/or to the device via an intermediate server). For example, the policies that govern how the user is notified of service usage or service cost can be determined by the policy management server 1652 and/or the service usage notification 5420. As another example, user acknowledgements of important notification messages and/or user choices related to important service usage decisions can be requested, as similarly discussed above with respect to device based service usage/control embodiments, which can then be communicated to the central billing system 123 as confirmation for any such important notification messages (e.g., related to service usage overage charges and/or confirmation of service upgrades). In some embodiments, various other service usage algorithms related to service usage and/or service cost forward projections described herein with respect device based service usage forward projection embodiments are performed in the network, such as by the integrated device service control, device usage monitoring system 5410, and such forward projections can then be communicated to each respective device as service usage notification messages (e.g., using a push based approach (initiated in the network) and/or pull based approach (initiated by a request from the device)). For example, these embodiments for projected service usage methods, as described herein, can be helpful for determining when the user is using services in a manner that will cause the user to run over a service limit so that the user can be notified, or the service can be controlled or throttled if the user has selected a control or throttling option.

In some embodiments, one or more intermediate servers are provided for workload balancing and/or off-loading the integrated device service control, device usage monitoring system 5410 and perform one or more of the functions described above with respect to various embodiments of the integrated device service control, device usage monitoring system 5410. In some embodiments, service plans, device settings, and/or user selected preferences are used to associate each device/user with a preprogrammed profile to more efficiently associate such devices/users with their selected service plans, device settings, and/or user preferences. For example, the process of setting a service profile for a given device can be determined by assigning the device to a service flow that has the pre-defined service profile and is shared with other devices within the integrated device service control, device usage monitoring system 5410 rather than individually processing the service flow manipulations for each device. In some embodiments, the act of provisioning and activating a service profile for a given devices involves setting up the service flow definition and identifier within the integrated device service control, device usage monitoring system 5410 (if it is not already set up) and then assigning the routing of the device credentials to that service flow identifier. User preferences can, for example, be accounted for by assigning the device service flow to one of several pre-defined profiles based on user preferences that are all supported under the same service plan. For example, one service flow profile can call for service usage notification but no control under the same service plan as another service flow profile that calls for less notification but active service usage control to maintain user costs to a monthly post-pay limit.

In some embodiments, the bill by account function is implemented in the context of the integrated device service control, device usage monitoring system 5410 or other network based system embodiments described herein. For example, the DPI service monitor 5412, in some cases in conjunction with service history server 1650, can operate in conjunction with bill by account policy settings stored in the billing event server 1662 so that service activities are divided into the account classifications defined by the service profile settings. The bill by account feeds can then be sent to the billing system or to an intermediate billing event aggregation server that collects this type of deep packet inspection generated information from one or more integrated device service control, device usage monitoring system 5410 units to aggregate and format the information in a manner that may be used by the central billing system 123. In some embodiments, the bill by account information collected in a network box like the integrated device service control, device usage monitoring system 5410 is augmented by bill by account information collected on the device as described herein, and any intermediate server that can be used to aggregate and format these bill by account feeds for the central billing system deals with both types of data, from the network and from the devices.

As shown in FIG. 20, in some embodiments, integrated device service control, device usage monitoring system 5410 includes the service control server link 1638, which, for example, can be used as described above (e.g., with respect to FIG. 16 and other embodiments described herein) to communicate with device service processors 115. In some embodiments, billing server 1662 within integrated device service control, device usage monitoring system 5410 detects service usage events reported by DPI service monitor 5412, in some cases in conjunction with service history server 1650, generates a billing event that can be recorded or transmitted to the central billing system 123. In some embodiments, billing server 1662 receives information from device billing agent 1695 and/or device service monitor agent 1696 and transmits the device service usage billing events to the central billing system 123. In some embodiments, certain billing events that are advantageously collected in the network (e.g., DPI service monitor 5412 and/or billing event server 1662) are combined with certain billing events that are advantageously collected on the device (e.g., service monitor agent 1696 and/or billing agent 1695), and both sources of billing information are transmitted to the billing system 123. Similarly, in some embodiments, certain service usage information is collected with service usage monitor agent 1696, and that information is combined with service usage information collected from DPI service monitor 5412 and/or service history server 1650 and/or service usage 118. In some embodiments, certain service aspects are controlled using network based DPC policy implementation 5402, in some cases in conjunction with or supervised by network based policy management server 1652, and other service aspects are controlled using device based policy implementation agent 1690, in some cases in conjunction with or supervised by policy control agent 1692. As will now be apparent to one of ordinary skill in the art in view of the numerous embodiments described herein, many hybrid approaches to service usage monitoring, service control, service notification or service billing can be accomplished with some aspects of the policy, notification, control, monitoring or billing being implemented/performed on the device apparatus described herein and others implemented/performed on the network apparatus described herein. The presence of access control integrity server 1662 and many other service control verification embodiments described herein make it apparent that the integrated device service control, device usage monitoring system 5410 embodiments also provide for affirmative verification of whatever functions are implemented on the device. It will also be apparent that all of the above combinations of device and network functions, and many others, can be accomplished in ways that are network neutral and/or protect user privacy preferences by implementing the service control algorithms in a network neutral manner and/or receiving user preference input on how to implement service control, and by maintaining service usage and CRM information security and filtering on both the device 100 and the network based integrated device service control, device usage monitoring system 5410.

In some embodiments, the integrated device service control, device usage monitoring system 5410 facilitates or plays a part in automated provisioning and activation of the devices as similarly described above with respect to various device based automated provisioning and activation embodiments. In some embodiments, the activation server 160 is integrated into or partially integrated into device service control, device usage monitoring system 5410.

In some embodiments, the integrated device service control, device usage monitoring system 5410 facilitates ambient services as similarly described above with respect to various device based ambient services embodiments.

In some embodiments, the integrated device service control, device usage monitoring system 5410 facilitates VSP and ODI solutions as similarly described above with respect to various device based VSP and ODI embodiments.

Various other network architectures for network based service control including deep packet inspection functions can similarly be used as will be apparent to one of ordinary skill in the art in view of the various embodiments described herein.

As discussed above, the division in functionality between one device agent and another is a design choice, and the functional lines between agents can be re-drawn in any technically feasible way that the product designers see fit. Furthermore, although the naming and functional breakouts for the device agents aid in understanding, agents can be combined into fewer agents or broken out into more agents, and agents can be renamed without departing from the disclosures herein. Thus, the sequel often refers to one or more device agents. It is to be understood that the one or more device agents can include one or more of the devices agents that were discussed previously and/or perform one or more of the functions of the device agents that were discussed previously. As also discussed above, the one or more device agents (i.e., service processor 115) may be implemented in hardware, in software, or in a combination of hardware and software. In some embodiments, some or all of service processor 115 is embodied in an application program (e.g., a client) that runs on a mobile device.

As also discussed above, the division in functionality between the various servers of service controller 122 is a design choice. The server names and functional breakouts do not imply that each named function is embodied in an individual server. A single named function in the various embodiments can be implemented on multiple servers, or multiple named functions in the various embodiments can be implemented on a single server. Thus, the sequel primarily refers to service controller 122 or one or more servers. It is to be understood that these elements can include one or more of the various servers described previously and/or perform one or more of the functions of service controller 122 or the various servers described previously. Likewise, it is to be appreciated that service controller 122 can be referred to as a cloud server or a network server.

Device Group Configuration and Management Overview

In this document, a device group is a group of one or more devices that are associated with a single billing account. Therefore, a device group may consist only of device 100, or it may consist of device 100 and one or more other devices. These other devices may be of the same type as device 100 (i.e., if device 100 is a smartphone, the other devices may also be smartphones), or they may be of different types (i.e., the device group may be comprised of any mixture of mobile devices, such as smartphones, tablets, laptops, etc.). In some embodiments, the device group consists of at least two devices that share a service plan, or that share one or more components of a service plan or a service plan allocation, or that have the ability to share one or more service plans or service plan components.

In some embodiments, one or more device agents interact with a user through a user interface (e.g., through a touch-sensitive display screen, using voice commands, through a keyboard, using eye tracking, using device motions, etc.) of device 100 to enable a user of device 100 to perform various tasks, such as, for example: to create a device group (e.g., by creating a device group account); to join a device group (e.g., to add device 100 to an existing account); to manage a device group (e.g., to add a device to a device group, or to delete a device from a device group); to select a service plan (e.g., for one or more devices in the device group); to change a service plan (e.g., associated with the device group to which device 100 belongs); to reconfigure a service plan (e.g., to change one or more aspects of a service plan currently associated with the device group); to purchase a service plan (e.g., to modify an aspect of a current service plan, to replace a current service plan, to add a plan to a current service plan); to share a service plan with one or more other devices in the device group to which device 100 belongs; to set limits on usage of a service plan by one or more devices in the device group (including device 100); to create restrictions (e.g., time-based, location-based, amount-based, etc.) on usage (e.g., restrict voice, text, or data usage) applicable to device 100 or applicable to other devices in the device group; to view service usage (e.g., voice, text, data) by device 100 or by another device in the device group; to transfer an existing phone number to device 100; to request a new phone number for device 100; to manage a device group account (e.g., configure or update billing information, view invoices and charges, update an account profile (e.g., name, billing address, shipping address, account password, device nicknames, etc.), select a specific device group to join (e.g., enterprise group, retail partner, etc.), etc.).

FIGS. 21, 22, and 24 through 166 present exemplary user interface screens enabling a user to perform one or more of the tasks above and other tasks in accordance with a particular set of embodiments. In the particular set of embodiments, service processor 115 comprises software executed by one or more processors of device 100 to provide many of the functions described in the preceding paragraph. In the embodiments illustrated by FIGS. 21, 22, and 24 through 166, device 100 is a smartphone. It is to be appreciated that screens similar or identical to those illustrated herein can be presented through other types of mobile devices, such as tablets, laptops, eReaders, remote user interfaces (UI) or screens of telematics devices, etc.

Figure 21:
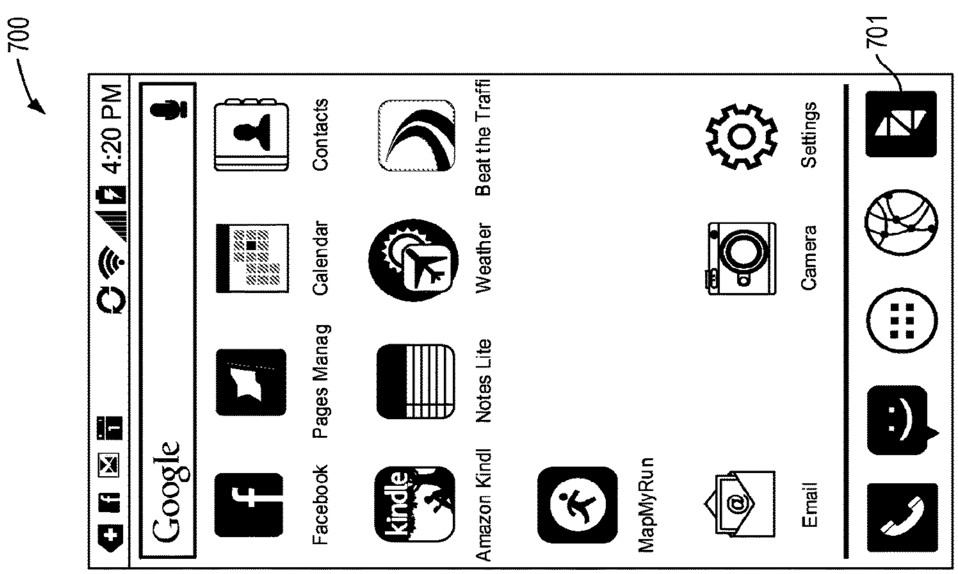
FIG. 21 illustrates a home screen of a device in accordance with an exemplary embodiment.

FIG. 21 illustrates an exemplary home screen 700 of device 100, which, in the particular embodiment of FIG. 21, is a smartphone based on the Android operating system (OS). In the lower right-hand corner of home screen 700 is icon 701, which features a parallelogram with the letter "Z" on it. Herein, icon 701 is referred to as the "service launch icon." In the embodiment shown in FIG. 21, service launch icon 701 is touch-sensitive and, when selected, launches an application program that embodies some or all of service processor 115 or the one or more device agents of service processor 115. Although FIG. 21 illustrates a touch-sensitive service launch icon 701, in some embodiments, the service described as being launched by icon 701 is launched by a voice command, a touch gesture, a device motion gesture, eye tracking gesture, or some other interaction between the device user and the device.

FIG. 22 illustrates exemplary initial or "service home" screen 704 (also sometimes referred to as a display) that appears in response to a user selecting the service launch icon of FIG. 21. Service home screen 707 is presented through the user interface of device 100 by one or more device agents (e.g., user interface 1697, billing agent 1695, etc.) of service processor 115. Service home screen 704 in the exemplary embodiment of FIG. 22 provides a plurality of user-selectable regions 703A, 703B, 703C, and 703D that allow the user to perform various tasks, including those described above (e.g., to create, join, or manage a device group; to select, change, reconfigure, purchase, share, or set limits on usage of a service plan; to create restrictions on usage; to view service usage; to transfer an existing phone number to device 100; to request a new phone number for device 100; to manage a device group account; etc.). In the exemplary embodiment of FIG. 22, service home screen 704 has service provider icon region 707 in the upper portion of screen 704 and four user-selectable regions (labeled 703A, 703B, 703C, and 703D) in the lower part of screen 704. Service provider icon region 707 may or may not be touch-sensitive. For example, in some embodiments, service provider icon region 707 is touch-sensitive and, in some embodiments, may direct a user to a web site or wireless application protocol (WAP) site or initiate an action when touched. In other embodiments, service provider icon region 707 may be decorative and not touch-sensitive.

In the exemplary embodiment of FIG. 22, the four user-selectable regions are called "My Plans" (703A), "Manage Devices" (703B), "Specialized Plans" (703C), and "Billing" (703D). The "My Plans" region 703A of screen 704 is touch-sensitive and allows a user to see usage and adjust one or more service plans at any time, from the mobile device, as will be discussed in more detail below.

In the exemplary embodiment of FIG. 22, the "Manage Devices" region 703B of screen 704 is also touch-sensitive and allows a user with authority (i.e., an account manager, account holder, account owner, parent, primary user, master user, administrator, authorized member of the device group, authorized user, etc.) to create and manage a device group (e.g., a group of one or more devices that are associated with the same billing account and that are, in some embodiments, able to share one or more service plans or service plan elements or service plan components). In some embodiments, the user is associated with the device group (e.g., the user uses or is associated with a device in the device group or otherwise participates in the device group). In some embodiments, the user is not necessarily associated with the device group, but the user has the capability to manage the device group (e.g., from an application on a device that is not part of the device group or from a website). In the embodiment of FIG. 22, the user can add, remove, share, and control devices by selecting the "Manage Devices" region 703B of screen 704. Device group management and device management are discussed in more detail below.

The "Specialized Plans" region 703C of screen 704 in the exemplary embodiment of FIG. 22 allows a user with authority (i.e., an account manager, account holder, administrator, authorized member of the device group, authorized user, etc.) to purchase, for example, international long-distance and other specialized plans for device 100 and/or other devices in the device group. Specialized plans are discussed in more detail below.

The "Billing" region 703D of screen 704 in the exemplary embodiment of FIG. 22 allows a user with authority (i.e., an account manager, account holder, administrator, authorized member of the device group, authorized user, etc.) to view and edit billing information, such as account history and credit card or other payment information, as will be discussed in more detail below.

Management of Permissions for Devices Already in the Device Group

In some embodiments, only a user who can undertake device management (which is alternatively called "device control" or "device group control") functions (i.e., whether the user can set allocations for plan usage for devices in the device group, purchase plans, place restrictions on devices in the device group, etc.) can select certain of the regions 703A, 703B, 703C, 703D of screen 704. For example, a user who can undertake device management may be able to select all of the regions 703A, 703B, 703C, and 703D, whereas a user who cannot undertake device management may be able to select only a subset or none of the regions 703A, 703B, 703C, and 703D. Alternatively, a user who cannot undertake device management may be able to select the "My Plans" region 703A to view plan information applicable to the device, but not any of the regions 703B, 703C, or 703D. As another example, a user who cannot undertake device management may be able to select the "Manage Devices" region 703B to perform a subset of tasks available to a user who can undertake device management, such as to view usage by the device being used, to set a restriction for the device being used, etc.

In some embodiments, whether a user can undertake device management is based on whether the user is able to provide a valid credential associated with an entity that has permission to access or manage the device group account (e.g., "log in" to the device group account). In some embodiments, a user who is able to log in to the device group account can undertake device management functions from a device that is not itself within the device group. For example, a user of a desktop computer can log in to the device group account through a web site and perform the management functions described herein. As another example, a user of a mobile device (e.g., a smartphone, a tablet, a laptop, etc.) that is not itself part of the device group can, in some embodiments, log in to the device group account and perform the device management functions described herein, either using a web browser or a specialized program (e.g., an application program) installed on the device that is not part of the device group. In some such embodiments, a service processor, which may be an application program or a client, is installed on the device (mobile or non-mobile) that is not in the device group but from which an account administrator wishes to perform device management. In some embodiments, the administrator can manage devices through a web site accessible from a web browser on a device (e.g., a smartphone browser, a laptop browser, a PC browser, etc.). The account administrator can then log in to the device group account from the application program (or web site) and perform some or all of the device management functions described herein for the devices that are in the device group. The ability to manage a device group from a device that is not itself within the device group offers flexibility and enables, for example, a parent to establish and manage a device group for his or her children while retaining the parent's current mobile service for the parent's own device. In other words, the parent does not need to join/add his or her device to the device group in order to manage his or her children's devices.

In some embodiments, whether a user can undertake device management functions is based on whether the device through which the user is attempting to perform management functions has been granted account control (e.g., the device itself has full control, partial control, primary control, or a level of account control or management authority or permission that enables management of at least a subset of devices in the group) by a user who is able to log in to the device group account. If a device has been granted some level of account control, any user of that device has the authority to manage the at least a subset of devices in the device group specified by an account administrator (e.g., that device only, or that device and a subset of other devices in the device group, or a subset of other devices in the device group, or all devices in the device group), even if the user does not have the ability to log in to the device group account and, therefore, otherwise would not be able to manage devices in the device group. It is also possible for more than one device to have a designated level of account control. For example, if a device group is shared by spouses, the spouses may choose to give all devices in the group full account control because each spouse trusts the other, and they have no reason to restrict purchases or changes to the device group from particular devices. It is also possible for one device to have one level of control (e.g., full control) and another device to have a different level of control (e.g., limited control).

In some embodiments, if a device does not have any level of account control, or has a level of account control that is insufficient to accomplish a desired task (e.g., the device is a child's device, or an employee's device, etc.), a user of that device still has the authority to manage that device and, if applicable, one or more other devices in the device group if the user is able to log in to the device group account from the device. Therefore, if a parent grants no permissions at all to a child's device, the parent can still log in to the device group account from the child's device to perform device group management functions (e.g., impose a restrictions on the child's device, increase or decrease a service allocation (e.g., allowance) for the child's device, purchase a specialized plan for the child's device, etc.).

In some embodiments, different levels of permissions or authorization levels are assigned to users who are able to log in to the device group account (i.e., some levels may be lower than full control but higher than no control). For example, in some embodiments, an account owner has the ability to establish three levels of control: the account owner has full control; an account manager has partial control (e.g., over only some devices, is only able to perform some management functions, etc.) that may be overridden by the account owner; and an account user has limited or no control (e.g., the account users are children or employees who have no control or very limited control, which may be device-specific).

In some embodiments, the level of control granted to a user is dependent on the role of the user. For example, if the device group is associated with an enterprise (e.g., a large or small business), the account owner may be the head of the information technology (IT) department. The head of the IT department may identify and grant different levels of control to selected account managers, but grant no control (and possibly no ability to log in to the device group account) to low-level employees. For example, the head of the IT department may decide to grant at least partial control over the devices used by the marketing department to the head of the marketing department, grant at least partial control over the devices used by the sales team to the head of the sales department, etc. The level of control granted may be a subset or partial set of the management tools available to the account owner. For example, the head of the IT department may purchase a 10 GB data plan, of which he allocates 3 GB to the marketing department and 4 GB to the sales department. The head of the IT department may allow the head of marketing to determine how to allocate the 3 GB to the devices used by the marketing team and allow the head of sales to determine how to allocate the 4 GB to the devices used by the sales department. He may also allow the heads of marketing and sales to determine whether they wish to allow the users within their sub-groups to have some level of account management capabilities (e.g., to allow team leads to view device usage of their team members, etc.). Moreover, the head of the IT department may decide to allow, temporarily or permanently, an account manager to purchase plans. For example, the head of the IT department may decide to allow the head of the sales department to purchase international roaming plans for use by and assignment to the devices used by the sales team. On the other hand, the head of the IT department may decide not to grant this same authority to the head of the marketing department (e.g., because the marketing department operates solely in the home country and has only sporadic or no need for international roaming).

As another example, a parent could establish a responsible teenager as an account manager so that, for example, the teenager could purchase plans, perhaps subject to a spending limit, and place restrictions on her own device. On the other hand, the parent could decide to give no account control at all to an 8-year-old child.

Because the ability to manage devices in a device group may be provided through at least two mechanisms (e.g., by logging in to the device group account or by managing from a device with some level of account control), a variety of device and/or user permissions or levels of authority for device control are possible, and the examples provided herein are not intended to be limiting. For example, a user who can log in to the device group account can manage at least a subset of devices in the device group, even from a device that does not have account control. As described above, a user who has the ability to log in to the device group account can also manage at least a designated set of devices in the device group from a device that is not itself part of the device group.

It is also possible for more than one user to have full account control. For example, if a device group is shared by spouses, the spouses may both have the level of account control of account owners.

In some embodiments, one or more device agents on a first device obtain information establishing an account priority status of the first device or the user of the first device. In some embodiments, the account priority status establishes the first device or the user of the first device as having full or partial control (e.g., a master device, a parent device, etc.) or no control (e.g., a child device, employee device, etc.). In some embodiments, if the information indicates that the account priority status establishes the first device as a device with control, or the user of the first device as having control, the one or more device agents present, through a user interface of the first device, one or more options to assist a user to configure at least an aspect of service applicable to a second device in the device group, where the second device is either a device with control or a device without control.

In some embodiments, if the information indicates that the account priority status establishes the first device as a device without control, the one or more device agents refrain from providing the one or more options that would otherwise assist the user to configure the at least an aspect of the service applicable to the second device. In some embodiments, if the information indicates that the account priority status establishes the first device as a device without control, the one or more device agents on the first device present information about the first device (e.g., information about applicable usage allowances, information about current usage, information about in-force usage restrictions, etc.) through a user interface of the first device, but they do not present information about any other devices that are in the device group. In some embodiments, if the information indicates that the account priority status establishes the first device as a device without control, the one or more device agents do not allow the user of the first device to configure or establish restrictions for the first device. In some embodiments, if the information indicates that the account priority status establishes the first device as a device without control, the one or more device agents allow the user of the first device to configure or establish at least a limited set of restrictions for the first device (e.g., so that the user of the first device can judiciously consume a service allowance applicable to the device, the one or more device agents might assist the user of the first device to set a restriction on data usage so that the device does not consume its entire allowance too quickly).

Figure 23:
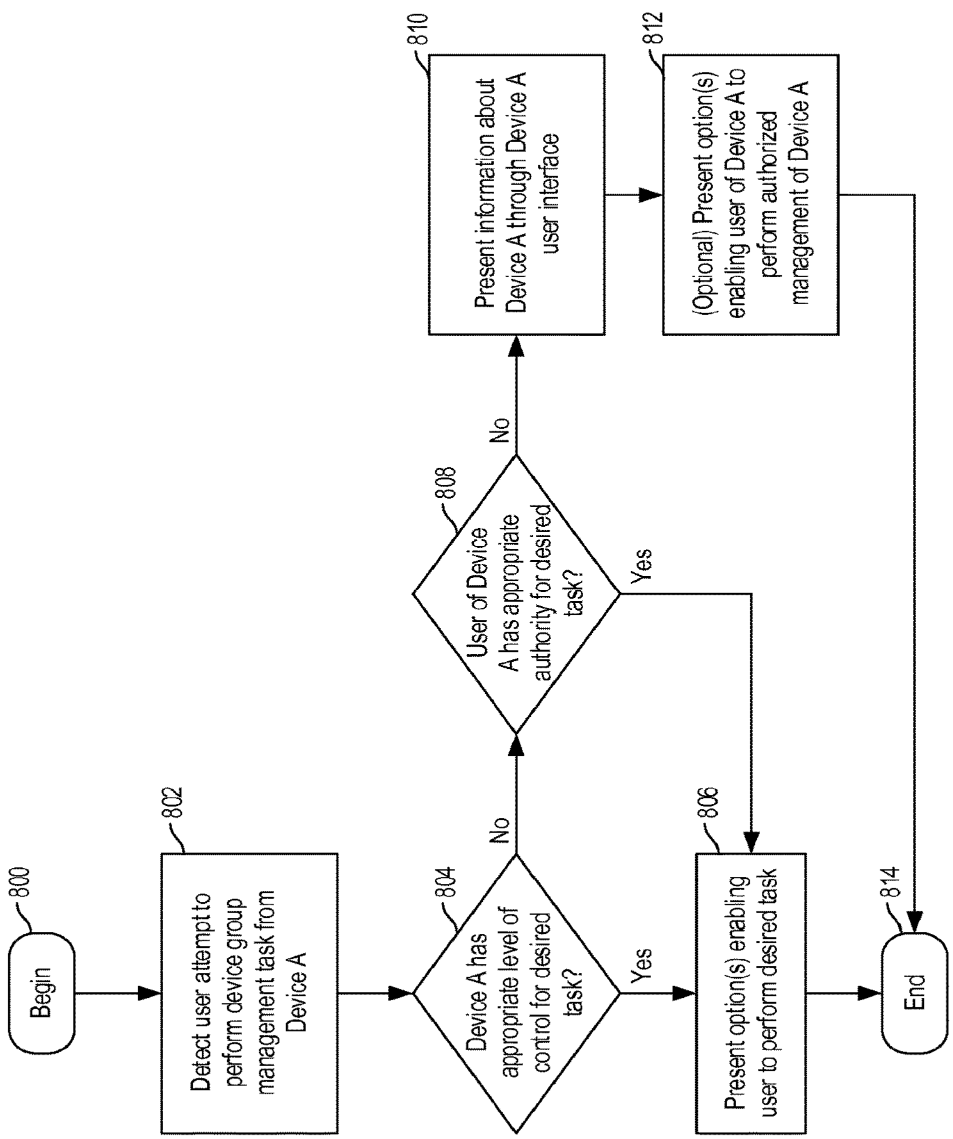
FIG. 23 illustrates a flowchart of an exemplary process to determine whether and what device group configuration or management tasks to allow a user to undertake from a device in accordance with some embodiments.

FIG. 23 illustrates a flowchart of an exemplary process to determine whether and what device group configuration or management tasks to allow a user to undertake and, in appropriate circumstances, to enable certain management tasks. The process of FIG. 23 begins at 800. At 802, one or more device agents on Device A detect an attempt (e.g., a desire or intent, conveyed by way of selecting an icon, button, etc.) by a user of Device A to perform a device group management task. At 804, the one or more device agents, possibly in cooperation with service controller 122 in the network, determine whether Device A is a device with a level of control that is adequate to allow the desired management task. If so, flow proceeds to 806, where the one or more device agents present one or more options (e.g., display screens, buttons, icons, user-selectable regions, etc.) enabling the user of Device A to perform the desired management task. If Device A does not have a level of control that allows the desired management task, flow proceeds to 808, where the one or more device agents determine, possibly in cooperation with service controller 122, whether the user of Device A has adequate authority to perform the desired task (e.g., whether the user can log in to the device group account). If the user of Device A does have an applicable level of authority to perform the desired management task, flow proceeds to 806, where the one or more device agents present one or more options enabling the user of Device A to perform the desired management task. If the user of Device A does not have authority to perform the desired management task, flow proceeds to 810, where the one or more device agents present information about Device A (e.g., the name of Device A, information about usage of a service plan by Device A, the phone number of Device A, etc.). Optionally, flow then proceeds to 812, where, if the user is found to have authority, or Device A is found to have the appropriate level of control, to perform other management tasks than the desired task. At 812, the one or more agents may provide one or more options enabling the user to conduct the management tasks for which the user and Device A are authorized (e.g., place a restriction on Device A, e.g., to reduce usage of a service plan or service plan allowance or allocation).

It is to be understood that the steps of FIG. 23 are exemplary and are not necessarily presented in any particular order. Performance of some or all of the steps in an alternative order is possible and is contemplated. The steps of FIG. 23 have been presented in the demonstrated order for ease of description and illustration. In addition, steps can be added, omitted, and/or performed simultaneously without departing from the scope of the appended claims. Furthermore, various other steps or variations of the steps recited in the flowchart can be performed. Some or all steps of the process shown in FIG. 23, and/or substantially equivalent steps, can be performed by hardware, by software, or by a combination of both. For example, some or all of the steps shown in FIG. 23, and/or substantially equivalent steps, can be performed by execution of computer-readable instructions included on a computer-readable medium. The term "computer-readable medium" and variants thereof can include volatile and/or non-volatile, removable and/or non-removable media such as, for example, RAM, RPM, EEPROM, flash memory or other memory technology, CD ROM, DVD, or other optical disk storage, magnetic tape, magnetic disk storage or other magnetic storage devices, or any other medium that can be used to store the computer-readable instructions.

The following are a few examples of modifications to FIG. 23 that are specifically contemplated: Determining whether a user has an appropriate level of authority for the desired management task can be performed before or at the same time as determining whether the device has an appropriate level of control. If neither the device nor the user has a level of authorization or control allowing the device management task, blocks 810 and 812 may be eliminated entirely (i.e., the user of Device A may not be able to see any information at all or perform any management tasks affecting Device A). If the desired management task affects only Device A (e.g., the user wishes to place a restriction on Device A to, for example, reduce usage of a service plan or service plan allowance or allocation), this task may be allowed regardless of whether the user has any authority to manage the device group or whether Device A has any level of control. In such cases, flow may proceed directly from 802 to 812 based on the determination that the desired management task initiated by Device A affects only Device A.

In some embodiments, in which a user of a first device configures at least an aspect of service applicable to a second device in the device group, the at least an aspect of the policy applicable to the second device comprises a control policy that controls at least an aspect of mobile access (or a device function execution, or an application installation, launch, storage, or usage) by the second device. In some embodiments, the at least an aspect of the policy applicable to the second device comprises one or more of the following: at least an aspect of a policy to govern at least an aspect of mobile connection service for the second device (e.g., a limit or restriction on usage of a service); an allowance for (or an allocation of) at least an aspect of a mobile service usage (e.g., an amount of data, an amount of time, etc.); an aspect of network access (e.g., tethering, roaming, etc.); an aspect of a time-dependent (or time-based) or geo/location based curfew or restriction; at least an aspect of a control policy that controls at least an aspect of use of an application on the first device; at least an aspect of a control policy that controls at least an aspect of phone use by the first device; at least an aspect of a control policy that controls at least an aspect of text messaging by the first device; a network-dependent aspect (e.g., is based on the type of network the second device is connected to (e.g., cellular, WiFi, Bluetooth, 2G, 3G, 4G, home, roaming, etc.)); at least an aspect of a notification policy associated with the second device; at least an aspect of an accounting policy associated with the second device; at least an aspect of a purchase policy (e.g., spending limits for services or in-application purchases (e.g., Google™ play store, game hints (via real or virtual currency, etc.)) for the second device.

In some embodiments, the one or more device agents on the first device obtain the information establishing the account priority status of the first device (or the first device user) during a sign-up process that either joins the first device to an existing device group account or that establishes a new device group account. In some embodiments, the one or more device agents on the first device obtain the information establishing the account priority status through a user interface of the first device. In some embodiments, the one or more device agents on the first device obtain the information establishing the account priority status from one or more device agents on a second device in the device group, where the one or more device agents on the second device have obtained the information through a user interface of the second device. In some embodiments, the one or more device agents on the first device obtain the information establishing the account priority status from a network server (e.g., service controller 122).

In some embodiments, the one or more device agents on the first device obtain the information establishing the account priority status of the first device from a user input obtained by the one or more device agents through a user interface of the first device. In some embodiments, the one or more device agents on the first device obtain the information establishing the account priority status of the first device based on the first device authority and the authority of a user of the first device. In some embodiments, the one or more device agents on the first device obtain the information establishing the account priority status of the first device based on the first device authority (or the authority of a user of the first device) and the location of the first device. In some embodiments, the one or more device agents on the first device obtain the information establishing the account priority status of the first device based on the first device authority (or the authority of the user of the first device) and a time (e.g., a time of day, a time period, an elapsed time, etc.).

The priority status can be established solely by the first device, or based on information from a network server, or based on information input by a user through a user interface of another device in the device group. In some embodiments, the priority status is established or authorized by the one or more device agents on the first device obtaining a user credential through a user interface of the first device. In some embodiments, the priority status is established or authorized by the one or more device agents on the first device based on information obtained (e.g., received) from a network server (e.g., service controller 122). In some embodiments, the user and/or device priority status is established or authorized by the one or more device agents on the first device obtaining information from one or more device agents on a second device in the device group, where the one or more device agents on the second device have obtained the information through a user interface of the second device.

In some embodiments, the one or more device agents on the first device obtain the information establishing the account priority status of the first device based on a service sign-up credential used to obtain service for the first device (e.g., used to add the first device to the device group). In some embodiments, the service sign-up credential is an account owner credential (e.g., one or more of an e-mail address, a username, a password, a PIN, etc.). In some embodiments, the service sign-up credential is a credential for a non-account owner (e.g., an OnCode (described below), a non-secure PIN, etc.) that is, in some embodiments, less secure than the account owner credential. In some embodiments, the service sign-up credential is a quick response (QR) code or another credential obtained from another device (e.g., through a near-field communication, Bluetooth communication, WiFi communication, bump, etc.). In some embodiments, if the service sign-up credential is a credential for a non-account owner (for example, a credential of a child, manager, secondary user, employee, etc.), an account administrator must approve the addition of the first device to the device group before the first device is joined/added to the device group (or device group account).

In some embodiments, service controller 122 determines an account control (wherein the term "account control" is used interchangeably with the term "account management") priority status (which may alternatively be referred to as control level, authority status, privilege level, granted permissions, etc.) for a first device in the device group and communicates the account control priority status to one or more device agents on the first device. In some embodiments, the account control priority status provides for control of service access or application usage by the first device. In some embodiments, the account control priority status provides for control of service access or application usage for one or more other devices in the device group. In some embodiments, if the first device is configured as a device with account control, service controller 122 accepts information from the one or more device agents on the first device, where the information assists in controlling service access or application usage of the first device and/or one or more other devices in the device group. In some embodiments, if the first device is not configured as a device with account control, service controller 122 does not accept the information from the one or more device agents on the first device.

Figure 24:
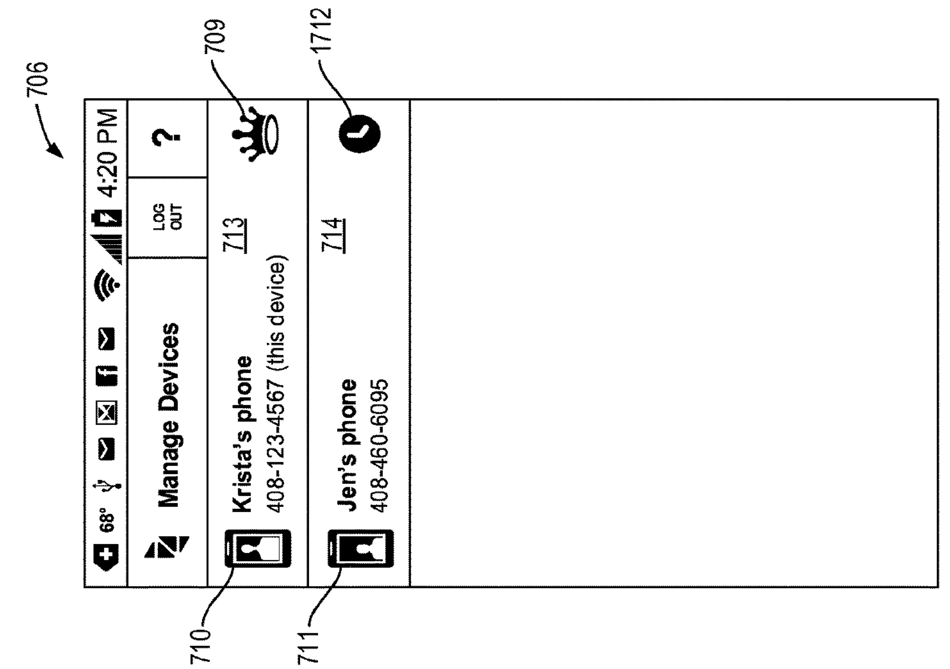
FIG. 24 illustrates a "Manage Devices" screen presented through a touch-screen display of a wireless end-user device in accordance with an exemplary embodiment.

FIG. 24 illustrates an exemplary embodiment of a "Manage Devices" screen 706 that is presented by one or more device agents of service processor 115 when a user with authority (by virtue of the device having account control or by virtue of the user being able to log in to the device group account) selects the "Manage Devices" region 703B of FIG. 22. The "Manage Devices" screen 706 of FIG. 24 provides indicia of the capabilities of or restrictions on the devices in the group, thus enabling the user with authority to determine, at a glance, whether a particular device has certain permissions or is subject to restrictions. In some embodiments, when an authorized user, or a user of a device with an appropriate level of account control, selects "Manage Devices" region 703B, one or more device agents of service processor 115 contact service controller 122 to obtain information about device 100 and other devices currently in the device group. In other embodiments, one or more device agents of service processor 115 periodically or occasionally communicate with service controller to receive information about device 100 and any other devices in the device group, and the one or more device agents store this information on device 100. In some embodiments, the one or more agents pull this information from service controller 122; in other embodiments, service controller 122 pushes this information to service processor 115, such as, for example, when a device has been added to the device group, or to communicate periodic or occasional updates on plan usage by devices in the device group, etc. In some embodiments, the one or more device agents and service controller 122 communicate over service control link 1653. In some embodiments, the communications are secure (e.g., encrypted).

In the exemplary embodiment of FIG. 24, the device group includes two devices, and the one or more device agents present information about the two devices in the device group on screen 706. The name (or nickname) of device 100 (i.e., the device on which the UI screens are being presented), which in this embodiment is "Krista's phone," is listed first by name ("Krista's phone"), number (408-123-4567), and an indication that it is the device being used ("(this device)"). The other device in the device group is named "Jen's phone" and has the phone number 408-460-6095. To the right of the name and number of Krista's phone is an icon 709 in the shape of a crown. In the exemplary embodiment of FIG. 24, icon 709 indicates that the associated device (i.e., in this example, the device on which screen 706 is being presented) has at least some level of control (i.e., can perform at least some of the various functions that will be described in the sequel, such as to purchase service plans, place restrictions on devices in the device group, etc.). In the exemplary embodiment, the absence of a crown icon to the right of the name and number of Jen's phone indicates that Jen's phone does not have full control (or, alternatively, has lower control, or limited, secondary, or partial control, or control over itself and/or a subset of other devices in the device group) (i.e., it cannot perform the full complement of managerial or administrative tasks available to Krista's phone).

In the embodiment of FIG. 24, a large person icon 710 is shown to the left of Krista's device's name and number, and Jen's phone is shown with a smaller person icon 711 to the left of the device's name and number. In the particular embodiment of FIG. 24, the sizes of the person icons 710 and 711 indicate whether the associated devices are subject to any restrictions (for example, restricted network access, restricted voice usage, restricted text messaging, restricted data usage, restricted application or device function usage, etc.). Restrictions are discussed in detail below. In the particular embodiment of FIG. 24, a large person icon indicates that the device is not subject to a usage restriction, and a small person icon indicates that the device is subject to a usage restriction. Thus, as shown in FIG. 24, Krista's phone is not subject to any restrictions because icon 710 is of a large person, but Jen's phone is subject to a restriction because icon 711 is of a small person.

In the exemplary embodiment of FIG. 24, a clock icon 1712 appears to the right of the name and number of Jen's phone. In this embodiment, clock icon 1712 indicates that the associated device is subject to a time-dependent restriction. For example, if Jen is a school-aged child, and Krista is Jen's mother, Krista might wish to restrict Jen's usage of Jen's device during the hours set aside for Jen to work on her homework. Thus, Krista might establish a restriction that disables one or more functions of Jen's phone during the hours of 3:00 P.M. and 6:00 P.M. when Jen is supposed to be doing her homework. (Embodiments supporting this functionality are described below.) Clock icon 1712 indicates that Jen's phone is currently subject to a time-dependent (i.e., temporary, possibly recurring) usage restriction. In some embodiments, icon 1712 may change in some manner (e.g., size, color, shape, presence, etc.) to indicate when the associated device has restrictions set for it or whether the device is currently subject to a restriction. In some embodiments, a device may be subject to more than one restriction, and the icon can vary to designate which restriction is currently in force, or more than one icon can be shown if more than one restriction is in force. In some embodiments, the user who establishes the restriction can select the icon(s) 1712 presented to indicate the existence of the restriction or whether the restriction is in force. In some embodiments, the user of the device subject to a restriction can select the icon associated with the restriction. In some embodiments, icons 1712 are assigned automatically by service processor 115.

Figure 25B:
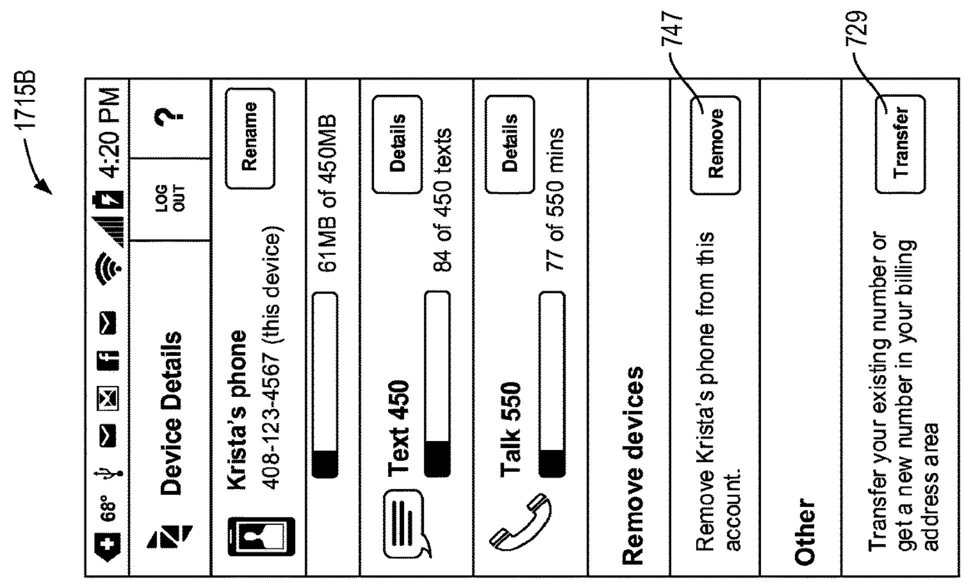
FIGS. 25A and 25B illustrate portions of a "Device Details" screen presented through a touch-screen display of a wireless end-user device in accordance with an exemplary embodiment.
Figure 25A:
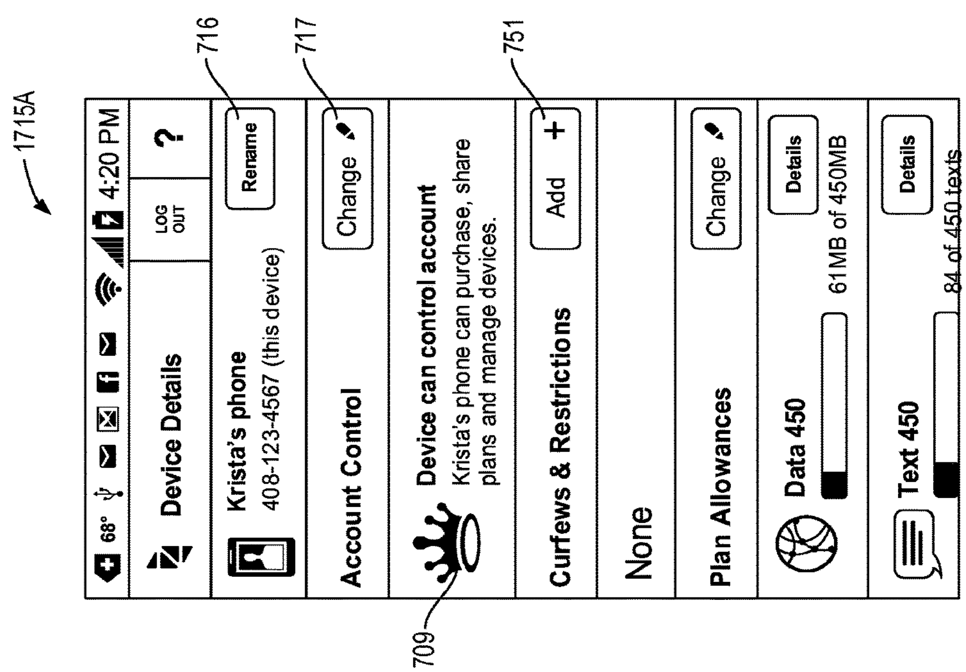

In the embodiment illustrated by FIG. 24, regions 713 and 714, which provide information about Krista's phone and Jen's phone, are touch-sensitive. Thus, if the user selects region 713, the one or more device agents provide a "Device Details" screen 1715, which presents additional information about Krista's phone, as shown in FIGS. 25A and 25B. FIG. 25A illustrates the top portion of the screen (1715A), and FIG. 25B presents the lower portion of the screen (1715B), which the user accesses by scrolling down. The "Device Details" screen 1715 shown in the embodiment of FIGS. 25A and 25B provides additional information about Krista's phone, such as, for example, information about account control, a curfew or restriction, and plan allowances and usage. In the embodiment of FIGS. 25A and 25B, "Device Details" screen 1715 informs the user that (1) Krista's phone can purchase and share plans, and manage devices in the device group; (2) Krista's phone is not subject to any curfew or restriction; and (3) Krista's phone has used 61 MB of 450 MB of data available to it, 84 of 450 texts available to it, and 77 of 550 voice minutes available to it. In addition, the lower portion of screen 1715B (shown in FIG. 25B) provides options to remove Krista's phone from the account or to transfer an existing number or get a new number for Krista's phone.

Figure 26:
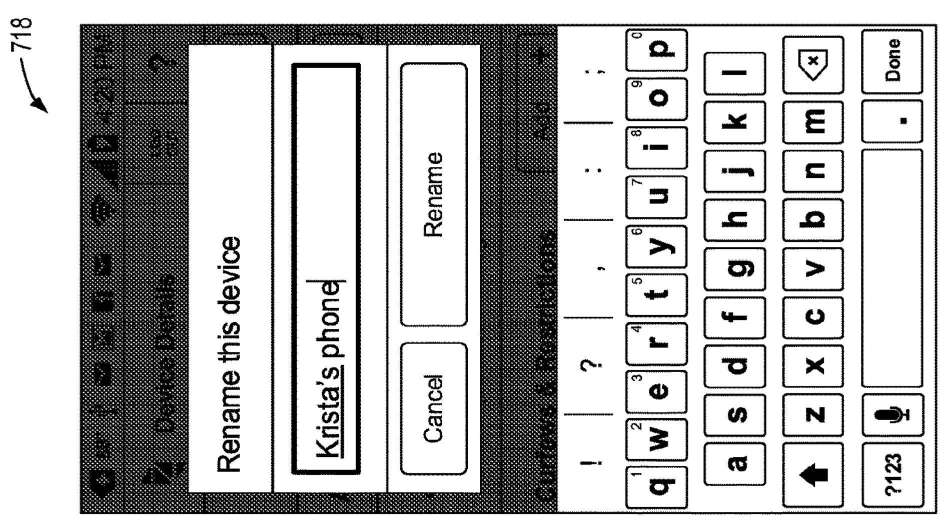
FIG. 26 illustrates a pop-up presented through a touch-screen display of a wireless end-user device to assist a user to change the name of a device in accordance with an exemplary embodiment.

If the user selects the "Rename" button 716 of FIG. 25A, the one or more device agents allow the user to give Krista's phone a different nickname. For example, in the embodiment of FIG. 25, the one or more device agents cause a pop-up to be presented through the user interface to allow the assignment of a new nickname for Krista's phone, as shown by the exemplary screen 718 shown in FIG. 26. In some embodiments, after the user changes the nickname of the device, the one or more device agents communicate the new nickname to service controller 122, which then distributes the new nickname to other devices in the device group (e.g., to devices that have full (or another appropriate level of) account control of the device group). Thus, in the example of FIG. 26, if the user changes the nickname of Krista's phone to "KJ's device," the one or more device agents would communicate the name "KJ's device" to service controller 122, which would then provide the name "KJ's device" to other devices in the device group with the appropriate level (e.g., full or partial) account control. These other devices would then list Krista's phone as "KJ's device" when a user of one of these other devices selected the "Manage Devices" option, as illustrated by screen 968 of FIG. 165 (Jen's phone, granted account control) and screen 969 of FIG. 166 (Lucy's phone, added to the device group as described below and granted account control). Likewise, the new nickname would be visible to a user with the appropriate level of authorization who logs into the device group account (e.g., an administrator who is able to manage Krista's device would see the device as "KJ's device" upon logging in).

Figure 27:
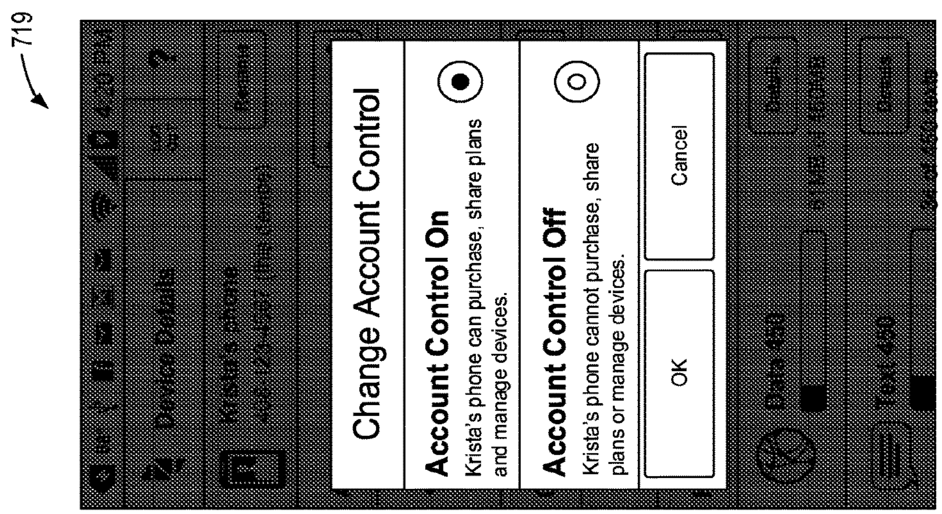
FIG. 27 illustrates a pop-up presented through a touch-screen display of a wireless end-user device to assist a user to change a level of account control of a device in accordance with an exemplary embodiment.

Referring again to the exemplary screen 1715 shown in FIGS. 25A and 25B, the user may select the "Change" option 717 to modify account controls available to Krista's phone. In some embodiments, the one or more device agents interact with the user through the UI (e.g., screen 1715) to obtain the user's desired change in account control. FIG. 27 illustrates an exemplary embodiment in which the one or more device agents cause a pop-up to be presented as screen 719 through the device 100 UI. In the embodiment of FIG. 27, the pop-up gives the user two options: (1) "Account Control On," in which case Krista's phone can purchase and share plans and manage devices in the device group; (2) "Account Control Off," in which case Krista's phone cannot purchase or share plans, or manage devices in the device group. If the user were to select the "Account Control Off" radio button of screen 719 and select "OK" to confirm the change, the crown icon 709 on the "Manage Devices" screen 706 of FIG. 24 would disappear in the exemplary embodiment.

Adding a Device to an Existing Device Group

In some embodiments, a user of or who is in possession of a device that is not yet associated with a service account can add that device to an existing device group (or to an existing device group account). In some embodiments, in order to add a device to an existing device group, the user of such device must provide information to authorize the addition of the device to the device group. In some embodiments, the information is a code (e.g., a sequence of digits, a QR code, OnCode, a bar code, etc.). In some embodiments, the code is less secure than, for example, a device group account password. In some embodiments, the information is associated with the device group account (e.g., a username, password, an e-mail address associated with the account, a PIN, an OnCode, etc.). In some embodiments, the one or more device agents prompt the user, through a user interface of the device that is to be added to the device group, for the required information. In some embodiments, the one or more device agents communicate the information to service controller 122, and service controller 122 determines, based on the information, whether the request to add the device is authorized. In some embodiments, default account control permissions, which may be temporary or modified by an authorized user, are based on the type of credential entered (e.g., the permissions are lower if the credential is an OnCode than they are if the credential is an account password, etc.). In some embodiments, service controller 122 sends a message to the one or more device agents to indicate whether the request to add the device to the device group was authorized. In some embodiments, if service controller 122 communicates that the request was authorized, service controller 122 sends information to one or more network elements to assist in provisioning the one or more network elements to support the addition of the device to the device group, and the one or more device agents present a notification through the user interface that the device is being added or has been added to the device group. In some embodiments, a message is sent to one or more users (or devices) that have the appropriate level of account control that a device has been added to the account.

In some embodiments, the one or more device agents perform one or more of the following tasks: (1) present, through a device user interface, an initial account sign-up screen; (2) obtain, through the user interface, one or more user inputs indicating an intention to join/add the device to an existing device group account; (3) assist in causing the device to be joined or added to the device group account. In some embodiments, the initial account sign-up screen gives the user an option to join an existing account or establish a new account. (See, e.g., FIG. 28.) In some embodiments, obtaining one or more user inputs indicating an intention to join/add the device to an existing device group account comprises obtaining one or more credentials or information to determine whether the device is authorized to join the existing device group account. In some embodiments, assisting in causing the device to be joined or added to the device group account comprises communicating service sign-up information to service controller 122. In some embodiments, the service sign-up information comprises the obtained one or more credentials or the information, which service controller 122 then uses to determine whether the device is authorized to join the device group (and/or initial account control permissions and/or plan sharing attributes).

In some embodiments, service controller 122 obtains, from one or more device agents on a first device, a request to join/add the first device to an existing device group account. In some embodiments, in response to the request, service controller 122 provisions one or more network elements and/or one or more aspects of the first device to implement a policy that allows the first device to obtain a service provided for under a first account access policy. In some embodiments, service controller 122 provides configuration information to the one or more device agents on the first device to support the joining of the first device to the device group account. In some embodiments, the configuration information enables the one or more device agents on the first device to present a notification informing the user that the first device has been successfully joined/added to the device group account. In some embodiments, the configuration information enables the one or more device agents on the first device to present a notification informing the user that service is now available. In some embodiments, the configuration information enables the one or more device agents on the first device to present a notification informing the user of an amount of service usage. In some embodiments, the configuration information enables the one or more device agents on the first device to present a notification informing the user of an amount of available or consumed service usage. In some embodiments, the configuration information enables the one or more device agents on the first device to present a notification informing the user of service configuration options. In some embodiments, the configuration information enables the one or more device agents on the first device to present a notification enabling the user to configure a device policy associated with the device group account.

In some embodiments, at a later time, service controller 122 obtains, from the one or more device agents on the first device or from one or more device agents on another device in the device group, a request to remove the first device from the device group account. In some embodiments, in response to the request, service controller 122 assists in provisioning the one or more network elements and/or the one or more aspects of the first device to prevent the device from obtaining service provided for under the first account access policy. In some embodiments, service controller 122, sends a message to other devices in the device group indicating that a device has been removed from the device group. In some embodiments, service controller 122 provides information to the one or more device agents on the first device to cause the one or more device agents on the first device to present an offer, through a user interface of the first device, an option to create a new service account or join an existing service account. In some embodiments, service controller 122 provides information to the one or more device agents on the first device to provision at least an aspect of a device configuration so that the first device no longer provides service associated with the device group account.

In some embodiments, at a later time, service controller 122 obtains, from the one or more device agents on the first device or from one or more device agents on another device, a request to join/add the first device to a different device group account. In some embodiments, in response to the request, service controller 122 provisions one or more network elements and/or one or more aspects of the first device to implement a policy that allows the first device to obtain a service provided for under a second account access policy associated with the different device group account. In some embodiments, service controller 122 provides configuration information to the one or more device agents on the first device to support the joining of the first device to the different device group account.

Figure 29:
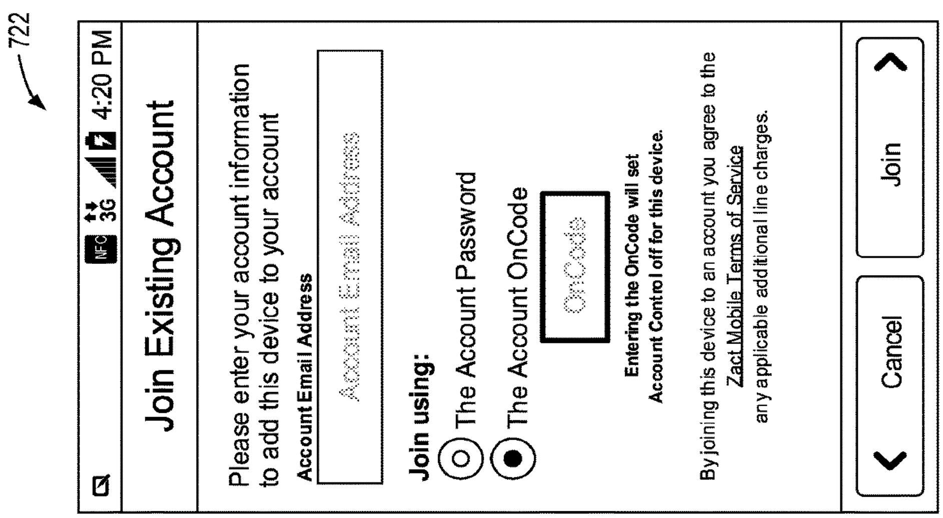
FIG. 29 illustrates a display screen presented through a touch-screen display of a wireless end-user device to assist a user to add the device to an existing device group account in accordance with an exemplary embodiment.
Figure 28:
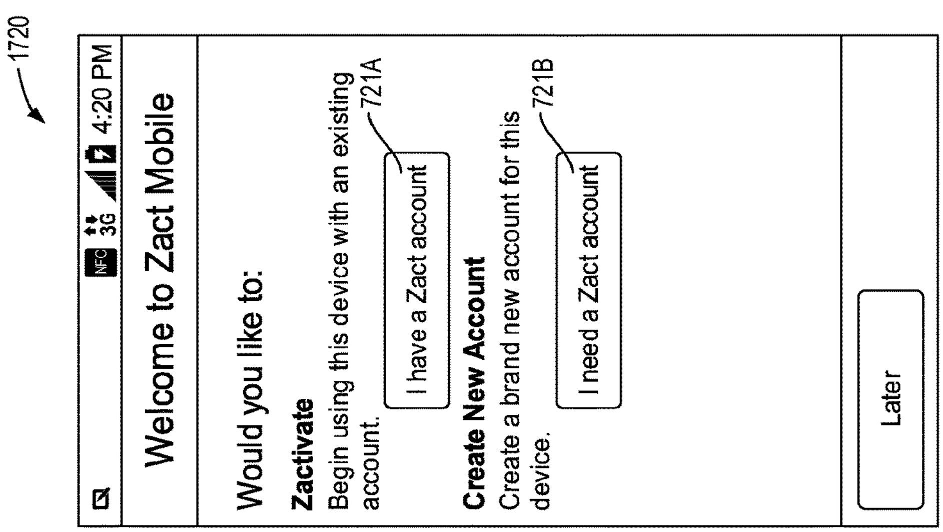
FIG. 28 illustrates a screen that is presented through a touch-screen display, in accordance with an exemplary embodiment, to a user of a new device to allow the user to either begin using the device with an existing device group account or to create a new device group account.

FIG. 28 illustrates an exemplary embodiment of screen 1720 that is presented to a user of a new device that is capable of being added to an existing account. In the exemplary embodiment of FIG. 28, screen 1720 allows the one or more device agents to offer two choices through the device UI: (1) to add the device to an existing account (button 721A), or (2) to create a new account for the device (button 721B). If the user selects the "I have a Zact account" button 721A of screen 1720 in the exemplary embodiment of FIG. 28, the one or more device agents present a screen to gather information to enable the device to be added to the account. FIG. 29 illustrates an exemplary embodiment of such a screen, labeled 722, which prompts the user to enter the account e-mail address and, by selecting one of two available radio buttons, either the account password or the account code (referred to in FIG. 29 as "The Account OnCode"). In an exemplary embodiment, the account code enables an account holder to authorize other people to add devices to the device group without assistance from the account holder and without compromising the security of the account. For example, an employer could provide devices to her employees and also provide the account code to the employees, and the employees could add their devices to the device group without further assistance from the employer. As another example, a parent in California could send a device and the account code to his or her daughter in Ohio, and the daughter could add the device to the account without further involvement or help from the parent. Because the account code may not be secure, screen 722 warns the user that entering the account code, instead of the account password, will set account control to "Off" when the device is added. Therefore, a person in possession of the device and the account code can add the device to the account, but he or she cannot manage the devices in the group or view or change account information unless he or she can log in to the device group account.

Figure 30:
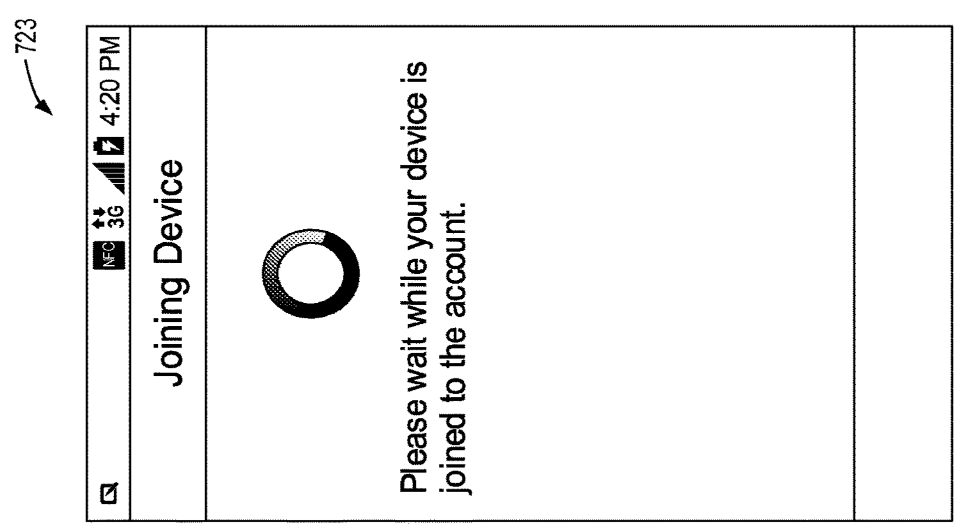
FIG. 30 illustrates a display screen presented through a touch-screen display of a wireless end-user device, in accordance with an exemplary embodiment, to inform a user that the process of adding the device to the account is underway.

If the user who is presented screen 722 of FIG. 29 enters an account e-mail address and account code, the one or more device agents send this information to service controller 122, possibly over service control link 1653, which may be secured. Service controller 122 can then determine, based on the information, whether the device will be added to the device group. In some embodiments, the one or more device agents indicate to the user that the process of adding the device to the account is ongoing. FIG. 30 presents an exemplary screen 723 that informs the user that the device is being joined/added to the account.

Figure 31:
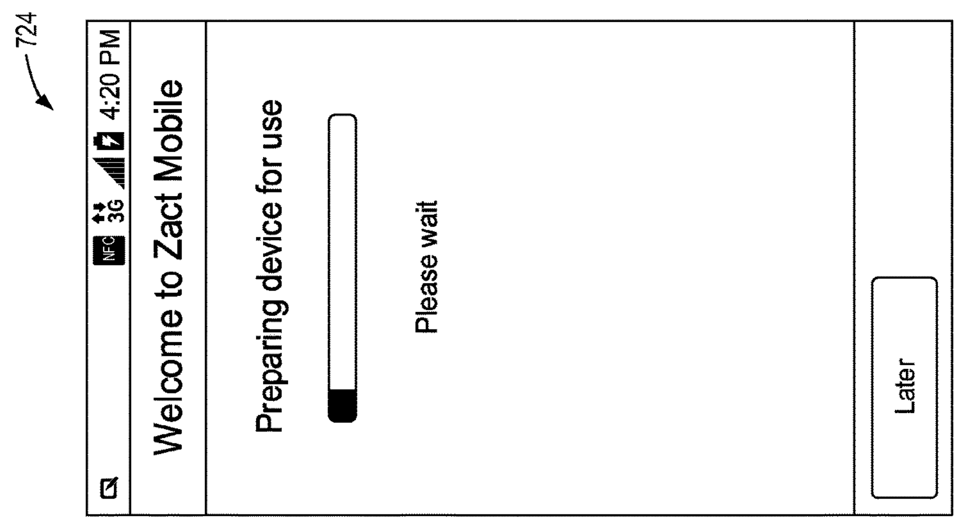
FIG. 31 illustrates a display screen presented through a touch-screen display of a wireless end-user device, in accordance with an exemplary embodiment, to inform a user that the device is being prepared for use.
Figure 32:
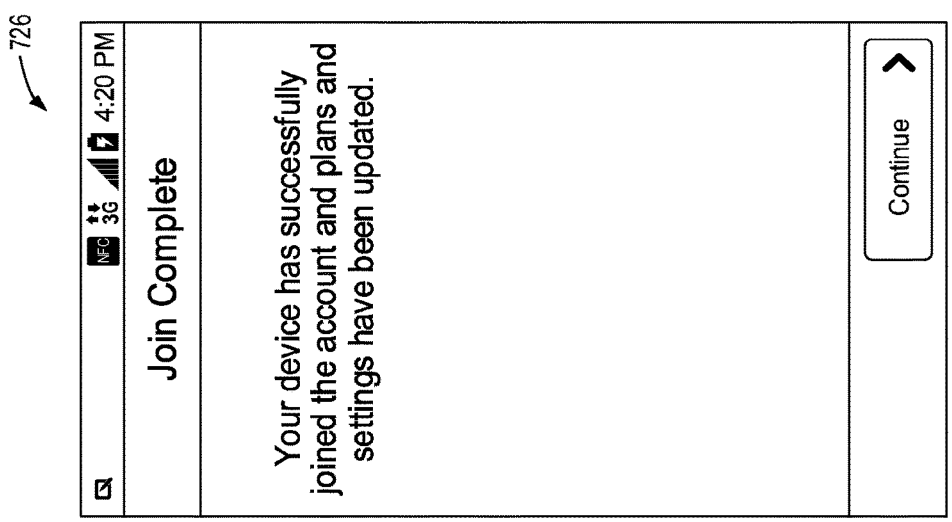
FIG. 32 illustrates a display screen presented through a touch-screen display of a wireless end-user device, in accordance with an exemplary embodiment, to inform the user that the device has successfully joined the account, and its plans and settings have been updated accordingly.

In some embodiments, after the device has been added to the account, the one or more device agents obtain information from service controller 122 (e.g., information about service plans, service processor settings, updated branding or logos, access restrictions, device settings, applications, home screen layout, application configuration, etc.). In the exemplary embodiment of FIG. 31, while the one or more device agents are obtaining information from service controller 122 or updating the device, the one or more device agents present screen 724 to inform the user that the device is being prepared for use. In some embodiments, when the device is ready for use, the one or more device agents present a notification to the user. In the exemplary screen 726 of FIG. 32, the notification informs the user that the device has successfully joined the account, and the plans and settings have been updated.

Figure 33:
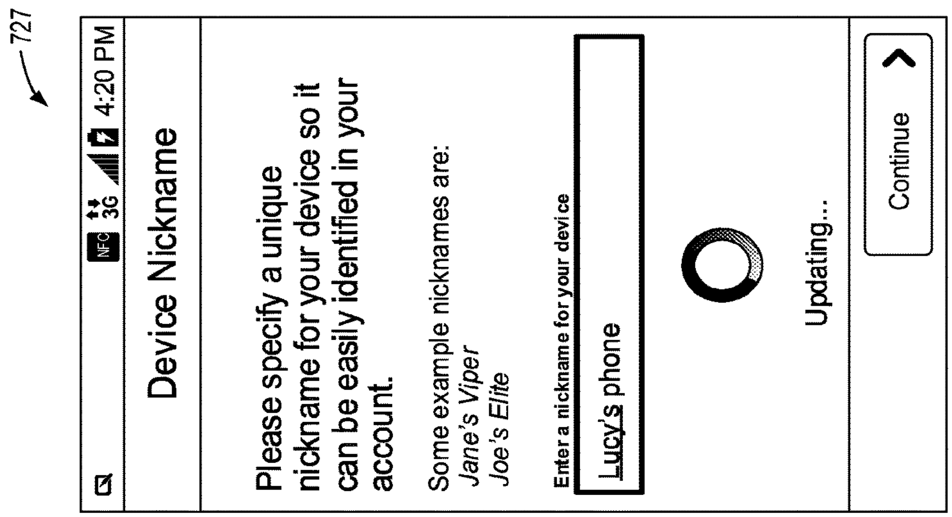
FIG. 33 illustrates a display screen presented through a touch-screen display of a wireless end-user device, in accordance with an exemplary embodiment, to enable a user of the device to specify a nickname for the device.

In some embodiments, after the device has been added to the device group, the one or more device agents assist the user to customize the device (e.g., to give the device a name/nickname, add an e-mail account, etc.) or to change one or more characteristics/settings of the device (e.g., a phone number associated with the device). In the exemplary embodiment of FIG. 33, using screen 727, the one or more device agents prompt the user to specify a nickname for the device. As discussed above, in some embodiments, the one or more device agents provide the nickname to service controller 122, which then sends information about the nickname to other devices in the device group or makes the nickname available to authorized users. In some embodiments, service controller 122 only sends information about the nickname to devices with some level of account control. As shown in FIG. 33, the user has elected to call the device "Lucy's phone," and the one or more device agents indicate on screen 727 that the device's nickname is being updated.

Figure 34:
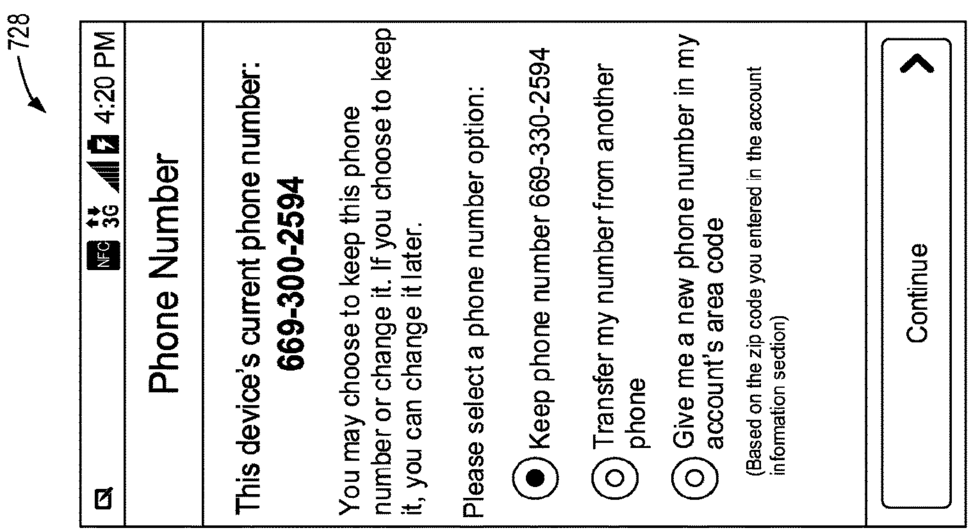
FIG. 34 illustrates a display screen presented through a touch-screen display of a wireless end-user device, in accordance with an exemplary embodiment, to assist a user of the device to transfer an existing phone number or to get a new number for the device.

In some embodiments, after the device has been added to the device group, the one or more device agents offer to transfer an existing phone number to the device, or request a new phone number for the device. In the exemplary embodiment of FIG. 34, using screen 728, the one or more device agents cause information to be presented to assist the user to transfer an existing phone number or to get a new number in the user's billing address area. The one or more device agents may also cause a touch-sensitive button 729, labeled "Transfer" in some embodiments, to be presented through the UI, as shown in screen 1715 of FIG. 25B. Phone number transfers are described below.

Figure 35:
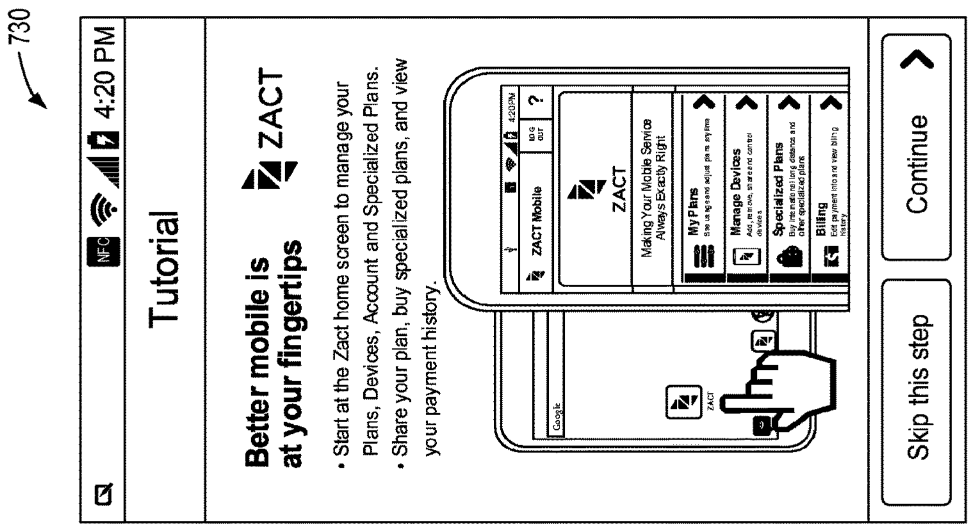
FIG. 35 illustrates a display screen presented through a touch-screen display of a wireless end-user device, in accordance with an exemplary embodiment, to enable a user of the device to view tutorial information.

In some embodiments, after the device has been added to the device group, the one or more device agents offer the user a tutorial. In an exemplary embodiment, illustrated by screen 730 of FIG. 35, the tutorial explains some of the features of the service, including those features presented in FIG. 22. FIGS. 157A through 157K also illustrate exemplary tutorial screens.

Figure 36:
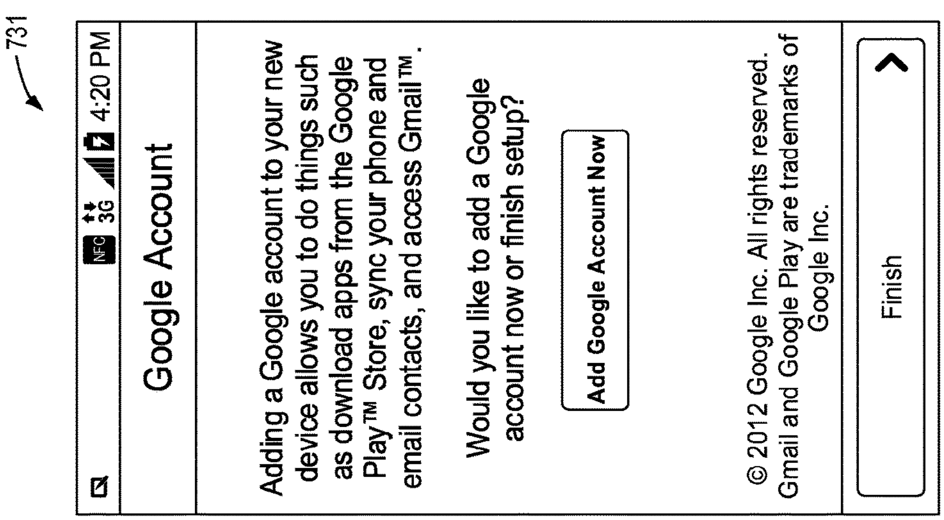
FIG. 36 illustrates a display screen presented through a touch-screen display of a wireless end-user device, in accordance with an exemplary embodiment, to assist a user to add a Google™ account to the device.

In some embodiments, after the device has been added to the device group, the one or more device agents offer to assist the user to add an existing external account (e.g., an existing e-mail account, etc.) to the device. In some embodiments, the user may skip adding an external account. FIG. 36 illustrates an exemplary embodiment in which the one or more device agents present screen 731, which offers to assist the user to add a Google™ account to the device.

Figure 37:
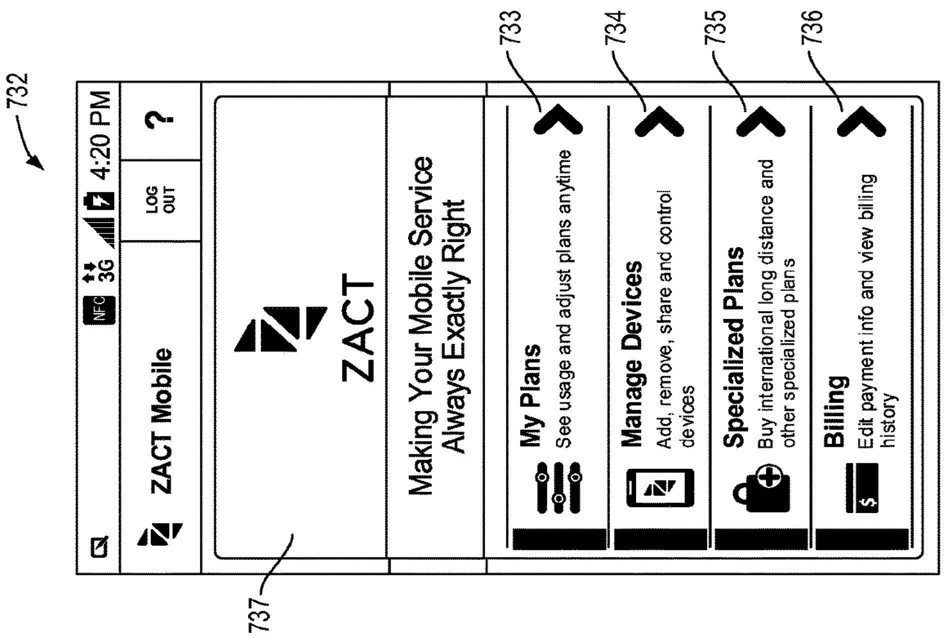
FIG. 37 illustrates a service home screen presented through a touch-screen display of a wireless end-user device in accordance with an exemplary embodiment.
Figure 39:
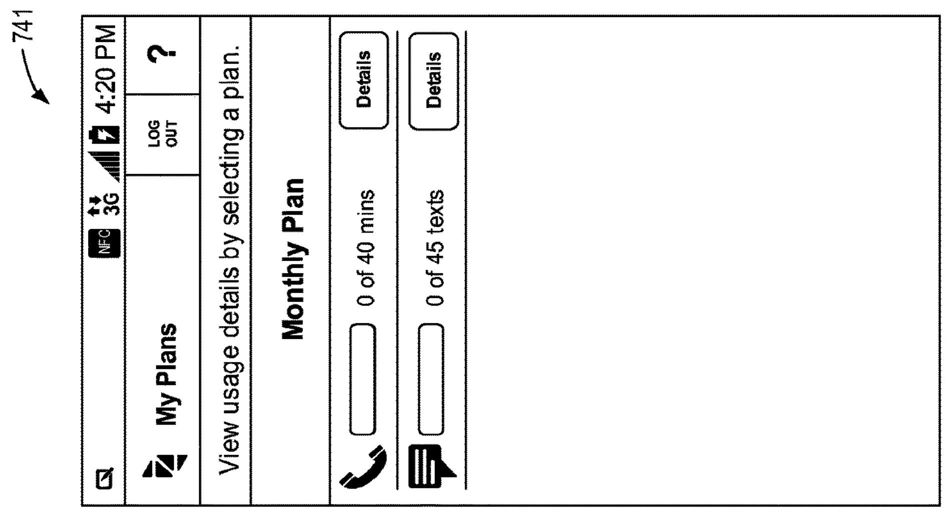
FIG. 39 illustrates a display screen presented through a touch-screen display of a wireless end-user device, in accordance with an exemplary embodiment, when a user selects the "View Device Usage" button illustrated in FIG. 38.
Figure 38:
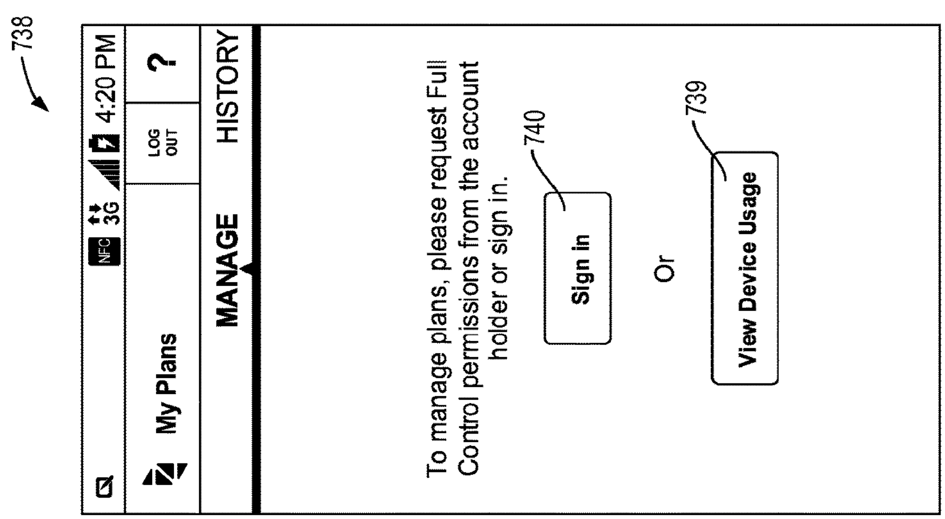
FIG. 38 illustrates a display screen presented through a touch-screen display of a wireless end-user device, in accordance with an exemplary embodiment, when a user selects the "My Plans" region illustrated in FIG. 37.

In some embodiments, after the device has been added to the device group, the one or more device agents present the service home screen 732, such as shown in FIG. 37. In some embodiments, the functions available to the user depend on whether the user added the device to the device group using the account password (e.g., a secure credential) or the account code (e.g., non-secure or less secure information). In some embodiments, if the user added the device to the device group using the account code, by default, the device does not have account control. In some such embodiments, if the user selects the "My Plans" region 733 from screen 732, the one or more device agents present screen 738 shown in FIG. 38, which informs the user that plan management requires control permission for the device or the ability to log in to the device group account. As described previously, if the user is able to log in to the account by selecting "Sign in" button 740 of screen 738, the user can perform the management functions specified by the user's authorization level. If the user does not log in to the account, in screen 738 of the exemplary embodiment of FIG. 38, the user can still view usage of the device by selecting the "View Device Usage" button 739. FIG. 39 illustrates an exemplary embodiment of a screen 741 presented by the one or more device agents when the user selects "View Device Usage" button 739 of FIG. 38. Screen 741 of FIG. 39 indicates that the device, which was just added to the device group, has not yet used any voice minutes or any text messages available to it.

Figure 41:
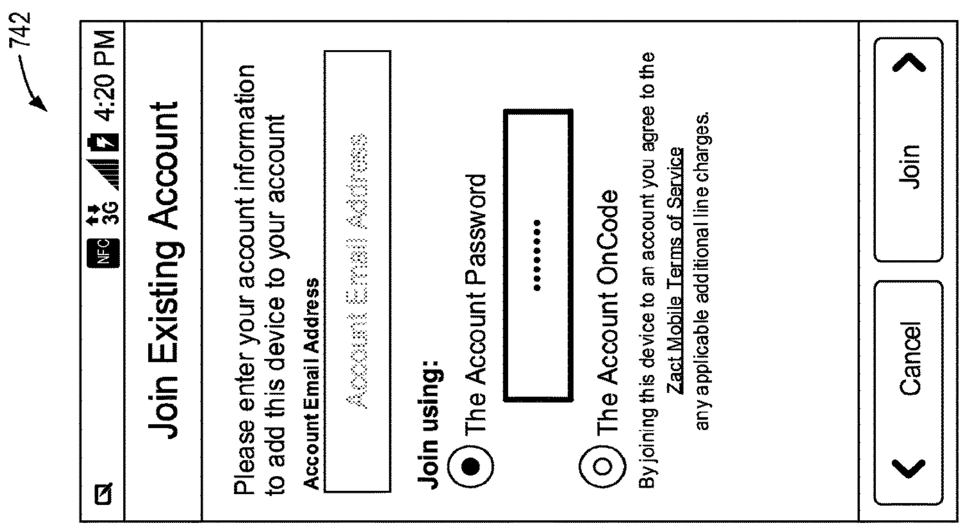
FIGS. 40 and 41 illustrate a display screen presented through a touch-screen display of a wireless end-user device, in accordance with an exemplary embodiment, to allow a user to join an existing device group account by entering the account e-mail address and the account password.
Figure 40:
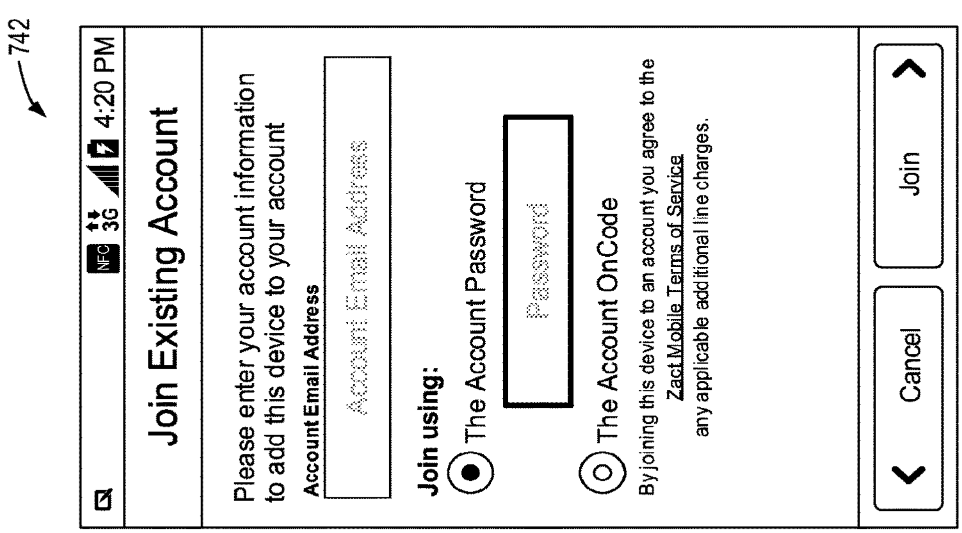
Figure 42:
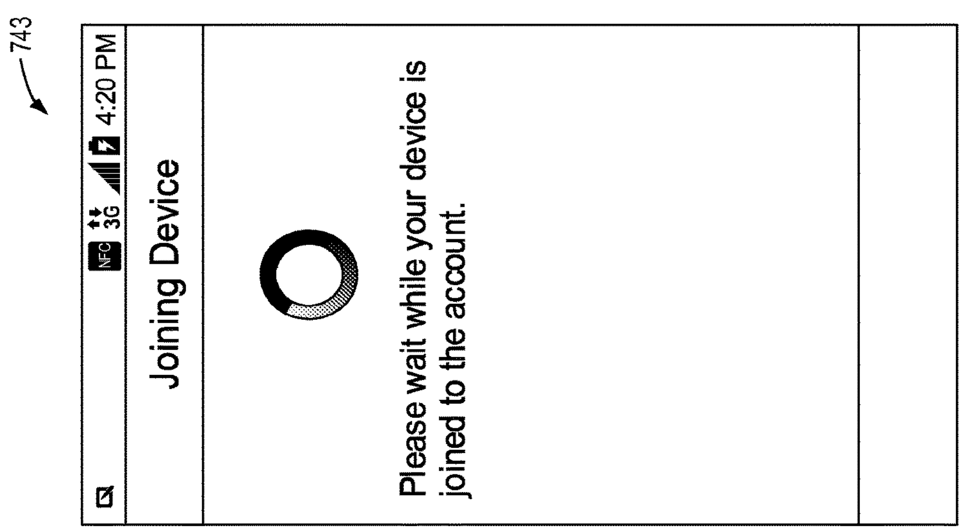
FIG. 42 illustrates a display screen presented through a touch-screen display of a wireless end-user device, in accordance with an exemplary embodiment, to inform a user that the device is being joined to the specified device group account.
Figure 43:
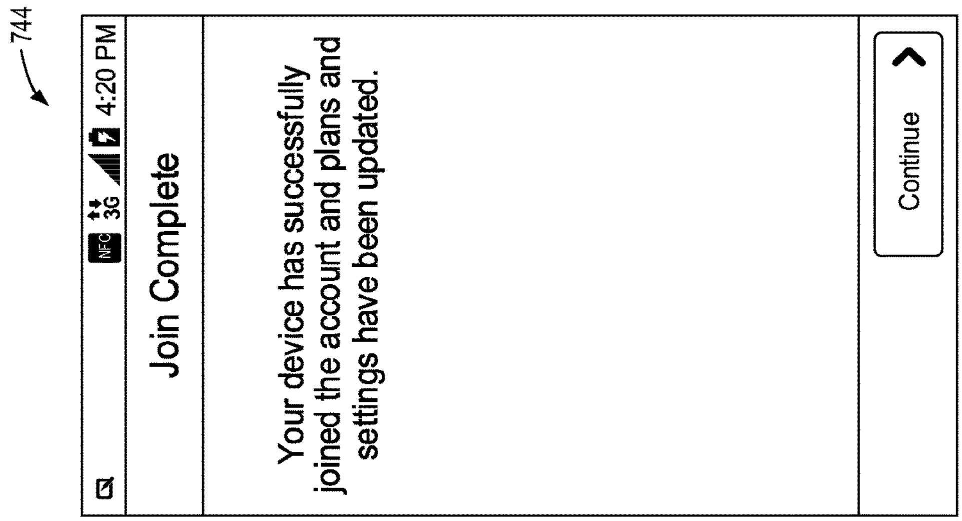
FIG. 43 illustrates a display screen presented through a touch-screen display of a wireless end-user device, in accordance with an exemplary embodiment, to inform a user of the device that the device has successfully joined the device group account, and its plans and settings have been updated accordingly.
Figure 44:
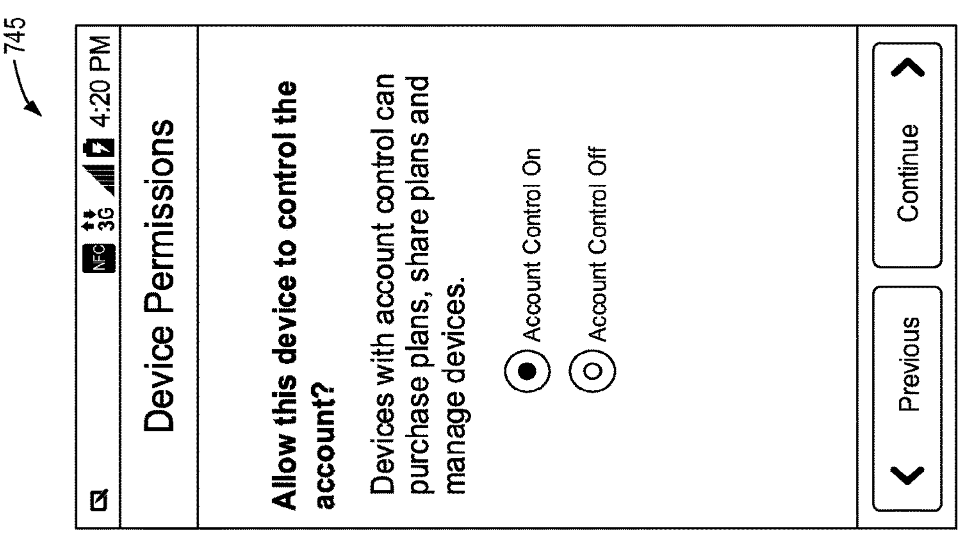
FIG. 44 illustrates a display screen presented through a touch-screen display of a wireless end-user device, in accordance with an exemplary embodiment, to assist a user of a device to specify a level of account control for the device.
Figure 45:
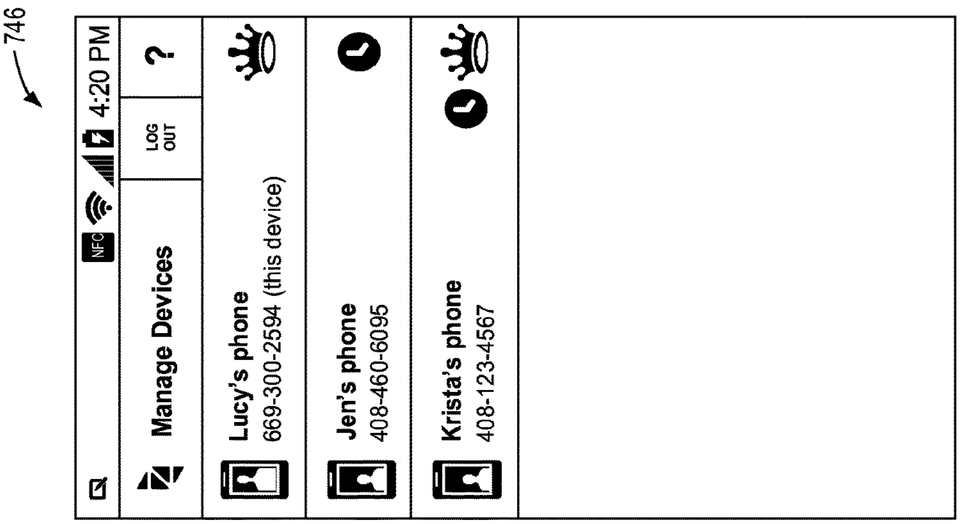
FIG. 45 illustrates a display screen presented through a touch-screen display of a wireless end-user device, in accordance with an exemplary embodiment, when the device has a level of account control enabling the user to see information about and manage devices in the device group.

In some embodiments, the procedure for adding a device to a device group using an account password is similar to the procedure for adding a device to a device group using an account code. FIGS. 40 and 41 illustrate screen 742, which is presented in response to the user selecting the "The Account Password" radio button instead of the "The Account OnCode" radio button of FIG. 29. After the user has entered the account e-mail address and the account password, the one or more device agents present screen 743 shown in FIG. 42 and, if service controller 122 indicates that the account e-mail address and account password are correct, screen 744 of FIG. 43. In some embodiments, when a user adds a device to a device group using the account password, it is possible that the user is an account holder or at least a person with authority/permissions (e.g., partial, primary, full, etc.) over the account (e.g., a parent, an employer, etc.). It is also possible, however, that the device being added is to be used by someone whom the account holder does not want to have access to the account or the ability to manage some or all of the devices in the device group (e.g., a parent setting up a child's device). Thus, in some embodiments, after a device has been added to a device group, the one or more device agents ask the user to indicate whether the device should be given account control. FIG. 44 illustrates an exemplary embodiment of screen 745, through which the one or more device agents seek this information. Screen 745 informs the user that devices with account control can purchase plans, share plans, and manage devices. If the user selects the "Account Control Off" radio button of screen 745, in some embodiments, the one or more device agents present some or all of the screens illustrated in FIGS. 33 through 39. If, on the other hand, the user selects the "Account Control On" radio button of screen 745, in some embodiments the user can then see information about and manage the other devices in the group, as illustrated by screen 746 of FIG. 45.

Removing a Device from a Device Group

In some embodiments, a user can remove a device from an account. In some embodiments, the one or more device agents present, through the device user interface, an offer to remove the device from the device group or an indication that removal of the device from the device group (and, therefore, from the device group account) is an option available to the user. In some embodiments, if the user indicates he wishes to remove the device, before removing the device from the account, the one or more device agents prompt the user to confirm that the user wishes to remove the device. In some embodiments, before removing the device from the account, the one or more device agents inform the user that charges previously incurred by the device being part of the account will be included in the account invoice. In some embodiments, to remove a device, the one or more agents prompt the user to enter information to confirm the removal (e.g., a user credential, a username, a password, security information, a code, etc.).

In some embodiments, if the user confirms that he wishes to remove the device from the device group, the one or more device agents communicate information to service controller 122 to enable service controller 122 to assist in removing the device from the device group. In some embodiments, service controller 122 sends a confirmation message to the one or more device agents after the device has been removed. In some embodiments, after the device has been removed from the device group (or during the device removal process), the one or more device agents present a notification through a device user interface to inform the user that the device has been removed (or is being removed) from the device group. In some embodiments, the one or more device agents present a notification with an offer to join or switch the device to a second device group.

In some embodiments, after the device has been removed from the device group, the one or more device agents present an initial device account sign-up offer through a user interface of the device. In some embodiments, the initial device account sign-up offer is presented through a touch screen of the device. In some embodiments, the initial device account sign-up offer is the same as before the device was associated with the device group (e.g., when the device was first switched on or before it was initially joined/added to the device group). In some embodiments, the user can interact with the one or more device agents through the device user interface to re-join the device group account, to join a different device group account, or to establish a new device group account.

Figure 46:
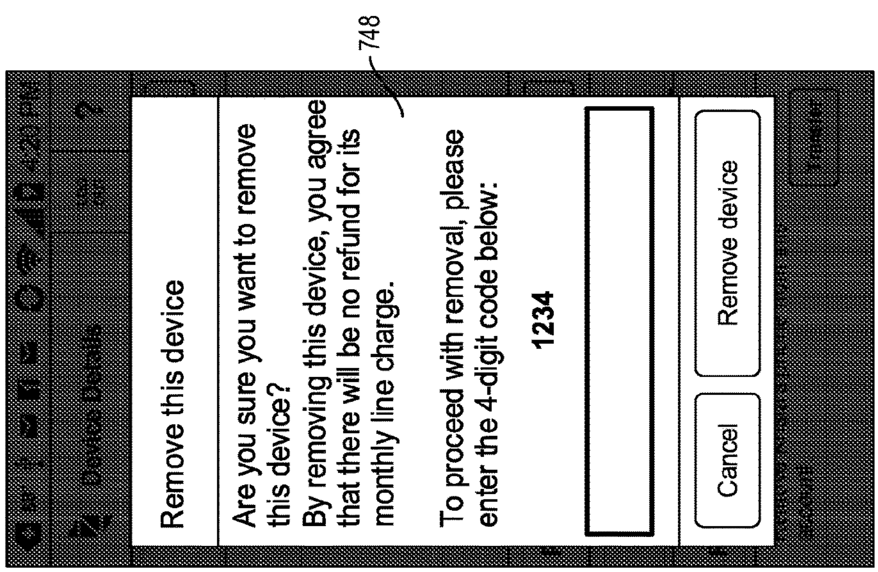
FIG. 46 illustrates a pop-up message (or window) presented through a touch-screen display of a wireless end-user device, in accordance with an exemplary embodiment, to confirm that the user wants to remove the device from the current device group account.

Referring again to FIG. 25B, the exemplary embodiment provides the user the ability to remove a device from the account. Screen 1715B includes button 747 labeled "Remove" to the right of text that says "Remove Krista's phone from this account." If the user selects "Remove" button 747, in an exemplary embodiment the one or more device agents cause pop-up message 748 to be presented through the UI of the device, as shown in FIG. 46. Pop-up message 748 confirms that the user wants to remove the device and warns the user that the monthly line charge for the device will not be refunded. Pop-up message 748 also asks the user to enter a four-digit code to confirm removal of the device from the account so that the device is not inadvertently removed from the account.

Creating a New Account for a Device

In some embodiments, as an alternative to joining or adding a device to an existing device group, the one or more device agents present an offer through a device user interface to establish a new account for a device. One embodiment is shown in FIG. 28, in which button 721B ("I need a Zact account") offers to assist a user to create an account for the device. Methods and apparatus for establishing a new account for a device are described in at least U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE and U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT, which are incorporated by reference.

In some embodiments, after a user establishes a new account, the one or more device agents assist the user to choose a service plan for the device group (which is a device group of one unless or until another device is added to the group). In some embodiments, the one or more device agents present a notification confirming that the account has been created. In some embodiments, the one or more device agents present a service plan selection screen, such as screen 749 shown in FIGS. 130A through 130F, which are discussed in more detail below. Service plan selection is similar to service plan modification, which is discussed in detail below, except that there is no "previous plan" with which to compare the selected plan.

Phone Number Transfer

Figure 47:
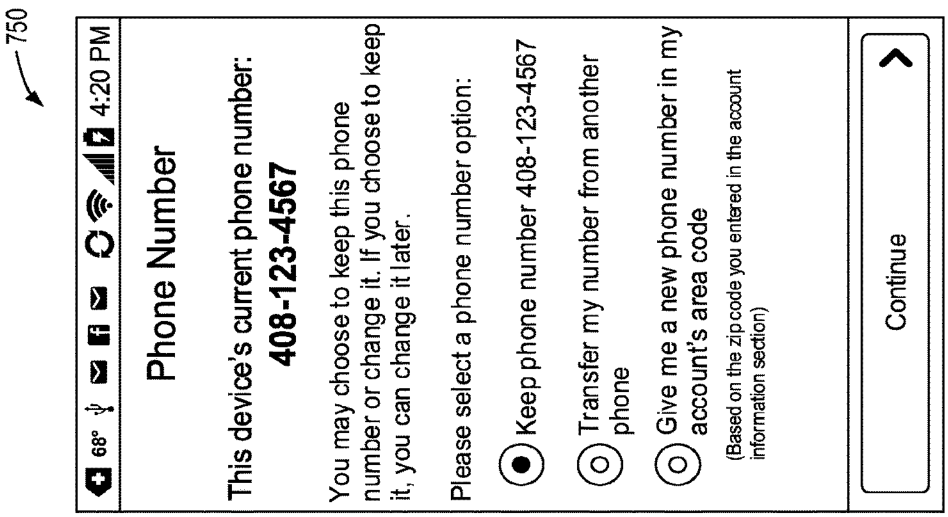
FIG. 47 illustrates a display screen presented through a touch-screen display of a wireless end-user device, in accordance with an exemplary embodiment, in response to a user selecting the "Transfer" button of FIG. 25B.

In some embodiments, the one or more device agents assist the user to transfer an existing phone number to the device, or request a new phone number for the device, even if the device has already joined the device group, and even if the device has been operating with another phone number. In the exemplary embodiment of FIG. 25B, the one or more device agents cause information to be presented to assist the user to transfer an existing phone number or to get a new number in the user's billing address area. The one or more device agents also cause a touch-sensitive button 729, labeled "Transfer," to be presented through the UI via screen 1715. If the user of the exemplary embodiment of FIG. 25B selects "Transfer" button 729, the one or more device agents cause a screen, such screen 750 shown in the exemplary embodiment of FIG. 47, to be presented. In the embodiment of FIG. 47, the one or more device agents notify the user of the device's current phone number, and the one or more device agents offer to allow the user to keep this phone number or change it. The notification of exemplary embodiment screen 750 provides three radio buttons enabling the user to indicate his or her preference. Methods and apparatus for phone number transfer are described in U.S. Provisional Application No. 61/785,988, filed Mar. 14, 2013, entitled AUTOMATED CREDENTIAL PORTING FOR MOBILE DEVICES, and in U.S. Nonprovisional application Ser. No. 14/208,236, filed Mar. 13, 2014, entitled AUTOMATED CREDENTIAL PORTING FOR MOBILE DEVICES, both of which are incorporated by reference.

Placing Restrictions on Devices in the Device Group

In some embodiments, a user with the appropriate level of authority can manage or control (e.g., place restrictions on, allocate plan allowances for, etc.) any device in the device group, including devices with account control. In some embodiments, if a device has the appropriate level of account control, any user of that device has the authority to manage that device and other devices in the device group, even if the user does not have the ability to log in to the device group account. In some embodiments, on devices with account control, the user is prompted to provide an account credential prior to managing other devices in the device group (e.g., for security purposes). If a device does not have account control, a user of that device has the authority to manage that device and other devices in the device group if the user is able to log in to the device group account. Thus, a user with authority can, for example, place a restriction on his or her own device, as well as placing restrictions on devices used by others (e.g., children, employees, etc.). In addition, a user who can log in to the device group account can manage devices from a device that does not have partial or full account control. This functionality is useful, for example, to enable a parent to change or impose a restriction on a child's device by logging in to the device group account from the child's device.

In some embodiments, a user who can log in to the device group account can establish a restriction that applies whenever a device in the device group is being used by a child. In some embodiments, the one or more device agents on the device at least assist in determining that the user is the child. The determination that the user is the child can be made by, for example, receiving or obtaining a child credential or detecting the child in some other manner (e.g., using a biometric input, voice recognition, facial recognition, etc.). As another example, if the device requires a PIN or password to unlock it for use, the one or more device agents on the device can determine, based on the PIN or password, whether the current user is a child subject to one or more restrictions.

The following text and figures explain how a user of a particular device that initially has full account control can place a restriction on the particular device. As the following text and figures explain, in an exemplary embodiment, the placement of a restriction on the device causes, as a default, the full account control to be revoked unless and until a user who can log in to the device group account restores full account control to the device. It is to be appreciated that these same operations could be performed by a user who has logged into the device group account from a website or using a device that is not part of the device group. It is also to be appreciated that the user of a device with the appropriate level of control, or a user who has logged in to the device group account and has the appropriate authority, can also or alternatively establish restrictions for other devices in the device group, as discussed below.

Figure 48:
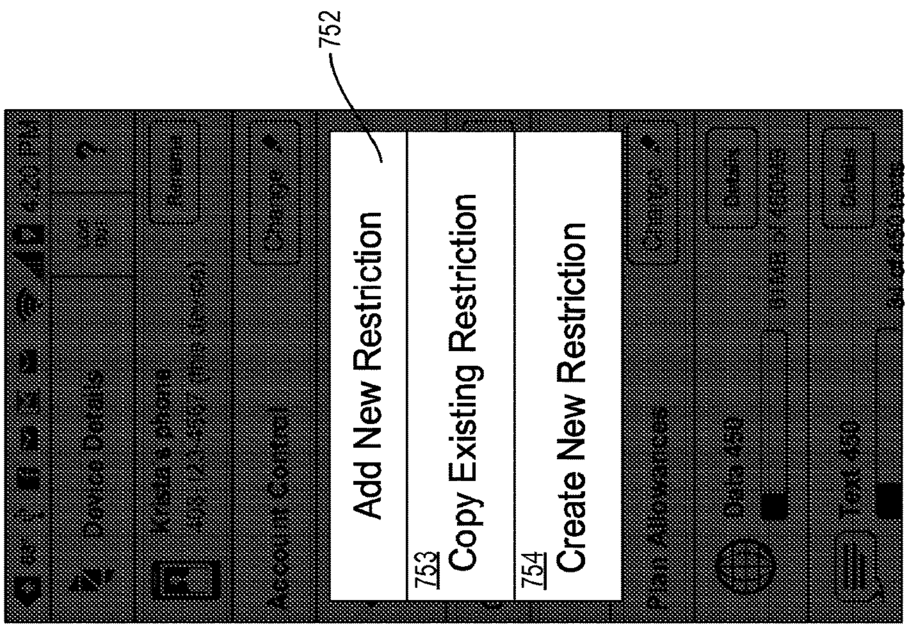
FIG. 48 illustrates a pop-up message/window presented through a touch-screen display of a wireless end-user device, in accordance with an exemplary embodiment, to allow a user of the device to copy an existing restriction or create a new restriction.

Referring again to the exemplary screen 1715A of FIG. 25A, the user of Krista's phone, which has full account control, may select "Add" button 751 to impose a curfew or restriction on Krista's phone. In other words, the user of Krista's phone may impose a restriction on Krista's phone directly from, and by interacting with, Krista's phone. (Alternatively, if Krista's phone did not have account control, a user of Krista's phone could log into the device group account from Krista's phone, or from a website, or from another device in the device group, or from another device not in the device group, to establish a restriction for Krista's phone.) In some embodiments, the one or more device agents interact with the user through the UI to obtain the information to establish the curfew or restriction. In some embodiments, the one or more device agents give the user a choice between copying and potentially editing an existing restriction, or creating a new restriction. FIG. 48 illustrates an exemplary embodiment in which the one or more device agents present touch-sensitive pop-up window 752 to allow the user to choose between copying an existing restriction and creating a new restriction. The user may select region 753, labeled "Copy Existing Restriction," or region 754, labeled "Create New Restriction."

Figure 50:
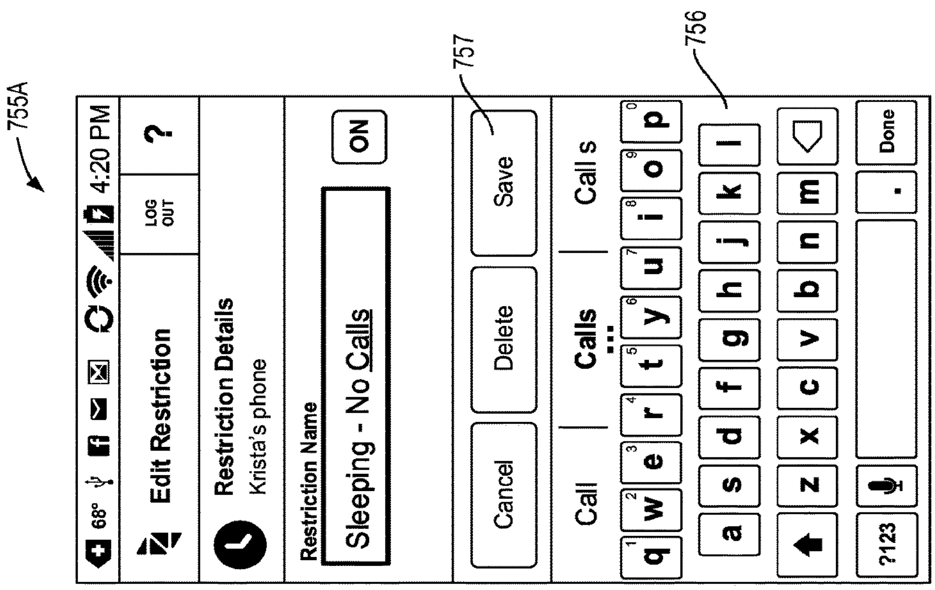
FIG. 50 illustrates a display screen presented through a touch-screen display of a wireless end-user device, in accordance with an exemplary embodiment, through which a user can create or modify a restriction for a device.
Figure 49:
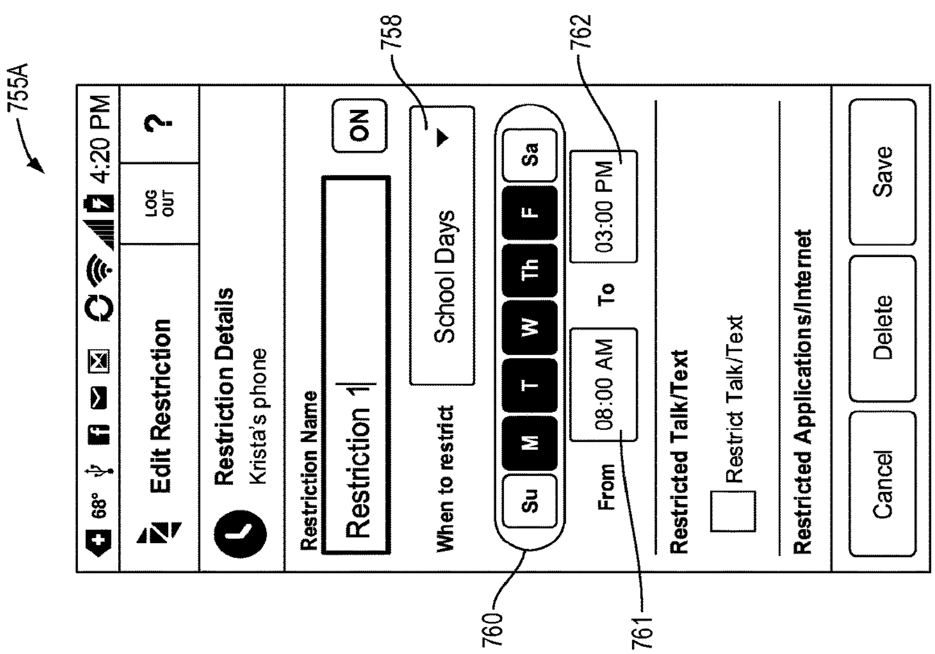
FIG. 49 illustrates a display screen presented through a touch-screen display of a wireless end-user device, in accordance with an exemplary embodiment, enabling a user to create or modify a restriction for a device.

FIG. 49 illustrates an exemplary embodiment in which the user of Krista's device chooses to create (or edit/modify from an existing restriction or template) a new restriction by selecting region 754 of pop-up window 752 of FIG. 48. The one or more device agents present screen 755, the upper portion of which is labeled as 755A as shown in FIG. 49, through which the user of Krista's phone can configure the name of the restriction (shown as having a default name "Restriction 1"). FIG. 50 illustrates that when the user selects the region of screen 755A in which the restriction name is defined, keyboard 756 pops up to enable the user to give the restriction a more meaningful name. In the example of FIG. 50, the name is "Sleeping—No Calls." The user saves the restriction's name by selecting button 757, labeled "Save" in FIG. 50.

Referring again to the exemplary embodiment of FIG. 49, the user can select the days of the week on which to restrict usage under the "Sleeping—No Calls" restriction by selecting region 758 to the right of the text "When to restrict." In some embodiments, the user's selection of region 758 causes the one or more device agents to cause a drop-down menu, a pop-up, or another construct with user-selectable options to be presented through the UI (i.e., on or overlaying screen 755). FIG. 51A illustrates pop-up menu 759, which overlays screen 755A in an exemplary embodiment. Drop-down menu 759 allows the user to select school days, school nights, weekend nights, all weekend, all day weekdays, all day every day, or a custom set of days of the week. It is to be appreciated that other pre-configured options are possible, as are other selection constructs than radio buttons. In some embodiments, when the user selects school days, school nights, weekend nights, all weekend, all day weekdays, or all day every day, the one or more device agents cause a pre-set combination of days of the week and times to be rendered on the UI (e.g., on screen 755). For example, in the exemplary embodiment of FIG. 49, the pre-set combination of days is rendered on the UI by changing the color of or shading the individual icons corresponding to the selected pre-set combination of days of the week (collectively, icons 760), and pre-set times corresponding to the selected option are shown in the "From" and "To" fields, labeled 761 and 762, respectively. As shown in FIG. 49, the user has selected "School Days," and the days from Monday through Friday represented in icons 760 are shaded dark. The "From" time in field 761 is 8:00 A.M., and the "To" time in field 762 is 3:00 P.M. As another example, if the user were to select "School Nights," the icons representing Monday through Friday would be selected (as shown shaded dark in the embodiment of FIG. 49), but the "From" time in field 761 would be, in an embodiment, 9:00 P.M., and the "To" time would be 7:00 A.M. It is to be appreciated that these times are simply examples, and the start and end times for any pre-set options may of course be different.

Figure 51B:
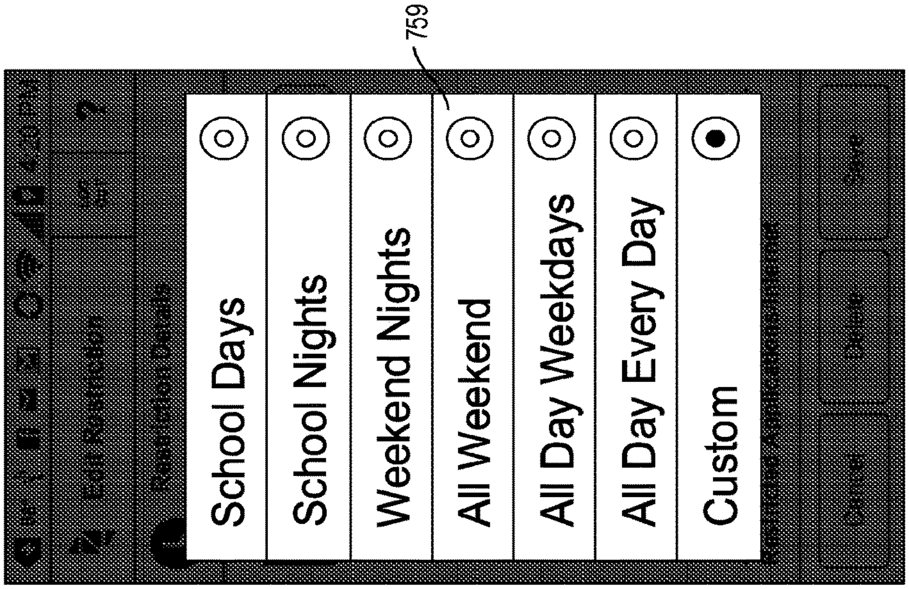
FIGS. 51A and 51B illustrate a pop-up window presented through a touch-screen display of a wireless end-user device, in accordance with an exemplary embodiment, to enable a user to select a pre-specified set of days/nights or to specify that the user will enter custom days.
Figure 51A:
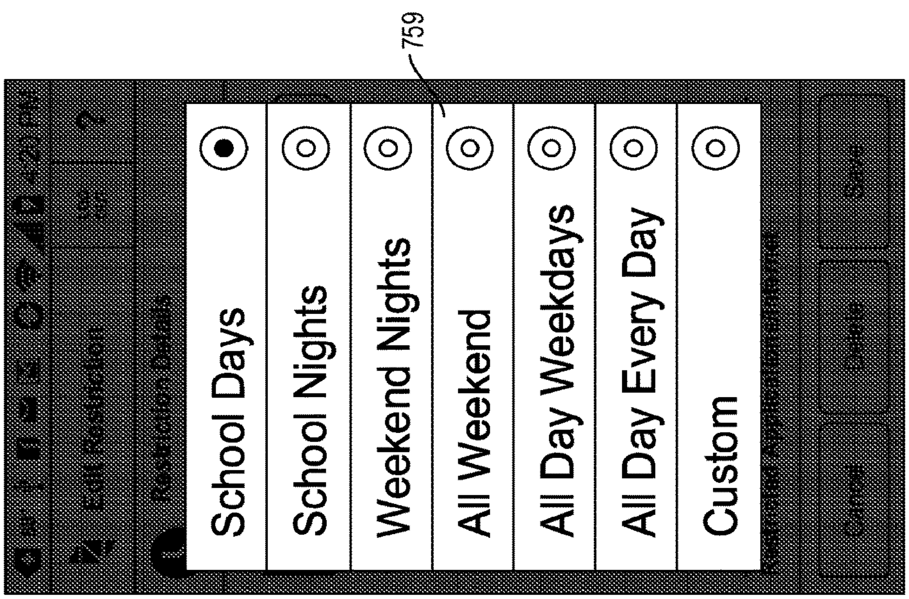
Figure 52:
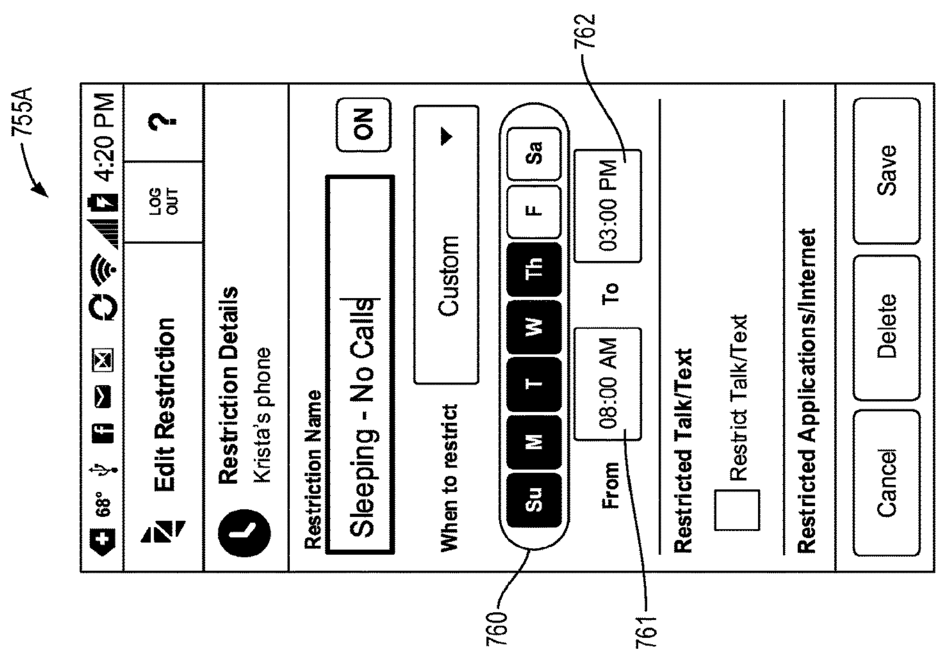
FIG. 52 illustrates a display screen presented through a touch-screen display of a wireless end-user device, in accordance with an exemplary embodiment, through which a user can create or modify a restriction for a device.
Figure 53A:
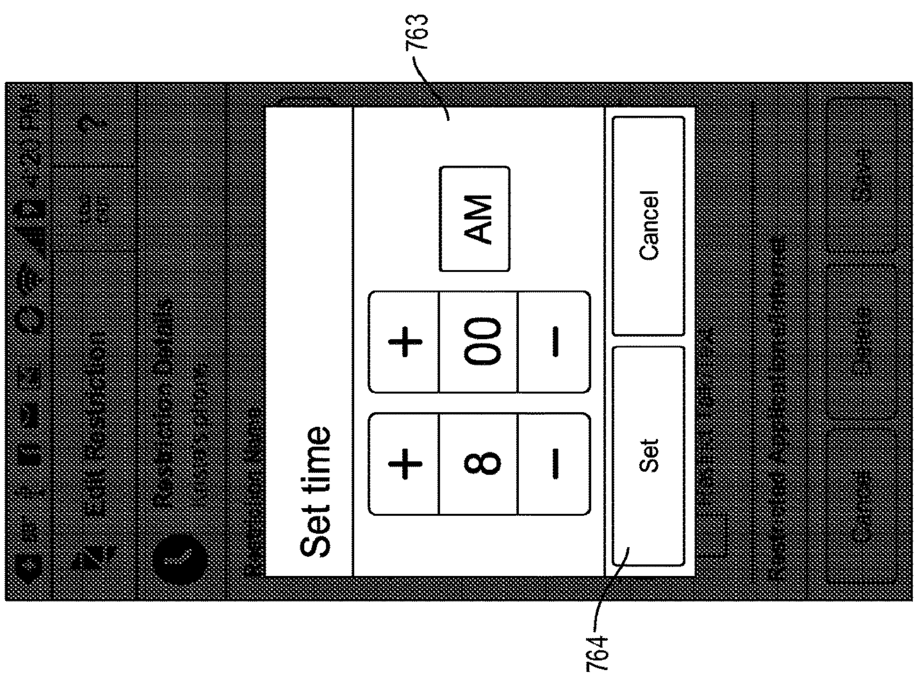
FIGS. 53A and 53B illustrate a pop-up presented through a touch-screen display of a wireless end-user device, in accordance with an exemplary embodiment, to enable a user to set a time associated with a restriction for a device.
Figure 53B:
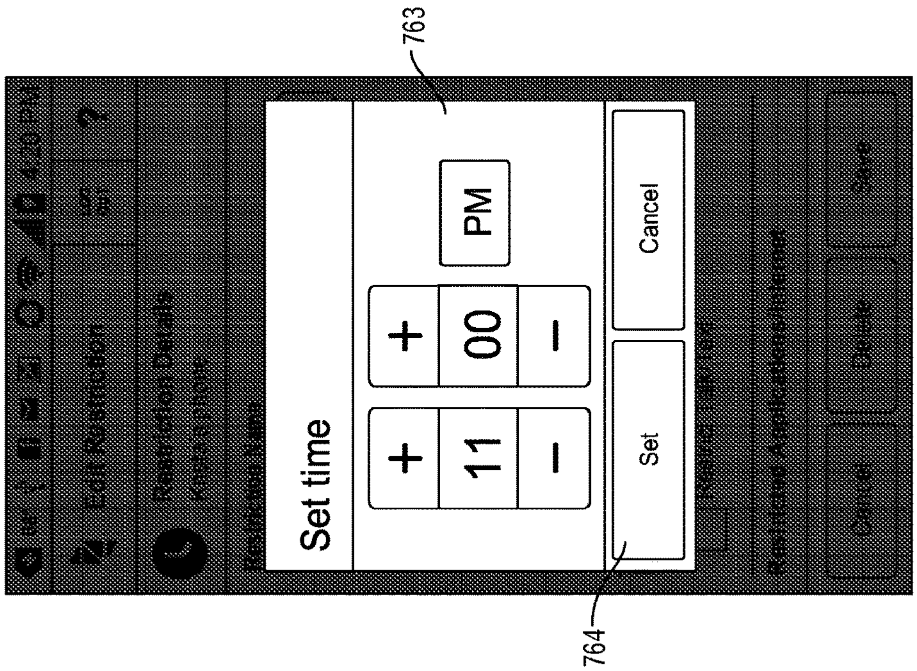
Figure 54:
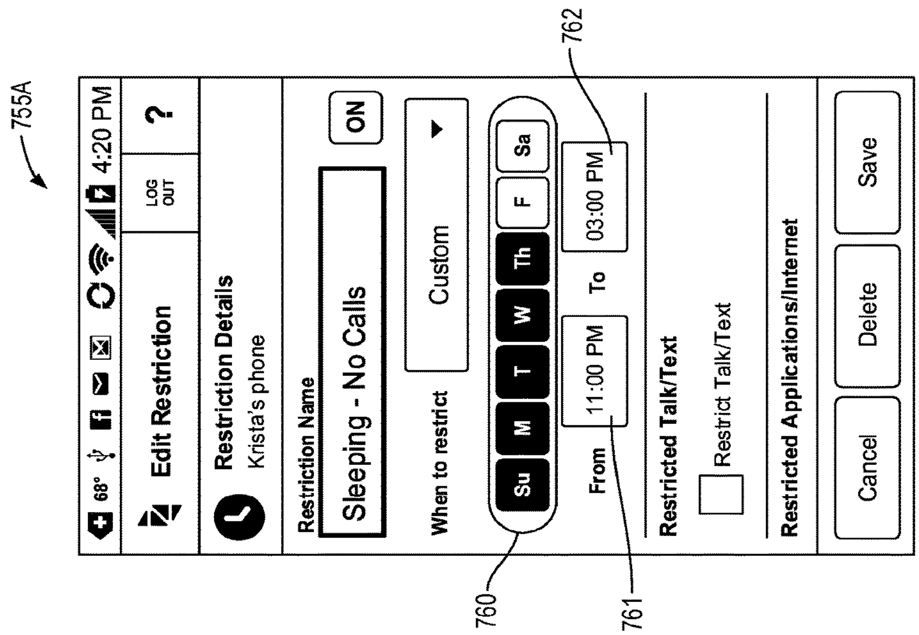
FIG. 54 illustrates a display screen presented through a touch-screen display of a wireless end-user device, in accordance with an exemplary embodiment, through which a user can create or modify a restriction for a device.
Figure 55B:
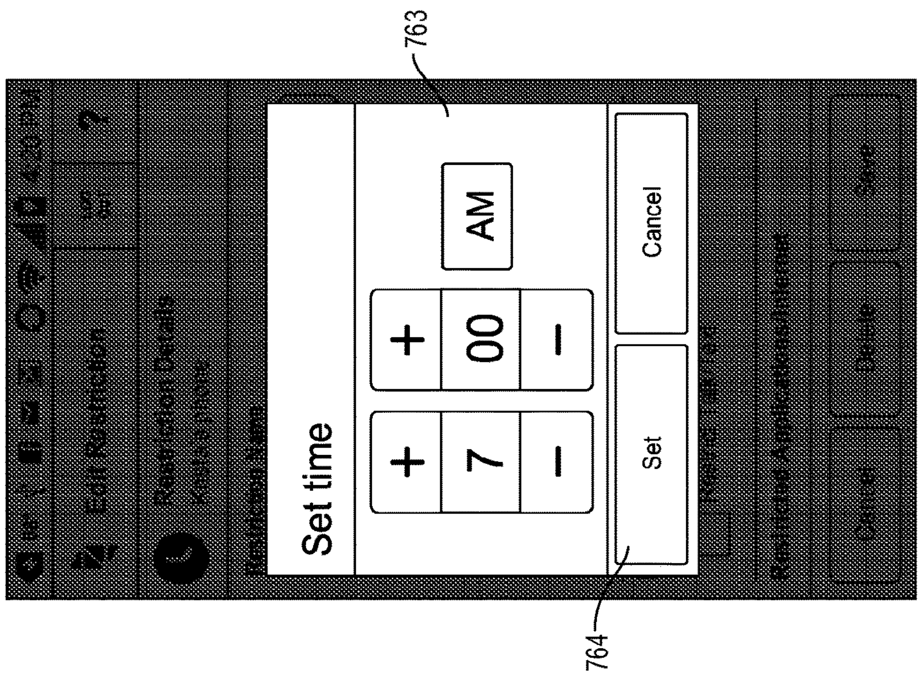
FIGS. 55A and 55B illustrate a pop-up presented through a touch-screen display of a wireless end-user device, in accordance with an exemplary embodiment, to enable a user to set a time associated with a restriction for a device.
Figure 55A:
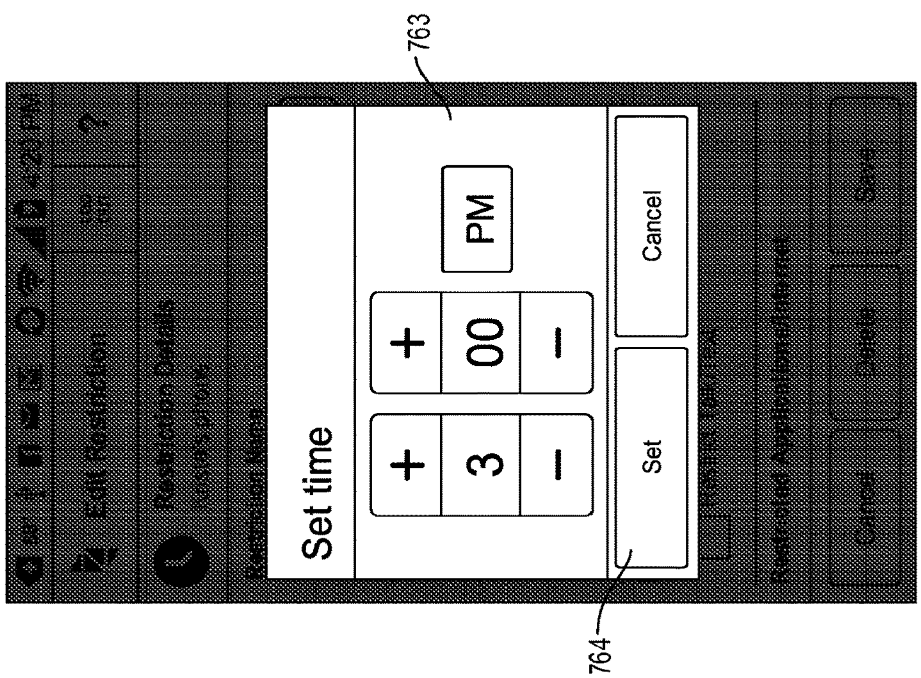
Figure 56:
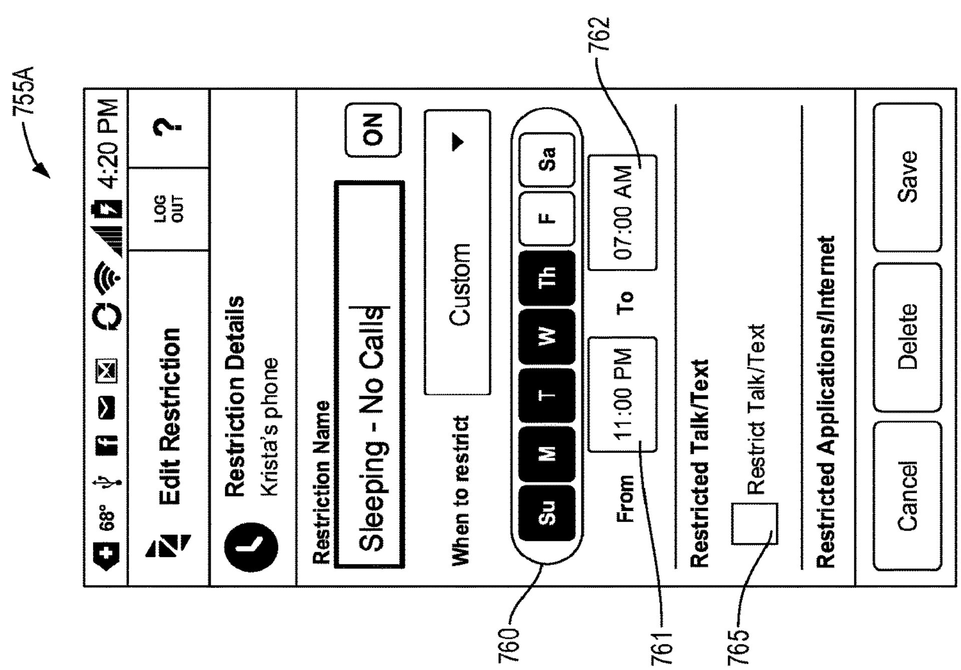
FIG. 56 illustrates a display screen presented through a touch-screen display of a wireless end-user device, in accordance with an exemplary embodiment, through which a user can create or modify a restriction for a device.

FIG. 51B shows that the user has selected the "Custom" option of pop-up menu 759. As shown in FIG. 52, the user can manually select and de-select individual days of the week from the set of icons 760. In the example of FIG. 52, the user has selected the days Sunday through Thursday for the restriction (shown as shaded dark in FIG. 52). In some embodiments, when the user selects either "From" field 761 or "To" field 762 of screen 755A in FIG. 52, the one or more device agents cause the UI present information to enable the user to change the associated time. FIGS. 53A and 53B illustrate a particular embodiment in which the one or more device agents present pop-up 763, which enables the user to increment or decrement the hour and minute fields, and to toggle between "AM" and "PM." In FIG. 53B, the user has changed the start time for the restriction to 11:00 P.M. When the user selects the "Set" button 764 of FIG. 53A or FIG. 53B, pop-up 763 disappears, and screen 755A of FIG. 54 shows that the start time of the restriction in field 761 has been set to 11:00 P.M. By following the same procedure, shown by pop-ups 763 in FIGS. 55A and 55B, the user can change the end time of the restriction to 7:00 A.M. FIG. 56 illustrates screen 755A after pop-up 763 has disappeared and the display presents the updated restriction configuration screen 755A. As shown by icons 760 and fields 761 and 762 in FIG. 56, when enabled (i.e., active or in force), the restriction "Sleeping—No Calls" will be in effect from 11:00 P.M. to 7:00 A.M. on the days Sunday through Thursday.

In some embodiments, the user can choose to restrict or prevent (e.g., block entirely, limit to a particular amount of usage, limit to a particular total usage time, allow only a percentage or a fraction of a unit of time, such as, for example 10 minutes per hour, etc.) phone calls, text messages, data, or a combination of phone calls, text messages, and data during the specified time period. In some embodiments, the user can choose to allow phone calls or text messages to or from particular people (also referred to as contacts, numbers, etc.) but prevent all other phone calls or text messages (e.g., create a "white list"). In some embodiments, the user can choose to block phone calls or text messages to or from particular people but allow all other phone calls or text messages (e.g., create a "black list").

In some embodiments, the user can choose to restrict or prevent usage of particular application programs on the device during the specified hours. In some embodiments, the user can choose to restrict or prevent usage of certain device functions (e.g., the camera, a speaker, etc.) during the specified hours. In some embodiments, the user can select to allow an application to be used on the device, but not allow the application to access data over the wireless connection.

In some embodiments, the restrictions are time-dependent (e.g., from time A to time B). In some embodiments, the restrictions are location-dependent (e.g., when the device is at location X, prevent usage of the phone or usage of application A). In some embodiments, the restrictions are time-dependent and location-dependent (e.g., during school hours, when the device is at school, prevent usage of texting, and also prevent usage of the Facebook, Twitter, YouTube, and Netflix applications). In some embodiments, the restrictions are additionally usage-dependent (e.g., only allow 3 MB of Facebook and text messages only to Mom and Dad during school days when the device is at school).

Restricting Voice or Text

Figure 57:
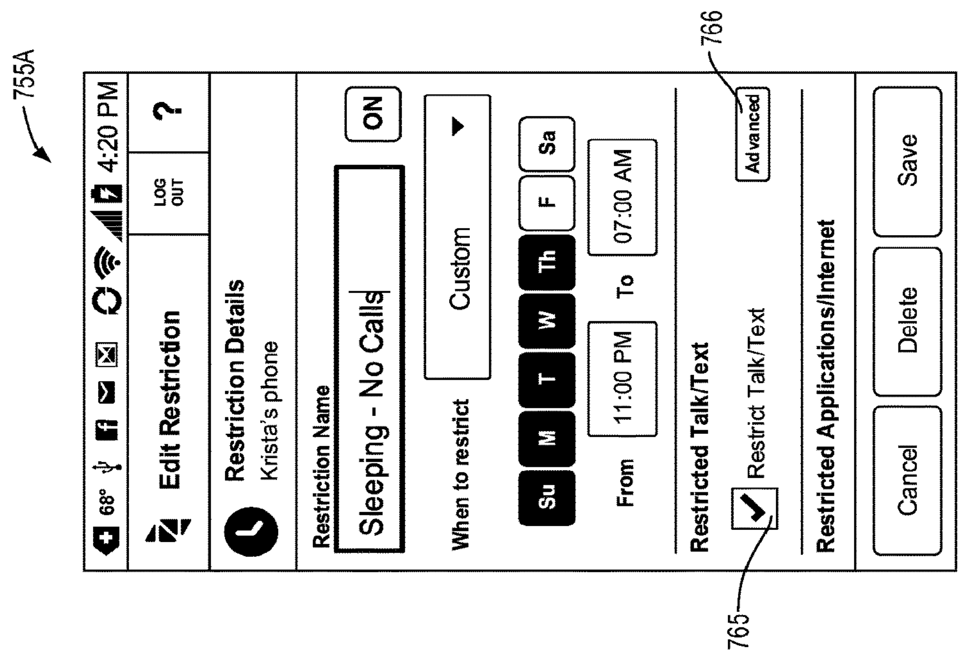
FIG. 57 illustrates a display screen presented through a touch-screen display of a wireless end-user device, in accordance with an exemplary embodiment, through which a user can create or modify a restriction for a device, in which the user has elected to restrict phone calls and/or text messaging.
Figure 58:
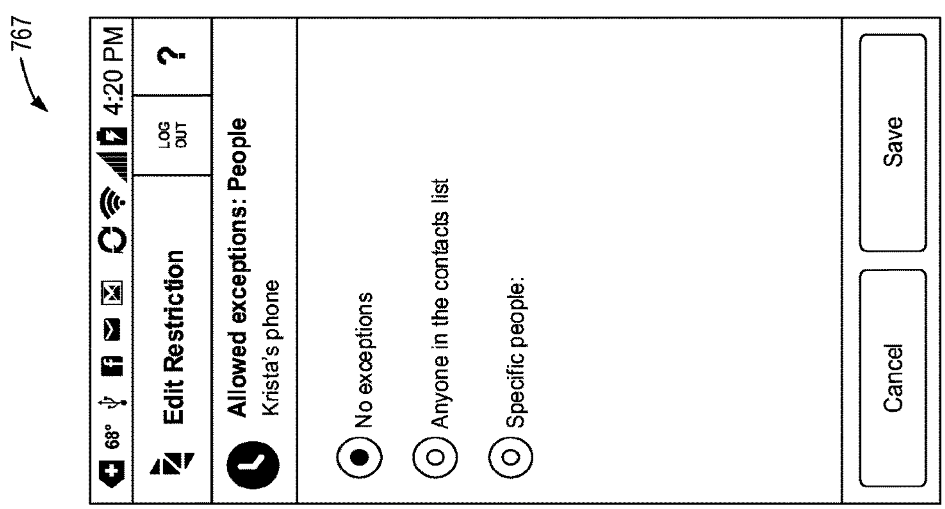
FIG. 58 illustrates a display screen presented through a touch-screen display of a wireless end-user device, in accordance with an exemplary embodiment, which allows a user to specify allowed exceptions to a voice/text restriction when a user selects the "Advanced" button of FIG. 57.

In the embodiment shown in FIG. 56, the user is given the option to restrict phone calls and/or text messaging by selecting the "Restrict Talk/Text" button 765, which will restrict phone calls and/or text messaging during the specified hours. FIG. 57 illustrates that when the user selects the "Restrict Talk/Text" button 765 the one or more device agents cause an additional user-selectable button 766, labeled "Advanced," to appear on screen 755A. FIG. 58 illustrates an exemplary embodiment of the display, denoted as screen 767, when the user selects the "Advanced" button 766 of FIG. 57. As shown by the menu of radio buttons in FIG. 58, the user can specify that all phone calls and text messaging are blocked during the specified hours of the restriction by selecting the "No exceptions" option of screen 767. As shown in FIG. 59A, the user can specify that people in the contacts list can be allowed exceptions during the specified hours of the restriction. It is to be appreciated that although FIGS. 59 through 62 present an embodiment in which voice and text are blocked unless a contact is an allowed exception (i.e., is on a "white list"), it is also possible, and contemplated, to allow voice and text to all contacts except those designated as blocked (i.e., are on a "black list").

In some embodiments in which a user with authority is placing a restriction associated with (or based on) the contacts list resident on a first device, the one or more device agents on a first device request permission from a user of the first device to upload a list of contacts from the first device, where the first device is the device to which the restriction will be applied. In some embodiments, the one or more device agents on the first device request permission from the user by presenting a notification through a user interface of the first device. In some embodiments, the notification informs the user that in order to restrict communications with particular contacts (or, alternatively, to allow communications with a subset of the contacts), it is necessary to obtain information about the contacts on the first device. In some embodiments, one or more device agents on a second device, the second device being associated with an account administrator, request permission to obtain information about the contacts on the first phone by presenting a notification through a user interface of the second device.

In some embodiments, the user of the first device must consent to the upload of the contacts information. In some embodiments, a user with authority (i.e., a user who can log in to the device group account, a device group administrator, a user of a device with account control, etc.) may consent to the upload of the contacts information from the first device. In some embodiments, the one or more device agents on the second device present, through a user interface of the second device, an offer to control access to one or more contacts from a first device.

In some embodiments, the one or more device agents on the second device obtain, through the user interface of the second device, an indication that the user of second device wishes to control access to one or more contacts on the first device. In some embodiments, the one or more device agents on the second device present a notification through the user interface, where the notification informs the user of the second device that controlling access to (i.e., first device communication with) contacts stored on the first device requires information about (e.g., a list of) the contacts stored on the first device to be obtained from the first device, and requests permission to obtain the required information. If the user gives permission for the retrieval of the information about the contacts on the first device, in some embodiments, service controller 122 sends a request for the information about the contacts on the first device to the one or more device agents on the first device. In some embodiments, the one or more device agents on the first device send the information about the contacts on the first device to service controller 122. In some embodiments, the one or more device agents on the first device send the information about the contacts on the first device directly to the one or more device agents on the second device.

In some embodiments, if the user consents to the upload or transfer of contacts information, the one or more device agents on the first device provide information about (e.g., a list of) contacts on the first device to service controller 122 so that the list is available for a user with authority (e.g., from the first device itself, or from another device in the device group, such as the second device, or from an authorized application on a device that is not in the device group, or from a website, etc.) to view to implement restrictions on specified contacts (or to allow communications with specified contacts during a restriction period) on the first device. In some embodiments, the one or more device agents on the first device send the information about the contacts on the first device to service controller 122 in response to a request from service controller 122. In some embodiments, the information is sent over service control link 1653, which may be secure. In some embodiments, the one or more device agents on the first device periodically or occasionally send the information about the contacts on the first device to service controller 122. In some embodiments, the one or more device agents on the first device send the contact information directly to the second device, bypassing the service controller.

In some embodiments, a user of the first device or an authorized party (e.g., account owner, administrator, etc.) can establish partitioned lists of contacts on the device. The partitioning can be based on any criteria established by the user or authorized party (e.g., based on a tag, a portion of an e-mail address associated with a contact, etc.). Partitioning contacts on the device into two or more groups enables new functions. For example, consider the case of a device that is provided by an enterprise to an employee. The enterprise may desire to pay for and, therefore, manage access to and allocations for, phone calls or text messages to contacts for business purposes, but not for phone calls or text messages to friends and family. By designating certain e-mail addresses, phone numbers, contact names, etc., as, for example, "business" or "personal," the user of the first device can designate certain contacts as "personal" and thus prevent information about them from being sent to service controller 122 or to a second device in the device group upon request of the enterprise or being visible to an administrator or enterprise account owner. Conversely, the user or the enterprise can designate certain contacts, either individually or using a rule (e.g., everyone in the company directory, everyone in the contacts list with a certain telephone prefix, everyone in the contacts list whose e-mail address ends with "company.com," etc.) as "business" contacts, which, in some embodiments, gives the enterprise permission to pull information about these contacts and applications from the device.

Figure 59B:
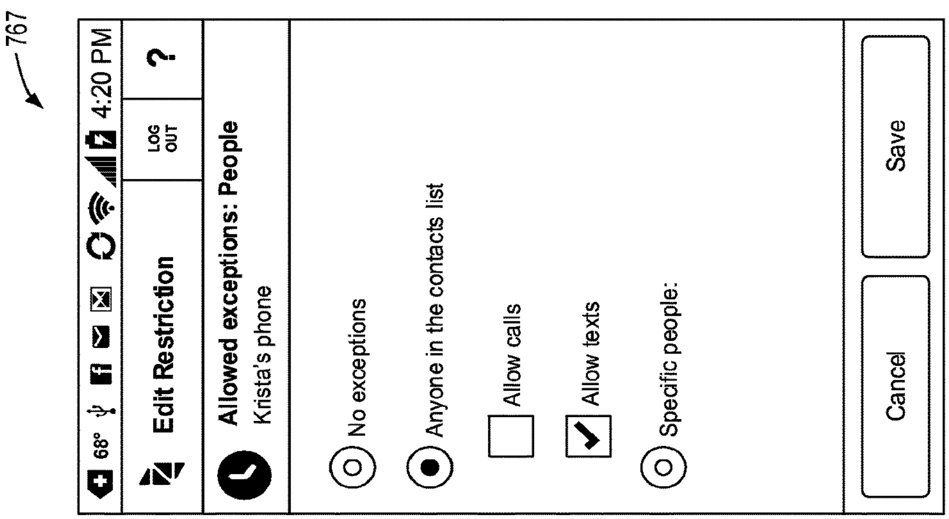
FIGS. 59A through 59D illustrate a display screen presented through a touch-screen display of a wireless end-user device, in accordance with an exemplary embodiment, to allow a user to specify allowed exceptions for a restriction on phone calls and/or text messaging.
Figure 59A:
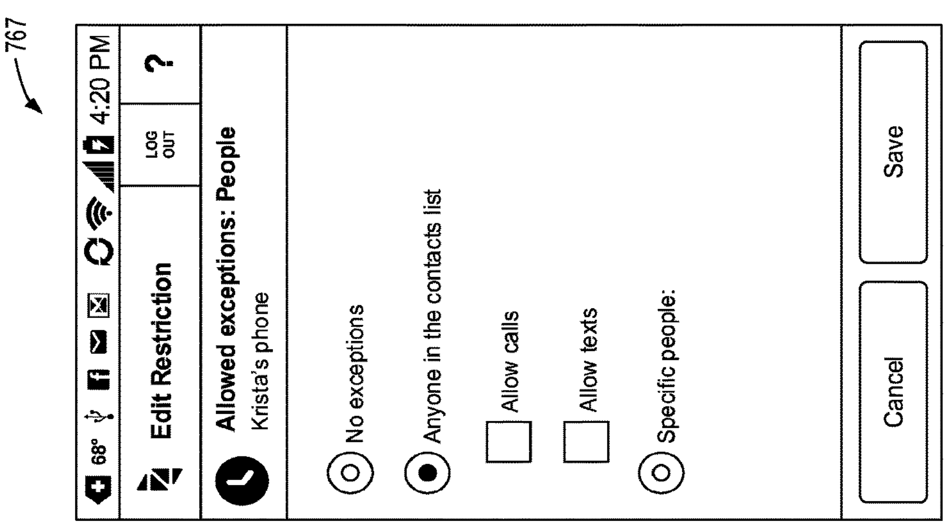
Figure 59D:
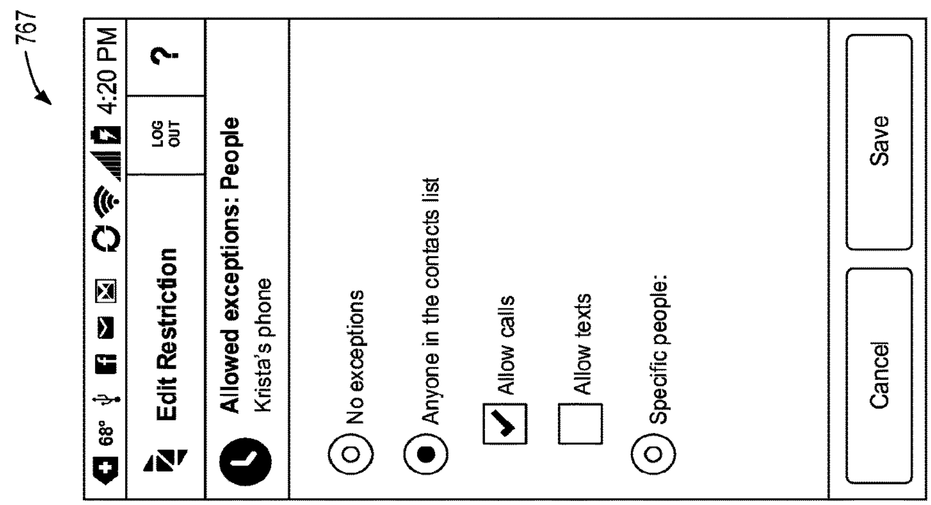
Figure 59C:
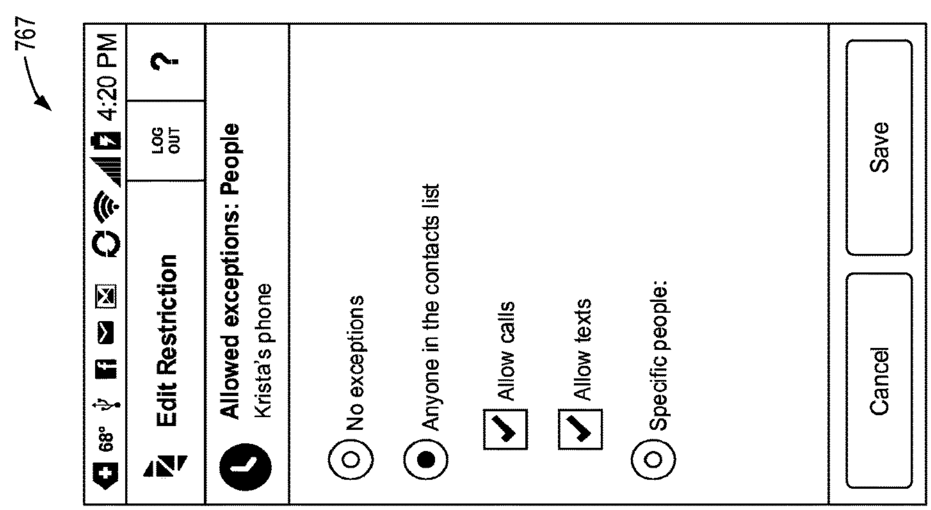
Figure 60:
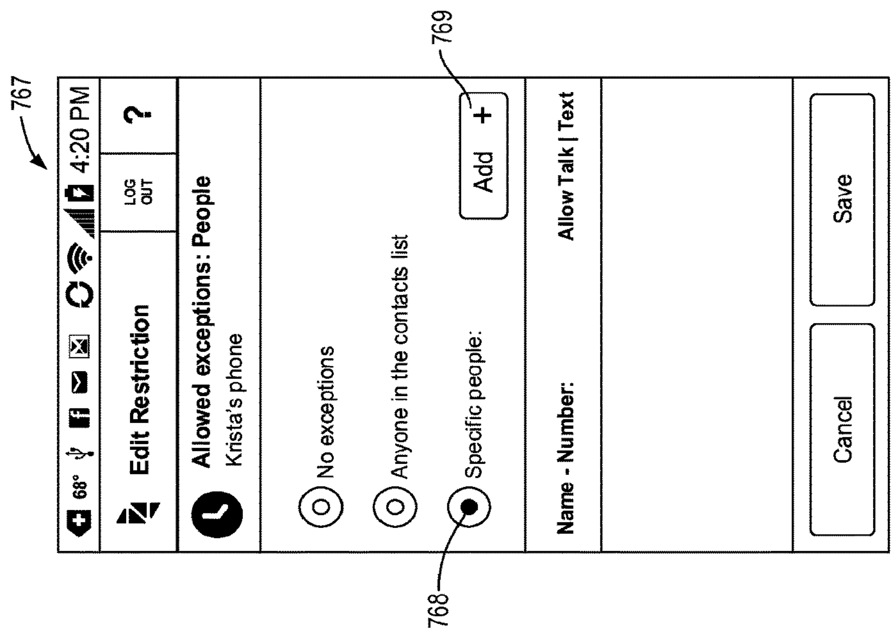
FIG. 60 illustrates a display screen presented through a touch-screen display of a wireless end-user device, in accordance with an exemplary embodiment, to allow a user to elect to specify specific people who are exceptions to a restriction on phone calls and/or text messaging.

As shown in FIG. 59B, restrictions on voice and text can be selected independently. For example, a user can choose to allow text messages to and from people in the contacts list, but block phone calls to and from people in the contacts list during the hours of the restriction. As shown in FIG. 59C, the user can choose to allow both text messages to and from people in the contacts list and phone calls to and from people in the contacts list. As shown in FIG. 59D, the user can choose to allow phone calls to and from anyone in the contacts list, but block text messages to and from people in the contacts list.

Figure 61A:
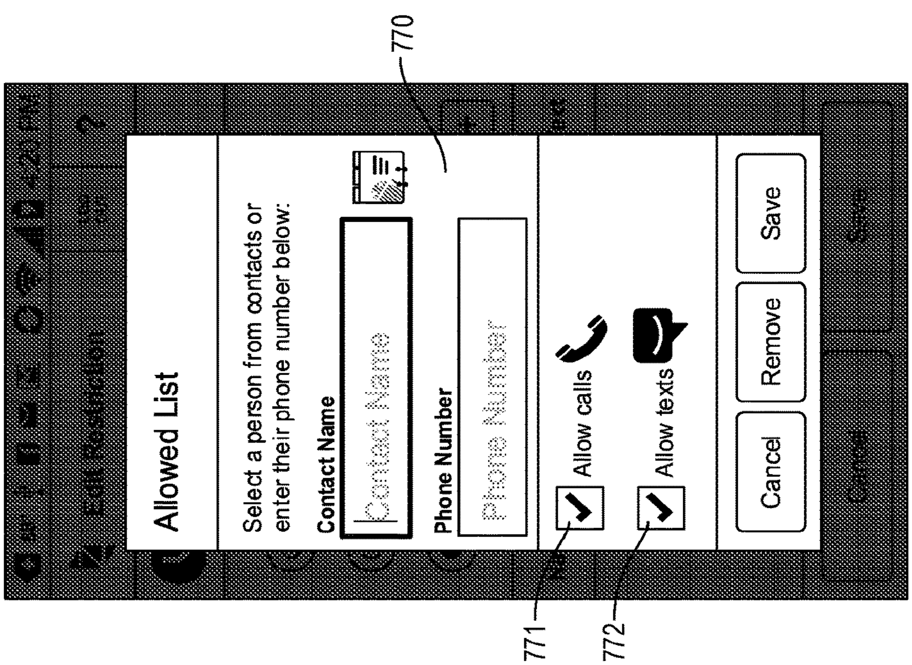
FIGS. 61A through 61D illustrate a pop-up presented through a touch-screen display of a wireless end-user device, in accordance with an exemplary embodiment, to allow a user to specify specific people who are exceptions to a restriction on phone calls and/or text messaging, and to specify whether calls, text messages, or both are allowed to and from the specified person.
Figure 61B:
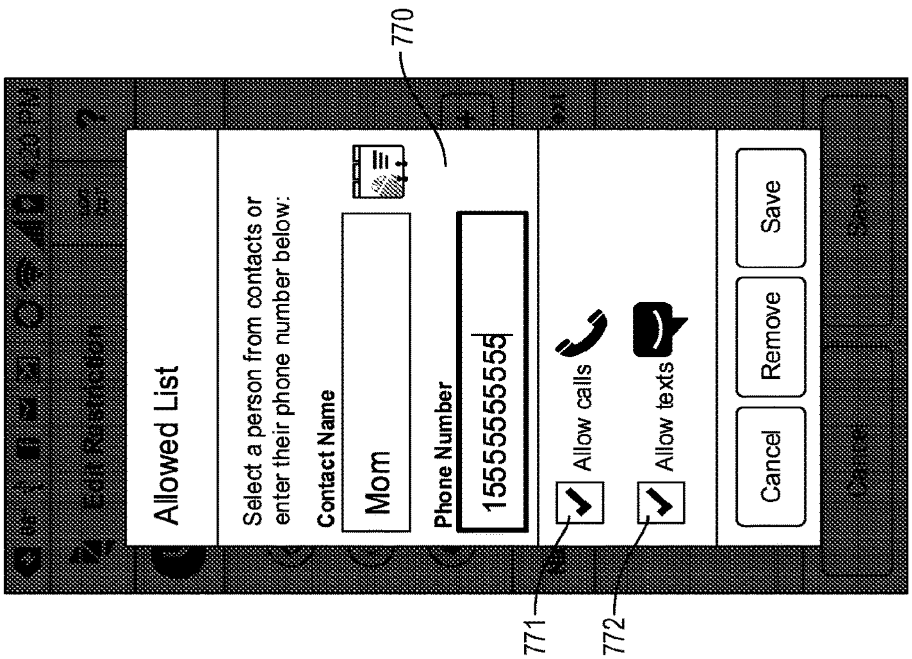
Figure 61C:
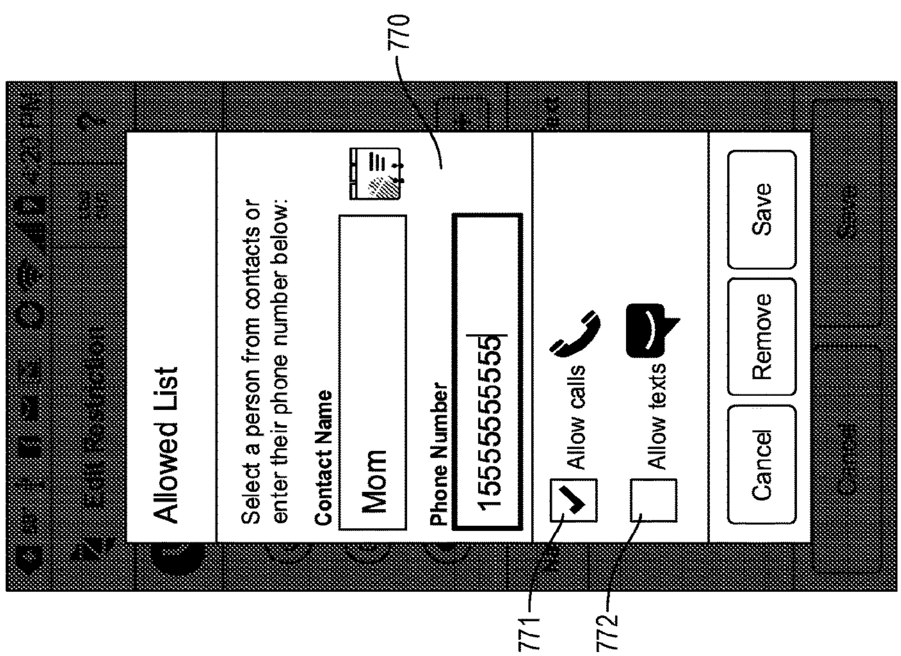
Figure 61D:
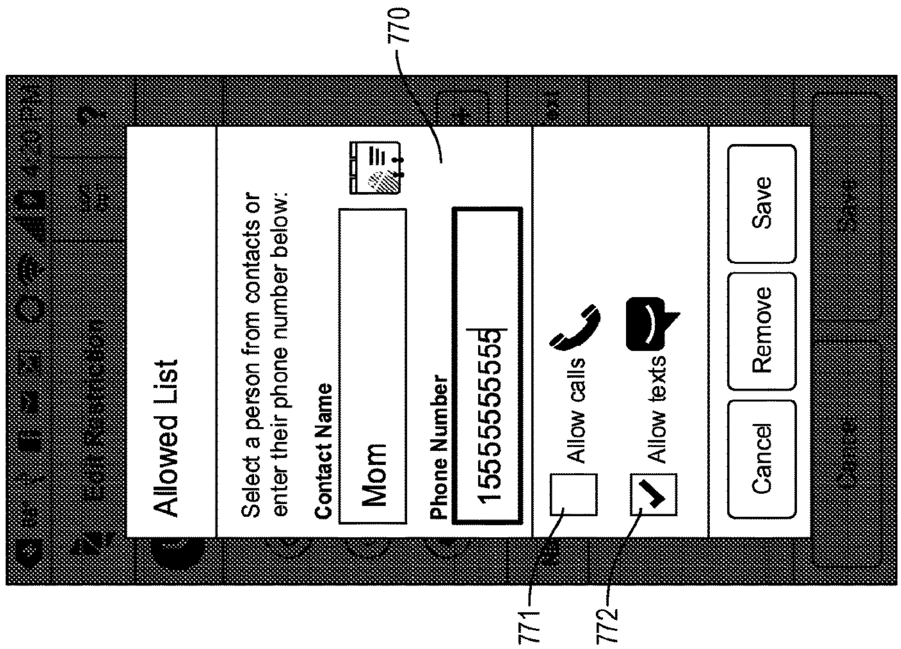
Figure 62:
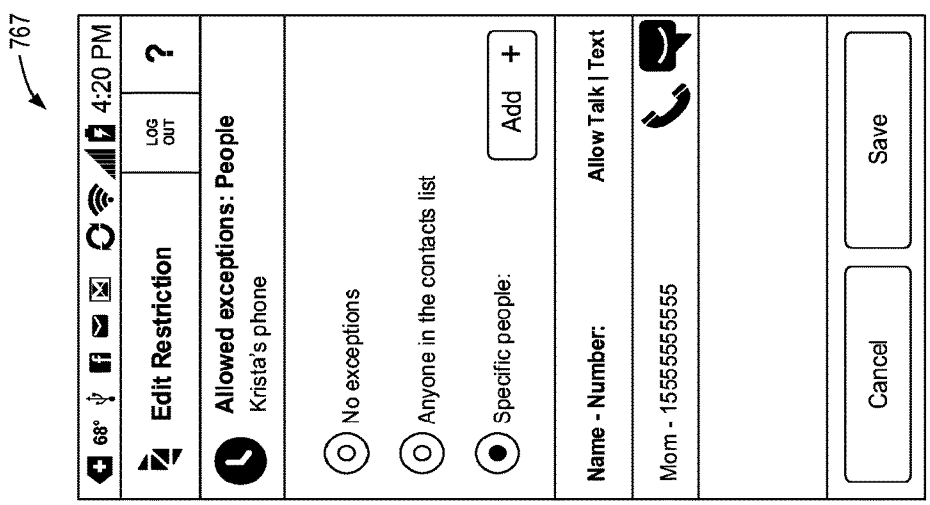
FIG. 62 illustrates a display screen presented through a touch-screen display of a wireless end-user device, in accordance with an exemplary embodiment, after a specific person has been added as an allowed restriction.

In some embodiments, if the user does not wish to allow everyone in the contacts list to send text messages to and receive from text messages from the device, or the user does not wish to allow everyone in the contacts list to place calls to and receive calls from the device, the user can provide, to the one or more device agents through the UI, information about specific people who are allowed exceptions (i.e., create a "white list"). In the exemplary embodiment of FIG. 60, when the user selects the "Specific people" option 768, button 769, labeled "Add," appears. FIG. 61A illustrates pop-up 770 that, in some embodiments, is presented by the one or more device agents when the user selects "Add" button 769 of FIG. 60. Pop-up 770 allows the user to select a person from the contacts, or manually enter contact information for the person with whom text messaging, phone calls, or both text messaging and phone calls are allowed during the hours in which the restriction being configured is in effect. As shown in the exemplary embodiment of FIG. 61B, the user may enter a name ("Mom") and a phone number ("15555555555"). As shown in FIGS. 61B through 61D, the user can select or de-select individually the options "Allow calls" (labeled 771) and "Allow texts" (labeled 772) to achieve the desired combination of text messaging and phone calls for the exception to the restriction. FIG. 62 illustrates the exception based on the configuration of pop-up 770 shown in FIG. 61B. In the exemplary embodiment of FIG. 62, the exception provides the name and phone number of the person who is excepted from the restriction, and the icons to the right of the name and number indicate whether phone calls and text messages are allowed. In the example configuration of FIG. 62, Mom is allowed to call Krista's phone and receive calls from Krista's phone during the hours of the restriction, and Mom is allowed to send text messages to and receive text messages from Krista's phone during the hours of the restriction.

In some embodiments, a restriction enables limited voice and/or text usage during the restricted period. For example, a restriction could allow up to N minutes of phone calls or up to M text messages during the restricted period. The restriction could further designate that the N minutes of phone calls or the M text messages may only be conducted with a particular group of contacts or phone numbers (e.g., with family members or co-workers). It is to be appreciated that a variety of restrictions and/or allowances during restrictions can be established and are contemplated.

Restricting Data or Device Functions

Figure 63:
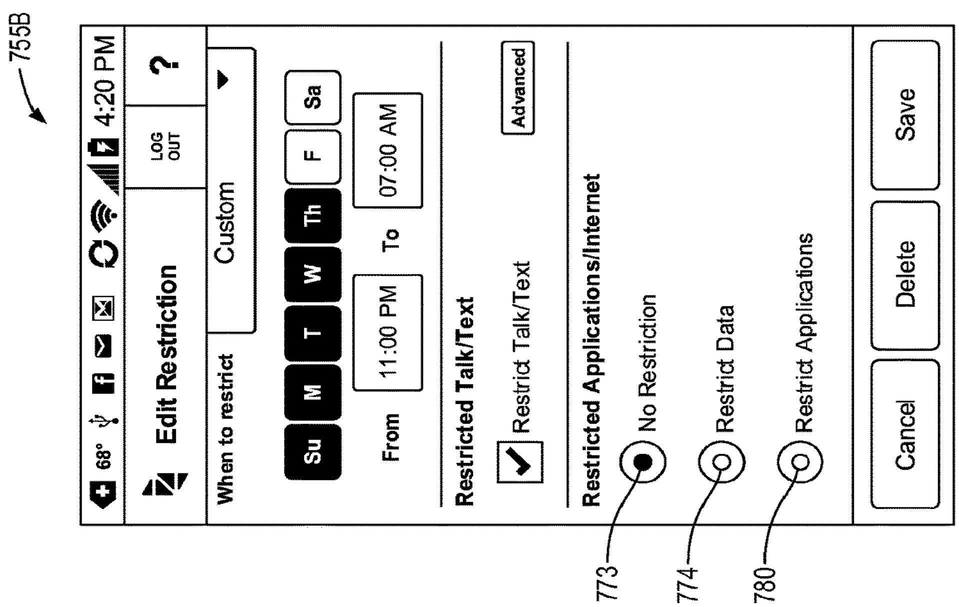
FIG. 63 illustrates a display screen presented through a touch-screen display of a wireless end-user device, in accordance with an exemplary embodiment, allowing a user to specify no restriction, restrict data, or restrict applications.

In some embodiments, in addition to, or instead of, restricting or preventing phone calls and/or text messages, the one or more device agents obtain information from the user about restricting or blocking data usage or device functions. In the exemplary embodiment of FIG. 63, which shows the lower portion of screen 755, labeled 755B, the user has three options to restrict applications or usage of the Internet: (1) no restriction (radio button 773), (2) restrict data (radio button 774), and (3) restrict applications (radio button 780). If the user selects radio button 773, corresponding to "No Restriction," the one or more device agents do not take any action to restrict usage of wireless networks, applications on the device, or device functions. Now referring to the exemplary embodiment of FIG. 64, if the user selects radio button 774, corresponding to "Restrict Data," a touch-sensitive button 775 labeled "Advanced" appears on screen 755B. If the user selects "Advanced" button 775, FIG. 65A illustrates the resulting screen 776 that is presented in accordance with an exemplary embodiment. In the example embodiment, the default setting when the user chooses "Restrict Data" is to restrict (e.g., block/prevent) data on all networks, as illustrated by the selection of radio button 777. As shown in FIGS. 65B and 65C, the user can also choose to restrict/limit/block data usage on all networks except 3G and 4G networks by selecting radio button 778 ("Allow only 3G/4G networks") or to allow data usage only on WiFi networks by selecting radio button 779 ("Allow only Wifi Networks"). In some embodiments that are not illustrated by the exemplary embodiment, the user can choose to restrict/limit/block data usage on roaming networks, or on networks known to be associated with a cost (e.g., device WiFi usage over a hotspot). The user can also choose to restrict background data, control data (e.g., do not allow application updates or OS updates), usage on specific WiFi networks (e.g., only allow usage on home and office WiFi networks), etc. Likewise, combinations of these network-dependent, data-type-dependent, application-dependent, etc. restrictions are contemplated and are within the scope of the disclosure herein.

In some embodiments, if the user specifies a network-dependent data restriction, the one or more device agents monitor the restricted device's network connection and prevent or restrict data usage on networks according to the restriction. For example, if the user specifies to block data on all networks except WiFi networks, the one or more device agents block data communications over the network to which the device is connected unless that network is a WiFi network.

Restricting Applications or Device Functions

In some embodiments, the one or more device agents assist the user in configuring a restriction that applies to individual application programs or device functions (e.g., the user can configure an application "black list"), or that prevents usage of all applications and device functions (unless otherwise indicated, application programs and device functions are collectively referred to as "applications") except those that are specified as excepted from the restriction (e.g., the user can configure an application "white list"). In some embodiments, a user with an appropriate level of account control can log in to a website (e.g., from a mobile or non-mobile device) and configure application-based restrictions. In some embodiments, a user with an appropriate level of account control can use a service processor (e.g., an application program) on a first device, which is not part of the device group, to configure a restriction for a second device that is in the device group. In some embodiments, a user of a second device in the device group can, if either the user or the device has the appropriate level of control or authority, configure an application-based restriction that applies to a first device in the device group. In some embodiments, a user of a first device in the device group can, if either the user or the device has the appropriate level of control or authority, configure an application-based restriction that applies to the first device.

In some embodiments, the restrictions are time-dependent (e.g., from time A to time B). In some embodiments, the restrictions are location-dependent (e.g., when the device is at location X, prevent usage of application A). In some embodiments, the restrictions are time-dependent and location-dependent (e.g., during school hours, when the device is at school, prevent usage of the Facebook, Twitter, YouTube, and Netflix applications). In some embodiments, the restrictions are additionally usage-dependent (e.g., only allow 3 MB of Facebook during school days when the device is at school).

In some embodiments, to enable configuration of an application-based restriction, the one or more device agents on a first device request permission from a user to upload, to a network element (e.g., service controller 122), a list of applications on the first device, where the first device is the device to which the restriction will be applied. In some embodiments, the one or more device agents on the first device request permission by presenting a notification through a user interface of the first device. In some embodiments, the notification informs the user that in order to restrict usage of individual applications or device functions, it is necessary to obtain a list of applications on the first device. In some embodiments, one or more device agents on a second device, the second device being associated with an account administrator, request permission to upload the list of applications on the first device by presenting a notification through a user interface of the second device.

In some embodiments, the user of the first device must consent to the upload of the information about (e.g., the list of) applications. In some embodiments, a user with authority (i.e., a user who can log in to the device group account, a device group administrator, a user of a device with account control, etc.) may consent to the upload of the information about (e.g., the list of) applications from the first device. In some embodiments, the one or more device agents on the second device present, through a user interface of the second device, an offer to control usage of one or more applications on a first device.

In some embodiments, the one or more device agents on the first device present, through the user interface of the first device, an indication that the user of second device wishes to control one or more applications on the first device. In some embodiments, the one or more device agents on the second device present a notification through the user interface of the second device, where the notification informs the user of the second device that controlling applications on the first device requires information about (e.g., a list of) the applications on the first device to be obtained from the first device, and requests permission to obtain the required information. If the user gives permission for the retrieval of the information about the applications on the first device, in some embodiments, service controller 122 sends a request for the information about the applications on the first device to the one or more device agents on the first device. In some embodiments, the one or more device agents on the first device send the information about the applications on the first device to the one or more device agents on the second device.

In some embodiments, if the user consents to the upload, the one or more device agents on the first device provide information about (e.g., a list of) applications on the first device to service controller 122 so that the list is available for a user with authority (e.g., from the first device itself, or from another device in the device group, such as the second device, or from an authorized application on a device that is not in the device group, or from a website, etc.) to view for the purpose of implementing a restriction on one or more specified applications (or to allow specified applications during a restriction period) on the first device. In some embodiments, the one or more device agents on the first device send the information about the applications on the first device to service controller 122 in response to a request from service controller 122. In some embodiments, the information is sent over service control link 1653, which may be secure. In some embodiments, the one or more device agents on the first device periodically or occasionally send the information about the applications on the first device to service controller 122. In some embodiments, the one or more device agents on the first device send the information directly to the second device, bypassing the service controller.

A savvy device user who anticipates that his or her device may be subjected to application restrictions could try to circumvent such restrictions by, for example, changing some aspect of an application on the device. For example, a user could change the name of the application or an icon associated with the application. To prevent application identities from being obscured in a manner that prevents the configuration and application of effective application-based controls, in some embodiments, before sending the information about the applications on the first device to service controller 122, the one or more device agents verify the identities of one or more of the applications on the first device. In some embodiments, the one or more device agents on the first device perform a secure verification of the applications' identities without assistance from service controller 122. In some embodiments, the one or more device agents on the first device verify an application credential (e.g., an application name, a package name, an application identifier, a hash involving the application, a certificate associated with the application, etc.) to verify the identity of the application. In some embodiments, the one or more device agents on the first device send an application credential (e.g., an application name, a package name, an application identifier, a hash involving the application, a certificate associated with the application, etc.) to service controller 122. In some embodiments, the one or more device agents on the first device perform a hash of the application and send information about the hash to service controller 122. In some embodiments, the one or more device agents on the first device send a certificate associated with the application or information about a certificate associated with the application to service controller 122. In some embodiments, the one or more device agents on the first device perform a hash of the application and check the hash result against a certificate. In some embodiments, the one or more device agents on the first device perform a hash of the application, check the hash result against a certificate, and then send the certificate to service controller 122. In some embodiments, the one or more device agents on the first device send information to service controller 122 if a secure check of an application indicates that the application has been altered, tampered with, renamed, or otherwise altered in a manner that suggests the application is not the application it purports to be.

In some embodiments, after the one or more device agents on the first device provide information about (e.g., a list of) applications on the first device to service controller 122, the one or more device agents obtain, from service controller 122, one or more policies. In some embodiments, service controller 122 provides the one or more policies over service control link 1653, which may be secure. In some embodiments, the one or more policies include one or more control policies to be applied to one or more of the applications on the first device. In some embodiments, service controller 122 obtains at least an aspect of, or information about at least an aspect of, the one or more control policies from the one or more device agents on the first device. In some embodiments, service controller 122 determines at least an aspect of the one or more control policies based on other information from the one or more device agents on the first device (e.g., information about a user input or a user preference, etc.). In some embodiments, service controller 122 obtains at least an aspect of the one or more control policies from app store or play store account information (e.g., an app store by Amazon™, Apple™, or a play store by Google™, etc.). In some embodiments, service controller 122 obtains at least an aspect of the one or more control policies from a website interface that provides information about the device group account.

In some embodiments, the one or more policies include one or more notification policies (e.g., to assist the one or more device agents on the first device to present a notification when usage of an application is not allowed, to assist the one or more device agents on the first device to present a pop-up when the user attempts to use an application that is not allowed under a restriction, etc.).

In some embodiments, a first device registers a first credential with service controller 122, and service controller 122 determines a first communication path (e.g., an IP address, a secure communication channel, a tunnel, a push notification address or path, etc.) associated with the first credential. In some embodiments, the first credential is a device credential or an agent credential. In some embodiments, service controller 122 identifies that the first device does not have account control based on the first credential.

In some embodiments, the one or more device agents on the second device register a second credential with service controller 122, and service controller 122 determines a second communication path (e.g., an IP address, a secure communication channel, a tunnel, a push notification address or path, etc.) associated with the second credential. In some embodiments, the second credential is a device credential or an agent credential. In some embodiments, the second credential is identified as being associated with a device with account control. In some embodiments, service controller 122 identifies that the second device has account control based on the second credential.

In some embodiments, service controller 122 receives a request over the second communication path, where the request is associated with a restriction to be applied to the first device. In some embodiments, in response to the received request, service controller 122 sends one or more settings or instructions over the first communication path, where the one or more settings or instructions are configured to assist one or more device agents on the first device to implement the restriction.

In some embodiments, service controller 122 (1) obtains information about (e.g., a list of) one or more applications on a first device, (2) obtains one or more control policies applicable to one or more of the one or more applications on the first device, and (3) provides the one or more control policies to one or more device agents on the first device. In some embodiments, service controller 122 obtains the information about the one or more applications from one or more device agents on the first device. In some embodiments, before obtaining the information about the one or more applications from the one or more device agents on the first device, service controller 122 acquires permission to obtain the information. In some embodiments, service controller 122 acquires permission based on a user input obtained through a user interface of the first device. In some embodiments, service controller 122 acquires permission from an account owner or administrator. In some embodiments, service controller 122 acquires permission based on a user input obtained through a user interface of a second device. In some embodiments, service controller 122 acquires permission from an account management interface associated with a website, an app store (e.g., by Amazon™, Apple™, etc.), a play store (e.g., by Google™), etc. In some embodiments, one or more device agents on the first device acquire permission to provide the information to service controller 122. In some embodiments, one or more device agents on a second device acquire permission to provide the information to service controller 122.

In some embodiments, service controller 122 obtains the information about the one or more applications on the first device based on account information associated with an app store (e.g., by Amazon™, Apple™, etc.) or a play store (e.g., by Google™). In some embodiments, before obtaining the information about the one or more applications on the first device based on the account information associated with the app store or the play store, service controller 122 acquires permission to obtain the information. In some embodiments, service controller 122 acquires permission based on a user input obtained through a user interface of the first device. In some embodiments, service controller 122 acquires permission from an account owner or administrator. In some embodiments, service controller 122 acquires permission based on a user input obtained through a user interface of a second device. In some embodiments, service controller 122 acquires permission from an account management interface associated with a website, an app store (e.g., by Amazon™, Apple™, etc.), a play store (e.g., by Google™) etc. In some embodiments, one or more device agents on the first device acquire permission to provide the information to service controller 122. In some embodiments, one or more device agents on a second device acquire permission to provide the information to service controller 122.

In some embodiments, service controller 122 obtains the information about the one or more applications from a website interface associated with the device group account. In some embodiments, before obtaining the information about the one or more applications from the website interface associated with the device group account, service controller 122 acquires permission to obtain the information. In some embodiments, service controller 122 acquires permission based on a user input through a user interface of the first device. In some embodiments, service controller 122 acquires permission from an account owner or administrator. In some embodiments, service controller 122 acquires permission based on a user input through a user interface of a second device. In some embodiments, service controller 122 acquires permission from an account management interface associated with a website, an app store (e.g., by Amazon™, Apple™, etc.), a play store (e.g., by Google™), etc. In some embodiments, one or more device agents on the first device acquire permission to provide the information to service controller 122. In some embodiments, one or more device agents on a second device acquire permission to provide the information to service controller 122.

In some embodiments, one or more device agents on a second device (1) obtain, from service controller 122 or directly from the one or more agents on the first device, information identifying the applications on a first device, (2) obtain a user input through a user interface of the second device, the user input specifying at least an aspect of one or more control policies to be applied to one or more of the applications on the first device, and (3) send control request information to service controller 122, the control request information providing an indication of the user input, the at least an aspect of the one or more control policies, or other information to assist service controller 122 to determine the one or more control policies to be applied to one or more of the applications on the first device.

In some embodiments, one or more device agents on the first device are configured to (1) implement one or more control policies to control usage of one or more applications on the first device, at least an aspect of the one or more control policies determined by service controller 122 and/or one or more device agents on a second device, and (2) determine whether at least one of the one or more applications on the first device has been tampered with or whether the identity of the at least one of the one or more applications has been tampered with. In some embodiments, the one or more device agents on the first device implement a communication protocol with service controller 122 that allows service controller 122 to determine whether the implementation of the one or more control policies has been tampered with. In some embodiments, the one or more device agents on the first device implement a communication protocol with service controller 122 that allows service controller 122 to determine whether the implementation of the one or more control policies has been altered or the control policy has been removed or altered. In some embodiments, the one or more device agents on the first device report the identity of at least one of the one or more applications. In some embodiments, the one or more device agents on the first device implement a communication protocol with service controller 122 that allows service controller 122 to determine whether the application-identity reporting mechanism has been tampered with, altered, or removed. In some embodiments, the one or more device agents on the first device implement a communication protocol with service controller 122 that allows service controller 122 to determine whether the identity of the at least one of the one or more applications has been tampered with or altered, or the application has been removed.

In some embodiments, one or more device agents on a first device provide an indication, through a user interface of the first device, of one or more applications that are available, or not available, for use on the first device based on a control policy obtained (e.g., received) from or specified at least in part by service controller 122 or one or more device agents on a second device. In some embodiments, the indication takes the form of a home screen that is different from the home screen that would otherwise be presented in the absence of application-based restrictions. In some embodiments, the indication takes the form of an available-applications partition (or, conversely, an unavailable-applications partition). In some embodiments, the indication takes the form of a list of applications that are available (or unavailable). In some embodiments, the indication takes the form of symbols superimposed on application icons (e.g., badges, "X" symbols, etc.). In some embodiments, indication takes the form of an icon that is somehow different from the icon that is presented when that application is not restricted. Such difference may be that the icon is smaller icon, greyed-out, transparent or translucent, located in a different tray, etc. In some embodiments, the indication takes the form of a notification message that indicates a restriction is in place when a user of the first device attempts to use an application that is subject to a restriction. In some embodiments, the indication takes the form of an icon in a notifications area of the device.

In some embodiments, one or more device agents on a first device provide an indication, through a user interface of the first device, of applications that have, or do not have, available network access based on a control policy obtained (e.g., received) from or specified at least in part by service controller 122 or one or more device agents on a second device. In some embodiments, the indication takes the form of a home screen that is different from the home screen that would otherwise be presented. In some embodiments, the indication takes the form of an available-applications partition (or, conversely, an unavailable-applications partition). In some embodiments, the indication takes the form of a list of applications that are available (or unavailable). In some embodiments, the indication takes the form of symbols superimposed on application icons (e.g., badges, "X" symbols, etc.). In some embodiments, indication takes the form of an icon that is somehow different from the icon that is presented when that application is not restricted. Such difference may be that the icon is smaller icon, greyed-out, transparent or translucent, located in a different tray, etc. In some embodiments, the indication takes the form of a notification message that indicates a restriction is in place when a user of the first device attempts to use an application that is subject to a restriction.

In some embodiments, a user of second device manages applications on a first device without assistance from service controller 122. In some such embodiments, the one or more device agents on the second device request, from one or more device agents on the first device, information about (e.g., a listing of) applications on the first device. In some embodiments, the user of the first device or an authorized party (e.g., account owner, administrator, etc.) must consent to the sending of the information about the applications on the first device to the second device.

In some embodiments, the one or more agents on the second device can request information about (e.g., a list of) applications on the first device from an app store or play store (e.g., from Amazon™, the Apple™ App Store™, Google Play™, etc.). In some such embodiments, the app store or play store account holder or another authorized party (e.g., account owner, administrator, etc.) must consent to the sending of the information about the applications from the app store or play store to the second device.

In some embodiments, a user of the first device or an authorized party (e.g., account owner, administrator, etc.) can establish partitioned lists of applications on the device. The partitioning can be based on any criteria established by the user or authorized party. Partitioning applications on the device into two or more groups enables new models. For example, consider the case of a device that is deployed by an enterprise to an employee. The enterprise may desire to pay for and, therefore, manage access to and allocations for, application or data usage taking place for work purposes (e.g., map applications, business e-mail applications, etc.), but not personal application usage (e.g., Facebook™ access, personal e-mail usage, etc.). By designating certain applications as, for example, "business" or "personal," the user of the first device can designate certain applications as "personal" and thus prevent information about them from being sent to service controller 122 or to a second device, or being visible to an administrator or account owner. Conversely, the user or the enterprise can designate certain applications (e.g., a VPN application, a maps application, etc.) as "business," which, in some embodiments, gives the enterprise permission to pull information about these applications from the device.

In some embodiments, if a user of a second device is configuring a restriction for the first device, service controller 122 provides information about (e.g., a list of) the applications on the first device to the second device. In some embodiments, this information includes a list of the applications that are on the first device. Because information about applications that are on the first device is sent to service controller 122, in some embodiments, the one or more device agents on the first device inform the user of the first device that the list of applications from the first device will be sent to service controller 122. In some embodiments, the one or more agents on the second device do not allow the user to restrict usage of applications or device functions for the first device unless a user with authority consents to the sending of the list of applications and functions from the first device to service controller 122. In some embodiments, an account holder or a person able to log in to the device group account can consent to the sending of the list of applications on the first device to service controller 122. In some embodiments, the user of the first device can consent to the sending of the list of applications to service controller 122, even if the user is not otherwise authorized to manage the account or devices in the device group. In some embodiments, a device group administrator (e.g., a person with authority, such as a parent, an account holder, etc.) can consent on behalf of other device users (e.g., children or employees).

In some embodiments, service controller 122 uses the information provided by the one or more device agents on the first device or on the second device to prevent push notifications associated with the specified applications while the restriction is in effect.

In some embodiments, service controller 122 (1) obtains information about (e.g., a list of) applications on a first device from one or more device agents on the first device, (2) provides information about (e.g., a list of) the applications on the first device to one or more device agents on a second device, (3) determines one or more control policies associated with the applications on the first device based on information from the one or more device agents on the second device, and (4) provides, to the one or more device agents on the first device, information about the one or more control policies. In some embodiments, the information from the one or more device agents on the second device is based on a user input obtained through a user interface of the second device by the one or more device agents on the second device. In some embodiments, the information about the one or more control policies comprises an instruction or setting to assist the one or more device agents on the first device to implement at least a portion of the one or more control policies.

In some embodiments, the information about the applications on the first device comprises one or more application identities for one or more applications capable of executing or running on the first device. In some embodiments, service controller 122 determines whether at least a subset of the one or more application identities are valid application identities. In some embodiments, service controller 122 associates at least a subset of the one or more application identities with descriptive information about the subset of the one or more application identities. In some embodiments, service controller 122 obtains the descriptive information from a network, a cloud server, or a database. In some embodiments, service controller 122 obtains the descriptive information from an app store or play store (e.g., from Amazon™, the Apple™ App Store™, Google Play™). In some embodiments, the descriptive information is obtained from an application information database. In some embodiments, the descriptive information comprises an icon, an identifier, a name, a description, a credential, a certificate, a hash, or a combination of these. In some embodiments, service controller 122 uses the descriptive information to identify the applications within the subset of the one or more application identities. In some embodiments, service controller 122 uses the descriptive information to confirm the identities of applications in the subset of the one or more application identities.

In some embodiments, service controller 122 also obtains, from the one or more device agents on the first device, information to assist in confirming the identity of at least one of the applications identified by the information about the applications on the first device. In some embodiments, the information that assists service controller 122 in confirming the identity of the at least one application comprises a credential, hash information, configuration information, certificate information, or a combination of these. In some embodiments, service controller 122 compares the information to assist in confirming the identity of at least one of the applications with information service controller 122 obtains from a network, a cloud server, or a database (e.g., an app store or a play store). In some embodiments, service controller 122 takes an action if the identity does not match. In some embodiments, the action is to provide a control policy to the one or more device agents on the first device. In some embodiments, the action is to cause a notification message to be presented through a user interface of the first device. In some embodiments, the action is to cause a notification message to be presented through a user interface of the second device. In some embodiments, the action is to send a notification (e.g., an e-mail, a device agent notification, a text message, an audible message or notification, etc.) to an account holder or a master user.

Figure 64:
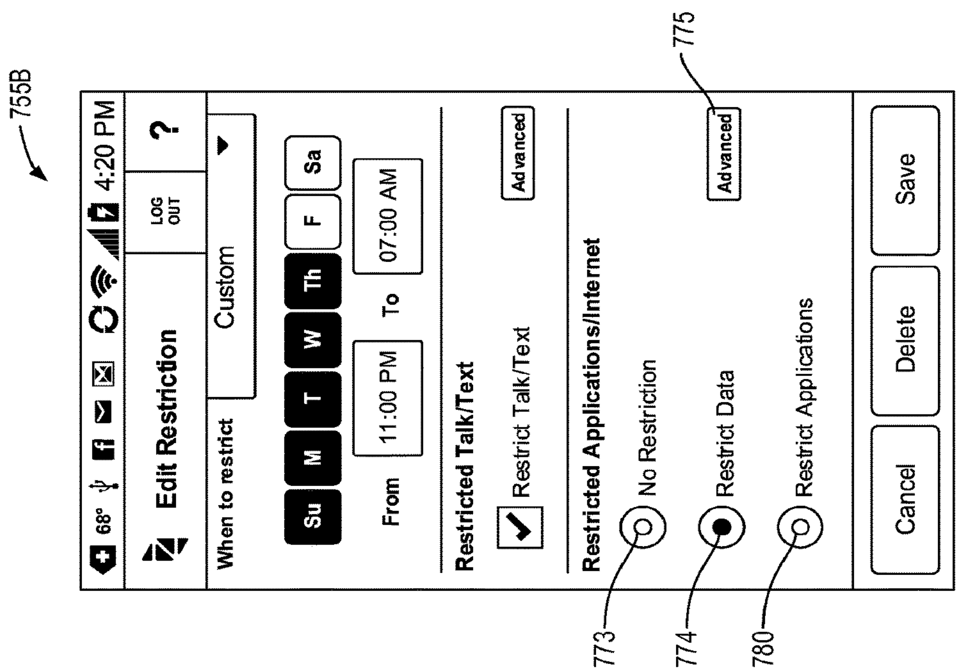
FIG. 64 illustrates a display screen presented through a touch-screen display of a wireless end-user device, in accordance with an exemplary embodiment, through which a user has elected to restrict data usage.
Figure 65A:
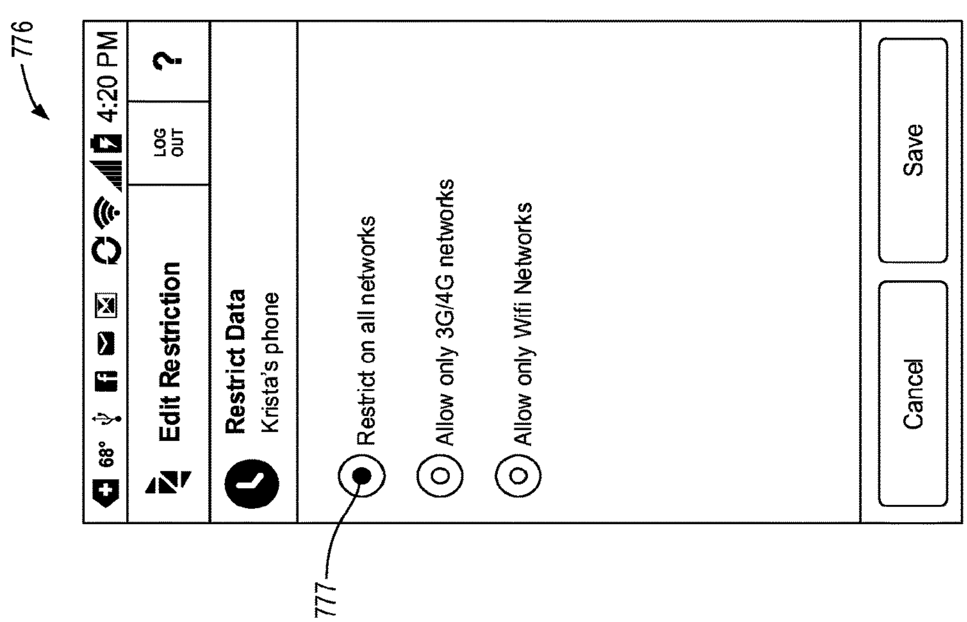
FIGS. 65A through 65C illustrate a display screen presented through a touch-screen display of a wireless end-user device, in accordance with an exemplary embodiment, to allow a user to specify whether to restrict data usage on all networks to which the device is connected, to allow data usage only on 3G or 4G networks, or to allow data usage only on wireless fidelity (Wi-Fi) networks.
Figure 65B:
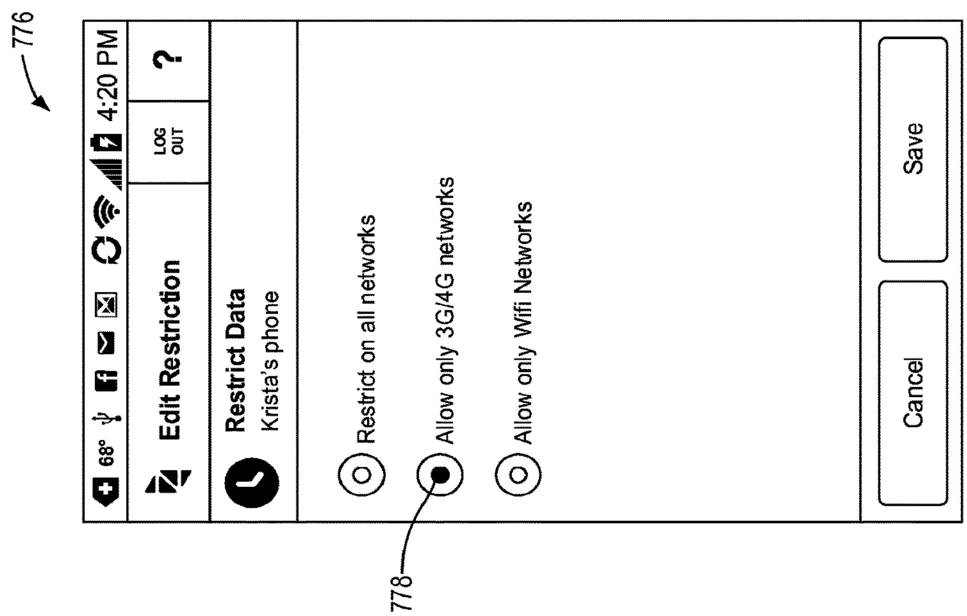
Figure 65C:
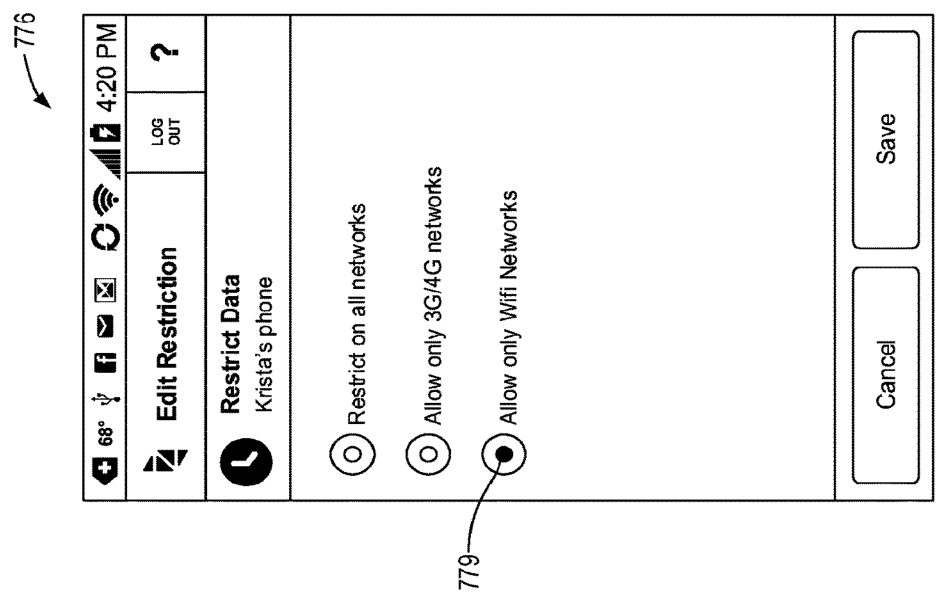
Figure 66:
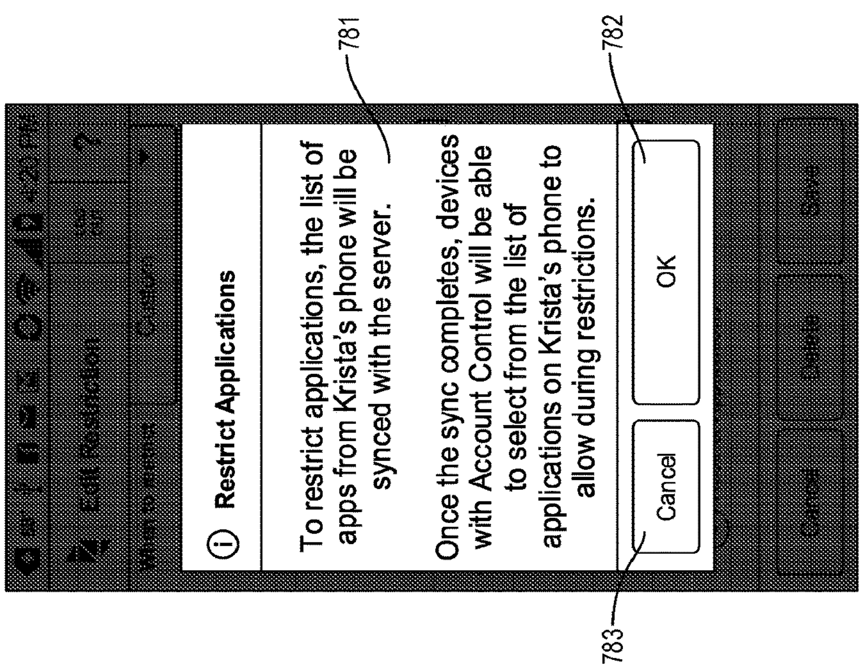
FIG. 66 illustrates a pop-up window presented through a touch-screen display of a wireless end-user device, in accordance with an exemplary embodiment, to inform a user that in order to restrict applications, the list of applications from the device for which the restriction is being configured will by synchronized with a server, and that after the synchronization is complete, a device with an adequate level of account control will be able to select specific applications from the list to allow during the restriction being configured (i.e., to designate as excepted from the restriction).
Figure 67:
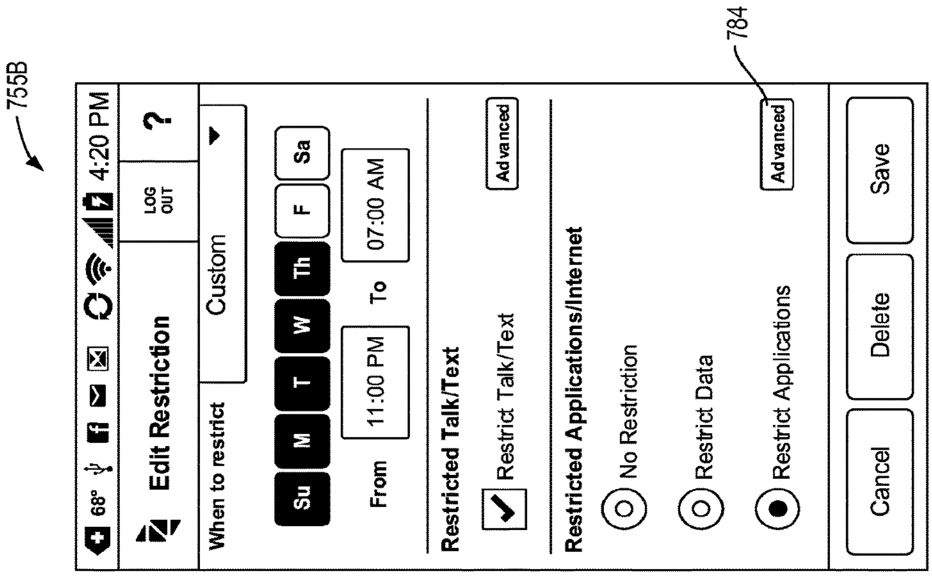
FIG. 67 illustrates a display screen presented through a touch-screen display of a wireless end-user device, in accordance with an exemplary embodiment, including an "Advanced" button that appears when a user elects to restrict access to or usage of applications.

Referring again to the exemplary embodiment of FIG. 64, as an alternative to restricting all or only some data, (e.g., possibly only on specified networks) by selecting radio button 774, the user can restrict usage of particular applications or device functions (applications and device functions are both referred to generally as applications) by selecting radio button 780, labeled "Restrict Applications." FIG. 66 illustrates an exemplary embodiment in which the one or more device agents present pop-up notification 781 informing the user that in order to restrict applications, the list of applications from Krista's phone will be synced with the server, and that after the sync is complete, a device with account control will be able to select specific applications from the list of applications on Krista's phone to allow during restrictions. It is to be appreciated that FIGS. 64 through 70 present an embodiment in which an application/device function is blocked unless it is designated as an allowed exception (i.e., the application is on a "white list"), but, as explained previously, it is also possible to allow usage of all applications except those designated as blocked (i.e., are on a "black list").

Figure 68B:
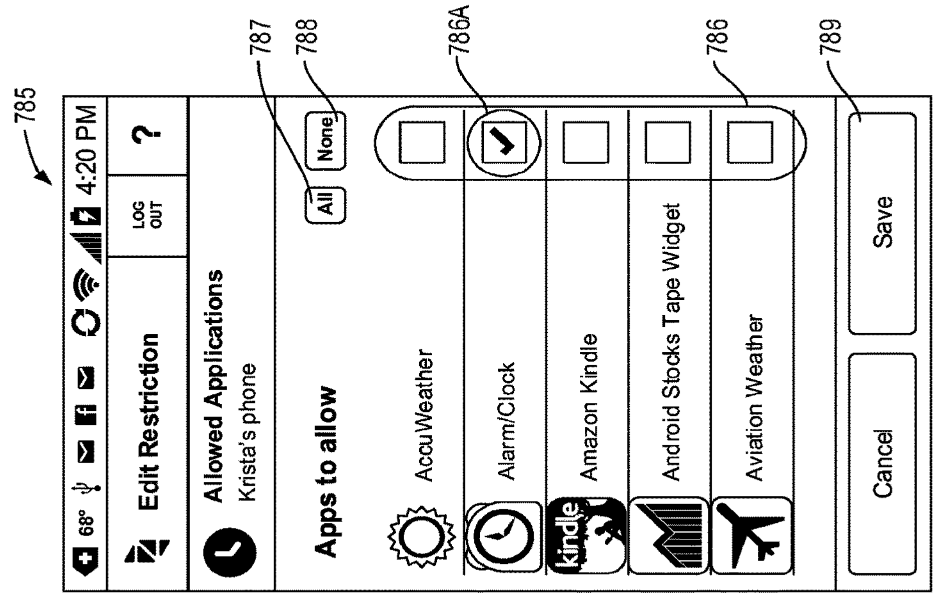
FIGS. 68A through 68C illustrate a display screen presented through a touch-screen display of a wireless end-user device, in accordance with an exemplary embodiment, through which a user configuring a restriction can identify specific applications to as exempt from the restriction (i.e., available for use during the restriction).
Figure 68A:
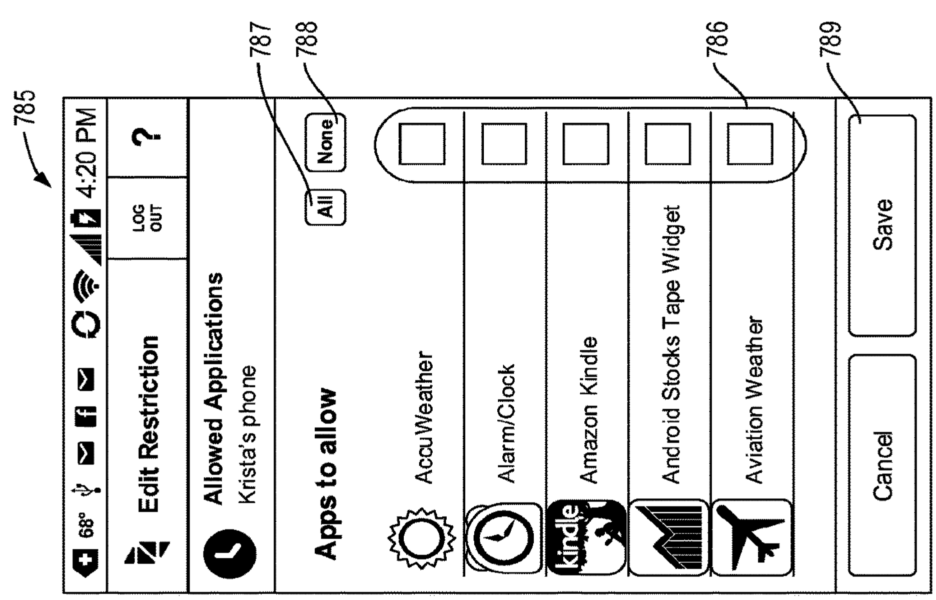
Figure 68C:
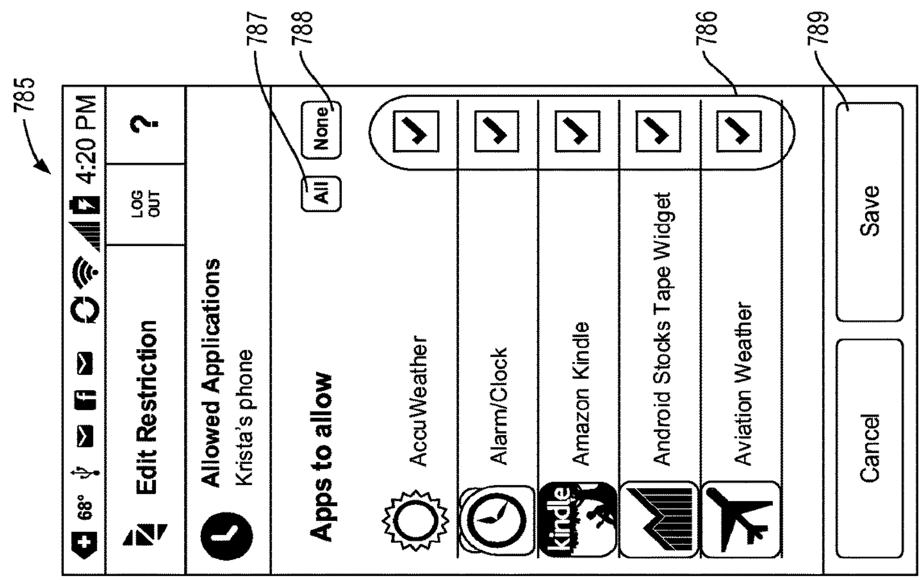
Figure 69:
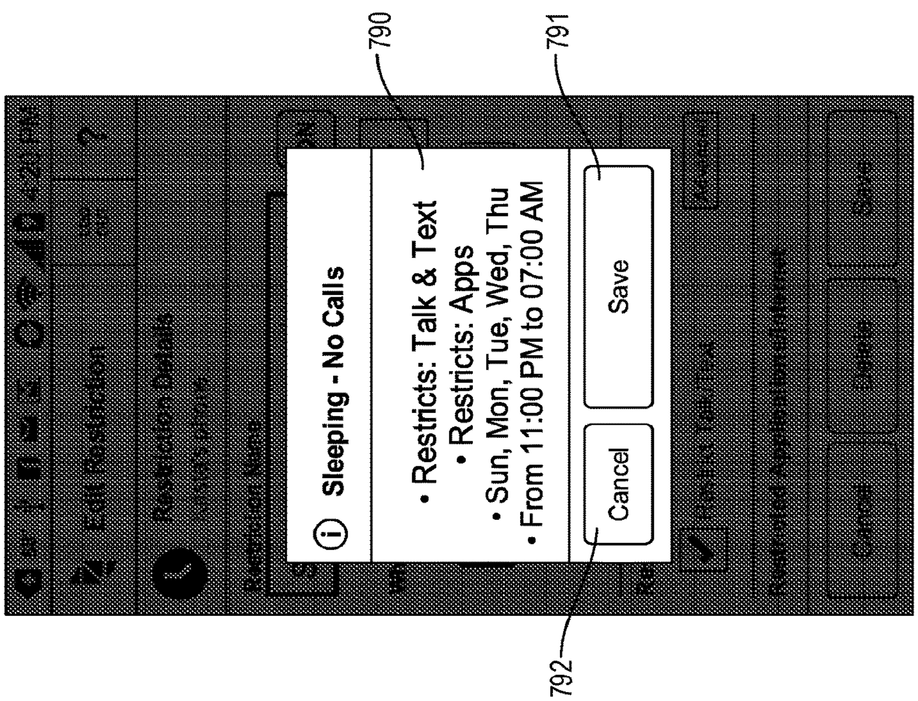
FIG. 69 illustrates a pop-up window/message presented through a touch-screen display of a wireless end-user device, in accordance with an exemplary embodiment, summarizing the restriction being configured and allowing the user to save the restriction.

In the embodiment of FIG. 66, the user can either consent to the list of applications being sent to the server (or, in some embodiments, directly to the requesting second device) by selecting the "OK" button 782, or the user can cancel the operation by selecting the "Cancel" button 783. If the user selects "OK" button 782, the one or more device agents present "Advanced" button 784 on screen 755B, as shown in the exemplary embodiment of FIG. 67. If the user selects "Advanced" button 784 of FIG. 67, the one or more device agents present a list of applications on the device, as obtained from the server (or, in some embodiments, directly from the other device). FIGS. 68A through 68C illustrate exemplary screen 785, through which the user can select individual applications to except from the restriction (i.e., to designate as allowed applications during the restriction being configured). FIG. 68B illustrates that the user can select individual boxes in the set of boxes 786, such as by selecting box 786A as shown in FIG. 68B. FIG. 68C illustrates that the user can select the "All" button 787 to place check marks in all of the boxes 786, or the user can select the "None" button 788 to remove or clear all check marks from all of the boxes 786 (as illustrated in FIG. 68A). When the user has selected the desired applications to allow during the restriction, the user selects "Save" button 789 shown in FIGS. 68A through 68C.

The controls provided by "Restrict Data" and "Restrict Applications" can be used together. For example, in some embodiments, the user can specify to restrict usage associated with a particular application only on certain networks (e.g., block usage of the Netflix application when the device is roaming during the time in which the restriction is in effect, block usage of the Pandora application unless the device is on a WiFi network, etc.). Many such hybrid restrictions are contemplated and are within the scope of the disclosure herein.

In some embodiments, before saving the restriction, the one or more device agents provide the user with one or more notifications or warnings. In the exemplary embodiment of FIG. 69, the one or more device agents present pop-up message 790, which summarizes the restriction "Sleeping—No Calls." Pop-up message 790 indicates that the restriction restricts phone calls, text messages, and applications on Sunday through Thursday from 11:00 P.M. until 7:00 A.M. If the user is satisfied with the restriction as configured, the user can save the restriction by selecting "Save" button 791. If the user is unsatisfied with the restriction as configured, the user can select "Cancel" button 792 to return to configuration screen 755 (illustrated in FIGS. 52, 54, 56, 57, 63, 64, 67).

In some embodiments, if the device to which the restriction is being applied has account control (e.g., has at least limited control, is able to purchase and share service plans, is able to manage itself and/or other devices in the device group, etc.), the one or more device agents present a notification that placing the restriction on the device will remove (or alternatively reduce, lower, deprioritize, etc.) the account control by default so that the user of the device cannot simply delete or turn off the restriction that has just been configured. For example, if the device is primarily used by a child, and the restriction restricts usage during the hours when the child is at school, the removal of account control prevents the child from removing the restriction and using the device in a manner that is contrary to the manner specified by a parent who configured and imposed the restriction. In some embodiments setting a restriction for a primary or master device (or a device with some level of priority or permissions) does not remove or reduce control unless the user configuring the restriction chooses to remove or reduce control.

Figure 70:
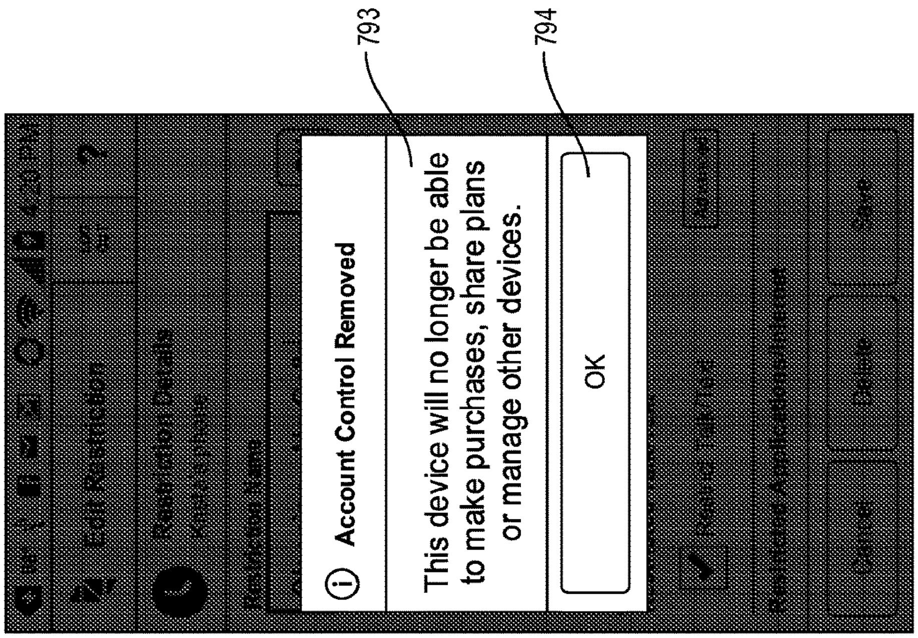
FIG. 70 illustrates a pop-up window/message presented through a touch-screen display of a wireless end-user device, in accordance with an exemplary embodiment, in response to the user selecting the "Save" button of FIG. 69, to advise the user that after the restriction has been applied, the device being restricted will no longer be able to make purchases, share plans, or manage other devices.

In the exemplary embodiment of FIG. 70, the one or more device agents present exemplary pop-up message 793, which advises the user that after the restriction has been applied, the device will no longer be able to make purchases, share plans, or manage other devices. By selecting "OK" button 794, the restriction is saved, and the account control is removed. The restriction will be effect during the times and on the days specified through screen 755.

In some embodiments, when the user has chosen to impose a restriction, the one or more device agents at least assist in implementing the specified restrictions during the specified time period. In some embodiments, the one or more device agents implement some or all of the restrictions (e.g., by blocking data usage, by identifying usage associated with an application that is not allowed under a restriction and blocking that usage, by blocking incoming or outgoing phone calls, by blocking incoming or outgoing text messages, by blocking particular device functions, etc.). In some embodiments, the one or more device agents communicate with service controller 122 to enable service controller 122 or other network-based elements to implement some or all of the restrictions. In some embodiments, the one or more device agents, service controller 122, and/or one or more network elements cooperate to implement the restrictions. The device agents and their functionalities that at least assist in restricting usage were described earlier in this document.

Figure 71:
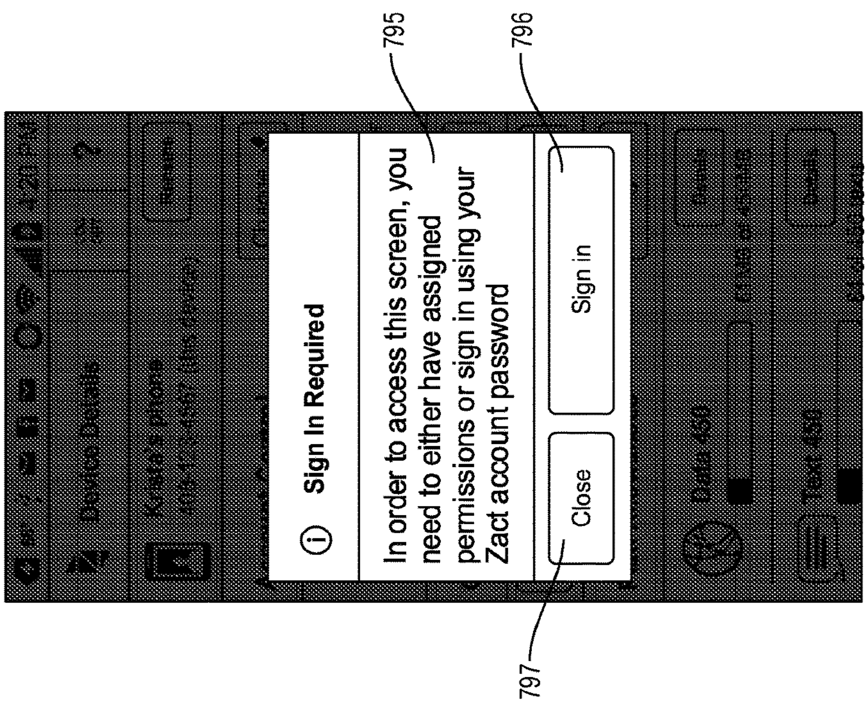
FIG. 71 illustrates a pop-up message/window presented through a touch-screen display of a wireless end-user device, in accordance with an exemplary embodiment, to inform the user that he or she cannot see the "Device Details" screen unless the user or the device has an adequate level of account control.

In some embodiments, after the account control has been removed, the user of the device cannot view the "Device Details" screen without logging in to the device group account. In the exemplary embodiment of FIG. 71, for example, the one or more device agents present pop-up message 795, informing the user that the user is not allowed to see the "Device Details" screen unless the user has assigned permissions or has signed in using the user's account password. The user may then select "Sign in" button 796 to sign in or can simply close the notification by selecting "Close" button 797.

Figure 72B:
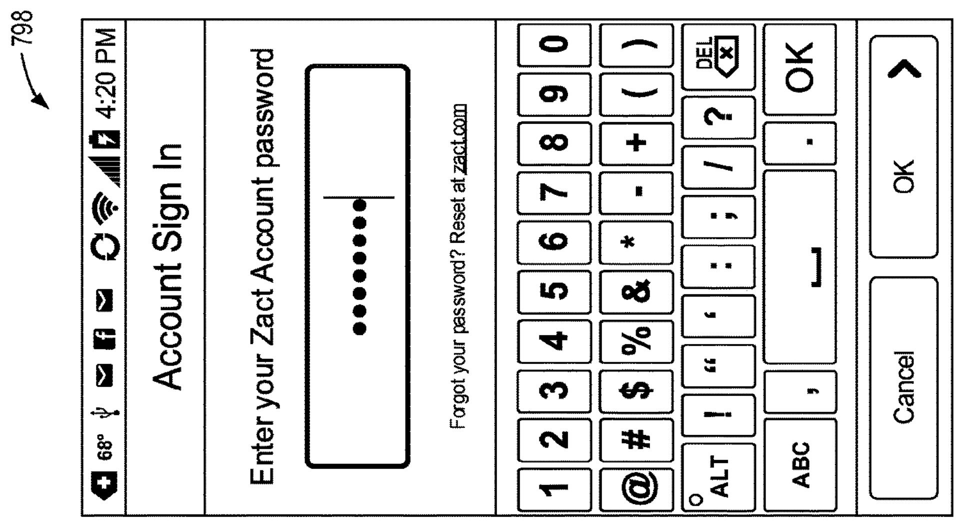
FIGS. 72A and 72B illustrate a display screen presented through a touch-screen display of a wireless end-user device, in accordance with an exemplary embodiment, to enable a user to sign in to a device group account.
Figure 72A:
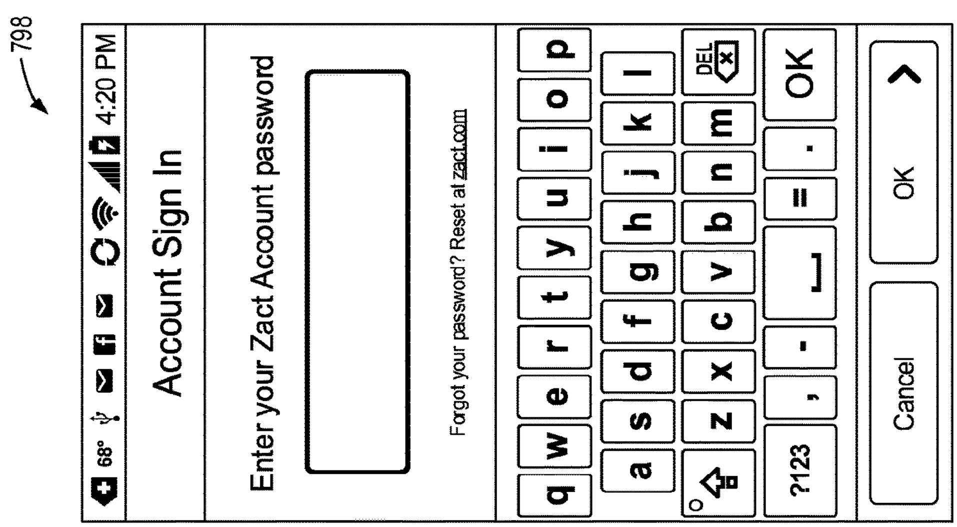

If the user chooses to sign in, the one or more device agents present an account sign-in screen, such as screen 798 illustrated in the exemplary embodiment of FIGS. 72A and 72B. By signing in, the user can once again view the "Device Details" screen.

Figure 73:
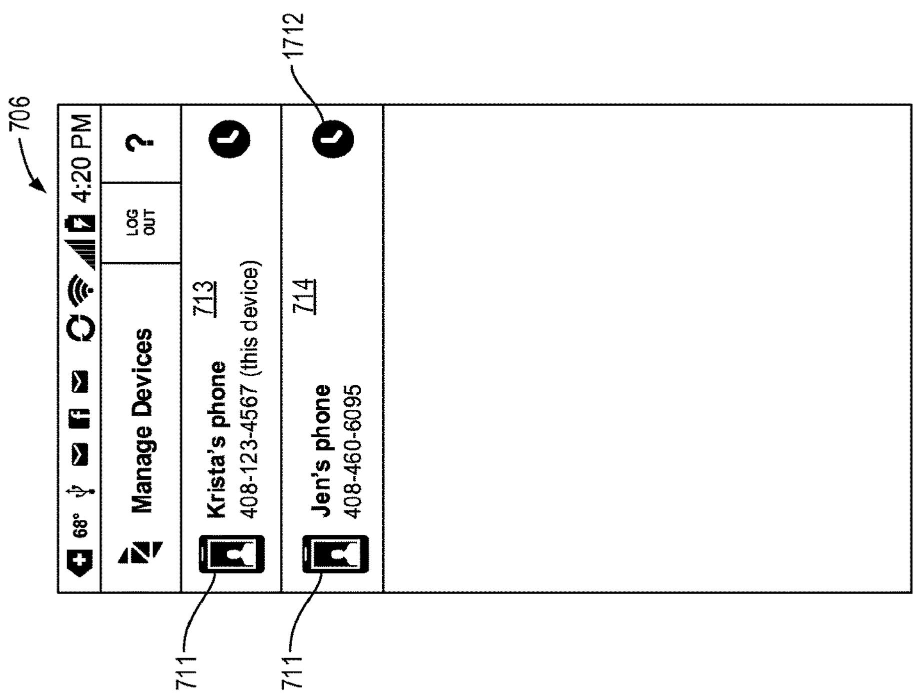
FIG. 73 illustrates a display screen presented through a touch-screen display of a wireless end-user device, in accordance with an exemplary embodiment, illustrating how the screen of FIG. 24 changes after a restriction has been applied to one of the devices in the device group.

In some embodiments, as a result of the imposition of a restriction on the device, the icons on the "Manage Devices" page change. FIG. 24 illustrates screen 706 of an exemplary embodiment before placement of a restriction on Krista's phone, and FIG. 73 shows screen 706 following the placement of a restriction on Krista's phone. As shown in FIG. 24, Krista's phone is associated with large person icon 710, crown icon 709, and no clock icon 1712. As shown in FIG. 73, after the restriction has been imposed, Krista's phone is associated with small person icon 711 (indicating that the device is subject to a restriction), clock icon 1712 (indicating that at least one time-dependent restriction is in place), and no crown icon 709 (indicating that the device no longer has full control (i.e., the ability to purchase and share plans and manage devices in the device group)). It is possible for a device to be associated with both crown icon 709 and clock icon 1712 to indicate that a device is subject to a restriction but still has some level of control.

If the user with authority (i.e., the user who is logged in to the device group account, because, as illustrated by the absence of the crown icon in FIG. 73, Krista's phone no longer has full account control) selects region 713 of screen 706, the user can obtain additional information about Krista's phone. In the exemplary embodiment shown in FIG. 74A, "Device Details" screen 1715A indicates that Krista's phone cannot purchase, share plans, or manage devices, and the restriction "Sleeping—No Calls" is in place because button 799 has the value "ON."

Figure 74A:
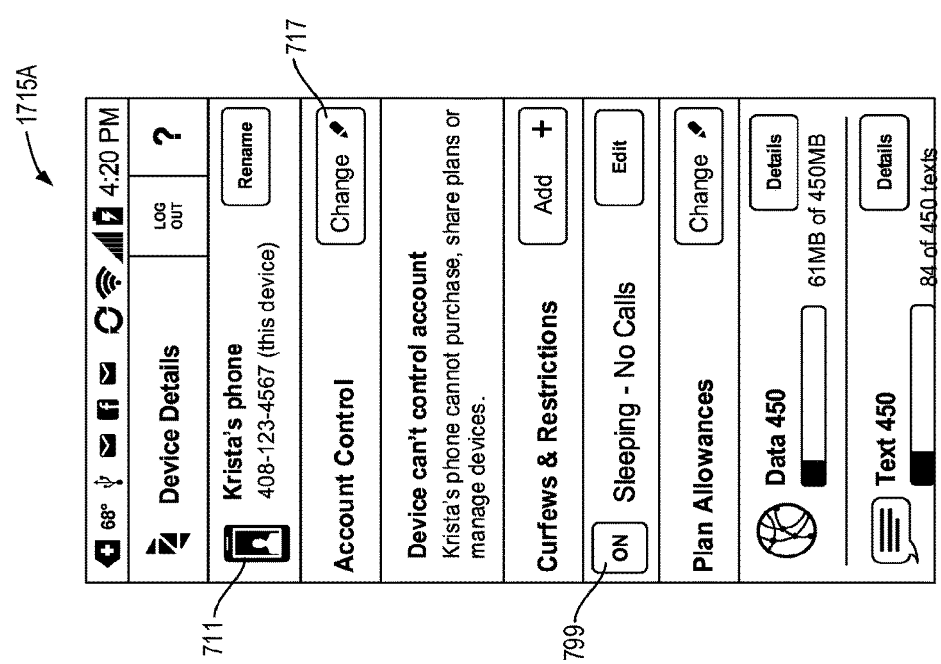
FIGS. 74A and 74B illustrate a display screen presented through a touch-screen display of a wireless end-user device, in accordance with an exemplary embodiment, providing information about a selected device from the device group account and allowing a user to toggle a restriction from "on" to "off."

In some embodiments, even if the device does not have full control, a user with authorization (i.e., a user who is able to log in to the device group account) can disable a restriction applicable to the device. In the exemplary embodiment of FIG. 74B, for example, the user who has logged in to the device group account from Krista's device and has navigated to screen 1715 is able to turn off the restriction "Sleeping—No Calls" by selecting or toggling button 799 from "ON" to "OFF," even though the device cannot control the account. Note that, in the embodiment of FIG. 74B, when the restriction is turned off, small person icon 711 from FIG. 74A is replaced by large person icon 710, and the one or more device agents present pop-up notification 820 that the restriction "Sleeping—No Calls" is being disabled.

Figure 74B:
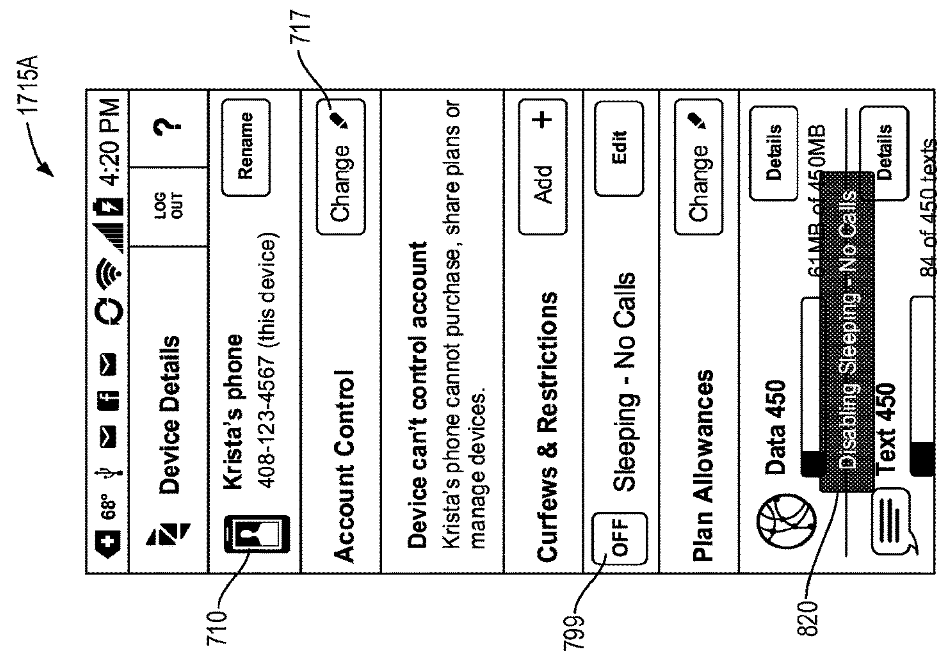

The exemplary embodiment of FIG. 74B illustrates that devices are associated with one set of privileges or permissions, and users are associated with another set of privileges or permissions. The decoupling of device permissions and user permissions allows users the flexibility to make changes to device restrictions without having to change device permissions. As a concrete example, a parent with the ability to log into the account could log into the account from a child's device to impose or remove a restriction on the child's device (or on another device in the device group) without having to give the child device control over the account.

Figure 75:
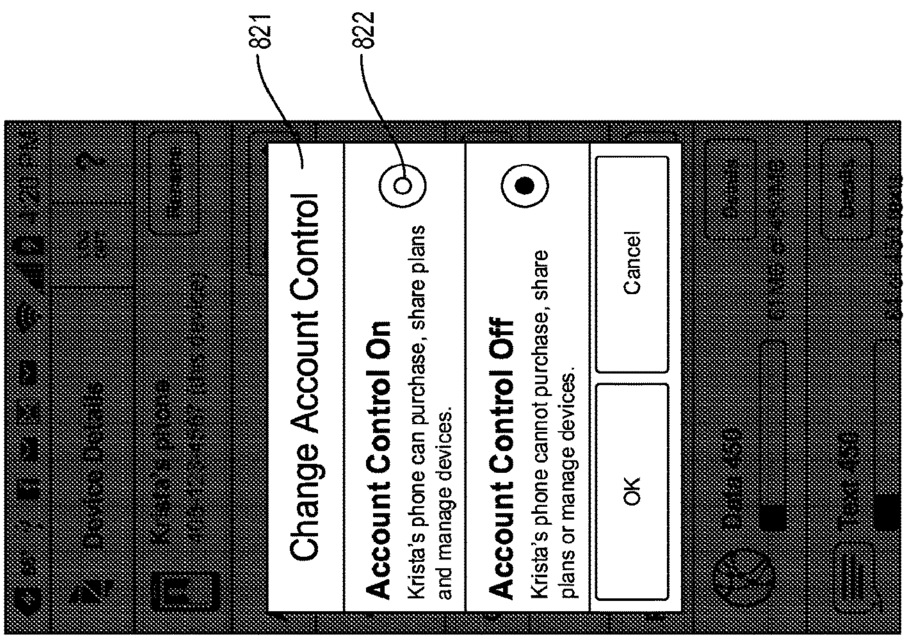
FIG. 75 illustrates a pop-up window/message presented through a touch-screen display of a wireless end-user device, in accordance with an exemplary embodiment, to indicate that account control is currently off for a device, and allowing the user to enable account control for that device.
Figure 76A:
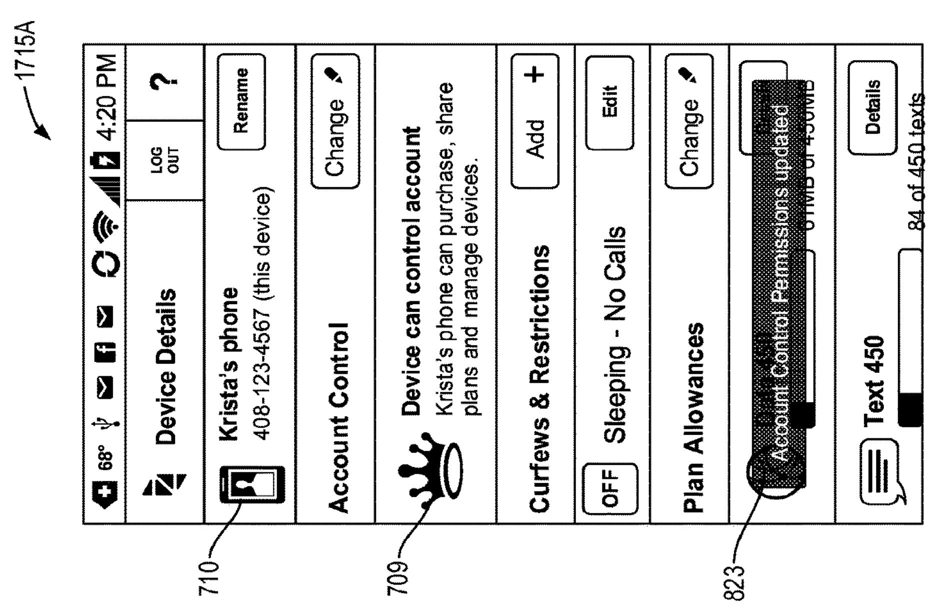
FIGS. 76A and 76B illustrate a display screen presented through a touch-screen display of a wireless end-user device, in accordance with an exemplary embodiment, illustrating the effect of enabling (i.e., turning on) a restriction for the device.

In some embodiments, after a restriction has been imposed on a device, and account control has been removed as a matter of course, a user with authority can restore account control to the device. In the exemplary embodiment of FIG. 74B, for example, a user who has logged into the account can select "Change" button 717 (next to "Account Control"). In response, in the exemplary embodiment of FIG. 75, the one or more device agents present, through the UI, pop-up 821, which indicates that account control is off and provides the option to select the "Account Control On" radio button 822 and thus enable Krista's phone to purchase, share plans, and manage devices. If the user selects "Account Control On" radio button 822 in FIG. 75, in the exemplary embodiment of FIG. 76A, the one or more device agents cause crown icon 709 to reappear on screen 1715A along with text indicating that Krista's phone can purchase, share plans, and manage devices. The one or more device agents may also superimpose pop-up notification 823 on the screen to indicate that the Account Control Permissions have been updated.

Figure 76B:
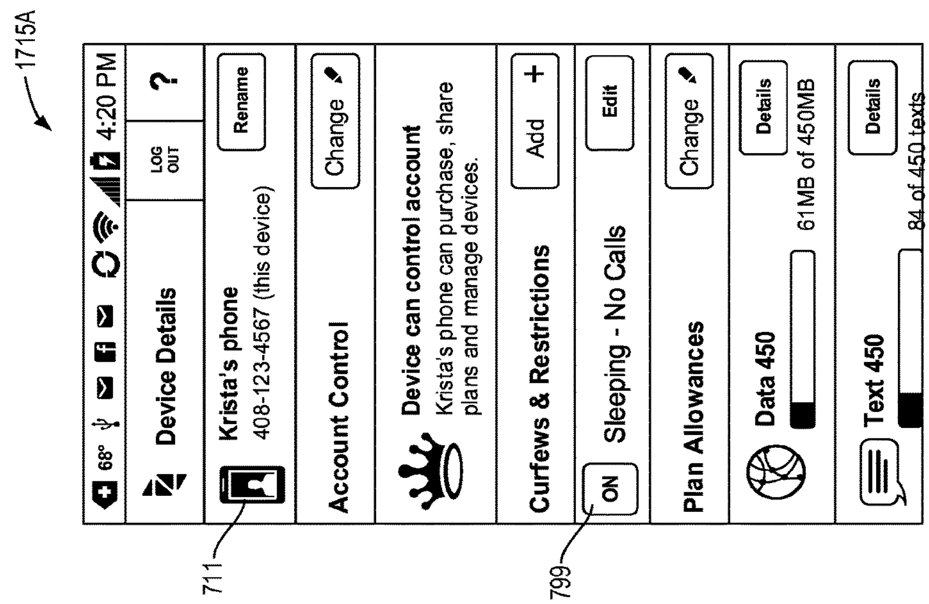

The user, having restored account control to Krista's phone, can now control the restriction "Sleeping—No Calls" at will by toggling button 799 between "ON" and "OFF," such as shown in FIG. 76B. Note that turning the restriction on again, as shown in FIG. 76B, replaces large person icon 710 of FIG. 76A by small person icon 711 in FIG. 76B, thus indicating that a restriction applies to the device.

In addition to placing restrictions on the device being used to enter the restrictions, in some embodiments users with authority (by virtue of the device being used having account control or by virtue of the user being able to log in to the device group account and having an appropriate level of permission or authority) can place restrictions on other devices in the device group. In some embodiments, the process of establishing a restriction is the same whether the restriction is being configured for the device being used or for another device in the group.

Figure 77:
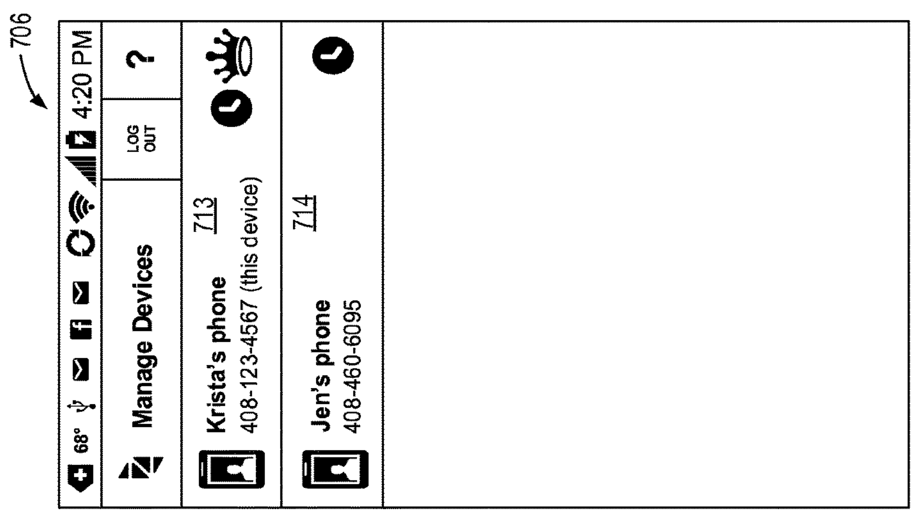
FIG. 77 illustrates a display screen presented through a touch-screen display of a wireless end-user device, in accordance with an exemplary embodiment, to allow a user to manage devices in a device group.
Figure 78:
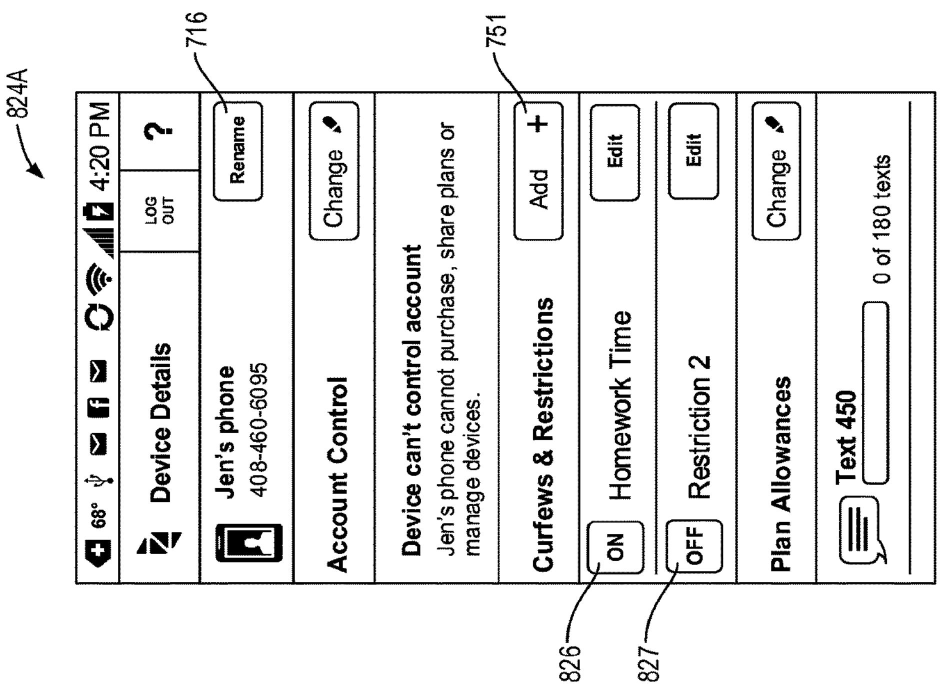
FIG. 78 illustrates a display screen presented through a touch-screen display of a wireless end-user device, in accordance with an exemplary embodiment, allowing a user to modify settings associated with a device in the device group.

For example, in the exemplary embodiment of FIG. 77, there are two devices in the device group: Krista's phone and Jen's phone. By selecting region 714 of screen 706 (labeled "Jen's phone"), in an exemplary embodiment the one or more device agents cause the screen 824A, shown in FIG. 78, to be presented. Screen 824A is similar to the screen shown in FIG. 25A for Krista's phone but allows management of Jen's phone instead of management of Krista's phone. (Screen 824B, illustrated in other figures, provides the rest of screen 824.) The absence of a crown on screen 824A indicates, in the exemplary embodiment of FIG. 78, that Jen's phone cannot control the account (i.e., purchase or share plans or manage devices). Screen 824A indicates that Jen's phone is associated with two curfews and restrictions: "Homework Time," which button 826 indicates is on (i.e., currently restricts usage of Jen's phone and will be in force at the times specified for "Homework Time") and "Restriction 2," which button 827 indicates is off (i.e., does not currently restrict usage of Jen's phone).

Figure 79:
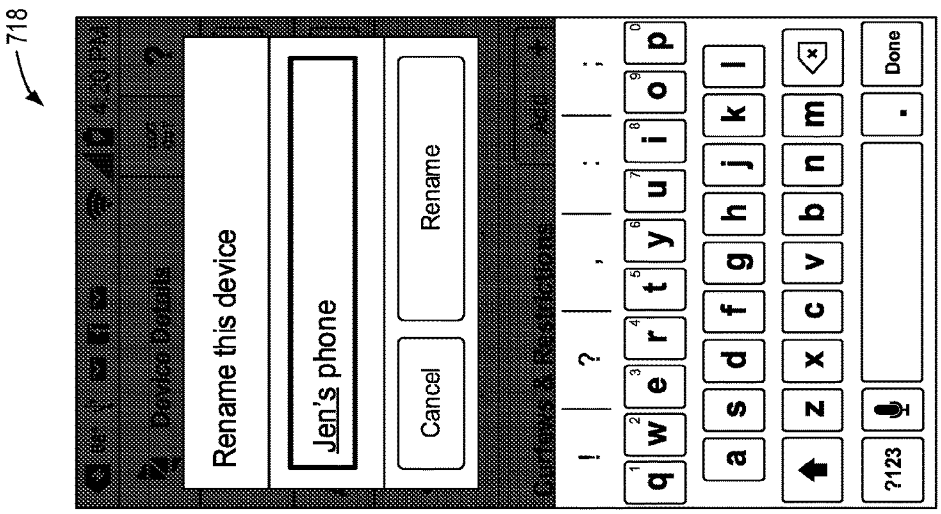
FIG. 79 illustrates a pop-up window/message presented through a touch-screen display of a wireless end-user device, in accordance with an exemplary embodiment, to allow a user to specify a nickname for a device in the device group.

In the exemplary embodiment, the user can rename Jen's phone by selecting "Rename" button 716, which causes the one or more device agents to present screen 718 of FIG. 79, which enables the user to change the device's name.

Figure 81:
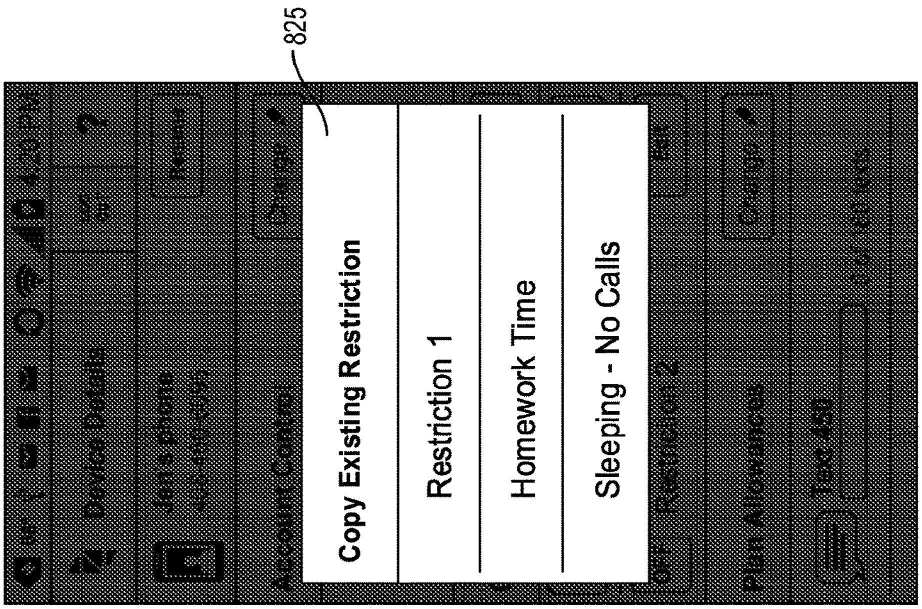
FIG. 81 illustrates a pop-up window/message presented through a touch-screen display of a wireless end-user device, in accordance with an exemplary embodiment, to enable a user to copy an existing restriction.
Figure 80:
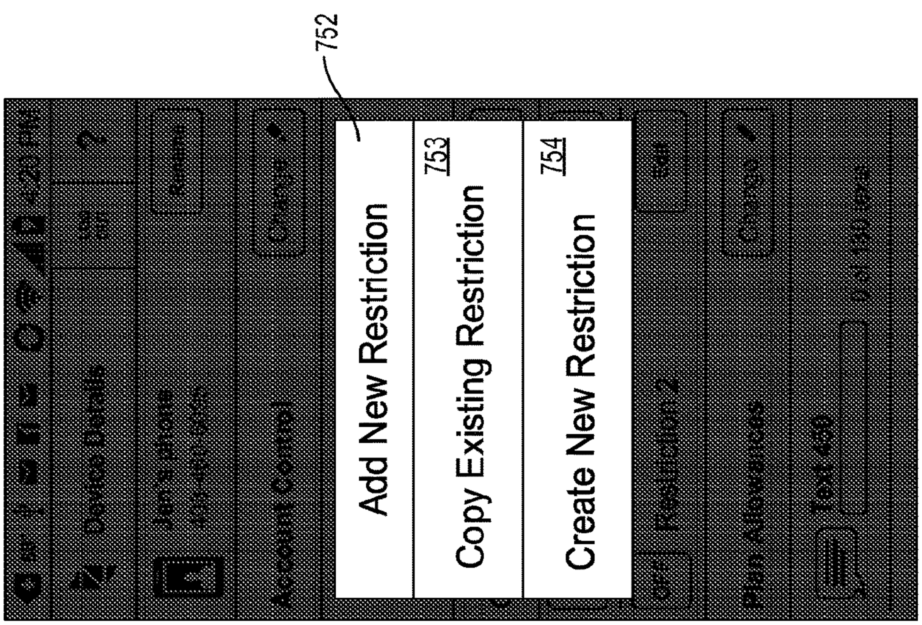
FIG. 80 illustrates a pop-up window/message presented through a touch-screen display of a wireless end-user device, in accordance with an exemplary embodiment, to enable a user to create a new restriction for a device either by copying an existing restriction or by creating a new restriction.

The user can also add a curfew or restriction to Jen's phone (in this example, from Krista's phone) by selecting "Add" button 751. In an exemplary embodiment, the procedure to set a restriction on Jen's device from Krista's phone is the same as the procedure to set a restriction on Krista's device from Krista's phone. FIG. 80 illustrates pop-up 752, which, in the exemplary embodiment, gives the user the option to copy an existing restriction by selecting region 753 or to create a new restriction by selecting region 754. FIG. 81 illustrates pop-up 825, which, in the exemplary embodiment, appears as the result of the user selecting region 753 to copy an existing restriction. Pop-up 825 provides a listing of existing restrictions configured for the device group, from which the user can choose. In the example of FIG. 81, the existing restrictions are "Restriction 1," "Homework Time," and "Sleeping—No Calls." In the exemplary embodiment, the user may select a restriction originally configured for a different device in the device group. For example, the restriction "Sleeping—No Calls," which was originally configured for Krista's device as described above, is among the existing restrictions available for selection and application to Jen's phone. The user may select "Sleeping—No Calls" and either apply it as-is to Jen's phone or modify the restriction, possibly saving the modified restriction with a new name so that the existing "Sleeping—No Calls" restriction remains available.

Figure 82B:
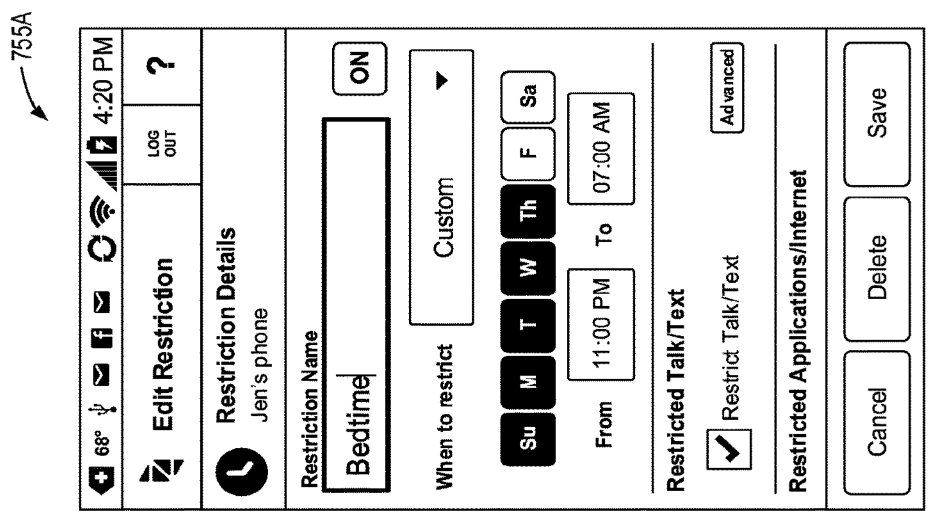
FIGS. 82A through 82C illustrate a display screen presented through a touch-screen display of a wireless end-user device, in accordance with an exemplary embodiment, enabling a user to configure a restriction for a device.
Figure 82A:
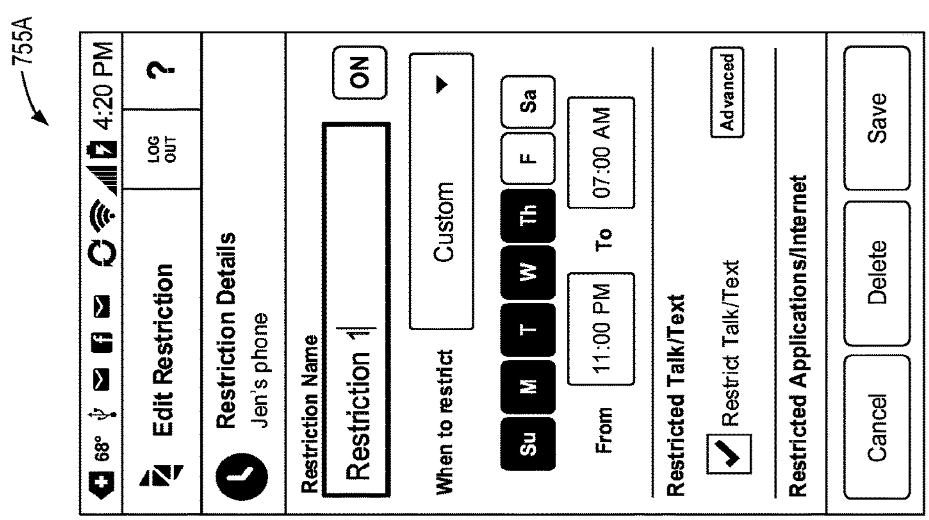
Figure 82C:
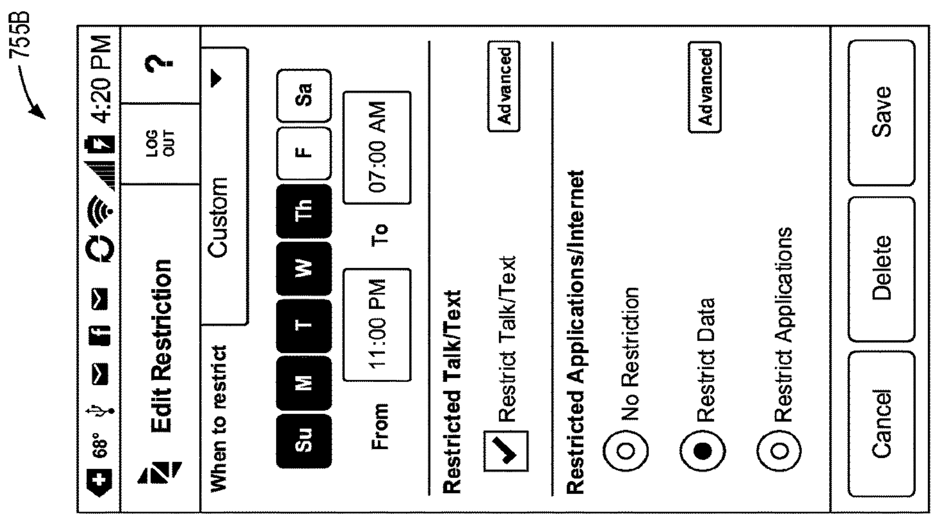
Figure 83:
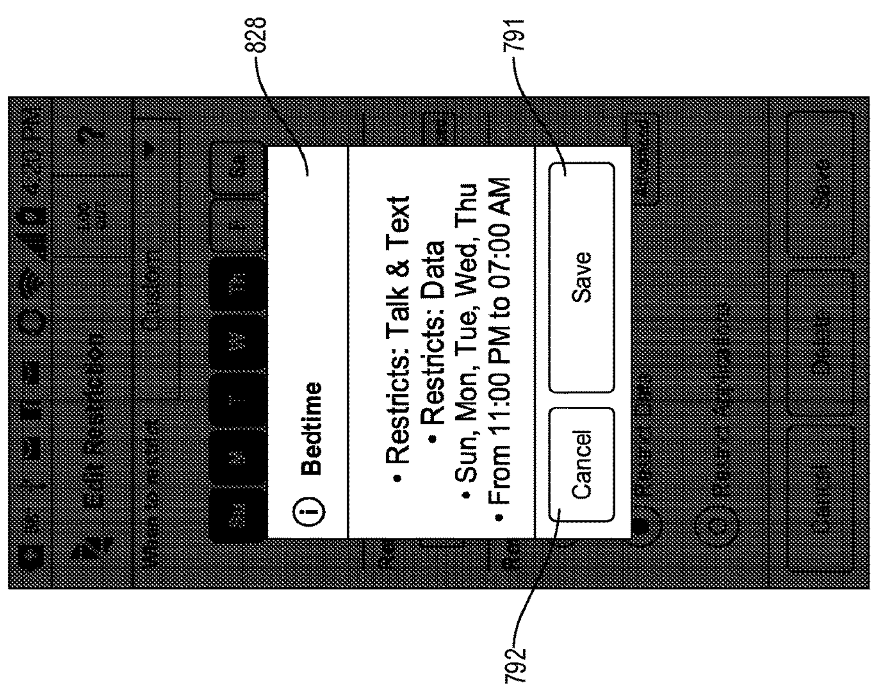
FIG. 83 illustrates a pop-up window/message presented through a touch-screen display of a wireless end-user device, in accordance with an exemplary embodiment, summarizing a configured restriction and enabling a user to save the restriction.

FIG. 82A illustrates screen 755A, which is presented by the one or more device agents in response to the user selecting the restriction "Restriction 1" from pop-up 825 of FIG. 81. "Restriction 1" may be a restriction previously configured and so-named by the user, or it may be a default restriction provided by the one or more device agents as a template for the user to modify. As shown in FIG. 82A, as already configured, whether by the user or in the default state, "Restriction 1" is in effect on Sunday through Thursday from 11:00 P.M. to 7:00 A.M., and it at least restricts voice calls and texting. As shown in FIG. 82B, the user has changed the name of "Restriction 1" to "Bedtime" (e.g., by using a pop-up keyboard such as keyboard 756 shown in FIG. 50). FIG. 82C illustrates the other portion of screen 755, screen 755B. In FIG. 82C, the user has selected to restrict data usage in addition to restricting voice minutes and text messaging. FIG. 83 illustrates pop-up 828, which summarizes the configuration of the restriction "Bedtime" and gives the user the opportunity to save the restriction by selecting "Save" button 791 or to cancel or make additional changes to the restriction by selecting "Cancel" button 792.

Figure 84:
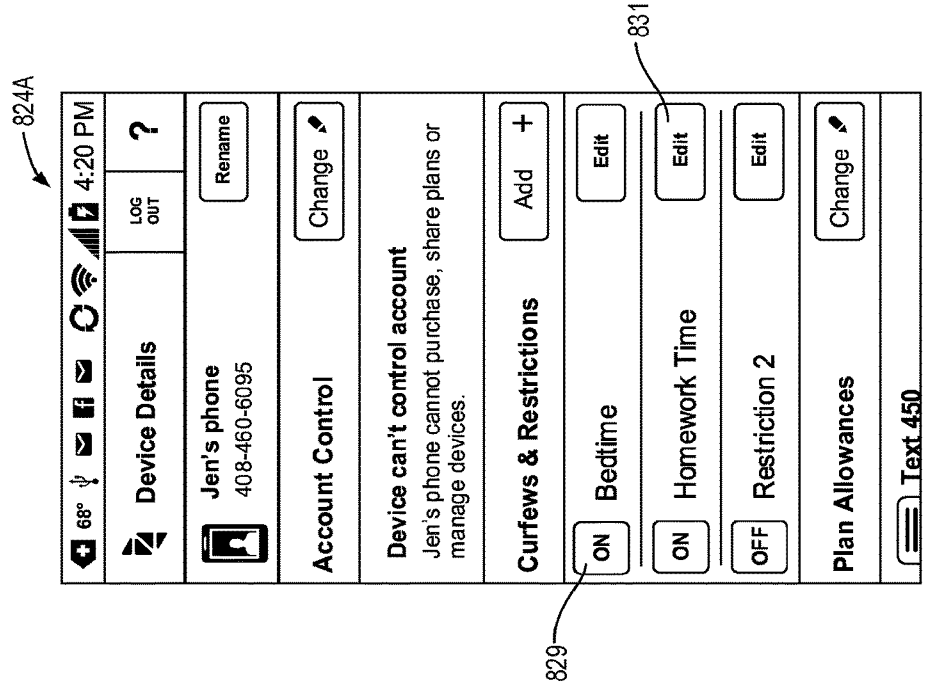
FIG. 84 illustrates a display screen presented through a touch-screen display of a wireless end-user device, in accordance with an exemplary embodiment, showing three restrictions applicable to the device, two of which are active (i.e., "on").

FIG. 84 illustrates screen 824A following the configuration of the "Bedtime" restriction. The "Bedtime" restriction just configured is now listed with the other restrictions (i.e., "Homework Time" and "Restriction 2"). As indicated by button 829, the "Bedtime" restriction is "on" (i.e., will be in force during the specified time(s) on the specified day(s)). The restriction "Homework Time" is also on, whereas the restriction "Restriction 2" is currently off (i.e., associated with Jen's phone, but will not restrict Jen's phone during the specified time(s) on the specified day(s)).

Figure 85B:
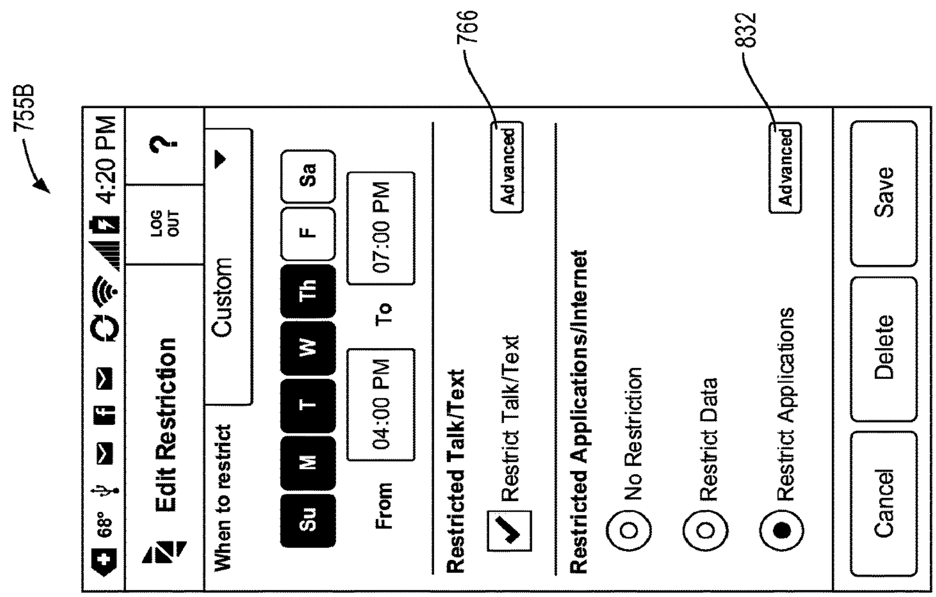
FIGS. 85A and 85B illustrate a display screen presented through a touch-screen display of a wireless end-user device, in accordance with an exemplary embodiment, enabling a user to create or modify a restriction for a device.
Figure 85A:
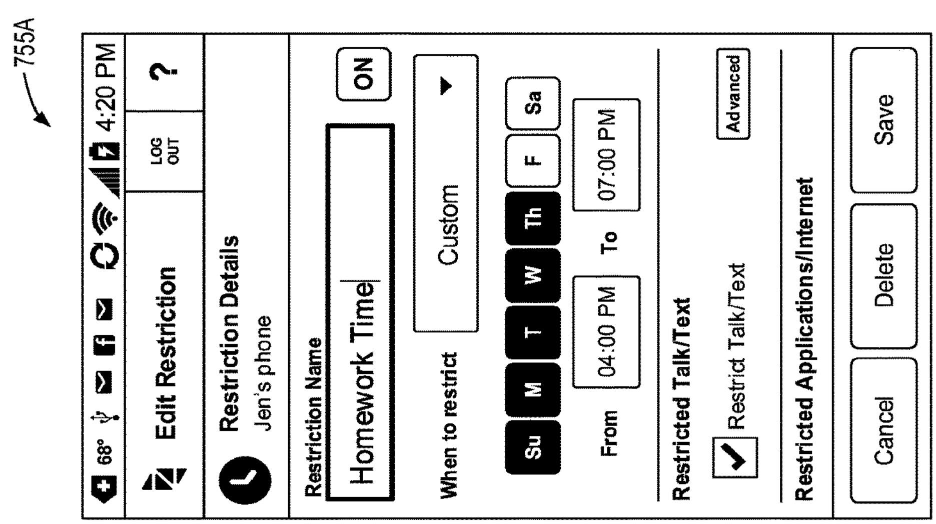
Figure 86:
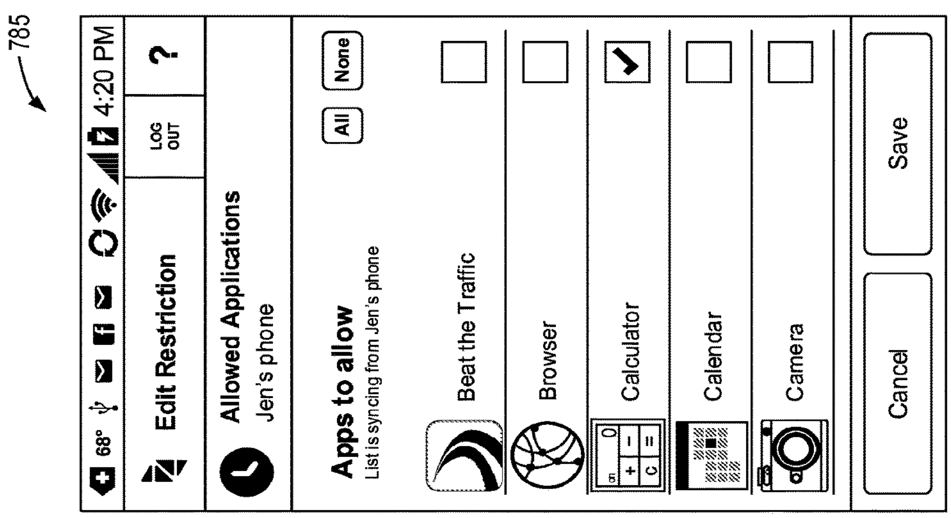
FIG. 86 illustrates a display screen presented through a touch-screen display of a wireless end-user device, in accordance with an exemplary embodiment, to allow a user to specify applications that are exceptions to a restriction (i.e., applications that are allowed during the restriction).

If the user now selects "Edit" button 831 of screen 824 in FIG. 84, the one or more device agents cause screen 755A, illustrated in FIG. 85A, to be presented. As described in the context of previous figures, the user can now reconfigure the restriction "Homework Time" for Jen's phone. As illustrated in FIG. 85B, which shows the rest of screen 755, the user has elected to restrict applications on Jen's phone, and button 832, labeled "Advanced" appears on screen 755B, which, in the exemplary embodiment, enables the user to select particular applications and/or device functions that may be used on Jen's phone while the restriction "Homework Time" is in effect. FIG. 86 illustrates screen 785, which is presented by the one or more device agents if the user selects button 832 of FIG. 85B. As described in the context of FIGS. 68A through 68C, the user can select and deselect applications and device functions that are allowed during the restriction being configured. In the example of FIG. 86, the user has chosen to allow use of the calculator on Jen's phone during the restriction "Homework Time."

Figure 87:
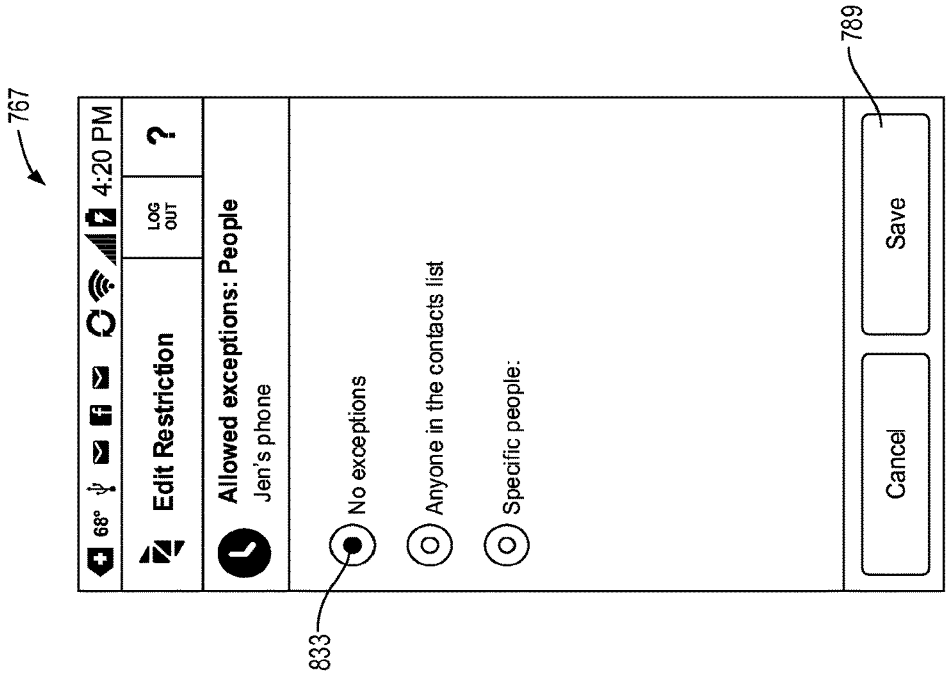
FIG. 87 illustrates a display screen presented through a touch-screen display of a wireless end-user device, in accordance with an exemplary embodiment, allowing a user to specify whether any people are allowed to call the device or be called from the device during the times that the restriction being configured is in effect (i.e., “on”).
Figure 88:
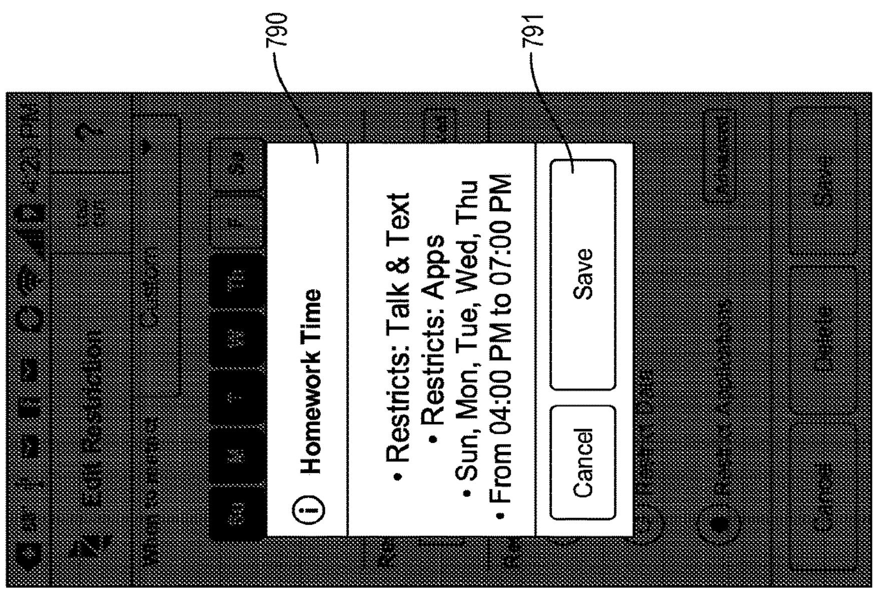
FIG. 88 illustrates a pop-up window/message presented through a touch-screen display of a wireless end-user device, in accordance with an exemplary embodiment, summarizing a restriction being configured and allowing the user to save the restriction or cancel creation of the restriction.

If the user selects button 766, labeled "Advanced," of screen 755B in FIG. 85B, the one or more device agents cause screen 767 to be presented through the device UI. The user can select a radio button to specify whether anyone can place calls to, receive calls from, send text messages to, or receive text messages from Jen's phone while the restriction "Homework Time" is in effect. As shown in FIG. 87, the user configuring the restriction has elected not to specify any exceptions to the ban on phone calls and texting during the restriction by selecting radio button 833. As shown in FIG. 88, after the user selects "Save" button 789 in FIG. 87, the one or more device agents cause pop-up 790 to be presented through the UI of the device on which the restriction on Jen's phone is being configured (in the case of the exemplary embodiment, the UI of Krista's device). If the user selects "Save" button 791 of FIG. 88, the restriction will be saved and applied to Jen's device.

FIGS. 89 through 94 provide another example of a user with authority setting a restriction for one device in the group from another device in the group. In this example, the user sets a restriction on Jen's phone from Lucy's phone. In the exemplary embodiment shown in screen 706 of FIG. 89, it is clear at a glance that Lucy's phone has account control, as indicated by the presence of crown icon 709 in association with the information about Lucy's phone. FIGS. 90A and 90B illustrate screen 833 (the uppermost portion of screen 833, denoted as screen 833A, is illustrated in FIG. 90A, and the lowermost portion of screen 833, denoted as screen 833B, is illustrated in FIG. 90B). Screen 833 provides information about Lucy's phone in same manner as screen 1715 for Krista's phone (illustrated, e.g., in FIGS. 25A and 25B) and screen 824 for Jen's phone (illustrated, e.g., in FIG. 78). Like FIG. 89, screen 833 of FIGS. 90A and 90B indicates that Lucy's phone has account control in two ways. First, crown icon 709 is present. Second, screen 833 includes text stating that Lucy's phone can purchase and share plans, and can manage devices. As explained previously, if Lucy's phone did not have account control, a user with the appropriate level of account permissions could still set the restriction from Lucy's phone by logging in to the device group account from Lucy's phone.

Figure 90B:
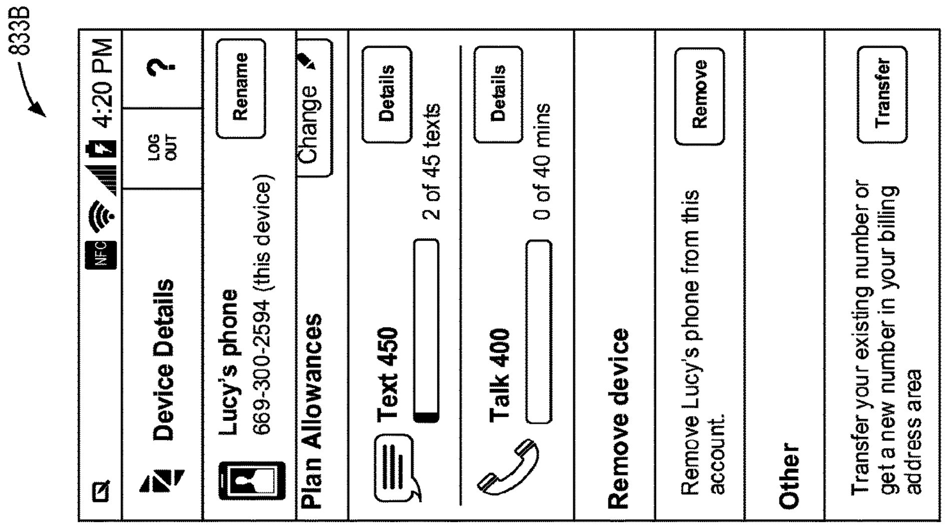
FIGS. 90A and 90B illustrate a display screen presented through a touch-screen display of a wireless end-user device, in accordance with an exemplary embodiment, providing information about the selected device.
Figure 90A:
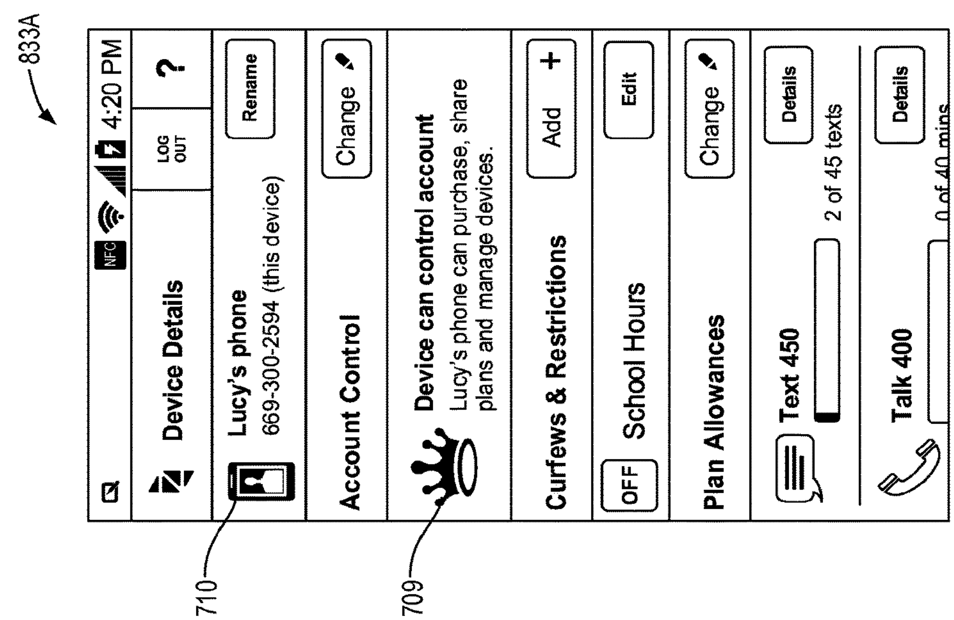

Screen 833 of FIGS. 90A and 90B also indicates that Lucy's device is associated with a restriction called "School Hours," but that the restriction is currently off. In the exemplary embodiment, the presence of large person icon 710 also indicates that Lucy's device is not currently subject to any restrictions.

Screen 833 of FIGS. 90A and 90B also shows usage information attributed to Lucy's device (discussed in more detail below).

Figure 89:
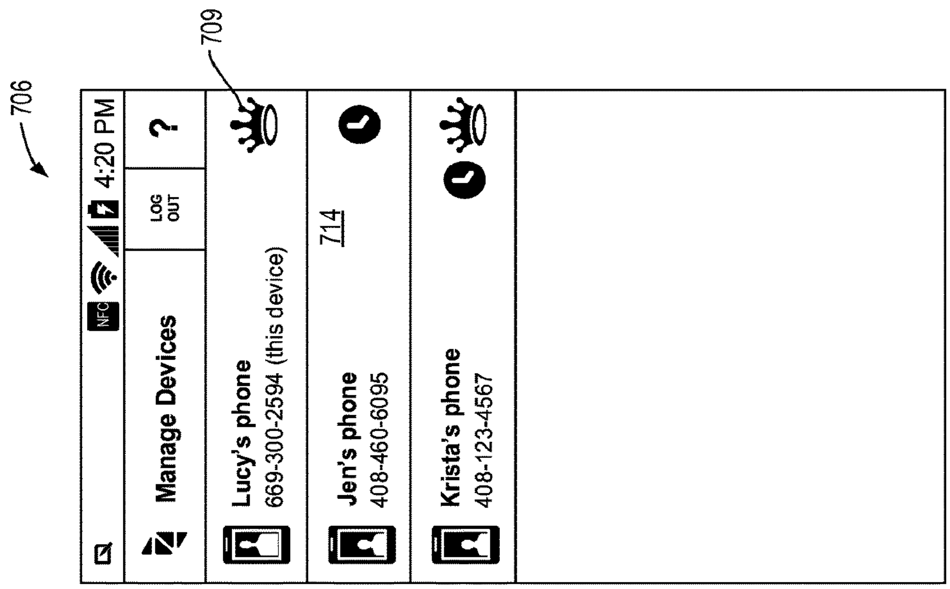
FIG. 89 illustrates a display screen presented through a touch-screen display of a wireless end-user device, in accordance with an exemplary embodiment, summarizing the devices in a device group and providing at-a-glance information regarding whether those devices have account control and whether they are subject to any restrictions.
Figure 91B:
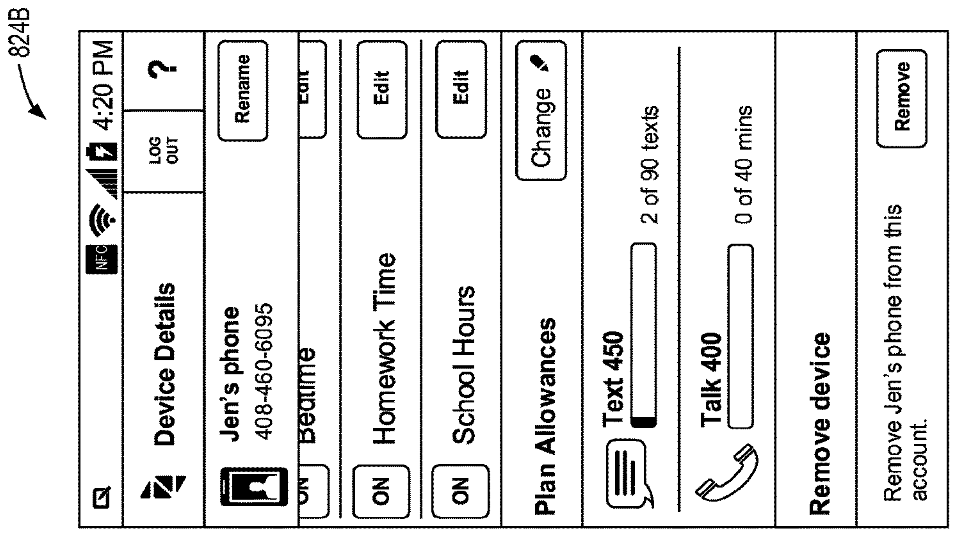
FIGS. 91A and 91B illustrate a display screen presented through a touch-screen display of a wireless end-user device, in accordance with an exemplary embodiment, providing information about the selected device.
Figure 91A:
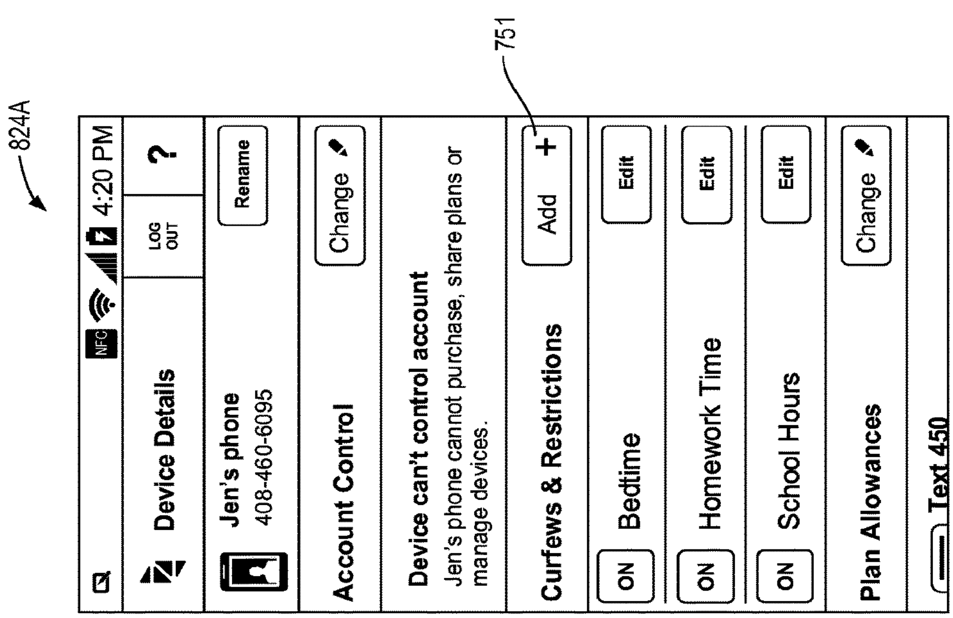
Figure 92B:
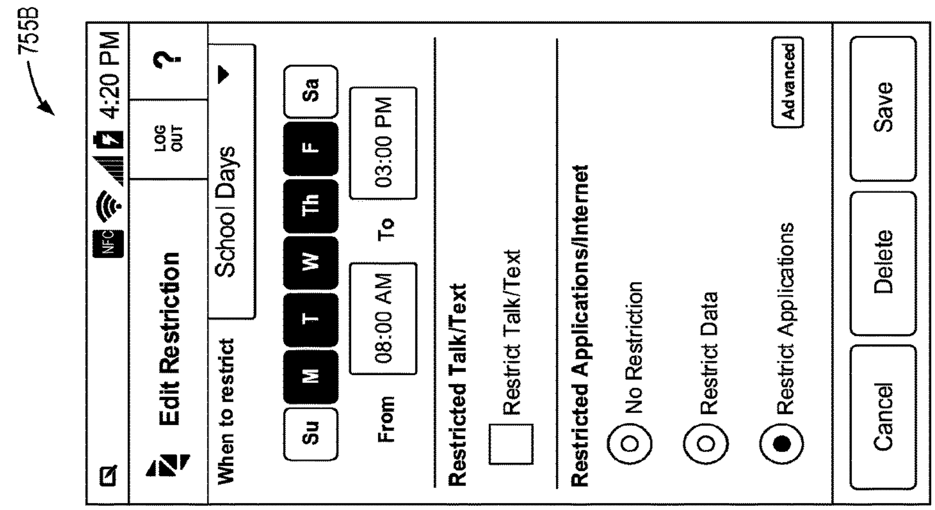
FIGS. 92A and 92B illustrate a display screen presented through a touch-screen display of a wireless end-user device, in accordance with an exemplary embodiment, to allow a user of one device to configure a restriction applicable to a selected device in the device group.
Figure 92A:
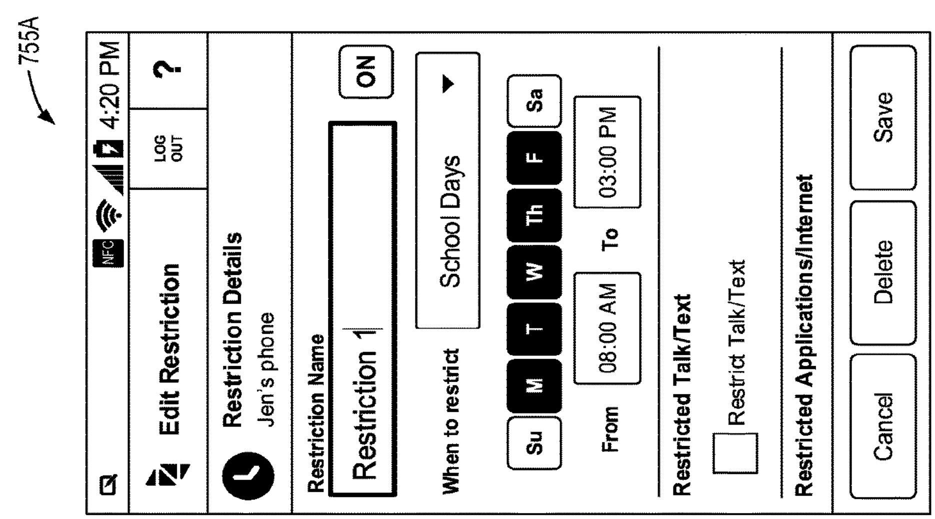

In an exemplary embodiment, if the user of Lucy's phone selects region 714 of screen 706 of FIG. 89, labeled "Jen's phone," the one or more device agents present screen 824, shown as screen 824A in FIG. 91A and screen 824B in FIG. 91B. As shown by FIG. 91A, Jen's phone is already subject to three active (i.e., "ON") restrictions: "Bedtime," "Homework Time," and "School Hours." The user of Lucy's phone can add another restriction by selecting "Add" button 751, shown in FIG. 91A. FIGS. 92A and 92B illustrate that the user of Lucy's device is adding a restriction that applies to applications on Jen's device. Because the user is setting the restriction on Jen's device from Lucy's device, the one or more device agents need to obtain information about (e.g., a list, a classification, summary, report, select set) the applications that are currently on Jen's device. Consequently, as discussed above, in some embodiments, the one or more device agents present a notification to inform the user that a list of applications on Jen's phone will be obtained. In an exemplary embodiment, the one or more device agents present pop-up notification 834, illustrated in FIG. 93, to inform the user that the list of applications from Jen's phone will by synchronized with the server (e.g., a network element such as a service controller 122, cloud server, network server, etc.), and that after the synchronization process completes, the user will be able to see the list of applications that are on Jen's phone and can select applications and device functions that the user of Jen's phone may use when the restriction being configured is in force (i.e., establish which applications are white-listed). If the user of Lucy's phone approves the collection of the list of applications from Jen's phone, the user selects "OK" button 835 in FIG. 93. In response, in some embodiments, the one or more device agents indicate to service controller 122 that the list of applications from Jen's phone is needed.

In some embodiments, service controller 122 obtains the list of applications from one or more device agents on Jen's phone. In some embodiments, the one or more device agents on Jen's phone send the list in response to a request from service controller 122, possibly over service control link 1653, which may be secure. In some embodiments, service controller 122 performs a verification of the list of applications from Jen's phone. In some embodiments, service controller 122 determines whether the applications are in fact the applications that they purport to be.

Figure 94:
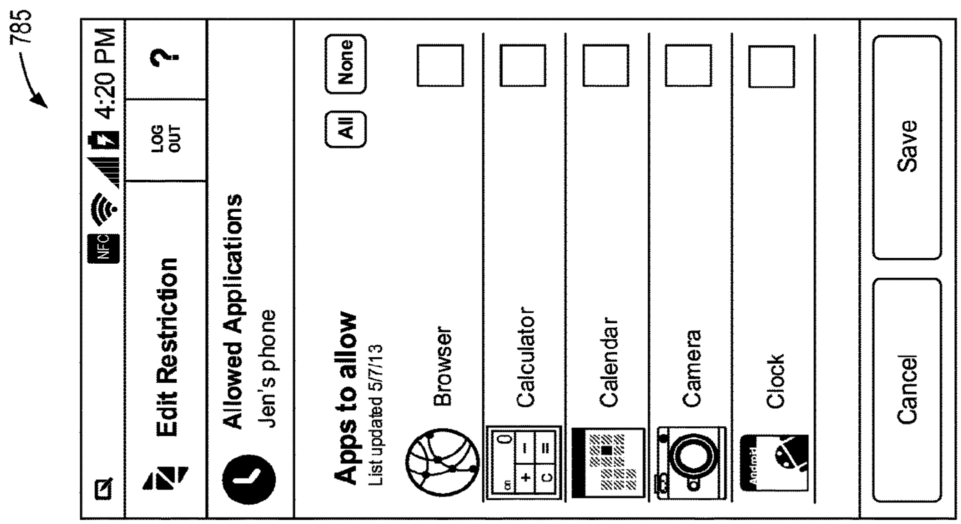
FIG. 94 illustrates a display screen presented through a touch-screen display of a wireless end-user device, in accordance with an exemplary embodiment, to allow a user to select applications and device functions that may be used/accessed during the restriction being configured.
Figure 93:
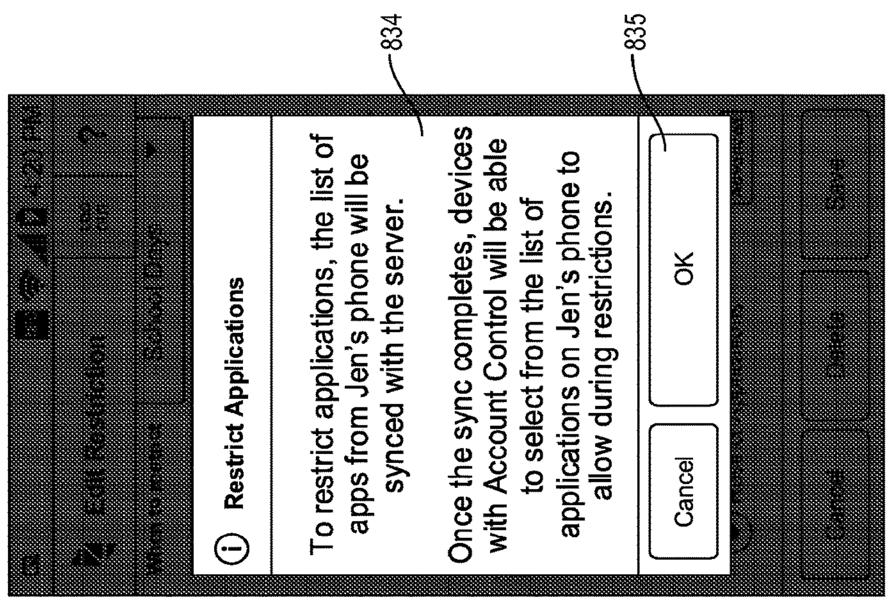
FIG. 93 illustrates a pop-up window/message presented through a touch-screen display of a wireless end-user device, in accordance with an exemplary embodiment, informing a user that the list of applications from the device for which the restriction is being configured will be synchronized with a server, and that after the synchronization process completes, the user will be able to specify applications and device functions that are excepted from the restriction being configured.

After service controller 122 has obtained and verified the list of applications on the device to be restricted, service controller 122 sends the list of applications to the device through which the restriction is being configured (in the example being discussed, Lucy's phone). In the exemplary embodiment, the one or more device agents on Lucy's phone present the list of applications to the user to enable the user to select which applications to block or restrict or which applications to allow. FIG. 94 presents an exemplary embodiment of screen 785, which enables the user of Lucy's device to select which applications and/or device functions on Jen's phone to allow during the restriction and which applications to block during the restriction.

It is to be appreciated that although the foregoing description focused on setting restrictions for a device in the group from another device in the group, a user with the appropriate level of authority can also configure restrictions by logging into a web site or by using a service processor (e.g., an application program) on a device that is not part of the device group.

Moreover, it is understood that a classification or category of applications on a device could be restricted without obtaining a list. For example, it is possible using the disclosures herein to restrict or block all applications, or all applications with network access, or all applications with a particular rating (e.g., PG7), or all streaming applications, or all social networking applications, etc. It is also possible to restrict a category or classification of applications based on a parameter, such as a network type (e.g., block all streaming applications when the device is connected to a roaming network), a location (e.g., block all social networking applications when the device is at school), or a combination of parameters. Such combinations and hybrid approaches are contemplated and are within the scope of the disclosure herein.

Effect of Restriction on Restricted Device

Figure 95:
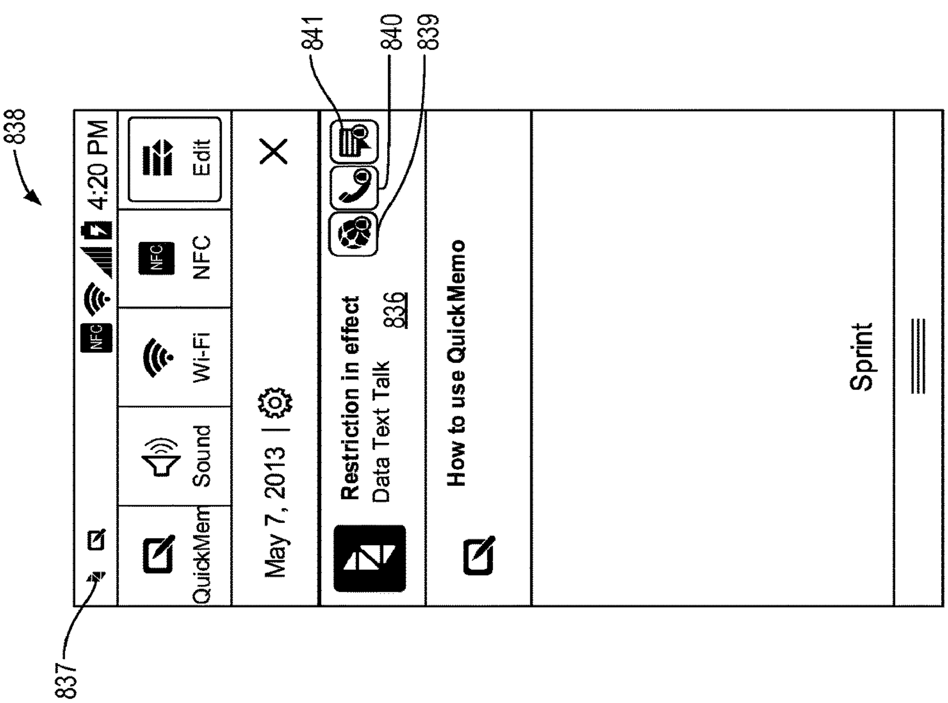
FIG. 95 illustrates a display screen presented through a touch-screen display of a wireless end-user device, in accordance with an exemplary embodiment, providing exemplary indicators to inform a user that one or more restrictions are in place and the nature of the restriction(s).

After a restriction has been placed on a device (i.e., has been configured and, in the exemplary embodiment, is "ON"), and account control has been removed (if applicable), the restriction affects the operation of the restricted device during the specified times when the restriction is in force. In some embodiments, the one or more device agents provide indicia on the display of the restricted device to indicate that a restriction is in effect. FIG. 95 illustrates exemplary indicators that may presented, in some embodiments, to inform a user of a restricted device that a restriction is in place. In the embodiment illustrated in FIG. 95, the one or more device agents cause icon 837 to be presented in the "Notifications" region of screen 838 (i.e., in the upper left portion of the display). If the user then expands the notifications, whether by swiping downward on the display or in some other manner, the exemplary embodiment provides notification message 836, which informs the user that a restriction is in effect. In the embodiment of FIG. 95, notification message 836 indicates through icons 839, 840, and 841, respectively, that the restriction affects data, telephony, and messaging. In some embodiments, tapping on notification message 836 causes the one or more device agents to present details about the restriction in effect (e.g., which services are available, which are restricted, etc.).

Figure 96:
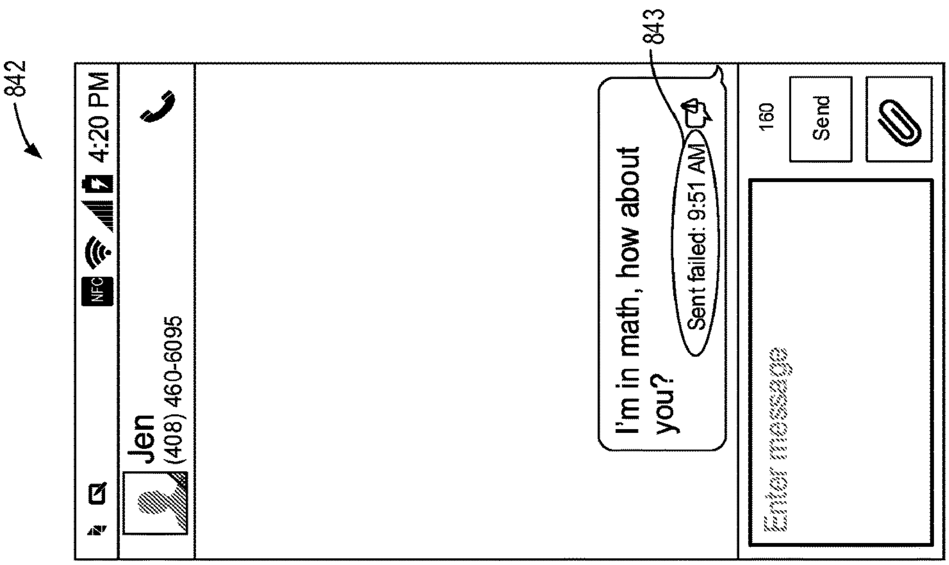
FIG. 96 illustrates a display screen presented through a touch-screen display of a wireless end-user device, in accordance with an exemplary embodiment, when a user of a device subject to a restriction attempts a usage activity that is barred by the restriction.
Figure 97:
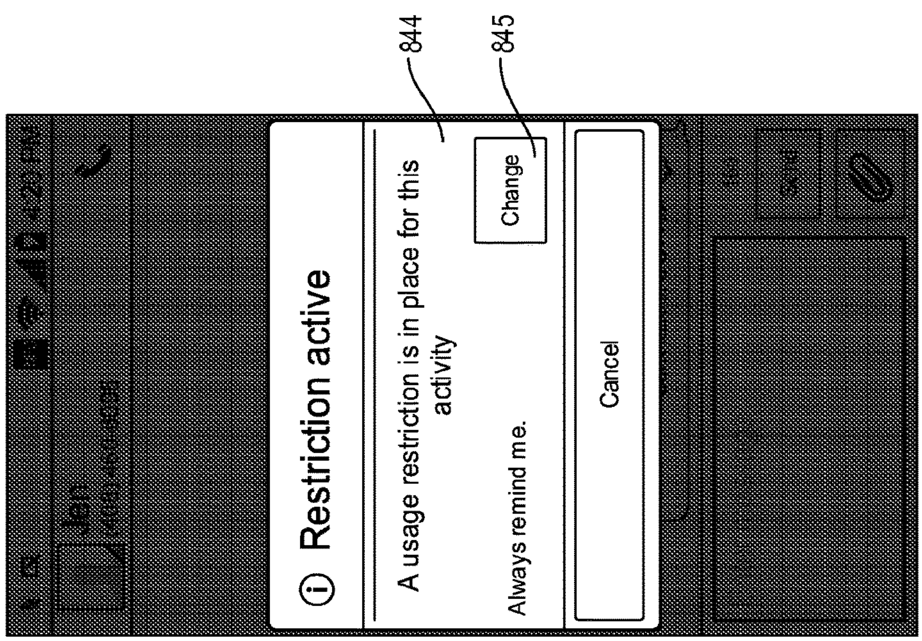
FIG. 97 illustrates a pop-up window/message presented through a touch-screen display of a wireless end-user device, in accordance with an exemplary embodiment, to inform a user of a device that a usage restriction is in place for the attempted activity.

When a restriction is in place, the user of the restricted device is prevented from using the restricted services, functions, or applications. For example, if the restriction in place prevents text messaging, the one or more device agents prevent the device from sending text messages. (It is to be understood that the phrase "text messaging" may include not only short message service (SMS) messages, but also, in some embodiments, multimedia message service (MMS) messages, instant messages (IM), and any other kind of messages supported by messaging applications on the device.) FIG. 96 illustrates an example in accordance with some embodiments. In this example, Lucy's phone is subject to a restriction that prevents text messaging between 9:00 A.M. and 3:00 P.M. If Lucy attempts to send a text message to Jen's phone at 9:51 A.M., the text message fails, as shown by status 843 ("Sent failed") in screen 842 of FIG. 96. In some embodiments, the one or more device agents present a notification to inform the user that the attempted activity was not successful because there is a restriction in place. FIG. 97 presents an exemplary embodiment in which the one or more device agents, upon detecting that Lucy's phone attempted to send a text message, present pop-up message 844, which informs the user that a usage restriction is in place for texting.

Figure 98:
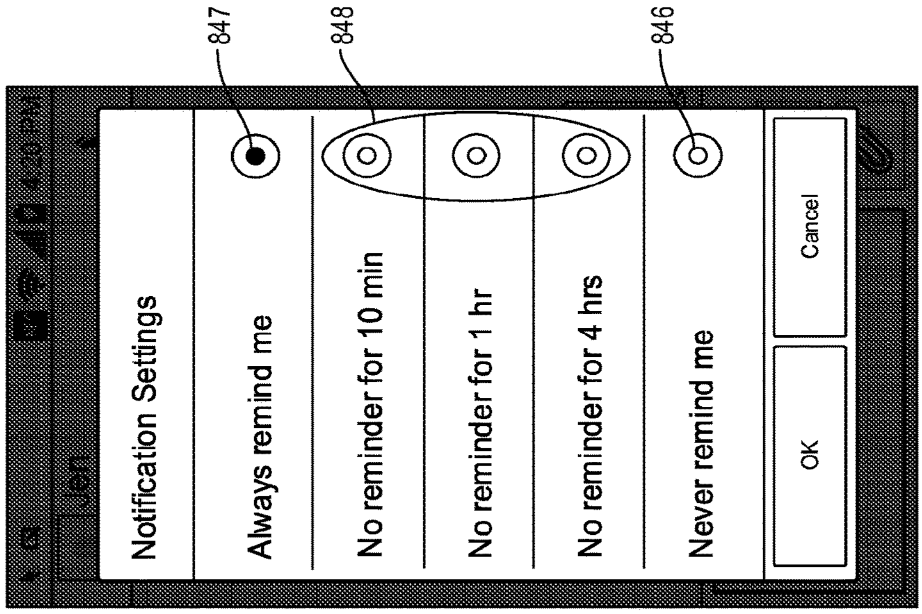
FIG. 98 illustrates a pop-up window/message presented through a touch-screen display of a wireless end-user device, in accordance with an exemplary embodiment, enabling a user to establish notification settings associated with a restriction.

In some embodiments, the one or more device agents provide the user with an option to suppress or otherwise customize notification messages about restricted activities. In some embodiments, the user can specify permanent suppression or temporary suppression. In an exemplary embodiment, the user can select "Change" button 845 of pop-up message 844 in FIG. 97 to customize notification messages about restricted activities. In an exemplary embodiment, illustrated by FIG. 98, the one or more device agents allow the user to suppress all notifications associated with the attempted, but unsuccessful, activity (in this case, text messaging) by selecting radio button 846 ("Never remind me"); to suppress none of the notifications associated with the attempted, but unsuccessful, activity by selecting radio button 847 ("Always remind me," shown as selected); or to suppress notifications associated with the attempted, but unsuccessful, activity for a particular period of time by selecting one of radio buttons 848 ("No reminder for {10 min, 1 hr, 4 hrs}"). Thus, the user can control whether and how often she is reminded that a particular activity is subject to a restriction.

In some embodiments, when application usage or usage of a device function is restricted, the one or more device agents prevent the restricted application or device function from launching. In some embodiments, the one or more device agents prevent the launching of restricted applications or device functions based on a control policy obtained from service controller 122 or from another device in the device group. In some embodiments, the restricted applications are hidden from the user (e.g., the icons that would otherwise launch those applications are hidden or suppressed). In some embodiments, the launch icons of the restricted applications are visible but include an indication that the application is restricted (e.g., is shown with a badge, an "X," a smaller icon, a greyed-out icon, a transparent or translucent icon, in a different tray, etc.). In some embodiments, the launch icons of the restricted applications are visible, but when a user attempts to launch a restricted application, the one or more device agents terminate, prevent, or abort the launch. In some embodiments (e.g., embodiments in which the device is an Android device), the one or more device agents monitor and intercept intents, and, based on the detected intents, prevent restricted applications from launching. In some embodiments in which the one or more device agents terminate, prevent, or abort the launch, the one or more device agents provide a notification message to the user to explain why the launch was terminated, prevented, or aborted. In some embodiments, when the one or more device agents prevent a restricted application from launching, executing, or running, the one or more device agents present a notification message through a device user interface to inform the user that the application usage is restricted. In some embodiments, the notification is a pop-up message. In some embodiments, the notification is audible.

In some embodiments a device is allowed to communication with emergency contacts, persons, numbers, etc., even when a restriction would otherwise prevent communication (e.g., calls to 911 are allowed even if a restriction that prevents use of voice service has no enumerated exceptions). In some embodiments, the contacts, persons, numbers with whom/which the restricted device is allowed to communicate during a restriction are specified by a white list.

Configuring Geo-Fencing, Geo-Check-in, and Geo-Beacons

In some embodiments, one or more device agents on a second device obtain a user input through a user interface of the second device, where the user input comprises an indication that the user wishes to receive a notification to inform the user that a first device is within (or outside) of a geographical region specified by the user. In some embodiments, the one or more device agents on the second device present, through the user interface, a map enabling the user to specify the geographical region. In some embodiments, the user can draw or otherwise indicate the geographical region on the map. In some embodiments, the user can specify an address and radius (e.g., 50 miles from 123 Main St, AnyTown, CA, 12345). In some embodiments, the one or more device agents on the second device also enable the user to specify one or more aspects of the notification to be sent when the first device is within (or outside of) the geographical region. In some embodiments, the one or more aspects include whether the notification is visual or audible, whether the notification is a pop-up, the timing or frequency of notifications, etc. In some embodiments, the user input is obtained from (1) a device in the device group with account control, (2) a device in the device group without account control into which an account administrator or other authorized user has logged in, (3) a device that is not in the device group but that has a service processor (e.g., an application program) installed to enable management of the device group, or (4) a website.

In some embodiments, the one or more device agents on the second device obtain a user input through a user interface of the second device, where the user input comprises an indication that the user wishes to receive a notification to inform the user that a first device has not arrived (or has arrived) at a specified location within a specified time frame. For example, the notification could be triggered if the first device, used by a child, has not arrived at a specified location (e.g., home) within 30 minutes of when classes ended. As another example, the notification could be triggered if the first device, used by a child, has not reported that it is at school when the child is supposed to be at school. In some embodiments, the user input is obtained from (1) a device in the device group with account control, (2) a device in the device group without account control into which an account administrator has logged in, (3) a device that is not in the device group but that has a service processor (e.g., an application program) installed to enable management of the device group, or (4) a website.

In some embodiments, one or more device agents on the first device periodically (or when requested) send a notification to service controller 122 or to one or more device agents on a second device to report the location of the first device. In some embodiments, the one or more device agents on the first device are directed to send the notification to the one or more device agents on the second device based on a user input from (1) a device in the device group with account control, (2) a device in the device group without account control into which an account administrator has logged in, (3) a device that is not in the device group but that has a service processor (e.g., an application program) installed to enable management of the device group, or (4) a website.

Plan Management, Sharing, and Allowances

In some embodiments, a user with an appropriate level of authority (whether obtained because the device has an appropriate level of account control, or because the user is able to log in to the device group account (from a device in the device group, from a device not within the device group, or from a website) and the user herself has an appropriate level of account control) can select, modify, and share service plans providing for voice, text, data, applications, transactions, or combinations of these and any other services accessible to the device group. In some embodiments, the user of a device in the device group can view plan allowances allocated to the device by a device group administrator, and also view the device's usage of the allocated amount. In some embodiments, a user with an appropriate level of authority can establish allowances for some or all of the devices in the device group. In some embodiments, a user with the appropriate level of authority can view usage of plan allowances by devices in the device group.

In some embodiments, one or more device agents on a first device present, through a user interface of the first device, a notification when usage of a particular service category by the first device, or by another device in the device group, reaches a threshold (e.g., an allowance). In some embodiments, the particular service category is one of voice minutes, text messages, data usage, or application usage (e.g., Facebook for 30 minutes). In some embodiments, the notification provides configuration options enabling a user of the first device to increase a usage allowance for the particular service category. In some embodiments, the notification provides configuration options enabling a user of the first device to modify (i.e., increase or decrease) usage allowances for the particular service category or for another service category for one or more devices in the device group.

In some embodiments, the one or more device agents on the first device assist in implementing the increased usage allowance or the modified usage allowance by sending a message to service controller 122, where the message provides information about the requested change. In some embodiments in which the change in an allowance applies to the first device, the one or more device agents on the first device assist in implementing the increased usage allowance or the modified usage allowance by modifying a setting or configuration of the first device in a manner that supports the change in the allowance. In some embodiments in which the change in an allowance applies to another device in the device group, the one or more device agents on the first device assist in implementing the increased usage allowance or the modified usage allowance by providing information about the change in the allowance to service controller 122 or to the affected device. In some embodiments, the threshold (e.g., usage allowance) is pre-configured by the one or more device agents on the first device. In some embodiments, the one or more device agents obtain the threshold from service controller 122 (or another network element). In some embodiments, the one or more device agents obtain the threshold from a user through a user interface of the first device.

In some embodiments, the notification indicates that no additional usage of the particular service category is available under a current state of the affected device (i.e., the first device or another device in the device group). In some embodiments, the notification indicates that a service plan providing for usage of the particular service category has been exhausted or has expired. In some embodiments, the notification indicates a percentage or an amount of usage of the particular service category that is still available or that has been used by the first device or by another device in the device group. In some embodiments, the notification is presented through a display of the first device. In some embodiments, the notification is an audible notification presented through a speaker of the first device (e.g., "You have two minutes remaining of your voice plan"). In some embodiments, the notification comprises an actionable button or selection object that, when selected by the user, provides the user with an option to adjust the allowance, to purchase a service plan, or to set or modify a notification preference (e.g., "Don't remind me again," "Don't remind me for 1 hour," etc.).

In some embodiments, the notification is presented through a display of the first device, and the display provides one or more user interface constructs enabling the user to adjust one or more allowances applicable to one or more devices in the device group. In some embodiments, the one or more user interface constructs include a rotating wheel, a slider, a checkerboard, a numeric entry field, a radio button, or another button. In some embodiments, the notification presents one or more objects with at least one characteristic that indicates the size of the allowance or the amount or percentage of the allowance that has been used or is remaining. In some embodiments, the at least one characteristic is the size of the object (e.g., small, medium, large, etc.), a gauge indicating "fullness" (i.e., a fuel tank showing Empty to Full), an object fill (e.g., a pie chart, a circle, a tank, a gauge, a bar, a drinking glass), how many objects are shown (e.g., five objects means 50 MB, 3 objects means 30 MB, etc.), a bar height or length, a color, or any other characteristic that assists the user to determine the size of the allowance or the amount or percentage of the allowance that has been used or is remaining. In some embodiments, the one or more user interface constructs include a first type of indicator for a first service category and a second type of indicator for a second service category.

In some embodiments, the one or more device agents on the second device present a notification through a user interface of the second device. In some embodiments, the notification provides an option for the user of the second device to increase the usage allowance, purchase additional service for the first device, or otherwise change an aspect of service usage that is available to the first device. In some embodiments, the notification is the result of a user of the first device interacting with one or more device agents on the first device to request the usage allowance increase or another modification to allow the first device to access additional service. In some embodiments, the notification is the result of the one or more device agents on the first device detecting, without user intervention or assistance, that the usage allowance or another usage threshold is approaching or has been met or exceeded. In some embodiments, the notification is triggered by service controller 122 sending information to the second device, where the information informs the one or more device agents on the second device of the need or desire or request to change the allowance for the first device or provide an additional or different allowance to the first device. In some embodiments, the notification is based on a service plan setting. In some embodiments, the notification is based on one or more user settings. In some embodiments, the notification is generated or triggered by the one or more device agents on the first device. In some embodiments, the one or more device agents on the first device generate or trigger the notification based on a service plan setting or based on a user setting (or based on both). In some embodiments, the notification is generated or triggered by the one or more device agents on the second device. In some embodiments, the one or more device agents on the second device generate or trigger the notification based on a service plan setting or based on a user setting (or based on both).

In some embodiments in which a user of a second device is able to set or modify an allowance allocated to a first device in the group (or a user of a device that is not part of the device group is able to set or modify the allowance for the first device), the one or more device agents on the second device receive an indication, from service controller 122 or from the one or more agents on the first device, that the usage allowance is nearing exhaustion or has been exhausted.

In some embodiments, a user of a second device sets or modifies an allowance for a first device. In some embodiments, a user of a second device is able to set or modify an allowance allocated to a set (or subset) of other devices (for example, a set of devices associated with a second user—Jen's smartphone and Jen's tablet). In some embodiments, in response to a change in the allowance, the one or more device agents on the first device update the user interface to reflect the affected service category.

In some embodiments, a second user with an appropriate level of authority establishes an allowance that is associated with a first user. In some such embodiments, the second user also grants a level of permission to the first user that enables the first user to manage the allocation of the allowance among the second user's devices (e.g., if Jen's data allowance is 100 MB per month, Jen can be granted the authority to decide that 80 MB of the 100 MB is available to Jen's tablet, and 20 MB is available to Jen's smartphone).

In some embodiments, a device group allocation is accounted to a device in a device group that is using data over a hotspot device (and not to the hotspot device).

Figure 99:
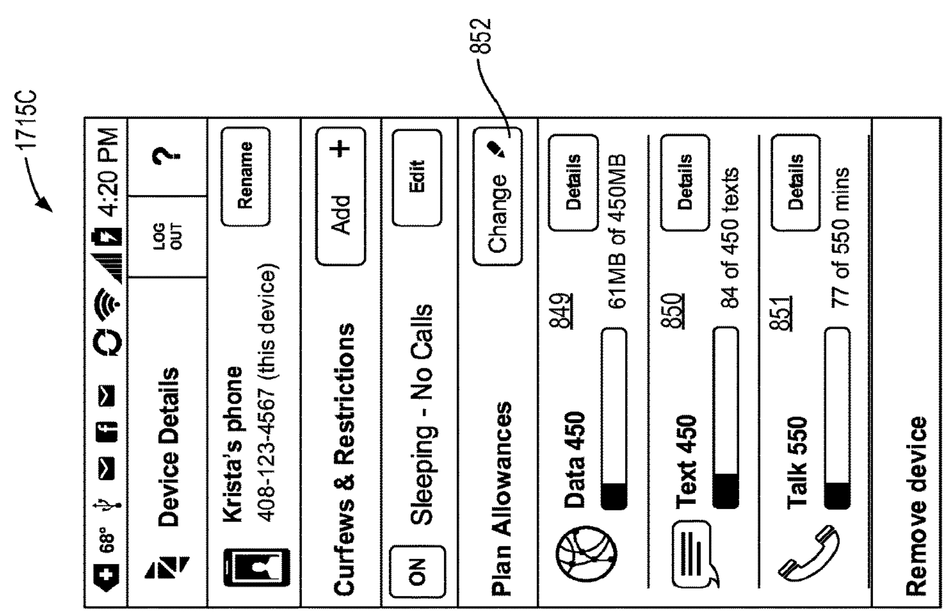
FIG. 99 illustrates a display screen presented through a touch-screen display of a wireless end-user device, in accordance with an exemplary embodiment, providing information about usage of one or more plans associated with the device.

FIG. 99 illustrates an exemplary embodiment in which usage by Krista's phone is presented, through screen 1715C, to a user of Krista's device in three categories: data, text, and talk. (Screen 1715C presents a view of the middle portion of screen 1715.) In this exemplary embodiment, usage is presented as bar charts and also as text in regions 849 (data), 850 (text), and 851 (voice). In FIG. 99, region 849 indicates that Krista's phone has used 61 MB of 450 MB available to it; region 850 indicates that Krista's phone has used 84 of 450 texts available to it; and region 851 indicates that Krista's phone has used 77 of 550 voice minutes available to it. Screen 1715C of FIG. 99 also provides information about the plans available to Krista's device. Region 849 indicates that the data plan is called "Data 450," which, in the exemplary embodiment, means that the plan provides for 450 MB of data usage. Region 850 indicates that the text plan is called "Text 450," which, in the exemplary embodiment, means that the plan provides for 450 text messages. Region 851 indicates that the voice plan is called "Talk 550," which, in the exemplary embodiment, means that the plan provides for 550 minutes of phone calls. A comparison of the plan names and the amounts available to Krista's phone reveals that Krista's phone is allowed to use all 450 MB of the available data, all 450 texts of the available text messages, and all 550 minutes of the available voice minutes.

In some embodiments, a user with an appropriate level of authority can modify plan allowances (i.e., the maximum amount or percentage of a plan available to a device) from the UI display. In some embodiments, the user has authority if the device has full control over the account. In some embodiments, the user has authority if the user logs into the account (e.g., from a device in the device group that has limited or no account control, from a device outside of the device group that has a service processor (e.g., an application program), or from a website). In the embodiment of FIG. 99, the one or more device agents cause touch-sensitive "Change" button 852 to be presented through the UI display. If the user selects "Change" button 852, the one or more device agents cause a screen, such as screen 853 shown in the exemplary embodiment of FIG. 100, to be presented. In the exemplary embodiment of FIG. 100, the user can modify the maximum amount of each service type that Krista's phone can use by selecting one or more of the touch-sensitive buttons 854, 855, and 856, each of which contains the text "No Limit" in FIG. 100.

Figure 100:
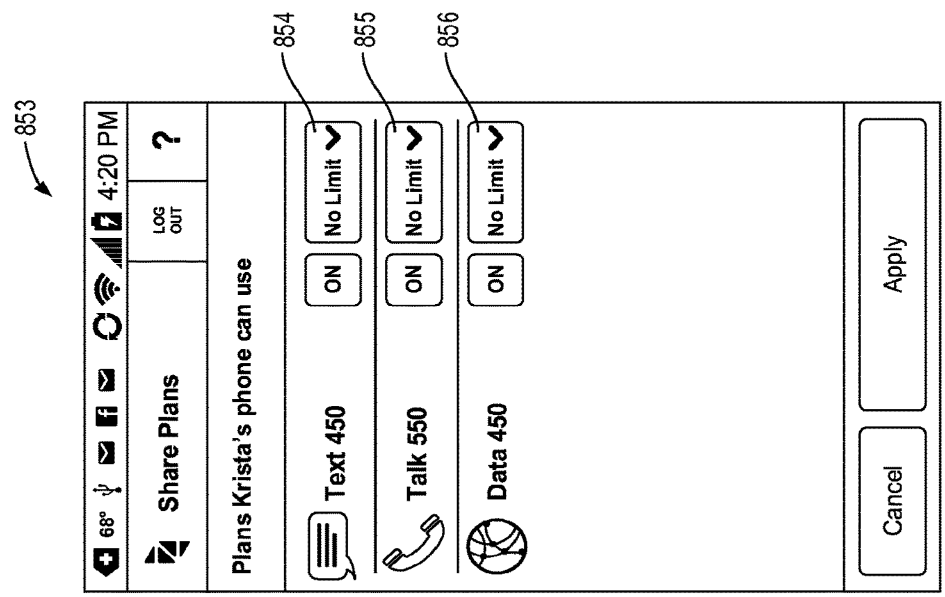
FIG. 100 illustrates a display screen presented through a touch-screen display of a wireless end-user device, in accordance with an exemplary embodiment, to enable a user to establish one or more limits on one or more service plans available to a device in the device group.
Figure 101B:
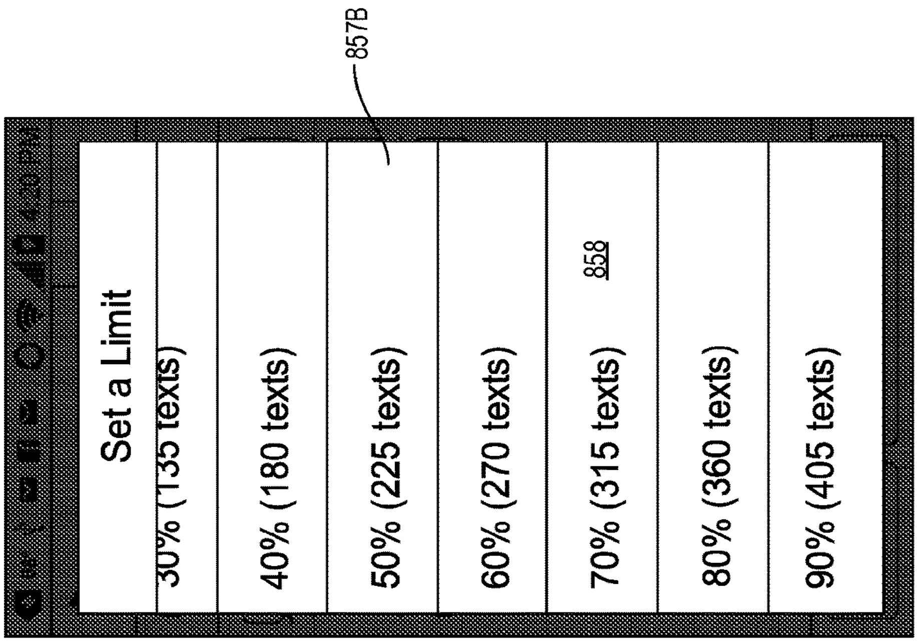
FIGS. 101A and 101B illustrate a pop-up presented through a touch-screen display of a wireless end-user device, in accordance with an exemplary embodiment, enabling a user to set a limit on a number of text messages available to a device in the device group.
Figure 101A:
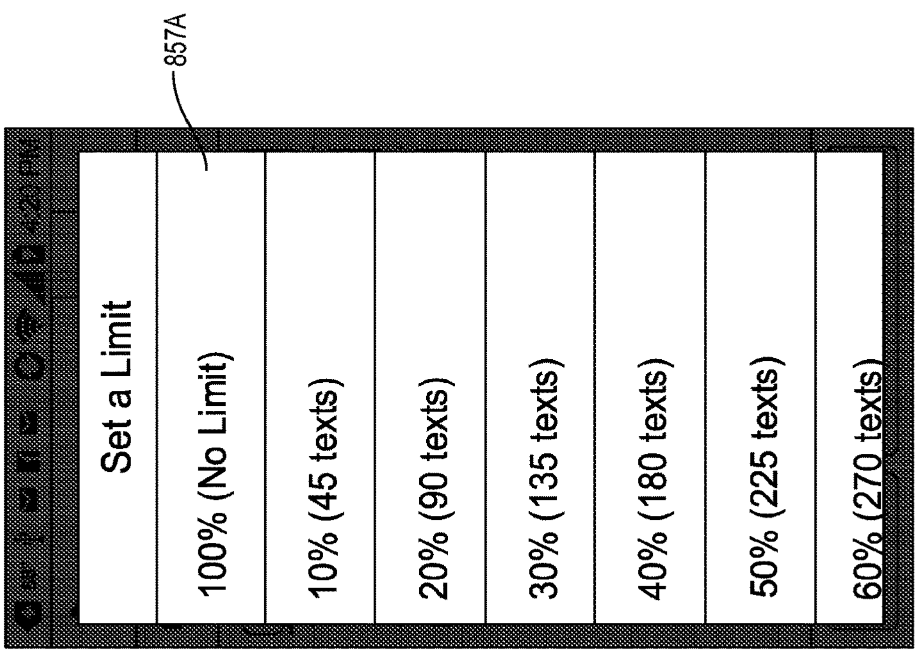
Figure 102:
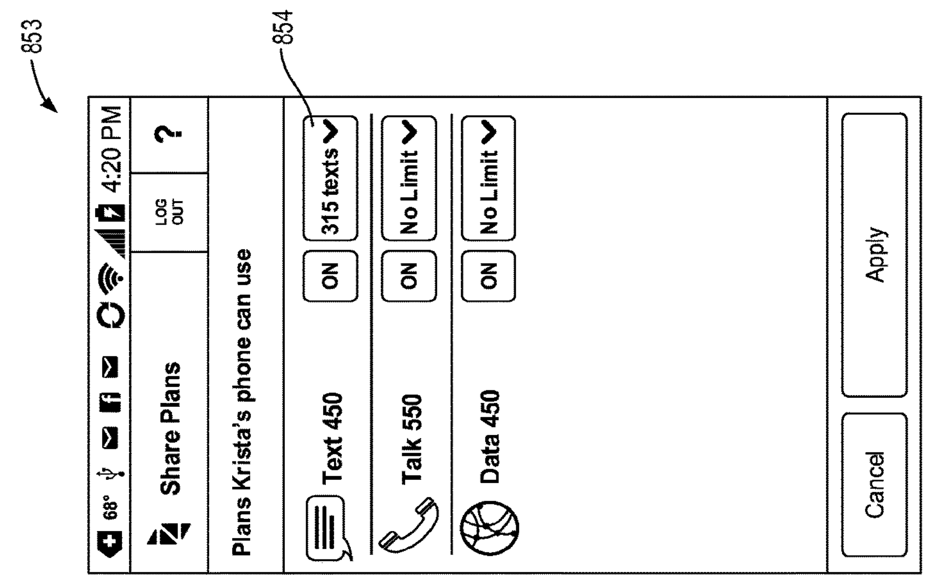
FIG. 102 illustrates a display screen presented through a touch-screen display of a wireless end-user device, in accordance with an exemplary embodiment, in which a user has set a limit of 315 text messages for one of the devices in the device group.

FIGS. 101A and 101B illustrate pop-up window 857 (the upper portion shown as 857A, the lower portion shown as 857B) that the one or more device agents on Krista's phone cause to be presented when the user selects button 854 (i.e., associated with the "Text 450" plan shown in FIG. 100). In exemplary pop-up window 857 of FIGS. 101A and 101B, the user is offered discrete percentages of the total number of text messages (i.e., 10 percent (45 texts), 20 percent (90 texts), etc.), which the user can select by touching the desired region (e.g., region 858 to select 70 percent (315 texts) of the total number of text messages available). Other percentages or numbers of text messages are, of course, possible, and it is also possible to provide different UI constructs to enable a user to choose an allowance. Such differences are contemplated and are within the scope of the disclosure herein. FIG. 102 illustrates how screen 853 of FIG. 100 changes in the exemplary embodiment when the user selects a limit of 315 text messages (or 70% of the total available under the plan). Specifically, button 854 now indicates that 315 texts are available to Krista's phone.

Figure 103A:
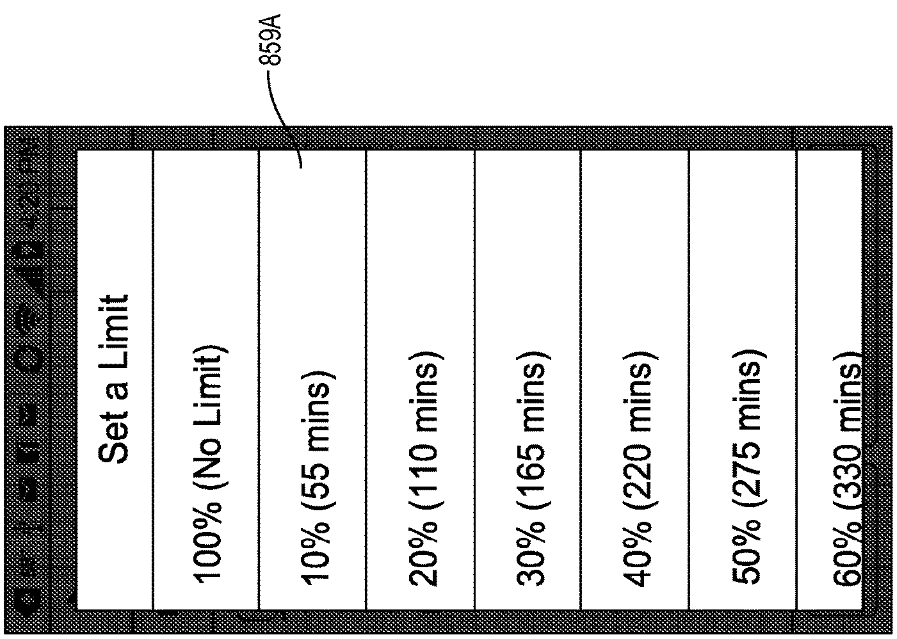
FIGS. 103A and 103B illustrate a pop-up presented through a touch-screen display of a wireless end-user device, in accordance with an exemplary embodiment, enabling a user to set a limit on a number of minutes available to a device in the device group.
Figure 103B:
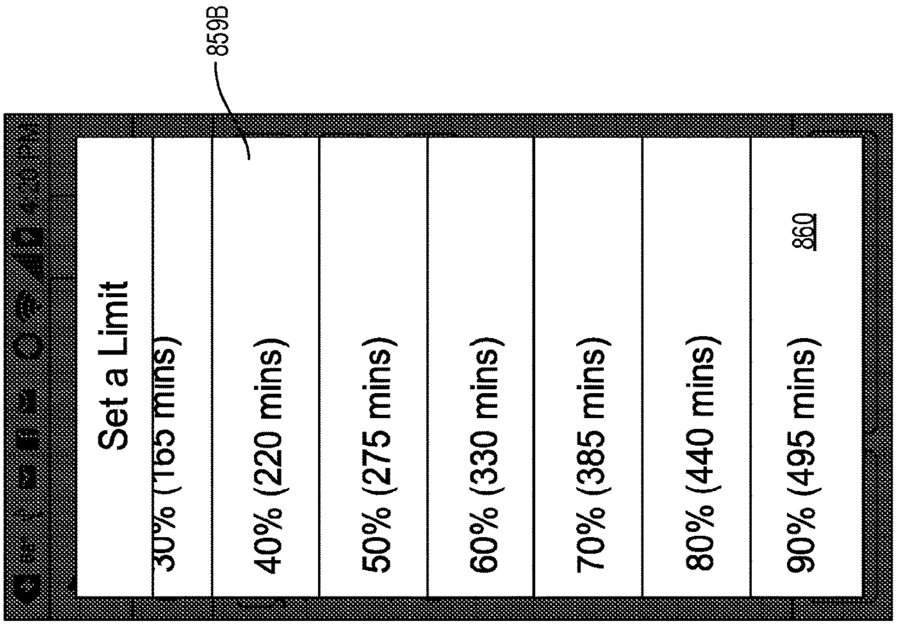
Figure 104:
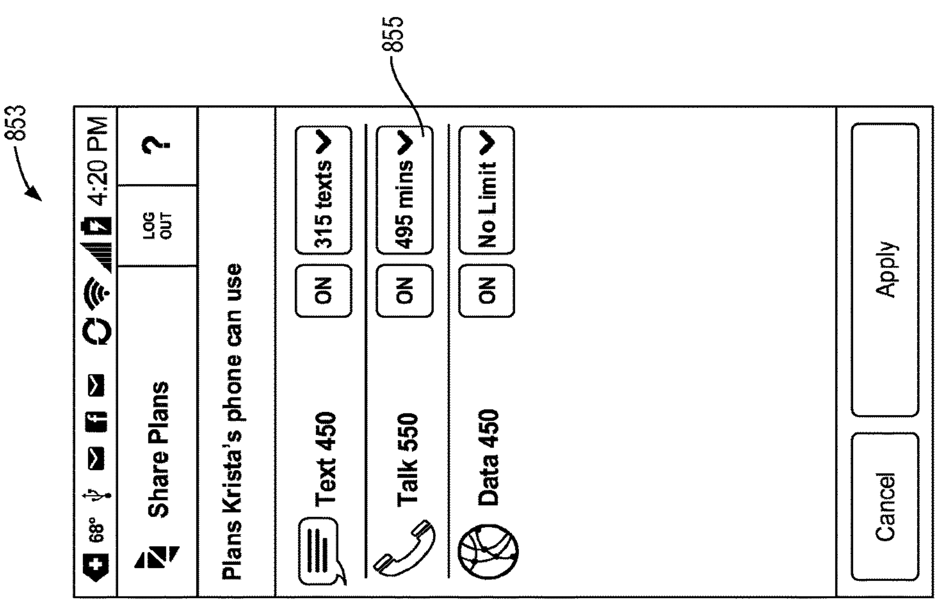
FIG. 104 illustrates a display screen presented through a touch-screen display of a wireless end-user device, in accordance with an exemplary embodiment, in which a user has set a limit of 495 minutes for one of the devices in the device group.

FIGS. 103A and 103B illustrate exemplary pop-up 859 (the upper portion shown as 859A, the lower portion shown as 859B) that is presented in the exemplary embodiment when the user selects button 855 associated with the "Talk 550" plan illustrated in FIG. 100. In the exemplary embodiment of FIGS. 103A and 103B, the user is offered discrete percentages of the total number of voice minutes (i.e., 10 percent (55 minutes), 20 percent (110 minutes), etc.). Other percentages or numbers of minutes are, of course, possible, and it is also possible to provide different UI constructs to enable a user to choose an allowance. FIG. 104 illustrates how screen 853 shown in FIG. 102 changes in the exemplary embodiment when the user selects region 860 of pop-up 859B in FIG. 103B, which sets a limit of 495 minutes (or 90% of the total available under the plan). Specifically, button 855 now indicates that 495 minutes are available to Krista's phone.

Figure 105:
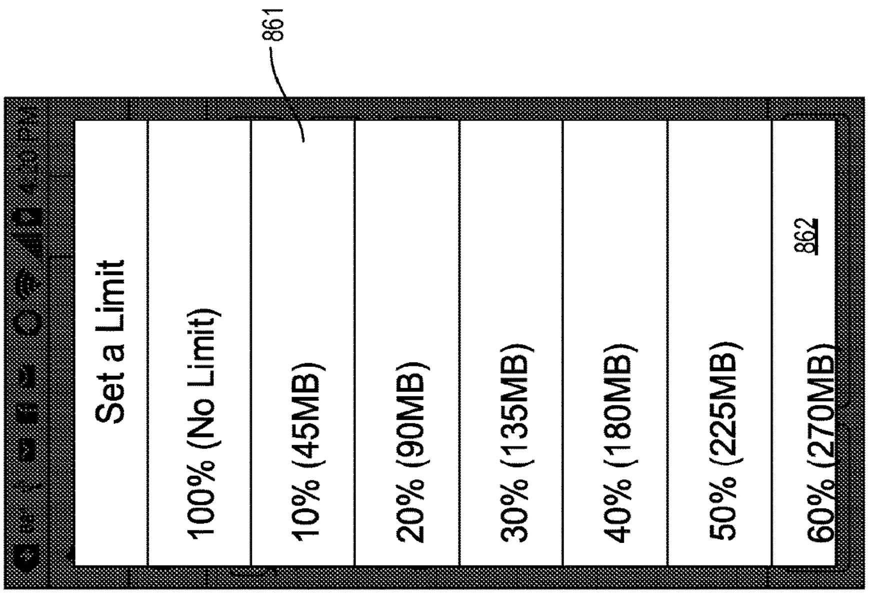
FIG. 105 illustrates a pop-up presented through a touch-screen display of a wireless end-user device, in accordance with an exemplary embodiment, enabling a user to set a limit on the number of megabytes available to a device in the device group.
Figure 106B:
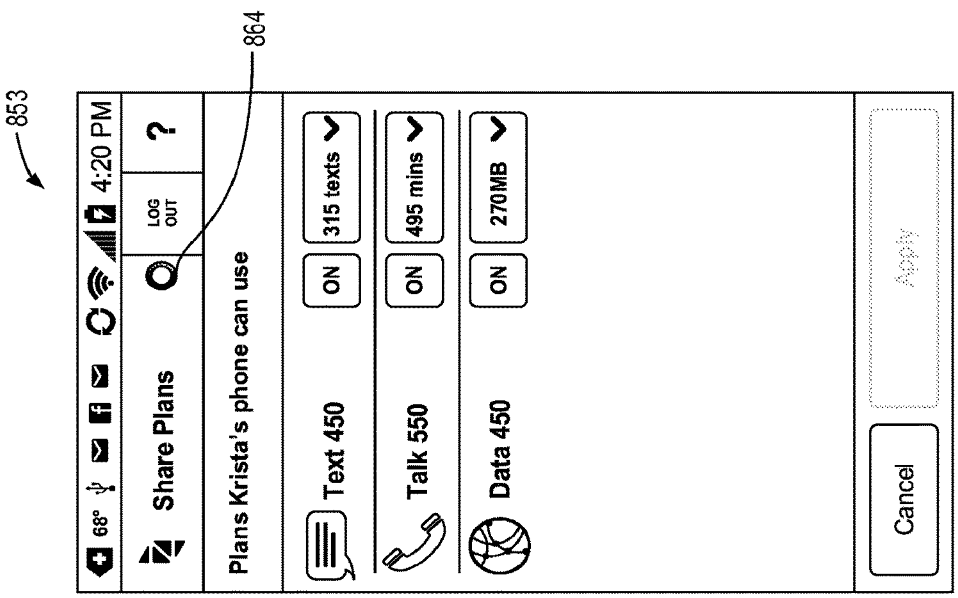
FIG. 106B illustrates a display screen presented through a touch-screen display of a wireless end-user device, in accordance with an exemplary embodiment, in response to a user selecting the “Apply” button of FIG. 106A.
Figure 106A:
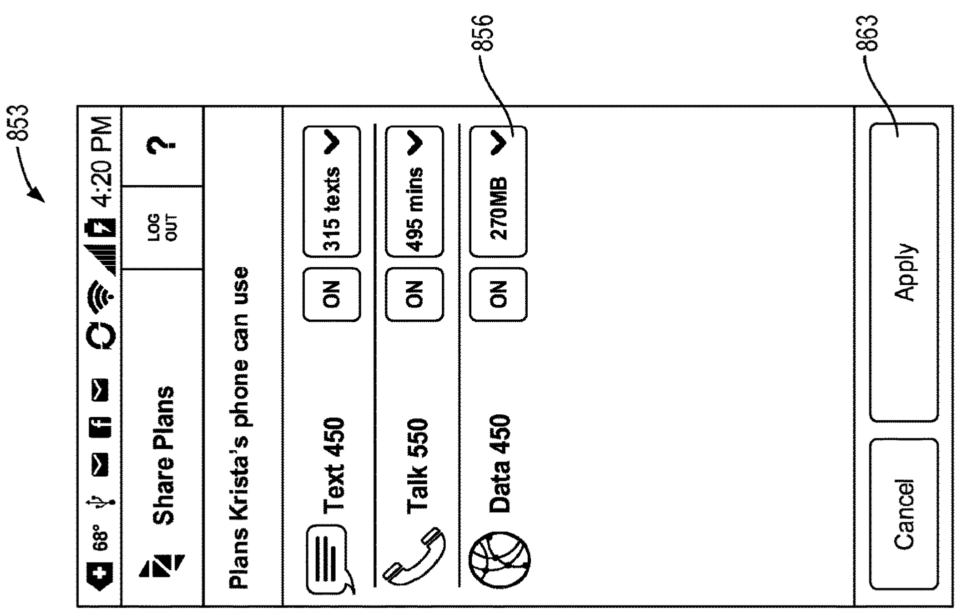
FIG. 106A illustrates a display screen presented through a touch-screen display of a wireless end-user device, in accordance with an exemplary embodiment, in which a user has set a limit of 270 MB for one of the devices in the device group.

FIG. 105 illustrates the upper portion of exemplary pop-up 861, which is presented in the exemplary embodiment when the user selects button 856 associated with the "Data 450" plan shown in FIG. 100. In the exemplary embodiment of FIG. 105, the user is offered discrete percentages of the total amount of data available (i.e., 10 percent (45 MB), 20 percent (90 MB), etc.). Other percentages or amounts of data are, of course, possible, and it is also possible to provide different UI constructs to enable a user to choose an allowance. FIG. 106A illustrates how screen 853 of FIG. 104 changes in the exemplary embodiment when the user selects region 862 of pop-up 861 in FIG. 105, which sets a limit of 270 MB (or 60% of the total available under the plan). Specifically, button 856 now indicates that 270 megabytes (MB) are available to Krista's phone. To save the new plan allowances for Krista's phone, the user selects "Apply" button 863, which causes the one or more device agents to store the new allowances and take the necessary actions (e.g., communicate the change to service controller 122;

subject to any restrictions that are in place, allow usage until the allowances have been exhausted, and then block usage after the allowances have been exhausted; etc.). FIG. 106B shows screen 853 with circular logo 864, which may be animated, that indicates that the changes to the allowances are in the process of being saved.

In some embodiments, device users can view not only usage by their devices of broad categories, but also usage broken down by source, destination, application, device function, etc. In some embodiments, usage is presented by numbers (i.e., X amount or Y percentage of a plan or allowance). In some embodiments, usage is presented through a graphical representation. In some embodiments, the graphical representation uses colors to indicate at a glance whether a device's usage is approaching a limit imposed by an allowance or a plan. In some embodiments, the color green indicates that the device's usage is not nearing a limit or is not expected to exhaust an allowance or plan limit based on previous or current usage; the color yellow indicates that the device's usage is likely to reach a limit or is expected, based on previous or current usage, to exhaust an allowance or plan limit if usage patterns continue; and the color red indicates that the device has reached a limit or is, based on previous or current usage, likely to exhaust an allowance or plan limit if usage patterns continue. In some embodiments, the one or more device agents present a graphic (e.g., a pie chart, etc.) that allows a user to determine which device functions or applications are consuming a plan allowance.

Figure 107:
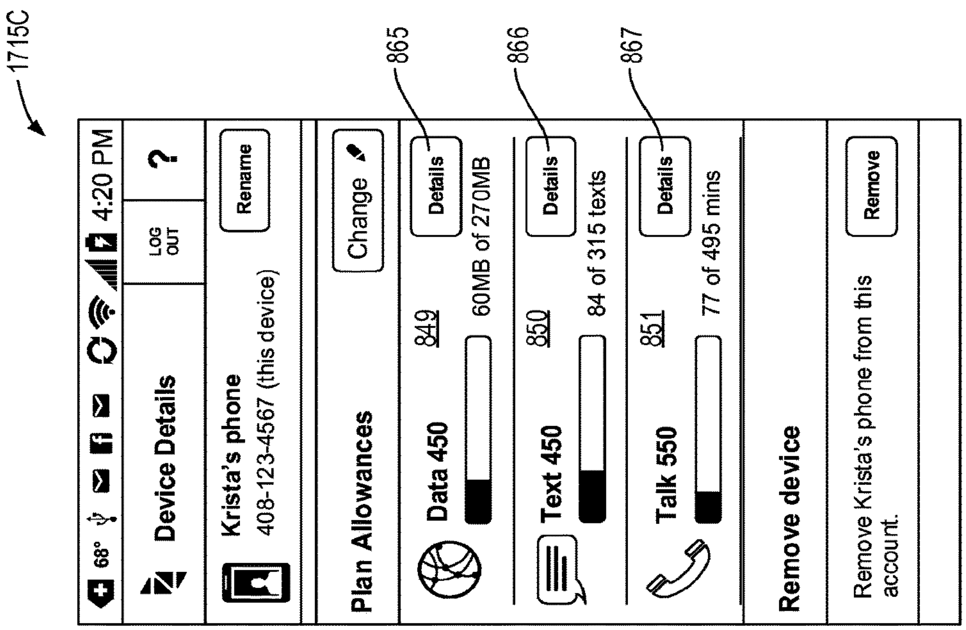
FIG. 107 illustrates a display screen presented through a touch-screen display of a wireless end-user device, in accordance with an exemplary embodiment, showing the “Device Details” screen after imposition of the allowances of FIGS. 102, 104, and 106A.
Figure 108B:
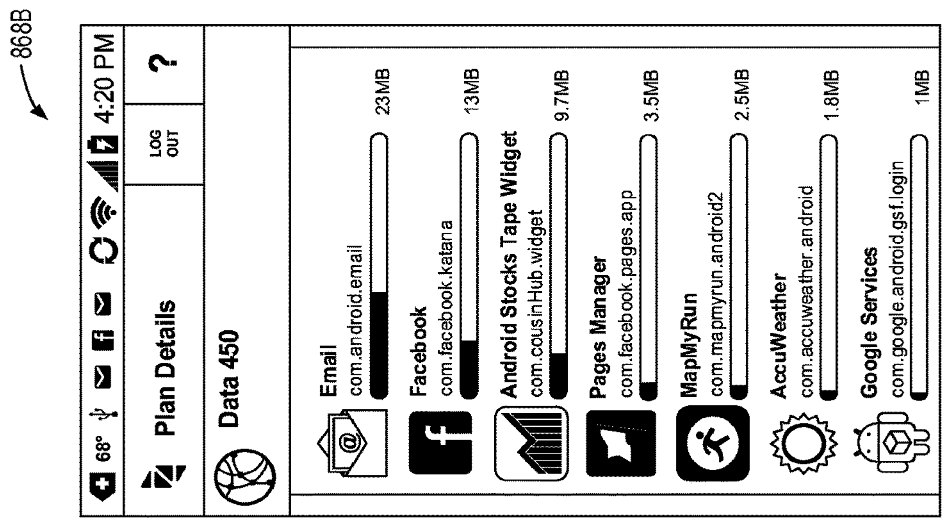
FIGS. 108A through 108F illustrate a display screen presented through a touch-screen display of a wireless end-user device, in accordance with an exemplary embodiment, providing information about usage of the plan “Data 450” by a selected device in the device group.
Figure 108A:
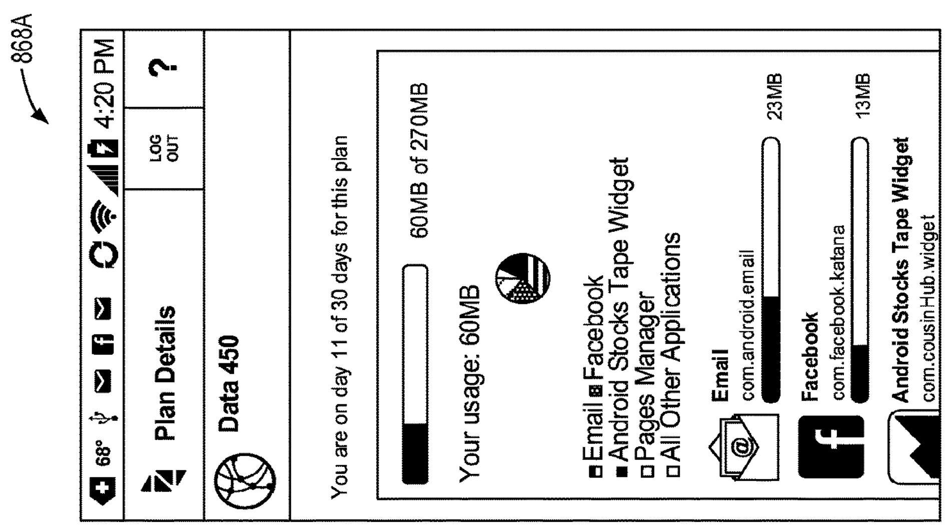
Figure 108C:
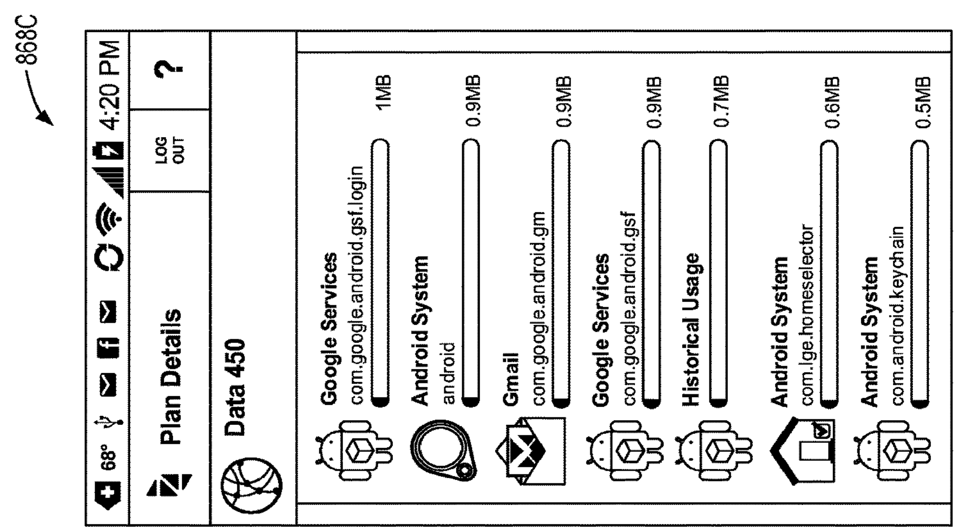
Figure 108D:
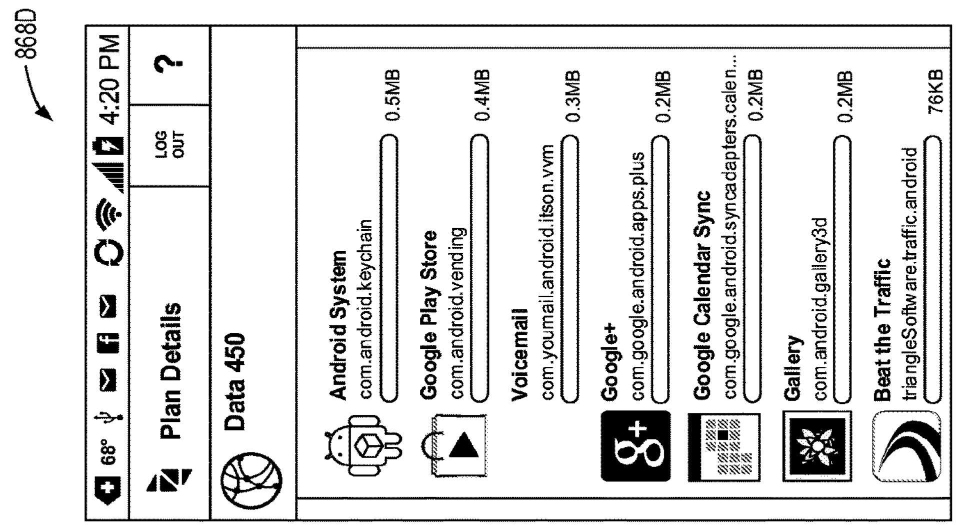
Figure 108E:
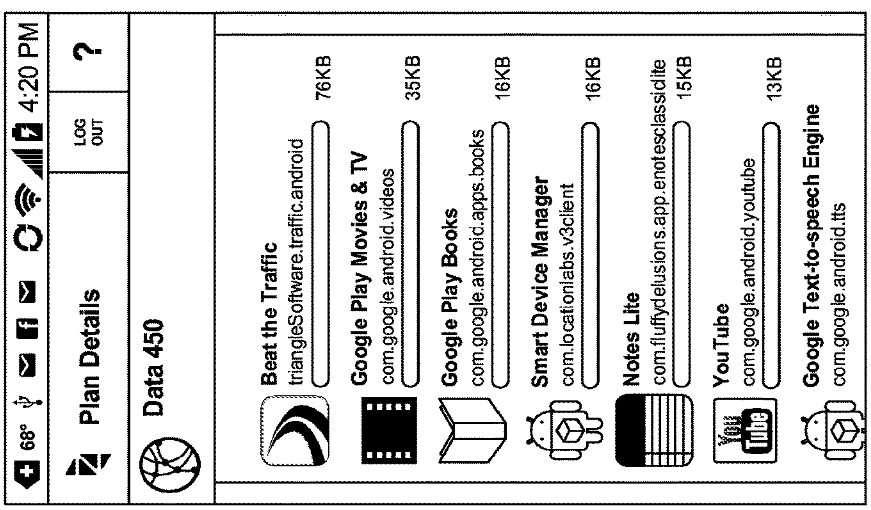
Figure 108F:
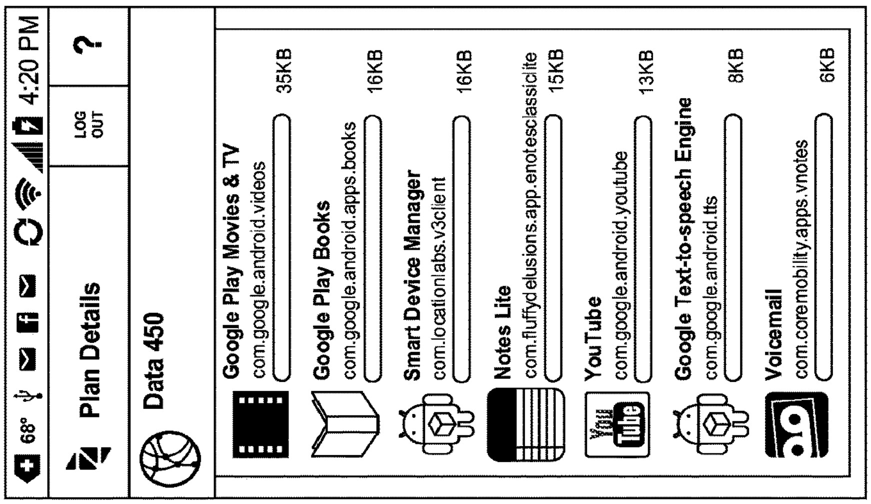

FIG. 107 presents an exemplary embodiment of a portion of the "Device Details" screen, screen 1715C (the middle portion of screen 1715) after imposition of the allowances as previously described. In accordance with the allowances imposed, region 849 screen 1715C of FIG. 107 indicates that Krista's phone is allowed to use as much as 270 MB of the 450 MB of data provided by the "Data 450" plan; region 850 indicates that Krista's phone is allowed to use as many as 315 texts of the 450 messages provided by the "Text 450" plan; and region 851 indicates that Krista's phone is allowed to as many as 495 minutes of the 550 minutes provided by the "Talk 550" plan. In the exemplary embodiment shown in FIG. 107, each of the plan allowance categories has a "Details" button that allows the user to view usage within the category. As illustrated in FIG. 107, button 865 allows the user of Krista's device to see details of usage of the "Data 450" plan; button 866 allows the user to see details of usage of the "Text 450" plan; and button 867 allows the user to see details of usage of the "Talk 550" plan.

FIGS. 108A through 108F illustrate various portions of screen 868, which, in an exemplary embodiment, is presented to a user who selects "Details" button 865 from FIG. 107. The user can view the information on FIGS. 108B through 108F by scrolling down on the touch screen. FIGS. 108A through 108F provide various items of information to the user, including progress through the plan or plan expiration (e.g., in FIG. 108A: "You are on day 11 of 30 days for this plan"), the device's usage of the plan relative to the allowance in place for the device (e.g., in FIG. 108A: Krista's device is allowed to use up to 270 MB of the "Data 450" plan because of the allowance of 270 MB that was put into place as previously described), a pie chart of usage enabling the user to determine the top four applications consuming the device's allowance of the data plan (in FIG. 108A, the pie chart indicates that for Krista's device, during the first 11 days of the "Data 450" plan, e-mail consumed the most of the allowance, followed by Facebook, the Android Stocks Tape Widget, Pages Manager, and then all other applications), and details regarding usage associated with particular applications on the device (e.g., shown in FIGS. 108A through 108F). Using the information from FIGS. 108A through 108F, users can determine which applications are consuming the data plan (allowance) and how much data those applications are consuming.

Figure 109A:
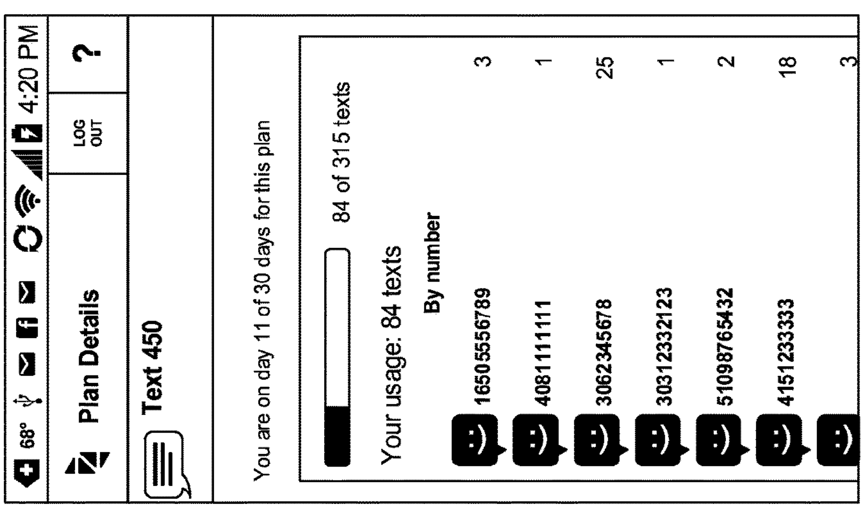
FIGS. 109A and 109B illustrate a display screen presented through a touch-screen display of a wireless end-user device, in accordance with an exemplary embodiment, providing information about usage of the plan “Text 450” by a selected device in the device group.
Figure 109B:
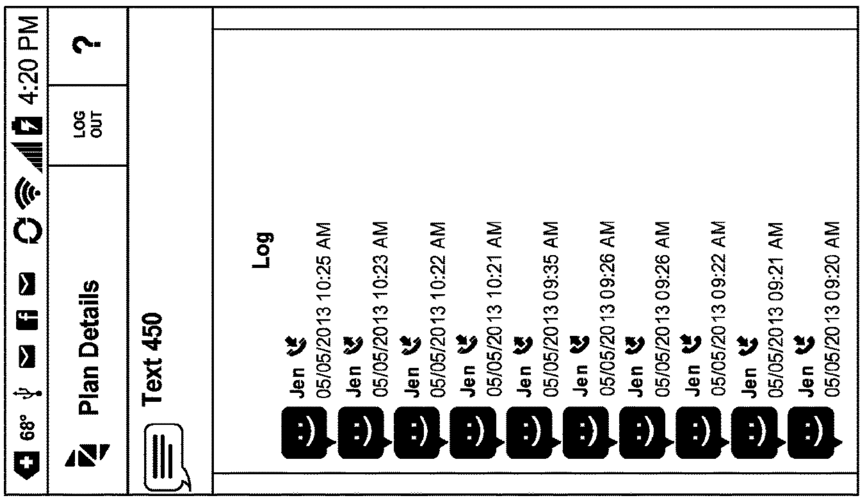

Referring again to FIG. 107, the user can also obtain details about usage of the allowance of the "Text 450" plan and the "Talk 550" plan by selecting, respectively, "Details" button 866 and "Details" button 867. FIGS. 109A and 109B illustrate an exemplary embodiment of screen 869, which is presented by the one or more device agents when the user selects "Details" button 866 of screen 1715C in FIG. 107, which is associated with the "Text 450" plan. FIG. 109A provides various items of information to the user, including progress through the plan or plan expiration (e.g., screen 869A states, "You are on day 11 of 30 days for this plan"), the device's usage of the plan relative to the allowance in place for the device (e.g., screen 869A indicates that Krista's device is allowed to use up to 315 texts of the "Text 450" plan because of the allowance of 315 texts that was put into place as previously described), and a listing of the number of texts sent to and received from each phone number. FIG. 109 illustrates screen 869B (obtained, in the exemplary embodiment, by scrolling down from screen 869A), which provides a log of each text sent or received along with indicia of the texting or texted party, date and time of the text message, and whether the text was sent or received. Using the information from screen 869 of FIGS. 109A and 109B, users can determine to/from whom they most often send/receive text messages and also see details of each text message. In some embodiments, the one or more device agents present an ordered list of phone numbers or contacts associated with text usage (e.g., present the top four phone numbers by text messages).

Figure 110B:
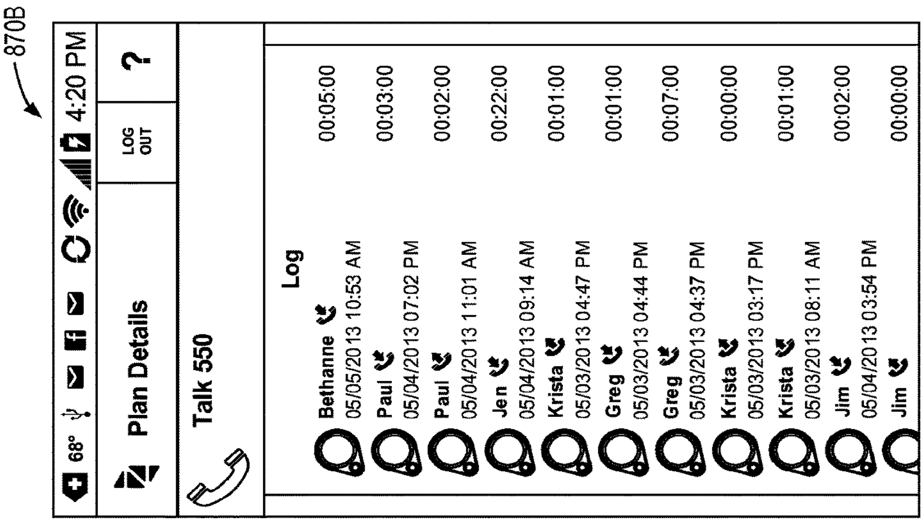
FIGS. 110A and 110B illustrate a display screen presented through a touch-screen display of a wireless end-user device, in accordance with an exemplary embodiment, providing information about usage of the plan “Talk 550” by a selected device in the device group.
Figure 110A:
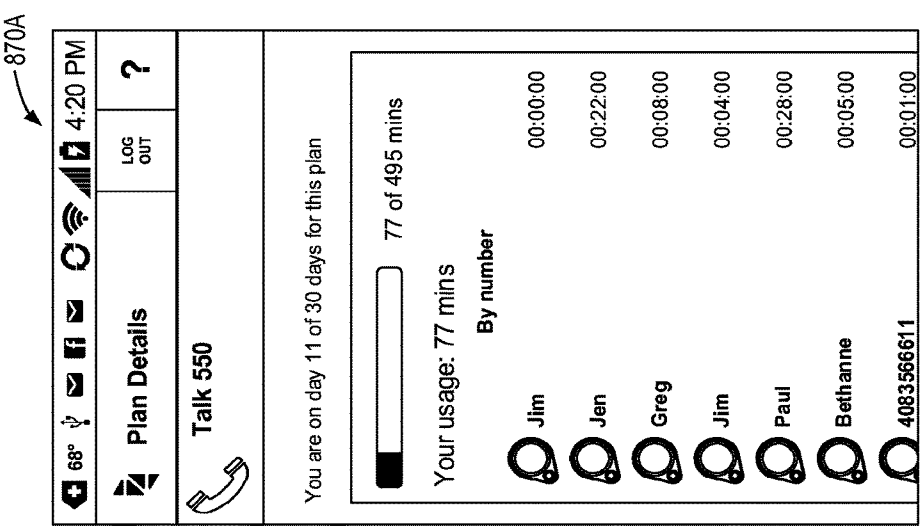

FIGS. 110A and 110B illustrate an exemplary embodiment of screen 870, which is presented by the one or more device agents when the user selects "Details" button 867 of screen 1715C in FIG. 107, which is associated with the "Talk 550" plan. FIG. 110A provides various items of information to the user, including progress through the plan or plan expiration (e.g., screen 870A states, "You are on day 11 of 30 days for this plan"), the device's usage of the plan relative to the allowance in place for the device (e.g., screen 870A indicates that Krista's device is allowed to use up to 495 minutes of the "Talk 550" plan because of the allowance of 495 minutes that was put into place as previously described), and a listing of calls by name (or phone number, if the person is not in the contacts list) and duration. FIG. 110B illustrates screen 870B (obtained, in the exemplary embodiment, by scrolling down from screen 870A), which provides a log of each call placed or received, along with indicia of the calling or called party, date and time of the call, and whether the call was initiated or received by the device. Using the information from FIGS. 110A and 110B, users can determine to/from whom they most often place/receive phone calls and also see details of each phone call. In some embodiments, the one or more device agents present an ordered list of phone numbers or contacts associated with voice usage (e.g., present the top four phone numbers by phone calls).

It is to be appreciated that the presentation of the information about usage of voice, text, and data can be different from the examples shown herein, which are illustrative and are not intended to be limiting.

Figure 111:
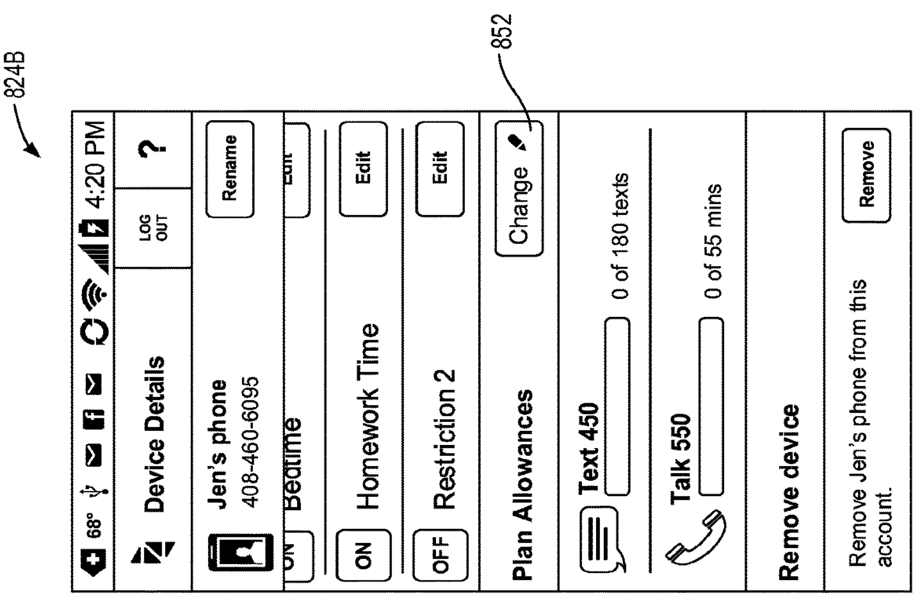
FIG. 111 illustrates a display screen presented through a touch-screen display of a wireless end-user device, in accordance with an exemplary embodiment, to assist a user of one device to establish one or more plan allowances for a selected device in the device group.
Figure 112:
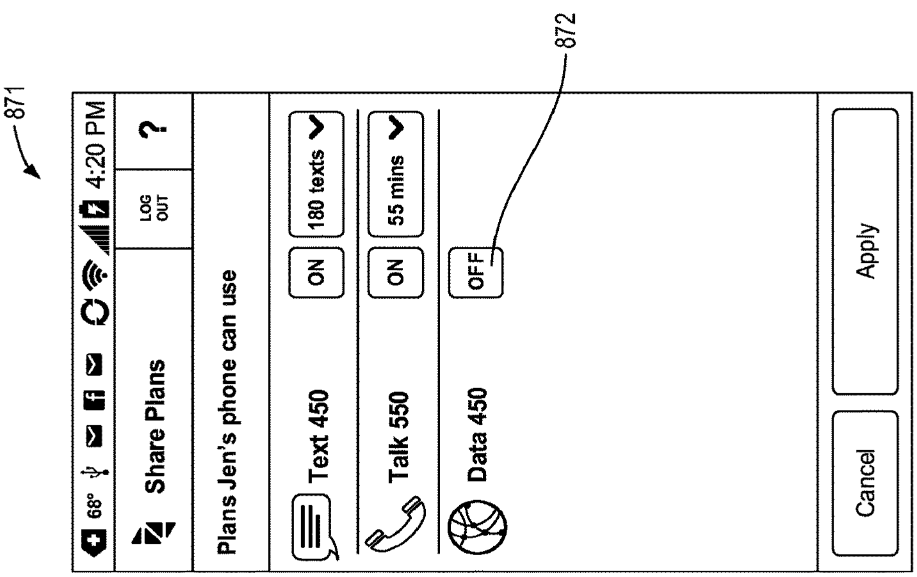
FIG. 112 illustrates a display screen presented through a touch-screen display of a wireless end-user device, in accordance with an exemplary embodiment, indicating that the device for which allowances are being configured or viewed can use up to 180 text messages of the "Text 450" plan, up to 55 minutes of the "Talk 550" plan, and none of the "Data 450" plan.
Figure 114:
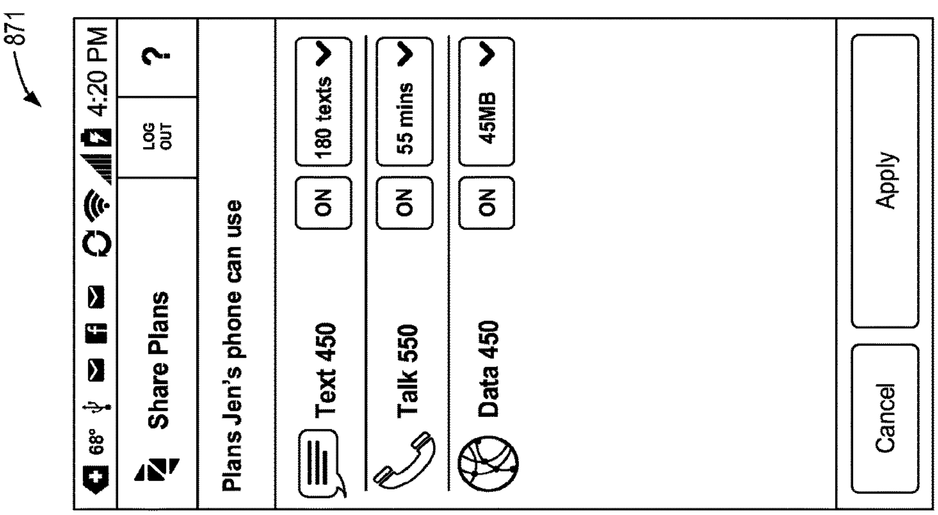
FIG. 114 illustrates a display screen presented through a touch-screen display of a wireless end-user device, in accordance with an exemplary embodiment, after a user with authority has established an allowance (limit) of 45 MB of the "Data 450" plan.
Figure 113:
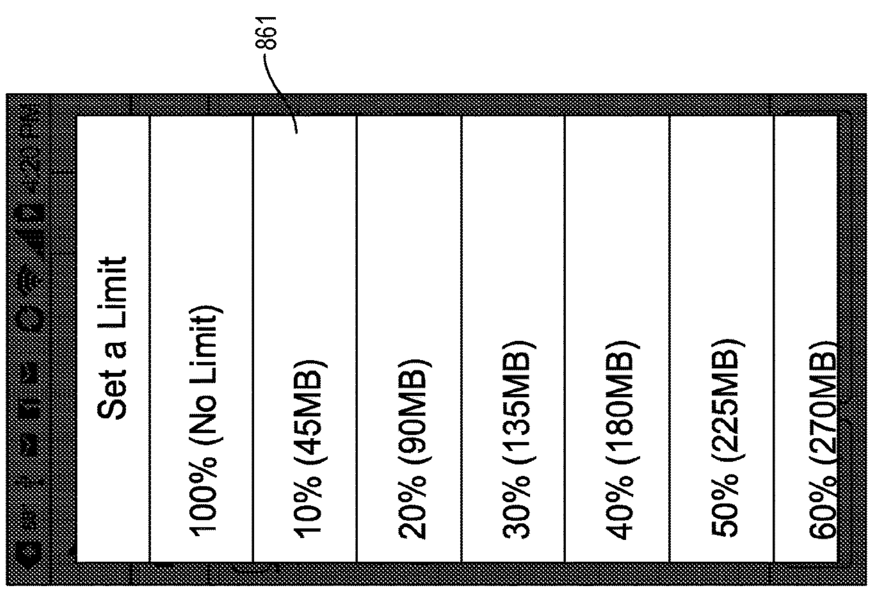
FIG. 113 illustrates a pop-up presented through a touch-screen display of a wireless end-user device, in accordance with an exemplary embodiment, to assist a user to set a data allowance for a device in the device group.
Figure 115:
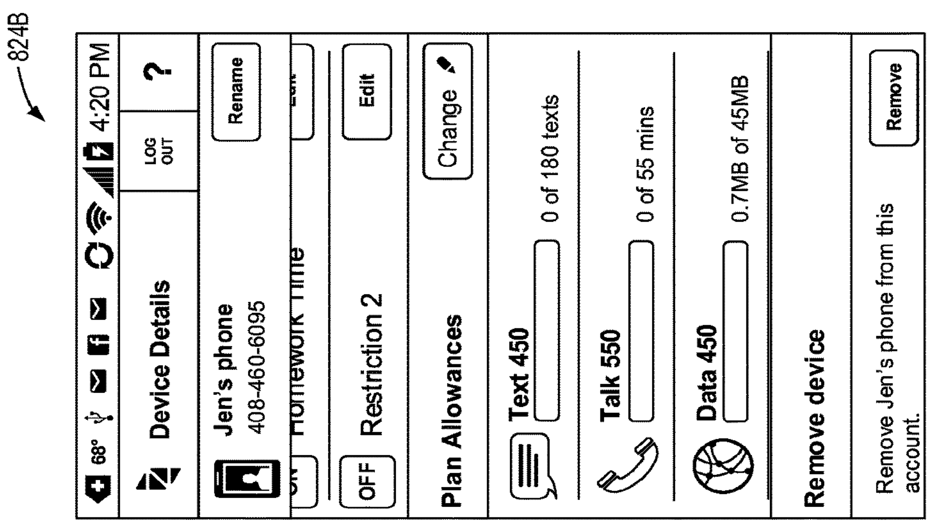
FIG. 115 illustrates a display screen presented through a touch-screen display of a wireless end-user device, in accordance with an exemplary embodiment, showing the "Device Details" screen after imposition of the 45 MB allowance.

In addition to establishing allowances for, and viewing usage by, the device being used by the user, a user with an appropriate level of authority can also establish allowances for, and view usage by, other devices in the device group. In the exemplary embodiment of screen 824B of FIG. 111, for example, a user of Krista's phone who has the appropriate authority can establish plan allowances for Jen's phone by selecting touch-sensitive "Change" button 852, which, in the exemplary embodiment causes the one or more device agents to present screen 871 shown in FIG. 112. FIG. 112 indicates that Jen's phone is currently allowed to use up to 180 texts of the "Text 450" plan, up to 55 minutes of the "Talk 550" plan, and none of the "Data 450" plan. The user of Krista's phone can select touch-sensitive "OFF" button 872, corresponding to the "Data 450" plan, to set a data allowance for Jen's phone. FIG. 113 illustrates pop-up 861, which enables a user of Krista's phone to select a data allowance to be applied to Jen's phone. FIG. 114 shows how screen 871 changes after the user has established a 45 MB allowance for Jen's phone. FIG. 115 illustrates screen 824B after the user of Krista's phone has set the 45 MB data allowance for Jen's phone. In the exemplary embodiment, other than the fact that the allowance is being set from Krista's phone, the procedure to set an allowance for Jen's phone is the same as the procedure to set an allowance for Krista's phone (or any other device in the device group).

In some embodiments, a user with authority establishes an allowance for a device and also establishes a contacts "white list" that enables the user of the device to contact the people on the white list even after the allowance has been exhausted. For example, if the service plan for the device group provides for 450 minutes of phone calls per month, a parent account holder (e.g., the mother) might allocate 30 minutes of the plan to her son, Bobby, and also establish a white list with both parents' phone numbers so that if Bobby exhausts his 30-minute allowance of phone calls, he can still call his parents. In some such embodiments, when Bobby attempts to place a phone call (or the device receives a call), the one or more device agents on Bobby's phone first check whether Bobby has exhausted his allowance of voice. If he has not, then the one or more device agents allow the call and account for the usage as part of the allowance. If Bobby's allowance has been exhausted, the one or more device agents check whether a white list is in place that allows calls to and from the calling or called party. If there is a white list in place, and it allows calls to and from the calling or called party, the one or more device agents check whether the device group plan has itself been exhausted. If there are no more minutes left in the device group plan, the one or more device agents block the call. If, on the other hand, minutes remain on the device-group plan, the one or more device agents allow the call to proceed and account for the usage under the device group plan.

Of course, even if a calling or called party is on the white list, the one or more device agents will not allow the call if the number of minutes under the applicable device group plan has been exhausted. In some embodiments, in such a case, the one or more device agents present a notification to Bobby that there are no more minutes remaining in the voice plan. In some embodiments, the one or more device agents assist in sending a message to an account administrator informing the administrator that Bobby was unable to place or receive a call. In some embodiments, the one or more device agents assist in sending a message to an account administrator informing the administrator that the device group plan component has been exhausted.

It is to be appreciated that the white list can also be used by the one or more device agents to ensure that Bobby's calls to contacts on the white list are never accounted to Bobby's 30-minute allowance. In other words, an account administrator can establish an allowance and a set of one or more phone numbers that are "free" to Bobby (i.e., they do not count as part of his allowance). Such embodiments allow Bobby to call people on the white list (e.g., his parents) without worrying that the calls will deplete his allowance.

It is to be appreciated that the concept of white lists can be used for text and data allowances, too. For example, if Bobby has a text message allowance of 100 texts per month, Bobby's mother can establish a white list so that, for example, Bobby's texts to or from his parents are never counted against his 100-message limit (assuming the remainder of the device group plan has not been exhausted), or so that Bobby can always text his parents (assuming the device group plan has not been exhausted) even after he has exhausted his allowance. Likewise, if Bobby has a data allowance of 100 MB per month, Bobby's mother can establish a white list of applications, websites, network destinations, etc., that are not counted against Bobby's allowance (assuming the remainder of the device group plan has not been exhausted), or so that Bobby can use certain applications, access certain websites, etc. (assuming the device group plan has not been exhausted), even after he has exhausted his allowance. For example, Bobby's mother can establish a white list with educational applications that are always available to Bobby and either do not ever count against Bobby's allowance or are available even if Bobby's allowance has been exhausted.

Although the foregoing explanation presumed the use of white lists, it is to be appreciated that black lists can be used instead (i.e., calls/texts to certain contacts are always accounted to Bobby's allowance, usage of particular applications is always accounted to Bobby's allowance, etc.)

Service Plan Selection, Modification, and Purchase

In some embodiments, after a user has created a new account for a device group, the one or more device agents on the device present a service plan selection notification through a device user interface. In some embodiments, after the user has selected a service plan, an authorized user can modify the service plan or purchase additional service plans. In some embodiments, the device user interface is a touch screen, and the user selects or modifies a service plan by manipulating one or more icons or other representations of service plans. In some embodiments, after the user has selected or modified a service plan, the one or more device agents present an interface enabling the user to allocate (at least a portion of) the service plan to the devices in the device group. In some embodiments, the user can separately select service categories of a service plan (e.g., voice, text, data). In some embodiments, the user can separately and independently allocate (at least a portion of) the categories of a service plan to the devices in the device group. In some embodiments, the allocations limit usage of the service plan by the devices in the device group. In some embodiments, the one or more device agents obtain, from service controller 122, a list of devices in the device group eligible to share the service plan. In some embodiments, the one or more device agents obtain a list of devices in the device group eligible to share the service plan from local storage on the device. In some embodiments, the one or more device agents obtain information about (e.g., a list of) the devices eligible to share the service plan from a user input through a user interface of the device. In some embodiments, to specify the devices eligible to share the service plan, the user enters one or more credentials of the additional devices, or one or more user credentials.

Figure 116:
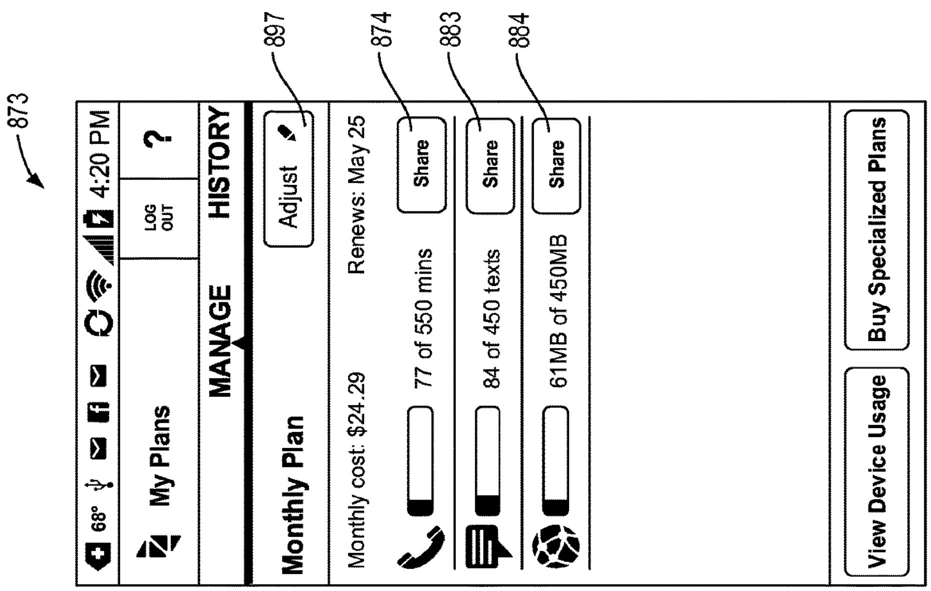
FIG. 116 illustrates a display screen presented through a touch-screen display of a wireless end-user device, in accordance with an exemplary embodiment, in response to a user selecting the "My Plans" region of FIG. 22.

Referring again to the exemplary embodiment of FIG. 22, if a user selects region 703A of the touch screen, labeled "My Plans," the one or more device agents cause a screen, such as screen 873 shown in the exemplary embodiment of FIG. 116, to be presented through the device UI. Screen 873 presents information about the monthly plan for the device group, including the monthly cost ($24.29), the renewal date (May 25), and aggregate usage by all devices in the device group. Screen 873 of FIG. 116 indicates that the device group has used 77 of 550 available voice minutes, 84 of 450 available text messages, and 61 MB of 450 MB of available data.

Figure 117A:
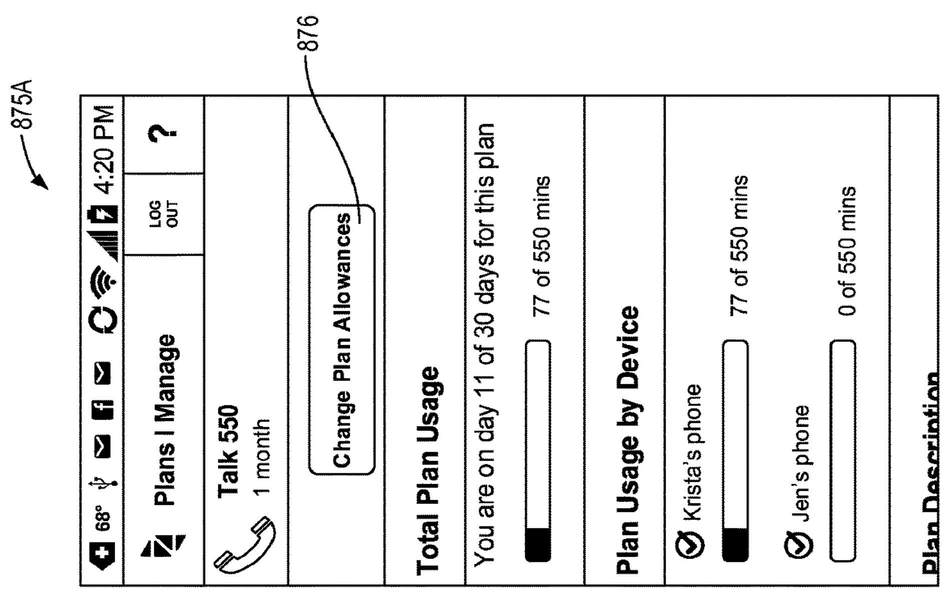
FIGS. 117A and 117B illustrate a display screen presented through a touch-screen display of a wireless end-user device, in accordance with an exemplary embodiment, in response to a user selecting the "Share" button associated with the voice plan shown in FIG. 116.
Figure 117B:
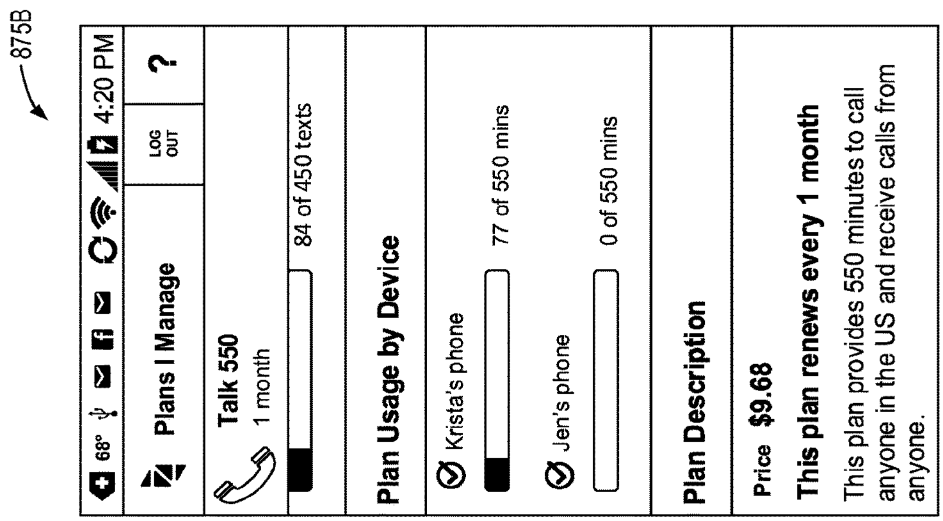
Figure 118:
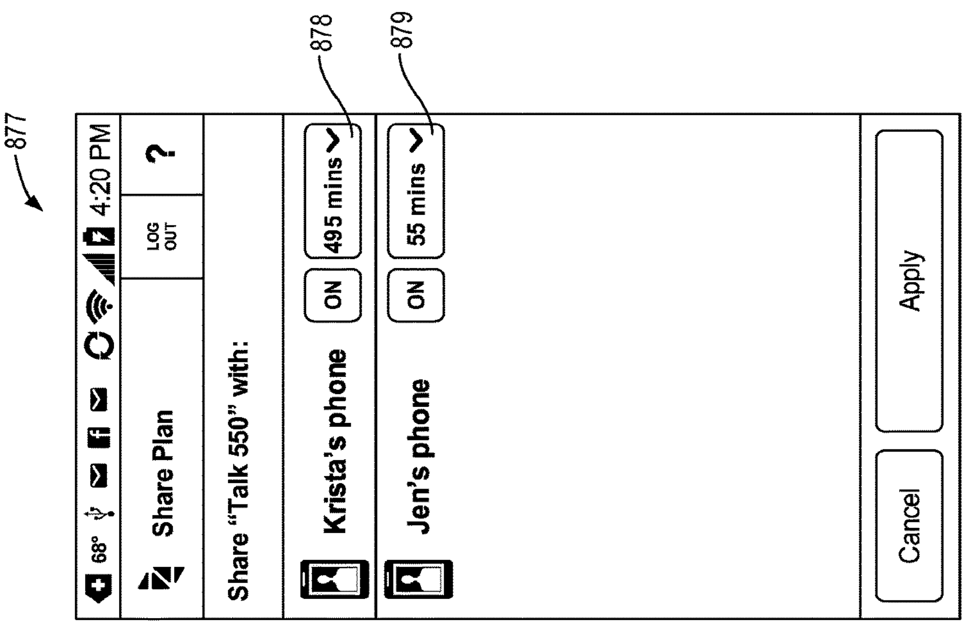
FIG. 118 illustrates a display screen presented through a touch-screen display of a wireless end-user device, in accordance with an exemplary embodiment, which allows a user to view and adjust the service plan allowances available to devices in the device group.
Figure 119:
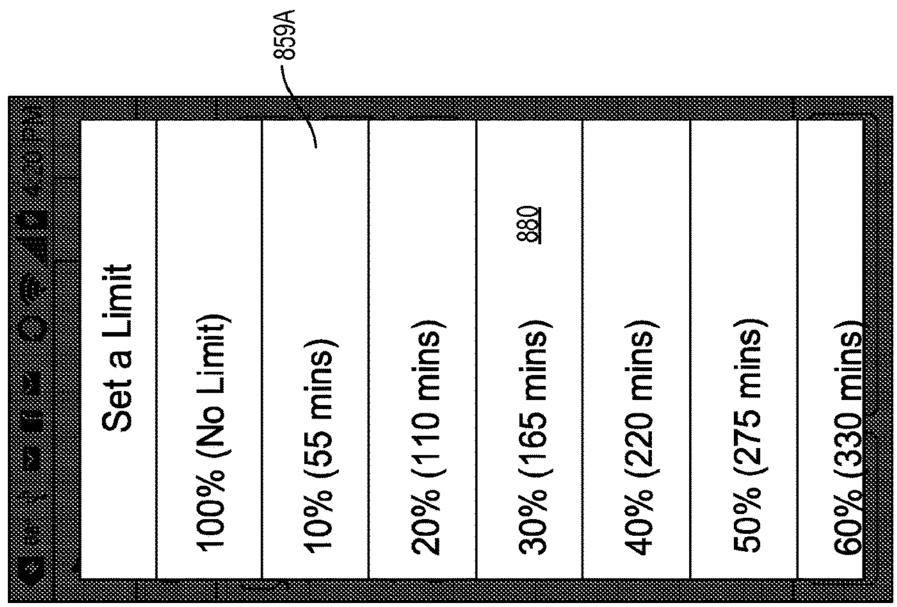
Figure 121:
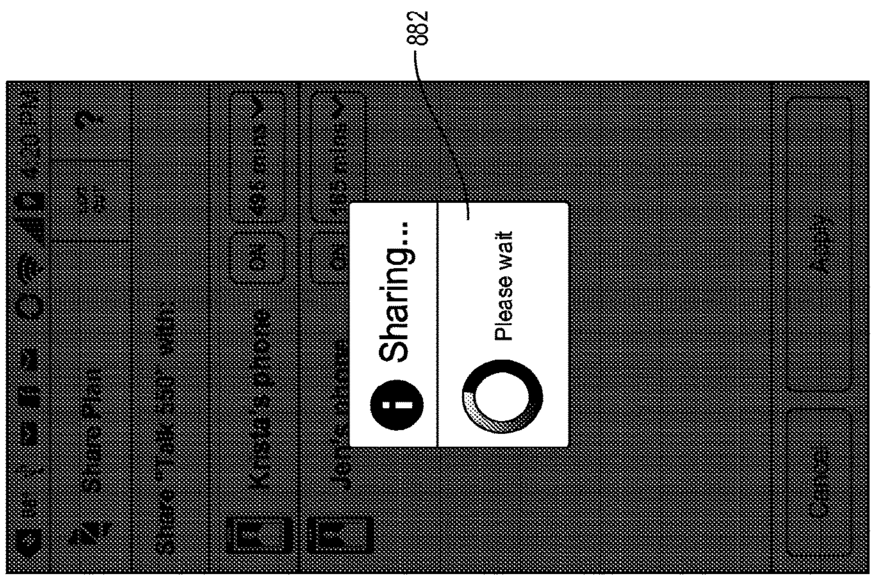
Figure 120:
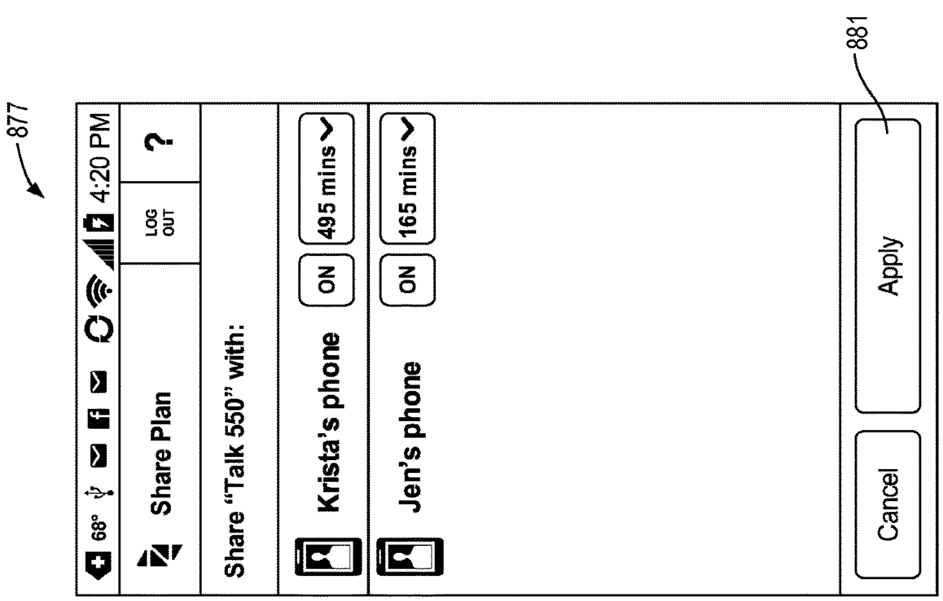
Figure 122B:
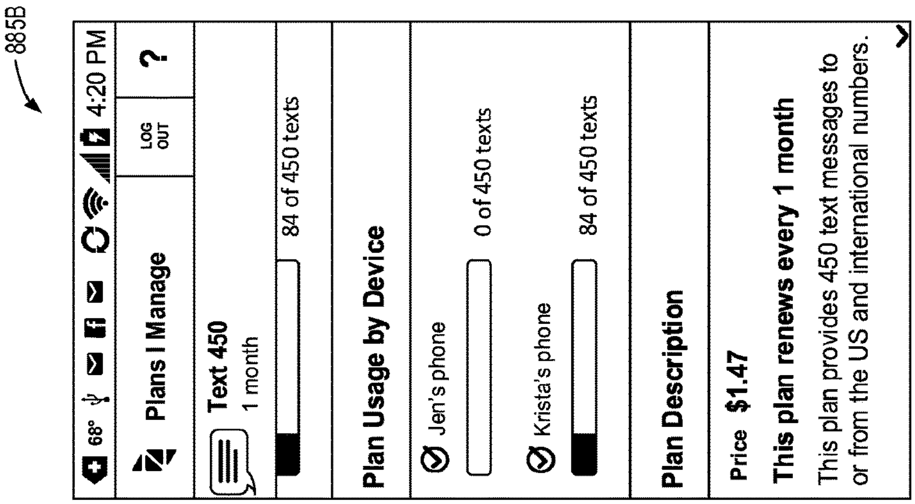
Figure 122A:
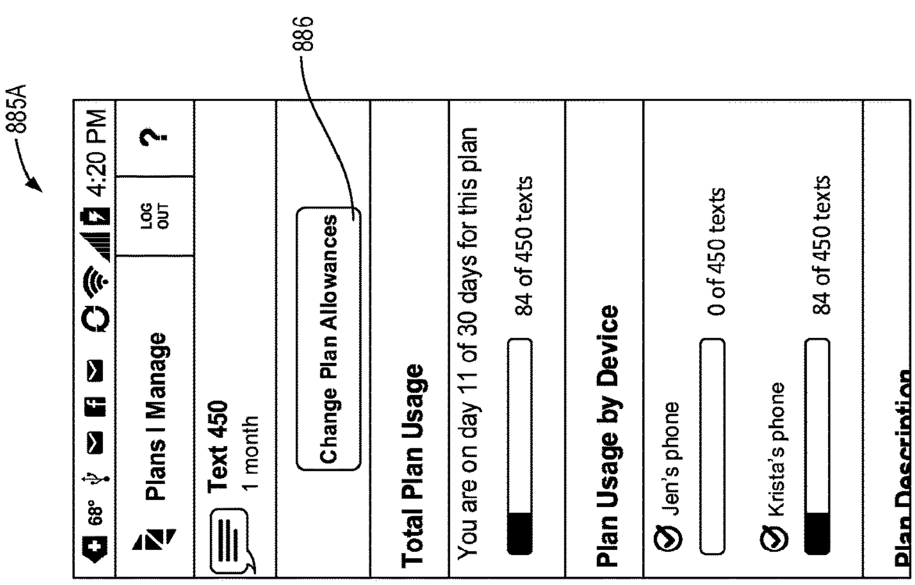

In an exemplary embodiment, if the user selects "Share" button 874, which is associated with voice usage, the one or more device agents cause screen 875, shown in FIGS. 117A (screen 875A) and 117B (screen 875B, obtained by scrolling down from screen 875A), to be presented through the device UI. Screen 875 provides information about the "Talk 550" plan, including progress through the plan (e.g., both in terms of number of days ("You are on day 11 of 30 days for this plan") and number of voice minutes used by the group ("77 of 550 mins")), usage per device in the device group (showing that Krista's phone has used 77 of the 550 available minutes, whereas Jen's phone has used none of the 550 available minutes), and, on screen 875B, a description of the plan, including its price ($9.68) and renewal terms ("This plan renews every 1 month"). By selecting "Change Plan Allowances" button 876, the user may adjust the allowances available to Krista's phone and Jen's phone. FIG. 118 shows screen 877, which enables the user to adjust the allowance available to Krista's phone by selecting button 878 and adjust the allowance available to Jen's phone by selecting button 879. (In this example, Lucy's phone, discussed in some embodiments above, is not part of the device group.) FIG. 119 illustrates pop-up 859A, which, in an exemplary embodiment, the one or more device agents cause to be presented through the device UI when a user selects button 878 or button 879 of screen 877. FIG. 120 shows how screen 877 changes after a user selects button 879 and selects region 880 of screen 859A shown in FIG. 119, thus setting the allowance of voice minutes for Jen's phone to 165 minutes. If the user now selects "Apply" button 881 of screen 877 in FIG. 120, in an exemplary embodiment the one or more device agents cause pop-up 882, illustrated in FIG. 121, to be presented to inform the user that the plan is being shared in accordance with the configuration of screen 877.

Figure 123:
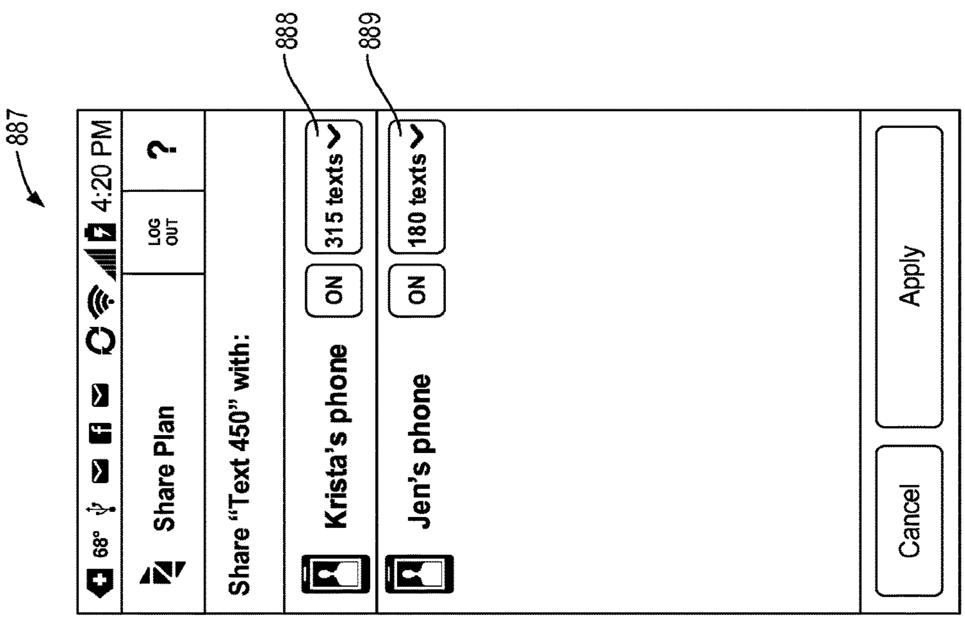
Figure 124:
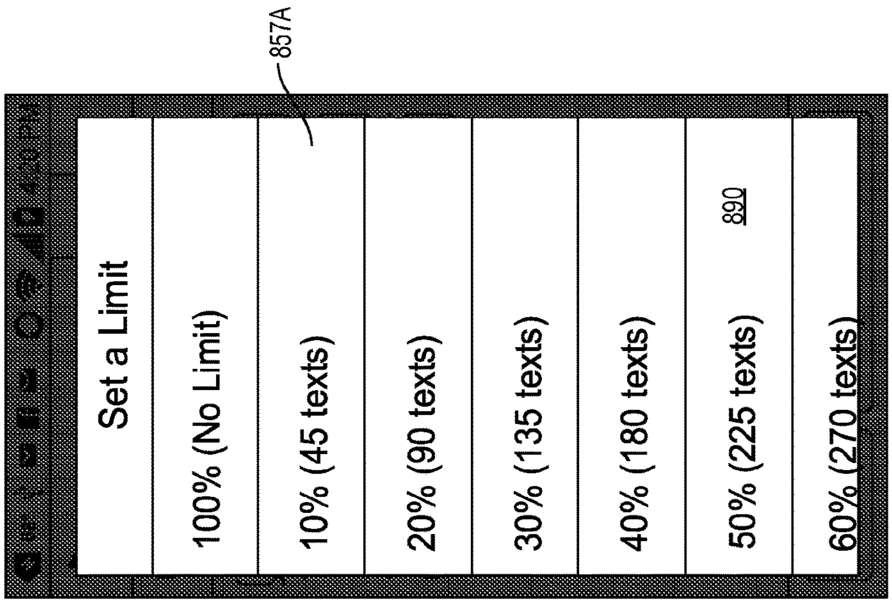
Figure 126:
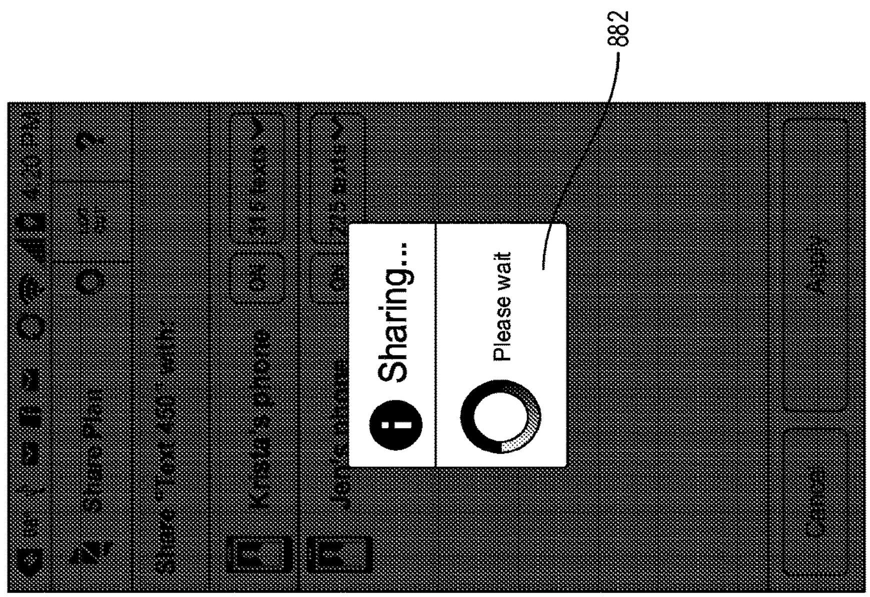
Figure 125:
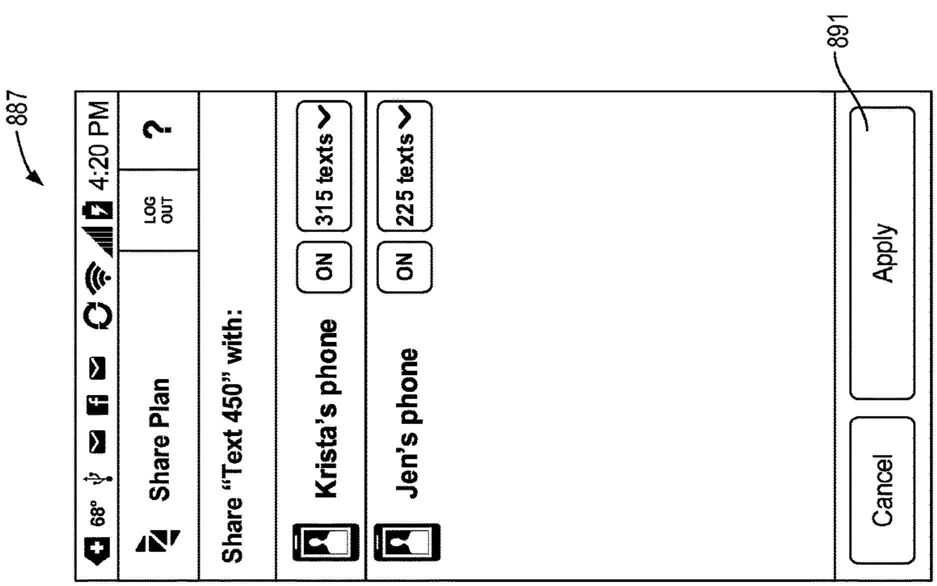

As illustrated by the exemplary embodiments of FIGS. 122 through 126, the user may also adjust the text messaging allowances. In an exemplary embodiment, the process of changing text messaging allowances. In an exemplary embodiment, if the user selects "Share" button 883, which is associated with usage of text messaging, the one or more device agents cause screen 885, shown in FIGS. 122A (screen 885A) and 122B (screen 885B, obtained by scrolling down from screen 885A), to be presented through the device UI. Screen 885 provides information about the "Text 450" plan, including progress through the plan (e.g., both in terms of number of days ("You are on day 11 of 30 days for this plan") and number of text messages used by the group ("84 of 450 texts"), usage per device in the device group (showing that Krista's phone has used 84 of the 450 available texts, whereas Jen's phone has used none of the 450 available texts), and, on screen 885B, a description of the plan, including its price ($1.47) and renewal terms ("This plan renews every 1 month"). By selecting "Change Plan Allowances" button 886, the user may adjust the allowances available to Krista's phone and Jen's phone. FIG. 123 shows screen 887, which enables the user to adjust the allowance available to Krista's phone by selecting button 888 and adjust the allowance available to Jen's phone by selecting button 889. FIG. 124 illustrates pop-up 857A, which, in an exemplary embodiment, the one or more device agents cause to be presented through the device UI when a user selects button 888 or button 889 of screen 887. FIG. 125 shows how screen 887 changes after a user selects button 889 and selects region 890 of screen 857A shown in FIG. 124, thus setting the allowance of text messages for Jen's phone to 225 text messages. If the user now selects "Apply" button 891 of screen 887 in FIG. 125, in an exemplary embodiment the one or more device agents cause pop-up 882, illustrated in FIG. 126, to be presented to inform the user that the plan is being shared in accordance with the configuration of screen 887.

Figure 127A:
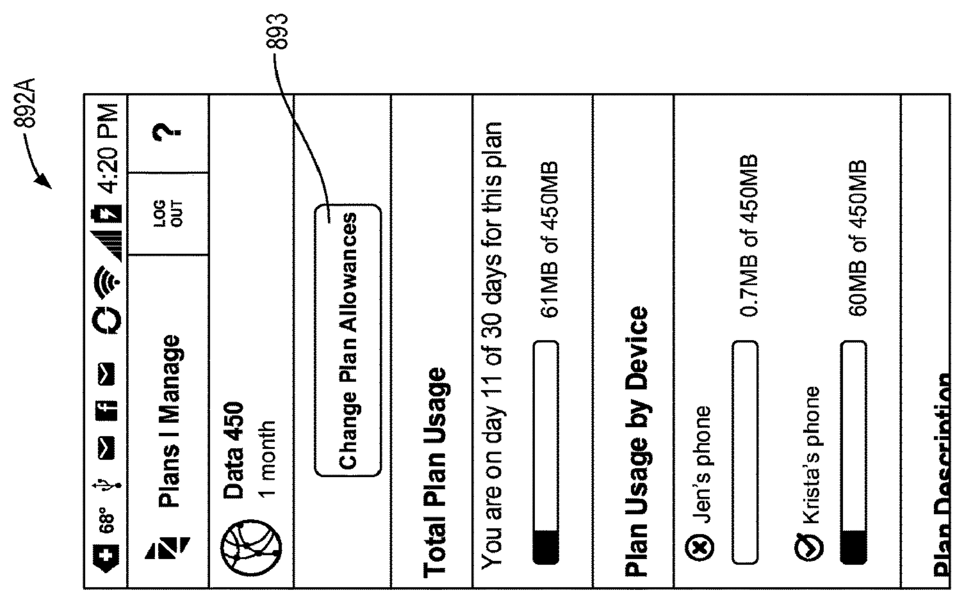
Figure 127B:
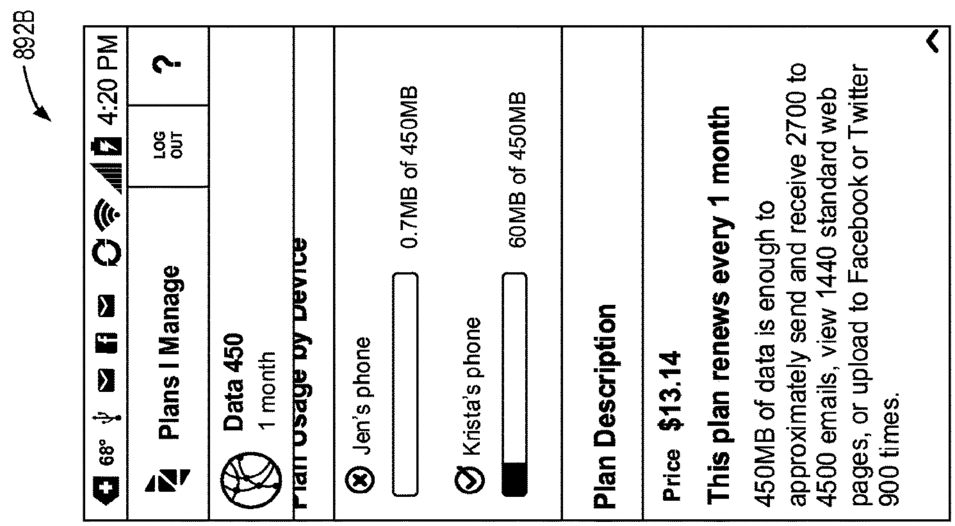
Figure 128:
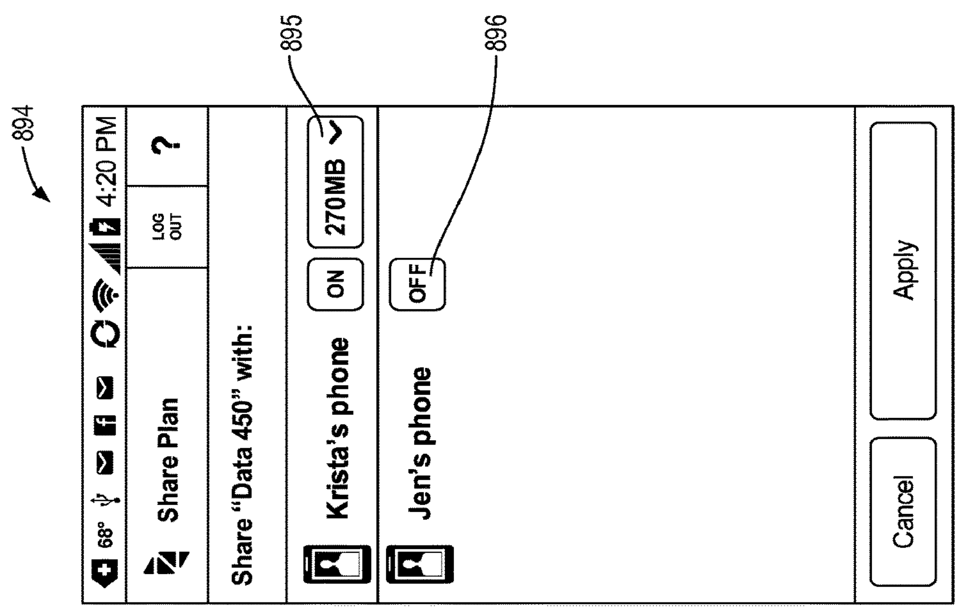
Figure 129:
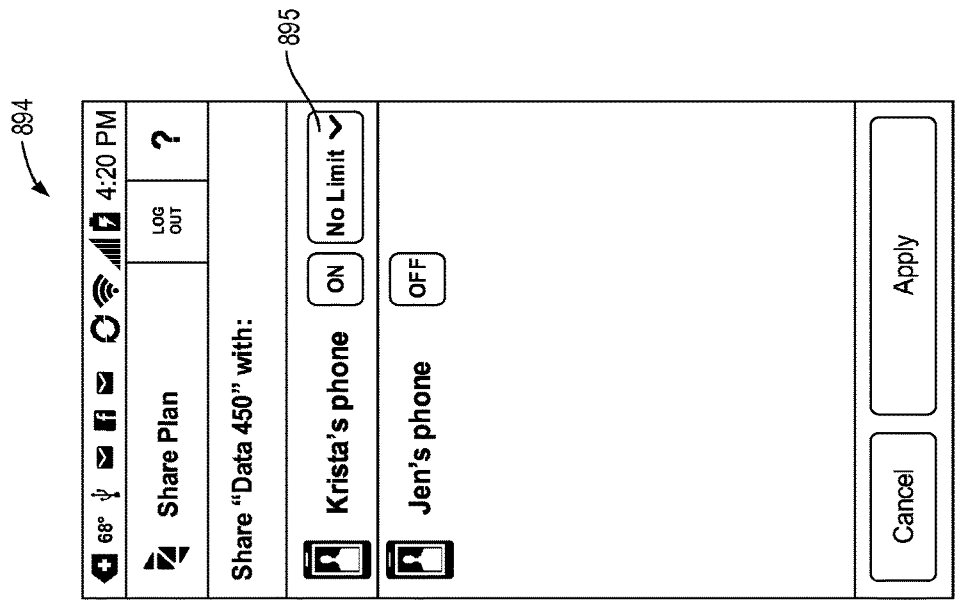

As illustrated by the exemplary embodiments of FIGS. 127 through 129, the user may also adjust the data allowances for Krista's phone and Jen's phone. In an exemplary embodiment, the process of changing data allowances is the same as changing voice minute allowances. In an exemplary embodiment, if the user selects "Share" button 884, which is associated with usage of data, the one or more device agents cause screen 892, shown in FIGS. 127A (screen 892A) and 127B (screen 892B, obtained by scrolling down from screen 892A), to be presented through the device UI. Screen 892 provides information about the "Data 450" plan, including progress through the plan (e.g., both in terms of number of days ("You are on day 11 of 30 days for this plan") and amount of data used by the group ("61 MB of 450 MB"), usage per device in the device group (showing that Krista's phone has used 60 MB of the available 450 MB of data, whereas Jen's phone has used 0.7 MB of the available 450 MB), and, on screen 892B, a description of the plan, including its price ($13.14) and renewal terms ("This plan renews every 1 month"). Note that Jen's phone is listed next to an "x," which, in the exemplary embodiment, indicates that Jen's phone is not currently allowed to use any of the "Data 450" plan. By selecting "Change Plan Allowances" button 893 of screen 892A, the user may adjust the allowances available to Krista's phone and Jen's phone. FIG. 128 shows screen 894, which enables the user to adjust the allowance available to Krista's phone by selecting button 895 and adjust the allowance available to Jen's phone by selecting "OFF" button 896. FIG. 129 illustrates screen 894 after the user has removed the limit of 270 MB on Krista's phone by selecting button 895 of screen 894 in FIG. 128. Button 895 now indicates that Krista's phone is not subject to an allowance and can therefore use all of the available "Data 450" plan. Not shown in the context of the data plan are the exemplary pop-ups described above for setting and changing the text and voice plan allocations or allowances (e.g., as shown in FIGS. 119, 121, 124, and 126). In an exemplary embodiment, the one or more device agents present similar pop-ups shown during the process of modifying an allocation of the data plan (e.g., "Data 450" of FIGS. 127 through 129).

In addition to setting or changing allowances of an in-effect plan, in some embodiments, a user can change the plan itself. In some embodiments, the one or more device agents assist a user to change a monthly plan or another plan available to the device group. Referring again to FIG. 116, the one or more device agents provide user-selectable button 897, labeled "Adjust." In an exemplary embodiment, a user's selection of "Adjust" button 897 causes the one or more device agents to present screen 749, shown in FIG.

130A, which allows the user to customize the plan. In the embodiment of FIG. 130A, the one or more device agents provide information about the current plan cost ("Previous Plan Cost"), which screen 749 indicates is $24.29. The one or more device agents also cause a UI construct to be presented to assist the user to view approximate usage of the current plan and to customize the plan. As shown in screen 749 of FIG. 130A, the construct is a carousel. Although FIG. 130A illustrates a carousel construct for the selection of a service plan, it is to be appreciated that any UI construct that enables a user to configure a service plan could be used, and other constructs are contemplated and within the scope of the disclosures herein. The use of a carousel in the exemplary embodiment is not intended to be limiting.

In the exemplary embodiment of screen 749 shown in FIG. 130A, the carousel presents a progress bar, the length of which is proportional to the usage of each plan component. For example, the length of the darkened portion of the progress bar in the center of region 898 is approximately 15 to 20 percent of the length of the entire bar, indicating that the number of voice minutes used by the device group to date is approximately 15 to 20 percent of the 550 minutes available. Likewise, the length of the darkened portion of the progress bar in the center of region 899 is approximately 20 percent of the length of the entire bar, indicating that the number of text messages used by the device group to date is approximately 20 percent of the 450 text messages available. Finally, the length of the darkened portion of the progress bar in the center of region 900 is approximately one-sixth of the length of the entire bar, indicating that the device group has used approximately one-sixth of the available 450 MB of data.

In the exemplary embodiment of screen 749 of FIG. 130A, the user can swipe his or her finger to the left or to the right in each of regions 898, 899, and 900 to adjust each of the three components (voice, text, data). For example, swiping horizontally in region 898 causes the one or more device agents to rotate the voice portion of the carousel, whereas swiping horizontally in region 899 rotates the text message portion of the carousel, and swiping horizontally in region 900 rotates the data portion of the carousel. The carousel settings of screen 749 shown in FIG. 130A indicate the settings corresponding to the current plan.

Figure 130B:
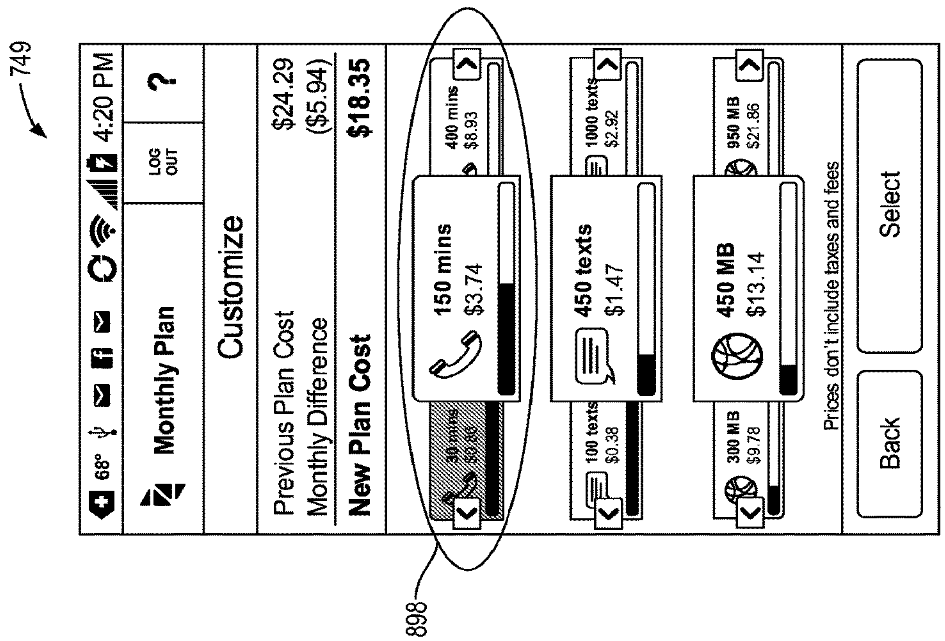
Figure 130A:
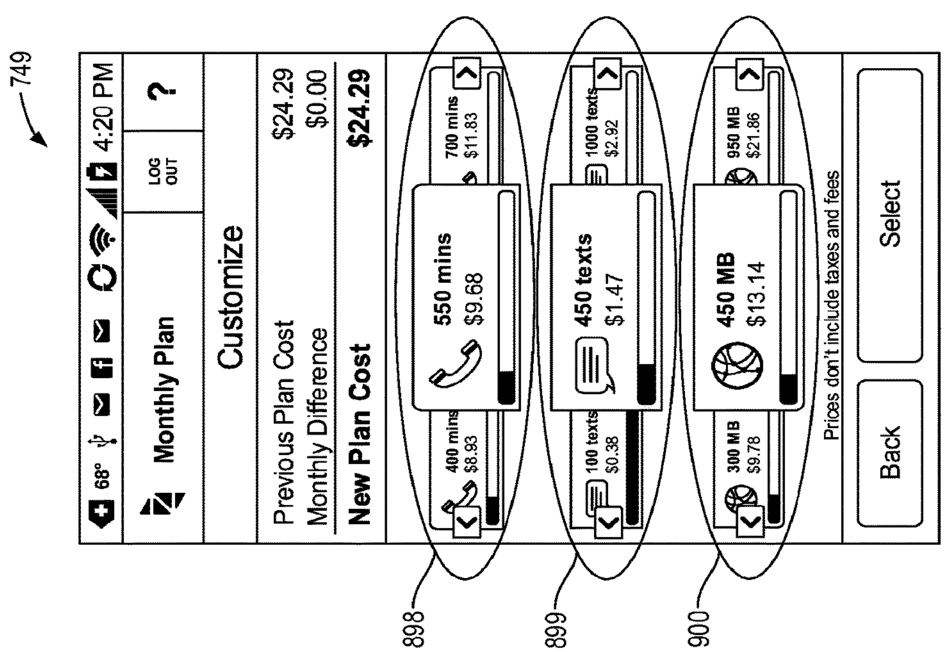

FIG. 130B illustrates how screen 749 changes when the user changes at least a portion of the plan. In FIG. 130B, the user has reduced the number of voice minutes from 550 minutes to 150 minutes by swiping to the right in region 898 of screen 749 shown in FIG. 130A. As shown in FIG. 130B, this adjustment reduces the monthly cost of the plan by $5.94, resulting in a monthly cost for the modified plan of $18.35 ("New Plan Cost"). In the exemplary embodiment of screen 749 in FIG. 130B, the selection of a lower number of minutes causes a proportional increase in the size of the bar that indicates how much of the plan has been consumed. As shown by FIG. 130B, the decrease in the number of minutes has increased the length of the darkened portion of the progress bar relative to its length in FIG. 130A. the length of the darkened portion of the progress bar in the center of region 898 is now approximately 50 percent of the length of the entire bar, indicating that with the plan change being configured, the number of voice minutes used by the device group to date will be approximately 50 percent of the 150 minutes that will be available under the new plan. Thus, the progress bars (or status bars) for voice, text, and data indicate how much of the new plan will have been consumed when the user completes the plan change.

Screen 749 of FIG. 130B indicates that the user cannot select the 30-minute plan, shown at the left of region 898 shaded in gray. This is because the device group has already consumed more than 30 minutes of voice. (According to FIG. 116, the devices have collectively used 77 voice minutes.) Therefore, the user must select a plan that includes at least as many voice minutes as have been consumed. In the exemplary embodiment shown in FIG. 130B, the smallest plan the user may select is the 150-minute plan shown in the center of region 898.

Figure 130D:
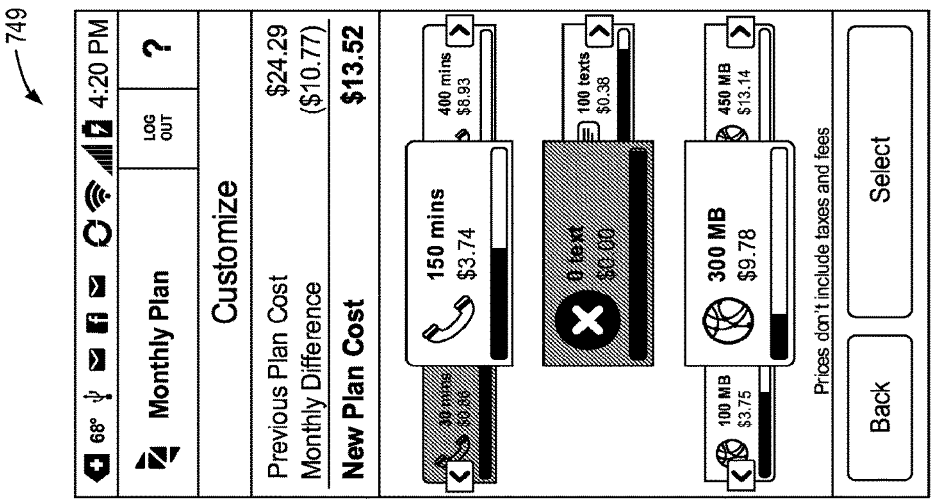
Figure 130C:
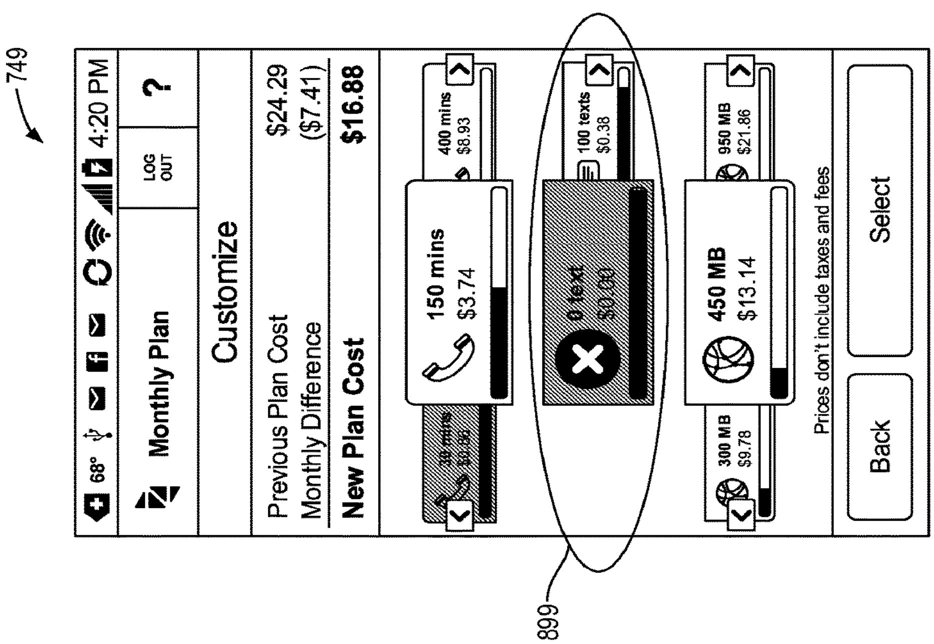

Screen 749 of FIG. 130C illustrates that the user cannot set the number of text messages in the plan to zero in region 899 because the devices in the device group have already consumed more than zero text messages. (According to FIG. 116, the devices have together used 84 text messages so far in the month, and therefore the user must select a plan that provides for at least 84 text messages.)

Screen 749 of FIG. 130D illustrates that if the user selects the 300 MB option for data rather than the 450 MB option, the user's cost will be reduced, but a larger percentage of the data will have been consumed, as indicated by the longer shaded bar.

Figure 130F:
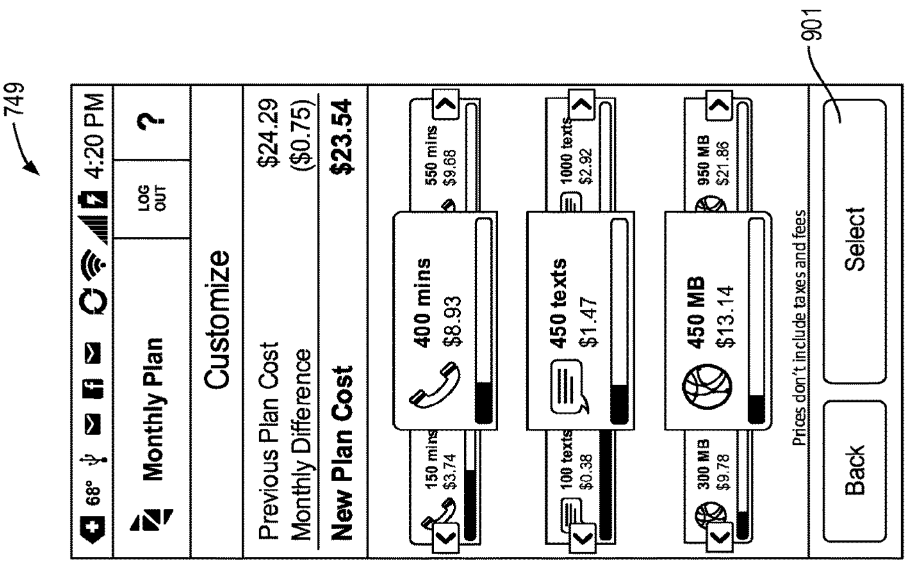
Figure 130E:
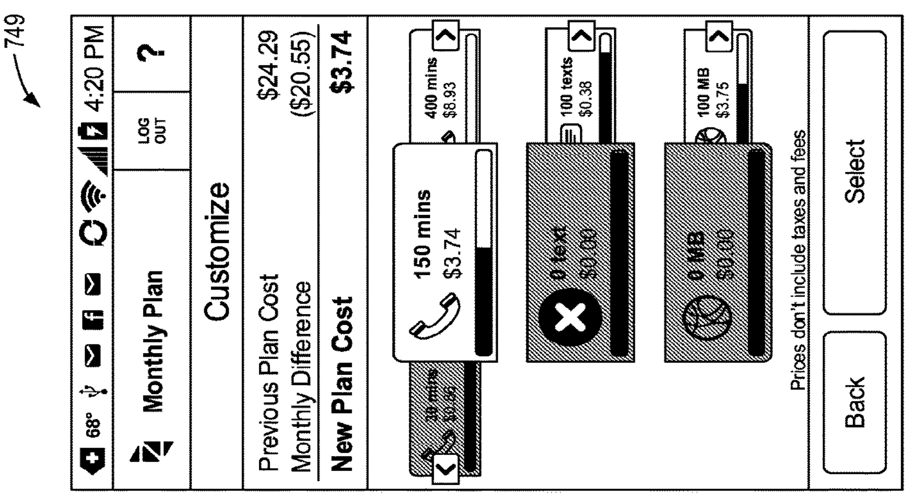

Screen 749 of FIG. 130E illustrates that the user cannot select a configuration that does not provide for text messages or data. This is because, according to screen 873 of FIG. 116, the device group has already used 84 text messages and 61 MB of data during the month.

Figure 131:
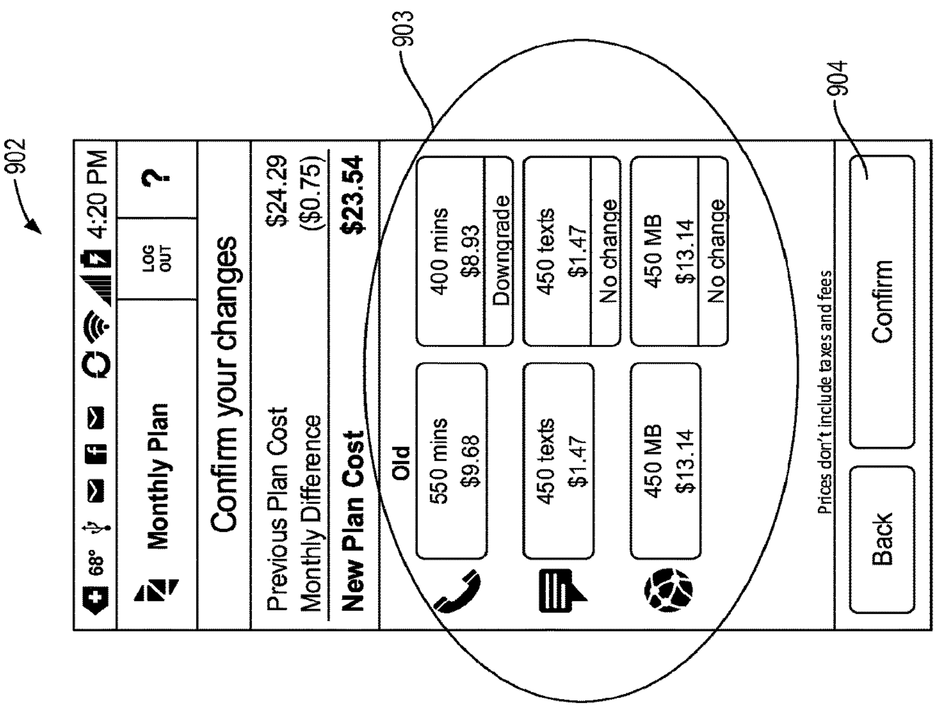

Screen 749 of FIG. 130F illustrates that if the user decreases the number of voice minutes in the plan from 550 to 400, but leaves the text and data components as they were, the user's monthly plan cost will be reduced by $0.75. If the user then selects "Select" button 901 of screen 749 of FIG. 130F, in an exemplary embodiment the one or more device agents present screen 902 of FIG. 131. In this embodiment, the one or more device agents cause summary information to be presented to indicate the previous plan cost ($24.49), the new plan cost ($23.54), and the monthly difference ($0.75); whether the user is changing the number of minutes, the number of text messages, or the amount of data available to the device group (presented in region 903 of screen 902); and, if the user is changing the number of minutes, number of text messages, or amount of data, whether each change is an upgrade or a downgrade (region 903). If the user selects "Confirm" button 904 shown in screen 902 of FIG. 131, in some embodiments, such as the embodiment shown in FIG. 132, the one or more device agents cause pop-up 905 to be presented through the device UI, asking the user to confirm the change. Pop-up 905 informs the user that the plan change will result in an account credit of $0.75, plus taxes and fees. The user can confirm the plan change by selecting "Confirm" button 906 of pop-up 905. In an exemplary embodiment, the selection of "Confirm" button 906 causes the one or more device agents to present pop-up 907, as shown in FIG. 133, which informs the user that the changes are being processed, and that the user can modify the plan any time.

In an exemplary embodiment, after the plan change has been completed, the one or more device agents cause screen 908, which provides a summary of the plan, to be presented through the device UI, as illustrated in FIG. 134. If the user selects "Finish" button 909 of FIG. 134, in an exemplary embodiment, the one or more device agents cause screen 873 of FIG. 135 to be presented through the device UI. Screen 873 reflects the changes to the plan. If the user selects "View Device Usage" button 911 of FIG. 135, in an exemplary embodiment the one or more device agents cause a screen such as screen 912 illustrated of FIG. 136 to be presented. In this exemplary embodiment, because the user changed the voice component of the device group plan part-way through the month, the number of minutes available is prorated based on the amount of time remaining in the month. FIG. 136 indicates that the prorated number of minutes is 360.

In some embodiments, after the user has modified a plan, the one or more device agents take the necessary actions to at least assist in implementing the plan change. In some embodiments, the one or more device agents assist in sending information about the plan change to service controller 122. In some embodiments, the one or more device agents provide configure themselves or provide information to one or more other device agents to enable the responsible agents to implement the modified plan. The functions of and actions taken by the service processor and its agents are described in detail elsewhere in this document and in the applications incorporated by reference.

Specialized Plans

Referring again to FIG. 22, if a user selects region 703C, labeled "Specialized Plans," in some embodiments the one or more device agents cause a listing of specialized plans to be presented through the device UI. In some embodiments, the specialized plans are non-recurring. In some embodiments, the specialized plans are recurring. In some embodiments, some specialized plans are recurring, and others are non-recurring. In some embodiments, the specialized plans provide for classifications of data usage (e.g., usage associated with a particular application program, usage associated with a particular network destination, usage associated with a particular content type, usage associated with a particular network type (e.g., roaming, 4G), etc.). In some embodiments, the specialized plans provide for usage (e.g., voice, text, data) in, to, or from a specific geographic region (e.g., Europe, Asia, Egypt, etc.). In some embodiments, the user can select a specialized plan, and the one or more device agents take actions to at least assist in implementing the specialized plan.

In an exemplary embodiment, when a user selects region 703C of screen 704 in FIG. 22, a listing of specialized plans is presented through the device UI through screen 913, as illustrated in FIGS. 137A through 137C. In some embodiments, certain plans are designated as "Featured Plans." The selection of featured plans may include voice, text, and data (whether bulk data or a classification of data). In some embodiments, such as the exemplary embodiment of FIGS. 137A through 137C, banner region 914 rotates through a plurality (i.e., more than one) of advertisements for available featured plans. In some embodiments, tapping on a particular banner in banner region 914 causes the one or more device agents to present additional information about the featured plan being advertised by the particular banner and allows the user to purchase the plan.

In the exemplary embodiment of FIGS. 137A through 137C, each featured plan listed on screen 913 has an associated button labeled "View." If a user selects "View" button 915 for the "Data 50" plan, in an exemplary embodiment the one or more device agents cause screen 916, illustrated in FIGS. 138A (screen 916A), 138B (screen 916B, obtained by expanding the "Description" field of screen 916A), and 138C (screen 916C, obtained by scrolling down from screen 916B) to be presented. Screen 916 provides additional information about the "Data 50" plan. If the user selects "Purchase for this device" button 917, in some embodiments, such as the exemplary embodiment of FIG. 139, the one or more device agents cause pop-up 918 to be presented. Pop-up 918 gives the user the option to purchase the plan for the device being used (by selecting radio button 919), to assign the plan to another device (by selecting radio button 921), or to share the plan among multiple devices (by selecting radio button 922). FIG. 140 illustrates how screen 916A changes in the exemplary embodiment when the user selects radio button 921 of pop-up 918 in FIG. 139 (i.e., the user has chosen to assign the plan to another device). As shown, screen 916A of FIG. 140 allows the user to choose to assign the plan to Krista's phone by selecting radio button 924 or to Jen's phone by selecting radio button 925.

If, on the other hand, the user selects radio button 922 of pop-up 918, thereby choosing to share the plan among multiple devices, screen 916A appears as illustrated in FIGS. 141A, 141B, and 141C, depending on how the user shares the plan between Krista's phone and Jen's phone. In the exemplary embodiment of FIG. 141A, neither device is allowed to use the "Data 50" plan. In this case, the plan could be purchased, but no device would be able to use it until a user with authority either shared or assigned the plan to one or more of the devices in the device group. Thus, as indicated by FIG. 141A, the user can choose to share the plan among multiple devices but not actually implement the sharing by providing an allowance to any of the devices.

FIG. 141B illustrates the sharing of the "Data 50" plan by multiple devices (Krista's phone and Jen's phone). As indicated by FIG. 141C, the user can also use the "Share with multiple devices" option to assign the plan to only one of the devices in the group ("Krista's phone," in the case of FIG. 141C).

If the user selects "Buy" button 925 shown in any of FIG. 138, 140, or 141, in an exemplary embodiment, the one or more device agents cause pop-up notification 926, illustrated in FIG. 142, to be presented to inform the user that the credit card on file will be charged, and asking the user to confirm the purchase of the plan. If the user confirms the purchase by selecting "OK" button 927 of pop-up 926, the one or more device agents take the necessary actions to at least assist in implementing the plan, such as communicating the user's selection to service controller 122 and obtaining confirmation of billing from service controller 122. In an exemplary embodiment, the one or more device agents present pop-up 928, as shown in FIG. 143, to inform the user that the selected plan is being purchased. In an exemplary embodiment, as shown in FIG. 144, the one or more device agents present pop-up notification 929 to inform the user that the purchase was successful.

In some embodiments, after a user has purchased a specialized plan, the one or more device agents present an updated "Manage" screen 873 that reflects the addition of the specialized plan. FIG. 145 illustrates an exemplary embodiment that provides information about not only the monthly plan, but also the specialized plan, "Data 50." If the user selects "View Device Usage" button 936 on screen 873 of FIG. 145, in an exemplary embodiment the one or more device agents cause screen 931 of FIG. 146 to be presented. If the user selects "Details" button 932 of screen 931, which is associated with the "Data 50" plan, in an exemplary embodiment the one or more device agents cause screen 933, illustrated in FIG. 147A (upper portion screen 933A) and FIG. 147B (lower portion screen 933B, obtained by scrolling down from screen 933A) to be presented. The information presented by screen 933A includes the plan term (1 month), total plan usage (0 MB of 50 MB), plan expiration ("You are on day 1 of 31 days for this plan"), plan usage by device (none by either Jen's phone or Krista's phone), and whether each device is allowed to use the plan (no for Jen's phone (indicated by the "x" next to the text "Jen's phone"), yes for Krista's phone (indicated by the checkmark next to the text "Krista's phone") because the user selected "Buy" from FIG. 141C), FIG. 147B illustrates screen 933B, which provides a description of the plan.

Referring again to FIGS. 137A through 137C, in an exemplary embodiment, if the user swipes his or her finger horizontally across the display, the user can view other specialized plans, including specialized plans that are not in the featured plans list. FIGS. 148A through 148E (screens 934A through 934E) illustrate exemplary data plans; FIGS. 149A and 149B (screens 975A and 975B) illustrate exemplary voice and text messaging plans; and FIGS. 150A and 150B (screens 936A and 936B) illustrate exemplary international calling plans. In an exemplary embodiment, the user can purchase one or more of these specialized plans using the same procedure as explained above for the "Data 50" plan.

Account Management

In addition to managing devices and plans from a device, a user who can log in to the device group account can perform account management functions. In some embodiments, the one or more device agents assist the authorized user to log in to the device group account to view invoices, information about previous purchases, billing information (e.g., credit card or other payment information, address information, account password, etc.).

Figure 152A:
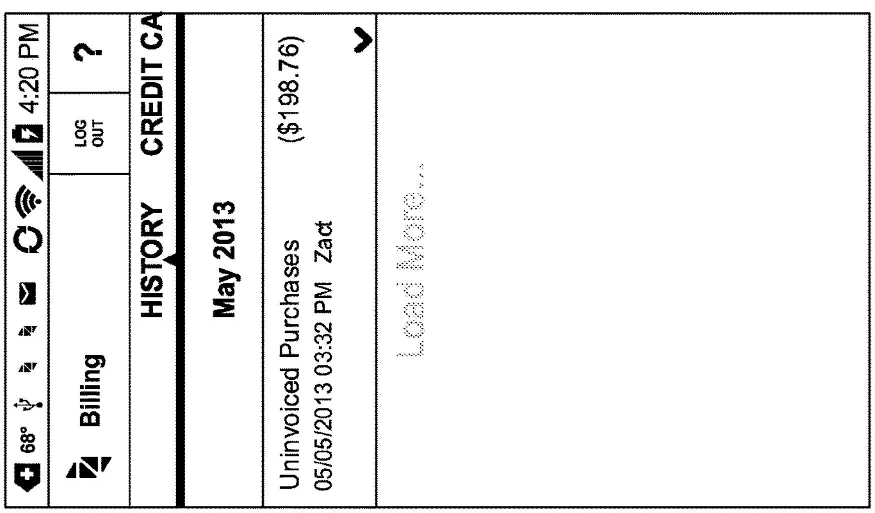
Figure 152B:
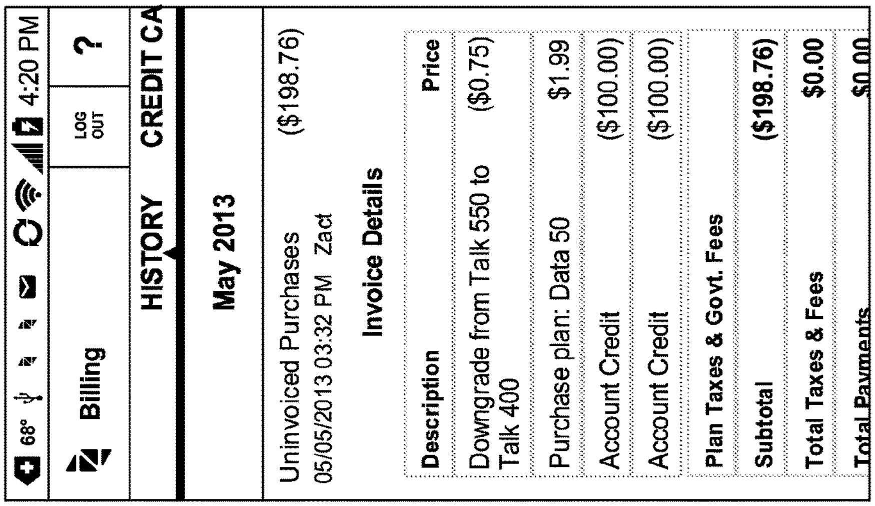
Figure 152D:
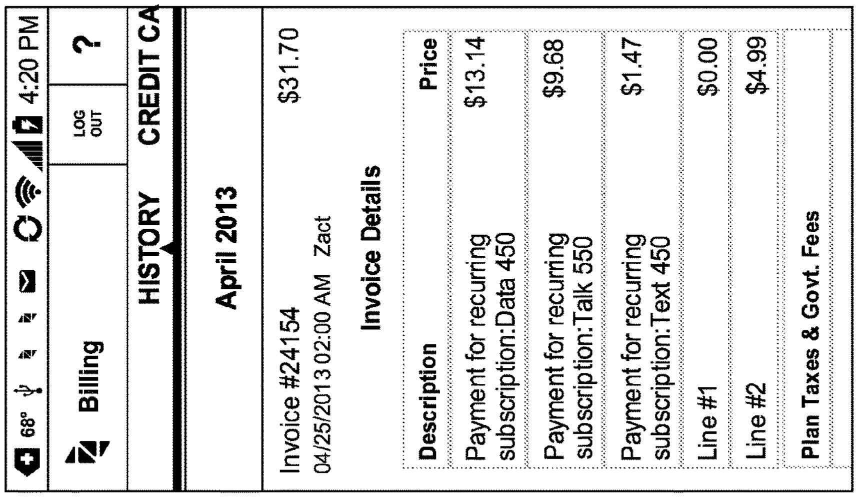
Figure 152C:
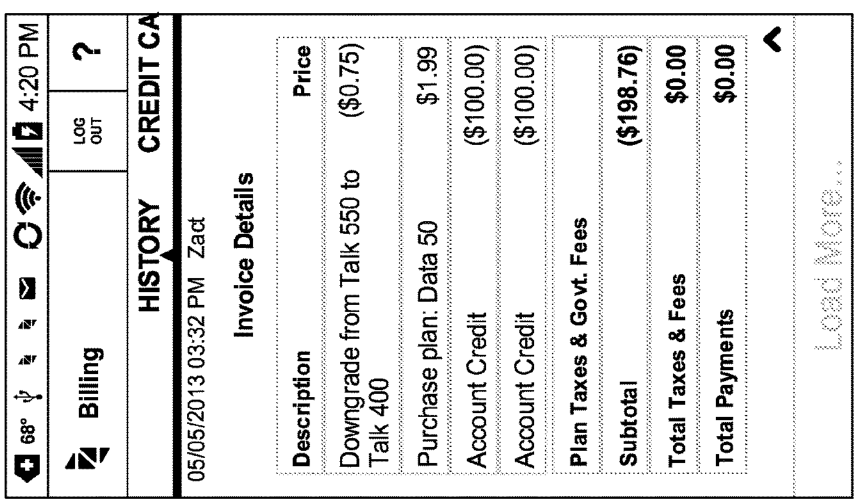
Figure 152E:
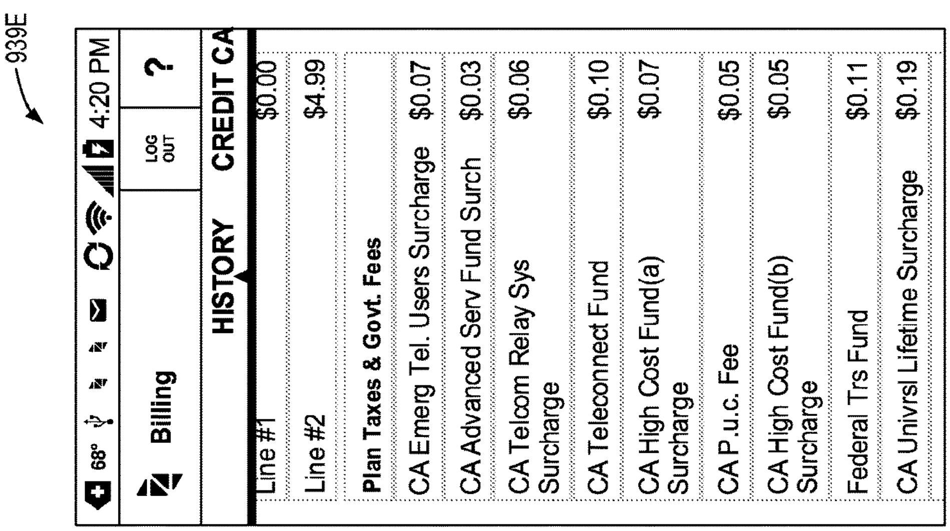
Figure 152F:
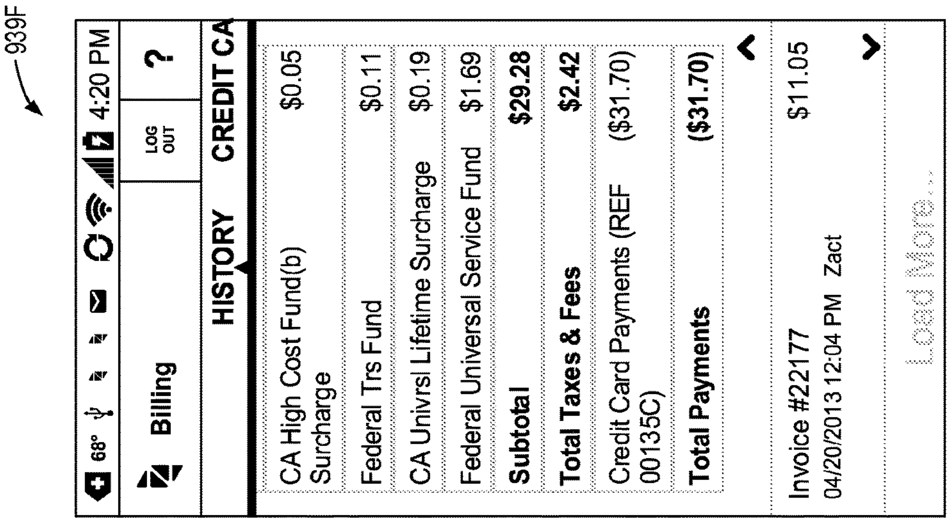

FIG. 151 illustrates device group account log-in screen 1938 in accordance with an exemplary embodiment. In some embodiments, a user who has logged in to the device group account can view account activity such as purchases and service plan changes. In an exemplary embodiment, illustrated in FIGS. 152A through 152F, authorized users can view summary and detailed information about uninvoiced purchases. For example, in FIGS. 152B and 152C, the user can see recent account charges and credits, including the downgrade from "Talk 550" to "Talk 400" and the purchase of the "Data 50" specialized plan described earlier. In addition, in the exemplary embodiment, as illustrated in FIGS. 152D through 152F, the authorized user can view invoices from previous months, including individual charges for voice, text, and data, per-line fees ($4.99 for the second line), and plan taxes and government fees.

FIGS. 153 through 155 illustrate screens 941, 943, and 945 in accordance with an exemplary embodiment in which a user who is logged in to the device group account can add or modify payment information or profile information associated with the account holder.

Providing User Help Information and Instructions

In some embodiments, the one or more device agents cause helpful information to be presented to a user. In the exemplary embodiment of screen 947 shown in FIG. 156, the one or more device agents cause a "Help" menu to be presented upon request by the user (e.g., by selecting "?" icon 970 from the upper-right corner of screen 704 in FIG. 22, screen 951 of FIG. 156, or any of the other screens in which the "?" icon appears).

In an exemplary embodiment, when the user selects region 952 of screen 951 in FIG. 156, labeled "Getting Started Tutorial," the one or more device agents are configured to cause a tutorial to be presented to explain the features of the device and service, and to guide the user through various tasks. FIGS. 157A through 157K provide exemplary, self-explanatory screens from such a tutorial.

In an exemplary embodiments, when the user selects region 953 of screen 951 in FIG. 156, labeled "Help and FAQs," the one or more device agents are configured to assist the device to present a WAP site, as illustrated by the exemplary embodiment of FIGS. 158A through 158Q. It is understood that other means than a WAP site can be used to present the "Help and FAQs" information. Like the tutorial information presented in FIGS. 157A through 157K, the "Help and FAQs" information presented in FIGS. 158A through 158Q is largely self-explanatory.

In some embodiments, when the user selects region 954 of screen 951 in FIG. 156, labeled "Check for Update," the one or more device agents are configured to gather information about the one or more device agents, or software on the device, and send the information to service controller 122. Service controller 122 then checks the information to determine whether to send a software update to the device. In some embodiments, such as the one illustrated in FIG. 159, if the device software does not need to be updated, the one or more device agents assist in presenting pop-up 955 to the user to indicate that the device's software is up to date.

In some embodiments, when the user selects region 956 of screen 951 in FIG. 156, labeled "Reprogram Device," the one or more device agents present a notification that provides information to the user. In an exemplary embodiment, illustrated in FIG. 160, notification 957 informs the user that he or she should only reprogram the device if instructed to do so by a customer service representative. In the exemplary embodiment, notification 957 also provides additional information to the user regarding the reprogramming and asks the user to confirm that he or she wishes to reprogram the device.

In some embodiments, when the user selects region 958 of screen 951 in FIG. 156, labeled "Contact Us," the one or more device agents assist the user to submit a trouble ticket or to request information. In the exemplary embodiment illustrated in FIG. 161, the one or more device agents cause screen 959 to be presented. Screen 959 invites the user to select a help subject, type in the user's e-mail address, and provide a question or request.

In some embodiments, when the user selects region 961 of screen 951 in FIG. 156, labeled "System Information," the one or more device agents cause information about the device to be presented (not shown). In some embodiments, this information includes the subscriber identifier, the equipment identifier, device model, network type, device type, phone number, information about roaming (e.g., whether roaming is allowed), a SIM serial number, a SIM operator, a network operator, a base station identifier, or a combination of these.

In some embodiments, when the user selects region 962 of screen 951 in FIG. 156, labeled "About," the one or more device agents cause information about the device or service to be presented. In an exemplary embodiment. shown in FIG. 162, the one or more device agents present screen 963, which provides information about or touch-sensitive regions enabling the user to obtain information about: the software version, a copyright notice, a patent notice, license credits, a link to the service provider web site, and terms of service. In an exemplary embodiment, when a user selects region 964 of screen 963 in FIG. 162, the one or more device agents cause copyright information to be presented in pop-up 965, illustrated in FIG. 163. In some embodiments, when the user selects region 966 of screen 963 in FIG. 162, the one or more device agents are configured to assist in satisfying the virtual marking provisions of 35 U.S.C. § 287 by causing information about patents covering the device and services to be presented. In the exemplary embodiment of FIG. 164, pop-up 967 provides notice that the services and devices that provide the services are protected by patents in the U.S. and elsewhere, and the user can obtain more information by visiting a web site. In some embodiments, including the exemplary embodiment of pop-up 967 in FIG. 164, the one or more device agents present a website link to enable the user to view the applicable patents from the device.

It is to be appreciated that the word "plan" is used herein to refer not only to specialized plans that have a single component (e.g., "Talk 30" plan, "Data 50" plan, etc.), but also to any monthly (or time-limited or non-expiring) plan having multiple components (e.g., voice, data, and/or text) and also to the components of a monthly (or time-limited or non-expiring) plan (e.g., the voice, data, and text components of a plan). Whether a device able to access "Data 450," "Text 450," and "Talk 550," such as the device shown in (for example) FIG. 99, has three plans (one each for data, text, and voice) or one plan (with data, text, and voice components) is a matter of semantics.

It is to be appreciated that although various of the figures presented and described herein illustrate particular user interface (UI) constructs that enable users to perform various functions (e.g., increment/decrement constructs to set times for restrictions, wheels or carousels to select, configure, and modify service plans, drop down menus to choose pre-set or custom restriction options, pop-ups for certain notification messages, etc.), these UI constructs are only a few of the myriad of UI constructs that could alternately or also be used. Many different UI constructs could be used to gather the information described herein, and the selections shown herein are design choices. The selection of a particular construct or combination of constructs to illustrate a particular functionality is not to be interpreted as limiting unless specifically recited in the claims. Moreover, although FIGS. 21, 22, and 24 through 166 are screen shots of a touch-sensitive display, it is to be appreciated that much or all of the same information could be gathered through a different type of user interface, such as an audio interface (e.g., a microphone), or a hand swipe/movement, or by detecting facial expressions, or eye movement/tracking control/selection, etc.

It is to be appreciated that although the exemplary embodiments sometimes refer to devices as having full account control or no account control, it is also possible to give devices intermediate levels of account control, as described above. For example, a device could be authorized to make particular purchases, or purchases costing no more than a limit. Likewise, a device could be authorized to control a first subset of devices in the device group but not a second subset. For example, a device could be authorized so that a user of that device can set restrictions for that device but not for other devices. It is to be appreciated that various levels of permissions and controls can be granted to individual devices and are within the scope of the disclosures herein. In some embodiments the control/management may include two or more levels of hierarchy, e.g., full control (e.g., for the account owner), partial control (e.g., for an account manager assigned by account owner), and minimal or no control (e.g., for a child).

Likewise, it is to be appreciated that although the exemplary embodiments at times assume that users have a full complement of managerial permissions by virtue of being able to log in to the device group account, and otherwise have no ability to manage devices, it is also possible, as described above, to give users intermediate levels of control. For example, a user could be authorized to manage (e.g., set usage allowances for, purchase plans for, etc.) a first subset of devices in the device group (e.g., set restrictions on the user's own device) but not a second subset of devices. Likewise, a user could be able to view usage of some or all of the devices in the device group, but not purchase or change plans for any of the devices. It is to be appreciated that by using the functions and tools described herein, many different levels and combinations of permissions and controls can be granted to individual users and are within the scope of the disclosures herein.

It is also to be appreciated that adding devices to a device group or removing devices from a device group is tantamount to adding devices to an account associated with the device group or removing devices from an account associated with the device group. Thus, the terms "device group" and "device group account" are often used interchangeably.

It is also to be appreciated that applications include not only user applications, but also operating system functions, pre-loaded enterprise applications, operating system components, device function applications (e.g., camera application, etc.), etc.

It is also to be appreciated that the one or more device agents can include one or more user applications, operating system (OS) components, OS functions, OS libraries, OS applications, user application functions, software agents, hardware agents, firmware agents, etc.

The terms account owner, account manager, account holder, account administrator, device group administrator, administrator, authorized member of the device group, authorized user, primary user, parent user, master user, and the like are interchangeable as used herein unless indicated otherwise in the context in which these terms are used.

It is to be appreciated that some or all of the management operations described herein (e.g., adding a device to a device group, selecting a plan, allocating or sharing a plan, configuring a restriction, etc.) can be accomplished over an ambient connection to service controller 122, i.e., at no charge to the user or to the device group account. Thus, even if a device group plan does not include a data component (e.g., the plan only includes voice and text), users and administrators with an appropriate level of account control can still manage the account and/or devices in the device group over the ambient connection.

As discussed herein, authority to manage a device group can be provided by (1) the device being used, itself included in the device group, having an appropriate level of authority to manage at least an aspect of the device group; (2) the device being used, itself included in the device group, not having the appropriate level of authority to manage the at least an aspect of the device group, but the user of the device being able to log in to the device group account, the user having the appropriate level of authority to manage the at least an aspect of the device group; (3) the device being used, itself not included in the device group, having a service processor (e.g., an application program) enabling a user with authority (e.g., by supplying a credential to the application program) to manage the device group; (4) a user logging into a web site that provides for management of the device group. Although some of the examples provided herein refer to specific configurations (e.g., a first device in the device group having authority to manage a second device in the device group), it is to be understood that having the appropriate level of control, whether because the device or the user has the authority, enables the management functions discussed herein. The use of a particular example in a particular context does not exclude other examples. In other words, a user who has obtained the appropriate level of authority can manage devices, regardless of the mechanism by which the user obtained that authority.

Unless the context indicates otherwise, the word "or" is inclusive, such that "A or B" means "A alone, B alone, or both A and B." The occasional use of "and/or" in this document is not to be construed as an indication that the use of "or" alone connotes exclusivity.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830; application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK, now U.S. Pat. No. 8,893,009; application Ser. No. 13/309,463, filed Dec. 1, 2011, entitled SECURITY, FRAUD DETECTION, AND FRAUD MITIGATION IN DEVICE-ASSISTED SERVICES SYSTEMS, now U.S. Pat. No. 8,793,758 (issued Jul. 29, 2014); application Ser. No. 13/374,959, filed Jan. 24, 2012, entitled FLOW TAGGING FOR SERVICE POLICY IMPLEMENTATION, now U.S. Pat. No. 8,606,911 (issued Dec. 10, 2013); application Ser. No. 13/441,821, filed Apr. 6, 2012, entitled MANAGING SERVICE USER DISCOVERY AND SERVICE LAUNCH OBJECT PLACEMENT ON A DEVICE; application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT; and application Ser. No. 13/802,483, filed Mar. 13, 2013, entitled MOBILE DEVICE ACTIVATION VIA DYNAMICALLY SELECTED ACCESS NETWORK; application Ser. No. 13/842,172, filed Mar. 15, 2013, entitled NETWORK SERVICE PLAN DESIGN; application Ser. No. 13/947,099, filed Jul. 21, 2013, entitled VIRTUALIZED POLICY & CHARGING SYSTEM; application Ser. No. 14/083,324, filed Nov. 18, 2013, entitled SERVICE PROCESSOR CONFIGURATIONS FOR ENHANCING OR AUGMENTING SYSTEM SOFTWARE OF A MOBILE COMMUNICATIONS DEVICE; application Ser. No. 14/098,523, filed Dec. 5, 2013, entitled INTERMEDIATE NETWORKING DEVICES, now U.S. Pat. No. 9,351,193 (issued May 24, 2016); application Ser. No. 14/181,910, filed Feb. 17, 2014, entitled ENHANCED CURFEW AND PROTECTION ASSOCIATED WITH A DEVICE GROUP; application Ser. No. 14/208,236, filed Mar. 13, 2014, entitled AUTOMATED CREDENTIAL PORTING FOR MOBILE DEVICES; application Ser. No. 14/214,492, filed Mar. 14, 2014, entitled WIRELESS END-USER DEVICE PROVIDING AMBIENT OR SPONSORED SERVICES; and application Ser. No. 14/275,805, filed May 12, 2014, entitled MOBILE DEVICE AND SERVICE MANAGEMENT.

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL;

Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; Provisional Application No. 61/550,906, filed Oct. 24, 2011, entitled SECURITY FOR DEVICE-ASSISTED SERVICES; Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; Provisional Application No. 61/610,876, filed Mar. 14, 2012, entitled METHODS AND APPARATUS FOR APPLICATION PROMOTION AND SPONSORSHIP; Provisional Application No. 61/610,910, filed Mar. 14, 2012, entitled WIFI ACTIVATION BACKUP PROCESS; Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; Provisional Application No. 61/674,331, filed Jul. 21, 2012, entitled SERVICE CONTROLLER FOR MANAGING CLOUD-BASED POLICY; Provisional Application No. 61/724,267, filed Nov. 8, 2012, entitled FLEXIBLE SERVICE PLAN DESIGN, USER INTERFACE AND DEVICE MANAGEMENT; Provisional Application No. 61/724,837, filed Nov. 9, 2012, entitled SERVICE PLAN DISCOVERY, CUSTOMIZATION, AND MANAGEMENT; Provisional Application No. 61/724,974, filed Nov. 10, 2012, entitled SERVICE PLAN DISCOVERY, CUSTOMIZATION, AND MANAGEMENT; Provisional Application No. 61/732,249, filed Nov. 30, 2012, entitled APPLICATION PROGRAMMING INTERFACES FOR SMART SERVICES; Provisional Application No. 61/734,288, filed Dec. 6, 2012, entitled INTERMEDIATE NETWORKING DEVICE SERVICES; and Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; Provisional Application No. 61/756,332, filed Jan. 24, 2013, entitled MOBILE HOTSPOT; Provisional Application No. 61/758,964, filed Jan. 30, 2013, entitled MOBILE HOTSPOT; Provisional Application No. 61/765,978, filed Feb. 18, 2013, entitled ENHANCED CURFEW AND PROTECTION ASSOCIATED WITH A DEVICE GROUP; Provisional Application No. 61/785,988, filed Mar. 14, 2013, entitled AUTOMATED CREDENTIAL PORTING FOR MOBILE DEVICES; Provisional Application No. 61/794,116, filed Mar. 15, 2013, entitled ENHANCED INTERMEDIATE NETWORKING DEVICE; Provisional Application No. 61/792,765, filed Mar. 15, 2013, entitled DEVICE GROUP AND SERVICE PLAN MANAGEMENT; Provisional Application No. 61/793,894, filed Mar. 15, 2013, entitled SIMPLIFIED POLICY DESIGN, MANAGEMENT, AND IMPLEMENTATION; Provisional Application No. 61/799,710, filed Mar. 15, 2013, entitled AMBIENT OR SPONSORED SERVICES; Provisional Application No. 61/801,074, filed Mar. 15, 2013, entitled DEVICE GROUP AND SERVICE PLAN MANAGEMENT; and Provisional Application No. 61/822,850, filed May 13, 2013, entitled MOBILE DEVICE AND SERVICE MANAGEMENT.

What is claimed is:

1. A wireless end-user device, comprising:

one or more modems enabling the wireless end-user device to communicate with a network system over a wireless access network;

a touch-screen user interface; and one or more processors configured to execute instructions that cause the one or more processors to:

detect a user input through the touch-screen user interface, the user input comprising an attempt by a user to perform a device group management task for an existing device group account, the existing device group account being associated with a plurality of wireless one or more devices including the wireless end-user device, make a first determination as to whether the wireless end-user device has a level of control over the existing device group account that allows the device to perform the device group management task, based on the determination indicating the level of control, present one or more options on the touch-screen user interface to enable the user to perform the attempted device group management task, based on the first determination indicating a lack of the level of control, make a second determination as to whether the user has a level of control over the existing device group account, and based on the second determination indicating the level of control, present the one or more options on the touch-screen user interface to enable the user to perform the attempted device group management task, and based on a user selection of the one or more options on the touch-screen user interface, send a message to the network system over the wireless access network, the message conveying a request to configure one or more device group management aspects of a wireless service policy for the existing device group account.

2. The wireless end-user device of claim 1, wherein execution of the instructions to cause the one or more processors to make a first determination comprises cooperating with a service controller in the network system to make the first determination.

3. The wireless end-user device of claim 1, wherein execution of the instructions to cause the one or more processors to make a second determination comprises cooperating with a service controller in the network system to make the second determination.

4. The wireless end-user device of claim 1, wherein execution of the instructions to cause the one or more processors to make a second determination comprises determining whether the user has a level of control over the existing device group account based on whether the user can log in to the device group account.

5. The wireless end-user device of claim 1, wherein execution of the instructions further causes the one or more processors to, based on the second determination indicating a lack of the level of control, present on the touch-screen user interface, instead of the one or more options, information about a service plan applied to the wireless end-user device.

6. The wireless end-user device of claim 1, wherein execution of the instructions further causes the one or more processors to make an initial determination as to whether the attempted device group management task only affects the wireless end-user device, and, based on the initial determination indicating that the attempted device grounp management task only affects the wireless end-user device, present one or more options on the touch-screen user interface to enable the user to perform the attempted device group management task, without making the first or second determinations.

7. The wireless end-user device of claim 1, wherein execution of the instructions to cause the one or more processors to make a first determination comprises cooperating with a second wireless device in the existing device group account to make the first determination.

8. The wireless end-user device of claim 1, wherein execution of the instructions to cause the one or more processors to make a second determination comprises cooperating with a second wireless device in the existing device group account to make the second determination.

9. The wireless end-user device of claim 1, wherein execution of the instructions further causes the one or more processors to display, on the touch-screen user interface, information for multiple ones of the wireless devices associated with the existing device group account, the information displayed for each of the multiple ones of the wireless devices comprising indicia of one or more capabilities and/or restrictions of that wireless device.

* * * * *